US008073714B1

(12) United States Patent
Ball

(10) Patent No.: US 8,073,714 B1
(45) Date of Patent: Dec. 6, 2011

(54) INTERACTIVE SYSTEMS AND METHODS FOR INSURANCE-RELATED ACTIVITIES

(75) Inventor: Robert Ball, Atlanta, GA (US)

(73) Assignee: The Guardian Life Insurance Company of America, New York, NY (US)

( * ) Notice: Subject to any disclaimer, the term of this patent is extended or adjusted under 35 U.S.C. 154(b) by 934 days.

(21) Appl. No.: 11/510,537

(22) Filed: Aug. 25, 2006

Related U.S. Application Data

(60) Provisional application No. 60/763,200, filed on Jan. 27, 2006.

(51) Int. Cl.
*G06Q 40/00* (2006.01)

(52) U.S. Cl. ............................ 705/4; 705/35; 705/36 R

(58) Field of Classification Search ................ 705/4, 35, 705/36 R
See application file for complete search history.

(56) References Cited

U.S. PATENT DOCUMENTS

| | | | | |
|---|---|---|---|---|
| 3,406,467 | A | 10/1968 | Lufkin et al. | 434/107 |
| 4,837,693 | A | 6/1989 | Schotz | 364/408 |
| 5,182,705 | A | 1/1993 | Barr et al. | 364/401 |
| 5,479,344 | A | 12/1995 | Keziah, Jr. | 364/40 B |
| 5,523,942 | A | 6/1996 | Tyler et al. | |
| 5,819,263 | A | 10/1998 | Bromley et al. | 707/3 |
| 5,884,283 | A | 3/1999 | Manos | 705/30 |
| 5,903,873 | A | 5/1999 | Peterson et al. | 705/4 |
| 5,956,691 | A | 9/1999 | Powers | 705/4 |
| 5,991,744 | A | 11/1999 | DiCresce | 705/36 |
| 6,009,402 | A | 12/1999 | Whitworth | 705/4 |
| 6,012,043 | A | 1/2000 | Albright et al. | 705/36 |
| D424,541 | S | 5/2000 | Mugura | D14/486 |
| 6,064,986 | A | 5/2000 | Edelman | 705/36 |
| 6,076,072 | A | 6/2000 | Libman | 705/34 |
| D427,576 | S | 7/2000 | Coleman | D14/486 |
| 6,092,050 | A | 7/2000 | Lungren et al. | 705/10 |
| D437,601 | S | 2/2001 | Utsuki et al. | D14/486 |

(Continued)

FOREIGN PATENT DOCUMENTS

WO WO 01/33476 5/2001

(Continued)

OTHER PUBLICATIONS

"GBS Agency Expert" GBS, Inc., http://www.gbsinc.com (Feb. 16, 2006), 122 pages.

(Continued)

*Primary Examiner* — Jagdish Patel
*Assistant Examiner* — Sara Chandler
(74) *Attorney, Agent, or Firm* — McGuire Woods LLP

(57) ABSTRACT

Systems and methods for performing insurance related activities are provided. Software can be implemented to provide an application that includes an interactive interface for use by insurance professionals in managing clients, marketing insurance, and storing information. For example, a network application can be implemented that a user can access via a web browser and which is intuitive for quick comprehension and interaction by users. The application can include multiple layers directed to particular stages of the insurance-client relationship. The application can include a workflow wizard to aid the user in managing and maintaining client information and tracking progress. Aggregation services can also be incorporated into the application. Interactive insurance-and-client specific display pages can be incorporated to aid in understanding a client's current insurance information and to generate presentations. "Value" calculators may be implemented to illustrate a comparison of a client's current level of protection to a client's current financial state.

51 Claims, 203 Drawing Sheets

U.S. PATENT DOCUMENTS

| | | | | |
|---|---|---|---|---|
| 6,430,542 | B1 | 8/2002 | Moran | 705/36 |
| 6,456,979 | B1 | 9/2002 | Flagg | 705/4 |
| 6,584,446 | B1 * | 6/2003 | Buchanan et al. | 705/4 |
| 6,611,807 | B1 * | 8/2003 | Bernheim et al. | 705/36 R |
| 6,684,190 | B1 | 1/2004 | Powers et al. | 705/4 |
| 6,996,782 | B2 | 2/2006 | Parker et al. | 715/764 |
| 7,062,458 | B2 * | 6/2006 | Maggioncalda et al. | 705/36 R |
| D526,323 | S | 8/2006 | McDougall et al. | D14/485 |
| D526,324 | S | 8/2006 | McDougall et al. | D14/485 |
| D526,653 | S | 8/2006 | McDougall et al. | D14/485 |
| D527,735 | S | 9/2006 | McDougall et al. | |
| 7,328,183 | B1 * | 2/2008 | Leisle | 705/36 T |
| D586,821 | S | 2/2009 | Koh | |
| D589,522 | S | 3/2009 | Jewitt et al. | |
| D589,528 | S | 3/2009 | Koh | |
| 2001/0009004 | A1 | 7/2001 | Groat et al. | 705/36 |
| 2001/0023414 | A1 * | 9/2001 | Kumar et al. | 705/35 |
| 2002/0007332 | A1 | 1/2002 | Johnson et al. | 705/36 |
| 2002/0095363 | A1 | 7/2002 | Sloan et al. | 705/36 |
| 2002/0103733 | A1 | 8/2002 | Barrington et al. | 705/36 |
| 2002/0123949 | A1 * | 9/2002 | VanLeeuwen | 705/35 |
| 2002/0138389 | A1 | 9/2002 | Martone et al. | 705/36 |
| 2002/0143680 | A1 | 10/2002 | Walters et al. | 705/36 |
| 2002/0147618 | A1 | 10/2002 | Mezrah et al. | 705/4 |
| 2002/0198743 | A1 | 12/2002 | Ariathurai et al. | 705/4 |
| 2003/0167220 | A1 | 9/2003 | Schoen et al. | 705/36 |
| 2004/0039588 | A1 | 2/2004 | Libman | 705/1 |
| 2004/0128171 | A1 * | 7/2004 | Rees et al. | 705/4 |
| 2004/0254881 | A1 * | 12/2004 | Kumar et al. | 705/40 |
| 2005/0010510 | A1 | 1/2005 | Brose et al. | 705/35 |
| 2005/0027632 | A1 | 2/2005 | Zeitoun et al. | 705/36 |
| 2006/0090141 | A1 | 4/2006 | Loui et al. | 715/764 |
| 2006/0155590 | A1 * | 7/2006 | Graham | 705/4 |
| 2007/0027736 | A1 | 2/2007 | Reynolds et al. | 705/8 |

FOREIGN PATENT DOCUMENTS

| | | | |
|---|---|---|---|
| WO | WO 02056143 | A2 * | 7/2002 |

OTHER PUBLICATIONS

"WebWriter™," Insurance Systems, Inc., http://www.insurancesystems.ca/insurance-software.htm, pp. 1-4 (Feb. 14, 2006).

"ProSpector™," Sintech Software, Inc, http://www.sintechsoft.com (Feb. 14, 2006), 32 pages.

"IncomeMAX," Cygnus Software, Inc., http://www.cygnussoft.com (Feb. 14, 2006), 46 pages.

"AccountantsWorld/Financial Calculators" AccountantsWorld, LLC, http://www.accountantsoffice.com (Aug. 18, 2006), 49 pages.

Article: Danna Voth, "Drowning in Date-Comprehensive Portfolio Management Software Throws a Lifeline to Investors Overwhelmed by the Task of Tracking Their Assets" , Worth, May 2007.

Article: Bob Ball and Kathy Readinger, "Producers Eye Account Aggregation As Key to Service Philosophy", National Underwriter Life & Health, Jul. 2007.

U.S. Appl. No. 12/113,087, filed Apr. 2008, Ball.

U.S. Appl. No. 29/283,341, filed Aug. 2007, Ball.

U.S. Appl. No. 12/380,564, filed Feb. 2009, Ball.

U.S. Appl. No. 11/891,616, filed Aug. 2007, Ball.

U.S. Appl. No. 12/771,795, filed Apr. 2010, Ball.

Article: Robert Regis Hyle, "Guardan Offers Customers Daily Look at Net Worth", (Industry Intelligence, News, Insights, Innovations, Financial Tools), National Underwriter Publication, TechDecisions for Insurance, vol. 8, No. 4, Apr. 2006.

* cited by examiner

120

130

150

170

190

200

210

220

230

240

250

260

270

280

300

310

320

330

340

350

360

362

370

380

380

410

420

420

420

420

480

490

500

500

500

500

500

560

570

580

590

590

570

620

630

640

650

660

660

660

690

700

710

720

730

740

760

770

780

790

820

830

840

850

860

870

880

890

900

910

920

940

950

960

970

980

990

990

990

990

990

1040

990

1060

1070

1070

1102

1130

1140

1150

1160

1170

1200

1210

1220

1230

1240

Figure 126:
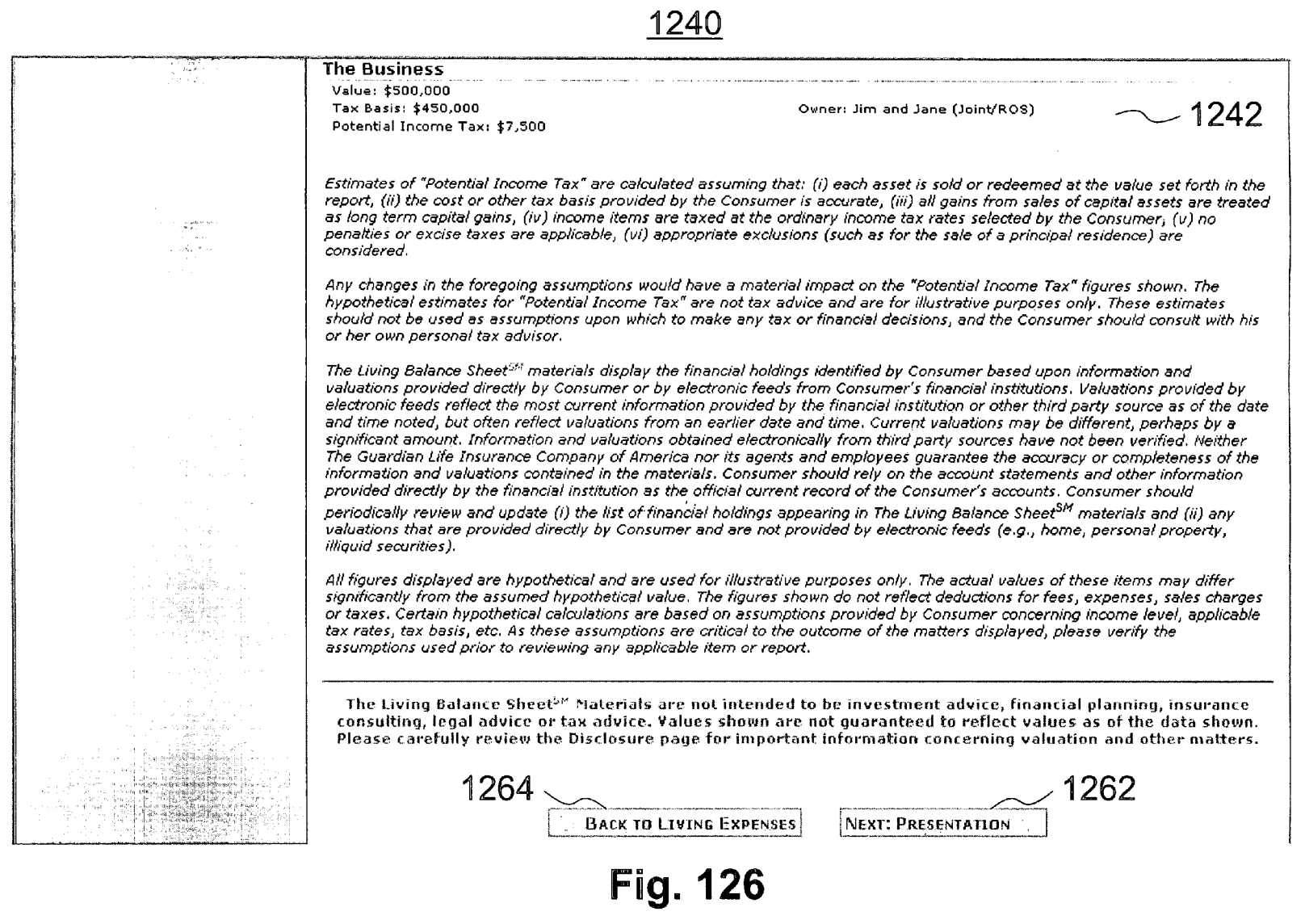

1240

The Business

Value: $500,000
Tax Basis: $450,000
Potential Income Tax: $7,500

Owner: Jim and Jane (Joint/ROS)

1242

*Estimates of "Potential Income Tax" are calculated assuming that: (i) each asset is sold or redeemed at the value set forth in the report, (ii) the cost or other tax basis provided by the Consumer is accurate, (iii) all gains from sales of capital assets are treated as long term capital gains, (iv) income items are taxed at the ordinary income tax rates selected by the Consumer, (v) no penalties or excise taxes are applicable, (vi) appropriate exclusions (such as for the sale of a principal residence) are considered.*

*Any changes in the foregoing assumptions would have a material impact on the "Potential Income Tax" figures shown. The hypothetical estimates for "Potential Income Tax" are not tax advice and are for illustrative purposes only. These estimates should not be used as assumptions upon which to make any tax or financial decisions, and the Consumer should consult with his or her own personal tax advisor.*

*The Living Balance Sheet[SM] materials display the financial holdings identified by Consumer based upon information and valuations provided directly by Consumer or by electronic feeds from Consumer's financial institutions. Valuations provided by electronic feeds reflect the most current information provided by the financial institution or other third party source as of the date and time noted, but often reflect valuations from an earlier date and time. Current valuations may be different, perhaps by a significant amount. Information and valuations obtained electronically from third party sources have not been verified. Neither The Guardian Life Insurance Company of America nor its agents and employees guarantee the accuracy or completeness of the information and valuations contained in the materials. Consumer should rely on the account statements and other information provided directly by the financial institution as the official current record of the Consumer's accounts. Consumer should periodically review and update (i) the list of financial holdings appearing in The Living Balance Sheet[SM] materials and (ii) any valuations that are provided directly by Consumer and are not provided by electronic feeds (e.g., home, personal property, illiquid securities).*

*All figures displayed are hypothetical and are used for illustrative purposes only. The actual values of these items may differ significantly from the assumed hypothetical value. The figures shown do not reflect deductions for fees, expenses, sales charges or taxes. Certain hypothetical calculations are based on assumptions provided by Consumer concerning income level, applicable tax rates, tax basis, etc. As these assumptions are critical to the outcome of the matters displayed, please verify the assumptions used prior to reviewing any applicable item or report.*

The Living Balance Sheet[SM] Materials are not intended to be investment advice, financial planning, insurance consulting, legal advice or tax advice. Values shown are not guaranteed to reflect values as of the data shown. Please carefully review the Disclosure page for important information concerning valuation and other matters.

1264 BACK TO LIVING EXPENSES

NEXT: PRESENTATION 1262

Figure 128:
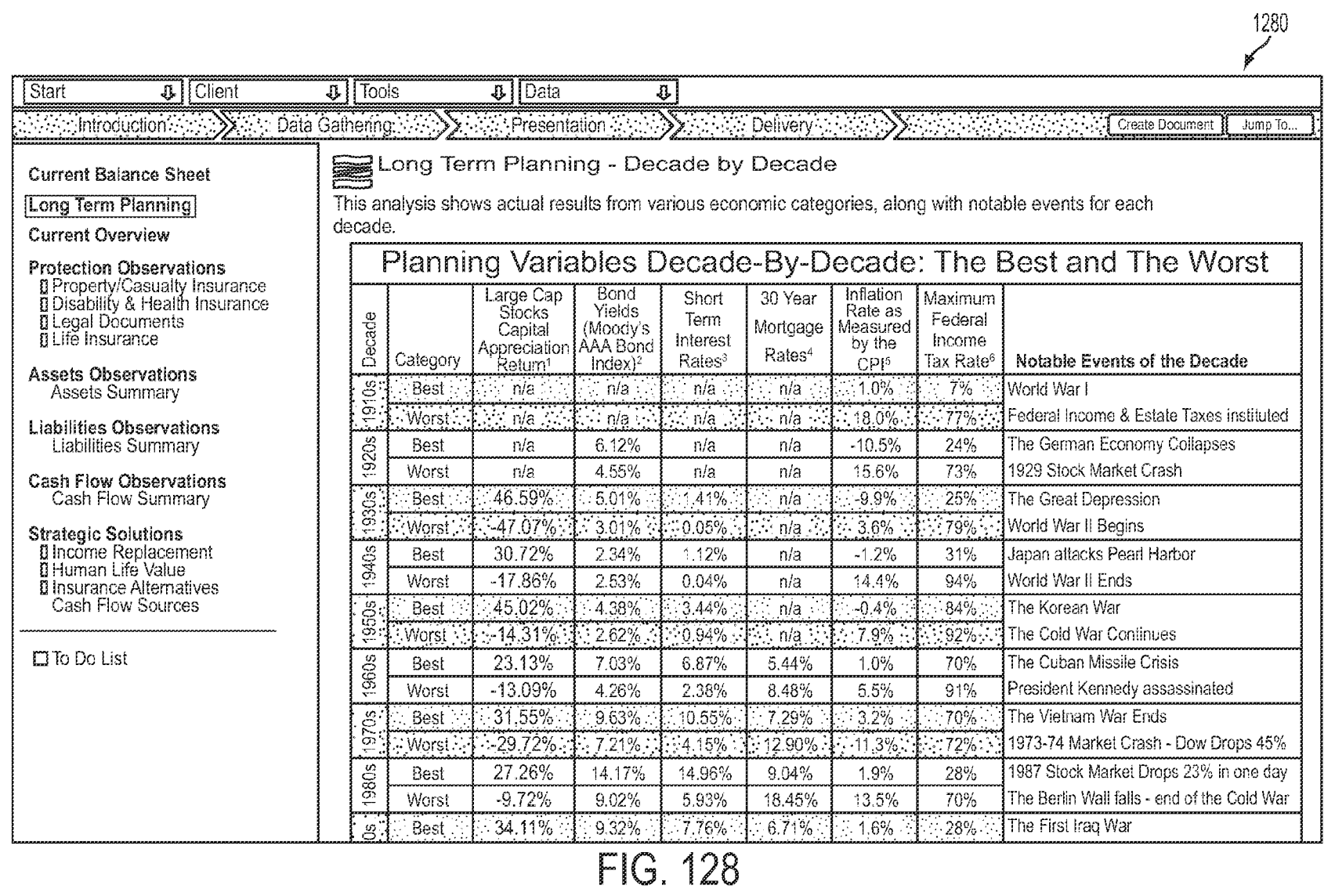

Start | Client | Tools | Data

Introduction > Data Gathering > Presentation > Delivery > Create Document | Jump To...

Current Balance Sheet

Long Term Planning

Current Overview

Protection Observations
- Property/Casualty Insurance
- Disability & Health Insurance
- Legal Documents
- Life Insurance

Assets Observations
Assets Summary

Liabilities Observations
Liabilities Summary

Cash Flow Observations
Cash Flow Summary

Strategic Solutions
- Income Replacement
- Human Life Value
- Insurance Alternatives Cash Flow Sources ☐ To Do List

Long Term Planning - Decade by Decade

This analysis shows actual results from various economic categories, along with notable events for each decade.

Planning Variables Decade-By-Decade: The Best and The Worst

| Decade | Category | Large Cap Stocks Capital Appreciation Return[1] | Bond Yields (Moody's AAA Bond Index)[2] | Short Term Interest Rates[3] | 30 Year Mortgage Rates[4] | Inflation Rate as Measured by the CPI[5] | Maximum Federal Income Tax Rate[6] | **Notable Events of the Decade** |
|---|---|---|---|---|---|---|---|---|
| 1910s | Best | n/a | n/a | n/a | n/a | 1.0% | 7% | World War I |
| | Worst | n/a | n/a | n/a | n/a | 18.0% | 77% | Federal Income & Estate Taxes instituted |
| 1920s | Best | n/a | 6.12% | n/a | n/a | -10.5% | 24% | The German Economy Collapses |
| | Worst | n/a | 4.55% | n/a | n/a | 15.6% | 73% | 1929 Stock Market Crash |
| 1930s | Best | 46.59% | 5.01% | 1.41% | n/a | -9.9% | 25% | The Great Depression |
| | Worst | -47.07% | 3.01% | 0.05% | n/a | 3.6% | 79% | World War II Begins |
| 1940s | Best | 30.72% | 2.34% | 1.12% | n/a | -1.2% | 31% | Japan attacks Pearl Harbor |
| | Worst | -17.86% | 2.53% | 0.04% | n/a | 14.4% | 94% | World War II Ends |
| 1950s | Best | 45.02% | 4.38% | 3.44% | n/a | -0.4% | 84% | The Korean War |
| | Worst | -14.31% | 2.62% | 0.94% | n/a | 7.9% | 92% | The Cold War Continues |
| 1960s | Best | 23.13% | 7.03% | 6.87% | 5.44% | 1.0% | 70% | The Cuban Missile Crisis |
| | Worst | -13.09% | 4.26% | 2.38% | 8.48% | 5.5% | 91% | President Kennedy assassinated |
| 1970s | Best | 31.55% | 9.63% | 10.55% | 7.29% | 3.2% | 70% | The Vietnam War Ends |
| | Worst | -29.72% | 7.21% | 4.15% | 12.90% | 11.3% | 72% | 1973-74 Market Crash - Dow Drops 45% |
| 1980s | Best | 27.26% | 14.17% | 14.96% | 9.04% | 1.9% | 28% | 1987 Stock Market Drops 23% in one day |
| | Worst | -9.72% | 9.02% | 5.93% | 18.45% | 13.5% | 70% | The Berlin Wall falls - end of the Cold War |
| 0s | Best | 34.11% | 9.32% | 7.76% | 6.71% | 1.6% | 28% | The First Iraq War |

Figure 129:
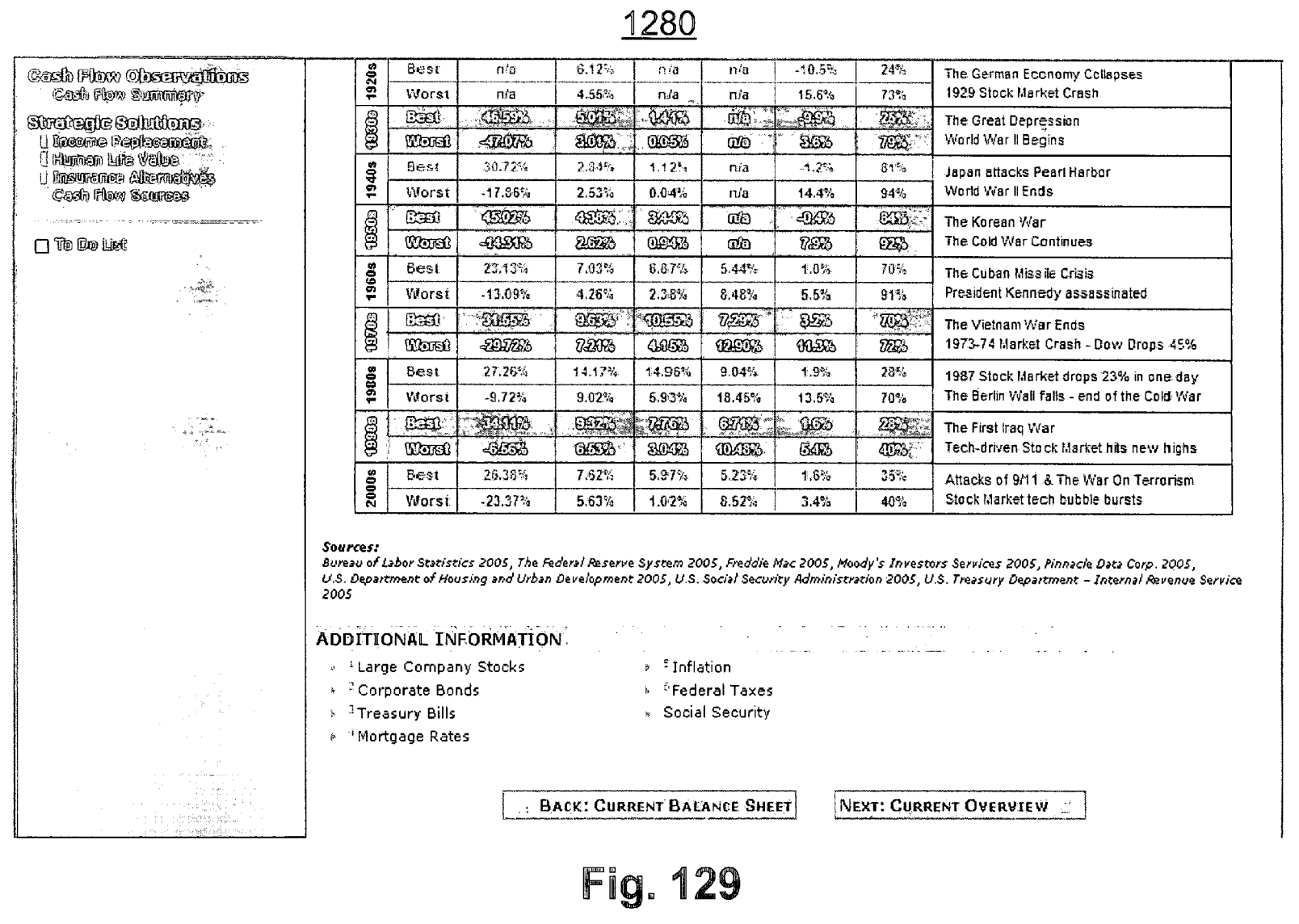

Cash Flow Observations
Cash Flow Summary

Strategic Solutions
- Income Replacement
- Human Life Value
- Insurance Alternatives
Cash Flow Sources ☐ To Do List

| | | | | | | | | |
|---|---|---|---|---|---|---|---|---|
| 1920s | Best | n/a | 6.12% | n/a | n/a | -10.5% | 24% | The German Economy Collapses |
| | Worst | n/a | 4.55% | n/a | n/a | 15.6% | 73% | 1929 Stock Market Crash |
| 1930s | Best | 46.59% | 5.01% | 1.41% | n/a | -9.9% | 25% | The Great Depression |
| | Worst | -47.07% | 3.01% | 0.05% | n/a | 3.6% | 79% | World War II Begins |
| 1940s | Best | 30.72% | 2.84% | 1.12% | n/a | -1.2% | 81% | Japan attacks Pearl Harbor |
| | Worst | -17.86% | 2.53% | 0.04% | n/a | 14.4% | 94% | World War II Ends |
| 1950s | Best | 45.02% | 4.36% | 3.44% | n/a | -0.4% | 84% | The Korean War |
| | Worst | -14.31% | 2.62% | 0.94% | n/a | 7.9% | 92% | The Cold War Continues |
| 1960s | Best | 23.13% | 7.03% | 6.87% | 5.44% | 1.0% | 70% | The Cuban Missile Crisis |
| | Worst | -13.09% | 4.26% | 2.38% | 8.48% | 5.5% | 91% | President Kennedy assassinated |
| 1970s | Best | 31.55% | 9.63% | 10.55% | 7.29% | 3.2% | 70% | The Vietnam War Ends |
| | Worst | -29.72% | 7.21% | 4.15% | 12.90% | 11.3% | 72% | 1973-74 Market Crash - Dow Drops 45% |
| 1980s | Best | 27.26% | 14.17% | 14.96% | 9.04% | 1.9% | 28% | 1987 Stock Market drops 23% in one day |
| | Worst | -9.72% | 9.02% | 5.93% | 18.45% | 13.5% | 70% | The Berlin Wall falls - end of the Cold War |
| 1990s | Best | 34.11% | 9.32% | 7.76% | 6.71% | 1.6% | 28% | The First Iraq War |
| | Worst | -6.56% | 6.63% | 3.04% | 10.48% | 5.4% | 40% | Tech-driven Stock Market hits new highs |
| 2000s | Best | 26.38% | 7.62% | 5.97% | 5.23% | 1.6% | 35% | Attacks of 9/11 & The War On Terrorism |
| | Worst | -23.37% | 5.63% | 1.02% | 8.52% | 3.4% | 40% | Stock Market tech bubble bursts |

*Sources:*
*Bureau of Labor Statistics 2005, The Federal Reserve System 2005, Freddie Mac 2005, Moody's Investors Services 2005, Pinnacle Data Corp. 2005, U.S. Department of Housing and Urban Development 2005, U.S. Social Security Administration 2005, U.S. Treasury Department – Internal Revenue Service 2005*

ADDITIONAL INFORMATION

- [1] Large Company Stocks
- [2] Corporate Bonds
- [3] Treasury Bills
- [4] Mortgage Rates
- [5] Inflation
- [6] Federal Taxes
- Social Security

BACK: CURRENT BALANCE SHEET | NEXT: CURRENT OVERVIEW

Figure 135:
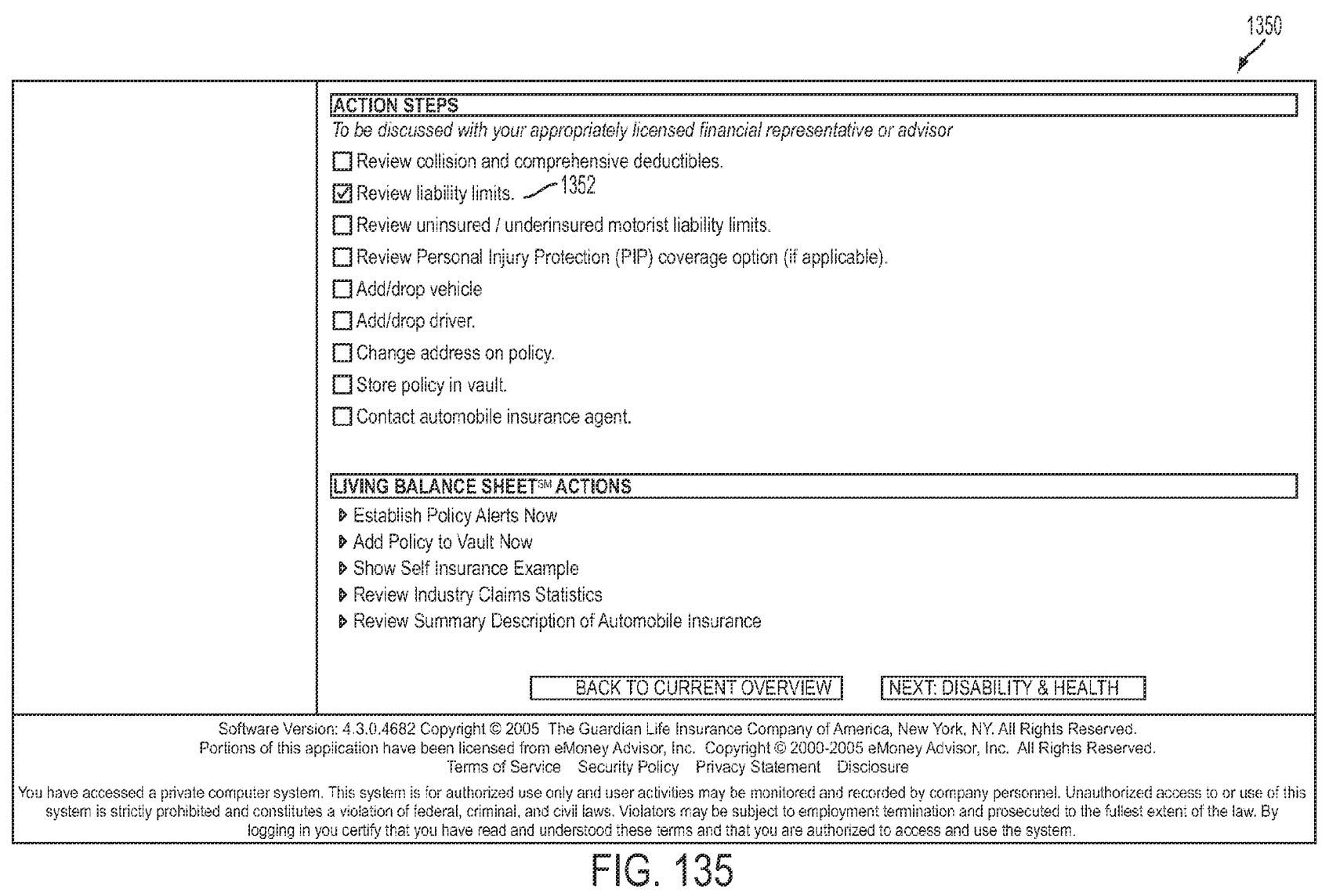

ACTION STEPS

*To be discussed with your appropriately licensed financial representative or advisor*

- ☐ Review collision and comprehensive deductibles.
- ☑ Review liability limits. 1352
- ☐ Review uninsured / underinsured motorist liability limits.
- ☐ Review Personal Injury Protection (PIP) coverage option (if applicable).
- ☐ Add/drop vehicle
- ☐ Add/drop driver.
- ☐ Change address on policy.
- ☐ Store policy in vault.
- ☐ Contact automobile insurance agent.

LIVING BALANCE SHEET[SM] ACTIONS

- ▸ Establish Policy Alerts Now
- ▸ Add Policy to Vault Now
- ▸ Show Self Insurance Example
- ▸ Review Industry Claims Statistics
- ▸ Review Summary Description of Automobile Insurance

[BACK TO CURRENT OVERVIEW] [NEXT: DISABILITY & HEALTH]

Software Version: 4.3.0.4682 Copyright © 2005 The Guardian Life Insurance Company of America, New York, NY. All Rights Reserved.
Portions of this application have been licensed from eMoney Advisor, Inc. Copyright © 2000-2005 eMoney Advisor, Inc. All Rights Reserved.
Terms of Service Security Policy Privacy Statement Disclosure
You have accessed a private computer system. This system is for authorized use only and user activities may be monitored and recorded by company personnel. Unauthorized access to or use of this system is strictly prohibited and constitutes a violation of federal, criminal, and civil laws. Violators may be subject to employment termination and prosecuted to the fullest extent of the law. By logging in you certify that you have read and understood these terms and that you are authorized to access and use the system.

Start | Client | Tools | Data

Introduction | Data Gathering | Presentation | Delivery | Create Document | Jump To...

Current Balance Sheet
Long Term Planning
Current Overview
Protection Observations
- Property/Casualty Insurance
- Disability & Health Insurance
- Legal Documents
- Life Insurance Assets Observations
Assets Summary
Liabilities Observations
Liabilities Summary
Cash Flow Observations
Cash Flow Summary
Strategic Solutions
- Income Replacement
- Human Life Value
- Insurance Alternatives
Cash Flow Sources ☐ To Do List

Disability & Health - Disability Insurance

Click on a link below to view the observations for a particular class of disability or health insurance. 1362

◉ Disability ○ Business Disability ○ Long Term Care ○ Medical 1361

We insure our cars, homes, and other assets according to their value. But when you think about it, it is our ability to earn an income that is a person's most valuable asset. Earned income supports your standard of living and enables you to achieve your long-term financial goals and objectives. So it only makes sense to protect your income in case an illness or injury prevents you from working. There are various types of disability insurance available, ranging from employer-provided group coverage (short- or long-term) to individual disability income insurance. Group coverage provides a basic level of benefits but for most people is insufficient to maintain their standard of living. An individual policy, which you own, provides you with the most flexibility and enables you to maximize your income protection. Individual policies can also help you protect the amount you are contributing to a qualified retirement plan. In addition, if you own a business you should also consider various types of business disability insurance which cover fixed overhead expenses or fund a buy-sell agreement.

1363

PRESENT COVERAGE HIGHLIGHTS

| Insurance Carrier | Policy Type | Annual Premium | Benefit Amount | Elimination Period | Benefit Period | Benefit Taxable |
|---|---|---|---|---|---|---|
| aaa insurnace | Group Short Term | $50 | $600 Monthly | 60 Days | Age 65 | No |

SUBJECTIVE COVERAGE ASSESSMENT

Choose an assessment: Under Protected

1364

ACTION STEPS

☐ Review current disability coverage.
☐ Consider exercising future increase option.
☐ Consider adding a cost of living adjustment benefit.

Figure 159:
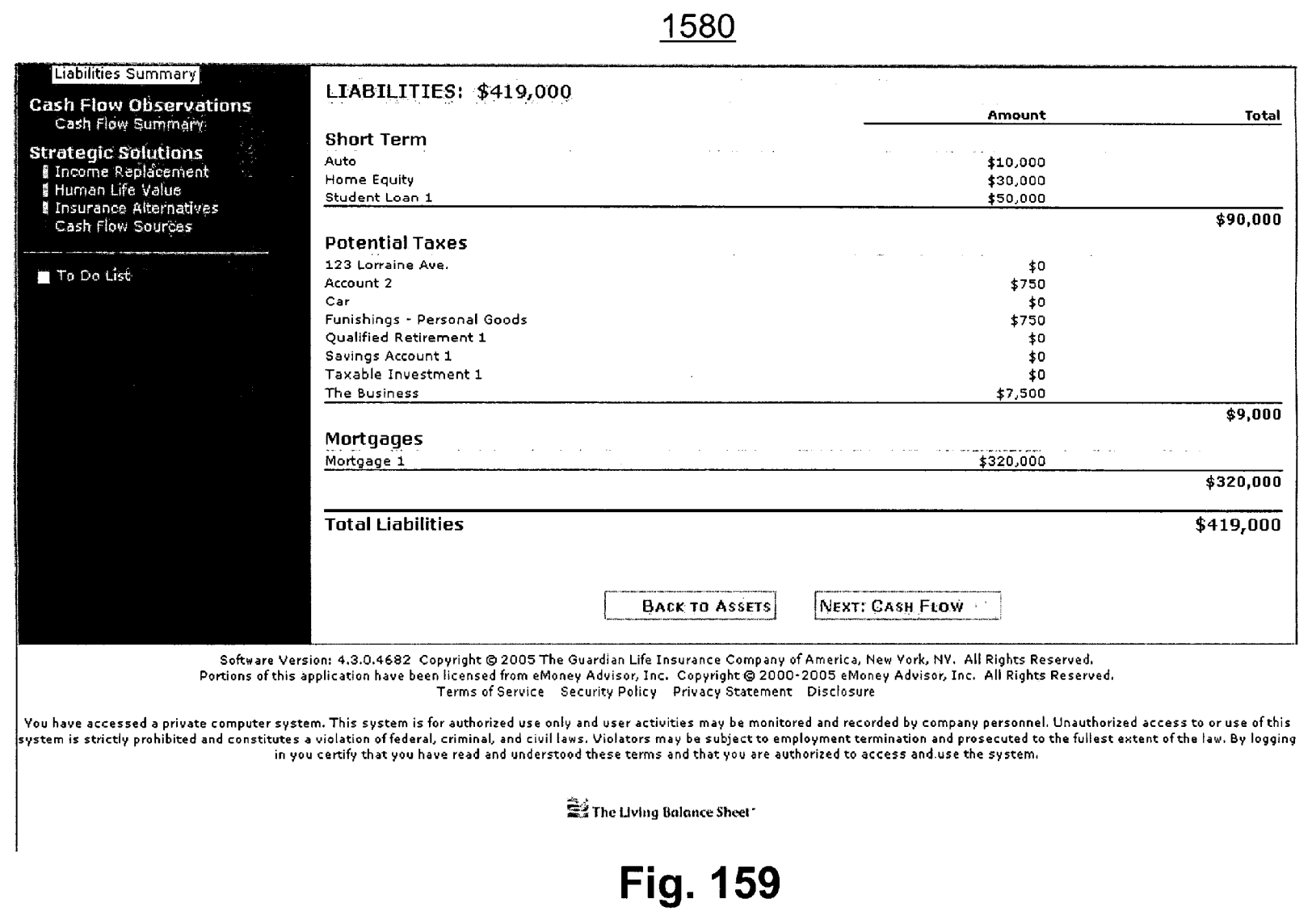

Liabilities Summary

Cash Flow Observations
Cash Flow Summary

Strategic Solutions
- Income Replacement
- Human Life Value
- Insurance Alternatives
- Cash Flow Sources

- To Do List

LIABILITIES: $419,000

| | Amount | Total |
|---|---|---|
| **Short Term** | | |
| Auto | $10,000 | |
| Home Equity | $30,000 | |
| Student Loan 1 | $50,000 | |
| | | $90,000 |
| **Potential Taxes** | | |
| 123 Lorraine Ave. | $0 | |
| Account 2 | $750 | |
| Car | $0 | |
| Funishings - Personal Goods | $750 | |
| Qualified Retirement 1 | $0 | |
| Savings Account 1 | $0 | |
| Taxable Investment 1 | $0 | |
| The Business | $7,500 | |
| | | $9,000 |
| **Mortgages** | | |
| Mortgage 1 | $320,000 | |
| | | $320,000 |
| **Total Liabilities** | | $419,000 |

BACK TO ASSETS NEXT: CASH FLOW

Software Version: 4.3.0.4682 Copyright © 2005 The Guardian Life Insurance Company of America, New York, NY. All Rights Reserved.
Portions of this application have been licensed from eMoney Advisor, Inc. Copyright © 2000-2005 eMoney Advisor, Inc. All Rights Reserved.
Terms of Service Security Policy Privacy Statement Disclosure You have accessed a private computer system. This system is for authorized use only and user activities may be monitored and recorded by company personnel. Unauthorized access to or use of this system is strictly prohibited and constitutes a violation of federal, criminal, and civil laws. Violators may be subject to employment termination and prosecuted to the fullest extent of the law. By logging in you certify that you have read and understood these terms and that you are authorized to access and use the system.

The Living Balance Sheet

Build using ChartFX for NET Development

☐ Investment Account Balance ☐ Policy Net Death Benefit

All investment and life insurance values are used for illustrative purposes only and are not guaranteed.

| Investment Only Option | | | | Permanent Life Insurance Option |
|---|---|---|---|---|
| Year | Annual Outlay | After Tax Earnings | End of Year A/T Investment Value | Policy Net Death Benefit |
| 1 | $1,300 | $0 | $1,300 | $1,000,000 |
| 2 | $1,300 | $78 | $2,678 | $1,000,000 |
| 3 | $1,300 | $161 | $4,139 | $1,000,000 |
| 4 | $1,300 | $248 | $5,687 | $1,000,000 |
| 5 | $1,300 | $341 | $7,328 | $1,000,000 |
| 6 | $1,300 | $440 | $9,068 | $1,000,000 |
| 7 | $1,300 | $544 | $10,912 | $1,000,000 |
| 8 | $1,300 | $655 | $12,867 | $1,000,000 |
| 9 | $1,300 | $772 | $14,939 | $1,000,000 |
| 10 | $1,300 | $896 | $17,135 | $1,000,000 |
| 11 | $1,300 | $1,028 | $19,463 | $1,000,000 |
| 12 | $1,300 | $1,168 | $21,931 | $1,000,000 |
| 13 | $1,300 | $1,316 | $24,547 | $1,000,000 |
| 14 | $1,300 | $1,473 | $27,320 | $1,000,000 |
| 15 | $1,300 | $1,639 | $30,259 | $1,000,000 |
| 16 | $1,300 | $1,816 | $33,375 | $1,000,000 |
| 17 | $1,300 | $2,003 | $36,678 | $1,000,000 |
| 18 | $1,300 | $2,201 | $40,179 | $1,000,000 |
| 19 | $1,300 | $2,411 | $43,890 | $1,000,000 |
| 20 | $1,300 | $2,633 | $47,823 | $1,000,000 |
| 21 | $1,300 | $2,869 | $51,992 | $1,000,000 |
| 22 | $1,300 | $3,120 | $56,412 | $1,000,000 |
| 23 | $1,300 | $3,385 | $61,097 | $1,000,000 |
| 24 | $1,300 | $3,666 | $66,063 | $1,000,000 |
| 25 | $1,300 | $3,964 | $71,327 | $1,000,000 |
| 26 | $1,300 | $4,280 | $76,907 | $1,000,000 |
| 27 | $1,300 | $4,614 | $82,821 | $1,000,000 |
| 28 | $1,300 | $4,969 | $89,090 | $1,000,000 |
| 29 | $1,300 | $5,345 | $95,735 | $1,000,000 |
| 30 | $1,300 | $5,744 | $100,779 | $1,000,000 |

Figure 175:
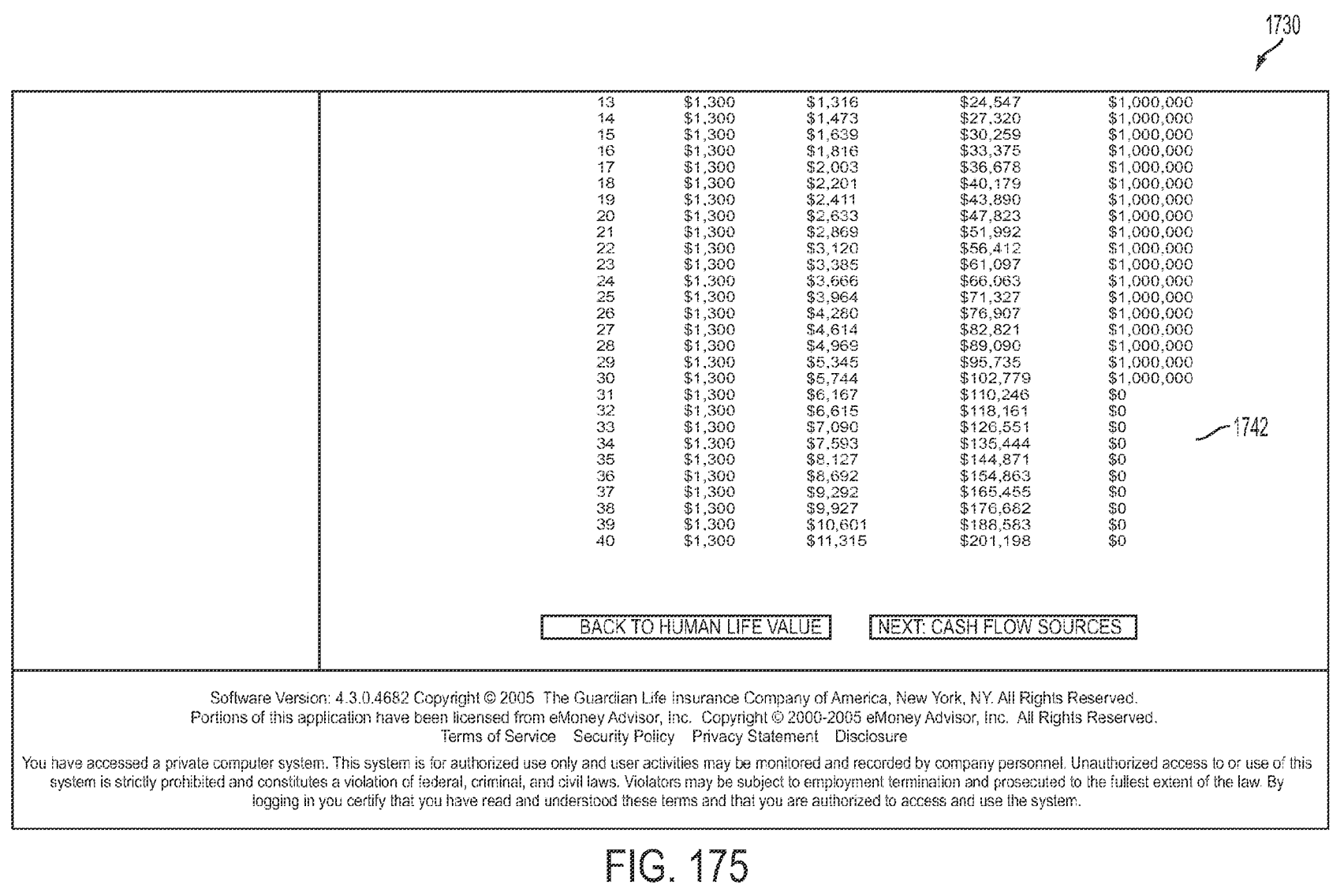

| | | | | |
|---|---|---|---|---|
| 13 | $1,300 | $1,316 | $24,547 | $1,000,000 |
| 14 | $1,300 | $1,473 | $27,320 | $1,000,000 |
| 15 | $1,300 | $1,639 | $30,259 | $1,000,000 |
| 16 | $1,300 | $1,816 | $33,375 | $1,000,000 |
| 17 | $1,300 | $2,003 | $36,678 | $1,000,000 |
| 18 | $1,300 | $2,201 | $40,179 | $1,000,000 |
| 19 | $1,300 | $2,411 | $43,890 | $1,000,000 |
| 20 | $1,300 | $2,633 | $47,823 | $1,000,000 |
| 21 | $1,300 | $2,869 | $51,992 | $1,000,000 |
| 22 | $1,300 | $3,120 | $56,412 | $1,000,000 |
| 23 | $1,300 | $3,385 | $61,097 | $1,000,000 |
| 24 | $1,300 | $3,666 | $66,063 | $1,000,000 |
| 25 | $1,300 | $3,964 | $71,327 | $1,000,000 |
| 26 | $1,300 | $4,280 | $76,907 | $1,000,000 |
| 27 | $1,300 | $4,614 | $82,821 | $1,000,000 |
| 28 | $1,300 | $4,969 | $89,090 | $1,000,000 |
| 29 | $1,300 | $5,345 | $95,735 | $1,000,000 |
| 30 | $1,300 | $5,744 | $102,779 | $1,000,000 |
| 31 | $1,300 | $6,167 | $110,246 | $0 |
| 32 | $1,300 | $6,615 | $118,161 | $0 |
| 33 | $1,300 | $7,090 | $126,551 | $0 |
| 34 | $1,300 | $7,593 | $135,444 | $0 |
| 35 | $1,300 | $8,127 | $144,871 | $0 |
| 36 | $1,300 | $8,692 | $154,863 | $0 |
| 37 | $1,300 | $9,292 | $165,455 | $0 |
| 38 | $1,300 | $9,927 | $176,682 | $0 |
| 39 | $1,300 | $10,601 | $188,583 | $0 |
| 40 | $1,300 | $11,315 | $201,198 | $0 |

1742

BACK TO HUMAN LIFE VALUE

NEXT: CASH FLOW SOURCES

Software Version: 4.3.0.4682 Copyright © 2005 The Guardian Life Insurance Company of America, New York, NY. All Rights Reserved.
Portions of this application have been licensed from eMoney Advisor, Inc. Copyright © 2000-2005 eMoney Advisor, Inc. All Rights Reserved.
Terms of Service Security Policy Privacy Statement Disclosure You have accessed a private computer system. This system is for authorized use only and user activities may be monitored and recorded by company personnel. Unauthorized access to or use of this system is strictly prohibited and constitutes a violation of federal, criminal, and civil laws. Violators may be subject to employment termination and prosecuted to the fullest extent of the law. By logging in you certify that you have read and understood these terms and that you are authorized to access and use the system.

INTERACTIVE SYSTEMS AND METHODS FOR INSURANCE-RELATED ACTIVITIES

RELATED PATENT APPLICATION

This application claims the benefit of U.S. Provisional Patent Application No. 60/763,200 filed Jan. 27, 2006, which is hereby incorporated herein by reference in its entirety.

COPYRIGHT NOTICE

The present application includes material that is subject to copyright protection. The copyright owner does not object to the facsimile reproduction of the application by any person as the application appears in the records of the U.S. Patent and Trademark Office, but otherwise reserves all rights in the copyright.

BACKGROUND OF THE INVENTION

The present invention relates to interactive tools for assisting insurance professionals in performing activities such as marketing services to new or existing clients, managing client relationships, and prospecting for new clients.

Historically insurance professionals have relied on traditional paper and notebook type techniques for tasks such as client management, organization, sales, and marketing. Transitioning to computer-based solutions can be complex and confusing to such professionals who may not already have familiarity with using personal computers and the Internet. In addition, many who are presently practicing in the insurance field commenced their careers well before the prevalence of personal computers and the Internet. The insurance field is also one in which professionals practicing in that field tend to adopt and maintain the traditional ways of conducting business. However, many of those who are entering the insurance field as professionals are typically individuals who are accustomed and more comfortable interacting with an electronic world of personal computer and the Internet then traditional techniques. As such, electronic solutions and features for insurance professionals that can meet the variable needs of interested parties are needed in the insurance field.

Moreover, known software applications for insurance professionals do not provide adequate support for a broad range of activities or services that are needed by the insurance professionals. For example, such known software applications are inadequate in meeting the needs of insurance professionals in areas such as interactive insurance reports, client organizers, interactive insurance calculators, client data gathering tools, automatic configuration based on client data, etc.

As such, a need exists for improved software and system solutions in the insurance field.

SUMMARY OF THE INVENTION

In accordance with the principles of the present invention, methods and systems for providing interactive insurance related tools and applications are provided.

For example, a method or system for assisting insurance professionals in marketing insurance is provided. The method or system can include implementing a multilayer software application for insurance professionals. The application is multilayered in that it includes separate functional layers for performing activities to complete a particular task that corresponds to that that layer. The application may include a first layer for performing data gathering for client information. The application may include a second layer for automatically generating reports and related action steps based on the gathered data. The application may also include a third layer for delivering the reports to the client (e.g., such as by generating a document, mailing a document, or reviewing the reports with the client electronically). The application can also store client-specific user activity within the application such as to record client information and to track a current state of interactions with a client. To access the application, insurance professionals may be required to be registered and authenticated before logging into the application.

The second layer can be directed to generating interactive insurance reports that are configured to include multiple sections (e.g., each report has the same general structure and is specific to a particular insurance category). A first section of a report can be for displaying a summary of a client's current insurance protection for a particular type of insurance. The report can include an assessment section specifying an assessment of the client's current level of protection for the current insurance category (displayed category). The report can include an action steps section that lists action steps that are applicable to the particular insurance category of protection. The action steps can be selected to indicate that they are to be completed in order to make progress with marketing efforts or discussions with the client.

Each layer can, if desired, include on or more features. For example, the second layer can, for example, include an income replacement calculator for displaying an impact to a client's financial state if the client was currently disabled. The second layer can, for example, include a human value calculator for displaying an impact to the surviving family of a client if the client is considered currently deceased.

The software application can be configured to include a workflow wizard that sequentially displays sections of the wizard for interaction by the user in a sequence that is consistent with the three layers.

The application can be configured as a network application that provides access to insurance professionals and provides access (e.g., through a client website) to clients. The application can incorporate an aggregation service that provides an interface for the client to view client account information from various sources (e.g., banks, lenders, stock accounts, etc.) through the interface and which aggregates such information to better reflect the client's current financial state. The aggregation service can be incorporated into the features of the application so as to better the analysis performed by the insurance professionals.

A feature that can be provided to insurance professionals, which can also be used by the professionals for illustration to clients, is a tool for evaluating a client's current level of protection to the client's current financial state. The feature can be specifically configured for a particular type of insurance such as life insurance or disability. The feature can involve a method or system for interactively analyzing and illustrating a client's insurance needs. After storing client information, an interactive interface can be displayed that is configured to permit a user to display a current financial state of a client and to compare the current financial state to a modified version of the current financial state that reflects a change in the client's financial state that would occur if a need for a particular type of insurance is currently triggered. The interface can also include options that provide the user with the opportunity to interact with the interface to enter insurance related parameters (e.g., insurance and financial data) to recalculate and redisplay the modified version of the current financial state based on the entered parameters. One option can be to allow the user to specify an additional level of insurance protection to be able to evaluate the impact of the hypothetical addition to the analysis. Another option can for example provide the user with an opportunity to select to payoff debts in calculating the modified version of the current financial state.

The interface can be configured to display the current financial state in numerical values or in other forms such as a graphical view (or combinations thereof). In one embodiment, the interactive interface can be configured to provide side-by-side tabular information for the current financial state and the modified version of the current financial state.

The interactive interface can, for example, be displayed in a browser. As previously mentioned, aggregation services can also be used in this context to update client information to maintain the validity of the analysis.

Another aspect of embodiments of the present invention is related to interactive reports that comprise various specific sections for the benefit of the insurance professional and the client. For example, a method or system can be implemented for providing an interactive insurance-specific client information display page. The method or system can involve storing insurance-related client information for a particular client. A software application can be implemented that displays an insurance-specific-client-information display page. The display page can be configured to include a title indicating a type of insurance, a text section providing general information regarding the type of insurance, a summary section providing a summary of a client's current insurance coverage for the type of insurance based on the stored client information, and an assessment section that is selectable by the user to specify a level of adequacy of the client's insurance coverage. The display page can also include a plurality of selectable action steps that are specific to the type of insurance and which the user can select for action in furthering client sales interaction, and a plurality of selectable tasks that are specific to the type of insurance and are specifically for the user to select to perform tasks within the software application. The display page can be configured for particular type of insurance such as life insurance or disability insurance.

The application can be configured to store the status of the selected action steps for later review by the user. To assist in view different display pages, the display page can includes links for related-insurance types (examples of which are provided in the FIGS.).

Another aspect of embodiments of the present invention relates to organizational tools for insurance professionals. For example, a method or system can be implemented for providing an insurance services environment to insurance professionals. The method or system can include implementing a network application that provides an insurance services environment to insurance professionals via a client-server arrangement, wherein the network application remotely stores client information entered by the insurance professionals via the network application. The method or system can further include providing a workflow wizard to the insurance professionals using the network application that sequentially displays pages to an interacting user in multiple stages comprising data gathering and presentation. If desired, the display pages can include a display page for selecting client-specific alerts. The delivery stage can include providing access to client-specific content through a personal website for the client. The presentation stage can include an interactive calculator interface for evaluating whether a client's current insurance coverage is sufficient for protecting the client's current financial state. The presentation stage can, for example, include generating reports. If desired, the network application can include a dashboard for pursuing various daily client tracking and status activities of an insurance professional.

Other features can include a to do list feature and a self insurance calculator.

BRIEF DESCRIPTION OF THE DRAWINGS

Further features of the invention, its nature and various advantages will be more apparent from the following detailed description, taken in conjunction with the accompanying drawings in which like reference characters refer to like parts throughout, and in which.

DETAILED DESCRIPTION OF PREFERRED EMBODIMENTS

Software applications, tools, or features are provided for insurance professionals that are intuitive, easy to comprehend, and easy to install. Software, for example, is implemented that can aid those with little software or Internet experience to collect client information, manage clients, track progress with respect to clients, generate reports, and evaluate insurance weaknesses. A networked solution can be provided to alleviate data storage needs of insurance professionals and to increase marketing opportunities by way of sharing client information. Aggregation services can be combined with software features to increase the usefulness of the software overtime in analyzing the insurance needs of clients. Software can also be implemented with color coordination and navigation tools to ease a user's comprehension and interaction with the software. Another aspect can involve detailed data collection and automatic use of collected data and the automatic configuration of the software (e.g., options, pages) based on the collected data. These and other features that show a general step forward in the insurance field are also described herein.

Figure 1:
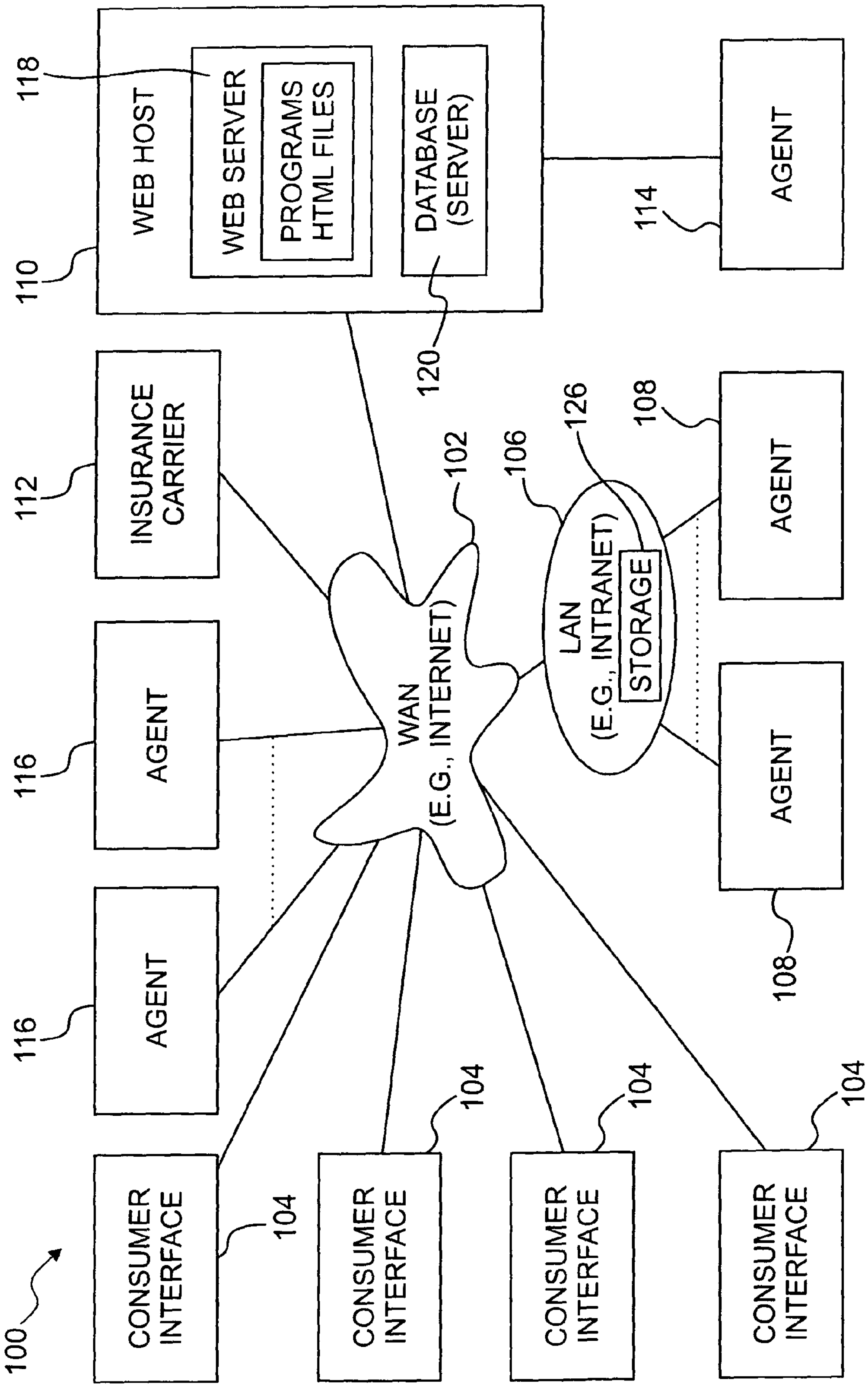
FIG. 1 is a functional block diagram of illustrative systems for providing software-implemented insurance related services in accordance with one embodiment of the present invention.

With reference now to FIG. 1, an environment such as environment 100 may be used by insurance agents for receiving insurance related services to, for example, assist the insurance agent in managing, marketing, and providing insurance services. Environment 100 may include wide area network ("WAN") 102 (e.g., the Internet), WAN consumer interfaces 104, insurance carrier equipment 112, web host equipment 110, and agent equipment 116. If desired, a configuration may be implemented in which insurance carrier equipment 112 and web host equipment 110 are combined (e.g., to provide the insurance carrier as also the web host) If desired, environment 100 may be configured to include local area network ("LAN") 106 (e.g., an intranet) and LAN agent interface equipment 108. If desired, environment 100 may be configured to include agent equipment 114 that is directly connected to web host equipment 110 and/or to include a direct connection from insurance carrier equipment 112 to web host equipment 110. If desired, environment 100 may also be configured in other ways. For example, there may be fewer or greater number of components (e.g., equipment or consumer interfaces) in environment 100. Environment 100 may include software applications implemented in environment 100 to support interactive tools for insurance professionals and to provide an interface for consumers.

Web host equipment 110 may be central to providing insurance tools. If desired, however, a distributed architecture may be used. Web host equipment 110 may include equipment such as web server 118 and database 120. Database 120 can be part of web server 118, a separate database server, multiple servers, or other such host equipment. One or more applications for providing interactive insurance tools may be implemented on web server 118 to provide insurance related services. Database 120 may store information related to consumers, agents, or insurance carriers that use the tools and services that are available in environment 100.

Web host equipment 110 may have been implemented by an insurance carrier to assist the agents and representatives of the insurance carrier by providing interactive tools available through agent equipment 116 that can drive and manage business for the agents.

Agents preferably interact with insurance related services, available via WAN 102, such as insurance services tools using agent interface equipment 116. Agent interface equipment 116 preferably includes personal computers such as laptops, workstations, or other type of computer equipment that includes a suitable interface for implementing one or more of the insurance tools available via environment 100. For example, for tools related to data collection and compilation, a computer that provides a convenient interface for data entry such as a full keyboard would be preferred. However, the use of other features may not require such functionality for each instance of their use. LAN 106 may be an enterprise platform implementation in which some or all of the functionality and services available from web host 110 is implemented in LAN 106 to supplement or replace web host equipment 110. Agent interface equipment 108 may comprise equipment such as that mentioned above in connection with agent interface equipment 116. As mentioned above, web host equipment 110 may be configured to include a direct connection with agent interface equipment 114. Agent interface equipment 114 may comprise equipment such as that mentioned above in connection with agent interface equipment 116.

Consumers may preferably interact with insurance related services available via WAN 102 using consumer interfaces 104. Consumer interfaces 104 may include personal computers, personal digital assistants, minicomputers, or other computer equipment that has a suitable communications connection with WAN 102.

Insurance carrier equipment 112 can include an interface for an insurance carrier to interact with web host equipment 110. If desired, insurance carrier equipment 112 may allow an insurance carrier to interact with agents via WAN 102. If desired, insurance carrier equipment 112 may be configured to have a direct connection or a private network connection to web host equipment 110 that is in addition or an alternative to a WAN connection. Insurance carrier equipment 112 may comprise computer equipment such as a personal computer (e.g., a PC on a LAN of the insurance carrier) or other computer equipment suitable for communicating with web host equipment 110.

One or more insurance carriers may participate in environments 100 such as through a plurality of insurance carrier equipment 112. However, preferably, environment 100 is configured to include a private communications network that is sponsored by one particular company, an insurance carrier, to provide tools and assistance to their agents through networked applications and databases. The private communications network can be implemented at least partially through a public packet data network such as the Internet. The applications and services may be branded with the carrier's logo and details.

Communications links within environment 100 may be wireless links, wired links, or combinations thereof. Suitable links may be used for the communications links in environment 100 to allow sufficient data throughput and interaction between end-users (e.g., agents, consumers, insurance carriers, web host provider, etc.). Techniques for implementing such communications links are known to those of ordinary skilled in the art.

Environment 100 may provide a variety of insurance related services to insurance agents. For example, environment 100 may be used to provide insurance services tools to insurance agents to assist them in marketing insurance products, managing information, educating clients, generating presentations, managing clients or developing prospects, or other tools or services illustratively described herein. An interactive application for providing insurance related tools and functionality for insurance professionals can be provided at least based in part on the process illustratively shown in FIG. 2.

Figure 2:
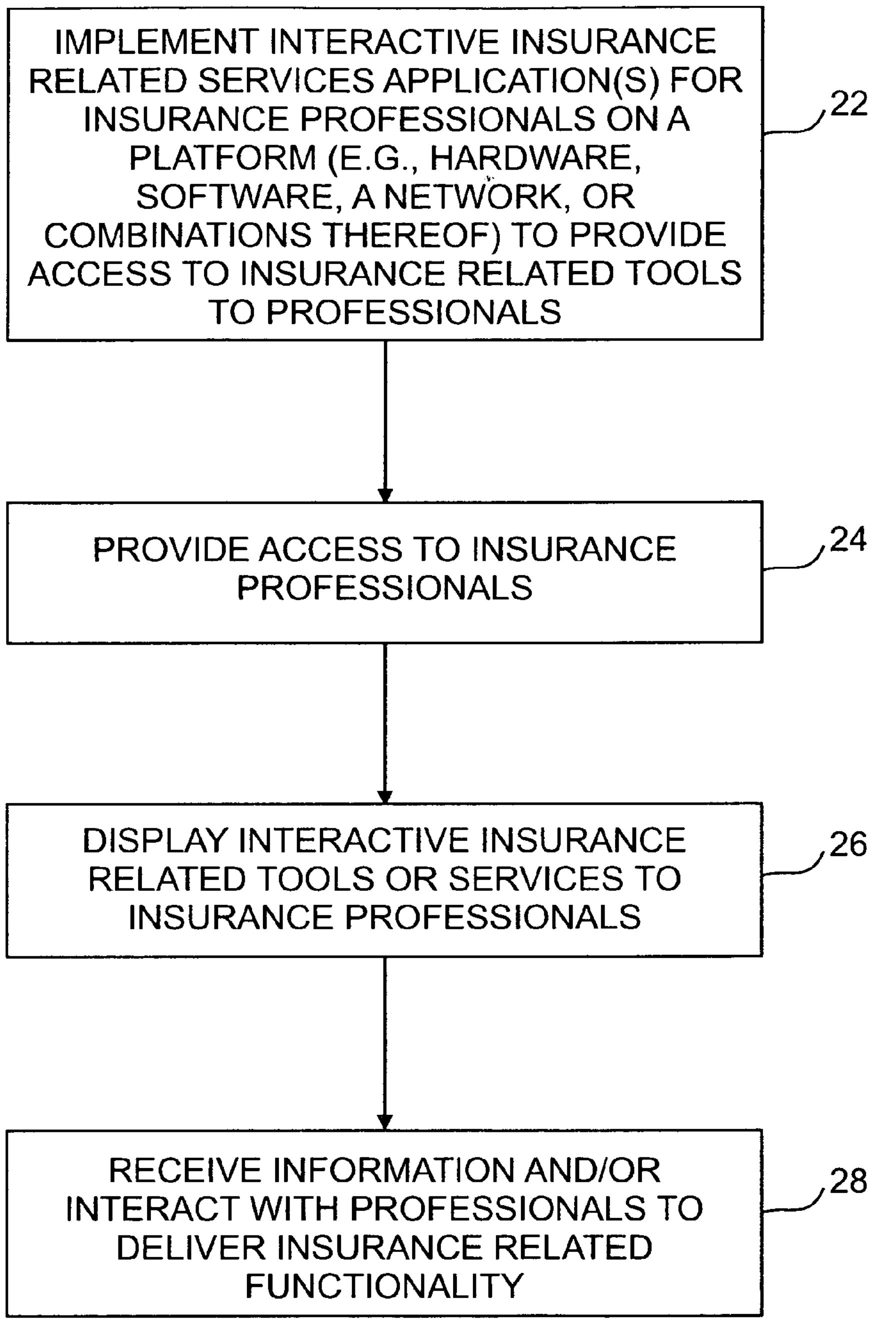
FIG. 2 is a flow chart for providing interactive insurance related services to insurance professionals in accordance with one embodiment of the present invention.

With reference now to FIG. 2, at step 22, an interactive insurance related services application specifically configured for insurance professionals or one or more such applications is implemented on a platform to provide access to insurance related tools or services to insurance professionals such as to assist and support the professionals. The platform can comprise hardware, software, a network, or combinations thereof. For example, the combination of the application and the platform can be considered agent-interface equipment (e.g., agent interface equipment 116 of FIG. 1). At step 24, insurance professionals can be provided access to the application. In providing access, authentication techniques are preferably implemented to provide access only to intended types of user and in addition only to those users who are registered to use the application. As such, the general public would not be provided access to the application. At step 26, interactive tools or services are displayed to insurance professionals. For example, after a user is authenticated, an application that implements insurance-related interactive tools or services displays the tools or services to the user. At step 28, the application receives information and/or interacts with one or more insurance professionals to deliver insurance related functionality to the professional. Accordingly, through interaction with the application, functionality, such as client tracking, data organization, data collection, or preparation of presentations, an insurance agent can benefit from insurance related services that are designed to enhance and improve the professionals business operations including its efficiency and speed of service.

Figure 3:
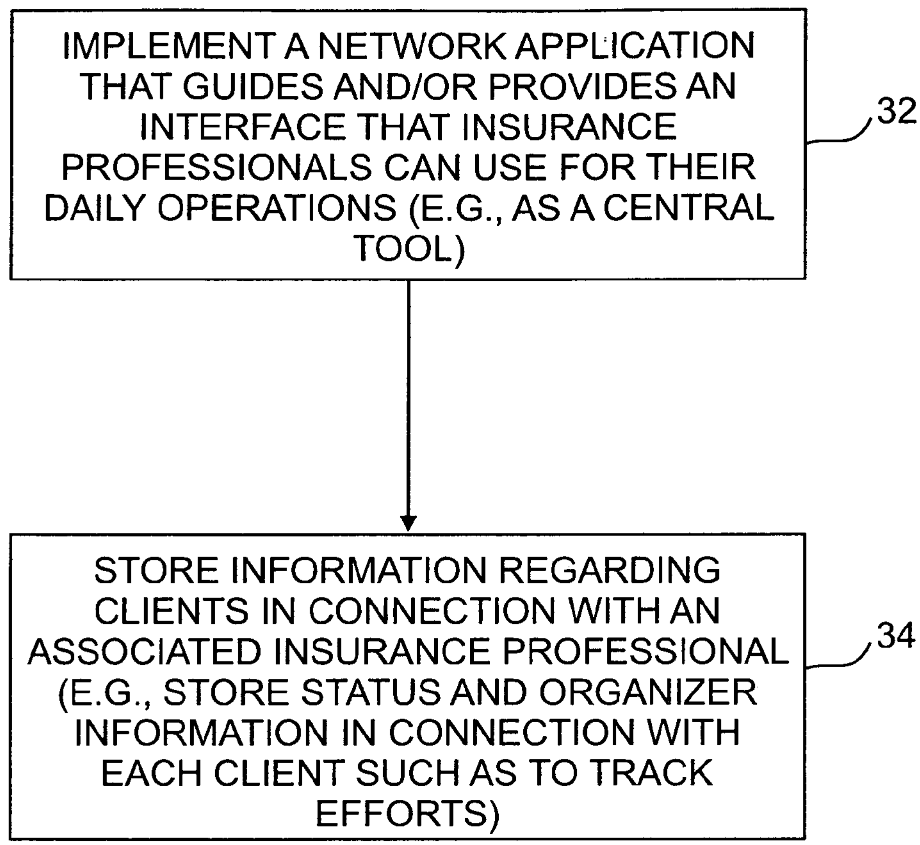
FIG. 3 is a flow chart for providing a network application to insurance professionals in accordance with one embodiment of the present invention.

Illustrative steps involved in for example providing network-based insurance related software tools or services to insurance professionals are shown in FIG. 3. With reference now to FIG. 3, at step 32, a network-based application is implemented that is configured to guide and/or provide a user interface for insurance professionals that can, for example, be used for the daily operations of insurance professionals. The network-based application is for example a web application that is configured using HTTP communications in a client-server arrangement. The application is preferably configured to be a central interface for insurance professionals in conducting their daily business operations. As such, insurance professionals would interact with the application to use its various features to achieve their business needs. At step 34, in response to interaction with insurance professionals, information is stored regarding clients or potential clients in connection with an associated insurance professional. For convenience, "clients" as used herein refers to clients and potential clients if the combined meaning is applicable in the given context. The status information that is stored is, for example, regarding a particular client or status information regarding the extent of progress with respect to a particular client.

Further by way of example, an organizer tool can be provided that stores information for organizing an insurance professional's client information, tasks, reminders, alerts, etc. (e.g., with respect to an individual client). This implementation allows an insurance professional to be able to review information on the state of discussions with a particular client and to, for example, pick up on discussions from where the professional left off without having to recall from personal memory or by maintaining notes on such activity. For example, the application preferably provides a record of activity completed with respect to a particular client and would preferably provide a record of desired activity that remains to be completed (e.g., using a to do list feature).

If desired, calendar information that is specific to a client or potential client can also be stored. For example, the calendar can be used to generate automatic alerts for the insurance professional in connection with each client. The information is preferably stored on a server that is remote from the insurance professional. This implementation provides the advantages of improved data security and portability. For example, an insurance agent would be able to access the data and application from any network-connected computer without having to be tied to the storage on his personal computer or the enterprise server of the professional's company. Improved data security is provided in such a system because the customer data can, for example, be encrypted in communications, and the server for the network-based application can be implemented with a higher level of physical and electronic security (including back-up services) than would likely be available by the system of the insurance professional. In addition, network-based implementations reduce the cost and complication that is imposed on insurance professionals to provide such security and storage capabilities on their own. If desired, in some embodiments of the systems and methods illustratively described herein, other ways of providing such insurance applications and services can be implemented. For example, the application can be configured as a software resident application on an insurance professional's computer or can be implemented as a combination of a resident application and network-based application. Thus, the interface can be an application provided through a browser or an application interface that is displayable without the need to open a browser. Another variation may be to provide only local storage of client information or provide a combination of local and remote storage (e.g., to provide limited duplication of the data).

Figure 4:
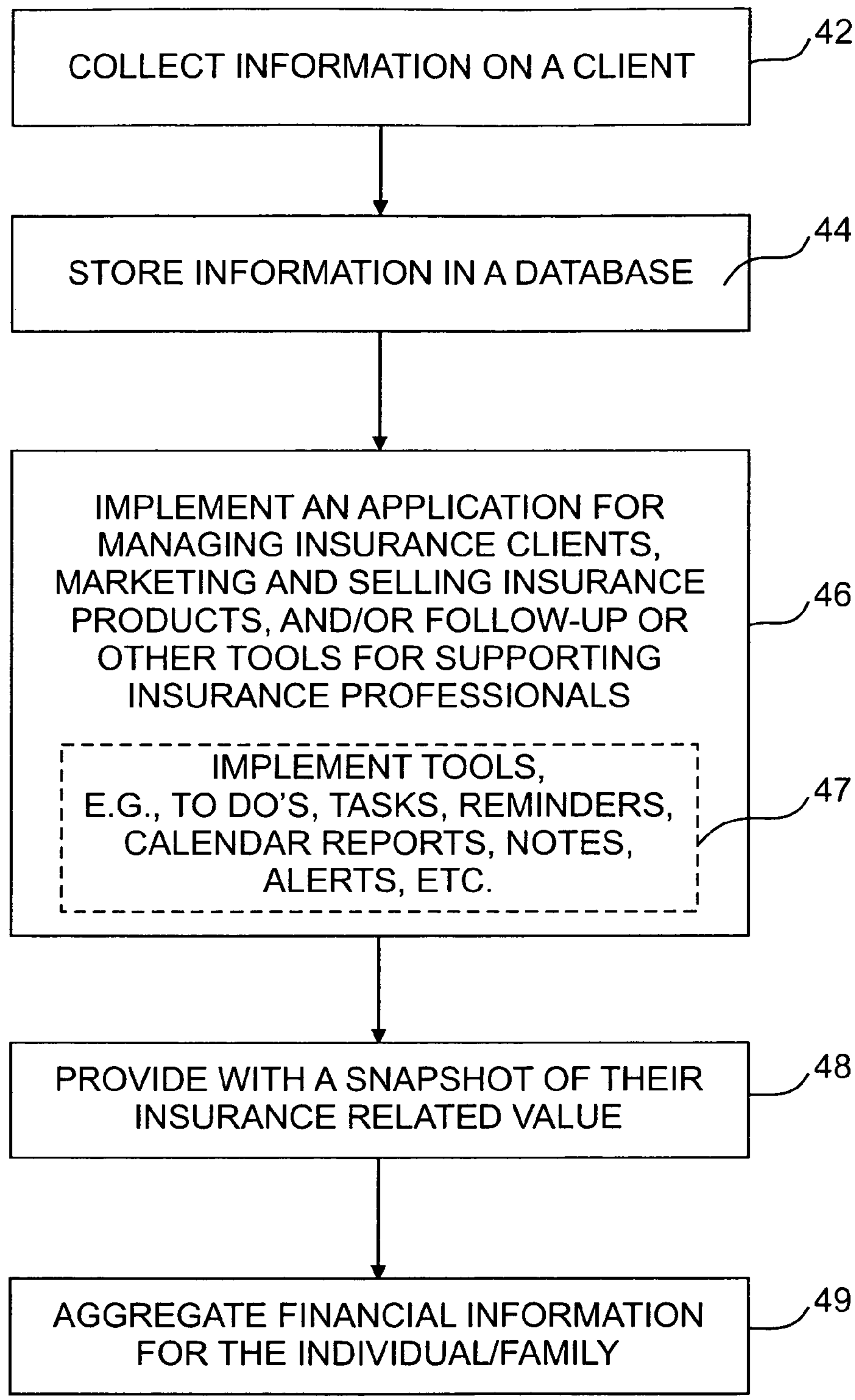
FIG. 4 is a flow chart for providing a software application for insurance professionals in accordance with one embodiment of the present invention.

An application can be implemented to provide a combination of different tools and services to insurance professionals. The application can be a single application, combination of different applications (e.g., that are electronically connected, that are separately selectable for execution, etc.), or can comprise one or more modules, applets, applications, or other software that is executable for providing desired functionality. Illustrative steps in providing an application that provides various tools and services including a snapshot of a client's insurance related value are shown in FIG. 4. At step 42, user interface and input functionality is implemented to collect information with respect to a client. For example, an insurance professional interacts with the user interface to collect and input data regarding a particular client and can do so for multiple clients. At step 44, the information is stored in a database for later retrieval by the insurance agent or possibly the client. As illustratively described, the database is preferably stored on a server remote from the insurance profession, but other embodiments can also be implemented if desired. At step 46, insurance related tools and services are implemented and/or provided for performing activity such as managing insurance clients, marketing, and selling insurance products, providing follow-up, or other tools for supporting insurance professionals. Preferably, the application would be a central source or outlet for the insurance professional such that it would provide a comprehensive and sole resource or interface for the professional. This for example would provide the advantage of simplifying computer interactions for insurance professionals such that they only need to interact with this application (e.g., as a dedicated terminal) rather to navigate multiple applications and interact with the operating system which can often times be confusing for less experienced computer users.

Step 46 may for example include step 47. At step 47, various specific tools or services can be provided to insurance professionals. The tools or services can, for example, include a "to do" or tasks feature, reminders, calendar, reports, notes, alerts, etc. (e.g., that can be configured to be specific to each particular client).

At step 48, a snapshot feature is provided. The snapshot feature can provide a tool for both presenting information and illustrating the insurance related needs or value of an individual or a family in connection the information. For the sake of clarity and convenience, the term individual or client is used herein to refer to an individual client or an individual client's family (i.e., immediate family or dependents) where applicable in the given context. The snapshot can be interactive to allow variations of the information to illustratively present different scenarios (e.g., levels of insurance protection). The snapshot is preferably configured as a tool for illustrating, in connection with a particular category of insurance (e.g., life insurance, disability, etc.), the real life impact on the financial state (e.g., income difference) if an event that would typically trigger the insurance coverage occurred. Thus, the snapshot would be able to display insurance related values (e.g., related to that insurance category) for an individual or a family that would exist before and after the triggering event. In addition, the snapshot can be configured to provide insurance-related parameters. The insurance related parameters can, for example, be used for controlling how the insurance proceed(s) would be applied or managed, and to illustratively vary a snapshot view for analysis by the insurance professional to illustrate for the client.

The snapshot feature can be implemented as a module or a component of a network application. In one embodiment, the module can require communications from an insurance agent's computer to a remote processor that performs the calculations and transmits information, such as, the resultant data to the insurance agent for display. In another embodiment, or in combination with such an embodiment, processing and calculations can be performed locally such that a noticeable delay between selecting a "calculate button" and the display of the resulting information does not exist (e.g., in a network application, there may be a delay involved in sending and receiving information in connection with the calculation). A benefit of the network-based implementation is that a user would not need to install a resident application on their computer.

Enhanced functionality of the insurance snapshot feature can be realized by combining this feature with an aggregation feature. Aggregation provides a functionality in which current financial information about an individual can be aggregated, stored, and updated. For example, an individual would provide account or personal information to an insurance professional. The information is used to automatically access electronic information (e.g., nightly, in real time, periodically, etc.) to provide a resource for viewing the current financial state of an individual in various categories (e.g., bank accounts, investments, mortgage, credit card debts, investment property, etc.) and preferably in all categories. The aggregate feature in combination with the snapshot feature provides a tool by which an individual or insurance professional can periodically evaluate whether the individual's insurance coverage matches the individual's current financial state (e.g., should the individual now increase or decrease his or her insurance coverage). The aggregated information can also be provided to the insurance professional to conduct such an analysis.

An application (e.g., a network application) can be specifically configured to match or present an insurance carrier's approach for marketing insurance. The application can, thus, integrate the insurance carrier's techniques, its insurance approach, and concepts from its instructions and teaching materials for its insurance professionals. Consequently, the application facilitates an integrated interface for the insurance professionals that provides a seamless connection in thought from instructions and teaching materials to the information displayed in the application, and the interactions and "look-and-feel" therein. Such an approach, for example, provides continuity with the insurance carrier's business approach and presents the application to be intuitive to the user, who may be well familiar with the insurance carrier's philosophy, but may not be as well versed in computers, the Internet, or software application. Illustrative steps involved for implementing such an approach are shown in FIG. 5.

Figure 5:
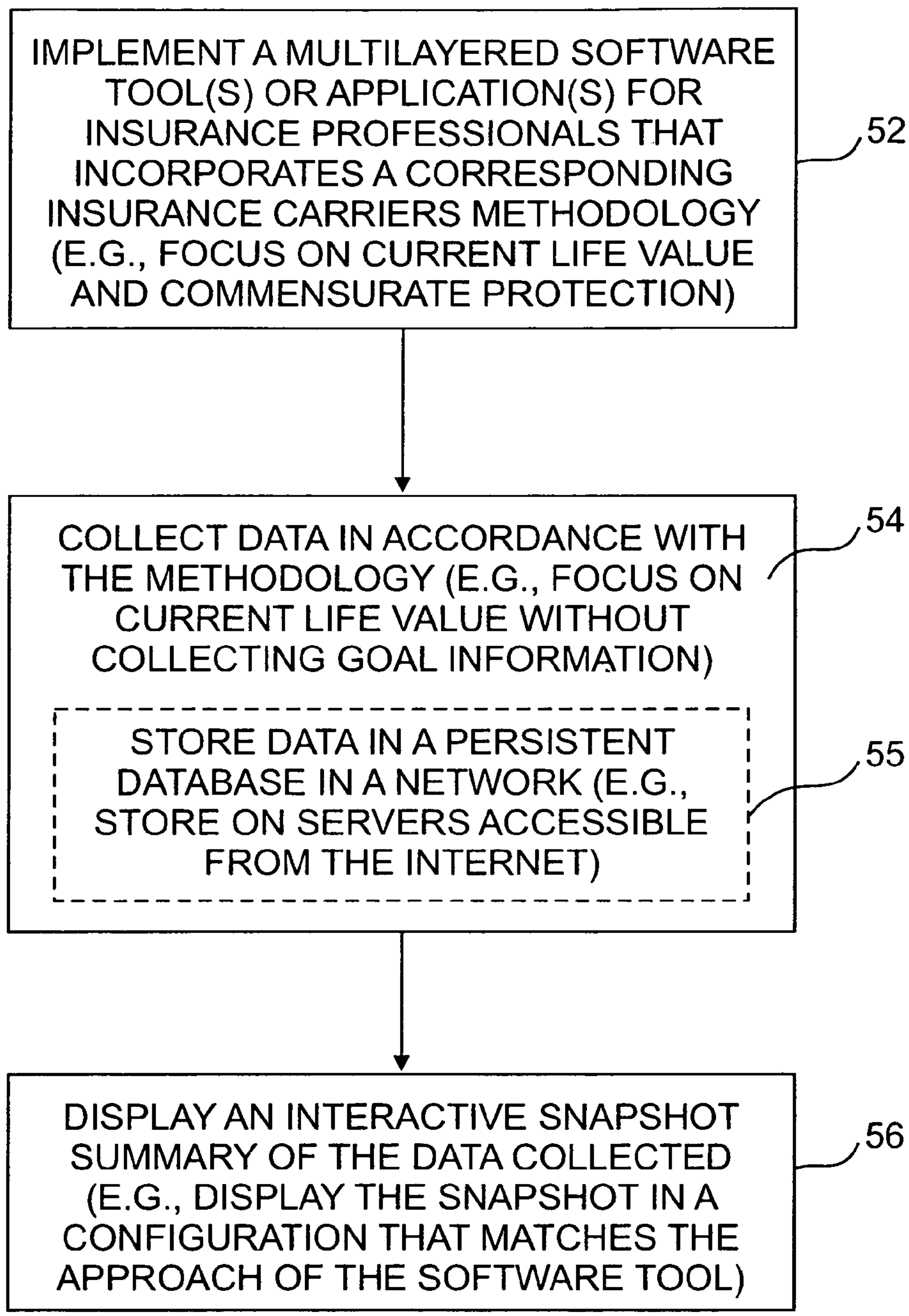
FIG. 5 is a flow chart for implementing a multi-layered software and tool in accordance with one embodiment of the present invention.

With reference now to FIG. 5, at step 52, a multi-layered software tool(s) or application(s) for insurance professionals is implemented that incorporates a corresponding insurance carriers methodology. The methodology may in particular be that in which the focus is on the life value or current life value of an individual and providing commensurate insurance protection. For example, the evaluation of an individual's insurance protection would be based on whether the protection is commensurate with the individual's current financial value (e.g., what would be required, taking into consideration the future wages and year of retirement of an individual, to provide the same financial picture for the individual's family). Such an approach preferably does not take into consideration the individuals goals of objections such as goals with respect to financial condition, savings, or investment goals, which are future term activity which may not be germane to better understanding the current financial picture of that individual. A benefit of providing a multi-layered software tool or application is that it provides a convenient interface for the insurance professional to implement the many different but related functions that an insurance carrier would need for business operations. Thus, for example, issues that often times arise with respect to interoperability of applications and inheritance of persistent data from one application to another can be automatically solved.

At step 54, the software tool(s) or application(s) is implemented to collect data in accordance with the methodology (e.g., focus on current life value without collecting financial or investment goal information). For example, the software tool may provide insurance professionals with a data entry section specifically configured to match the insurance carrier's methodology. The data collection can for example have a sequence that matches the methodology. The data collection can for example focus on the current life value of the individual without collecting or prompting for information on investment needs, educational funding for children, etc. A look and feel through colors can be implemented to match the methodology. Step 54 may include step 55. At step 55, the collected data is stored in a persistent database in a network that is accessible by the insurance professionals. For example, the information can be collected by way of computer input by an insurance agent at an agent's computer and stored on a server that is accessible from the Internet using the multilayered software tool or application.

At step 56, an interactive snapshot summary of the financial and insurance information of the individual collected at step 54 or aggregated is displayed. The snap shot display can be structured for example to display the snapshot in a configuration that matches the methodology of the software. For example, the information can be displayed in a single page in a hierarchy that matches the methodology. In addition, color schemes can be used to provide the display to be intuitive in connection with the methodology and the configuration of the software. The feature can be interactive in that items of information displayed in the snapshot can be selected to display underlying information with respect to the selected information.

Figure 6:
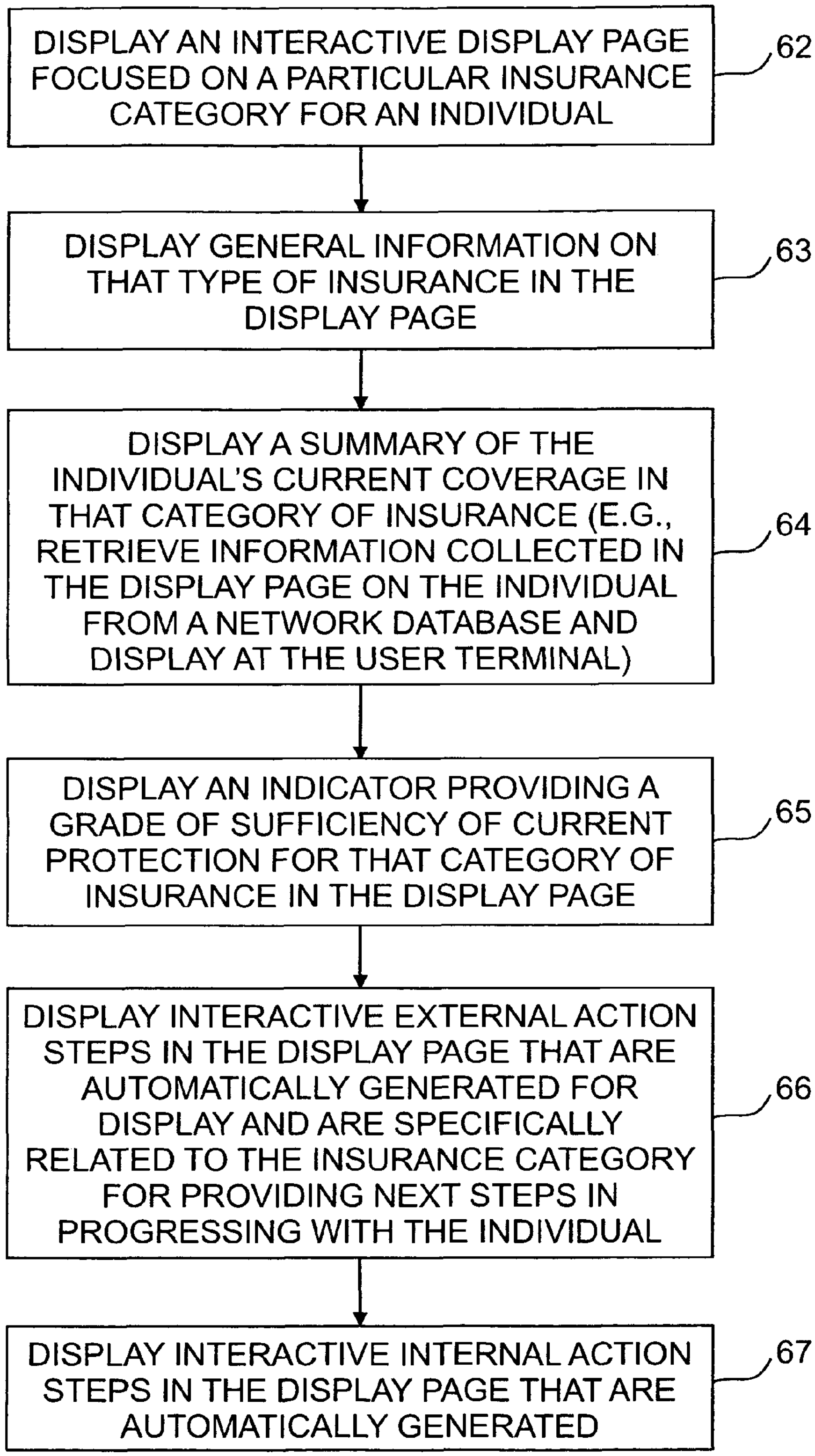
FIG. 6 is a flow chart for providing client and insurance category focused display pages in accordance with one embodiment of the present invention.

A component of the software application can be an interactive insurance information display page that is specific to an individual. Illustrative steps involved in providing such a software feature are shown in FIG. 6. At step 62, an interactive display page is displayed that is focused on a particular insurance category (e.g., life, disability, etc.) for an individual. At step 63, general information on that type of insurance is displayed in the display page (e.g., so as to occupy one section of the display page that is dedicated to such information). At step 64, a summary of the individual's current insurance coverage in that category is displayed in the display page (e.g., so as to occupy one section of the display page that is dedicated to such information). Step 64 can involve retrieving information that was previously collected on the individual from a network database and displaying the information at the user terminal. Alternatively, the information can be stored or cached locally.

At step 65, an indicator is displayed that provides a grade of sufficiency for the current insurance coverage of the individual for the insurance category (e.g., so as to occupy one section of the display page that is dedicated to such information). The indicator is displayed in the display page to provide convenient sufficiency indicator to the viewer. The grade that is assigned can be subjective or objective. For example, the grade may be selected by the insurance agent after reviewing the individuals insurance information or if desired, can be automatically selected based on an algorithm that compares the individual's information to a database of insurance information to perform an evaluation. The indicator can be set from the interactive insurance display page or from a different page as a precursor to generating the interactive insurance display page.

At step 66, interactive action steps that are related to external tasks are automatically generated and displayed (e.g., so as to occupy one section of the display page that is dedicated to such information). The action steps are specifically related to the insurance category of the current interactive display page. The action steps are preferably a list of steps suggested for interaction with the client in connection with current insurance category. For example, a database can be implemented that would store sets of action items in association with different insurance categories. Each set would be configured to cover the steps needed to, for example, gather, analyze, or consider relevant information in connection with a particular insurance category with respect to a client. This would provide a tool for an insurance agent such that an automatic list can be generated and tracked for each client. If implemented as a network application, the list can be automatically updated without the need for periodic upgrades such that new strategies or legal requirements can be compiled and addressed with the database of action steps. The external action steps can provide intuitive next steps but can also be implemented as a comprehensive list of actions for the insurance agents consideration. The external action steps relate to activities that the client needs to perform with an insurance agent, some other client representative or acquaintance, or individually. The action steps displayed in the display page can be displayed on the basis of some level of intelligence or filtering. For example, steps that were selected and marked as being completed are preferably not displayed again when an insurance agent returns to the same page. Thus, the action steps can reflect the state of interaction or progress with respect to a particular client. The information can be persistent. Therefore, an insurance professional would not need to personally track progress or what has been covered with each client. The software automatically provides such functionality and allows the insurance professional to pick up where he or she left off with each client. In addition, filtering based on the information collected on a client can be implemented such as to not display action items that are not applicable to the client (e.g., if the client does not have children, certain action steps may not be applicable and should not be displayed).

At step 67, interactive internal action steps are automatically generated and displayed (e.g., so as to occupy one section of the display page that is dedicated to such information). Internal action steps are actions that are suggested to the insurance professional to be performed in the software application. The internal action steps are specifically related to the insurance category of the current interactive display page. For example, a database can be implemented that would store sets of internal action items in association with different insurance categories. Each set would be configured to cover the steps needed to support the insurance agent to market the current insurance category (the displayed insurance category) or to market other products. This would provide a tool for an insurance agent such that an automatic list can be generated and tracked for each client. If implemented as a network application, the list can be automatically updated without the need for periodic upgrades of a resident application such that new strategies or legal requirements can be complied with in the database of internal action steps. The internal action steps can provide intuitive next steps but can also be implemented as a comprehensive list of actions for the insurance agent's consideration. The internal action steps displayed in the display page can be displayed on the basis of some level of intelligence or filtering. For example, steps that were selected and marked as being completed are preferably not displayed again when an insurance agent returns to the same page. Thus, the action steps can reflect the state of interaction or progress with respect to a particular client. The information can be persistent. Therefore, an insurance professional would not need to personally track progress or what has been covered with each client. The software tool automatically provides such functionality and allows the insurance professional to pick up where he or she left off for each client. In addition, filtering based on the information collected on a client can be implemented such as to not display internal action items that are not applicable to the client (e.g., if the client does not have children, certain action steps may not be applicable and should not be displayed).

By implementing an interactive display page for a particular insurance category that includes a general information section, client summary section, grade indicator, external action steps, and internal action steps, a software tool can be provided that integrates information, organizational needs, client specific data, and a grade indicators together as a convenient tool for quickly viewing information and status with respect to a client for a particular insurance category and to generate a report on the basis of the information.

Figure 7:
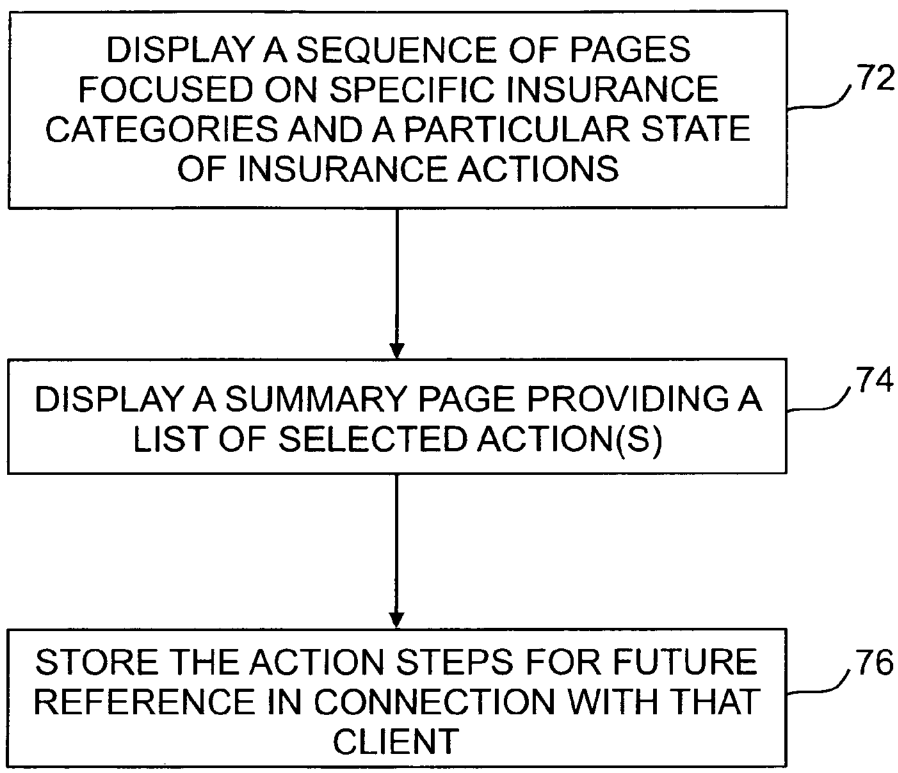
FIG. 7 is a flow chart of a software tool in accordance with one embodiment of the present invention.

Interactive insurance display pages can be implemented to provide a particular software tool. For example, a sequential methodology can be implemented such that the pages for different insurance categories can be implemented to be displayed in sequence and automatically summarized at the end of the sequence. For example, with reference now to FIG. 7, a sequence of interactive insurance display pages that are each focused on a specific insurance category and include action steps that reflect the state of interactions with a corresponding or with the application with respect to a particular client (e.g., such as that illustratively described in connection with FIG. 6) can be displayed. At step 74, an interactive summary page is displayed that provides a list of selected action steps. Thus, the summary page can display a compilation of the actions selected in each interactive insurance display page as a summary of selected actions to be completed. At step 74, the action steps can be selectable so as to allow the user to reconsider a selected items to remove that step from the list. At step 76, information with respect to the action steps (e.g., which ones selected or not selected) are stored for future reference in connection with that client (e.g., to reflect the status of work with that client).

Figure 8:
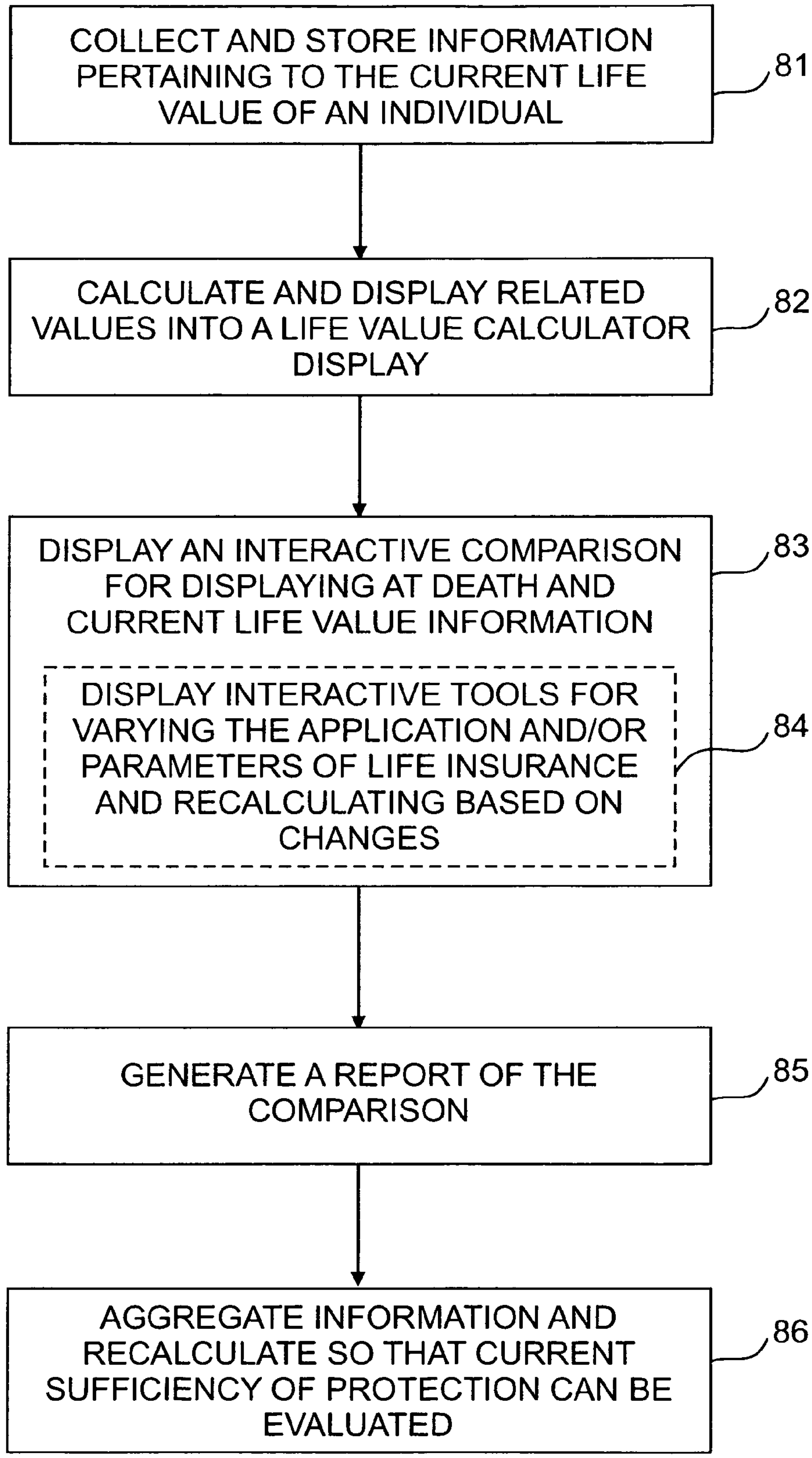
FIG. 8 is a flow chart directed to a life value tool in accordance with one embodiment of the present invention.

A current value snapshot feature can be specifically implemented for life insurance. For example, with reference now to FIG. 8, at step 81, information pertaining to the current life value of an individual can be collected and stored. At step 82, the software, calculates values relating to the current life value based on the collected information and displays the values in an interactive life value calculator display page. At step 83, an interactive comparison for illustrating the at death and the current life value related information of a particular individual are displayed in the interactive life value calculator display page based in the information that was inputted and calculated. Step 83 may include step 84, which is implemented to allow for user variation of the displayed values to vary the snapshot. At step 84, interactive tools for varying the application and/or parameters of life insurance are displayed and recalculated based on the changes. At step 85, a report option can be included as part of the page for generating a report of the current comparison information. At step 86, an aggregation feature can be used to update and recalculate relevant values so that the current sufficiency of the client's life insurance protection can be periodically evaluated. In one particular embodiment, this feature is part of a network application in which recalculation would require communications to and from a server to redisplay the information. In other words, relevant signals and data are transmitted to a server that calculates and returns the relevant results.

Figure 9:
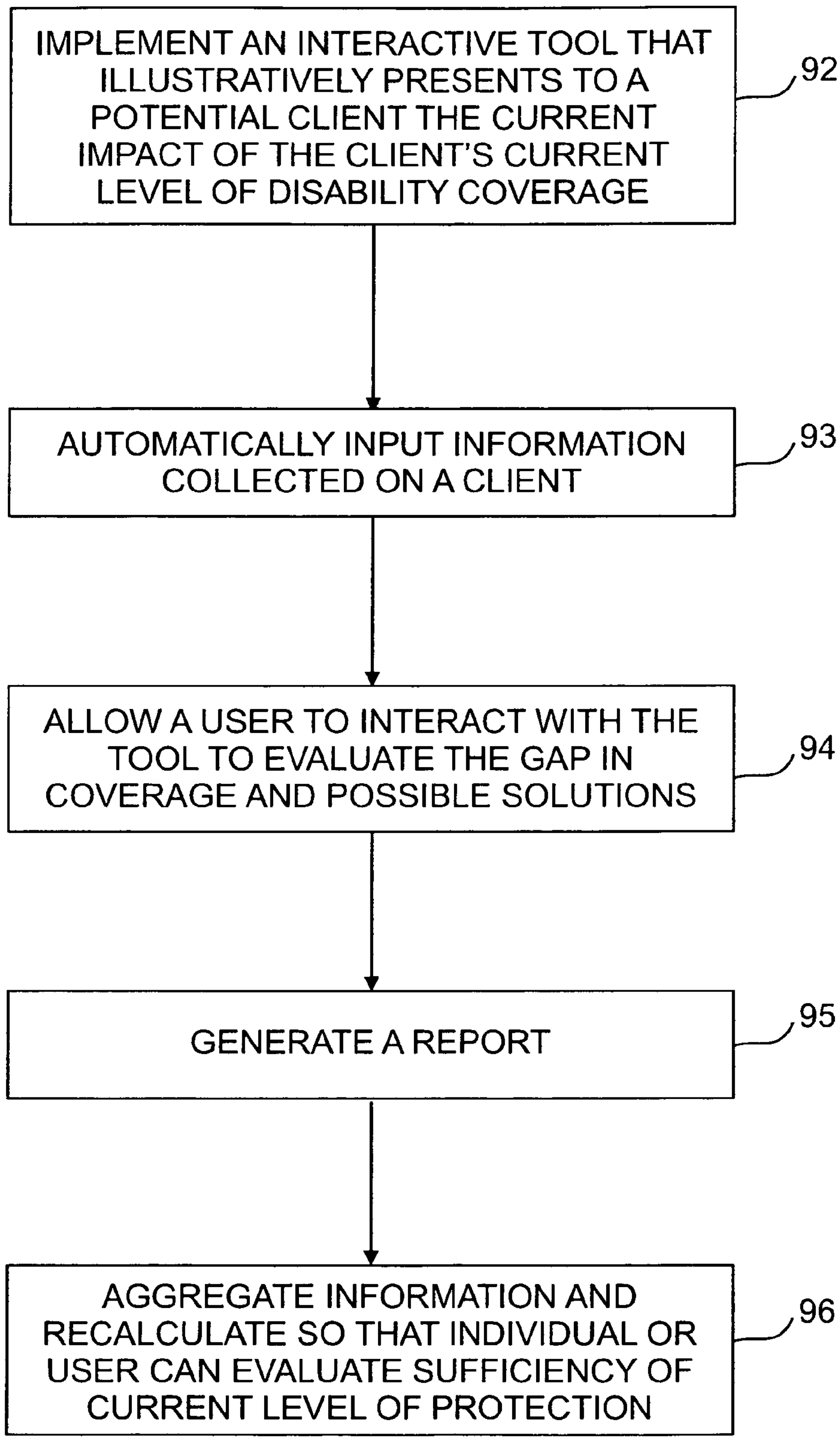
FIG. 9 is a flow chart directed to a disability value tool in accordance with one embodiment of the present invention.

A similar feature can be provided for other insurance categories such as disability. Illustrative steps involved in implementing such a feature for disability insurance is shown in FIG. 9. At step 92, an interactive tool is implemented that illustratively presents to a potential client or a software user, the current impact of the client's current level of disability coverage. At step 93, information that was collected from the client are automatically collected and input for use in the insurance disability coverage evaluation. At step 94, a user (e.g., an insurance agent) is allowed to interact with the tool to evaluate whether a gap in the client's disability insurance coverage exists and to interact with the tool to suggest possible solutions (e.g., impact of different coverage). At step 95, a report may be generated that comprises the information displayed with respect to the client' disability coverage. At step 96, an aggregation feature can be implemented so that client information can be updated and the disability coverage and related financial data can be recalculated and displayed to allow for an evaluation of the sufficiency of the current level of protection.

Figure 10:
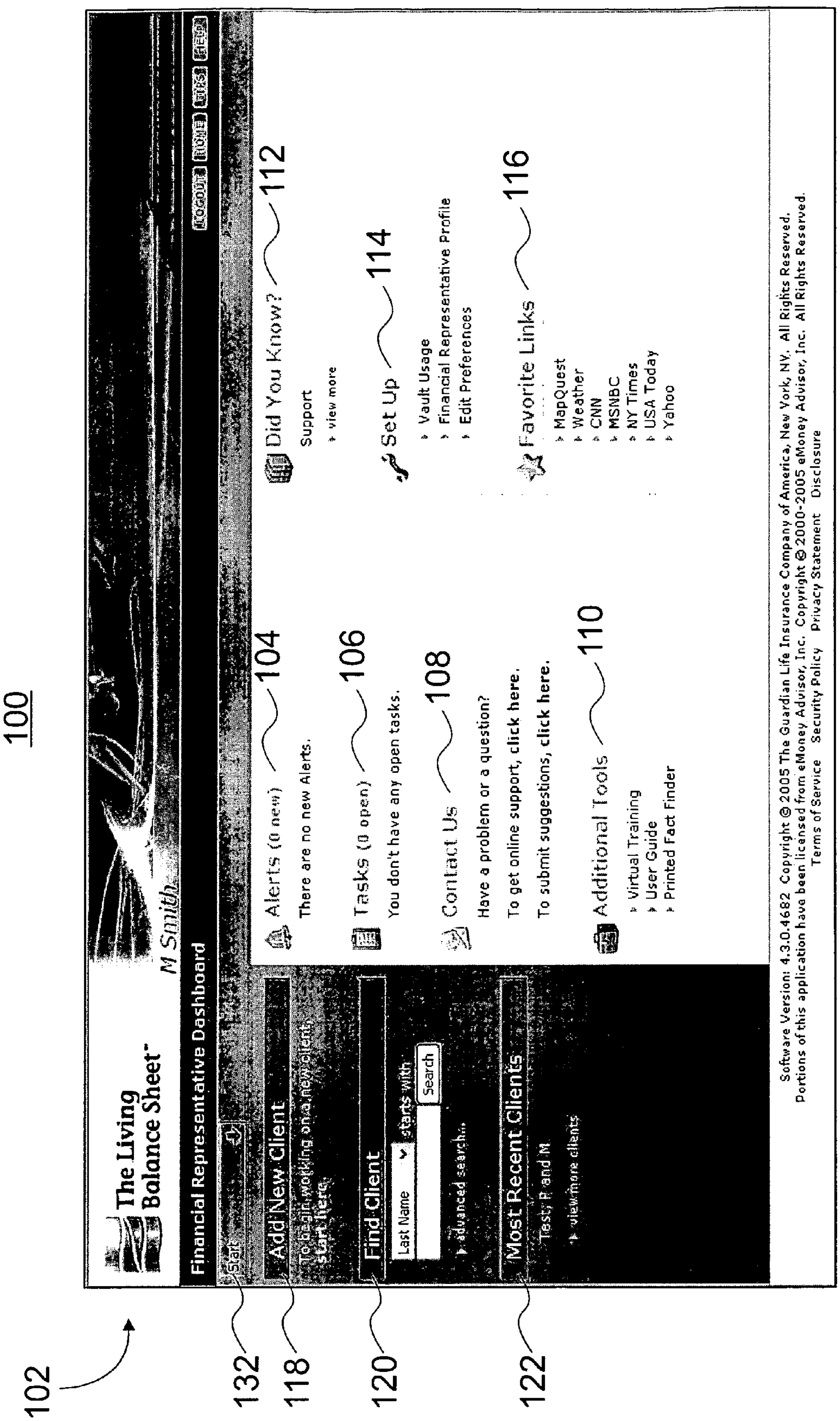
FIGS. 10 to 203 are diagrams of illustrative display pages for implementing interactive methods and systems for insurance related activities in accordance with embodiments of the present invention.
Figure 203:
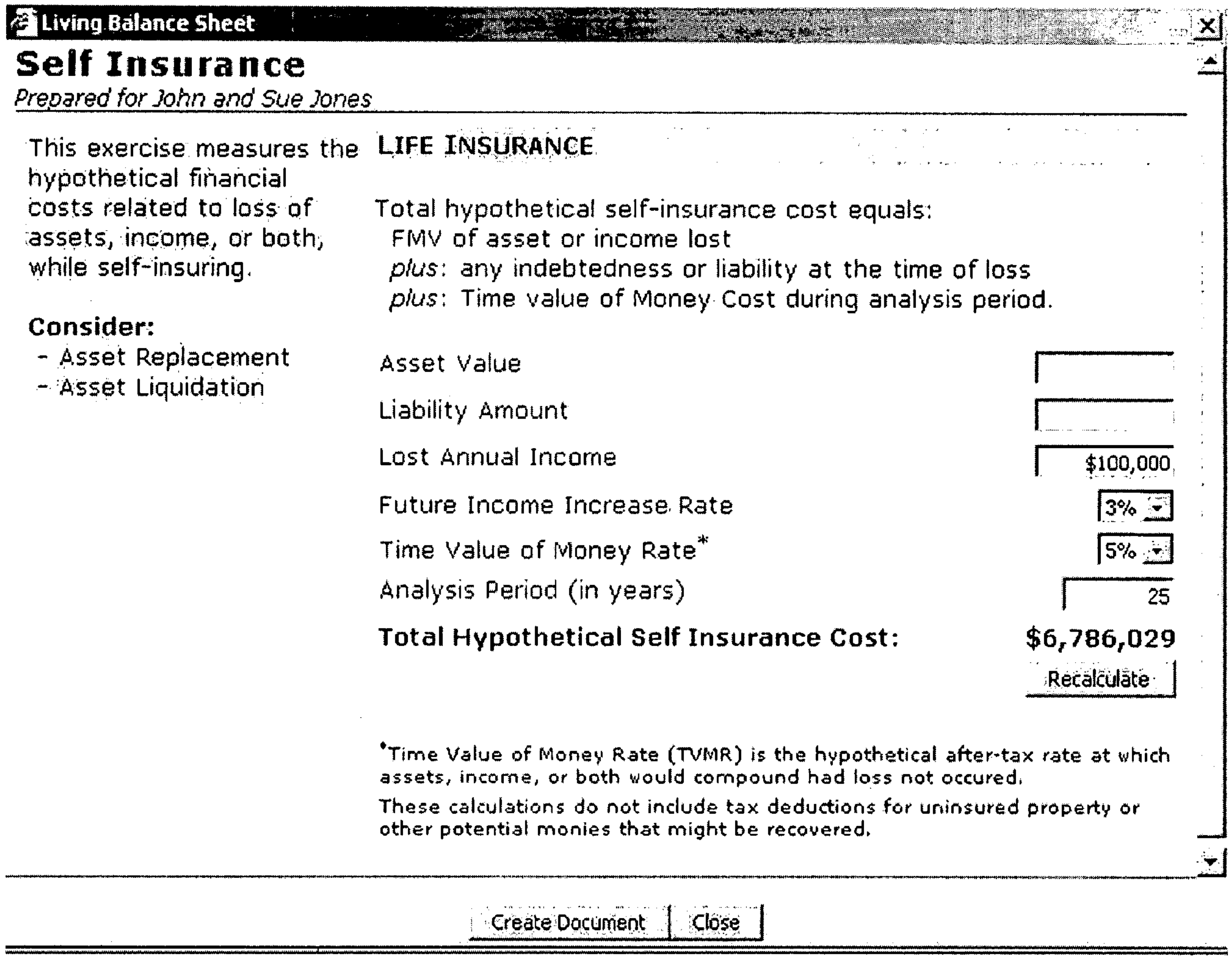

FIGS. 10 to 203 show illustrative display pages for implementing interactive methods and systems for insurance related activities in accordance with embodiments of the present invention such as to, for example, implement the illustrative steps and processes described in FIGS. 2-9.

FIG. 10 is a diagram of an illustrative financial representative dashboard display page 100. Display page 100 can be displayed after a user, which is commonly an insurance agent, is authenticated (e.g., using an ID and password). Display page 100 includes a banner 102 that displays text identifying the current user and a branding component. Display page 100 is preferably the initial display page that is presented to a user when the user logs into the software. Display page 100 includes alerts section 104, tasks section 106, "contact us" section 108, additional tools section 110, did you know section 112, setup section 114, and favorite links section 116. Display page 100 also includes add new client section 118, find client section 120, most recent clients section 122, and start section 132.

Add new client section 118 preferably includes a link or button that is used to access an add-new-client feature. Find client section 120 preferably includes functionality to identify a client for which information was previously stored. This feature, for example, allows an agent to quickly find and access the information of a client. Find client section 120 can include a search functionality such as to allow the user to search client information based on parameters such as last name, first name, or other search criteria. Most recent clients section 122 is preferably a tool that allows a user to pull up a recently viewed client.

Alerts section 104 displays the user's alerts that were triggered based on some preset parameter. The alerts can be client specific. Tasks section 106 displays any open tasks of the user. Contact us section 108 provides links to customer or technical support. Additional tools section 110 includes selectable links for additional tools that the user may require such as a user guide, virtual training, and a fact finder. Did you know section 112 displays links and information that are related to supporting the user in using the site (e.g., technical and/or educational support). Setup section 114 can include links for the user to customize or setup the software to the user's preferences or needs. Setup section 114 includes a vault usage link (for viewing information on client vault usage), a financial representative profile link (for displaying and updating the user's profile information), and edit preferences link (for selecting software preferences of the user). Favorites link 116 contains links to various external websites.

Figure 11:
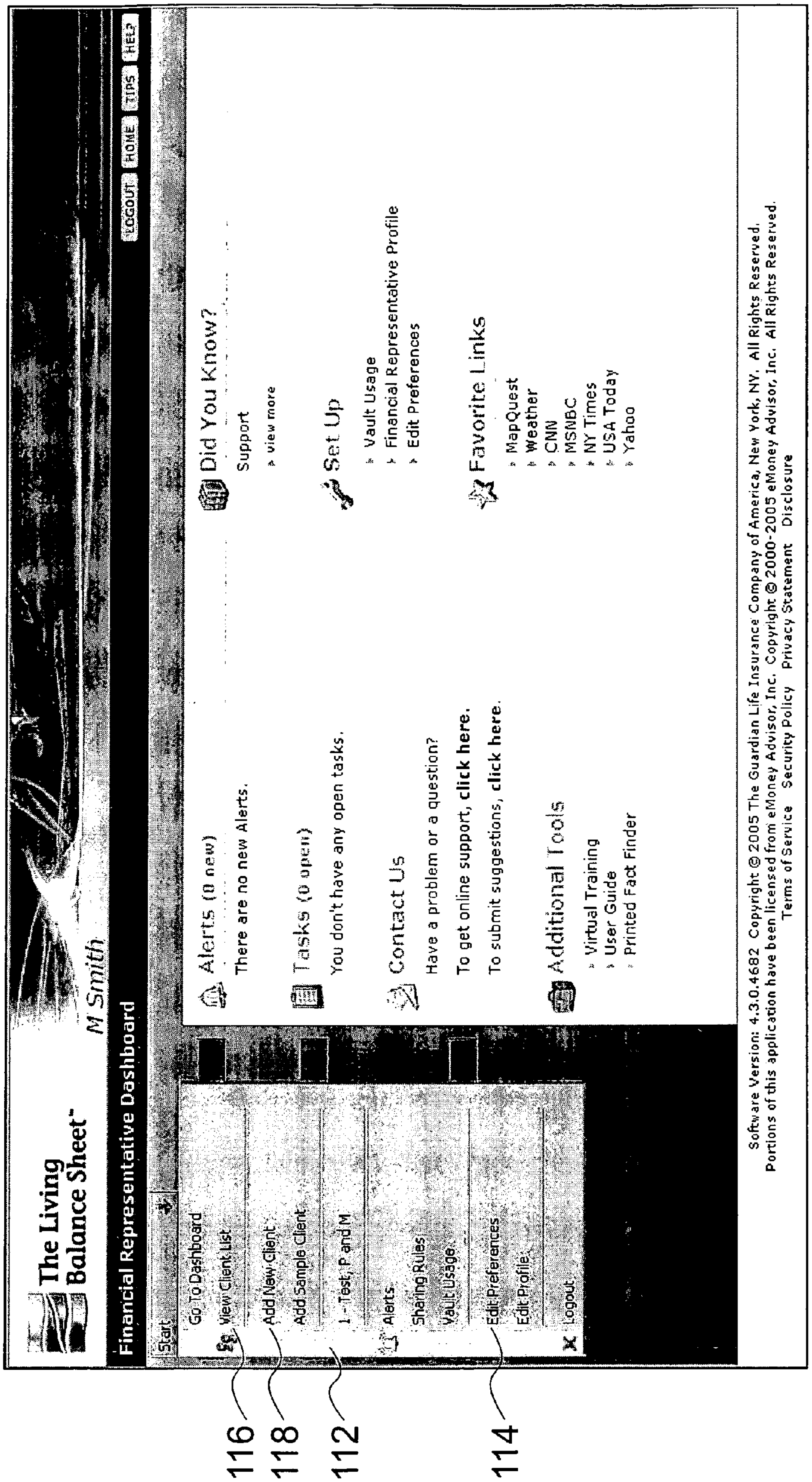
Figure 12:
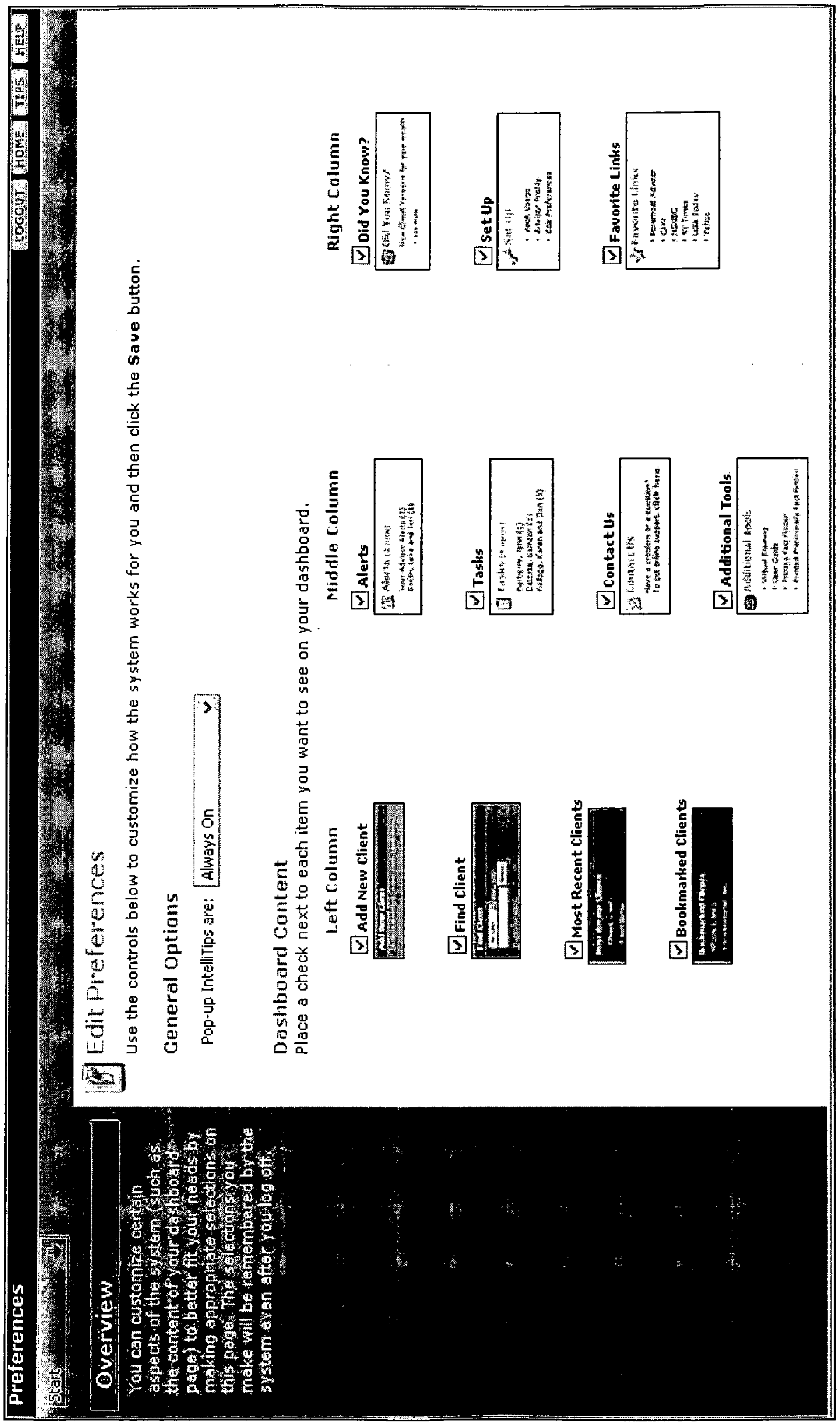
Figure 13:
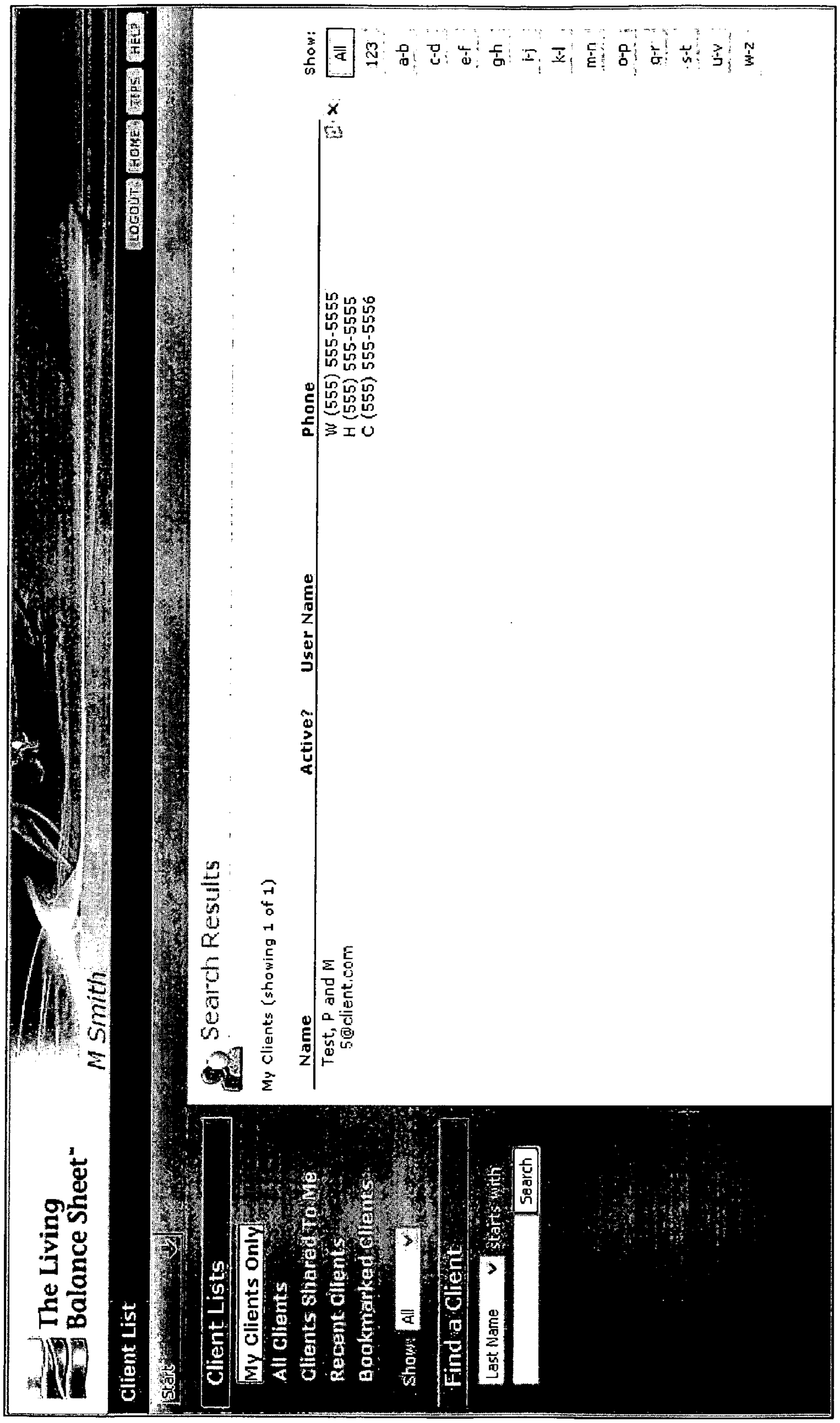

Start section 132 can be a pull-down menu that users can access to navigate within the software. As shown in FIG. 11, start pull-down menu 112 can include various options, such as, go to dashboard, view client lists, add new client, most recent client section, alerts, sharing rules, vault usage, edit preferences, edit profile, and logout. By selecting, for example, edit preferences option 114, an edit preferences display page can be displayed such as that illustratively displayed in FIG. 12. Edit preferences display page 120 contains various options for personalizing the software to the user's preferences. For example, as shown, the user can select the dashboard content by selecting corresponding check boxes associated with possible sections that can be displayed in the dashboard. Display page 120 can also allow for setting other preferences such as to select whether automatically displayed context sensitive tips are to be always active when the user is navigating within the software. Another displayed option in start pull-down menu 112 of FIG. 11 is view client list option 116. Client list display page 130 of FIG. 13 can be displayed when view client list 116 of FIG. 11 is selected. Client list display page 130 displays a list of the user's clients. If desired, the software can be configured to not only display a list of the current user's clients but also additional clients based on selected criteria. For example, display page 130 can include a my clients only option (to limit the client list to the user's clients), an all clients option (to display all clients available), a clients shared to me option (to display clients that other users have decided to share with the current user), a recent clients options (to display recently added clients or clients for which the user recently modified or added their personal information), and bookmarked clients options (to display a list of clients that the user bookmarked for quick reference).

Figure 14:
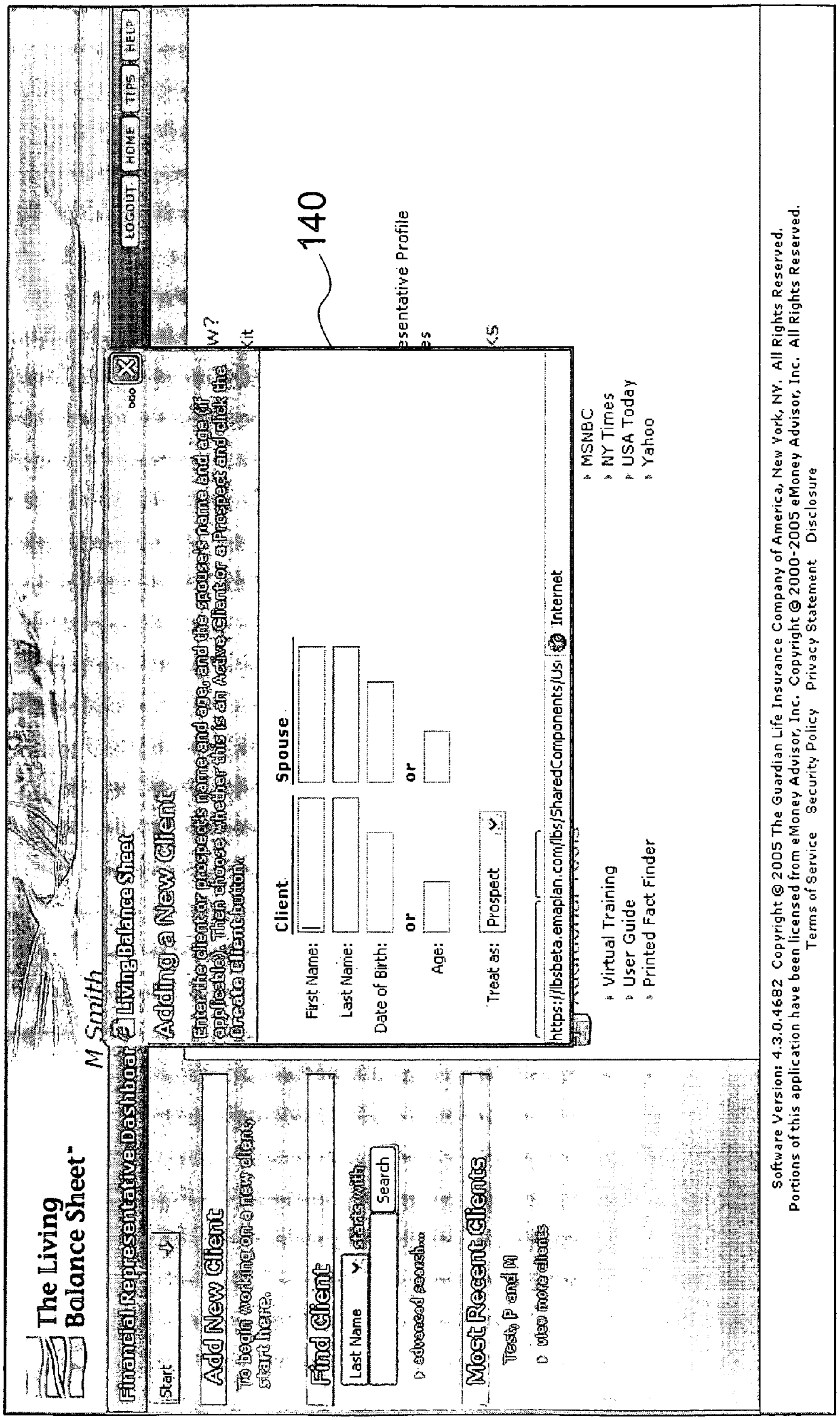

From start pull-down menu 112 of FIG. 11, add new client option 118 can be selected. In response, add new client window 140 of FIG. 14 can be displayed. Window 140 contains data entry field for entering the name, date of birth (or age) of the client and spouse (if any). Window 140 also includes an option to allow the user to identify the client as a prospect or an active client. Window 140 may include a button for the user to submit the new client information. In response, a workflow wizard mode can be triggered. If desired, the workflow wizard mode can also be entered using other techniques such as by way of the start pull-down menu 112 of FIG. 11.

Figure 15:
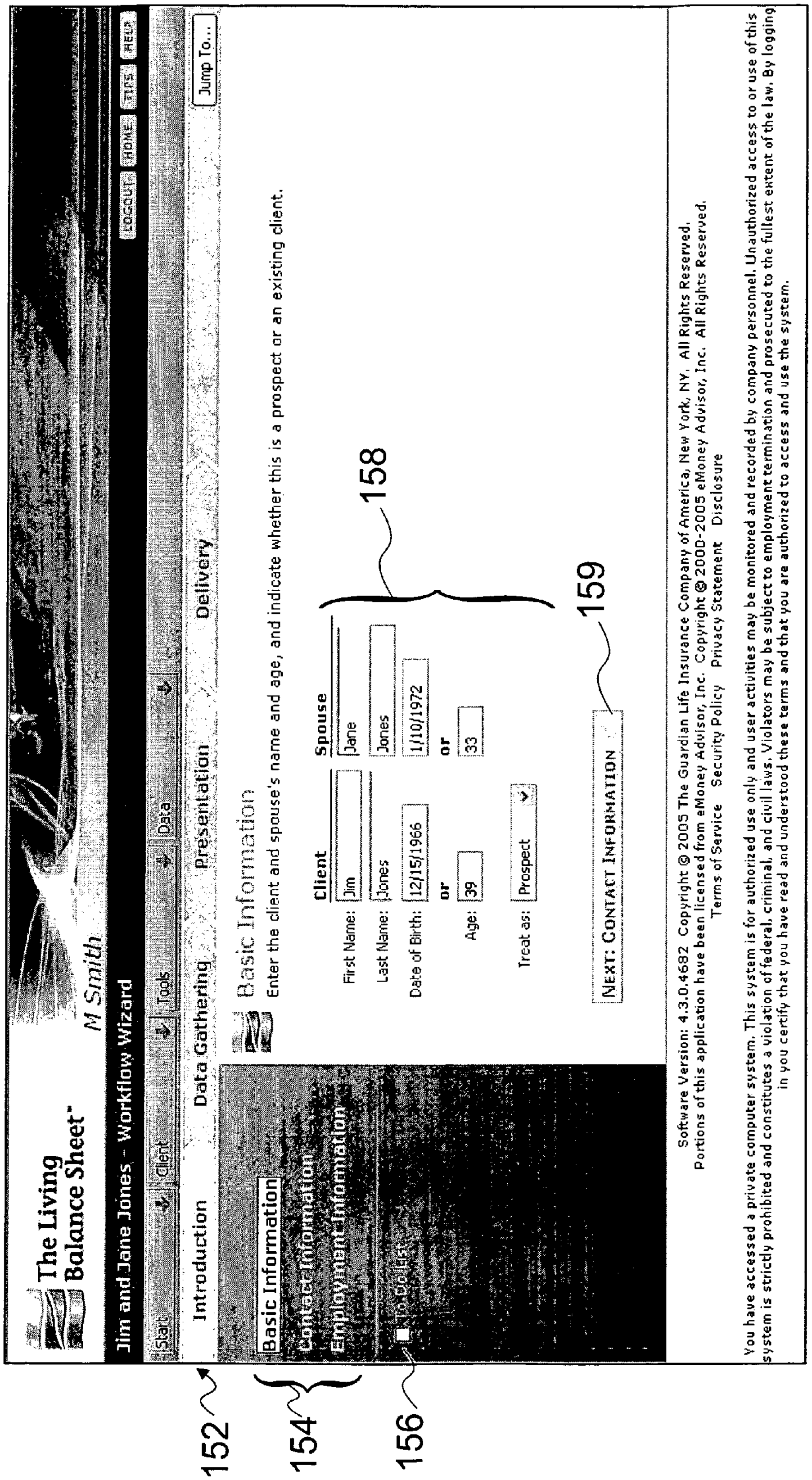

FIG. 15 shows an illustrative basic information display page 150, which can be an initial page in the workflow wizard mode. Basic information display page 150 includes workflow wizard navigation tools 152 and 154. Workflow stage navigation tool 152 displays the text identifying the stages of the workflow wizard, which are introduction, data gathering, presentation, and delivery. The information is displayed within arrows to indicate the sequence of the stages. The current stage is highlighted to indicate the user's current position within the stages. As shown in FIG. 15, the user is currently in the introduction stage. Introduction navigation tools 154 display navigation links for sections within the introduction stage. A user can, for example, "click" on Employment Information to move forward to that section. Alternatively, the user can select next button 159 to move or to sequentially move to the next section in the workflow wizard. The automatic sequence provides a convenient and efficient tool for users to interact with the software. Basic information section 158 can be automatically populated with information entered in window 140 (of FIG. 14) or could be manually entered or modified when displayed in basic information display page 150. A "to do list" option 156 can also be displayed to allow the user to select a link to access, setup, or modify a to do list (e.g., specifically for the current client). As shown, within introduction navigation tools 154, the user's current position is highlighted (e.g., "basic information" is highlighted) to show the current position of the user within the current stage of the workflow wizard.

Figure 16:
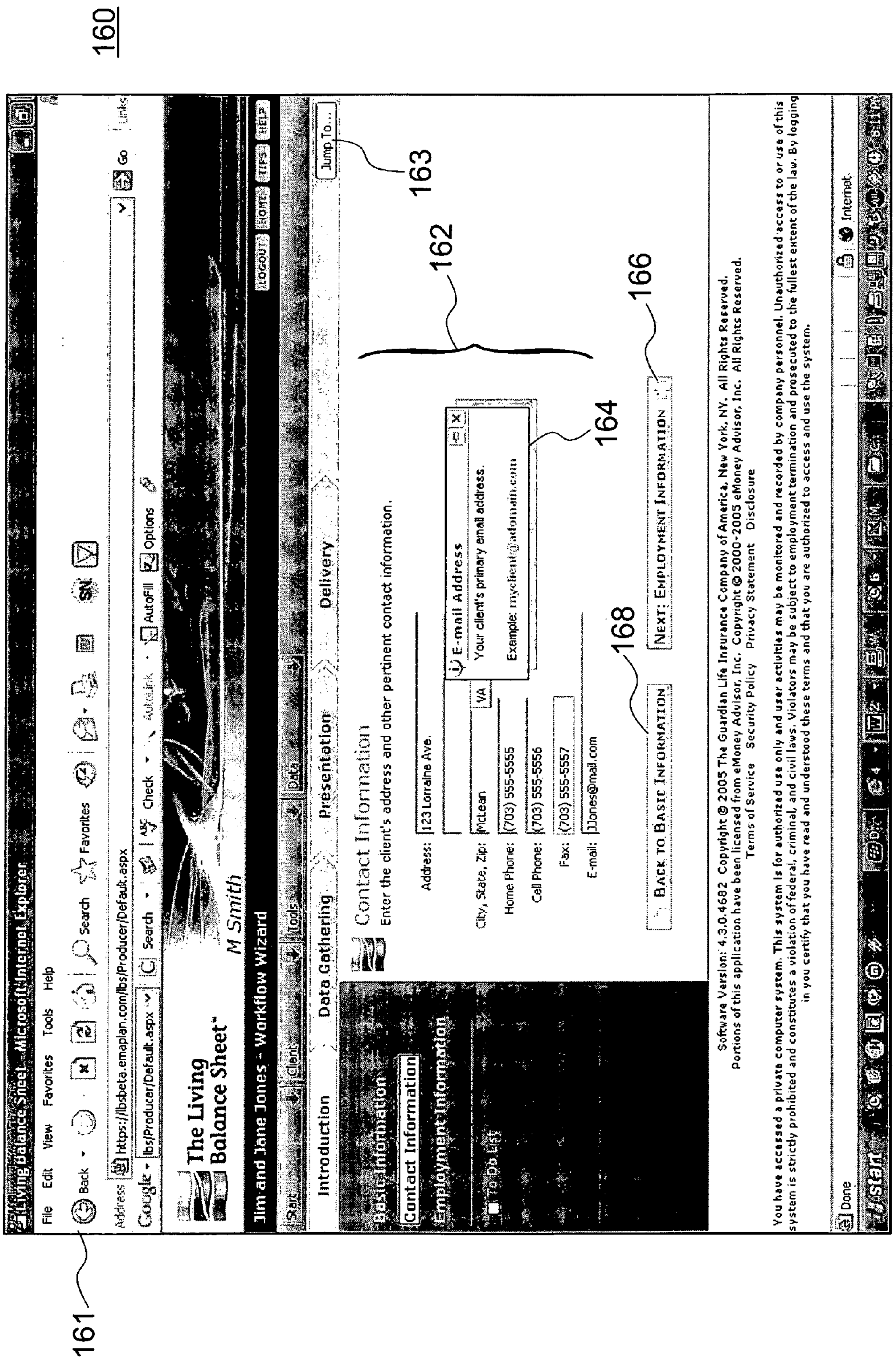

By for example, selecting next 159, the user can move to the next section of the introduction stage. For example as shown in FIG. 16, contact information display page 160 can be displayed. Display page 160 can include contact information section 162 for allowing the user to enter the client contact information. An automatic pop-up tip feature can be implemented for assisting users in interacting with the software. For example, tip 164 is a pop-up window that is displayed over the current display page in close proximity to the user's current data entry field. For example, when the user moves the cursor to the email field to enter the client's e-mail contact, tip 164 can be automatically generated to inform and help the user in entering the e-mail address. The pop-up tip can be generated using java or other appropriate software that permits pop-up windows to dynamically appear (e.g., without using "refresh") in connection with the user's current data entry field. Next button 166 can be used to move to the next section within the current workflow wizard stage. Back button 168 can be used to move to the previous section within the current workflow wizard stage. If desired, the workflow wizard mode can be implemented such that the user cannot use the browser's navigation buttons 161 (e.g., "back") to move within the software. For example, selecting the browser's back button will not cause the previous page to be displayed but rather displays a warning such as the page has expired. As such, the navigation tools, the next and back buttons 166 and 168, and jump to button 163 are preferably used for navigation within the software application. Jump-to button 163 can be selected to display a list of selectable navigation points for jumping to those points using the software. Next and back buttons 166 and 168 can also be buttons for indicating that the user-entered information in a current display page should be saved (e.g., by pressing the next button) or cancelled (e.g., by pressing the back button).

Within the workflow wizard, navigation tools 152 and 154 (of FIG. 15) are preferably a persistent feature of the display pages. As such, when the user leaves the workflow wizard mode, navigation tools 152 and 154 are no longer displayed.

Figure 17:
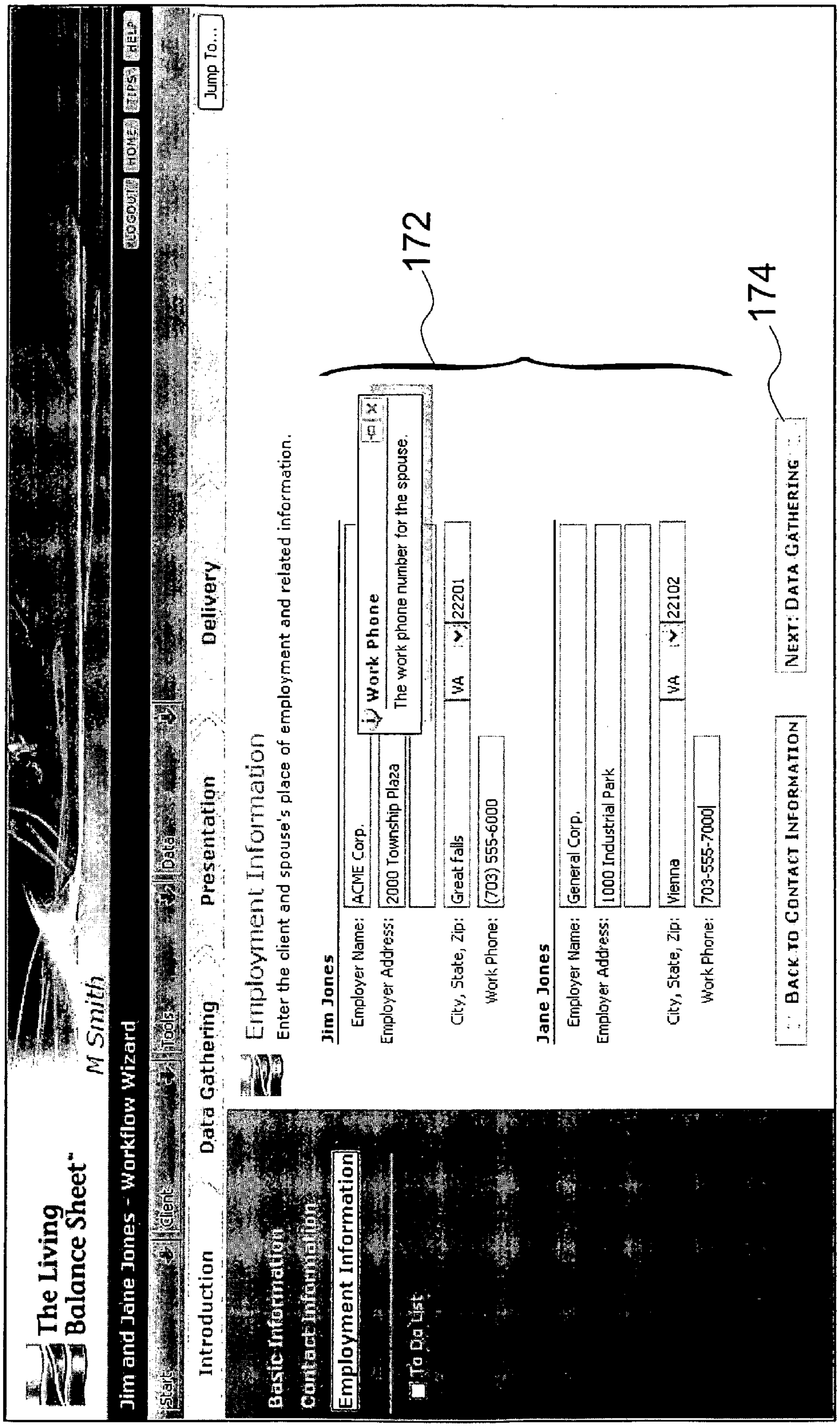

With reference to FIG. 17, employment information display page 170 can be displayed when a user selects next button 166 (of FIG. 16). Employment information display page 170 provides preconfigured data entry fields 172 for the user to enter the client and, if applicable, spousal employment information. Next button 174 can be used to save and display the next section, which in this case will be an initial section in the next stage of the workflow wizard.

Client & spouse basic information display page 180 can be displayed when the user selects next button 174 (of FIG. 17). Display page 180 is a section within the data gathering stage of the workflow wizard. As shown, "data gathering" is now highlighted in the workflow stage navigation tool. Section navigation tool 182 has been updated to display the sections and subsections of the current stage. The current display page is also highlighted. As shown, each subsection link includes an associated color, which is preferably used in a consistent way throughout the software to improve the intuitiveness of the application. For example, subsections within the basic information section are associated with the color grey except for income, which is associated with green. Protection is associated with the color orange. Assets are associated with the color blue. Liabilities are associated with the color red. Cash flow is associated with the color light green.

Figure 18:
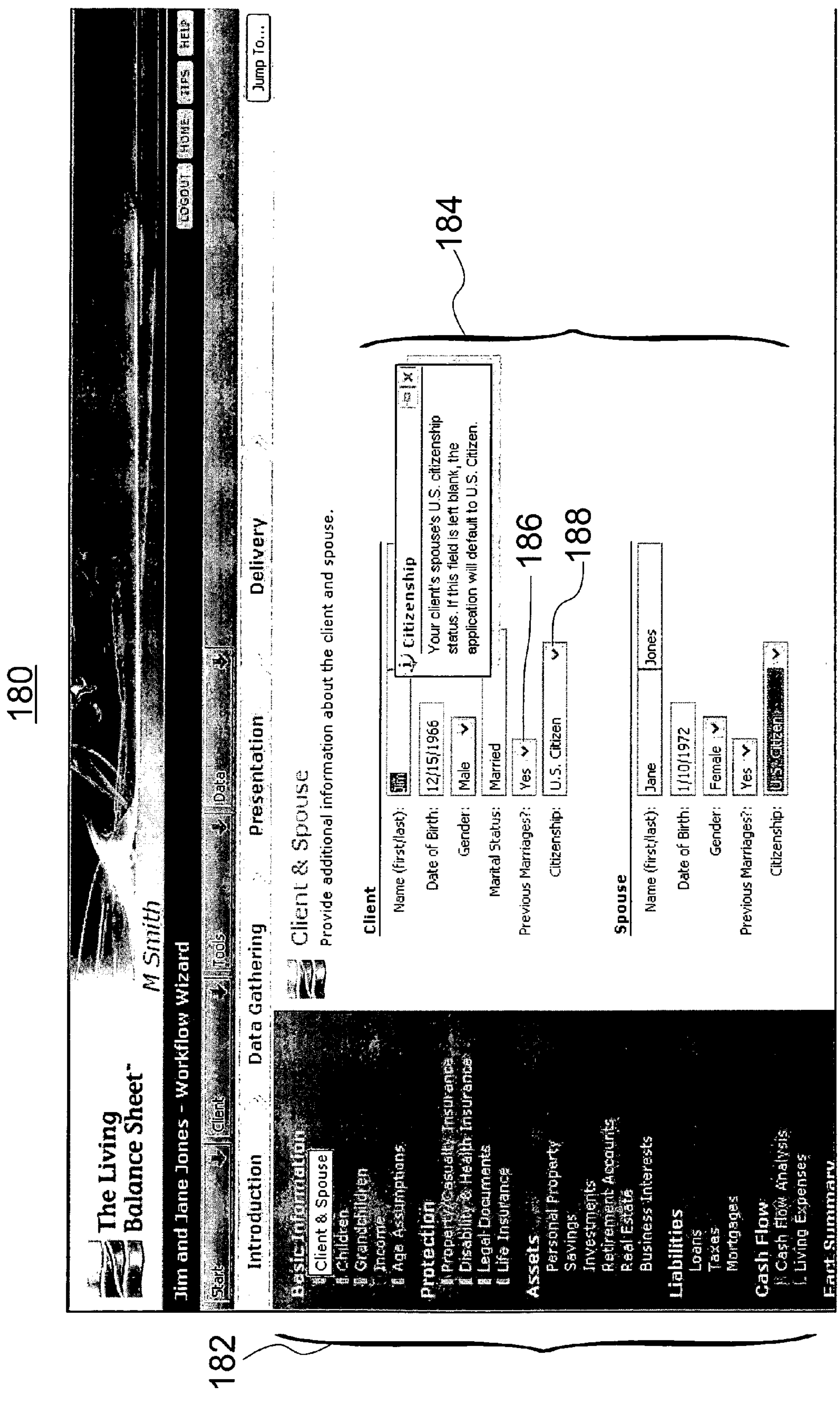
Figure 19:
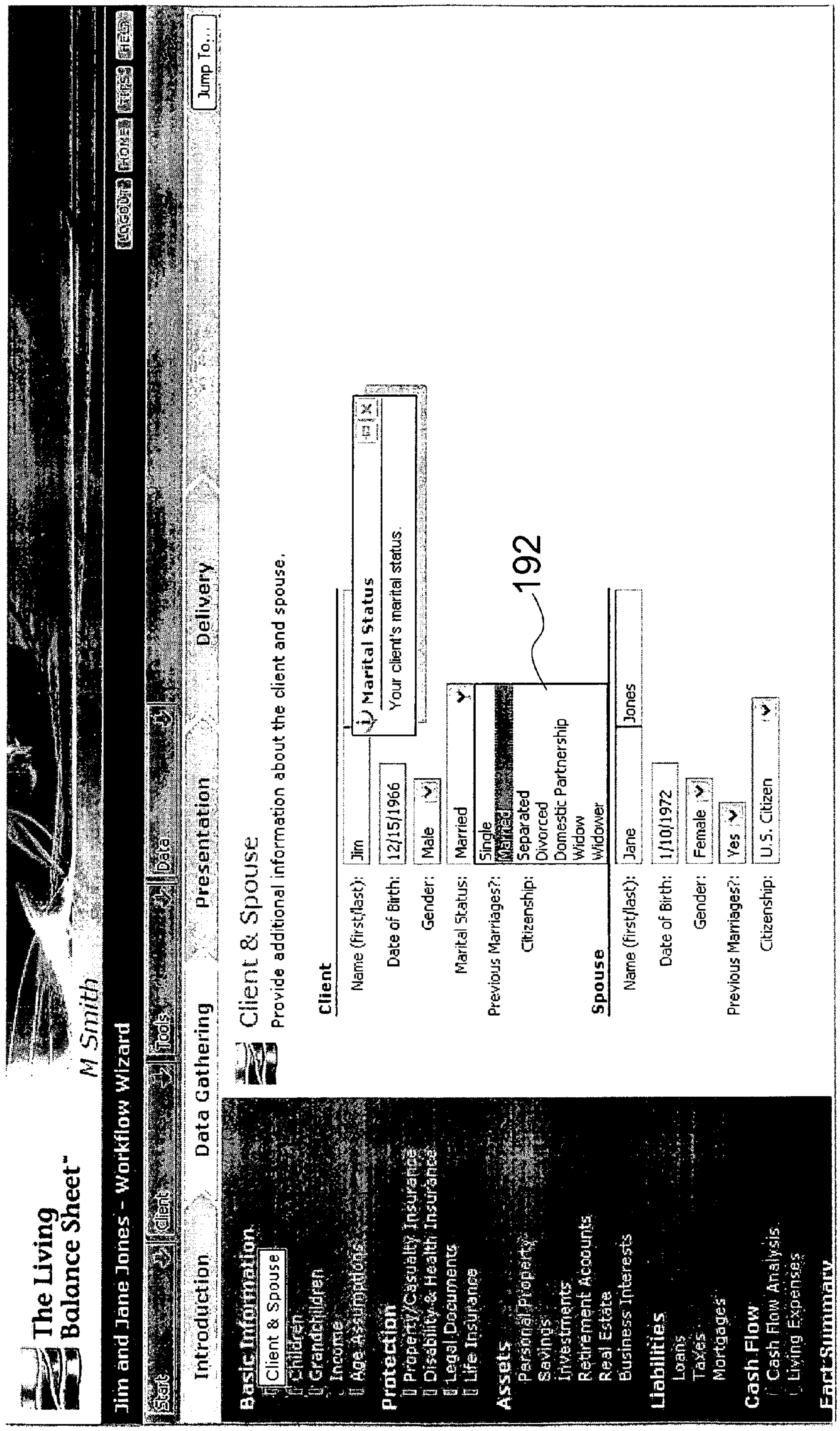

Client & spouse basic information display page 180 is configured to permit the data entry of additional information for the client and spouse. For example, marriage option 192 of FIG. 19 can be displayed that provides options using a pull-down menu to select one of the following: single, married, separated, divorced, domestic partnership, widow, or widower. In display page 180, a next button and cancel button are displayed but are out of view in the illustrations of FIGS. 18 and 19. A user can select the next button to save the data entry and selections made within that page or select the cancel button to cancel the data entry and selections, which are the common mode of operation within the workflow wizard mode. The cancel and save buttons, which are labeled "Cancel: Don't Save Changes" and "Done: Save Changes" are also navigational tools for moving forward and backward within the workflow wizard. The button can include arrows to communicate such functionality. Add child display page 200 of FIG. 20 can be displayed when a user selects the next button.

Add child display page 200 provides the user with an opportunity to add a child and related information to the current client information. In addition to the navigation tools, display page 200 can include child details section 202, delete section 204, help section 206 and save and cancel buttons 208 and 210. Child details section 202 can be configured to allow the user to enter child related details such as name, date of birth, gender, special needs, marital status, from pervious marriage, and citizenship. Help section 206 can be automatically displayed to provide instructional information and to educate the user as to the pertinence of the requested information. Delete section 204 preferable provides the user with option to delete the child entry. By selecting that entry, the inclusion of the child in the client's information can be quickly deleted.

Figure 20:
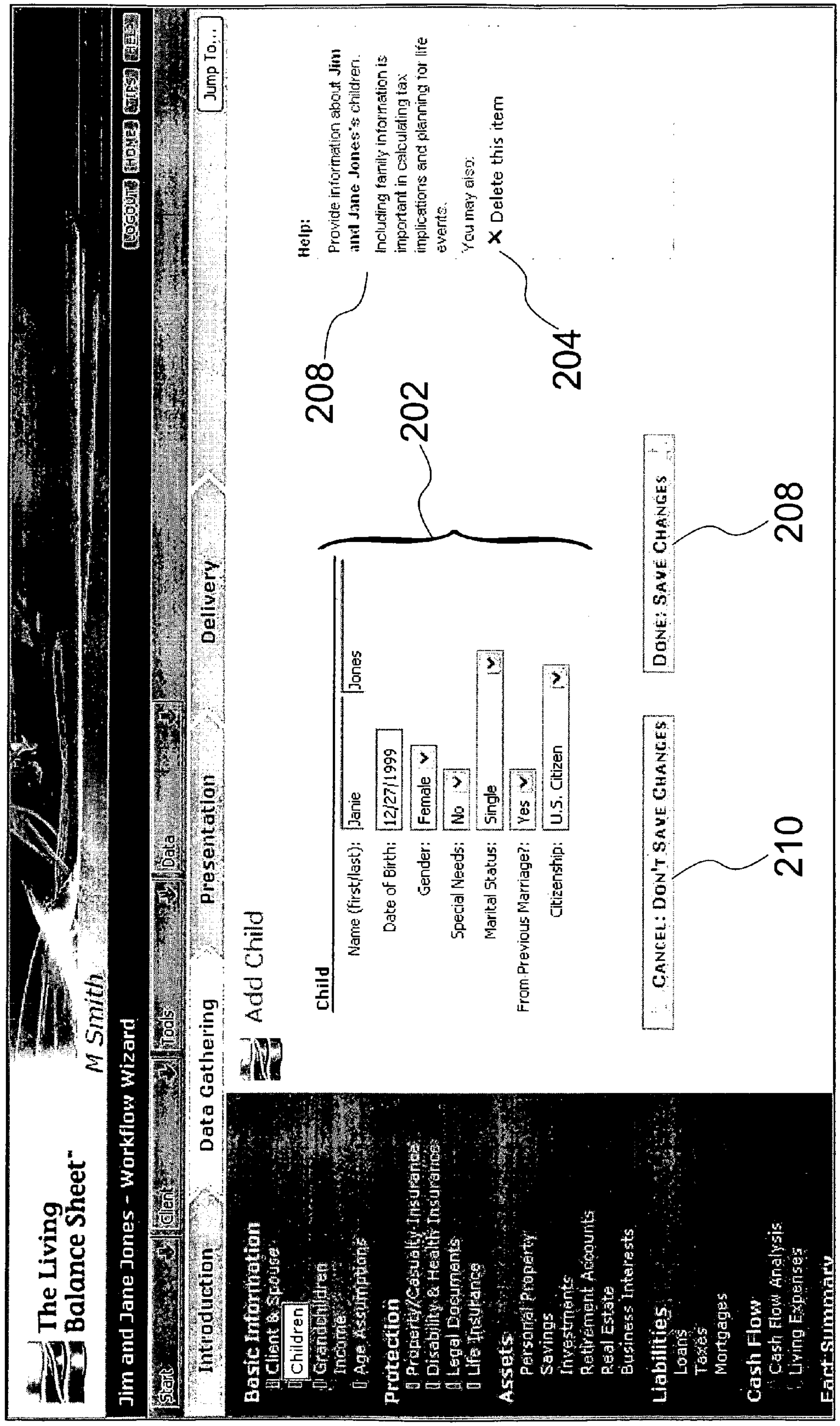
Figure 21:
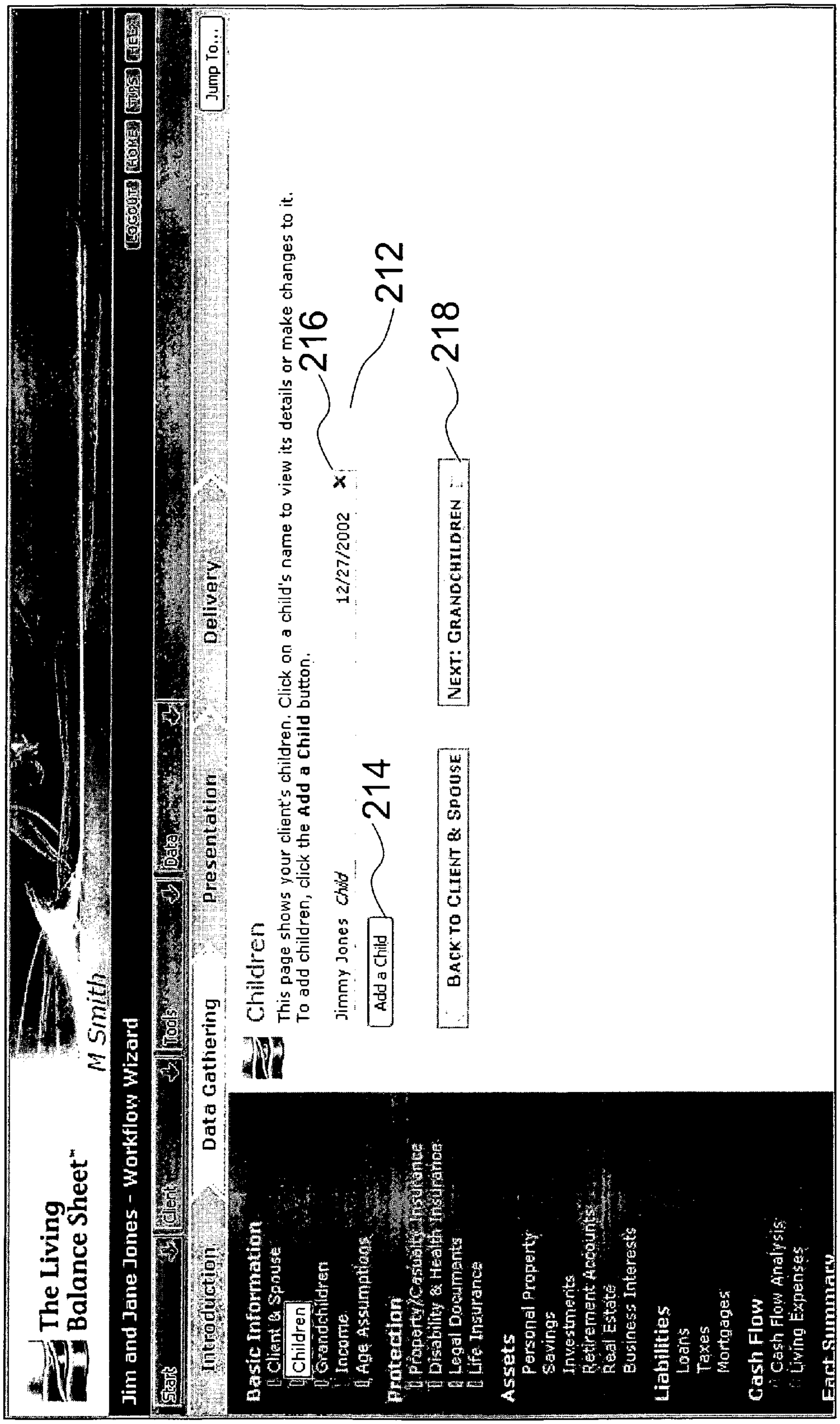

Children display page 210 of FIG. 21 can be displayed when a user selects save button 208 of FIG. 20. Children display page 210 displays children summary section 212 and "add a child" button 214. Children summary section 212 displays a list of selectable items that inform the user of the children associated with the current client including the children's names and date of birth. The items can include delete icon 206 that can be selected (e.g., a mouse click, double click, a combination of click and confirm, etc.) to delete that child from the client's information. "Add a child" button 214 can be used to add a child and related information for the client (e.g., using add-child display page 200 of FIG. 20).

Figure 22:
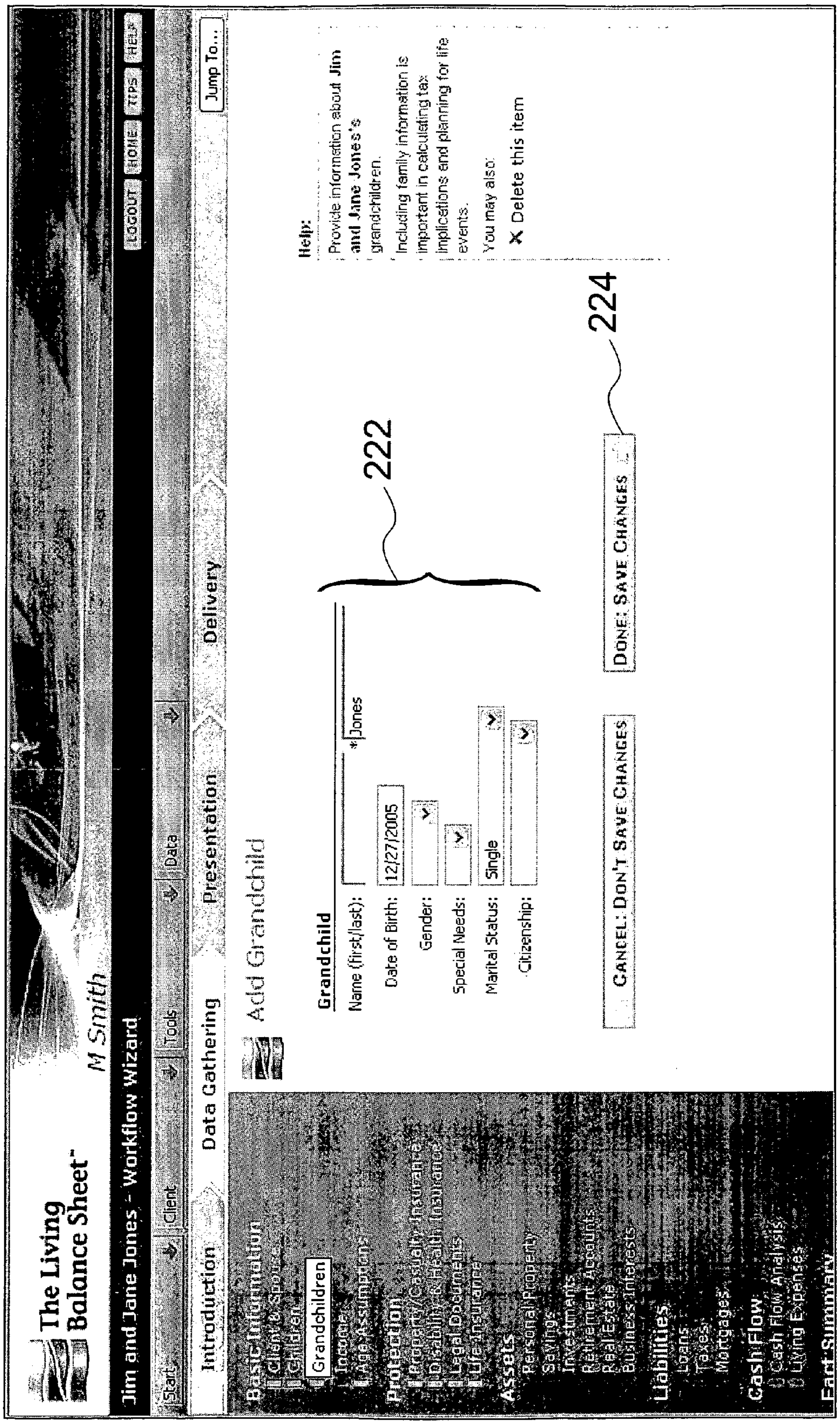
Figure 23:
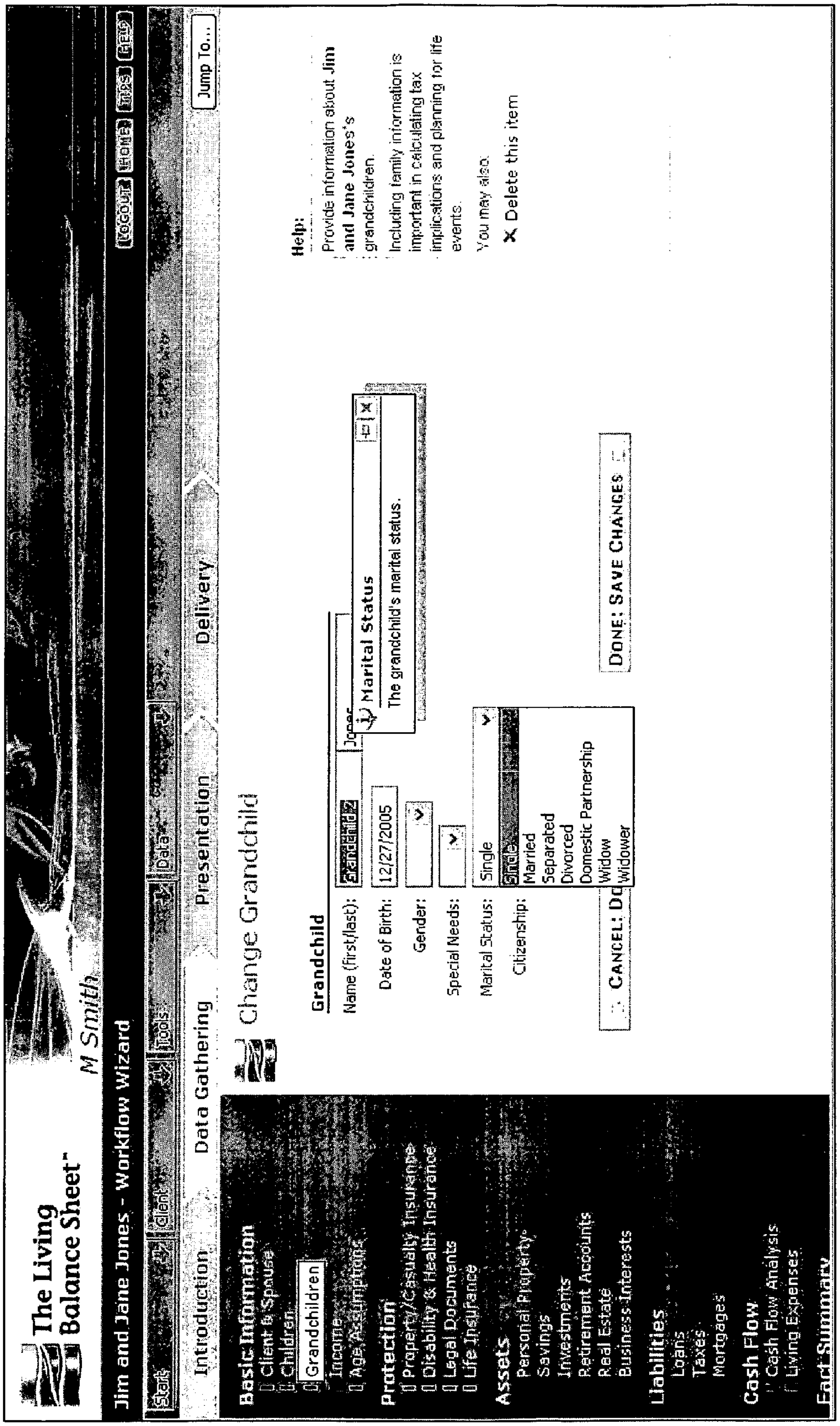

Add grandchild display page 220 of FIG. 22 can be displayed when a user selects next button 218 of FIG. 21. Display page 220 provides the user with the opportunity to add grandchildren information for the client such as to add a grandchild and related grandchild information to the client information. Section 222 can be used for the entry of detailed grandchild information. Add grandchild display page 220 is structured and contains the same functionality as add child display page 200 of FIG. 20, but add grandchild display page 220 is specific to adding a grandchild. After the user enters grandchild information in display page 220 and selects save button 224, a grandchildren summary display page can be displayed having the same structure and functionality as children summary display page 210 of FIG. 21, but the grandchildren summary display page would be specific to the client's grandchildren. If a user selects, a grandchild from the list of grandchildren in the grandchildren display page, change grandchild display page 230 of FIG. 23 can be displayed to allow the user to change or update the information of that grandchild (e.g., display page 230 would have the same functionality as add grandchild display page 220 of FIG. 22 such as to provide an edit function for a grandchild that is already associated with the client). A similar functionality and display page can also be implemented for the client's children.

Figure 24:
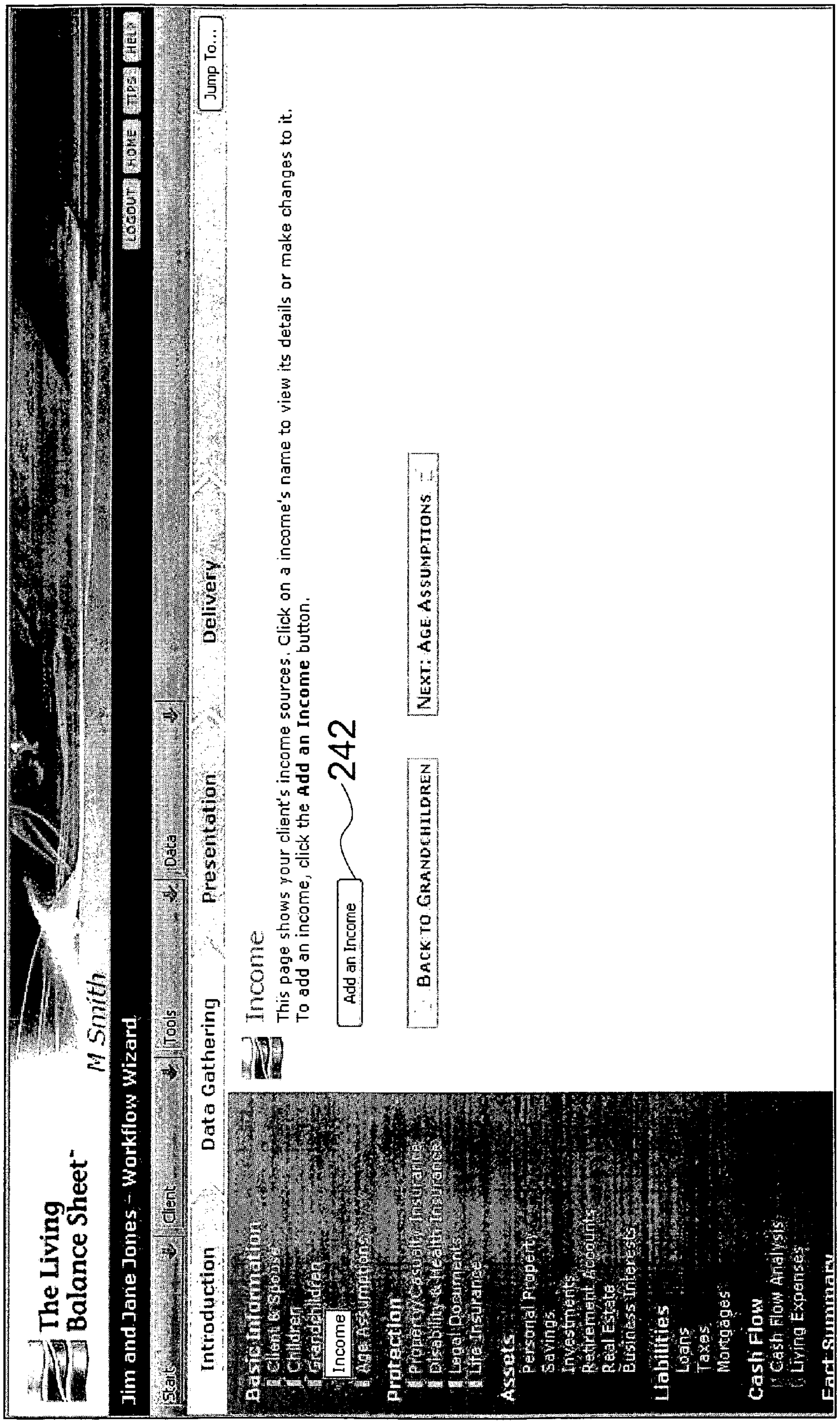

The next subsection can be an income section. For example, as shown in FIG. 24, an income display page 240 can be displayed. An income display page 240 can provide a summary of the income information for the client using a selectable list of income items. If no income information has yet been entered and saved, income display page 240 would reflect that status. Income display page 240, as shown, includes add an income button 242 to enter an income item. Navigation tools can also be displayed to allow the user to move forwards or backwards to different subsections of the workflow wizard (e.g., to skip the current subsection and move to the next subsection).

Figure 25:
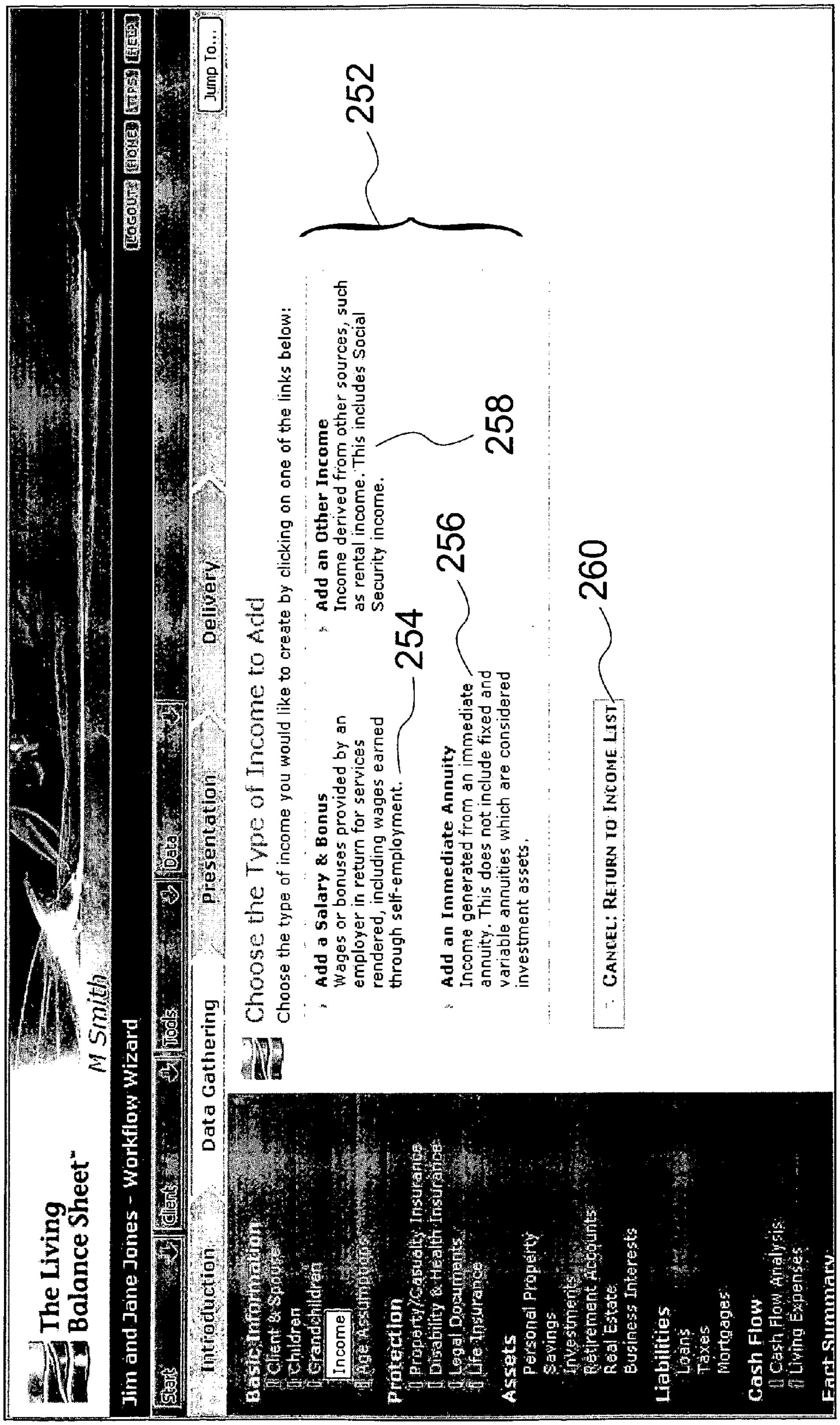

Type of income display page 250 of FIG. 25 is, for example, displayed when a user selects add an income button 242 of FIG. 24. Type of income display page 250 includes income type selection section 252 that contains different options corresponding to different types of income. Each one of the income type options can include supplementary text informing the user of the type of income that is related to that option such as the text shown for the various options shown in FIG. 25. Income type selection section 252 as shown includes add a salary & bonus option 254, add an immediate annuity option 256, and add an other income option 258. Add a salary & bonus option 254 provides the user with an opportunity to enter salary and bonus information related to the client (e.g., the client or spouse). Add an immediate annuity option 256 provides the user with an opportunity to enter information related to an immediate annuity. Add an other income option 258 provides the user with an opportunity to enter information on income derived from other sources such as rental income.

Figure 26:
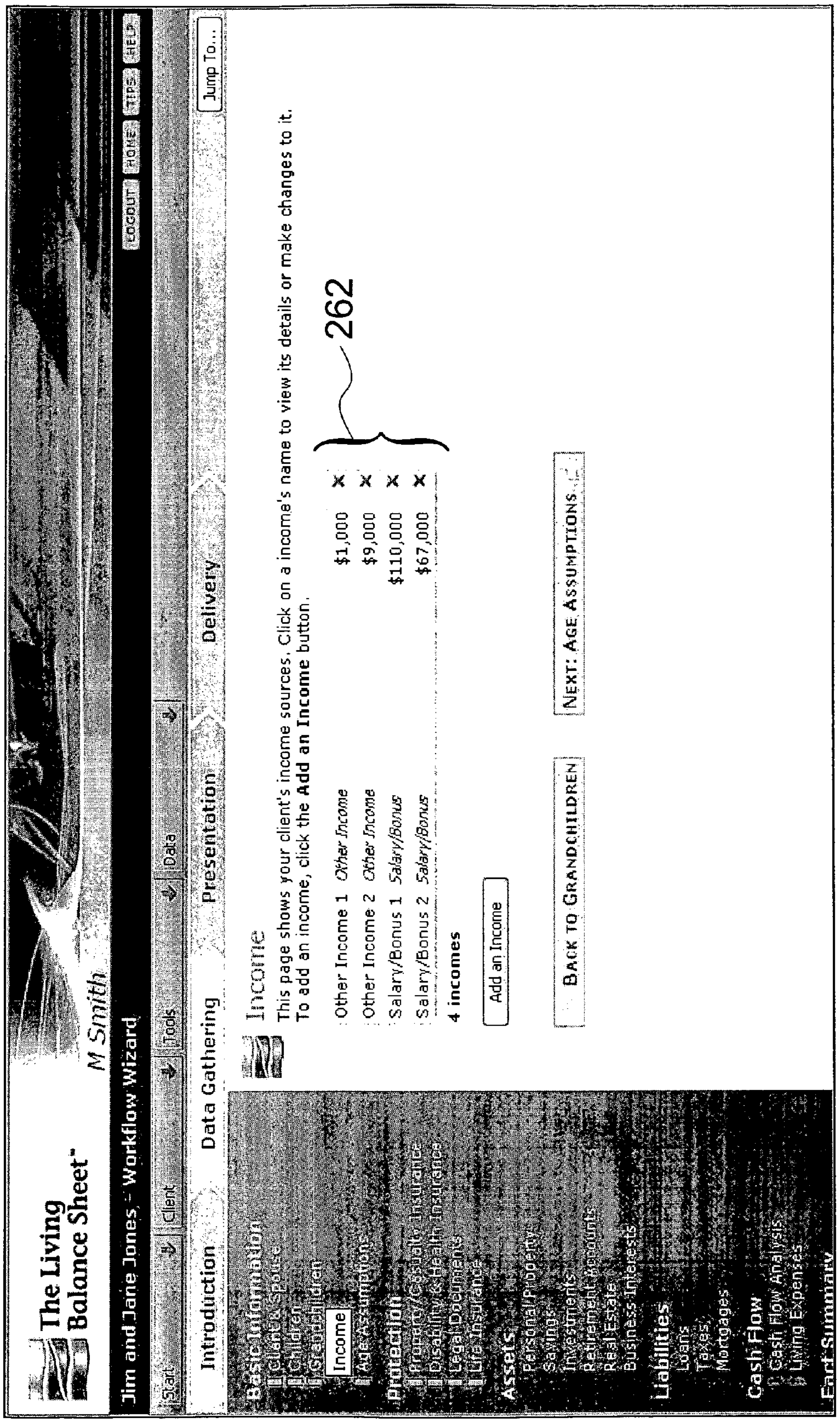

FIG. 26 shows income display page 260 that is illustrative of the income display page after income data has been entered for a client. Summary section 262 shows four income sources of the client and identifies the type and amount of income. A delete option is also displayed for each income item to allow the user to delete an item from the list and thus, change the client's saved information. A user can select income items in section 262 to change or update related information. For example, change salary & bonus display page 270 can be displayed when a user selects the "Salary/Bonus 2" item from section 262 of FIG. 26. Change salary & bonus display page 270 includes data entry options and fields for the user to enter or change salary and bonus information for the selected item. The specific information can for example include annual amount, owner (e.g., who is the owner of that income), the destination (e.g., a pull-down menu where a user can select from core cash account or another destination such as a disability policy), and whether the income is guaranteed. Note that when a user selects to add a new salary & bonus income from type of income display page 250 of FIG. 25, a display page that is preferably the same as display page 270 of FIG. 27 in functionality and structure would be displayed except that it would be configured for the entry of new information (e.g., there would be a title space for "Add Salary & Bonus" and the data field may be left empty or at a preset default value).

Figure 27:
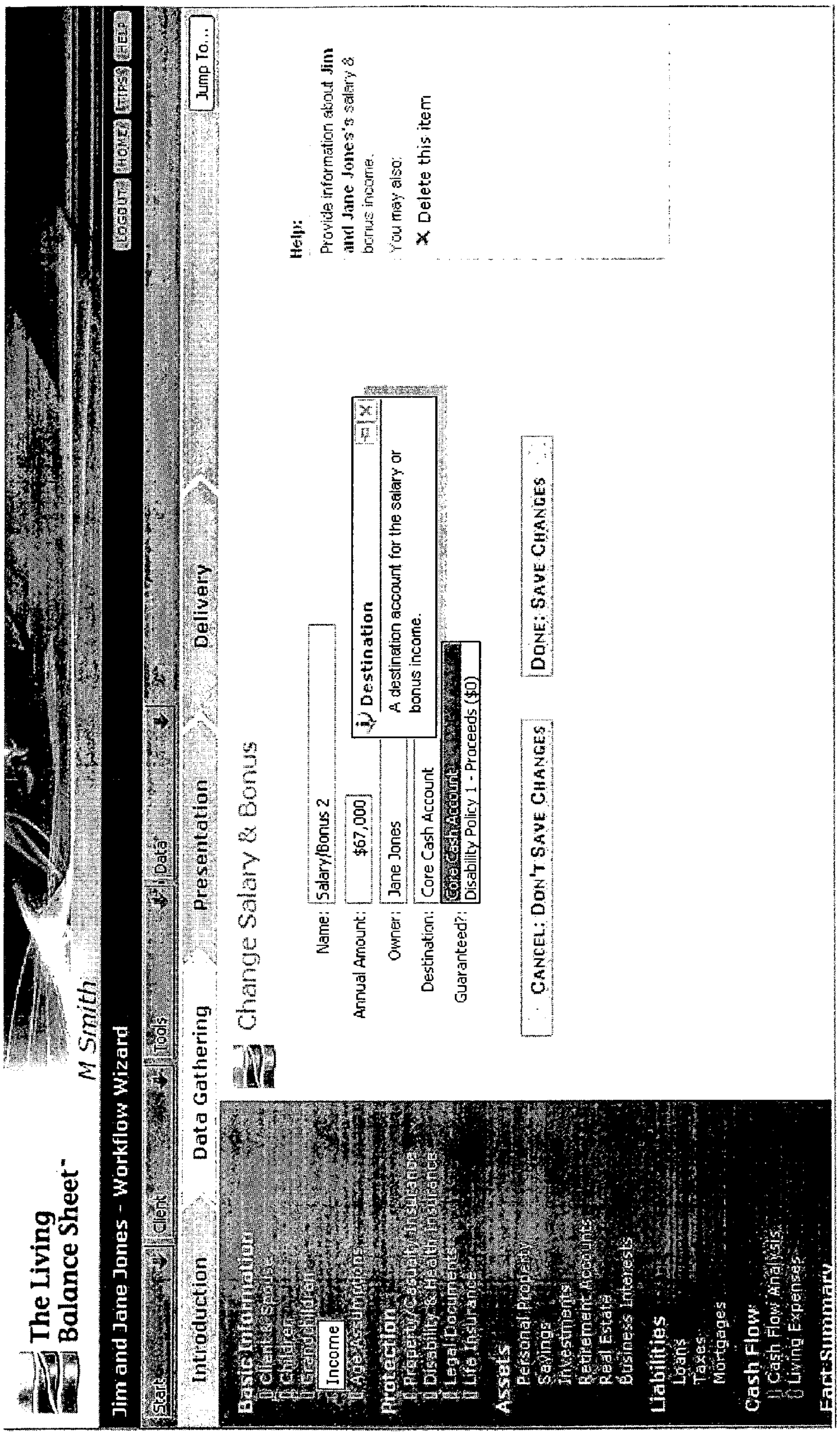
Figure 28:
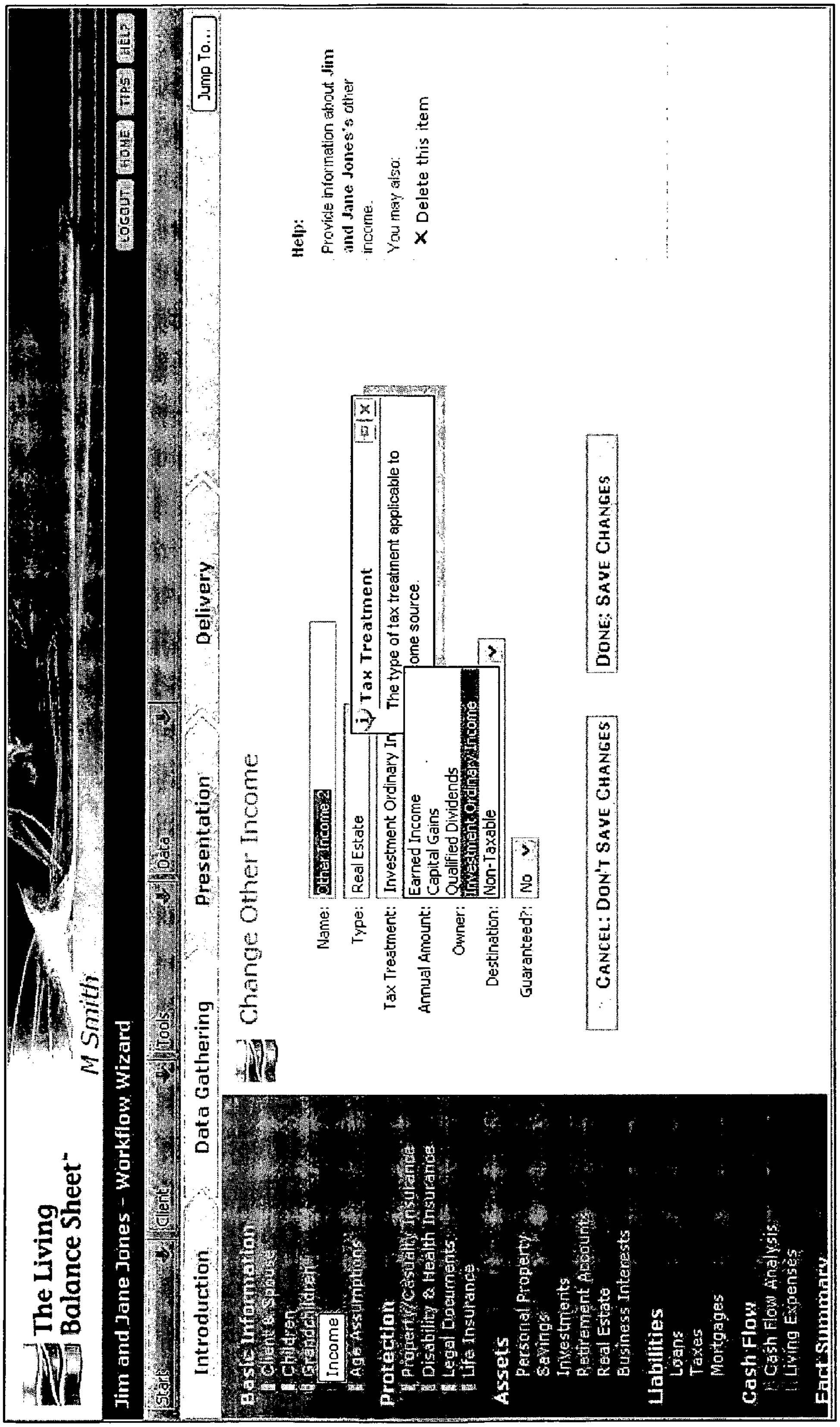

In another example, change other income display page 280 can be displayed when a user selects the "Other Income 2" item from section 262 of FIG. 26. Change other income display page 280 includes data entry options and fields for the user to enter or change other income information for the selected item. The specific information can for example include the type (e.g., using a pull-down menu that lists income sources), tax treatment (e.g., an option that allows the user to identify the tax treatment for the income such as a pull-down menu for choosing the expected tax treatment to be one of earned income, capital gains, qualified dividends, investment ordinary income, or nontaxable), annual amount, owner (e.g., who is the owner of that income), the destination (e.g., a pull-down menu where a user can select from core cash account or another destination such as disability policy), and whether the income is guaranteed. Note that when a user selects to add a new "other income" type of income from display page 250 of FIG. 25, a display page that is preferably the same in functionality and structure as display page 270 of FIG. 27 is displayed except that it would be configured for the entry of new information (e.g., there would be a title space for "Add Other Income" and the data fields may be left empty or at a preset default value).

Figure 29:
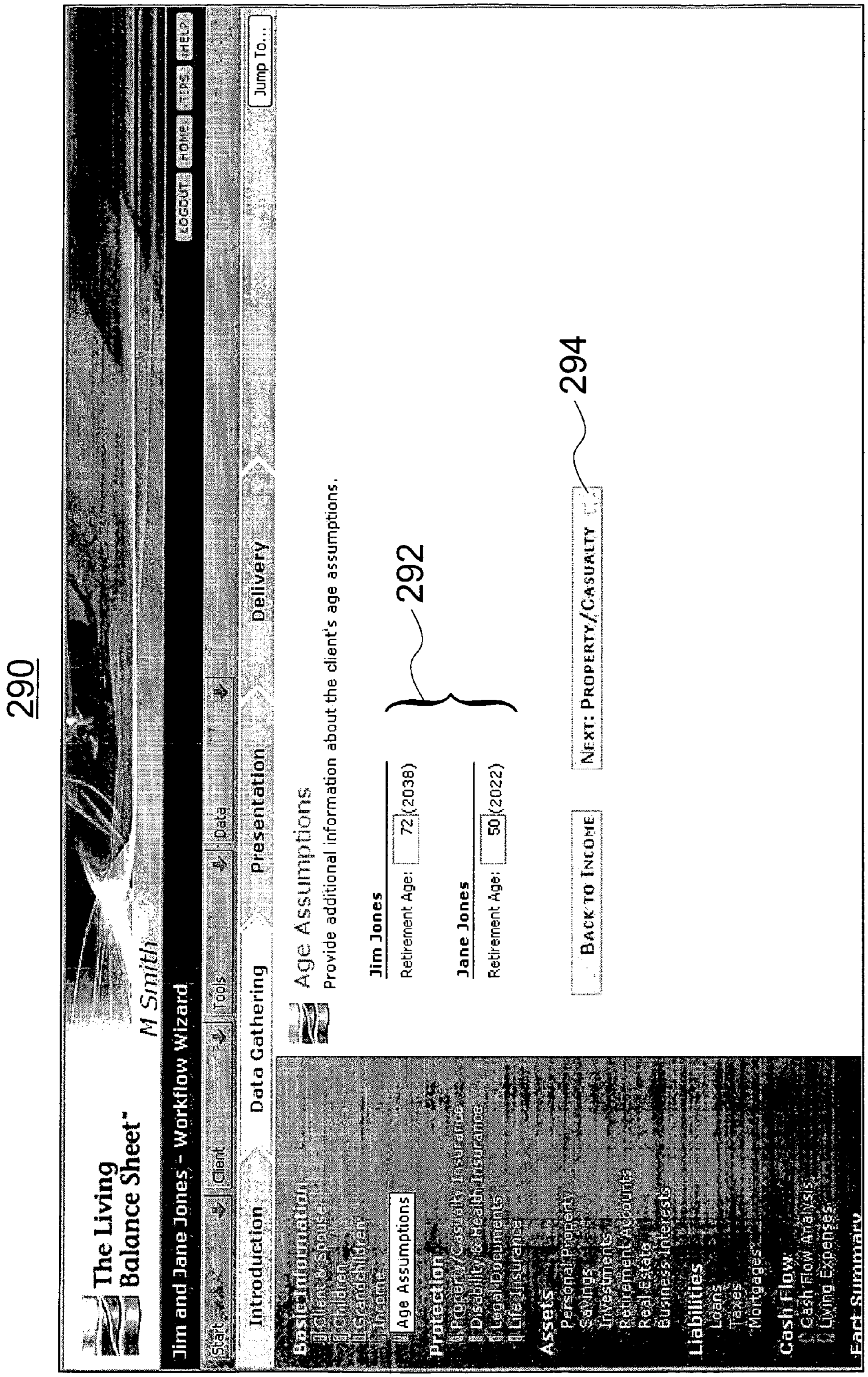

Age assumptions display page 290 of FIG. 29 can be displayed when for example, a user selects the next or save button in income display page 260 of FIG. 26. Age assumption display page 290 provides the user with the opportunity to enter assumptions with respect to the expected retirement age of the client. Section 292 of display page 294 as shown includes data entry fields for the client and spouse in which the user can enter a particular age. Section 292 can include a dynamically updated year next to the age entry field that shows the year with which the retirement age corresponds. Note that if the client did not have a spouse and as such, no such information was added to the client information during the basic information subsection of the workflow wizard, the software would have the intelligence to vary the display pages to reflect that fact. As such, age assumptions display page 290 would be displayed without a data entry field for the spouse if a spouse had not been previously added to the client's information. Preferably, the software incorporates such intelligence and data persistence in the workflow wizard to, for example, provide a clean interface for the user and to automatically enter or update information for the user. Display page 290 includes next button 294, which the user can select to save the entered information and move to the next subsection.

Figure 30:
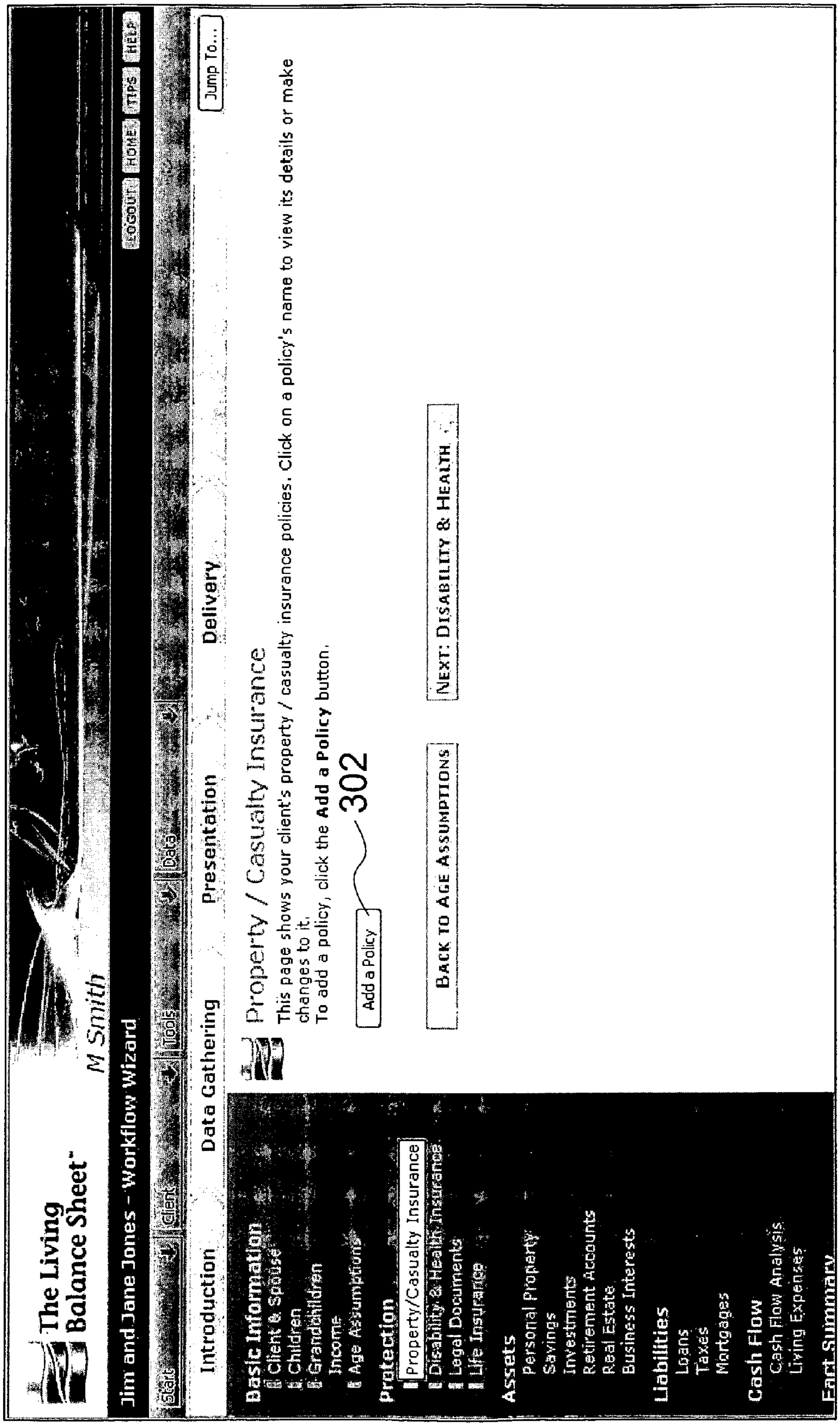
Figure 31:
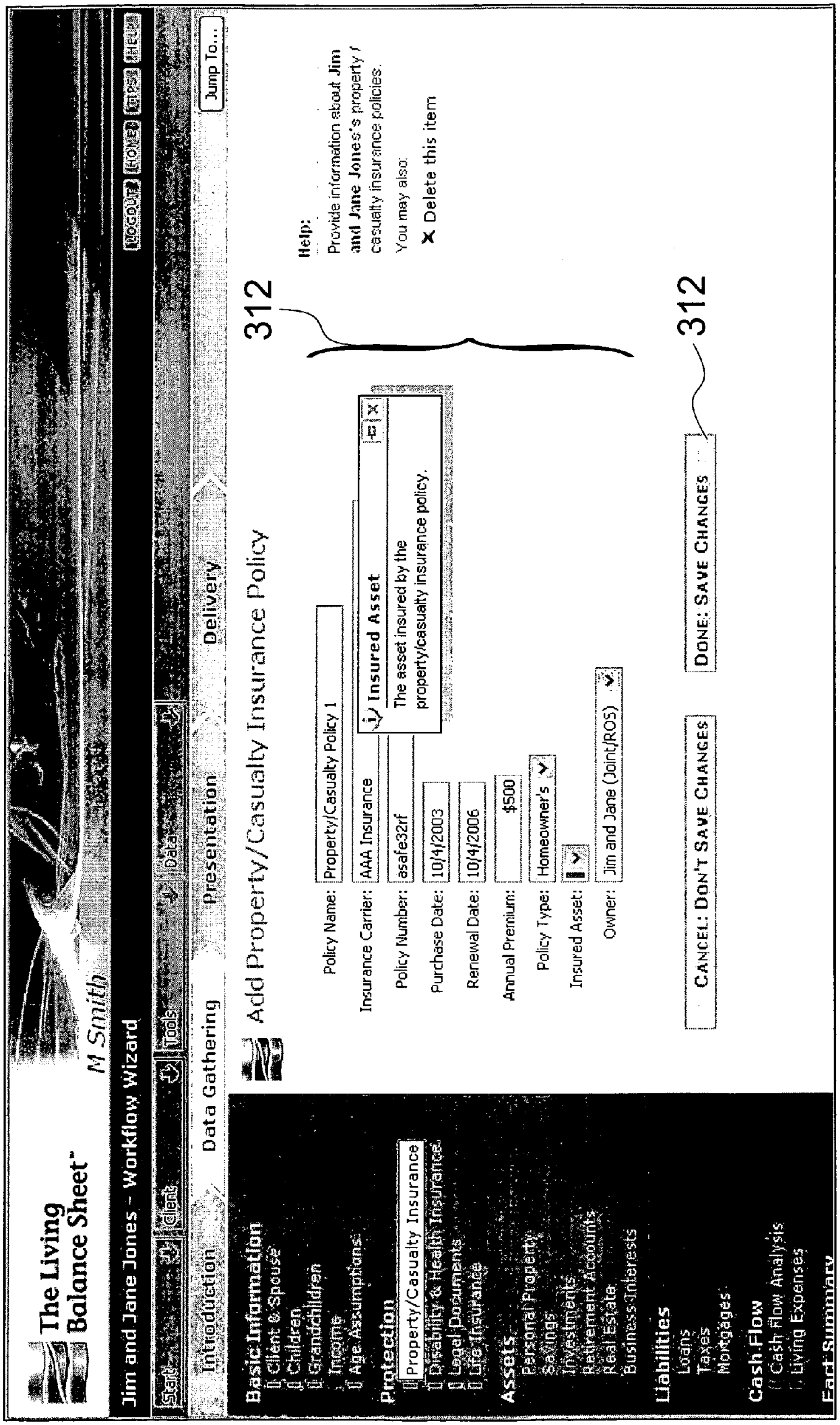
Figure 32:
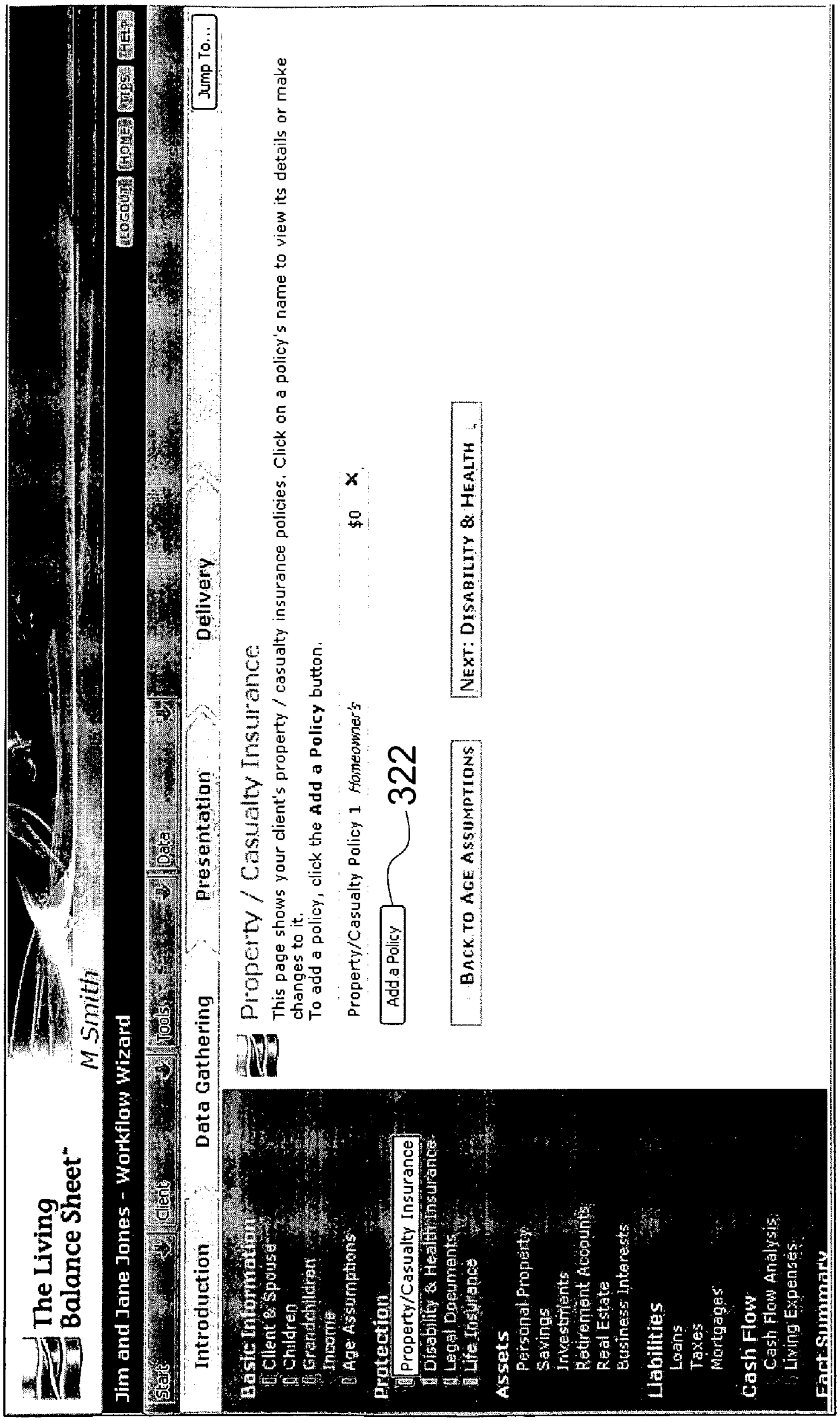
Figure 33:
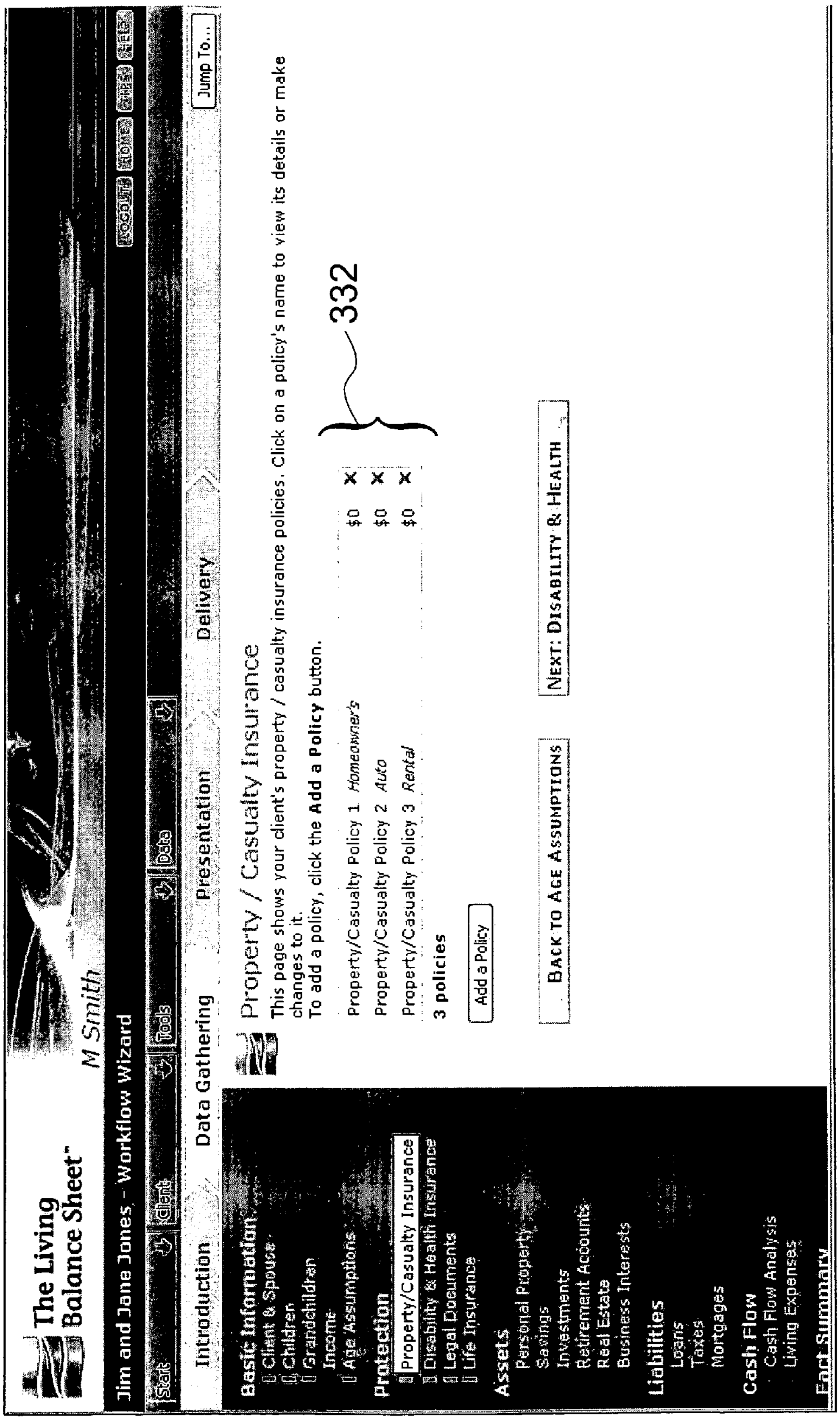

Property/casualty insurance display page 300 of FIG. 30 can be displayed when the user selects next button 294 of FIG. 29. Property/casualty insurance display page 300 preferably displays a summary of the client's property and casualty information if such information has been added for that client. Display page 300 as shown also includes add a policy button 302 for adding a policy to the client information. Add property/casualty insurance policy display page 310 of FIG. 31 can be displayed when a user selects add policy button 302 of FIG. 30. Display page 310 can include options and data entry fields for adding a property/casualty insurance policy of the client such as the fields and options shown in section 312 of display page 310. As shown, the user can enter a policy name, insurance carrier, policy number, purchase date, renewal date, annual premium, policy type, insured asset, and owner. After certain data is entered, the user can select next or save button 312, which would in response, cause property/casualty insurance display page 320 of FIG. 32 to be displayed. As shown, display page 320 now reflects the policy that was added using add property/casualty insurance policy display page 310 of FIG. 31. Specifically, "Property/Casualty Policy 1" is now identified to be a policy of the client in display page 320 of FIG. 32 where before the corresponding data entry, display page 300 of FIG. 30 showed no such policy. Using add a policy button 322, a user can continue to add policies, which would again be summarized in the property/casualty insurance display page such as that shown in property/casualty insurance display page 330 of FIG. 33. As shown in display page, each item in list 332 can be selectable to access a display page to change or update the related information for that item. In addition, the summary item can include information such as the insurance type (e.g., homeowner's, auto, rental, etc.).

Figure 34:
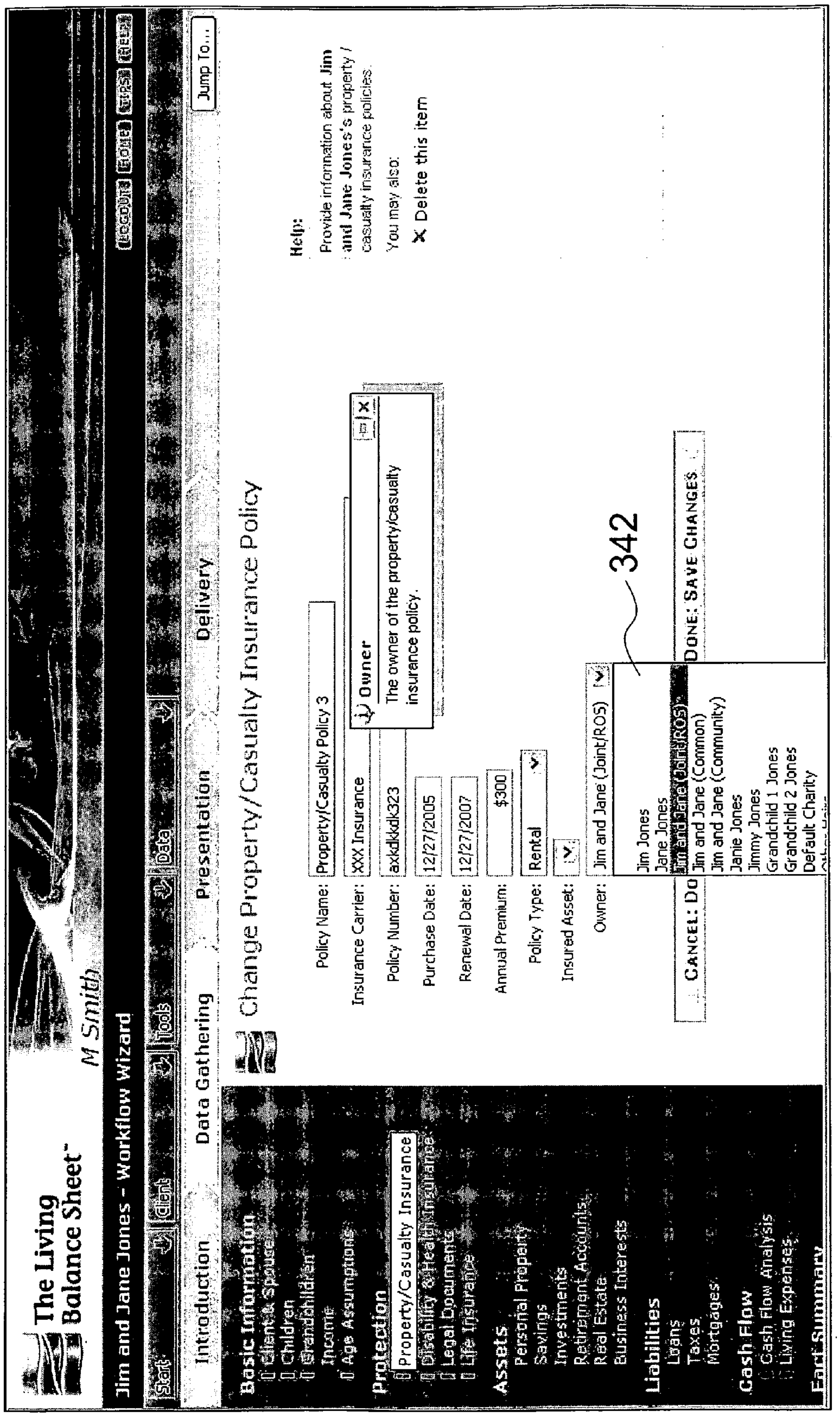
Figure 35:
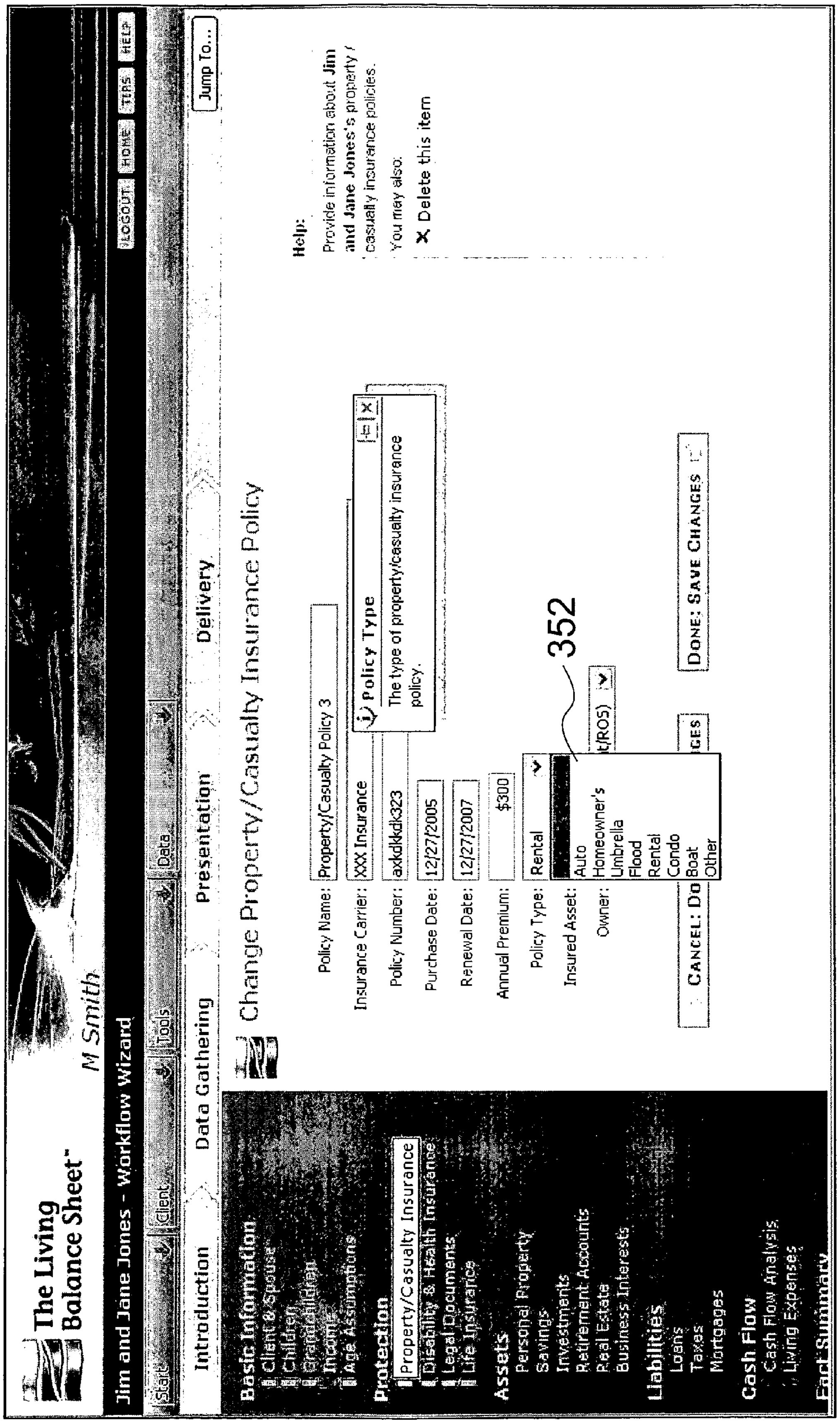

FIGS. 34 and 35 show that a user can access a "change" display page when the user selects a policy from the list of policies in a display page such as display page 330. FIGS. 34 and 35 also illustrate certain pull-down menu functionality. Owner pull-down menu 342 shows that the software automatically generates pull-down menu options based on information that was previously entered for the client. Thus, in the given example, owner pull-down menu 342 provides as selectable items the name of the client, the spouse, individual children, individual grandchildren, or other possible owners such as a default charity, other heirs, or a default trust. In addition, menu 342 can provide a level of sophistication where joint ownership can be specified including the type of joint ownership such as common, community, or joint with a right of survival. Pull-down menu 352 of FIG. 35 shows the range of policy types that a user can select from for data entry purposes such as auto, homeowner's umbrella, flood, rental, condo, boat, and other.

As shown, the next subsection within the protection section is disability and health insurance. Disability and health insurance display page 360 can be displayed when a user first moves from the previous subsection to the disability and health insurance subsection. As in other "home" subsection screens, disability and health insurance display page 360 preferably displays summary information which in this case would be a summary of the clients disability and health insurance policies and also would allow the user to add or change information.

Figure 36:
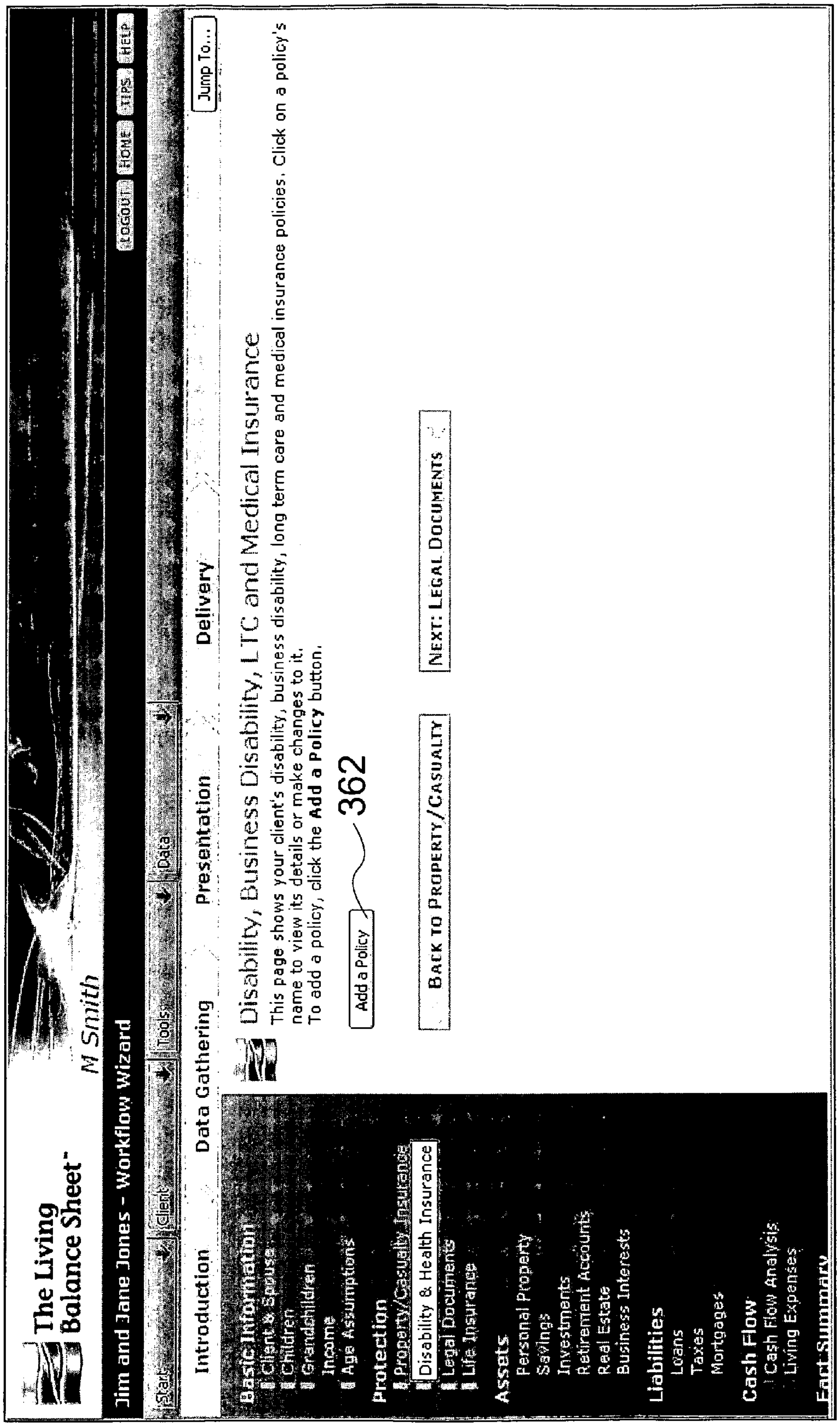
Figure 37:
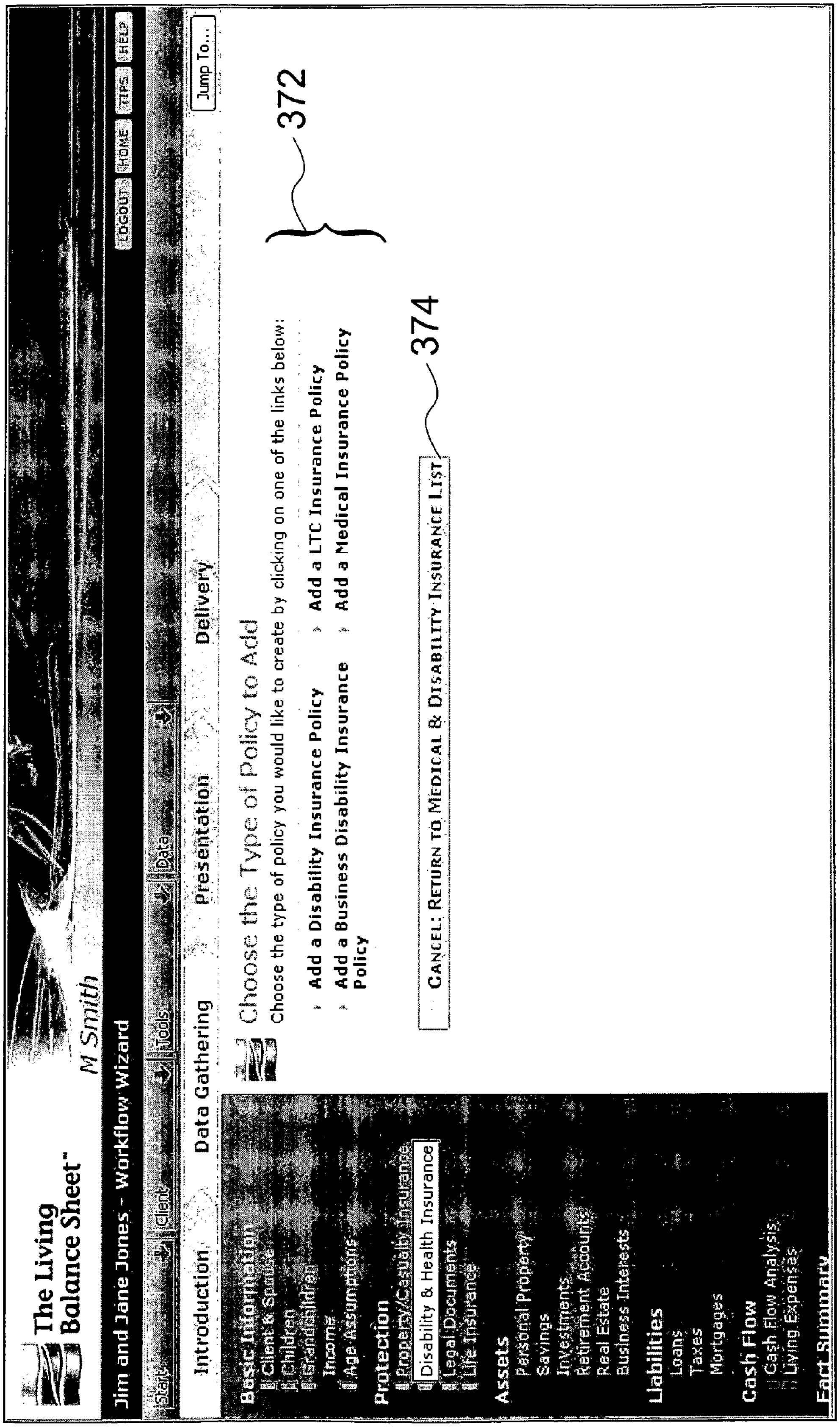

Type of policy display page 370 of FIG. 37 can be displayed when a user selects add a policy button 362 of FIG. 36. Display page 370 as shown includes choose type section 272 for allowing the user to select a type of policy to add to the client information. As shown, section 272 includes options for adding a disability insurance policy, adding a business disability insurance policy, adding a long-term care insurance policy, and adding a medical insurance policy. Cancel button 374 can return the user to disability and health insurance display page 360 of FIG. 36.

Figure 38:
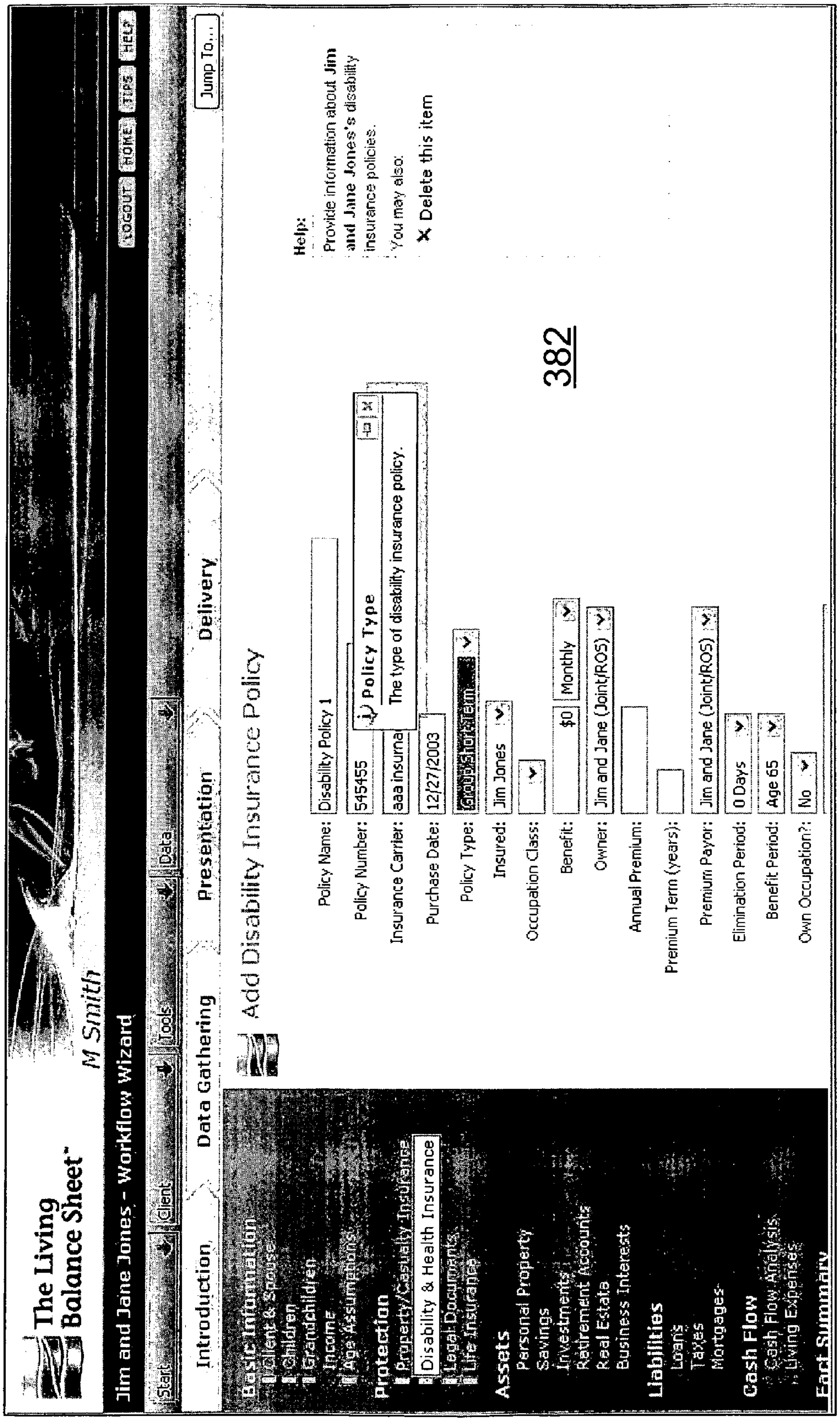
Figure 39:
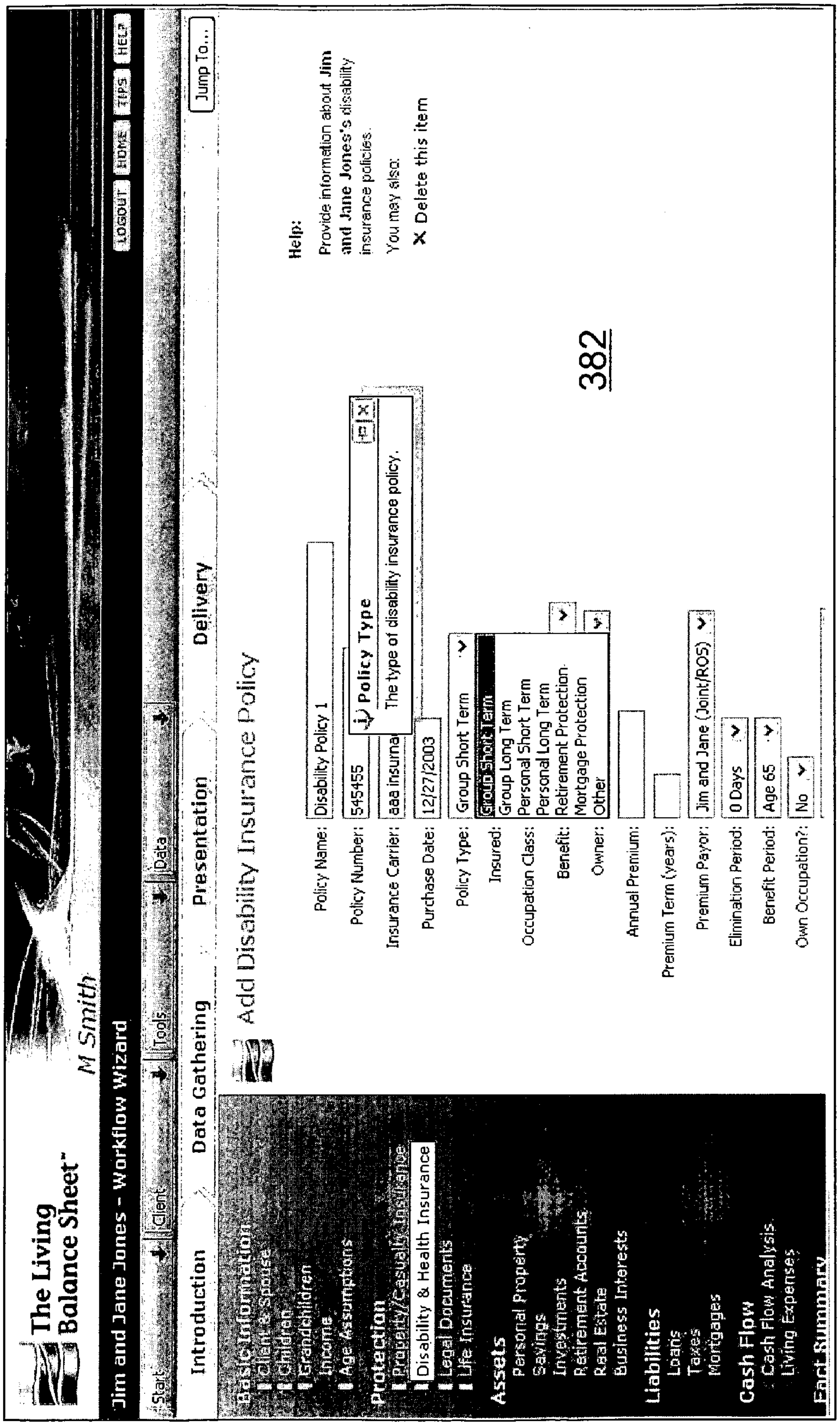
Figure 40:
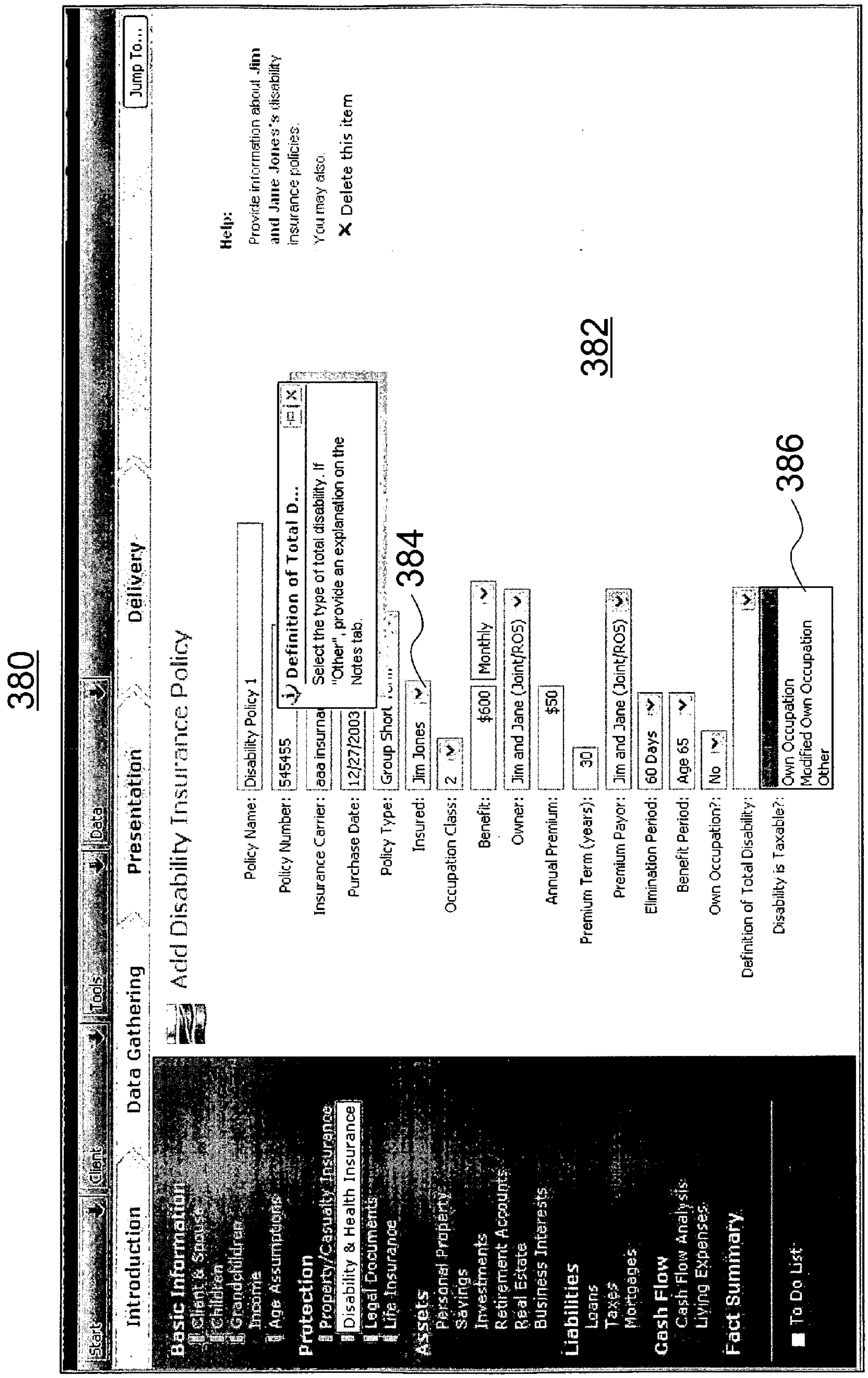

Add disability insurance policy display page 380 of FIGS. 38 to 40 can be displayed when a user selects an option for adding a disability insurance policy in choose type display page 370 of FIG. 37. Display page 380 provides the user with the opportunity to enter and save detailed information related to a disability insurance policy of the client. Specifically, display page 380 as shown includes section 382 for data entry and option selections with respect to the insurance policy. In section 382, a user can enter a policy name, policy number, insurance carrier, purchase date, policy type, insured, occupation class, benefit (e.g., monthly, yearly, etc.), owner, annual premium, premium term, premium payer, elimination period, benefit period, own occupation, definition of total disability, whether the disability is taxable.

Pull-down menus can be incorporated to assist with the user's interaction. For example, section 382 of FIG. 39 shows a pull-down menu for policy type that includes options for selecting the policy type to be group short term, group long term, personal short term, personal long term, retirement protection, mortgage protection, or other. Another example is pull-down menu 386 of FIG. 40 in which the user is provided with the option to select whether the disability is taxable and is given the options of own occupation, modified own occupation, or other. Related help would be included for the various options and functionality to help the user in interacting with the software. Pull-down menus can be automatically generated that are customized for the current client. Insured option 384 can automatically list the names of the client, spouse, or other possible insured for which data has been saved in connection with the current client.

Figure 41:
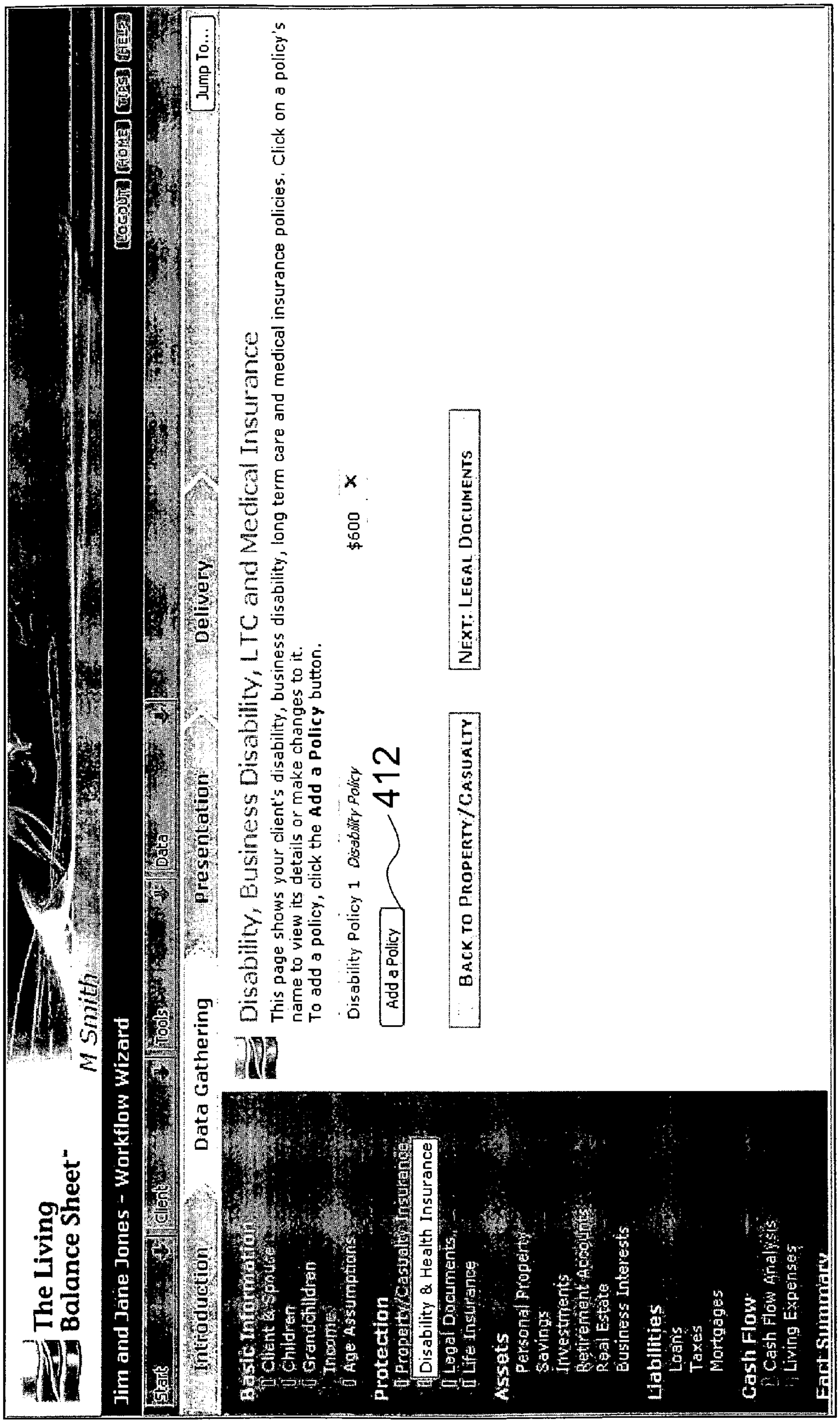
Figure 42:
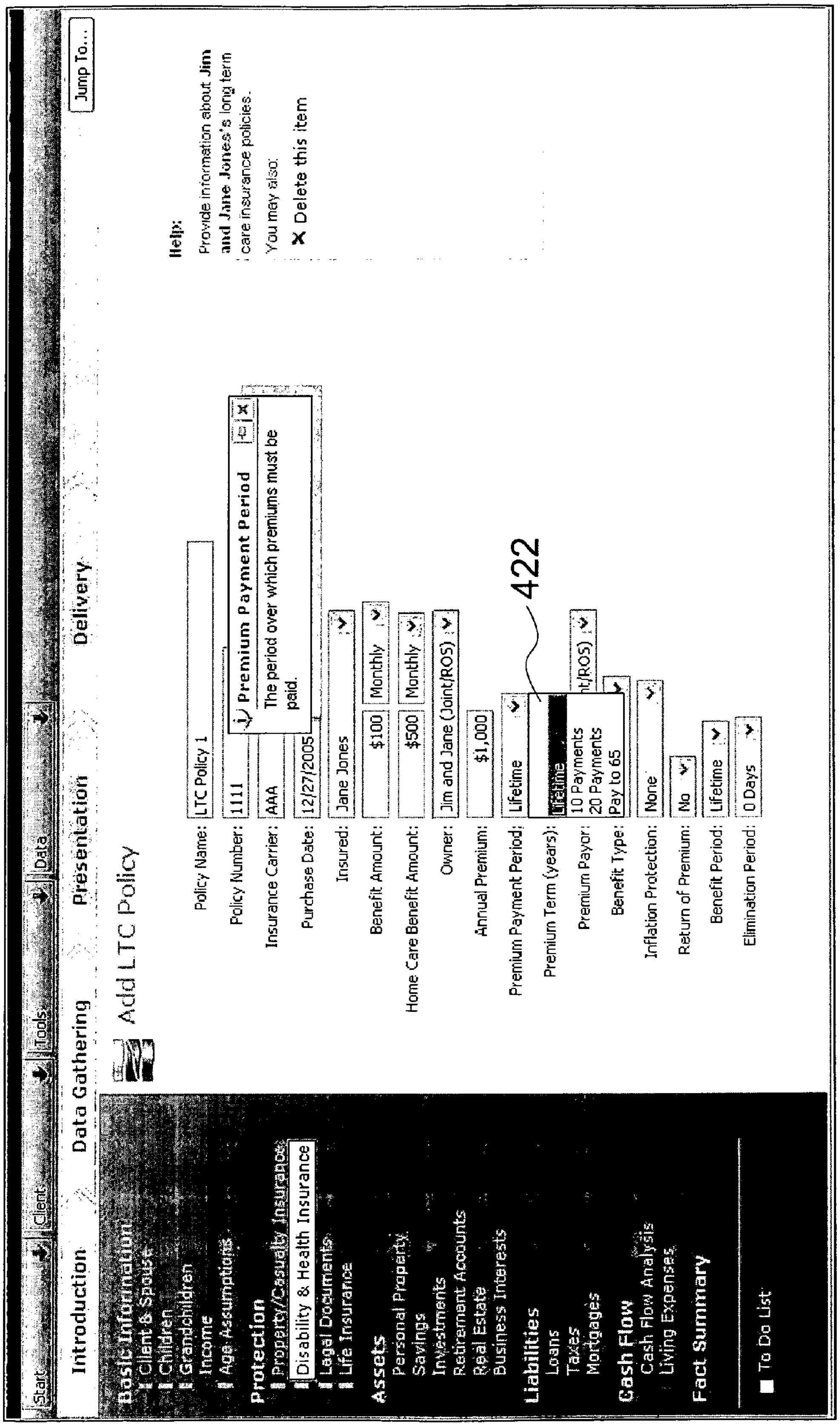
Figure 43:
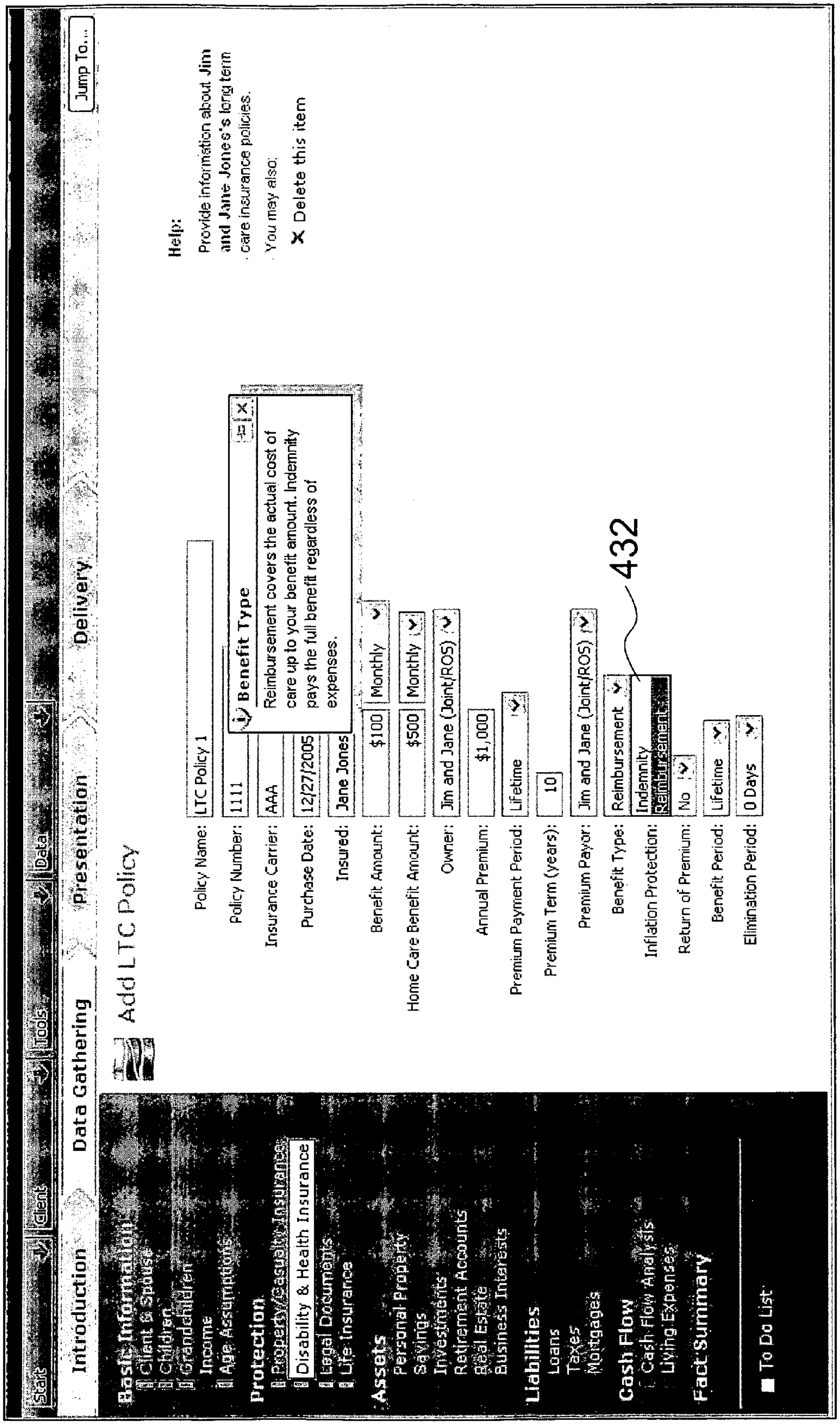

Although not visible in FIGS. 38 to 40, display page 380 can include a save button to allow the user to return to the disability and health insurance policy display page. For example, as shown in FIG. 41, disability and health insurance display page 410 can be displayed when a user selects a save button from display page 380 of FIG. 40. As shown, display page 410 includes a summary of the policy that was entered using display page 380 of FIGS. 38-40. The summary can include the policy name, policy type, the benefit, or other characteristics. The summary can be selected to change the saved policy information.

Figure 44:
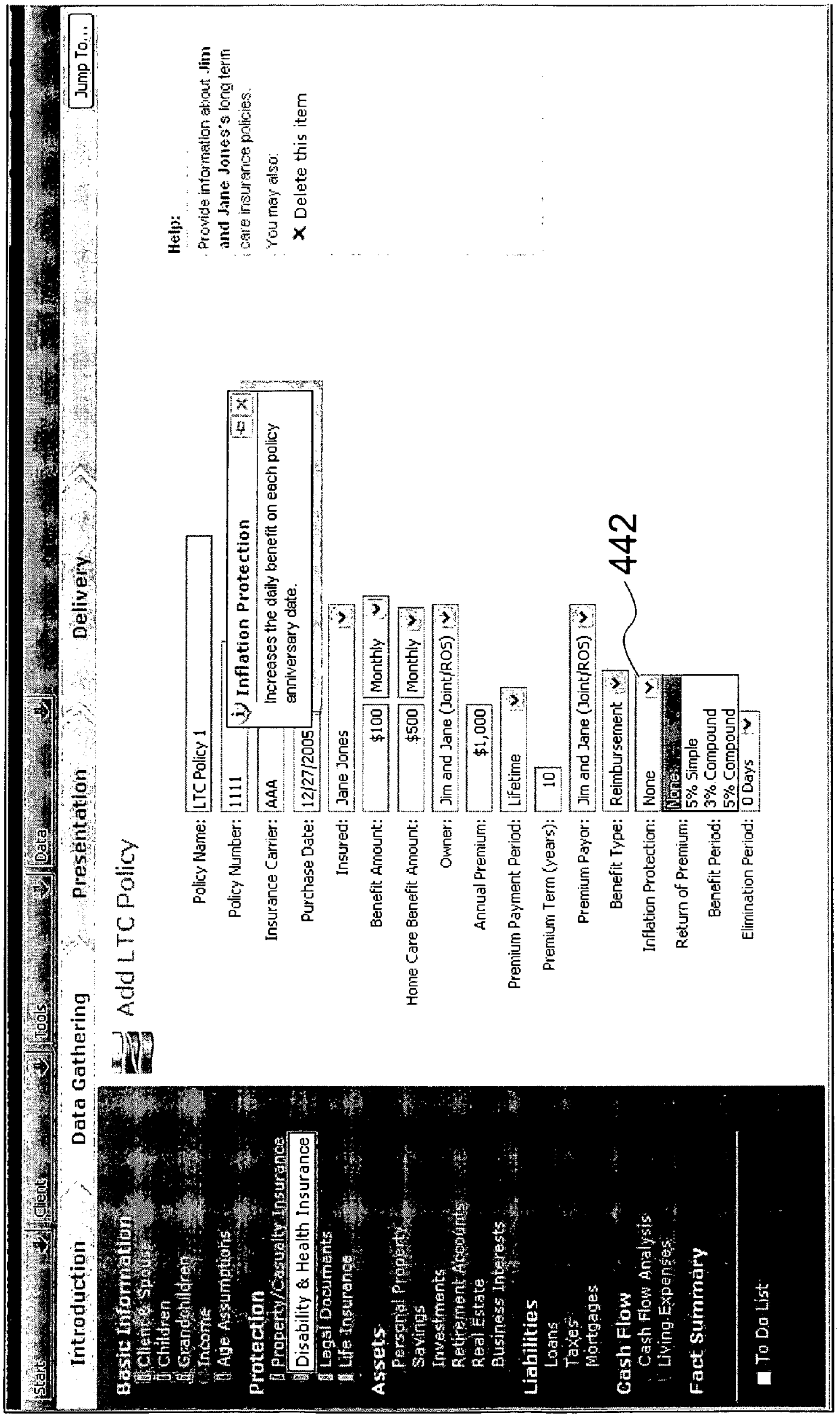
Figure 45:
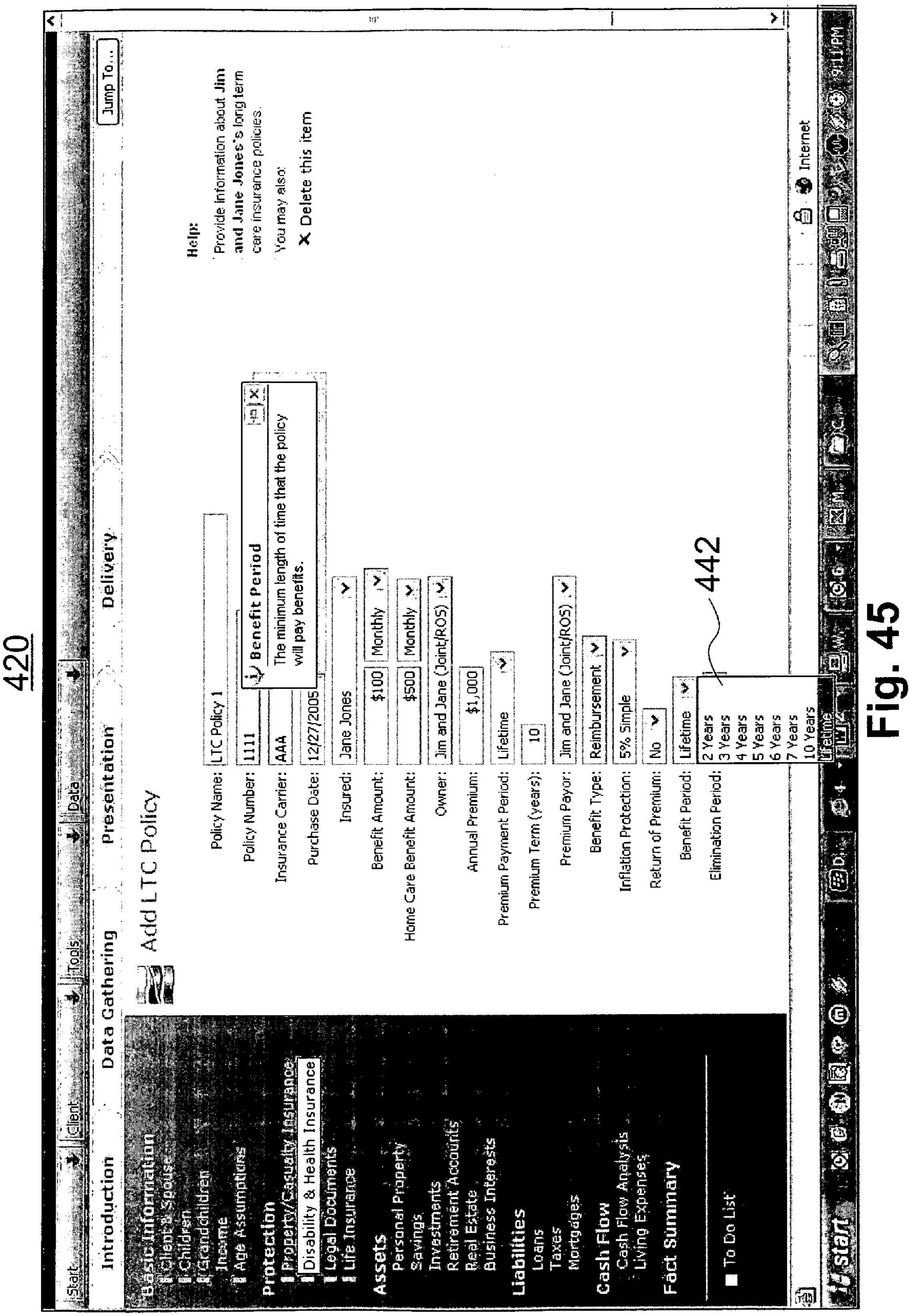
Figure 46:
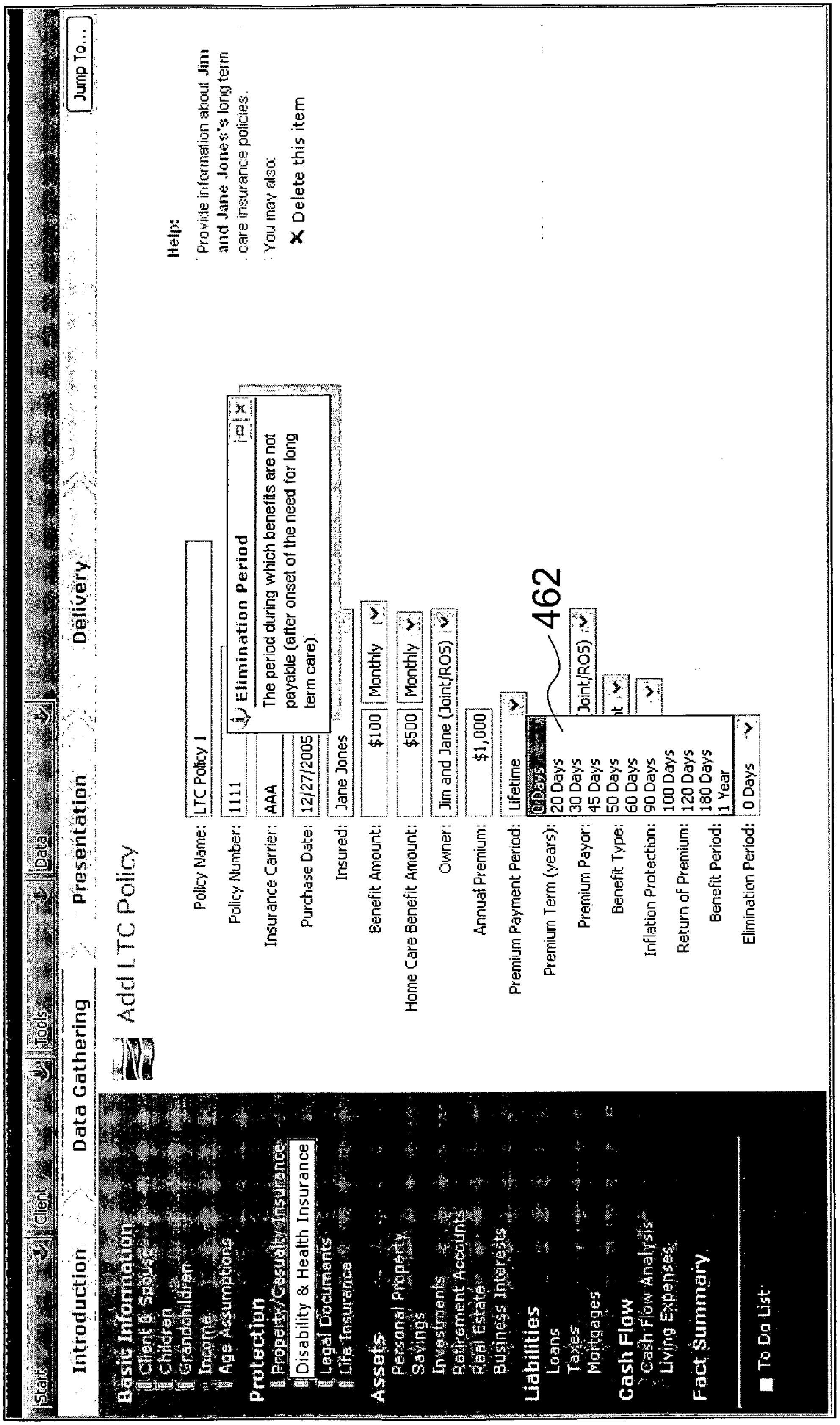
Figure 47:
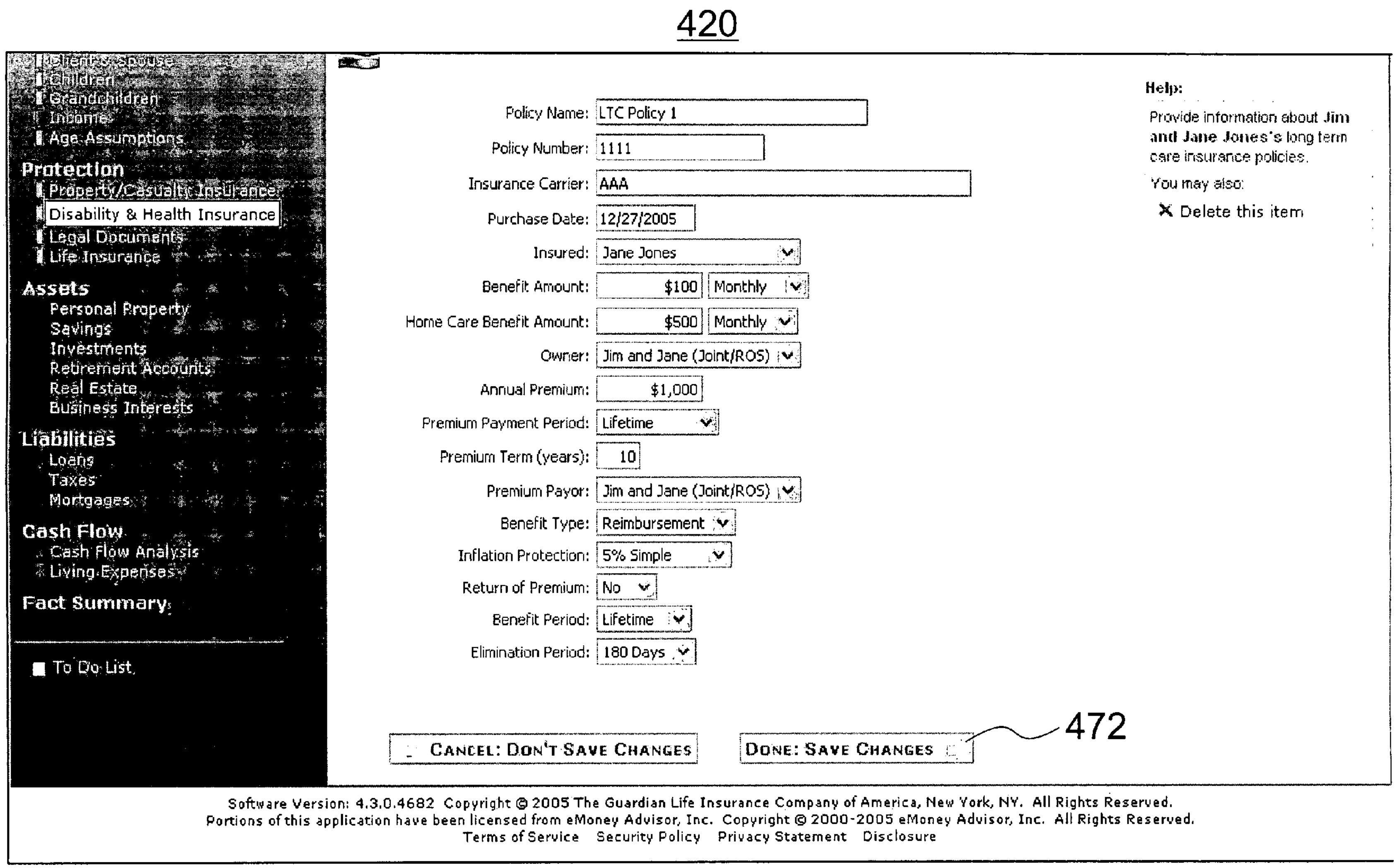
Figure 48:
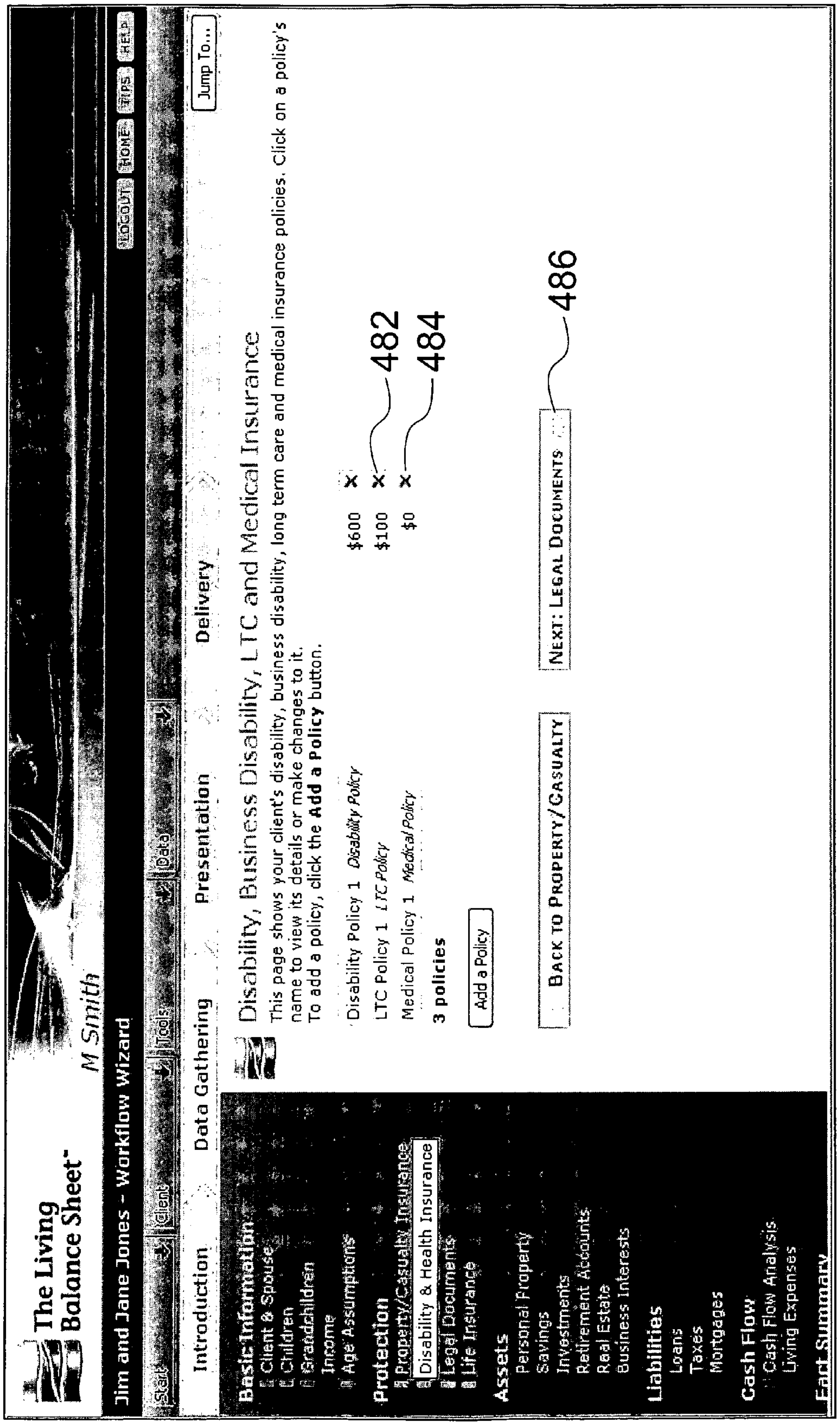
Figure 49:
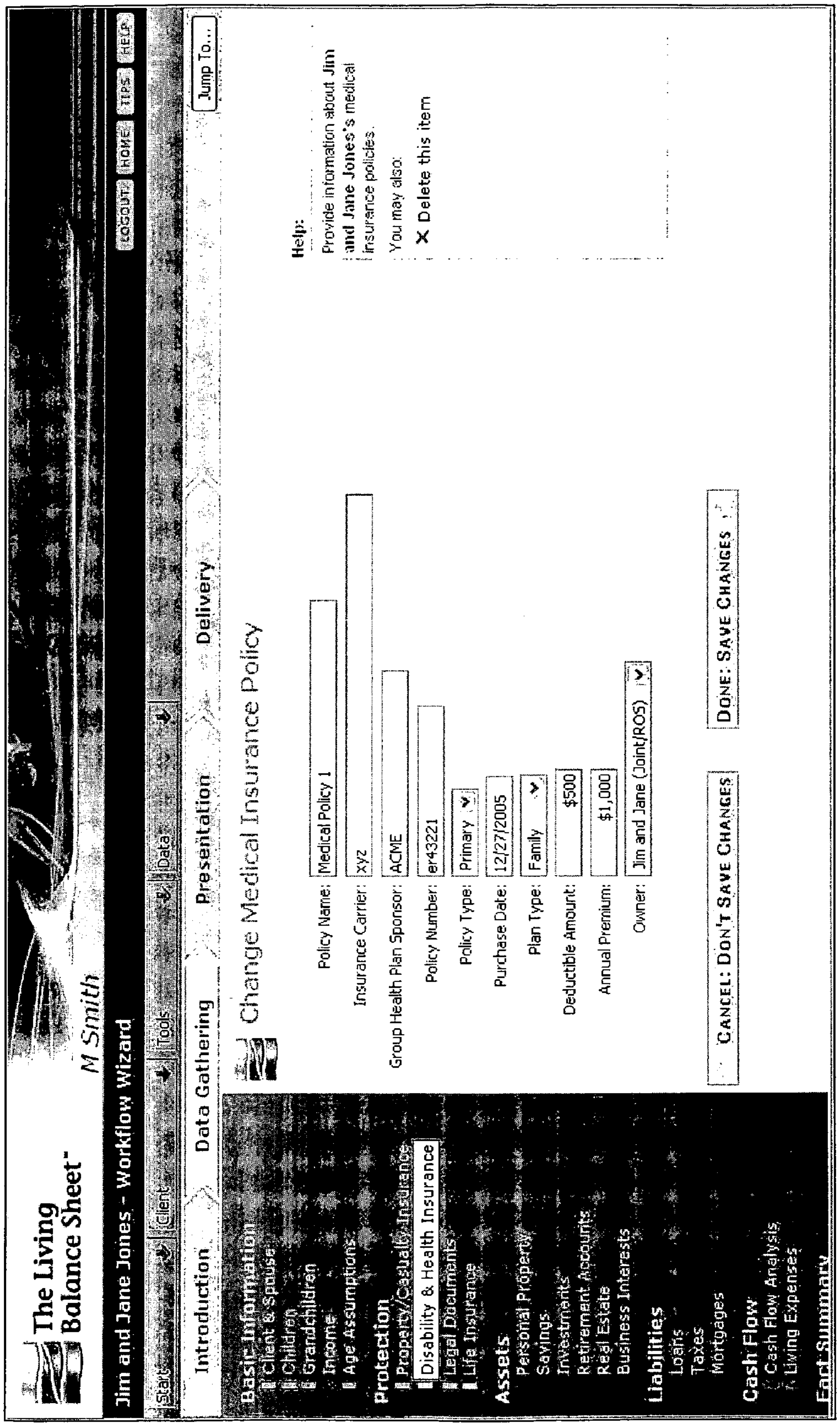

Add LTC policy display page 420 of FIGS. 42-47 can be displayed when a user takes the steps in the software for adding a long term care ("LTC") policy to the client information. Add LTC policy display page 420 provides the user with an opportunity to add an LTC policy of the client and related information to the client information. Display page 420 as shown includes data entry and pull-down menus for entering LTC related information such as policy name, policy number, insurance carrier, purchase date, insured, benefit amount (e.g., amount and periodic rate), home care benefit amount (e.g., amount and periodic rate), owner, annual premium, premium payment period, premium payer, benefit type, inflation protection, return of premium, benefit period, and elimination period. Preconfigured or dynamically configured pull-down menus can be used to assist in the interaction with display page 420. For example, premium payment period 422 can be configured to display certain choices for the duration of payments such as lifetime, 10 payments, 20 payments, or pay to 65. Another LTC related pull-down menu is benefit type menu 432 of FIG. 43. Menu 432 permits the user to enter the benefit type to be indemnity or reimbursement. Inflation protection menu 442 of FIG. 44 is another LTC related option that is provided to users. As shown, inflation protection menu 442 provides the user with the option to select from none, 5% simple, 3% compound, and 5% compound. Benefit period menu 452 of FIG. 45 provides the user with further functionality by providing the user to select the benefit period from a generated list of possible benefit periods (e.g., 2 years, 3 years, 4 years, years, 6 years, 7 years, 10 years, and lifetime). The user can also specify an elimination period using pull-down menu 462 of FIG. 46, which, as shown, provides the options of 0, 20, 30, 45, 50, 60, 90, 100, 120, or 180 days or 1 year. Done button 472 of FIG. 47 can be selected to save the entered information and return to the disability and health insurance display page such disability and health insurance display page 480 which now reflects the addition of LTC Policy 1 482 via display page 420 of FIGS. 42 to 47. Display page 480 also shows that a medical policy (medical policy 1 484) was previously added for the client. Change medical insurance policy display page 490 can be displayed when a user selects medical policy 1 484 of FIG. 48. Change medical insurance policy page 490 displays saved information relating to the client's "medical policy 1" and permits the user to update and change the saved information. Display page 490 provides the user with the opportunity to enter medical insurance policy related information for the client. For example, the user can enter or change a policy name, insurance carrier, group health plan sponsor, policy number, purchase date, plan type, deductible amount, annual premium, and owner. An add medical insurance policy display page having the same functionality and structure was preferably used to initially add the policy to the client's information.

Figure 50:
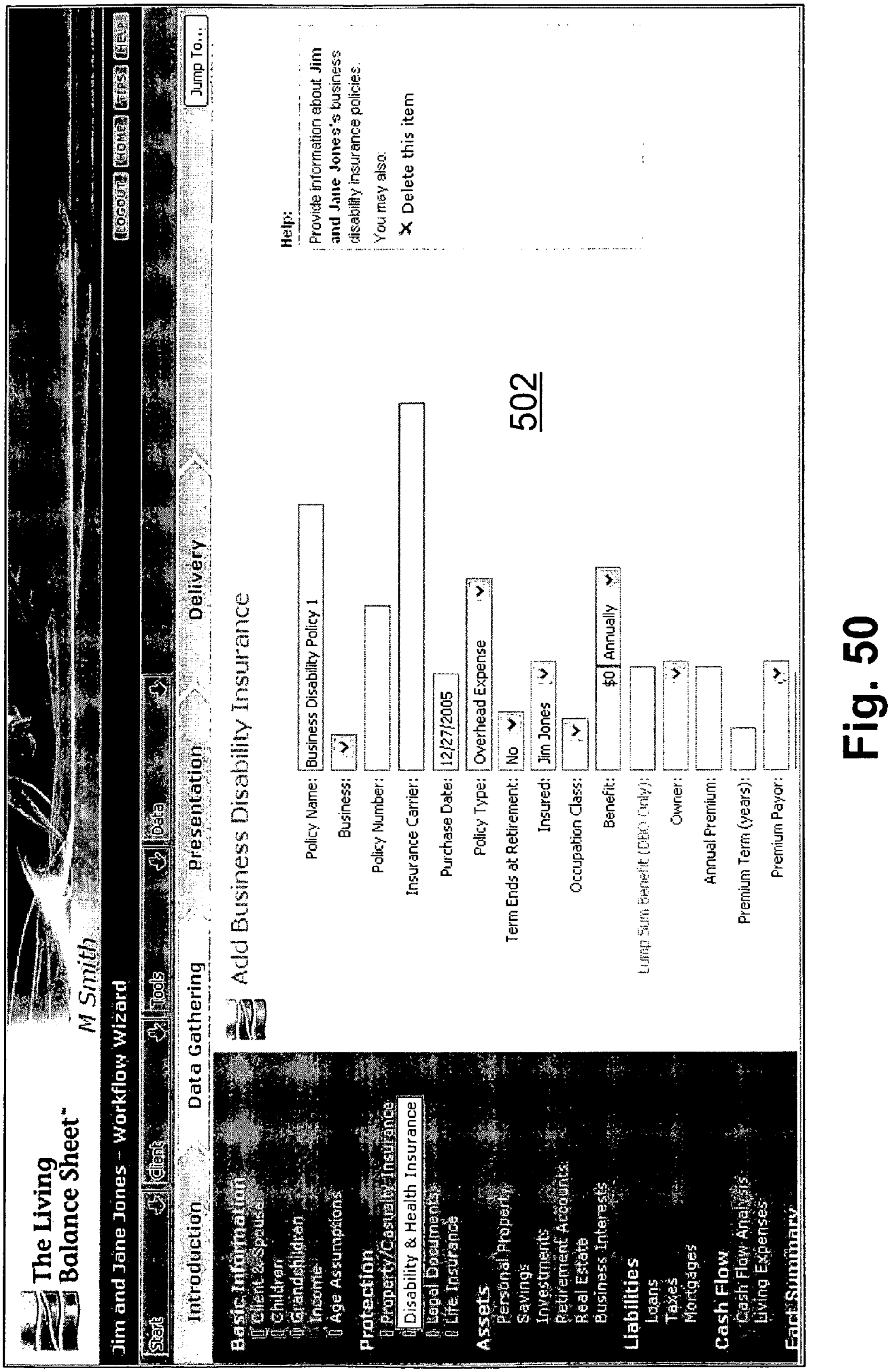
Figure 51:
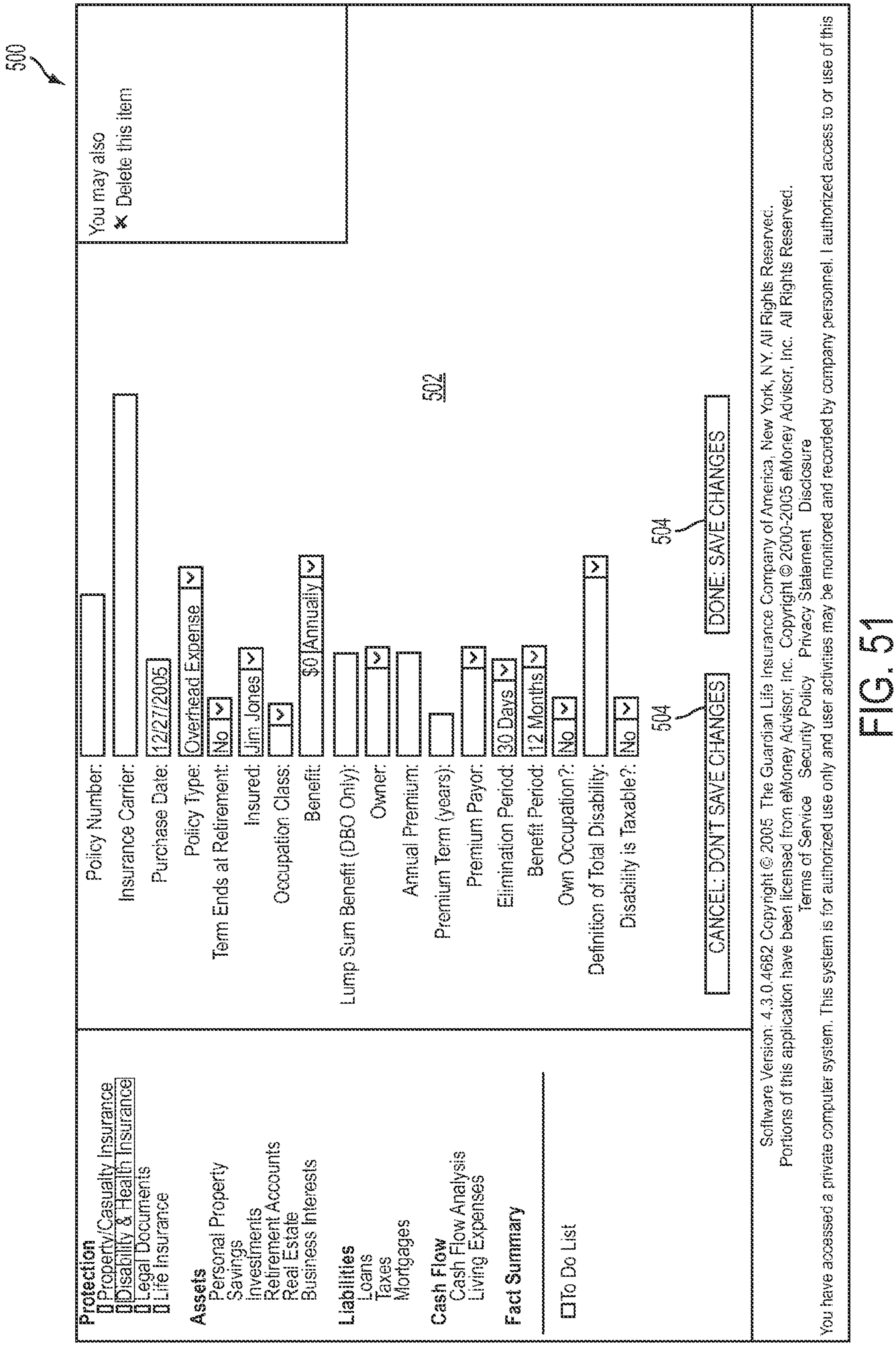
Figure 52:
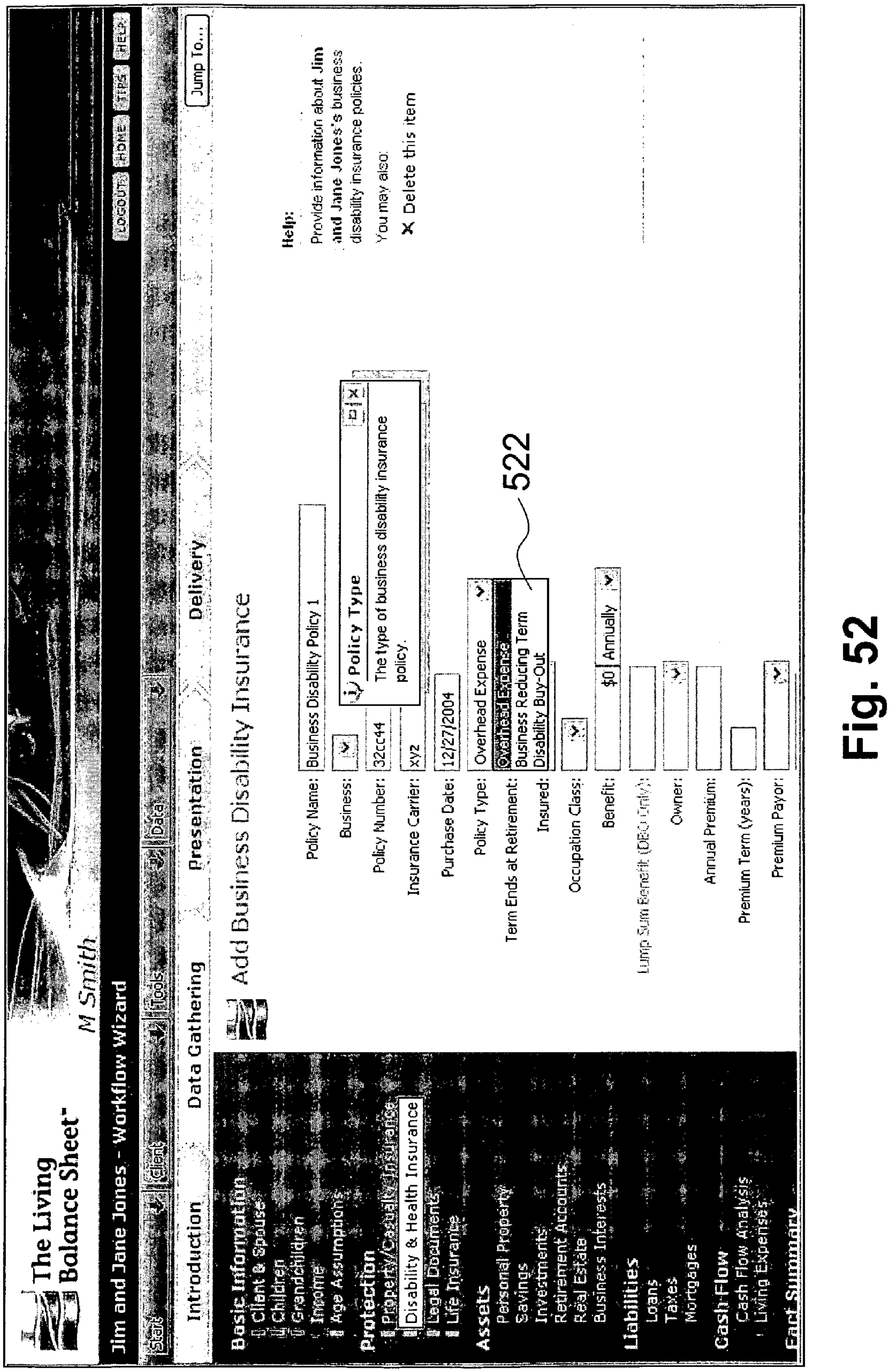
Figure 53:
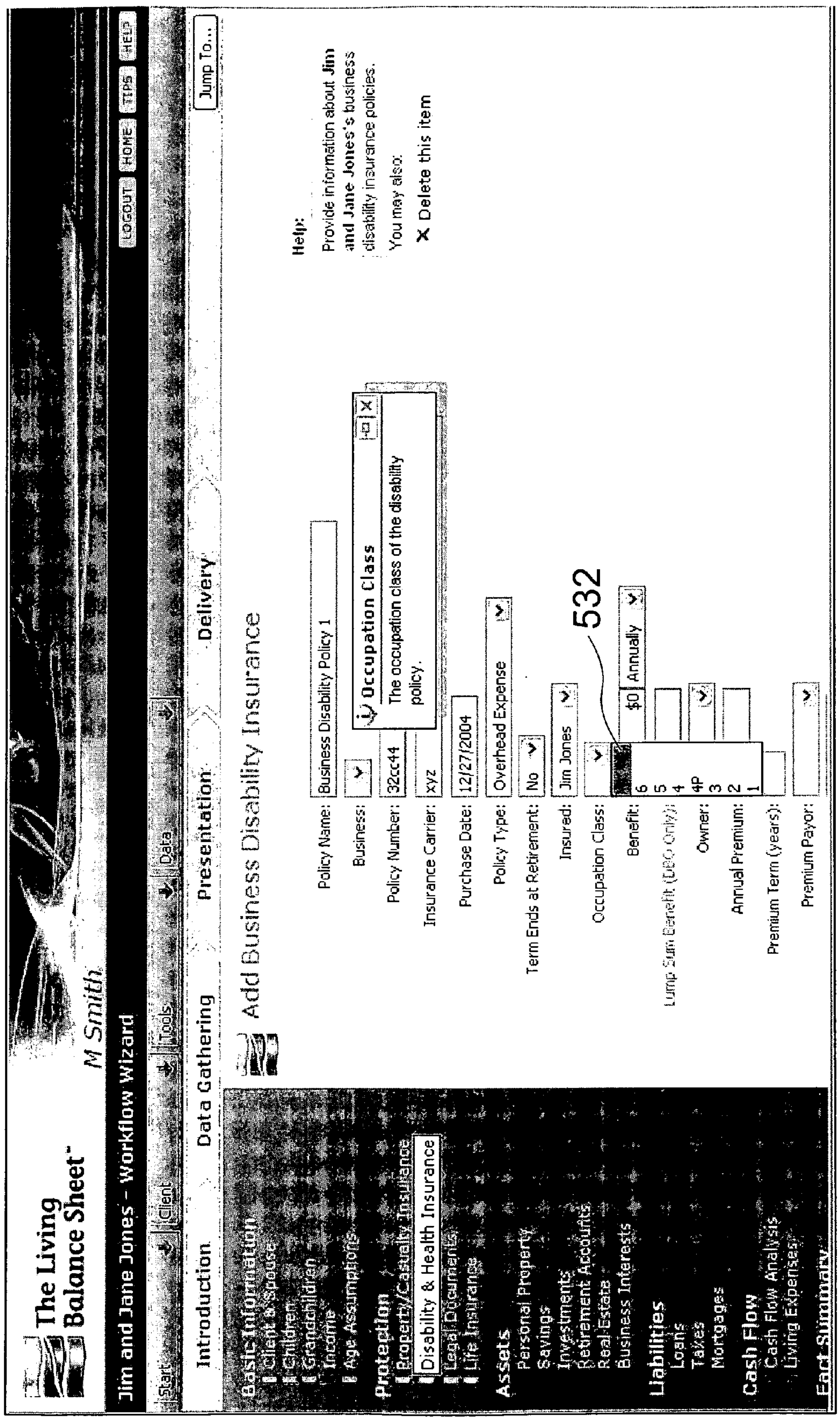
Figure 54:
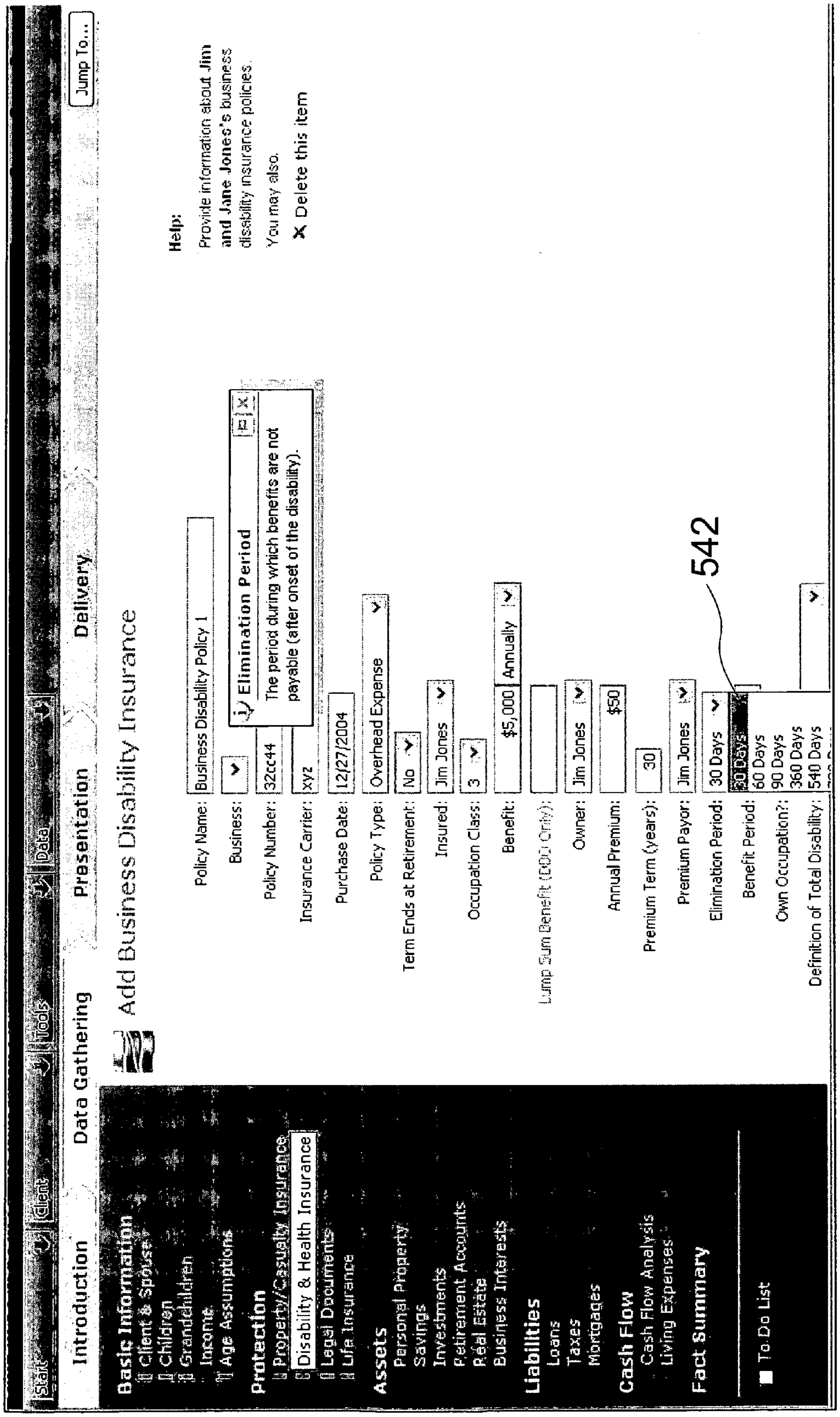
Figure 55:
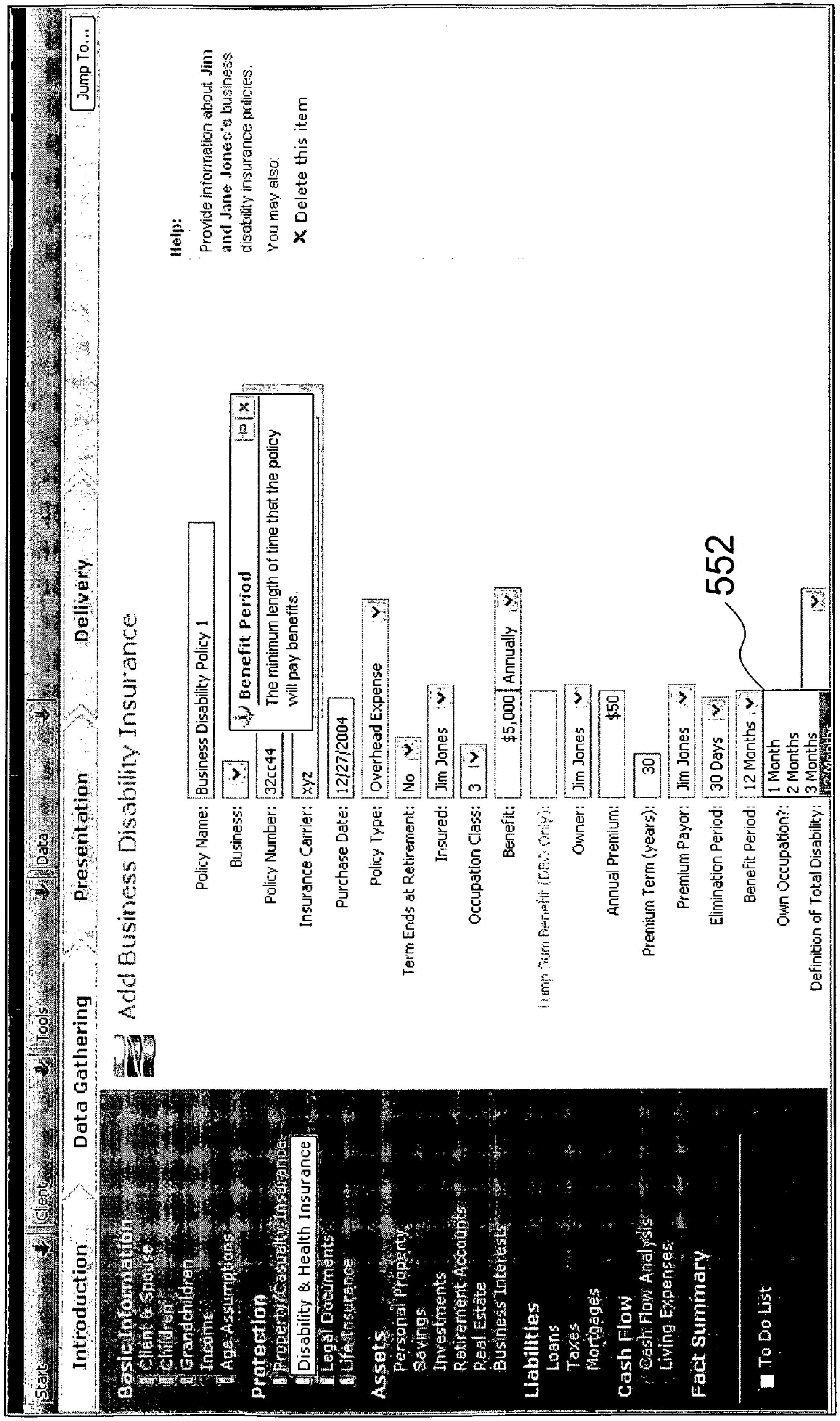

A user may also add one or more business disability insurance policies of the client. For example, add business disability insurance display page 500 of FIGS. 50 and 51 can be displayed when a user selects to add a business disability insurance policy by selecting a corresponding option in choose type display page 370 of FIG. 37. Display page 500 includes a data entry section 502 for entering information related to a business disability policy of the client. Cancel and done buttons 504 are also included in display page 500. Data entry section 502 provides the user with the opportunity to enter a policy name (which may have been automatically populated by the software with some default name), business, policy number, insurance carrier, purchase date, policy type, whether the term ends at retirement, insured, occupation class, benefit (e.g., amount and frequency), lump sum payment, owner, annual premium, premium term, premium payer, elimination period, benefit period, own occupation, definition of total disability, and whether the disability is taxable.

FIGS. 52-55 show a sequence of data entry in add business disability insurance display page 500. For example, a user can use policy type pull-down menu 522 to select the policy type of the policy to be overhead expense, business reducing term, or disability buy-out. A user can use occupation class pull-down menu 532 to select the occupation class of the disability policy, which as shown can be 1, 2, 3, 4, 4P, 5, and 6. Elimination period pull-down menu 542 can be used to select the elimination period of the policy such as to select 30, 60, 90, 260, 540 or 720 days. Benefit period pull-down menu 552 can be used to select the minimum length of time that the policy will pay benefits, which as shown can be 1, 2, 3, 12, 24, and 36 months.

Figure 57:
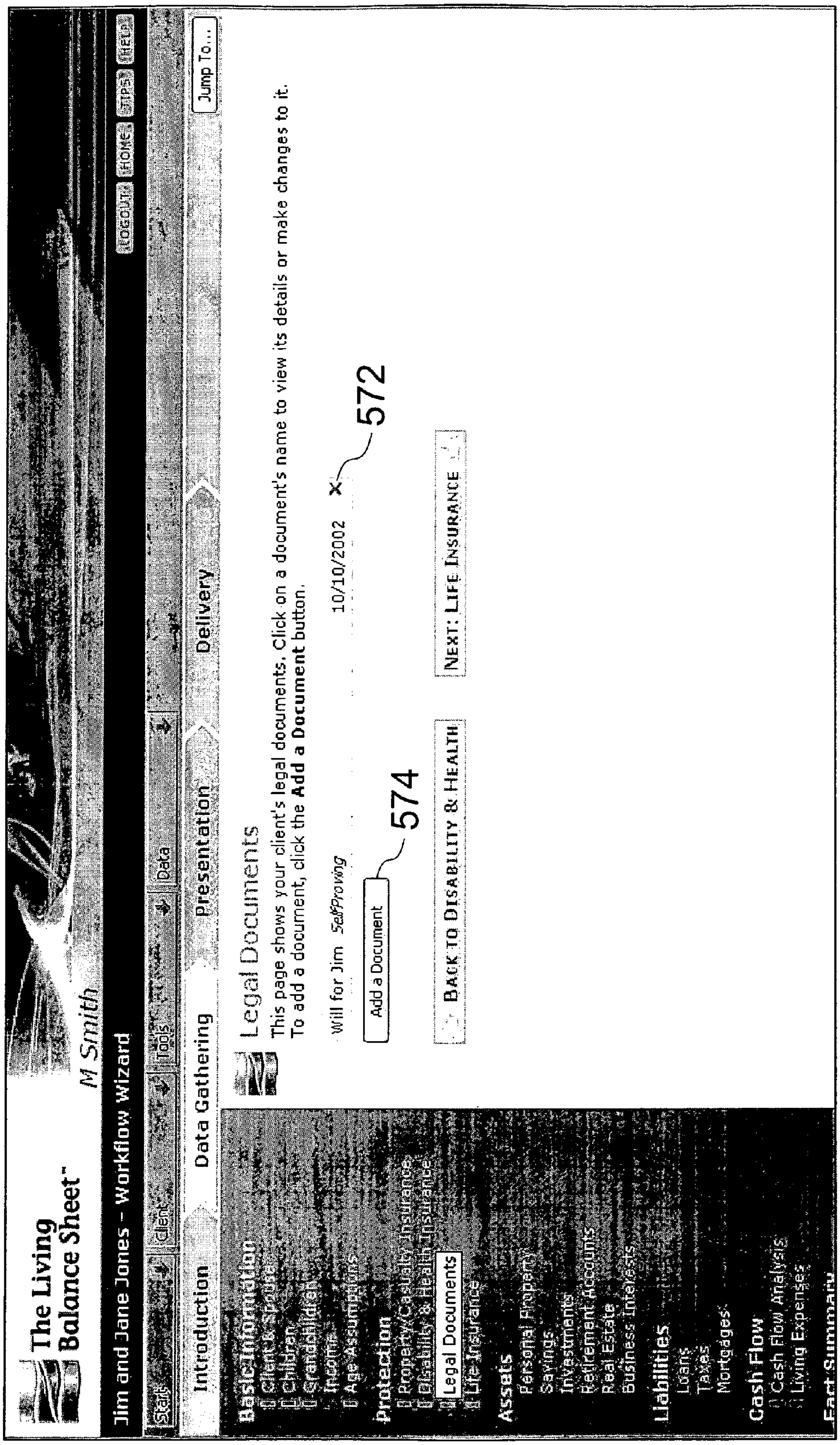

The next subsection in the protection section of the workflow wizard, as shown, is the legal documents section. For example, when a user selects next button 486 of FIG. 48, legal documents display page 560 can be displayed. Legal documents display page 560 can provide the user with the opportunity to add one or more legal documents and to display a summary of already added legal documents. For example, as shown in FIG. 57, legal documents display page 570 includes a summary including selectable summary item 572 for a legal document that a user previously added using for example add comment button 574. The summary item can include the name of the document and information related to the documents such as whether a will is self proving. Each item in the summary can be used to select a legal document and to change and update the related information for that document.

Figure 58:
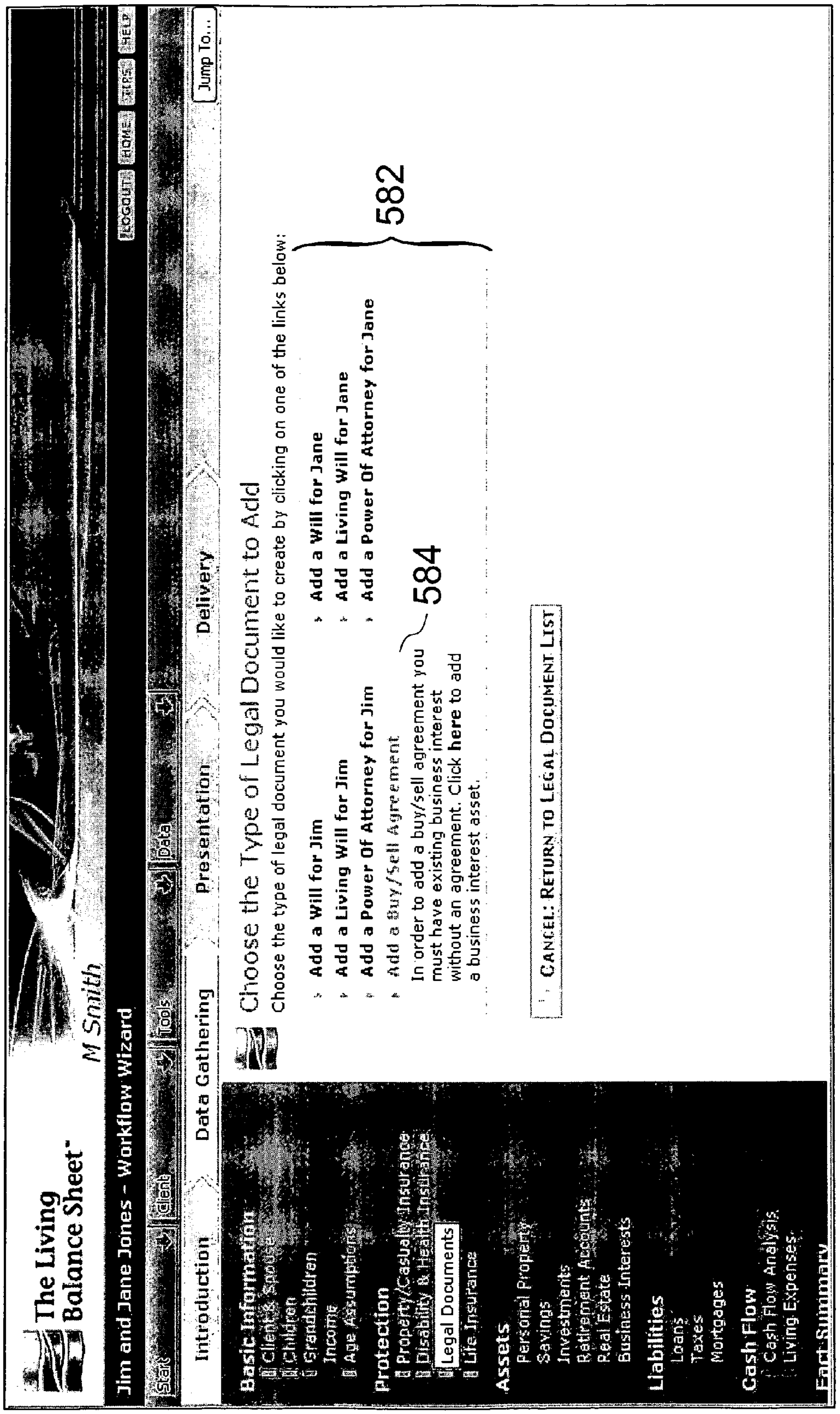

Type of legal document display page 580 of FIG. 58 can be displayed when a user, for example, selects add a document button 574 of FIG. 57. Display page 580 includes options 582 for selecting different types of legal documents (e.g., a will, a living will, a power of attorney, an agreement, etc.). The options can be automatically customized for the client such that for example there would be specific options listed for the client (e.g., add a will for Jim) and for the spouse (e.g., add a will for Jane). Note that the option for adding a buy/sell agreement requires that the client information already reflect an existing business interest. As such, add agreement option 584 includes a link for adding a business interest so that option 584 can be used.

Figure 59:
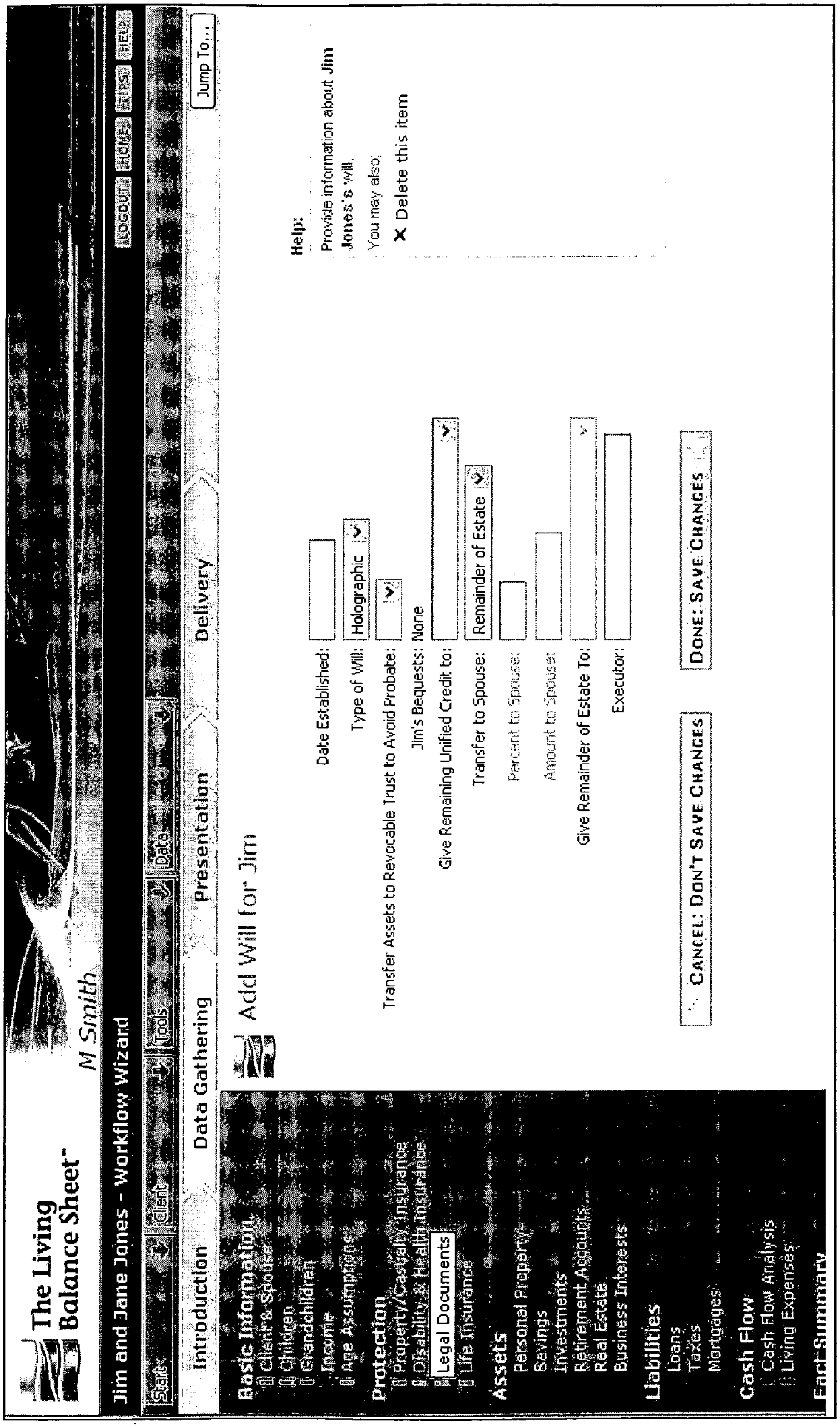
Figure 60:
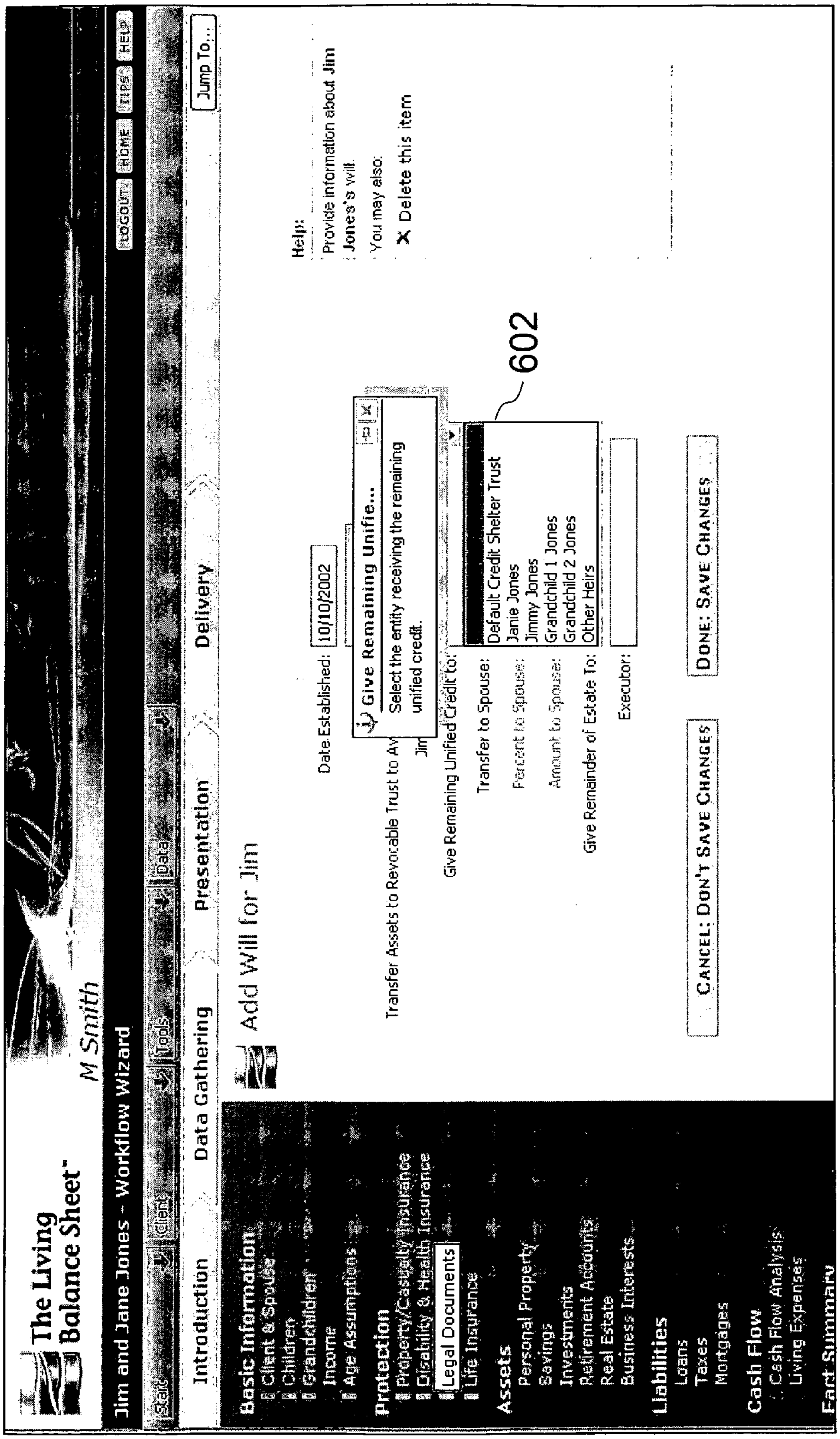
Figure 61:
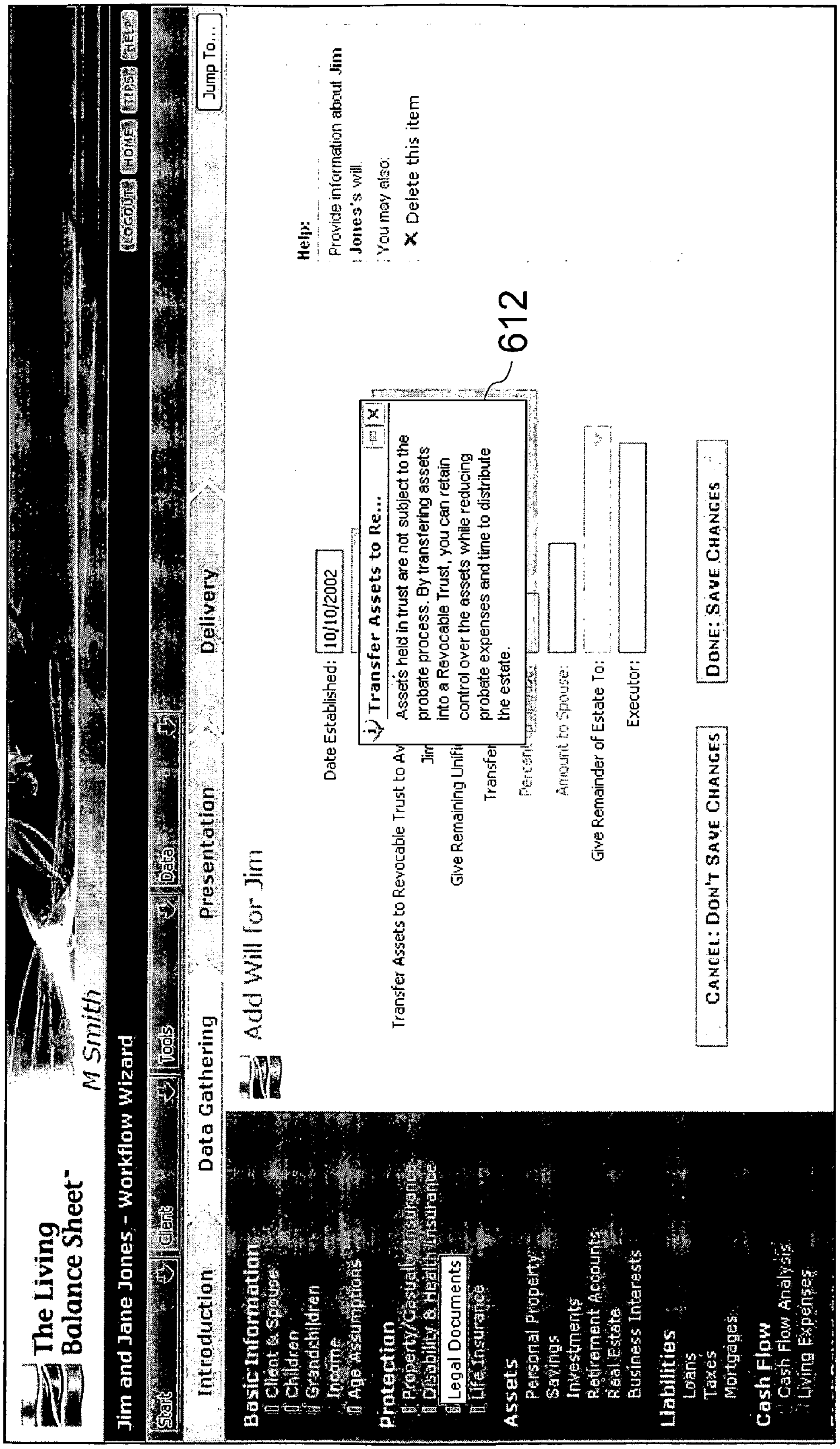

Add will for client display page 590 of FIGS. 59-61 can be displayed when a user selects the option of adding a will for the current client ("Jim") from option 582 of FIG. 58. Display page 590 includes data entry fields and menus for the client's will related information such as data established, type of will, whether it includes a transfer of assets to an irrevocable trust, the client's bequests, identifying who to give the remaining unified credit, identifying of what is to be transferred to spouse (e.g., remainder, percentage, amount), who to give the remainder of the estate to, and the executor. For example, a user can select pull-down menu 602 to select the entity that is to receive the remaining unified credit such as by selecting, as shown, a default credit shelter trust, the spouse, individual children or grandchildren, or other heirs. As previously discussed, pop-up tips such as tip 612 can be automatically displayed to educate and assist the user in the data entry process. As shown, tip 612 clarifies the meaning of the data entry option for transferring assets to a revocable trust.

Figure 62:
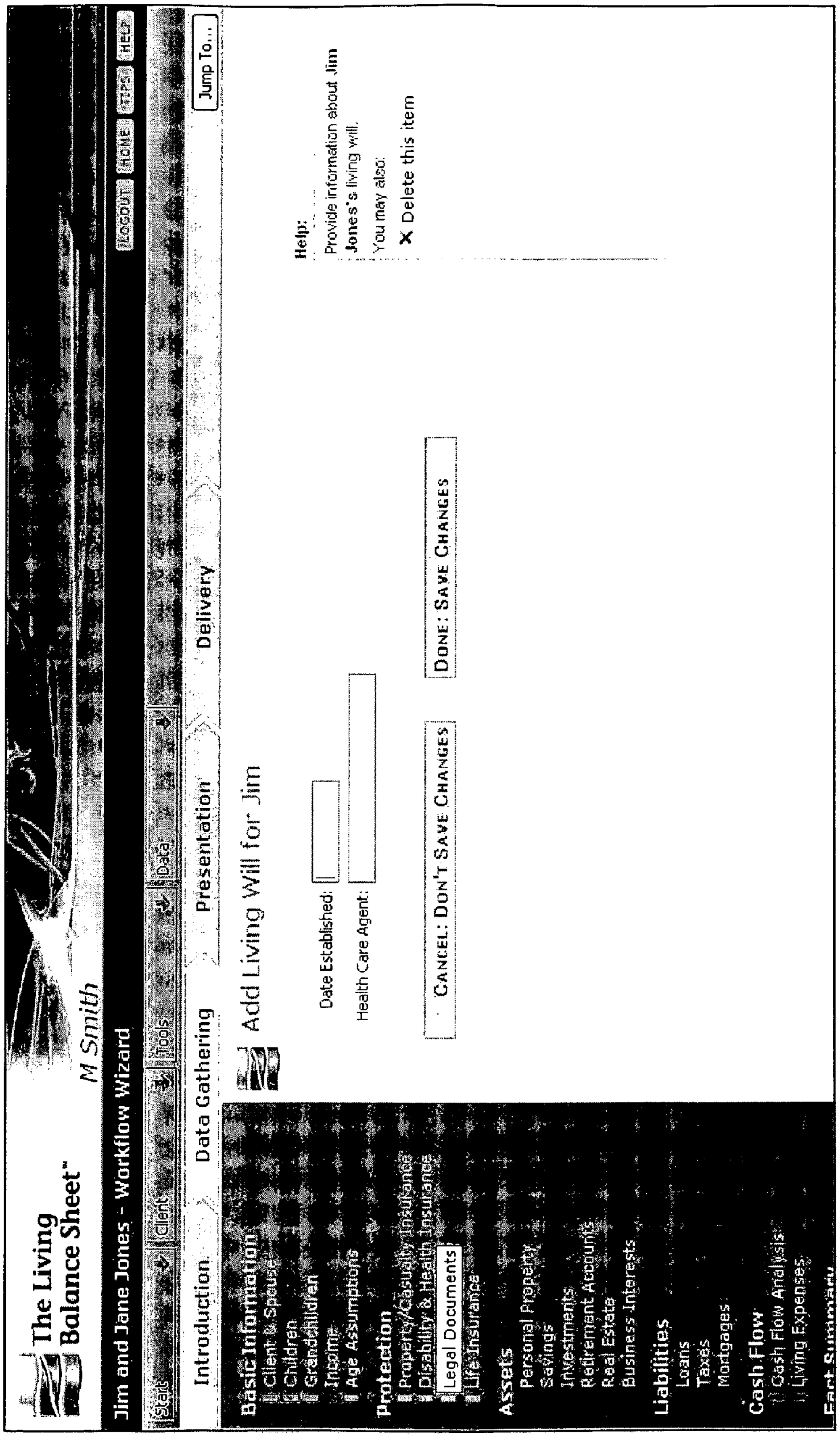
Figure 63:
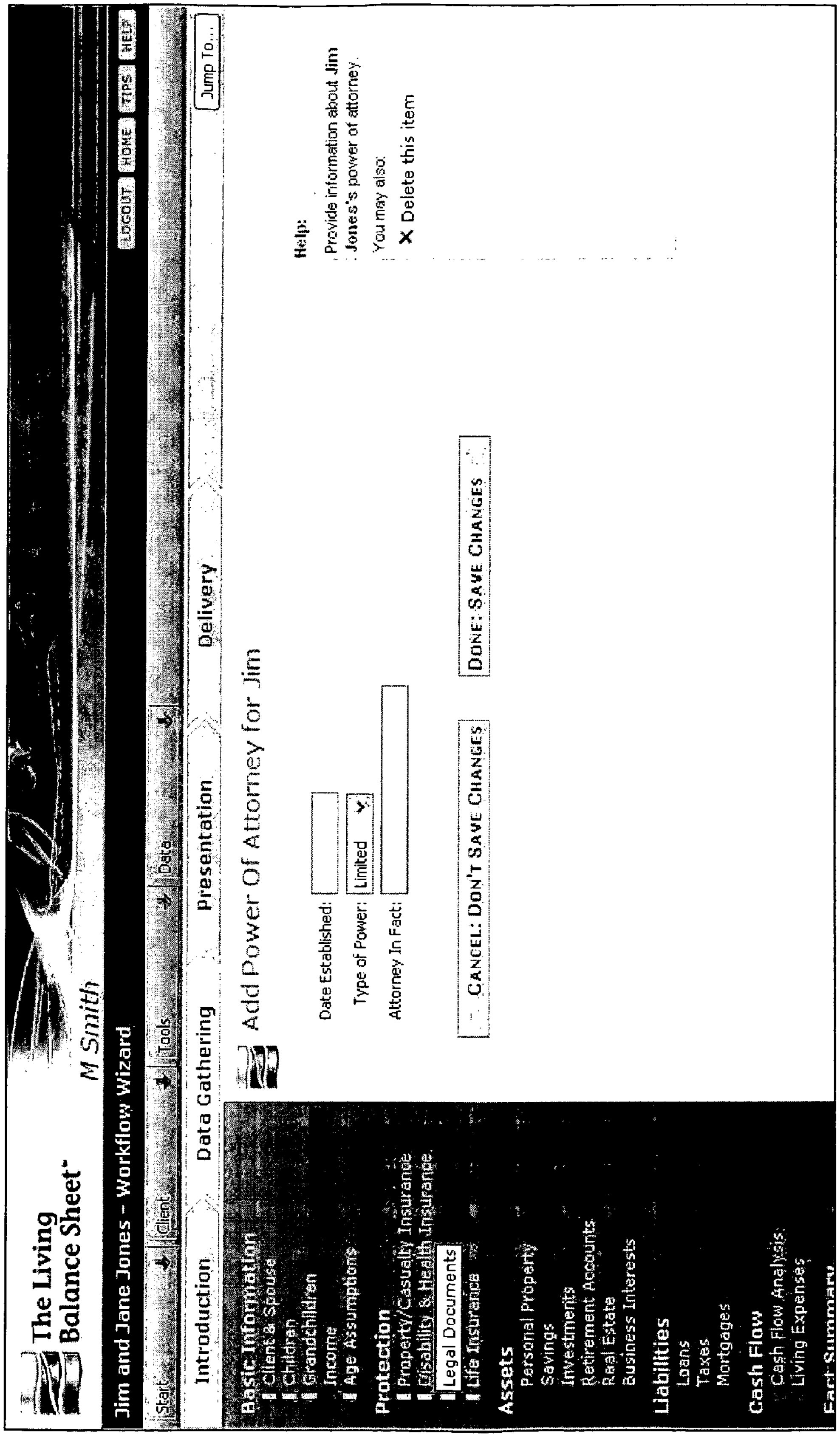
Figure 64:
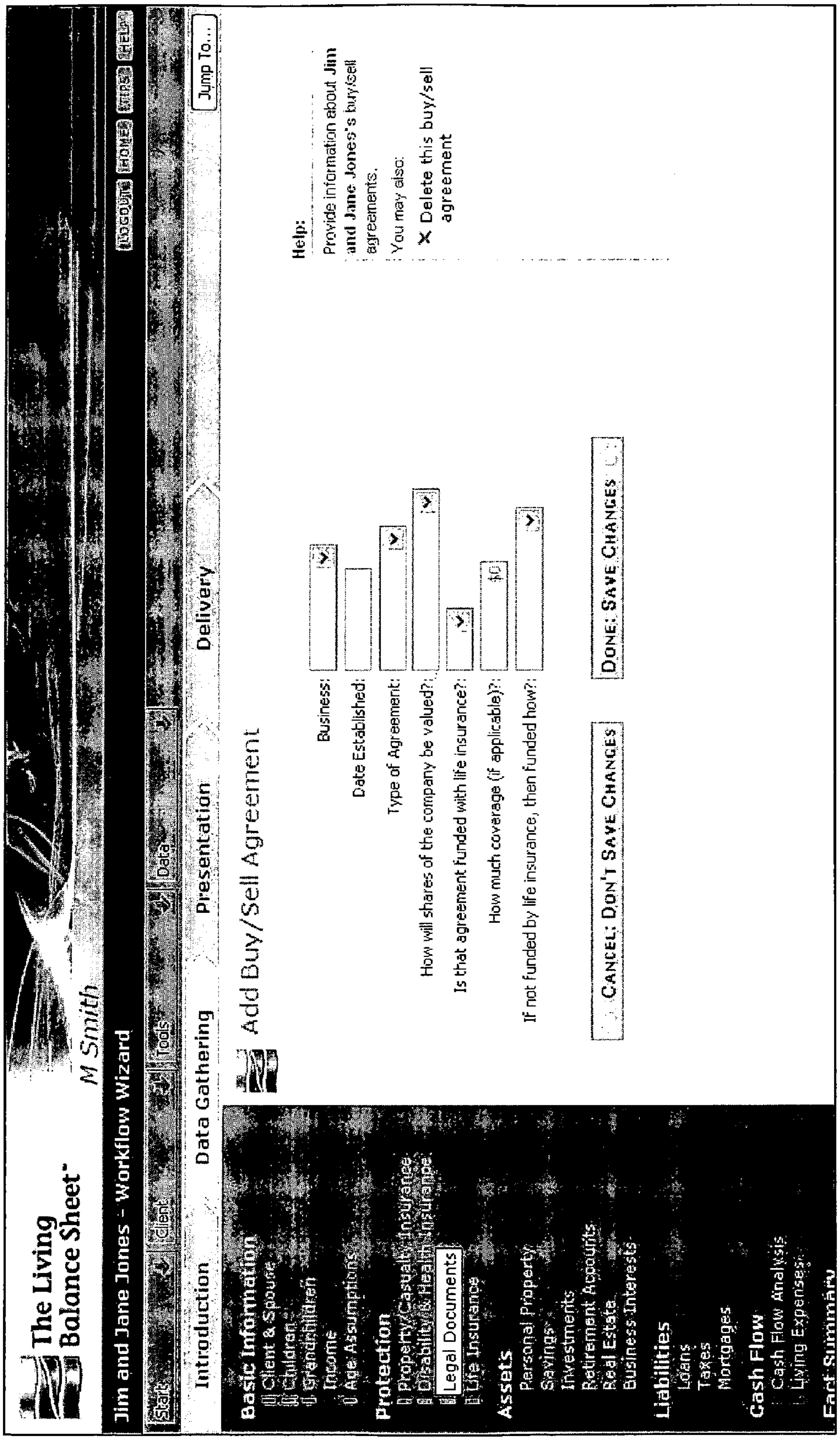

Add living will for client display page 620 of FIG. 62 can be displayed when a user selects that option from display page 580 of FIG. 58. Display page 620 can be used to enter living will related information for the client such as the date established and the health care agent. Add power of attorney for client display page 630 of FIG. 63 can be displayed when a user selects that option from display page 580 of FIG. 58. Display page 630 can be used to enter power of attorney related information for the client such as the date established, type of power, and attorney in fact. Add buy/sell agreement display page 640 of FIG. 64 can be displayed when a user selects that option from display page 580 of FIG. 58. Display page 640 can be used to enter buy/sell business agreement related information for the client such as the business, date established, type of agreement, how will shares of company be valued, is the agreement funded with life insurance, the coverage (if applicable), and how funded.

Figure 56:
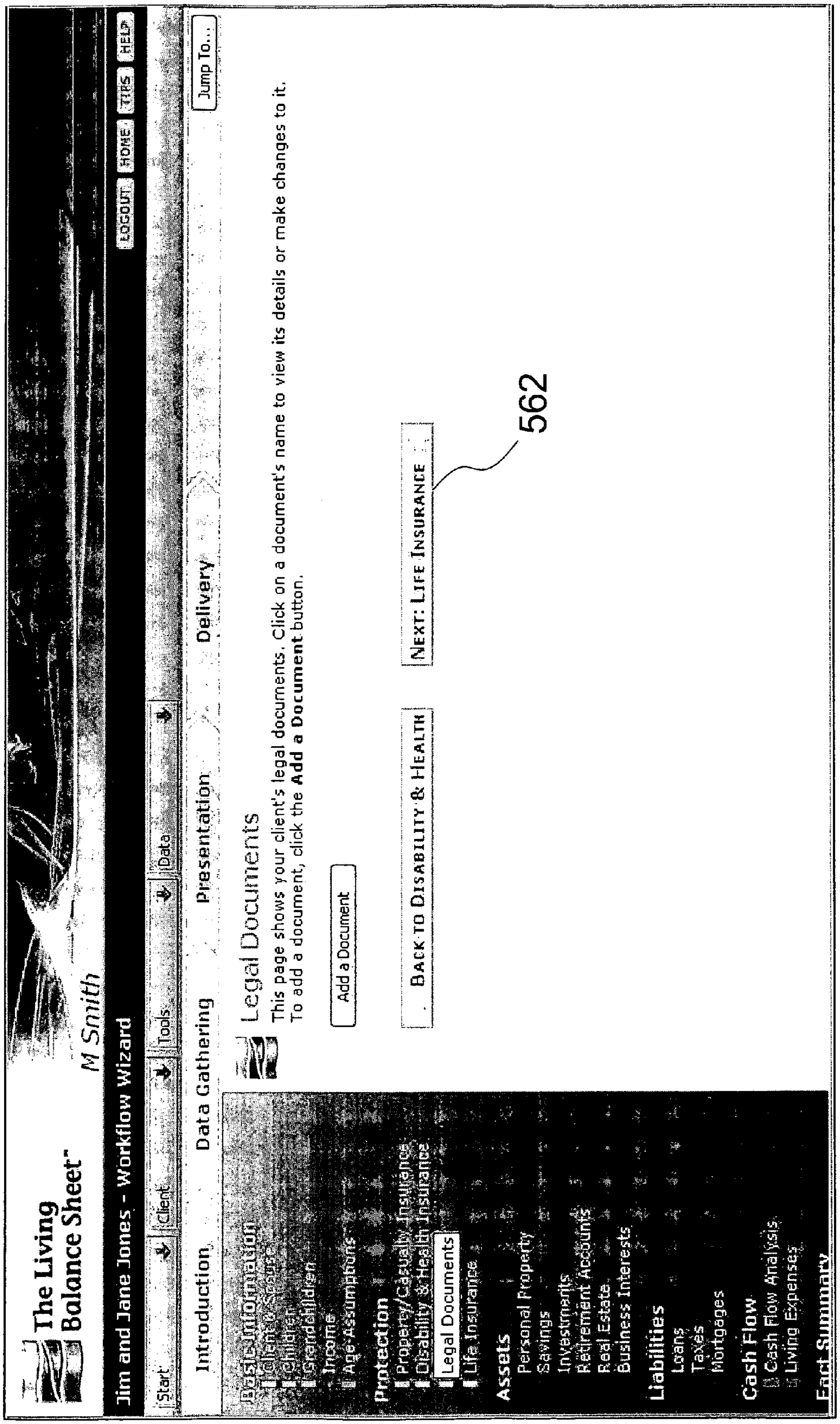
Figure 65:
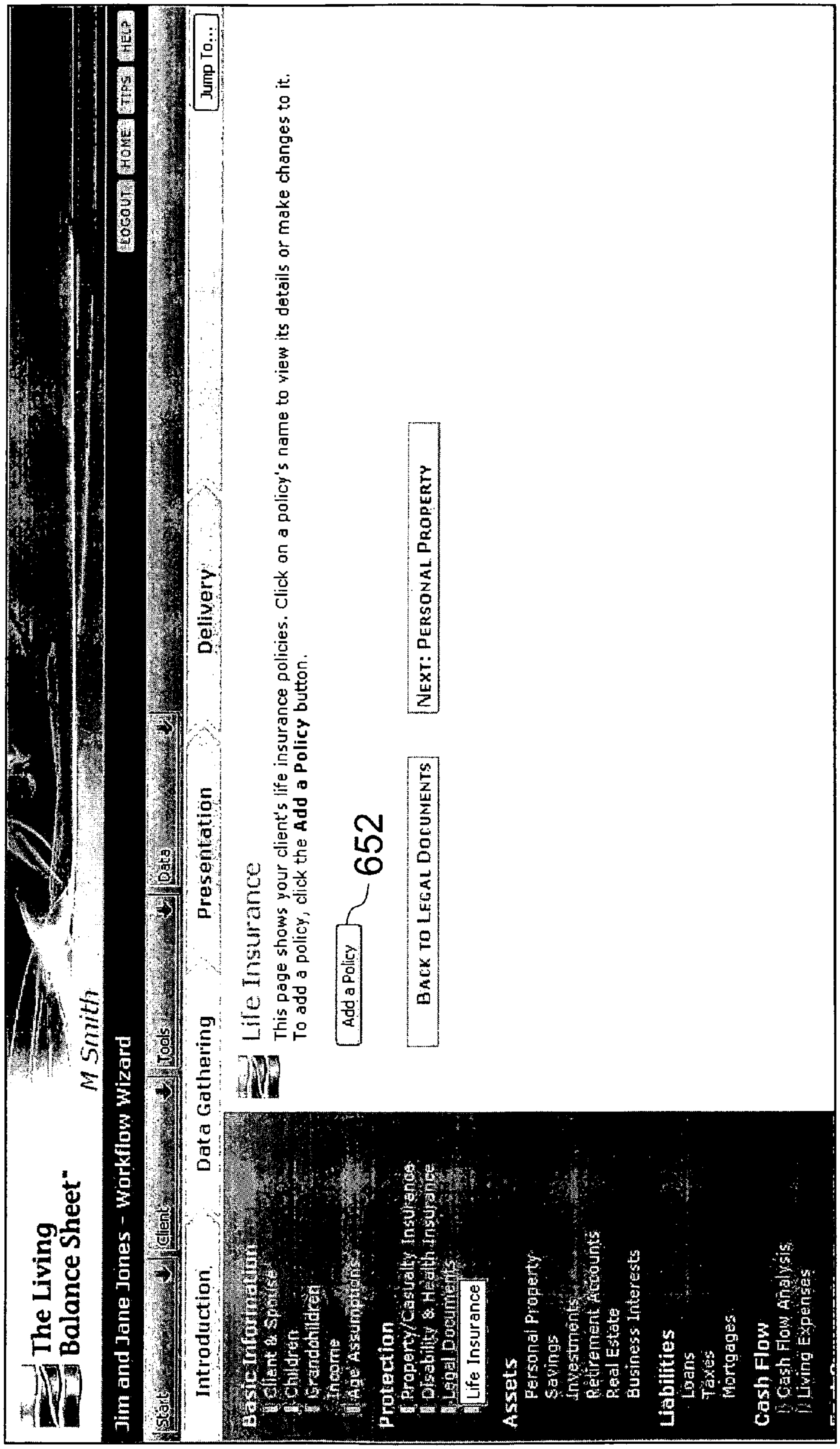
Figure 66:
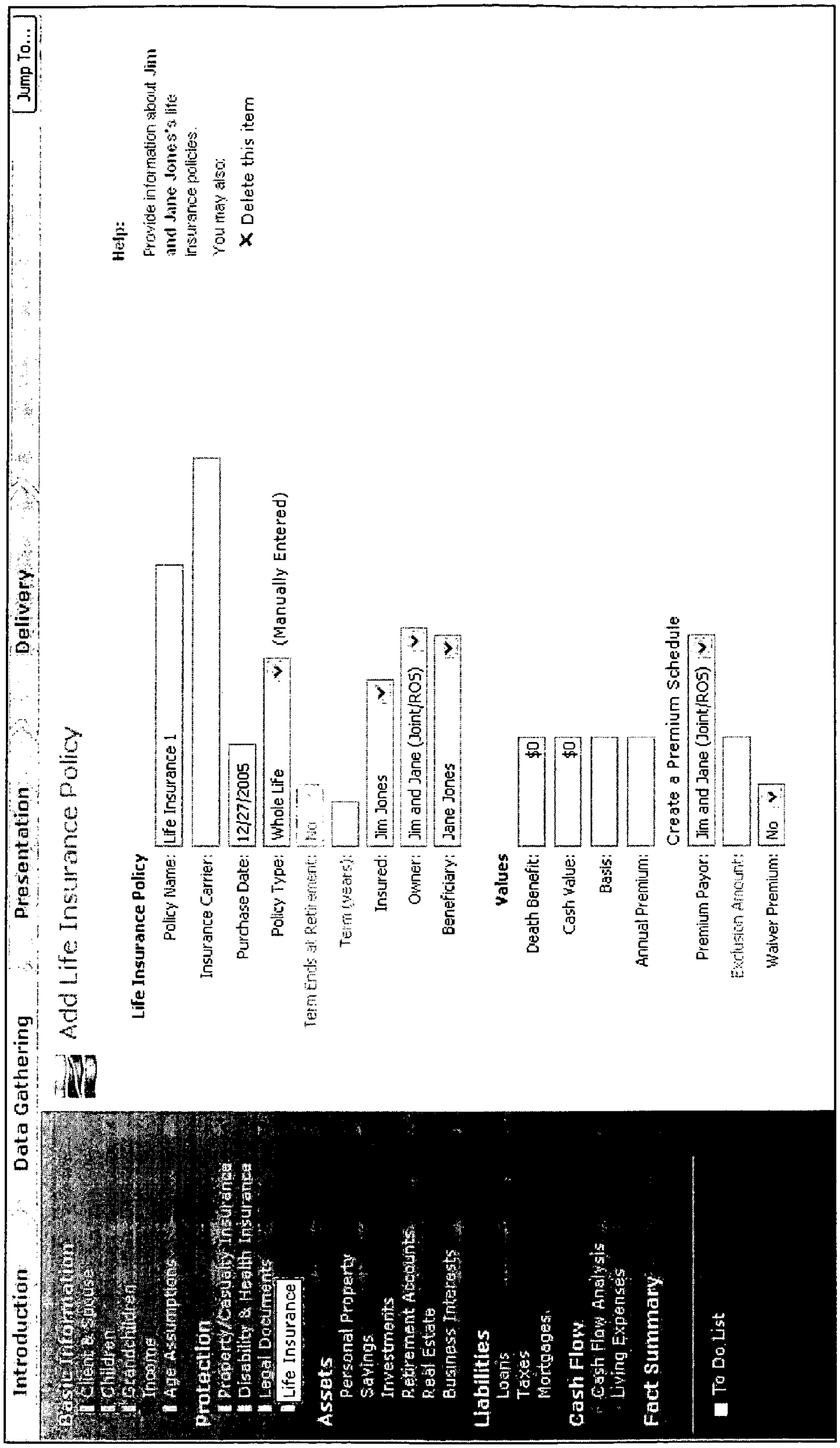
Figure 67:
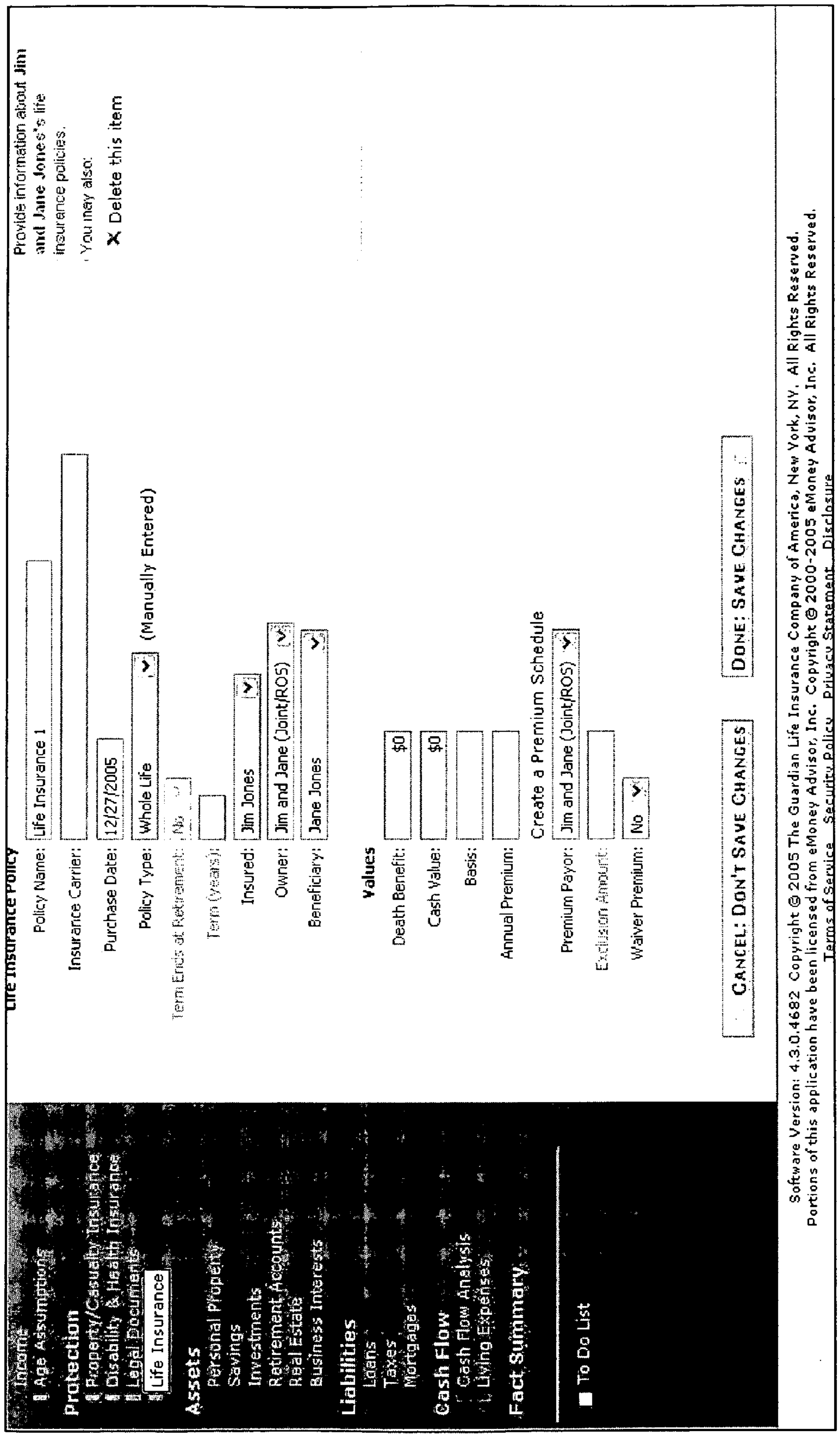
Figure 68:
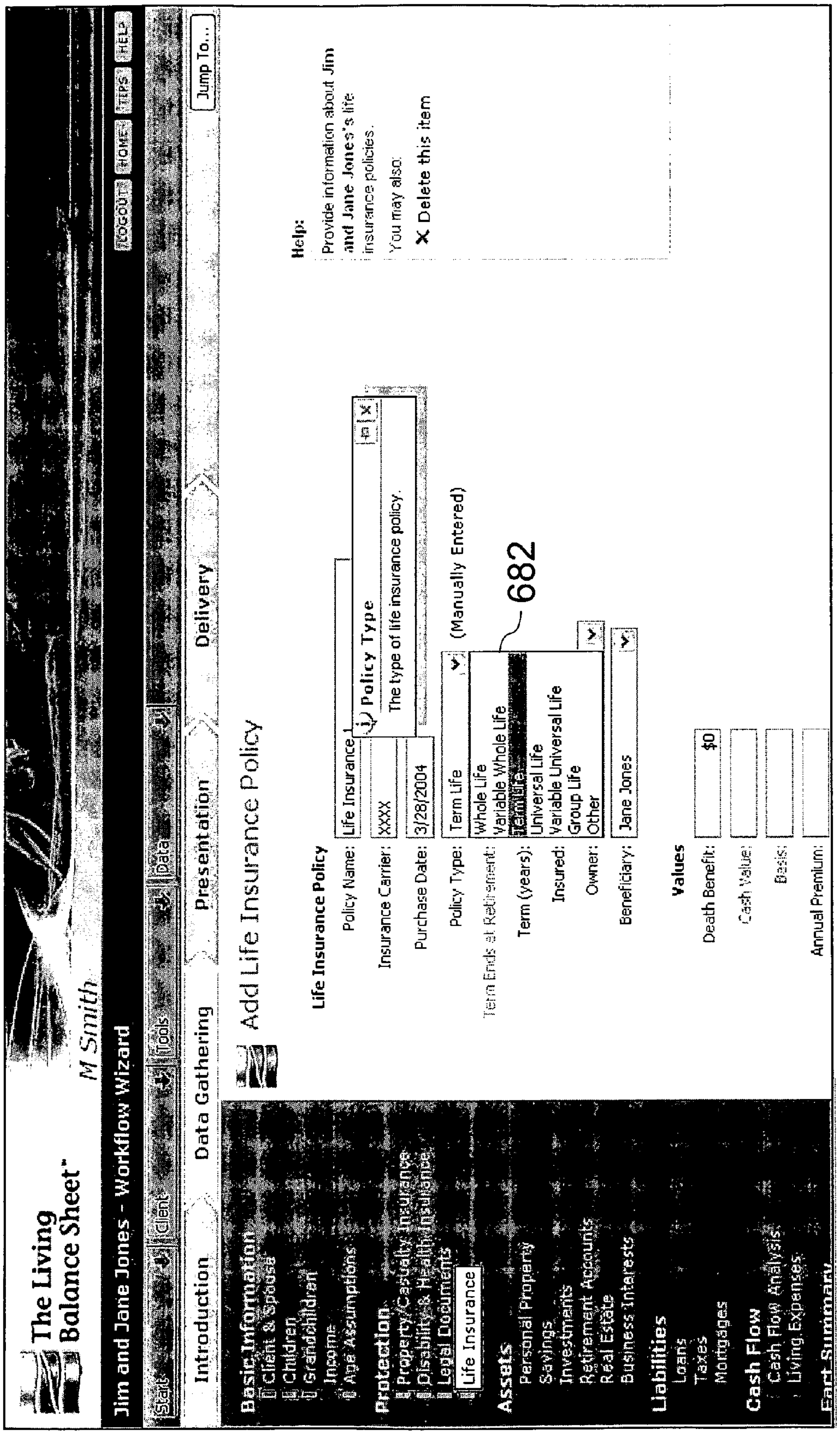

The next subsection in the protection section of the workflow wizard, as shown, is the life insurance section. For example, when a user selects next button 562 of FIG. 56, life insurance display page 650 of FIG. 65 can be displayed. Life insurance display page 650 can provide the user with the opportunity to add one or more life insurance policies and to display a summary of any already added insurance policies. Add life insurance policy display page 660 of FIGS. 66-68 can be displayed when a user selects add a policy button 652 of FIG. 65. Add life insurance policy display page 660 provides the user with an opportunity to enter life insurance policy related information for a client. For example, as shown, display page 660 can include data entry fields and options for entering a policy name, insurance carrier, purchase date, policy type, term ends at retirement (if applicable), term, insured, owner, beneficiary, death benefit, cash value, basis, annual premium, premium payer, exclusion amount, and premium waiver. The menu options can include policy type 682 of FIG. 68 that allows the user to select the policy type to be whole life, variable whole life, term life, universal life, variable universal life, group life, and other. When the user saves the entered information, the life insurance display page can be displayed such as display page 690 of FIG. 69, which now reflects the addition of the life insurance policy 692 that was accomplished using add life insurance display page 660 of FIGS. 66-68. Summary item 692 includes details with respect to the insurance such as the policy type and death benefit. A user can select item 692 to access a change display page to update or change the items of saved information.

Figure 69:
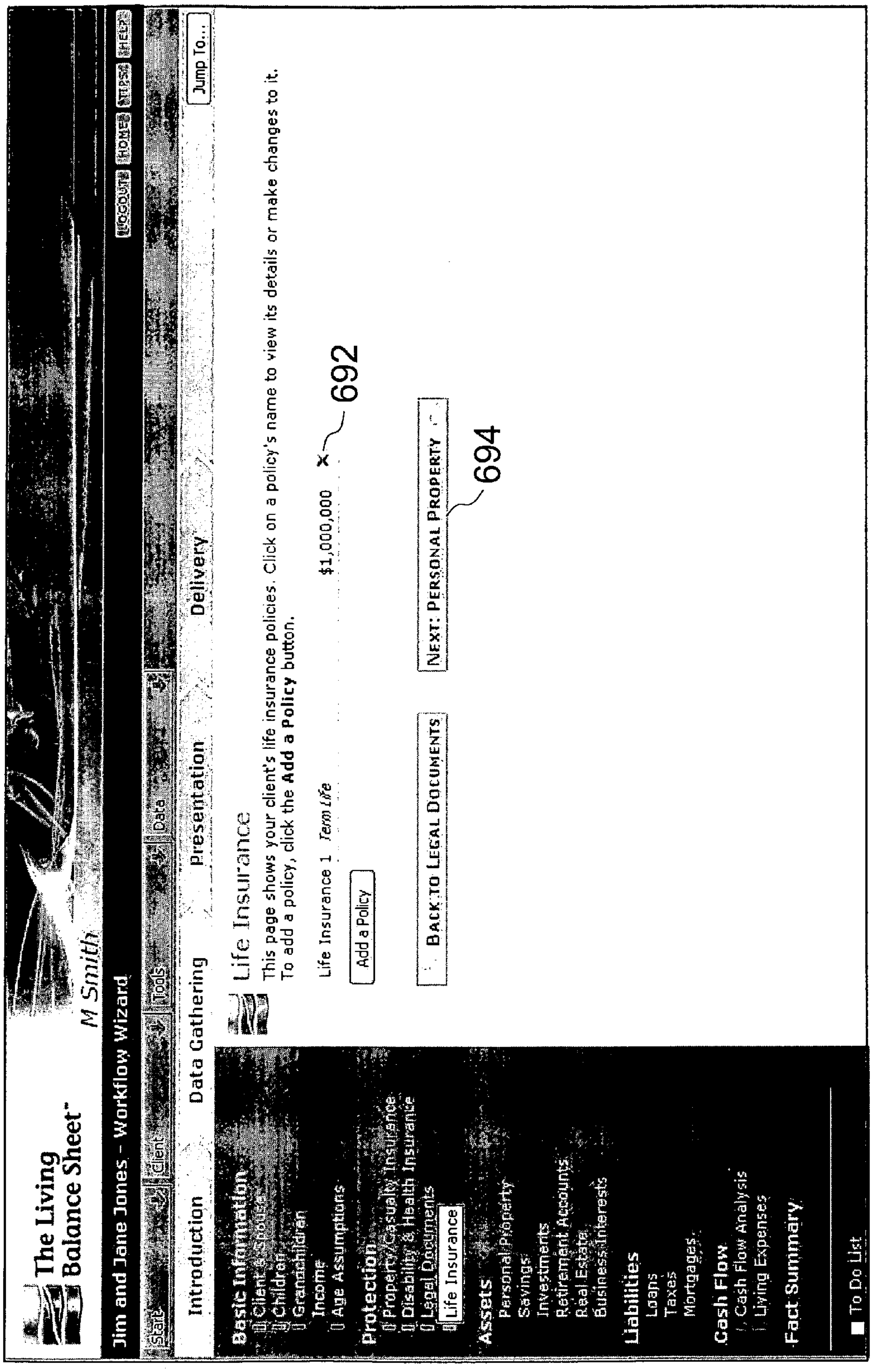
Figure 70:
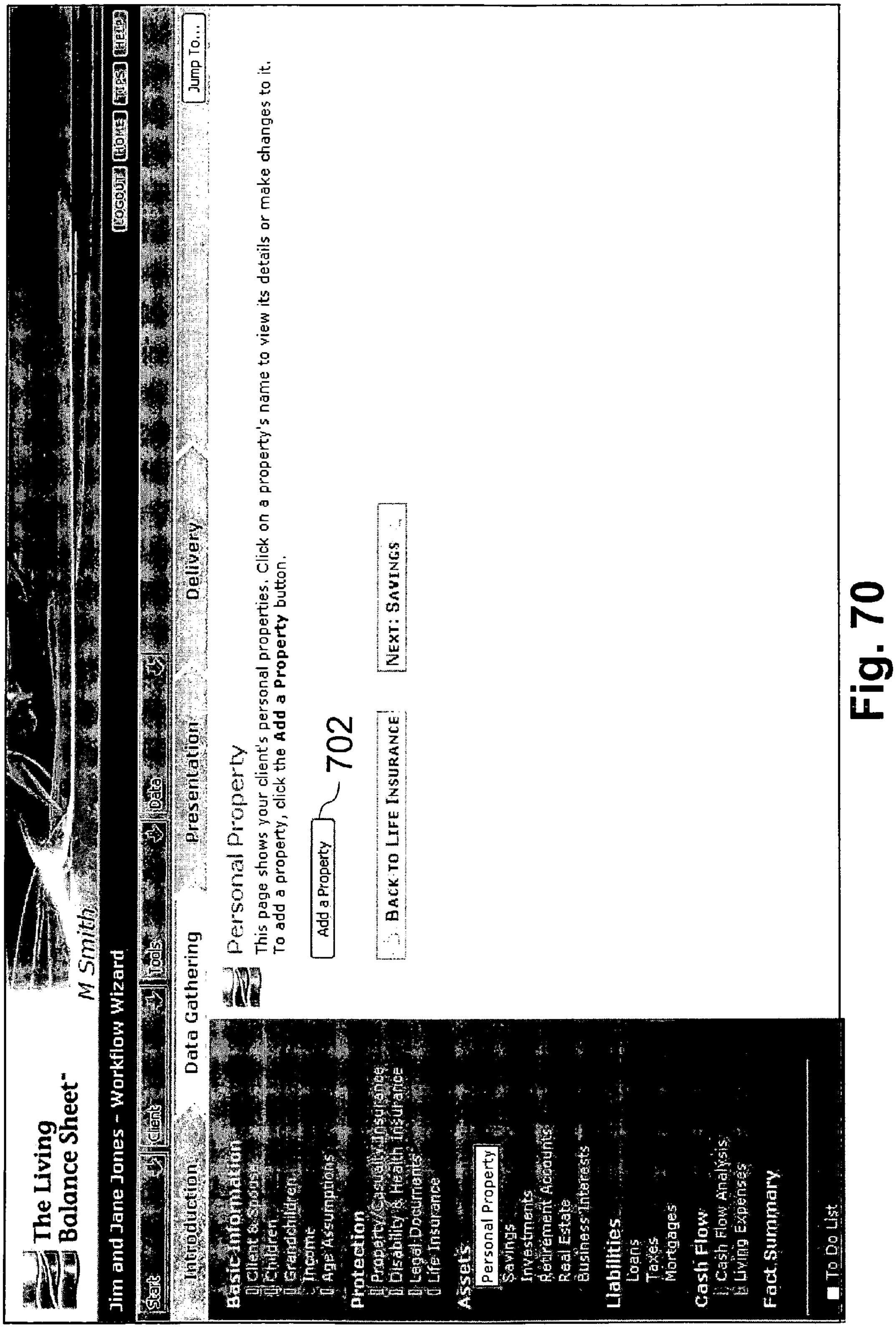
Figure 71:
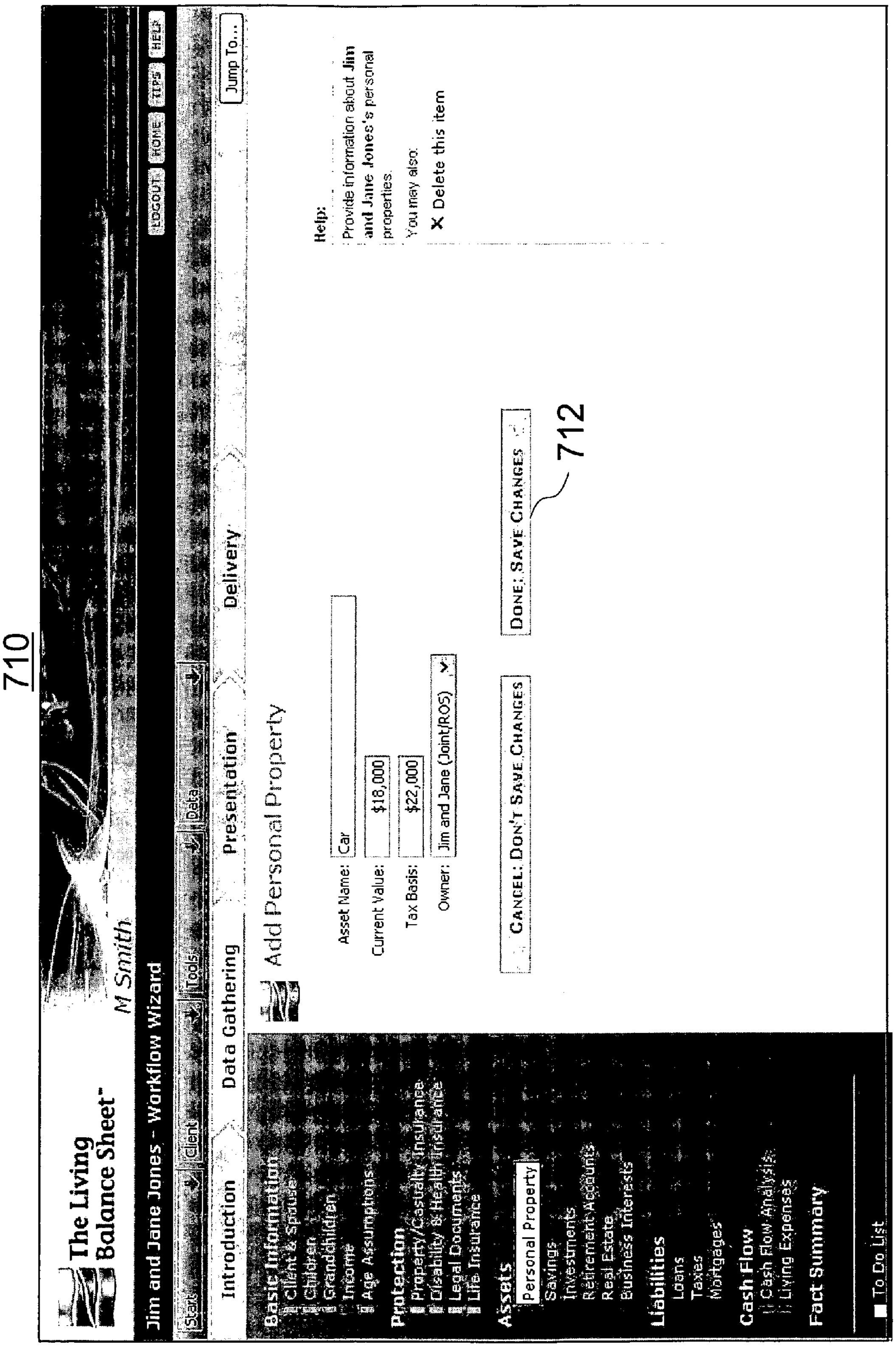

By selecting next button 692 of FIG. 69, a user can move to personal property display page 700 of FIG. 70, which corresponds to the "personal property" subsection of the assets section. Personal property display page 700 is preferably structured in the same way other initial or top-level subsection display pages (e.g., capability of a summary list and a button for adding new items) such as life insurance display page 690 of FIG. 69, legal documents display page 560 of FIG. 56, disability and health insurance display page 480 of FIG. 48, income display page 260 of FIG. 26. Add personal property display page 710 of FIG. 71 can be displayed when a user selects add a property button 702 of FIG. 70. Add personal property display page 710 includes a section for entering details related to a particular personal property of the client. As shown, the user can enter an asset name, current value, tax basis, and owner. By selecting done button 712, the user can add the property to the client's information and save the related information. In response, the user would be returned to personal property display page 700 of FIG. 70, which would be updated in the summary section to show the addition of the new personal property and for possibly repeating the process to add other personal property items. For example as shown in personal property display page 720 of FIG. 72, the user has added two personal property items that are reflected in summary section 722. A user can select one of the summary items in that section to access a change personal property display page to update or to change the data that was previously entered for that particular personal property. Summary section 722 can, for example, display the name of the personal property, the personal property type, and current value, as shown.

Figure 72:
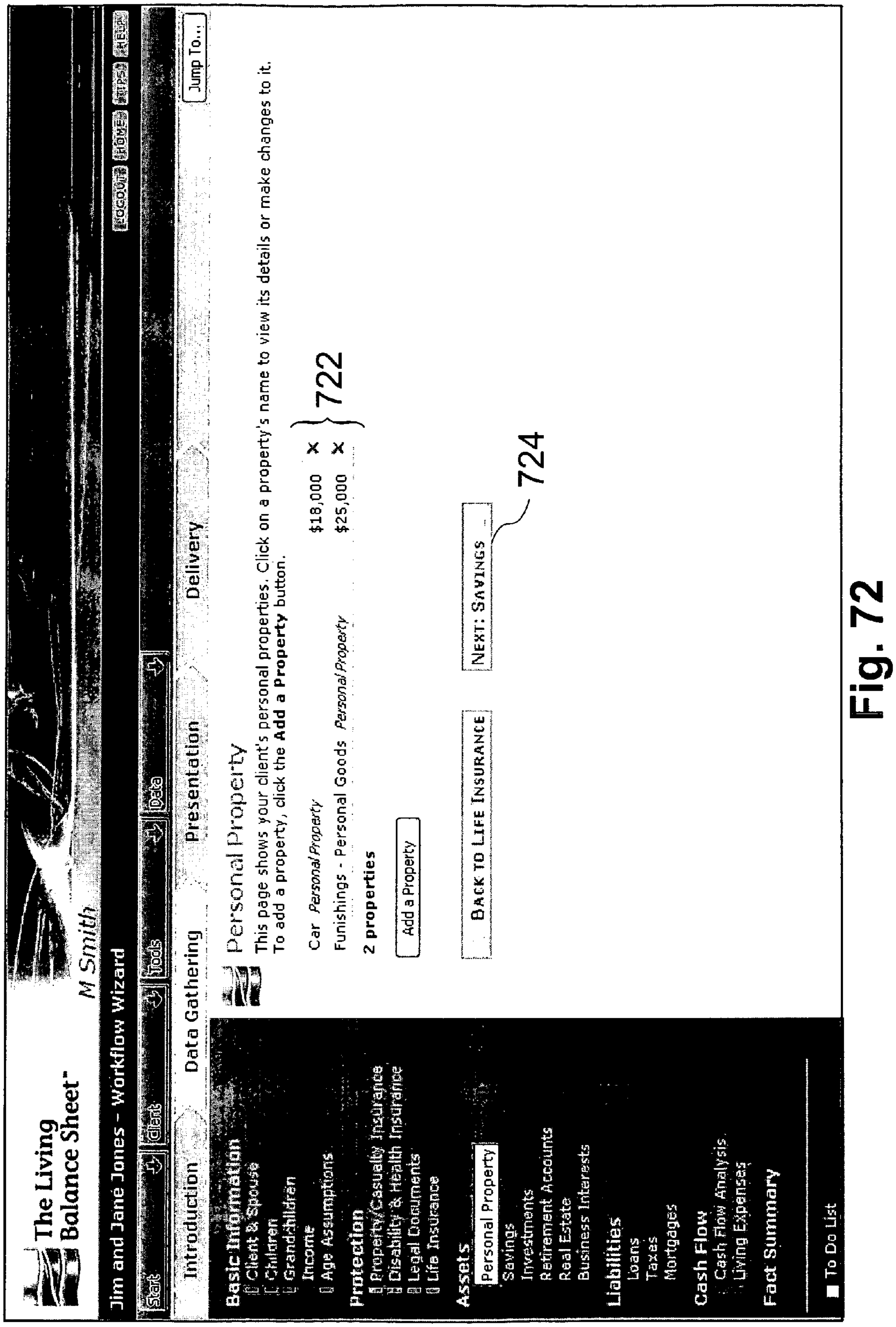
Figure 73:
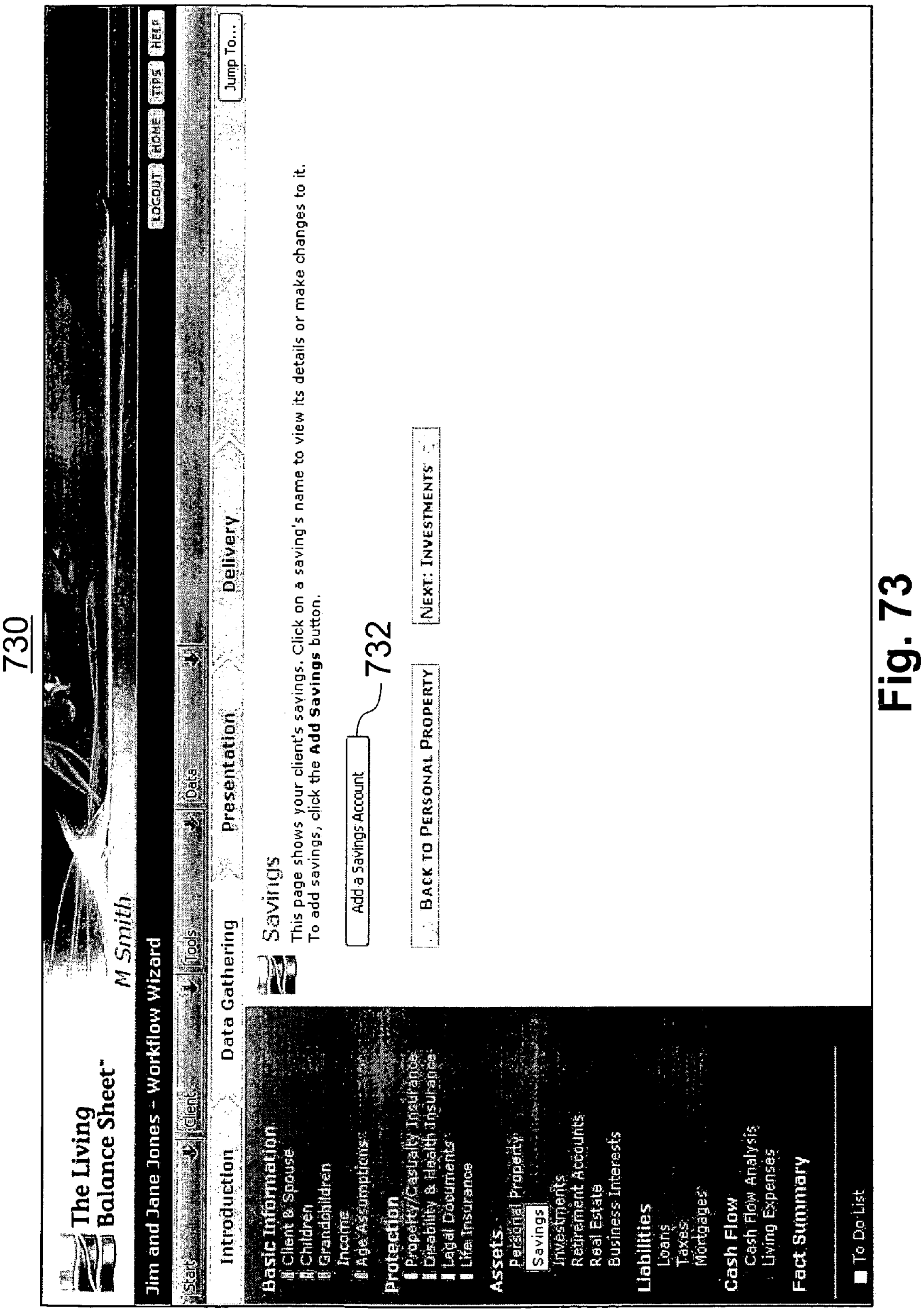
Figure 74:
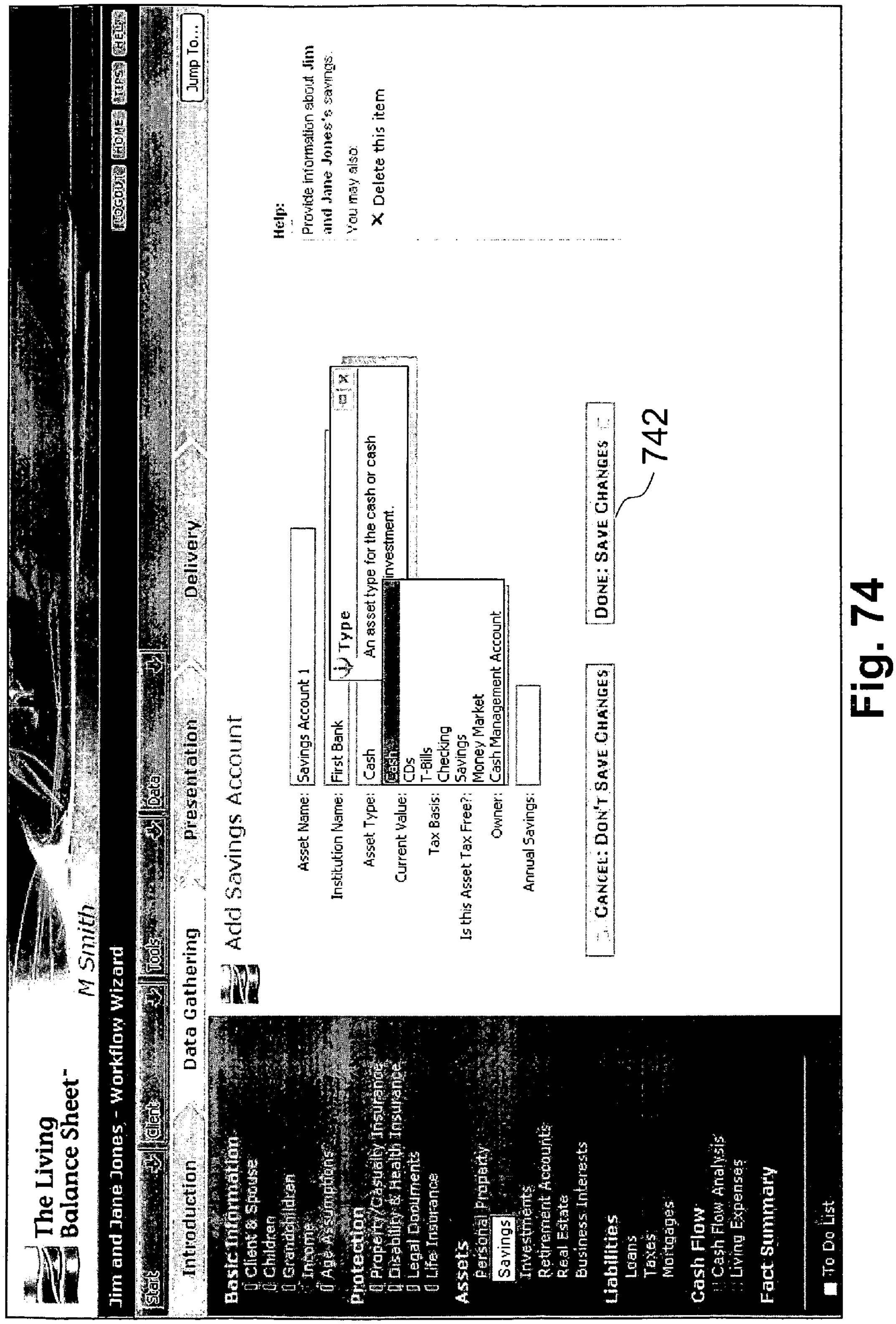

By selecting next button 724 of FIG. 72, a user can move to savings display page 730 of FIG. 73, which as shown corresponds to the "savings" subsection of the assets section. Savings display page 700 is preferably structured in the same way as other initial or top-level subsection display pages (e.g., capability of a summary list and a button for adding new items) such as life insurance display page 690 of FIG. 69, legal documents display page 560 of FIG. 56, disability and health insurance display page 480 of FIG. 48, income display page 260 of FIG. 26. Add savings display page 740 of FIG. 74 can be displayed when a user selects add a property button 732 of FIG. 73. Add savings display page 740 includes a section for entering details related to a particular personal property of the client. As shown, the user can enter an asset name, institution name, asset type (e.g., using a pull-down menu that includes cash, CDs, T-Bills, checking, savings, money market, and cash management account), current value, tax basis, whether the asset is tax-free, owner, and annual savings (e.g., the projected annual savings). By selecting done button 742, the user can add the property to the client's information and save the related information. In response, the user would be returned to savings display page 730 of FIG. 73, which would be updated in the summary section to show the addition of the new savings account and which could be used to repeat the process for adding other savings accounts. For example, as shown in savings display page 750 of FIG. 75, the user has previously added two savings accounts that are reflected in summary section 722. A user can select one of the summary items in that section to access a change savings display page to update or change the data that was previously entered for that particular personal property. Summary section 752 can, for example, display the name of the savings account, the type, and current value, as shown.

Figure 75:
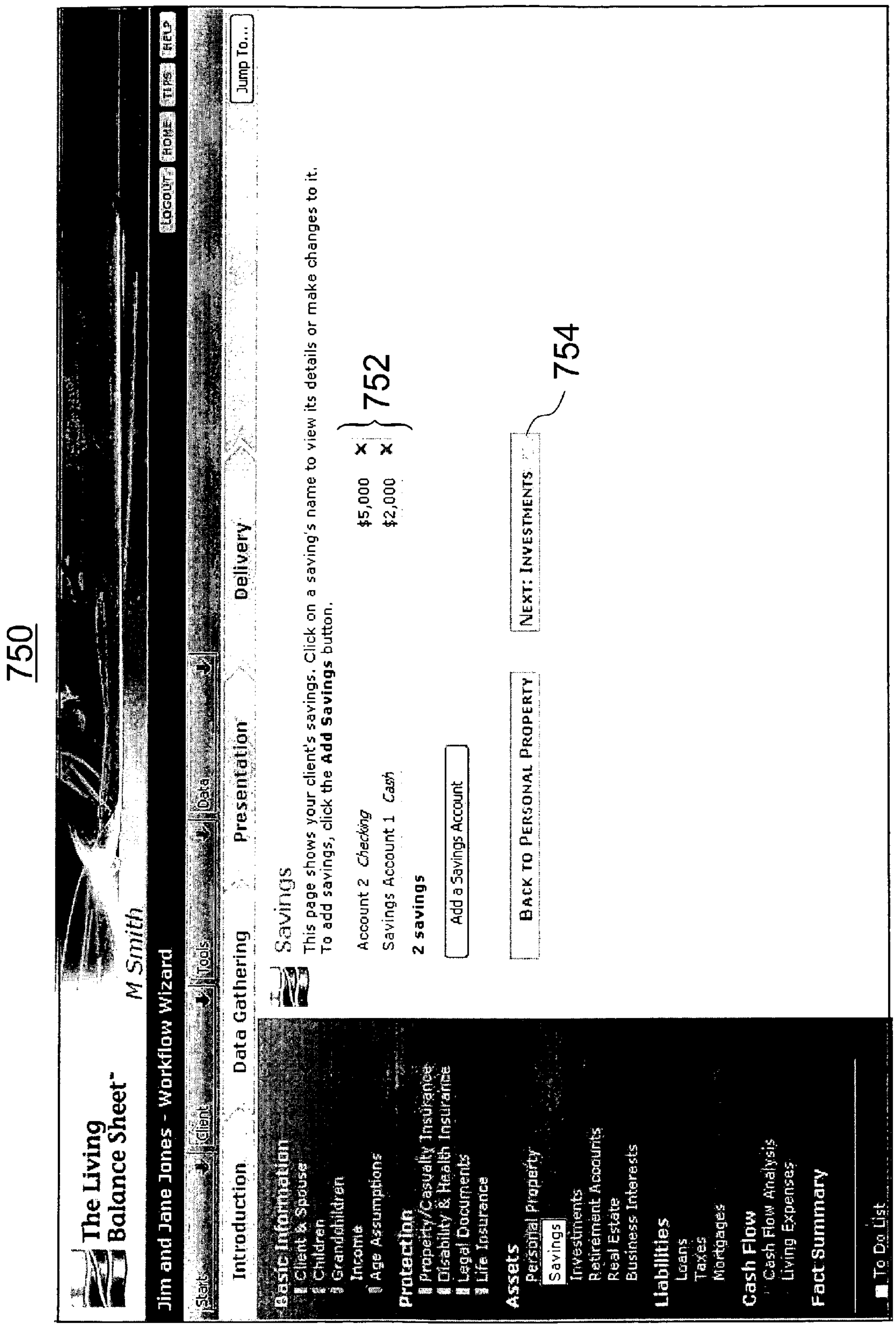
Figure 76:
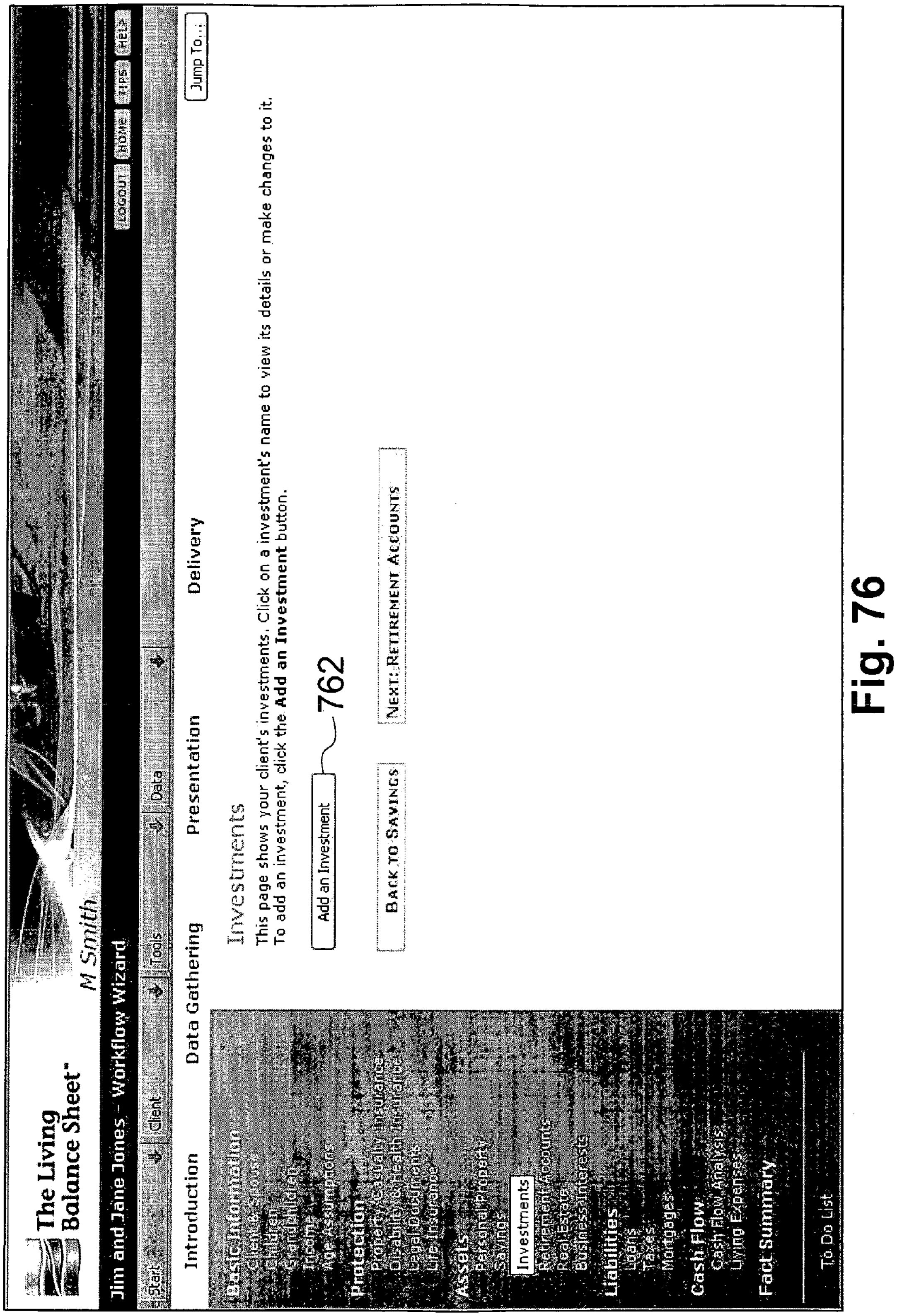

By selecting next button 754 of FIG. 75, a user can move to investments display page 760 of FIG. 76, which as shown corresponds to the "investments" subsection of the assets section. Investments display page 760 is preferably structured in the same way as other initial or top-level subsection display pages (e.g., having the capability of a summary list and a button for adding new items), such as, life insurance display page 690 of FIG. 69, legal documents display page 560 of FIG. 56, disability and health insurance display page 480 of FIG. 48, or income display page 260 of FIG. 26. Investment type display page 770 of FIG. 77 can be displayed when a user selects add an investment button 762 of FIG. 76. Investment type display page 770 provides the user with options for selecting the type of investment that is to be added to the client's information. As shown, the user can select from the option of adding a taxable investment 772, adding a 529 plan 774, adding an annuity 776, or adding a deferred compensation plan 778.

Figure 77:
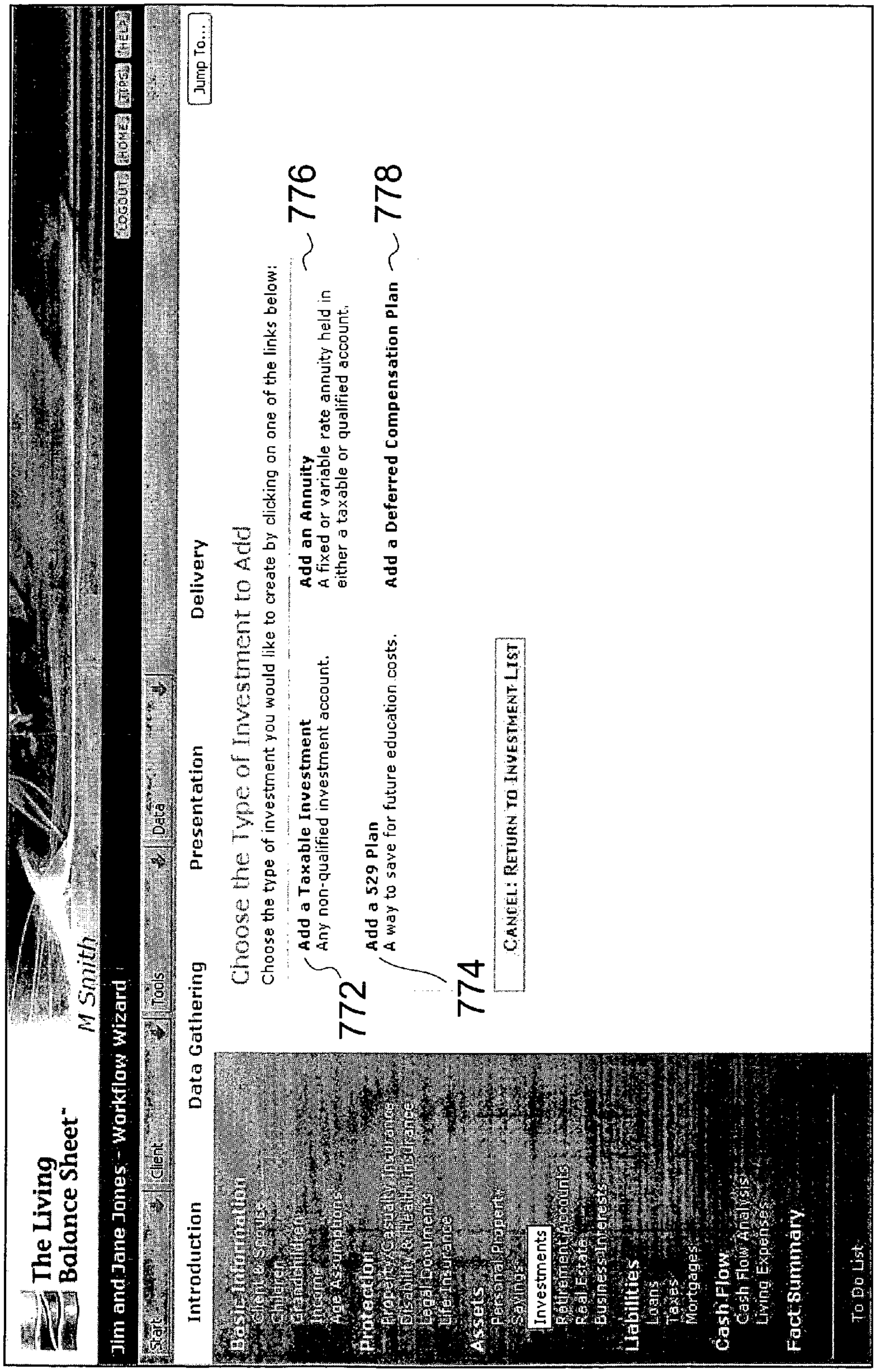
Figure 78:
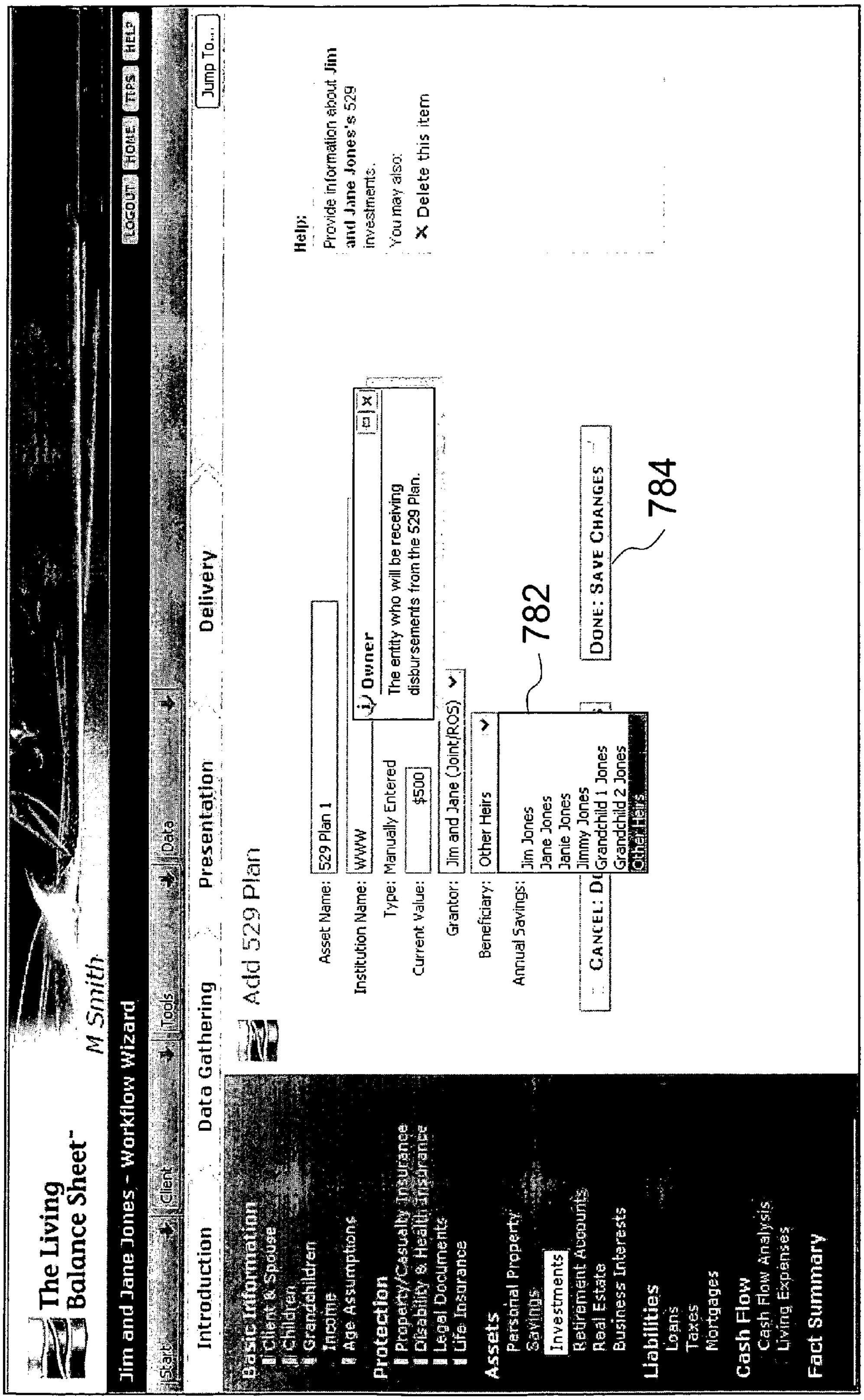
Figure 79:
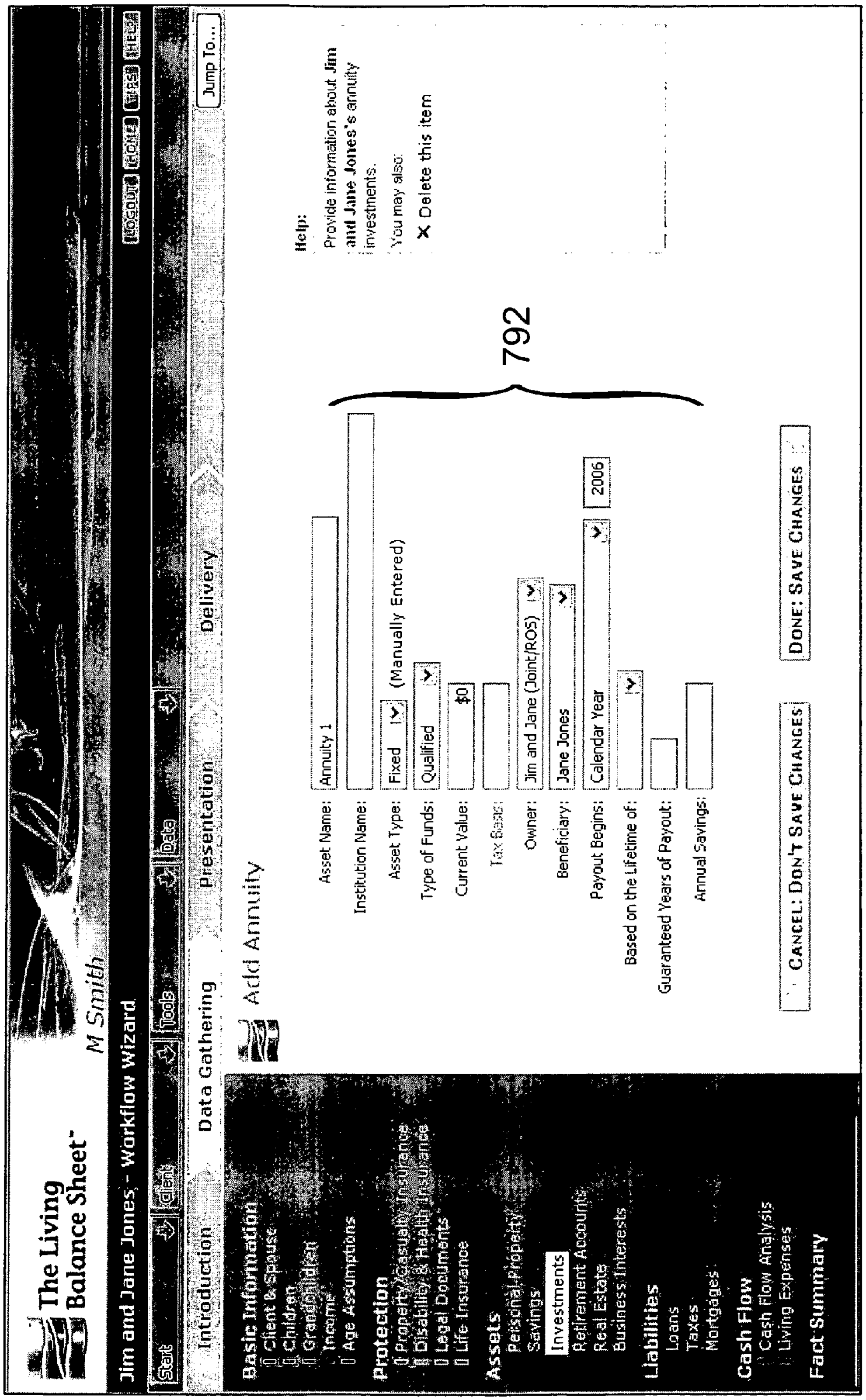

Add 529 display page 780 of FIG. 78 can be displayed when a user selects option 774 of FIG. 77. Add 529 display page 780 includes a section for entering details related to a particular 529 plan of the client. As shown, the user can enter an asset name, institution name, type, current value, grantor, beneficiary (e.g., such as using pull-down menu 782 that automatically generates applicable menu options such as the client, spouse, individual children or grandchildren, or "other heirs"), and the annual savings (e.g., the projected annual savings). By selecting done button 784, the user can add the 529 plan to the client's information and save the related information. In response, the user would be returned to investments display page 760 of FIG. 76, which would be updated in the summary section to show the addition of the new investment item and which could be used to repeat the process for adding other investments.

Figure 80:
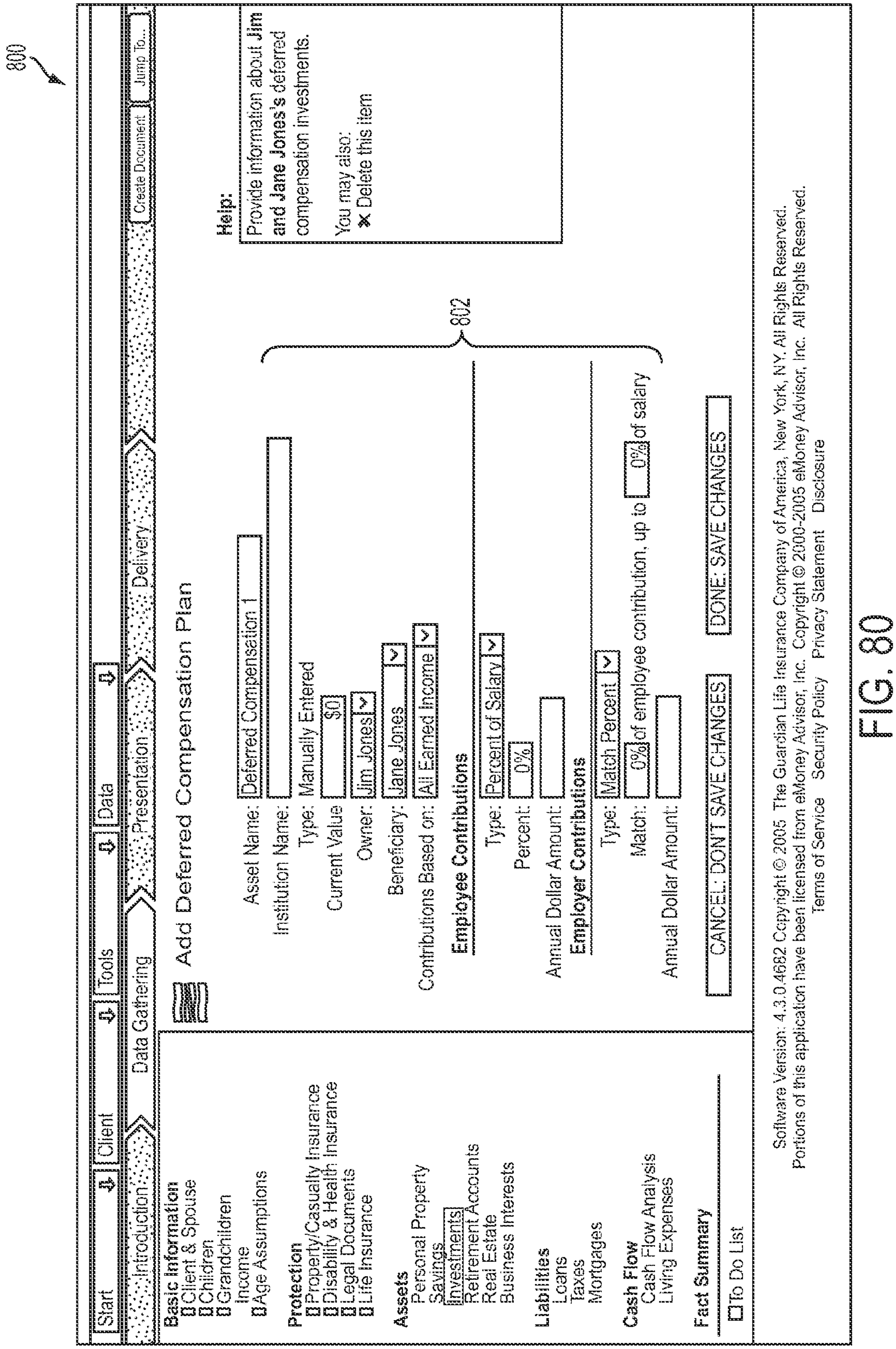

For example, the user can repeat the process to add an annuity. After the user selects add button 762 of FIG. 76 and option 776 of FIG. 77, add annuity display page 790 can be displayed for adding an annuity and related information to the client's information. Add annuity display page 790 includes section 792 for entering annuity related information. As shown, the user can enter an asset name, institution name, asset type, type of funds, current value, owner, beneficiary, when the payout begins, the person whose lifetime the annuity is based on, whether it includes guaranteed years of payout, and the annual savings (e.g., the estimated annual savings). Add deferred compensation display page 800 of FIG. 80 can be displayed when for example user selects add button 762 of FIG. 76 and option 778 of FIG. 77. Add deferred compensation display page 800 of FIG. 80 can be displayed to allow the user to add a particular deferred compensation plan and related plan information to the client information. As shown, the user can enter an asset name, institution name, type, current value, owner, beneficiary, and on what the contributions are based. In addition, display page 800 also provides options and data entry fields for specifying information relating to employee contributions (e.g., type, percentage, or annual dollar amount) and employer contributions (e.g., type, such as match percent, the percentage to match, and the maximum match percentage).

Figure 81:
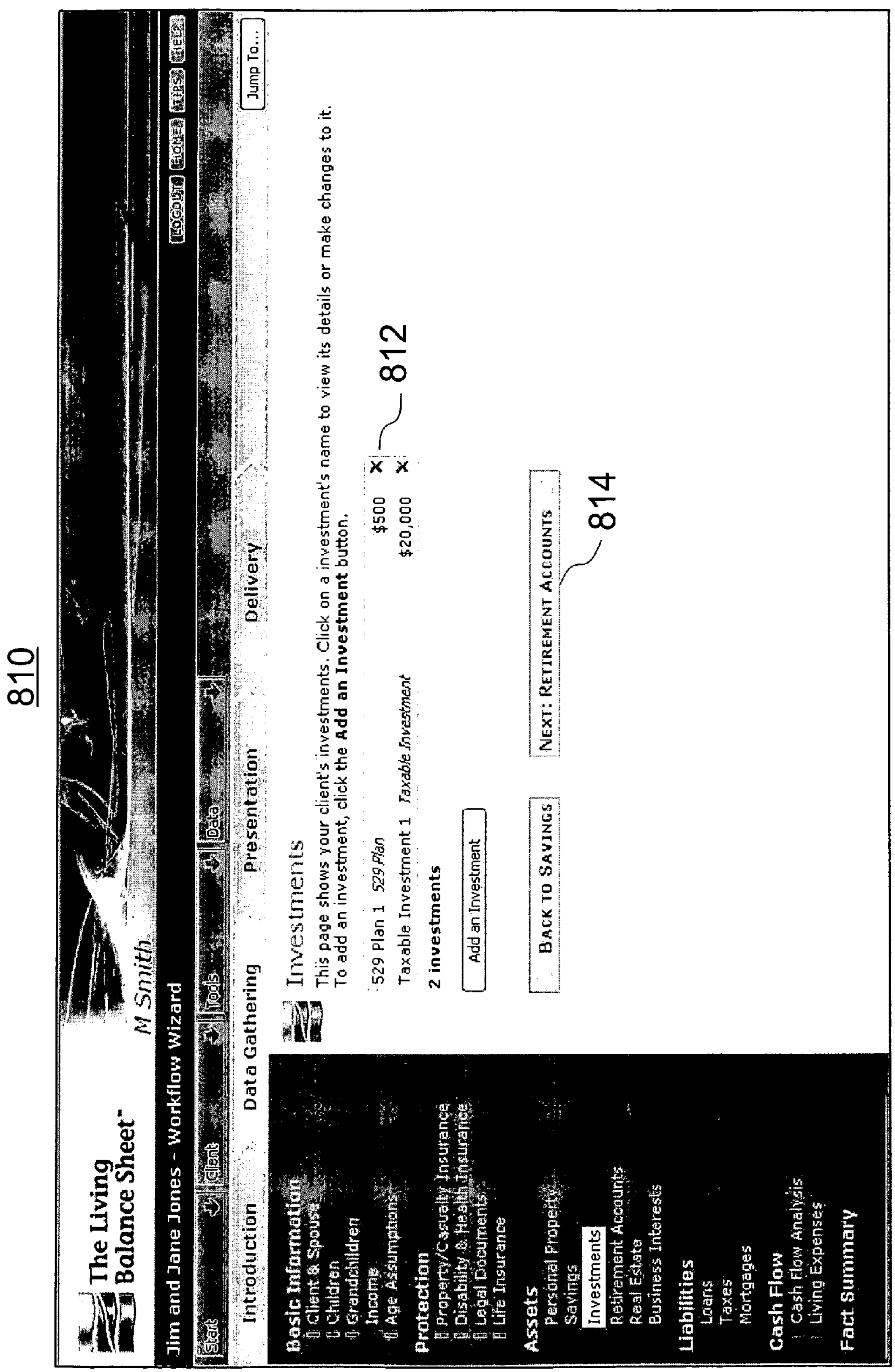
Figure 82:
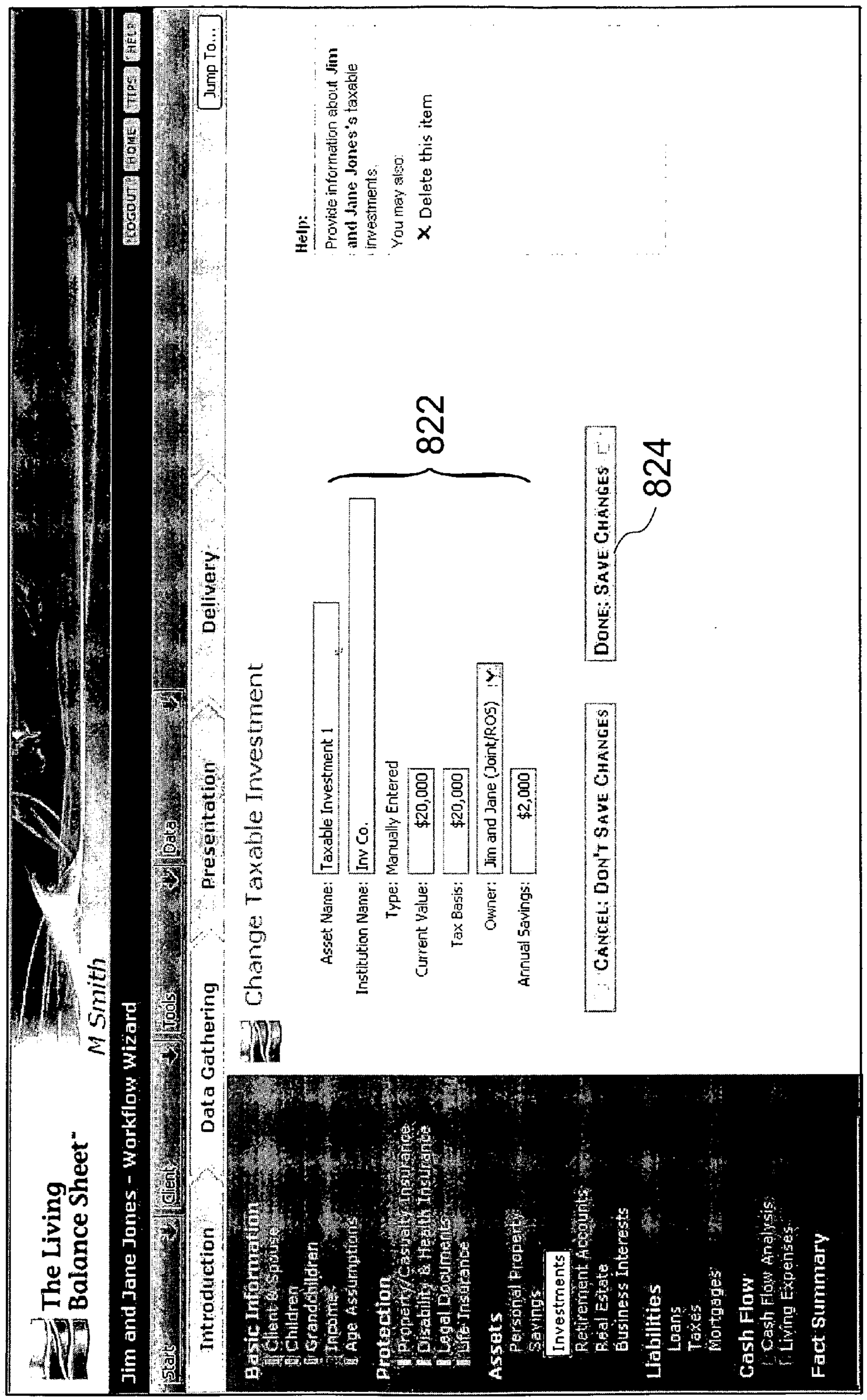

Investment display page 810 of FIG. 81 can be displayed after the user has performed the process of adding two investments: "529 Plan 1" and "Taxable Investment 1." The two investments are reflected in summary section 812. Summary section 812 displays information such as the asset name, investment type, and current value. If a user selects one of the items in summary section 812, a change display page for that item would be displayed for updating or changing the related information. For example, if one of the items was a taxable investment, change taxable investment display page 820 of FIG. 82 can be displayed, which is structured and functions the same as an add taxable investment display page but is repopulated with information that was entered or selected by the user. Change taxable investment display page includes a details section relating to the added-taxable investment and related information such as asset name, institution name, type, current value, tax basis, owner, and annual savings. Done button 824 can be used to save any updates or new data that was entered or selected in display page 820 and to return the user to a display page such as an investment display page 812 of FIG. 81.

Figure 83:
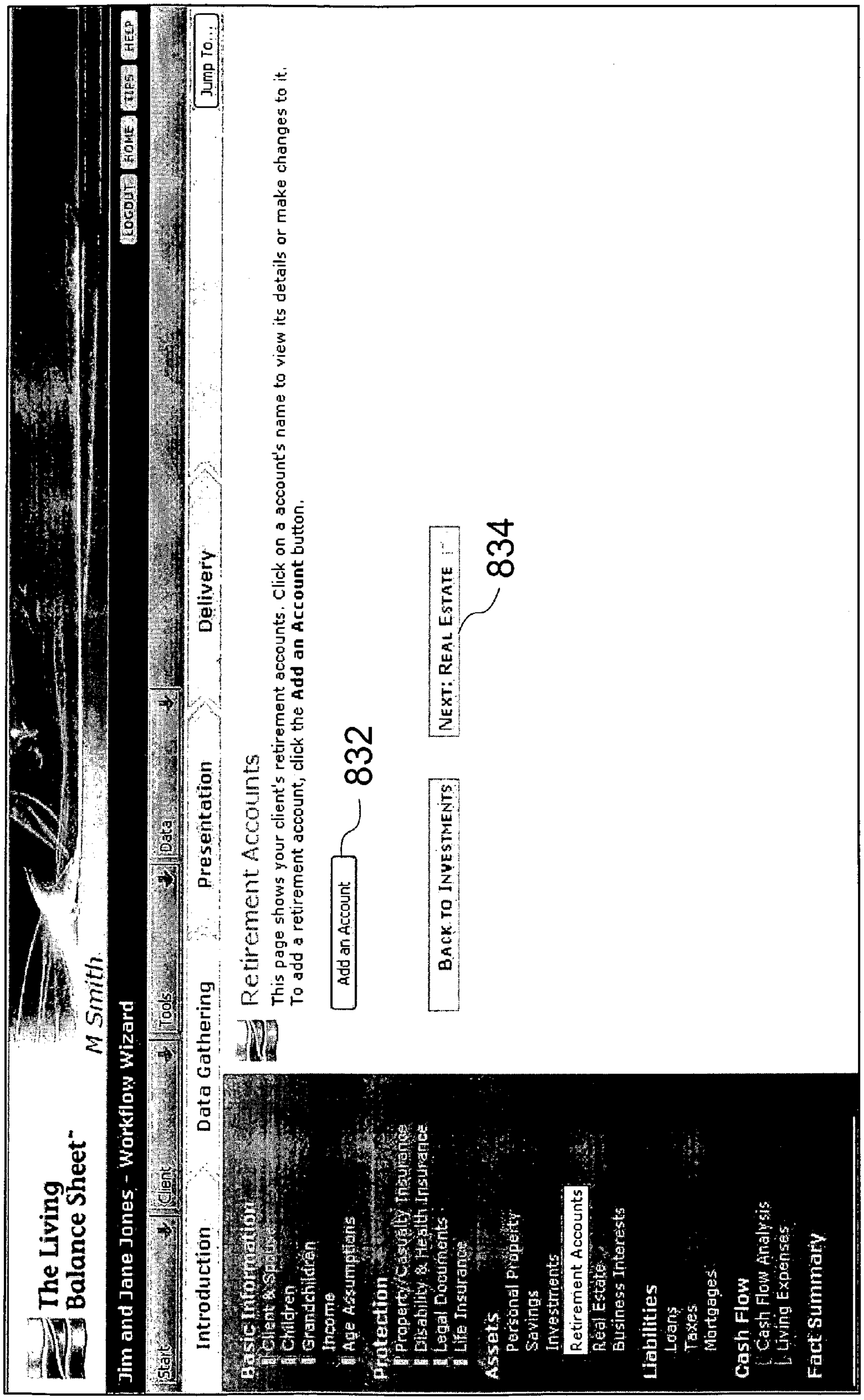

By selecting next button 814 of FIG. 81, a user can move to retirement accounts display page 830 of FIG. 83, which as shown corresponds to the "retirement accounts" subsection of the assets section. Retirement accounts display page 830 is preferably structured in the same way as other initial or top-level subsection display pages (e.g., capability of a summary list and a button for adding new items), such as, life insurance display page 690 of FIG. 69, legal documents display page 560 of FIG. 56, disability and health insurance display page 480 of FIG. 48, or income display page 260 of FIG. 26. Retirement account type display page 840 of FIG. 84 can be displayed when a user selects add an account button 832 of FIG. 83. Retirement account type display page 840 provides the user with options for selecting the type of retirement account that is to be added to the client's information. As shown, the user can select from the option of adding a qualified retirement plan 842 or adding a Roth IRA plan 844.

Figure 84:
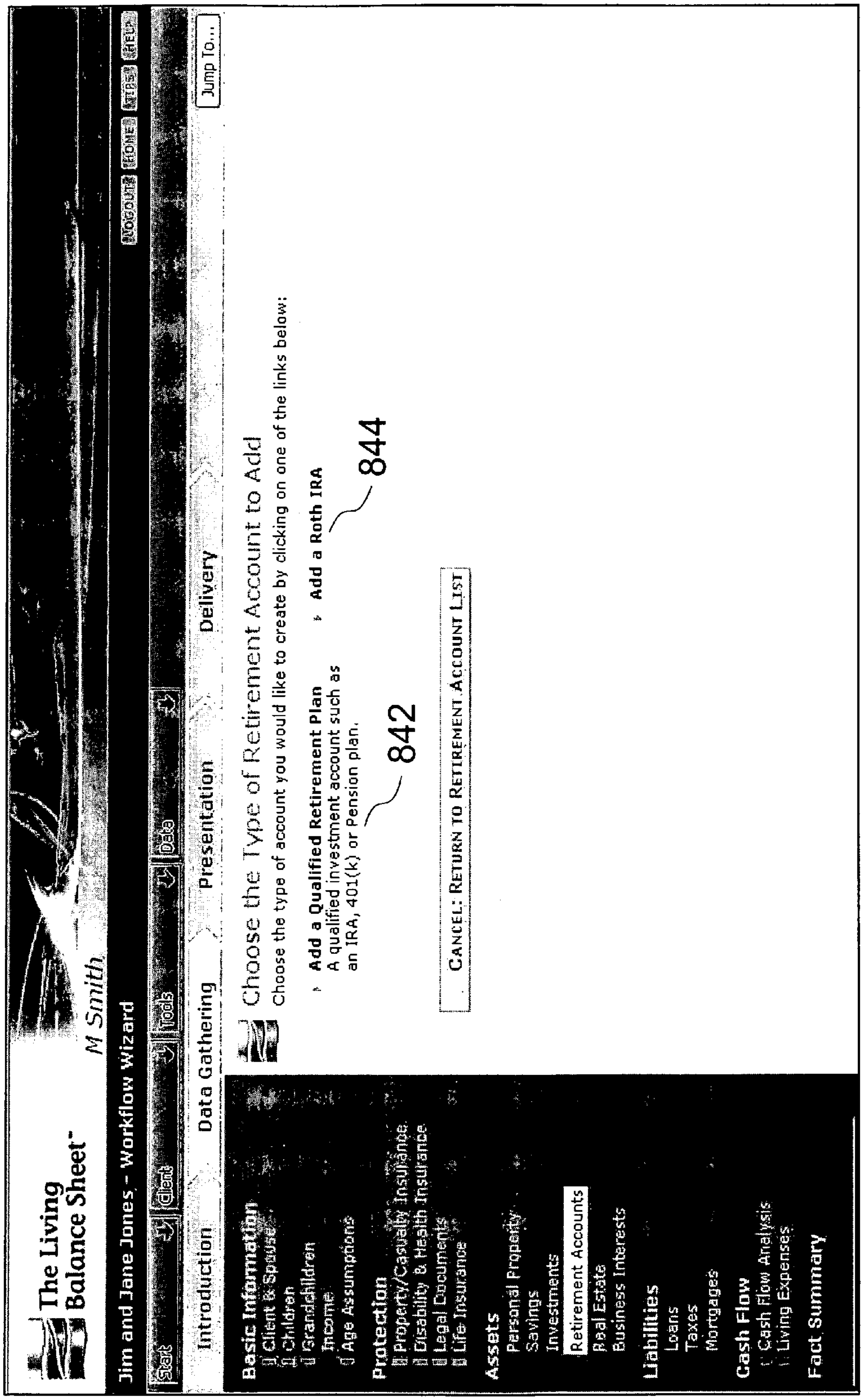
Figure 85:
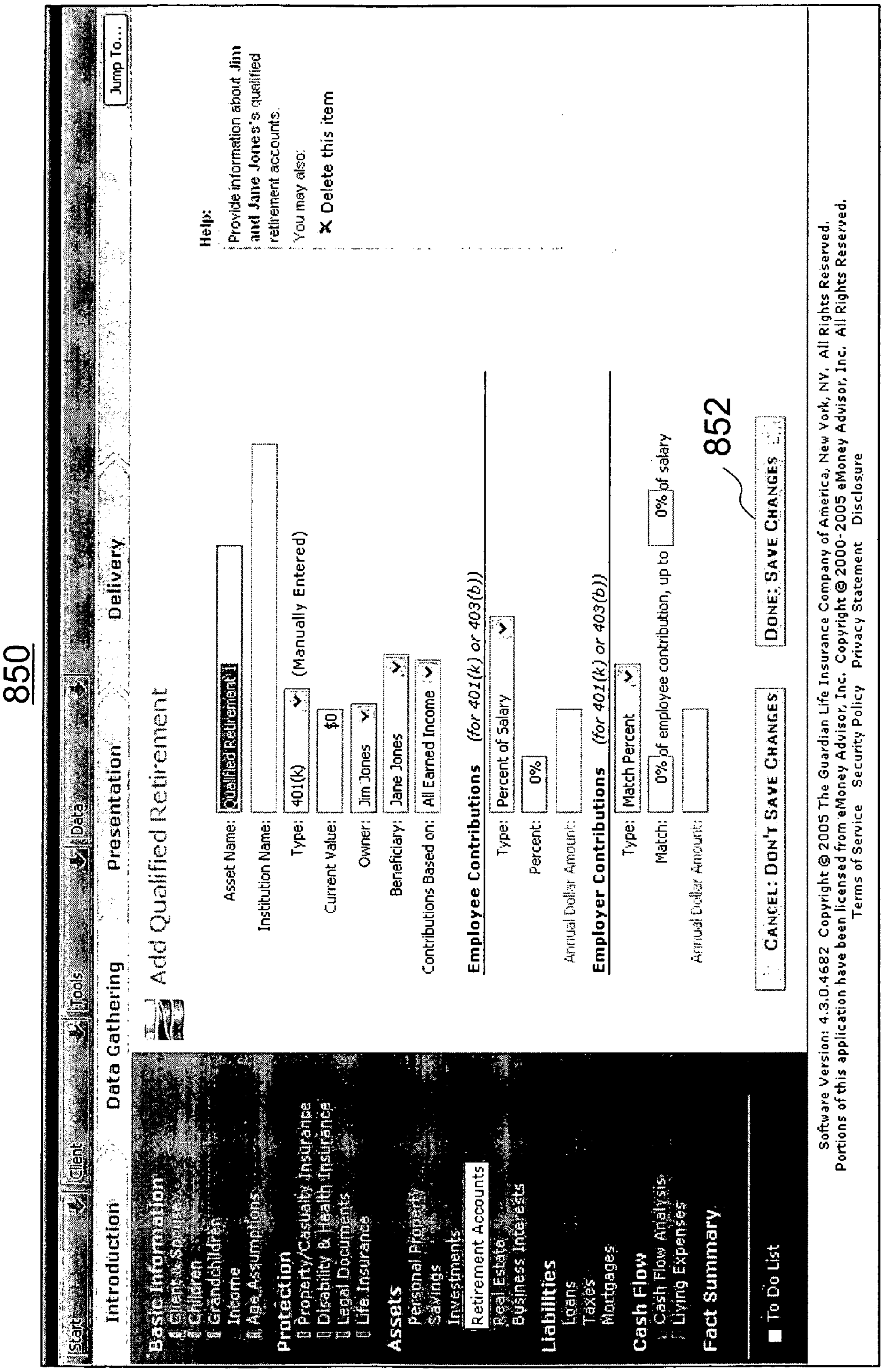

Add qualified retirement account display page 850 of FIG. 85 can be displayed when a user selects option 842 of FIG. 84. Add qualified retirement account display page 850 includes a section for entering details related to a particular qualified retirement account of the client. As shown, the user can enter (which can involve various forms of data entry such as selecting an item from a pull-down menu) an asset name, institution name, type, current value, owner, beneficiary, and the basis for contributions into the account. Data fields can also include fields for entering information relating to employee and employer contributions such as those related to 401k or 403 (b) accounts (type, percent of salary, matching, minimum for matching, and level of matching). By selecting done button 852, the user can add the retirement account from display page 850 to the client's information and save the account related information that was entered. In response, the user would be returned to retirement accounts display page 830 of FIG. 83, which would be updated in the summary section to show the addition of the new retirement account and which could be used to repeat the process for adding other retirement accounts. For example, the user can repeat the process to add a Roth IRA, which would have the same data fields as for example display page 850 except that it would not have sections for employee and employer contributions. Changes to saved data can be implemented through a change display page in the same way as is described above in connection with other subsections.

Figure 86:
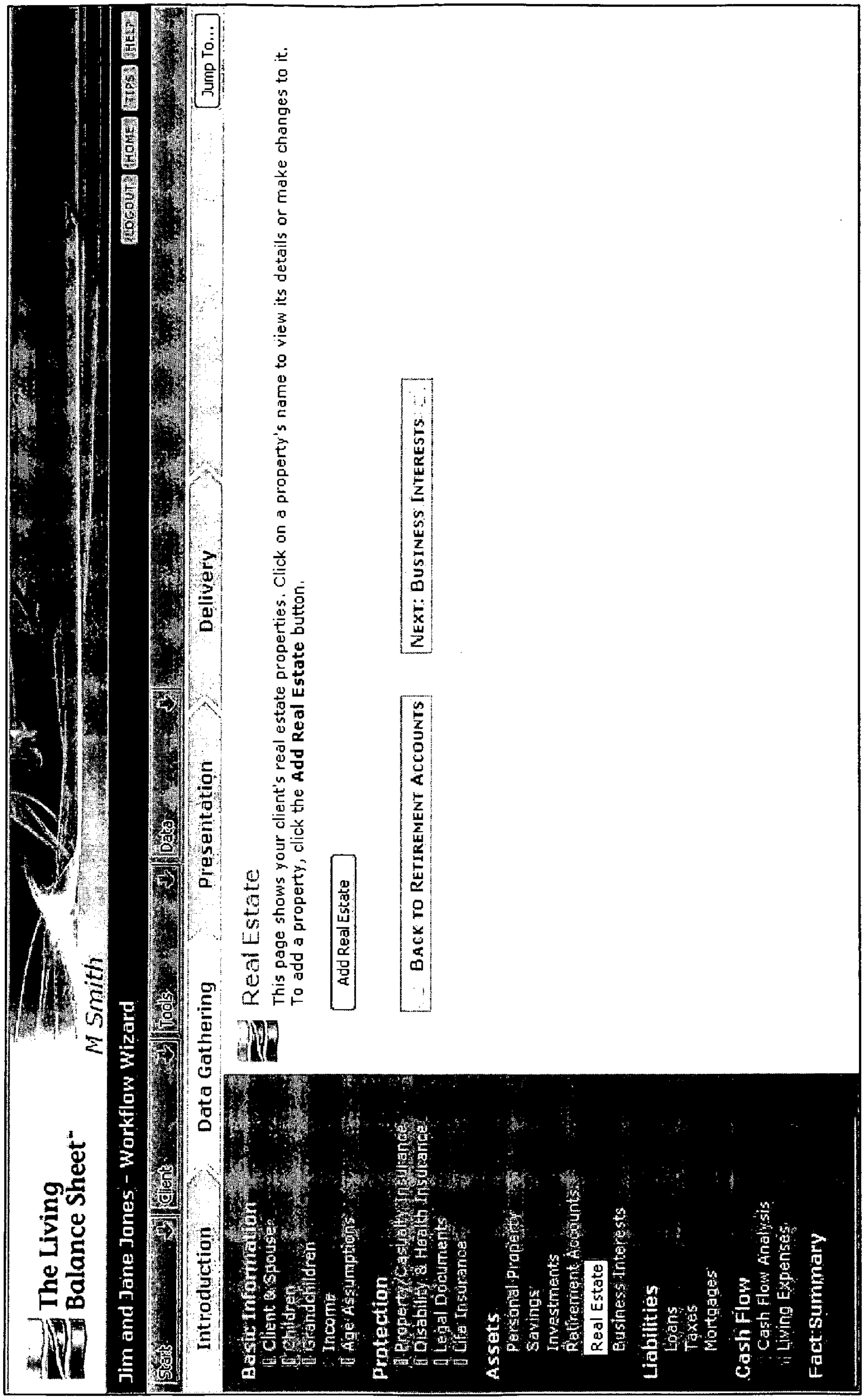
Figure 87:
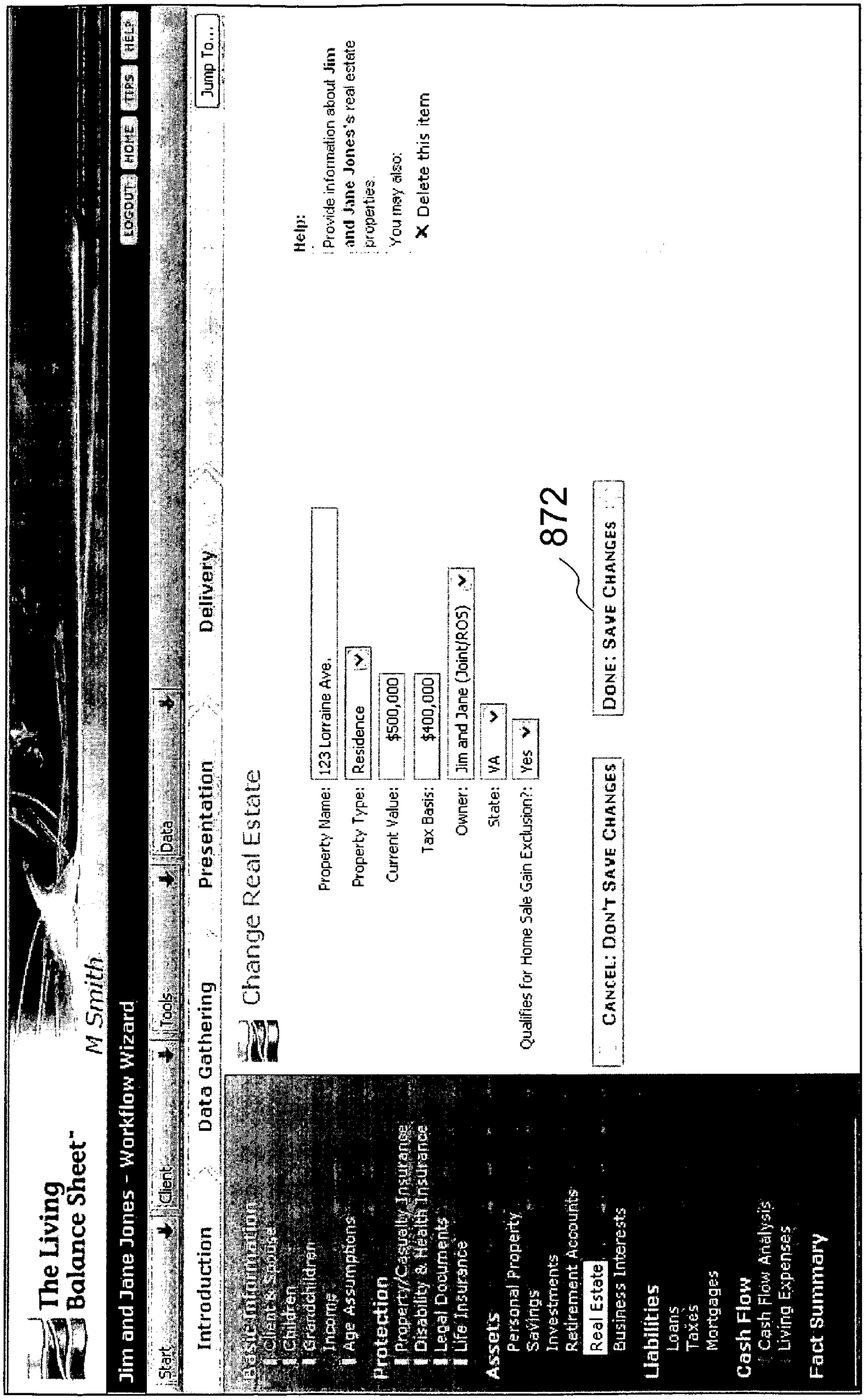

By selecting next button 834 of FIG. 83, a user can move to real estate display page 860 of FIG. 86, which as shown corresponds to the "real estate" subsection of the assets section. Real estate display page 860 is preferably structured in the same way as other initial or top-level subsection display pages (e.g., capability of a summary list and a button for adding new items), such as, life insurance display page 690 of FIG. 69, legal documents display page 560 of FIG. 56, disability and health insurance display page 480 of FIG. 48, and income display page 260 of FIG. 26. Change real estate display page 870 of FIG. 87 can be displayed when a user selects a real estate item from the summary section of display page 860 (e.g., if the user had previously added a real estate item for the client). An add real estate display page having the same structure and functionality as the change real estate display page 870 can be displayed if the user is adding a new real estate item (e.g., user selects the add real estate button of FIG. 86 to add real estate). Change real estate display page 870 includes a section for entering details related to a particular real estate property of the client. As shown, the user can enter an asset name, property type, current value, tax basis, owner, location state, and whether it qualifies for home sale gain exclusion. By selecting done button 872, the user can save the changes to the real estate identified in display page 870. In response, the user can be returned to real estate display page 880 of FIG. 88, which would be updated in the summary section to show the added or updated real estate items. Summary section 882 of display page 880 can show summary information regarding individual real estate property such as the address, type of property, and current value.

Figure 88:
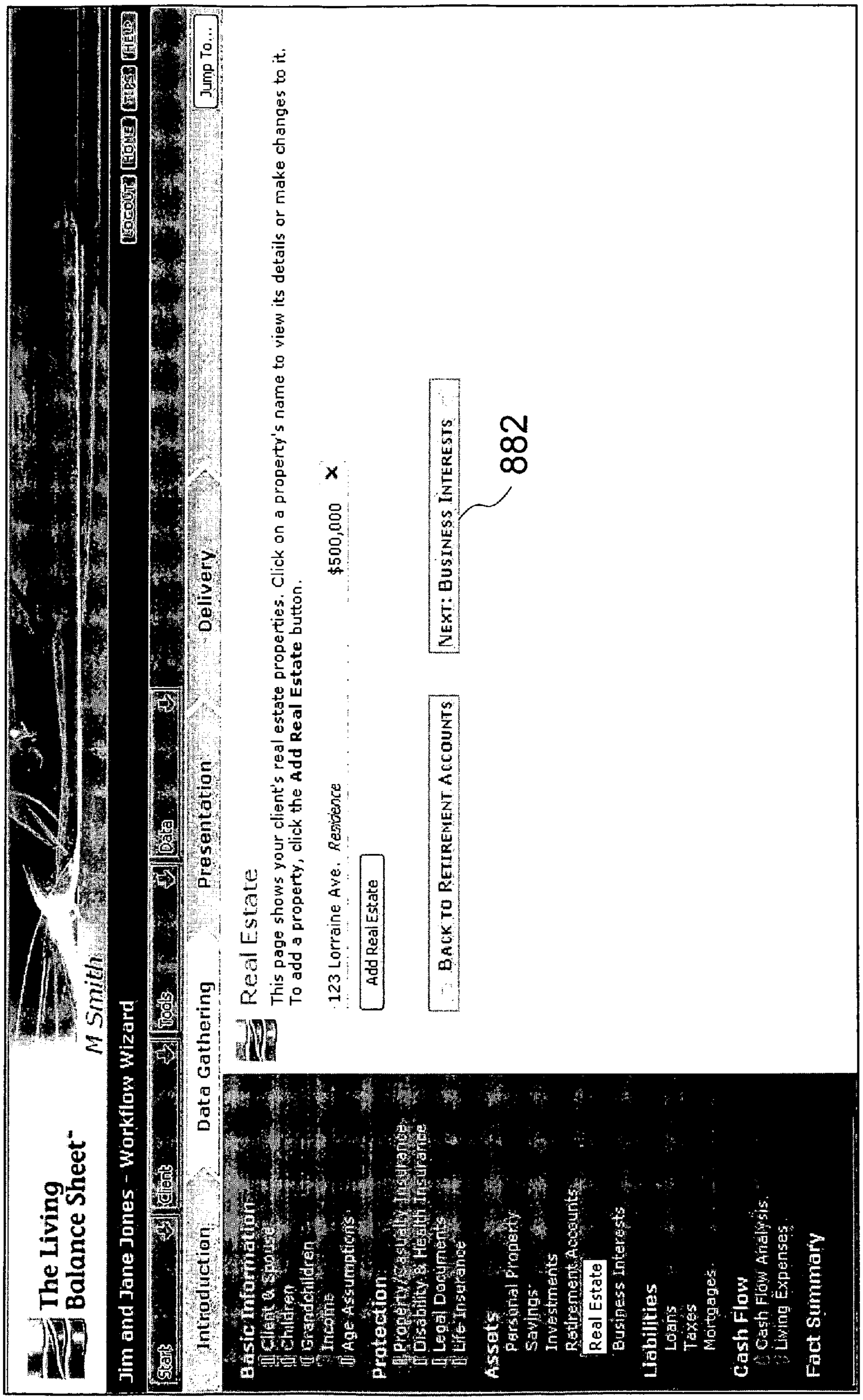
Figure 89:
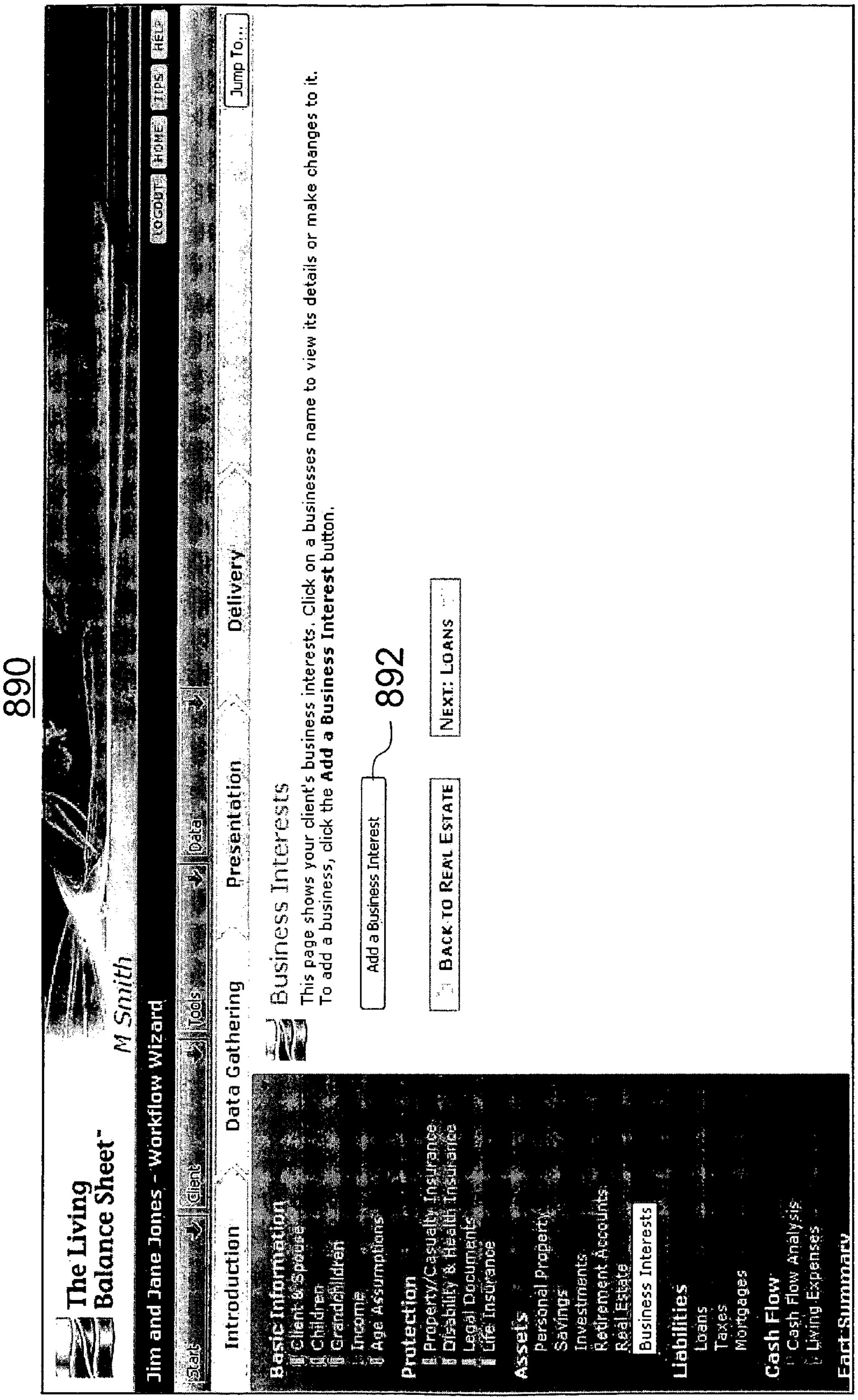
Figure 90:
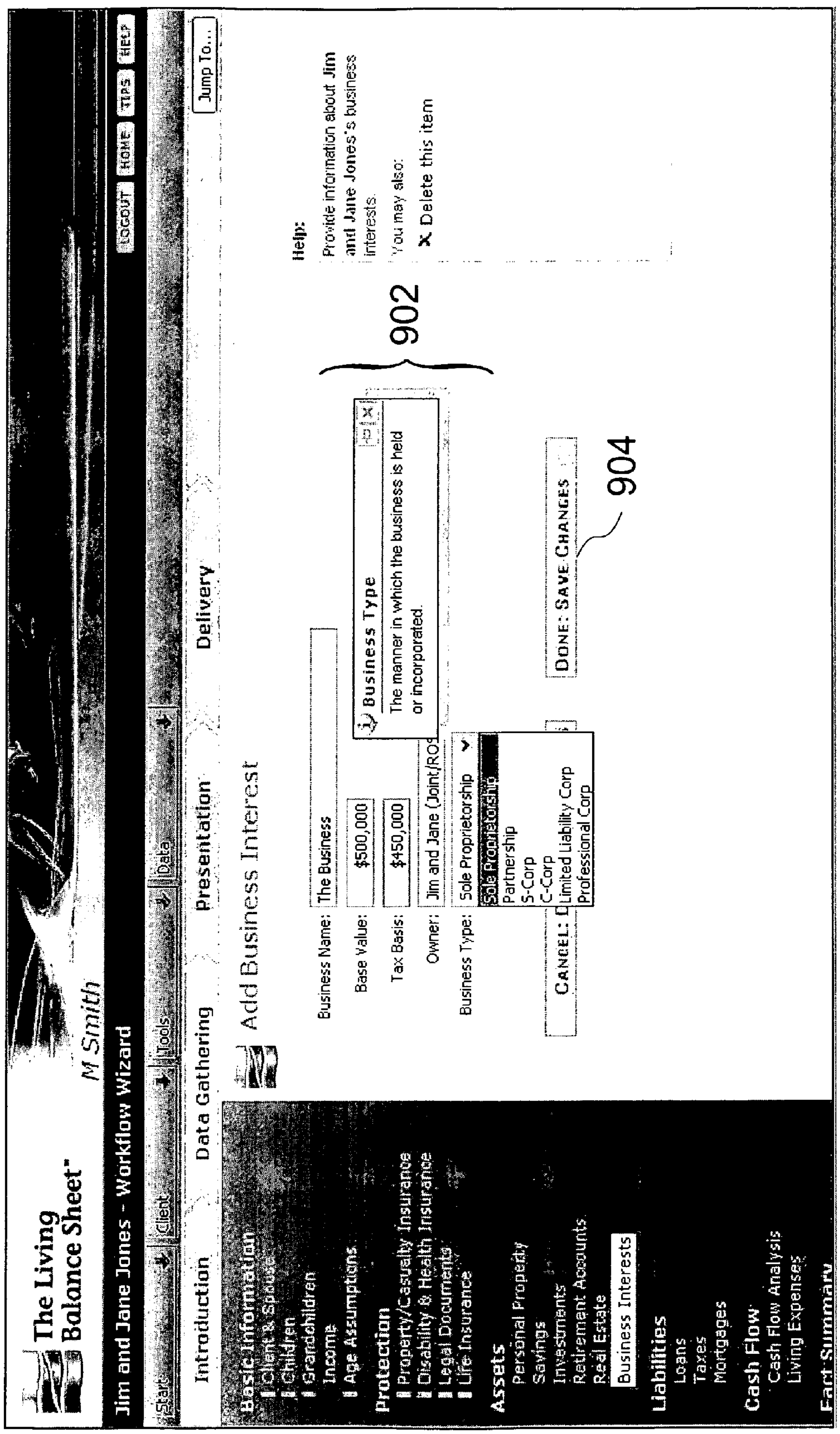

By selecting next button 882 of FIG. 88, a user can move to business interests display page 890 of FIG. 89, which as shown corresponds to the "business interests" subsection of the assets section. Business interests display page 890 is preferably structured in the same way as other initial or top-level subsection display pages (e.g., capability of a summary list and a button for adding new items), such as, life insurance display page 690 of FIG. 69, legal documents display page 560 of FIG. 56, disability and health insurance display page 480 of FIG. 48, or income display page 260 of FIG. 26. Add business interests display page 900 of FIG. 90 can be displayed when a user selects add a business interest button 892 of FIG. 89 to add a business interest to the client's information. A change business interests display page having the same structure and functionality as the add business interest display page 870 can be displayed if the user select a previously added business interest from the summary section of the business interest display page. Add business interests display page 900 includes section 902 for entering details related to a particular business interest of the client. As shown, the user can enter a business name, basis value, tax basis, and business type. By selecting done button 904, the user can add the business interest and save the related information entered in display page 900. In response, the user can be returned to business interests display page 910 of FIG. 91, which would be updated in summary section 912 to show the added business interest. Summary section 912 of display page 910 can display summary information with respect to the name of the business interest, type of business, and base value.

Figure 91:
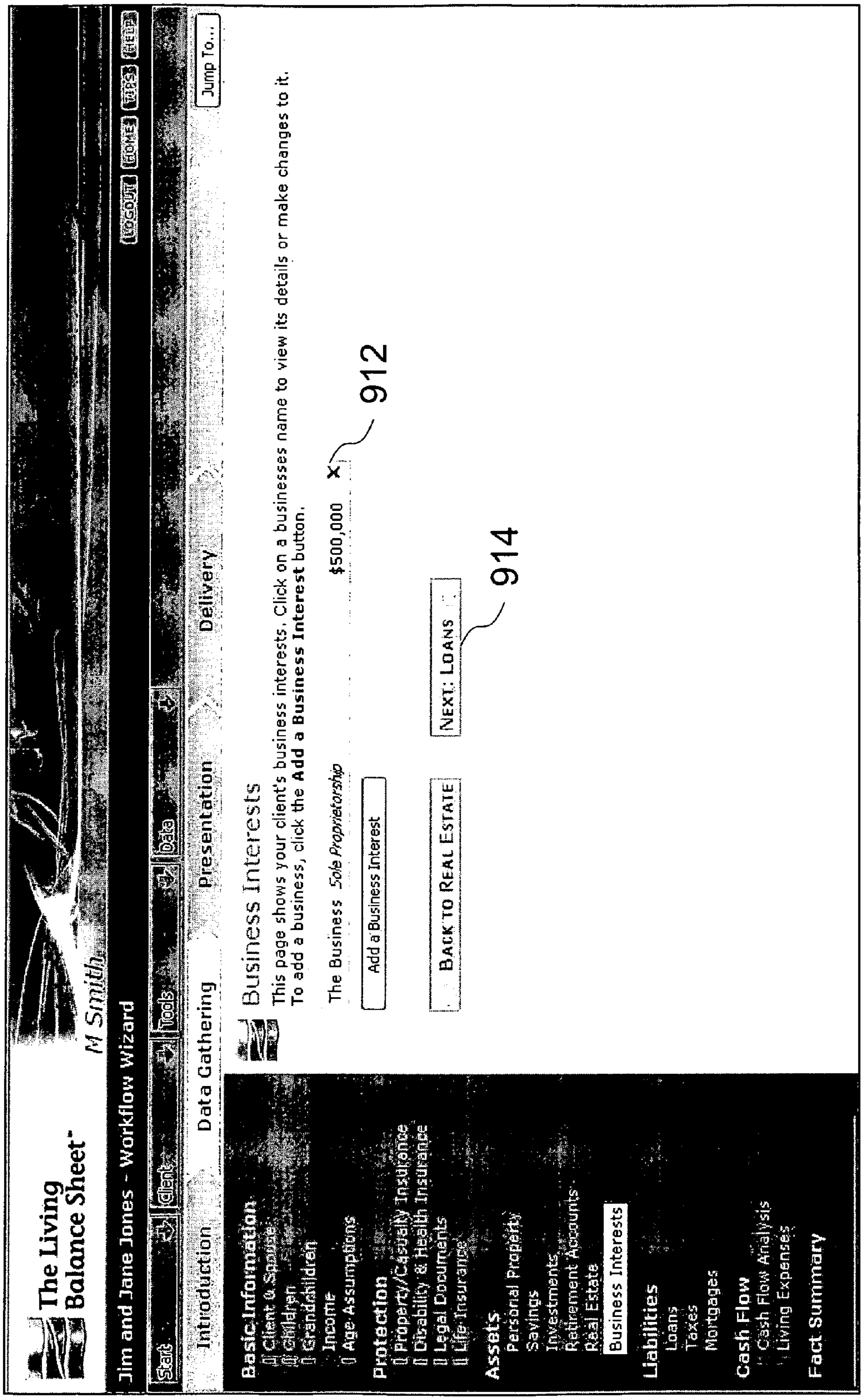
Figure 92:
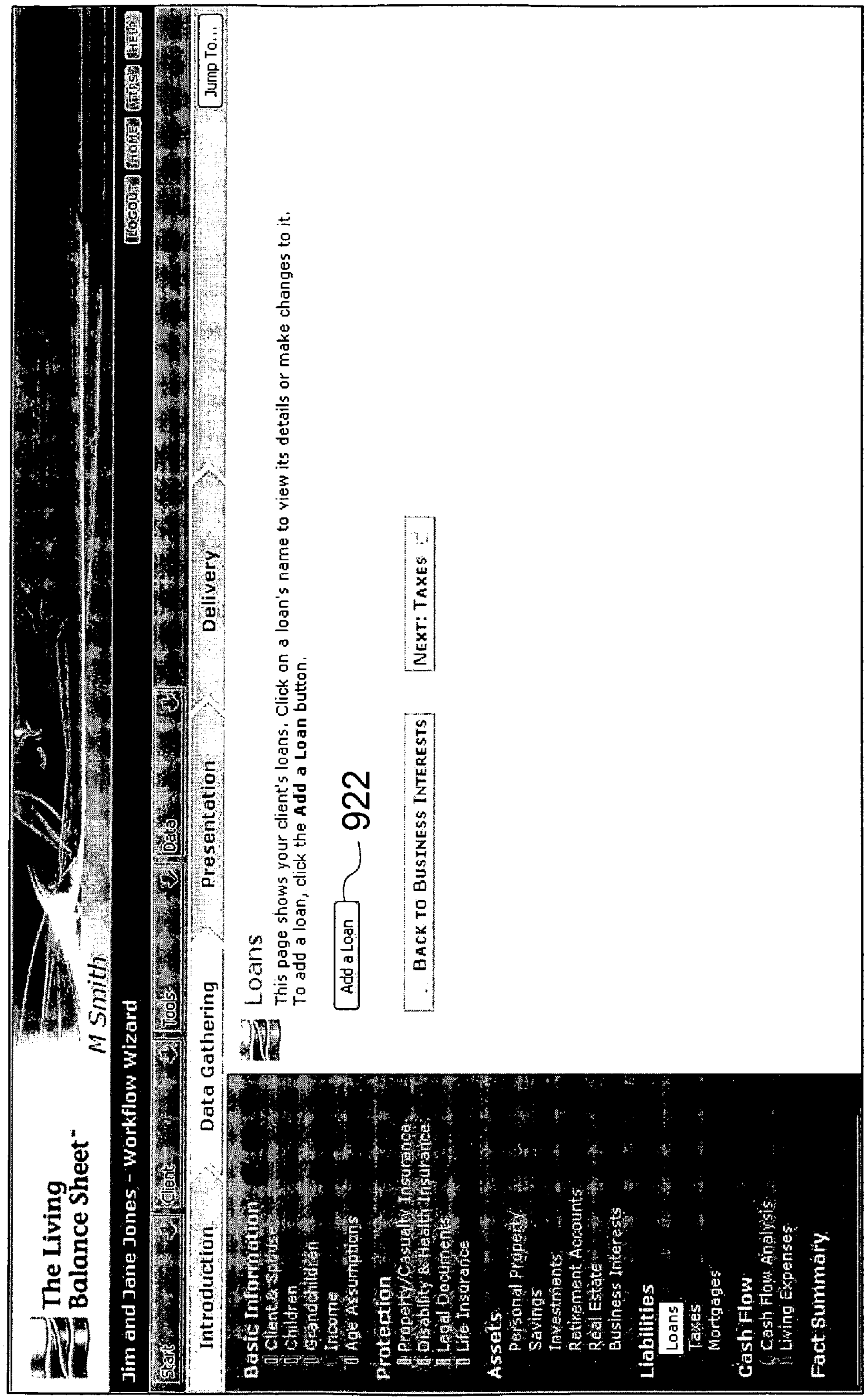
Figure 93:
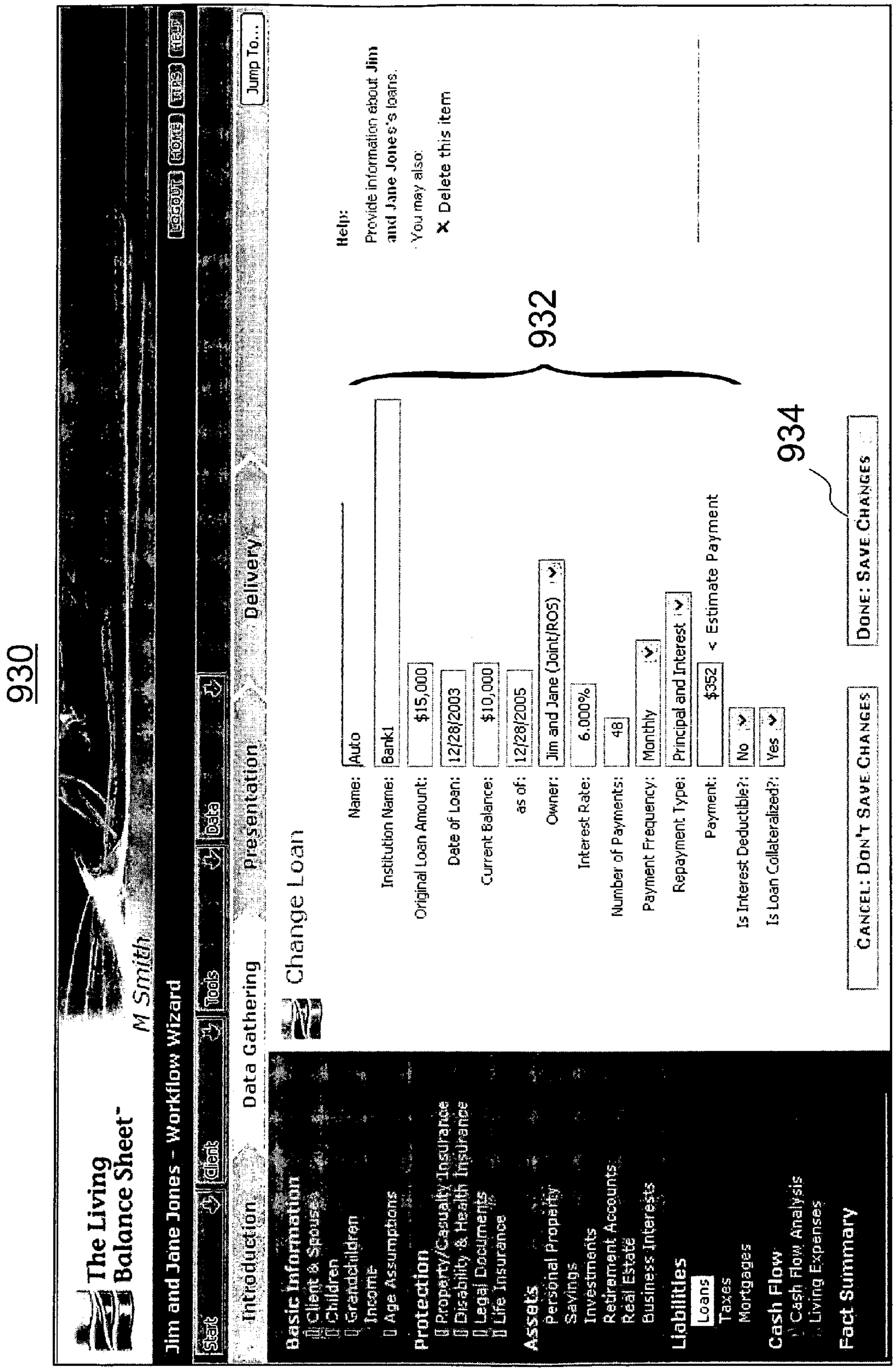

By selecting next button 914 of FIG. 91, a user can move to loans display page 920 of FIG. 92, which as shown corresponds to the "loans" subsection of the liabilities section, which follows the assets section. Loans display page 920 is preferably structured in the same way as other initial or top-level subsection display pages (e.g., capability of a summary list and a button for adding new items), such as, life insurance display page 690 of FIG. 69, legal documents display page 560 of FIG. 56, disability and health insurance display page 480 of FIG. 48, or income display page 260 of FIG. 26. Change loan display page 930 of FIG. 93 can be displayed when a user selects a loan from the summary section of display page 920 (if the user had previously added a loan item for the client). An add loan display page having the same structure and functionality as change loan display page 930 can be displayed if the user is adding a new loan item (e.g., user selected the add a loan button 922 of FIG. 92). Change loan display page 930 includes section 932 for entering details related to a particular loan of the client. As shown, the user can enter (e.g., so as to update data) a loan name, institution name, original loan amount, date of loan, current balance, the "as of" date for the current balance, owner, interest rate, number of payments, payment frequency, repayment type, payment, whether the interest is deductible, or whether the loan is collateralized. By selecting done button 934, the user can save the changes to the loan identified in display page 930. In response, the user can be returned to loans display page 940 of FIG. 94, which would be updated in summary section 942 to show the added or updated loan items. Summary section 942 of display page 940 can show summary information regarding individual loans such as the name of the loan, type of loan, and current balance.

Figure 94:
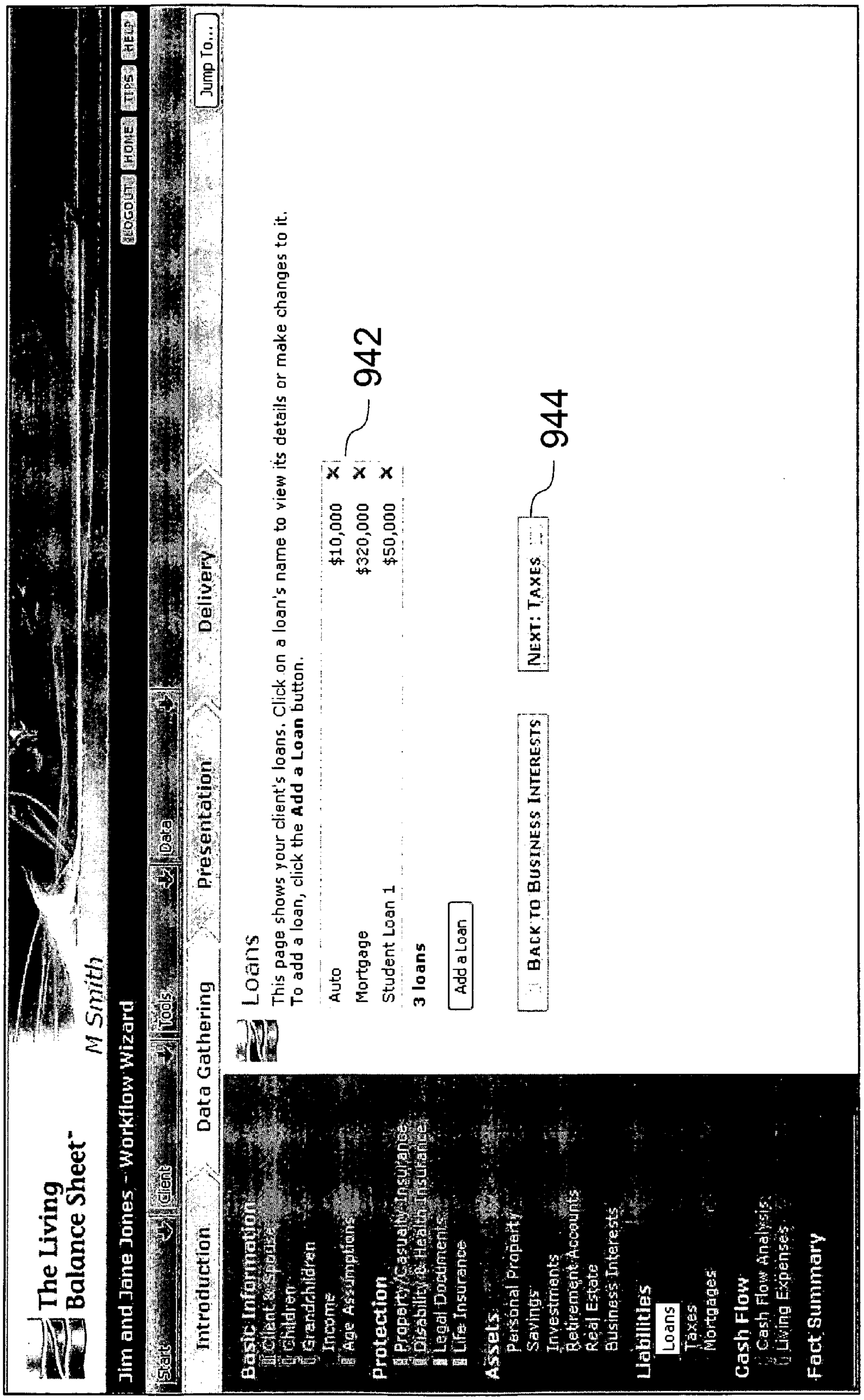
Figure 95:
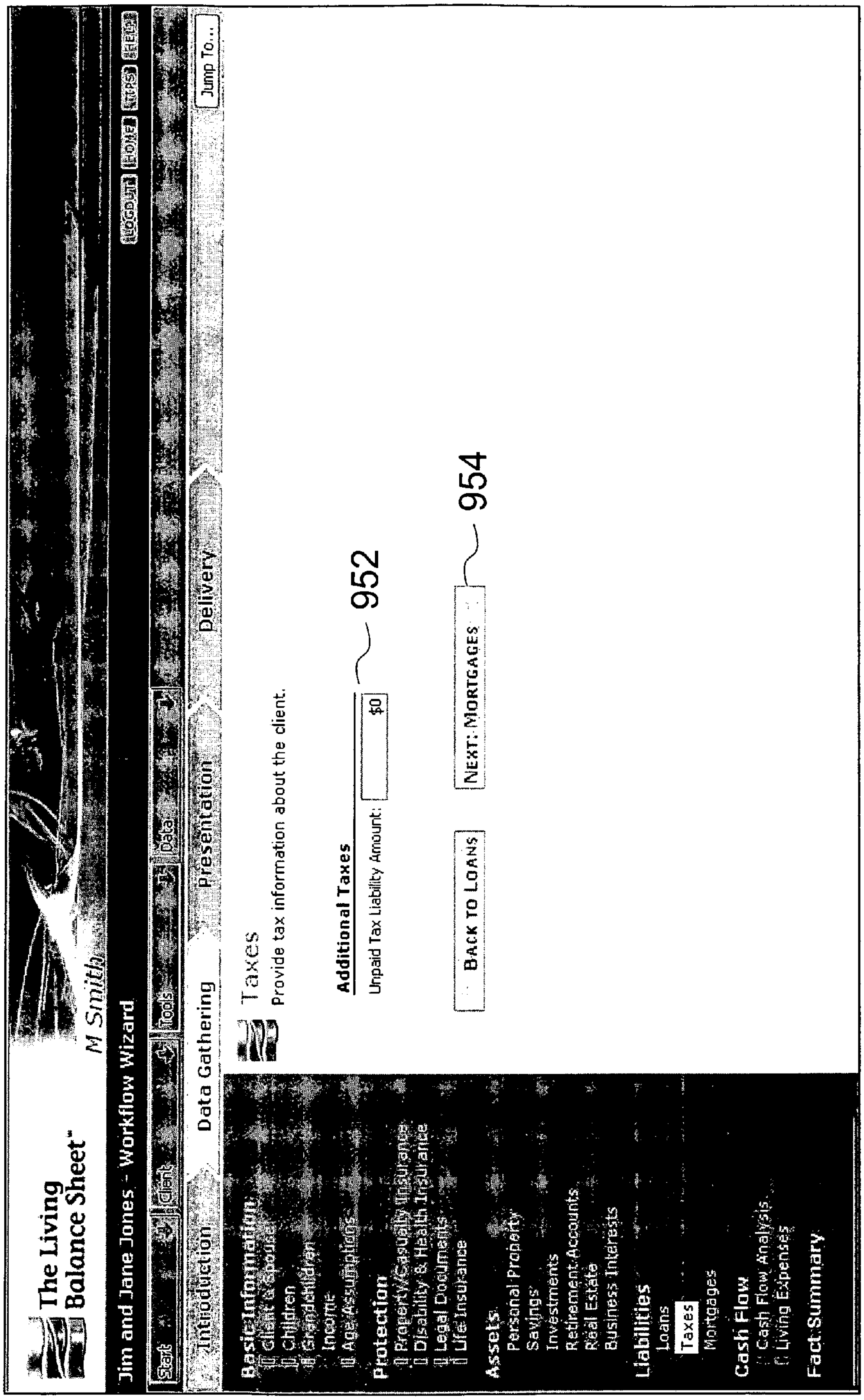

By selecting next button 944 of FIG. 94, a user can move to taxes display page 950 of FIG. 95, which as shown corresponds to the "taxes" subsection of the liabilities section. Tax display page 950 permits the user to enter and save the tax information of the client such as any unpaid tax liability amount that is due by the client. Additional taxes section 952 can be used for such data entry.

Figure 96:
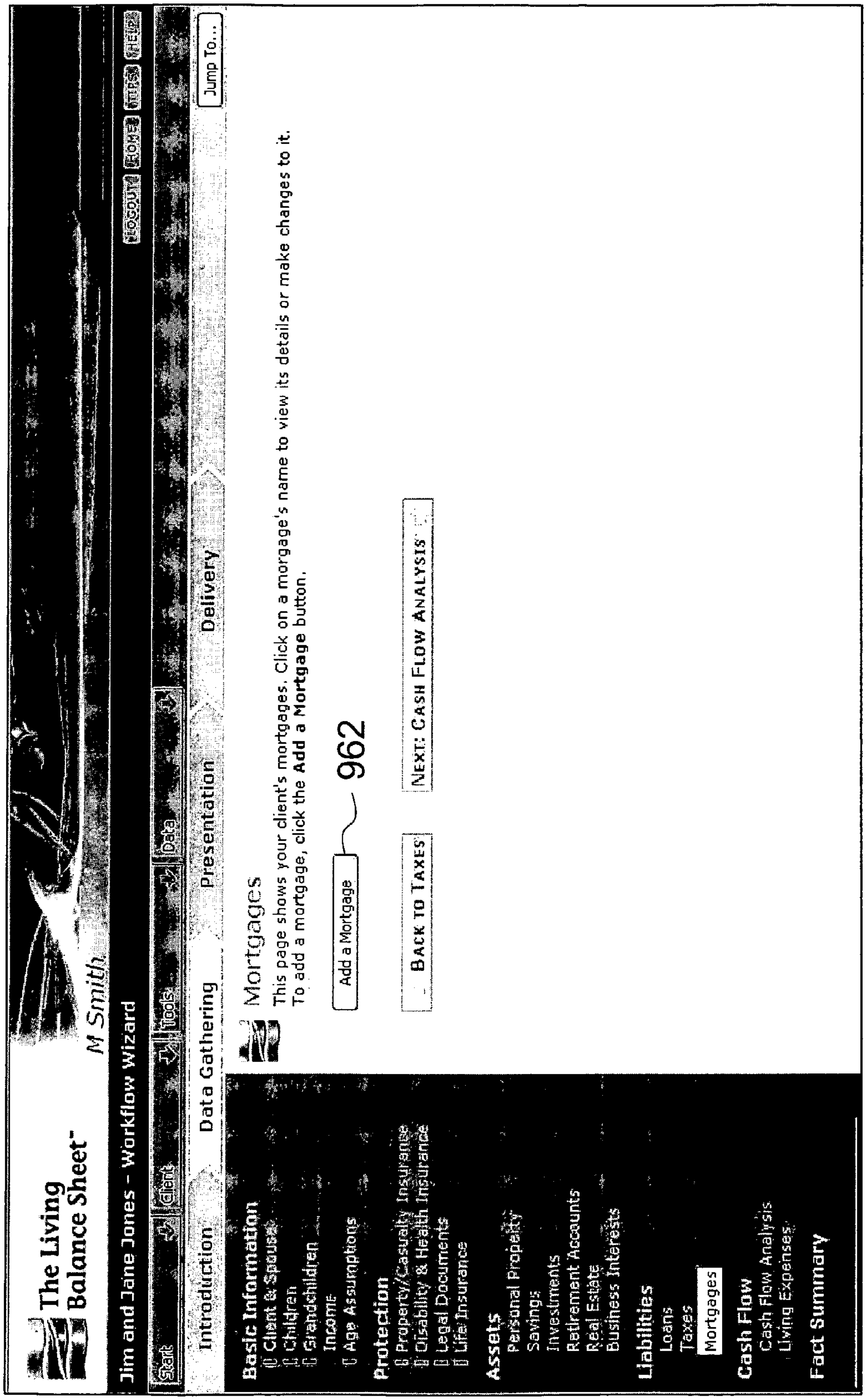
Figure 97:
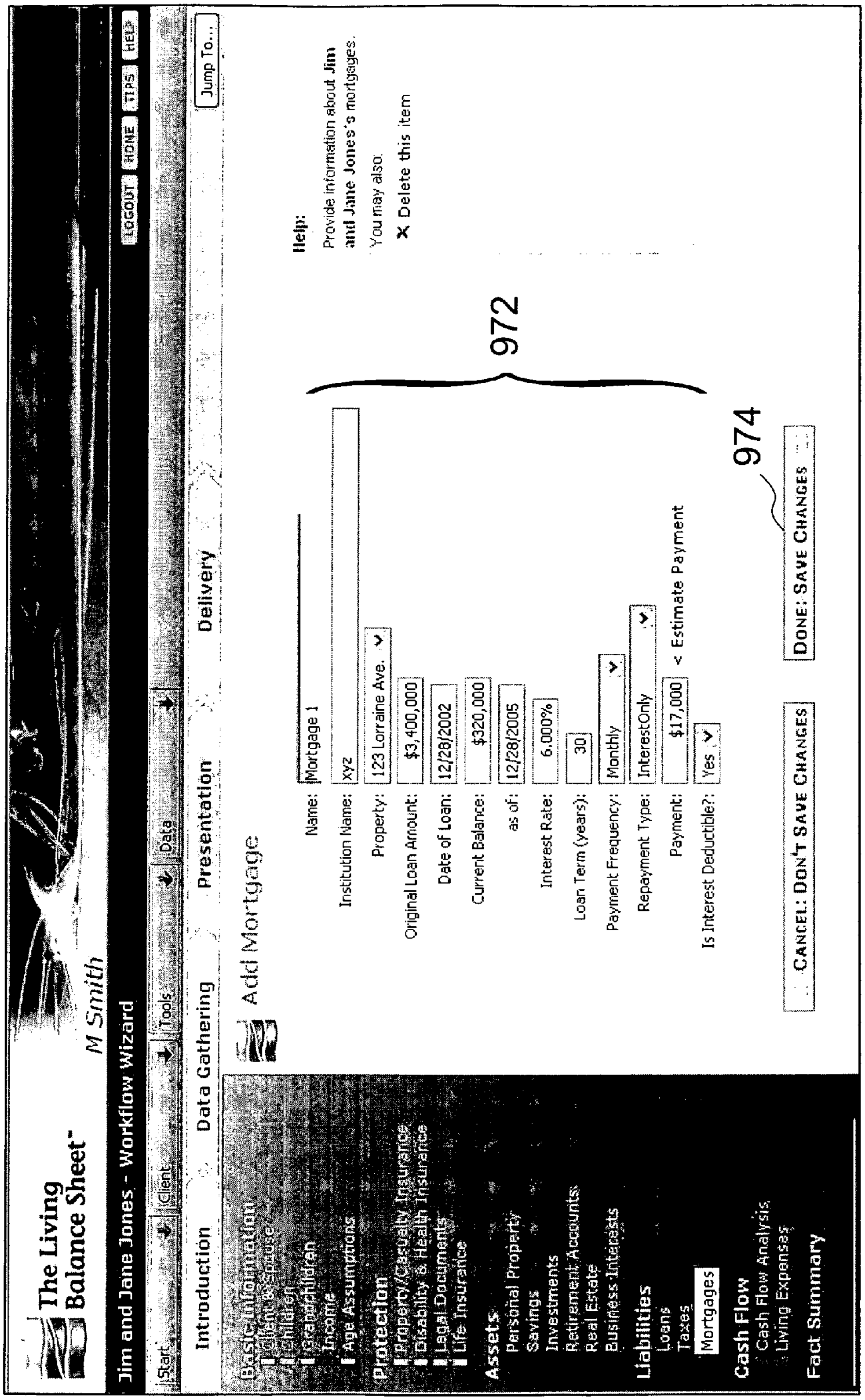
Figure 98:
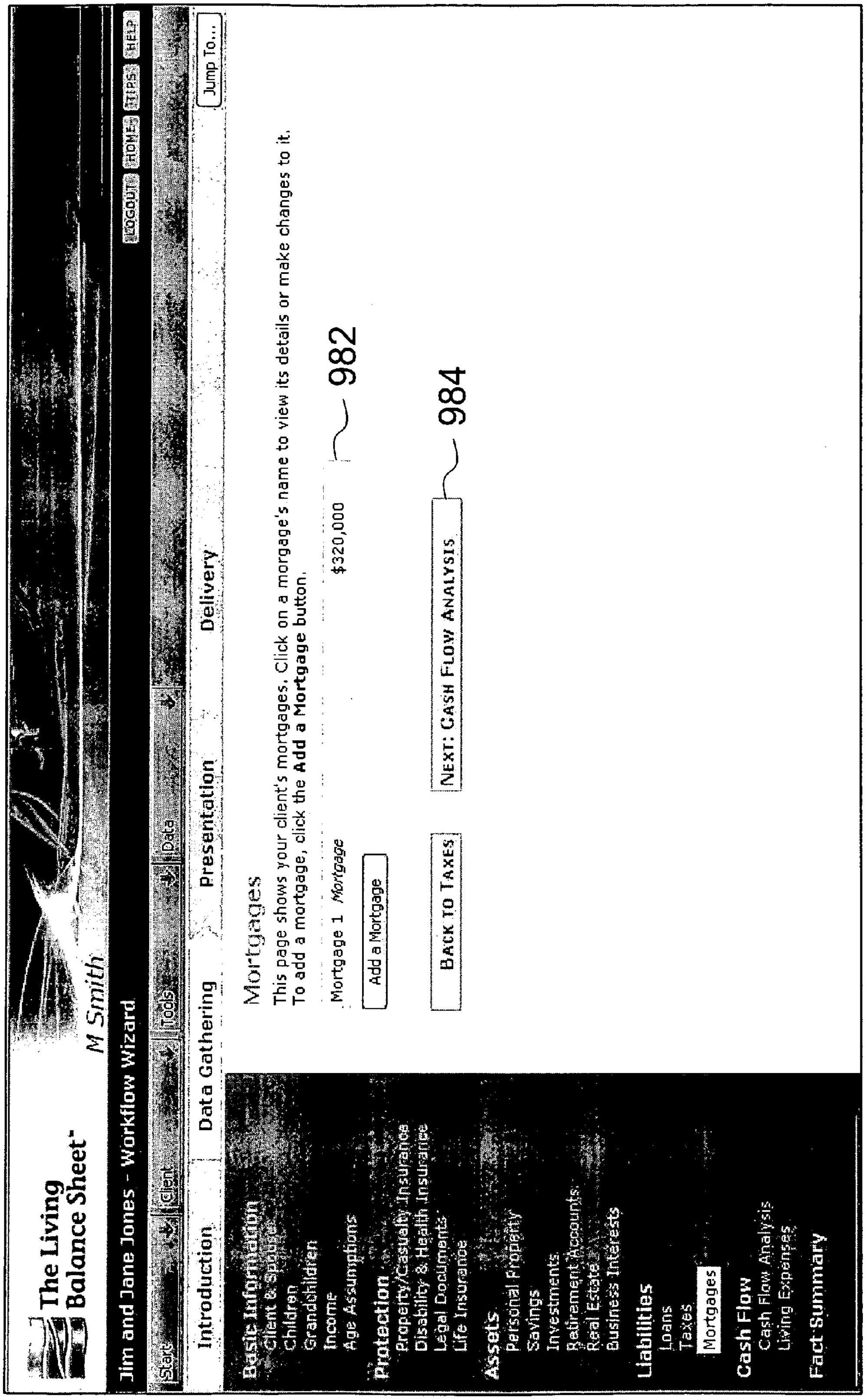

By selecting next button 954 of FIG. 95, a user can move to mortgages display page 960 of FIG. 96, which as shown corresponds to the "mortgages" subsection of the liabilities section. Mortgages display page 960 is preferably structured in the same way as other initial or top-level subsection display pages (e.g., capability of a summary list and a button for adding new items) such as life insurance display page 690 of FIG. 69, legal documents display page 560 of FIG. 56, disability and health insurance display page 480 of FIG. 48, income display page 260 of FIG. 26. Add mortgage display page 972 of FIG. 97 can be displayed when a user selects add a mortgage button 962 of FIG. 96 to add a mortgage to the client's information. A change mortgage display page having the same structure and functionality as the add mortgage display page 970 can be displayed if the user selects a previously added mortgage from a summary section of the mortgages display page. Add mortgage display page 970 includes section 972 for entering details related to a particular mortgage of the client. As shown, the user can enter a mortgage name, institution, mortgage property (which can for example be selected from an automatically generated list of already entered properties), original loan amount, date of loan, current balance, the as of date for the current balance, the interest rate, loan term, payment frequency, repayment type, payment (e.g., estimated payment), and whether the interest is deductible. By selecting done button 974, the user can add the mortgage and save the related information entered in display page 970. In response, the user can be returned to mortgages display page 980 of FIG. 98, which would be updated in summary section 982 to show the added mortgage. Summary section 982 of display page 980 can display summary information with respect to the name of the mortgage and other values from add mortgage display page 970.

Figure 99:
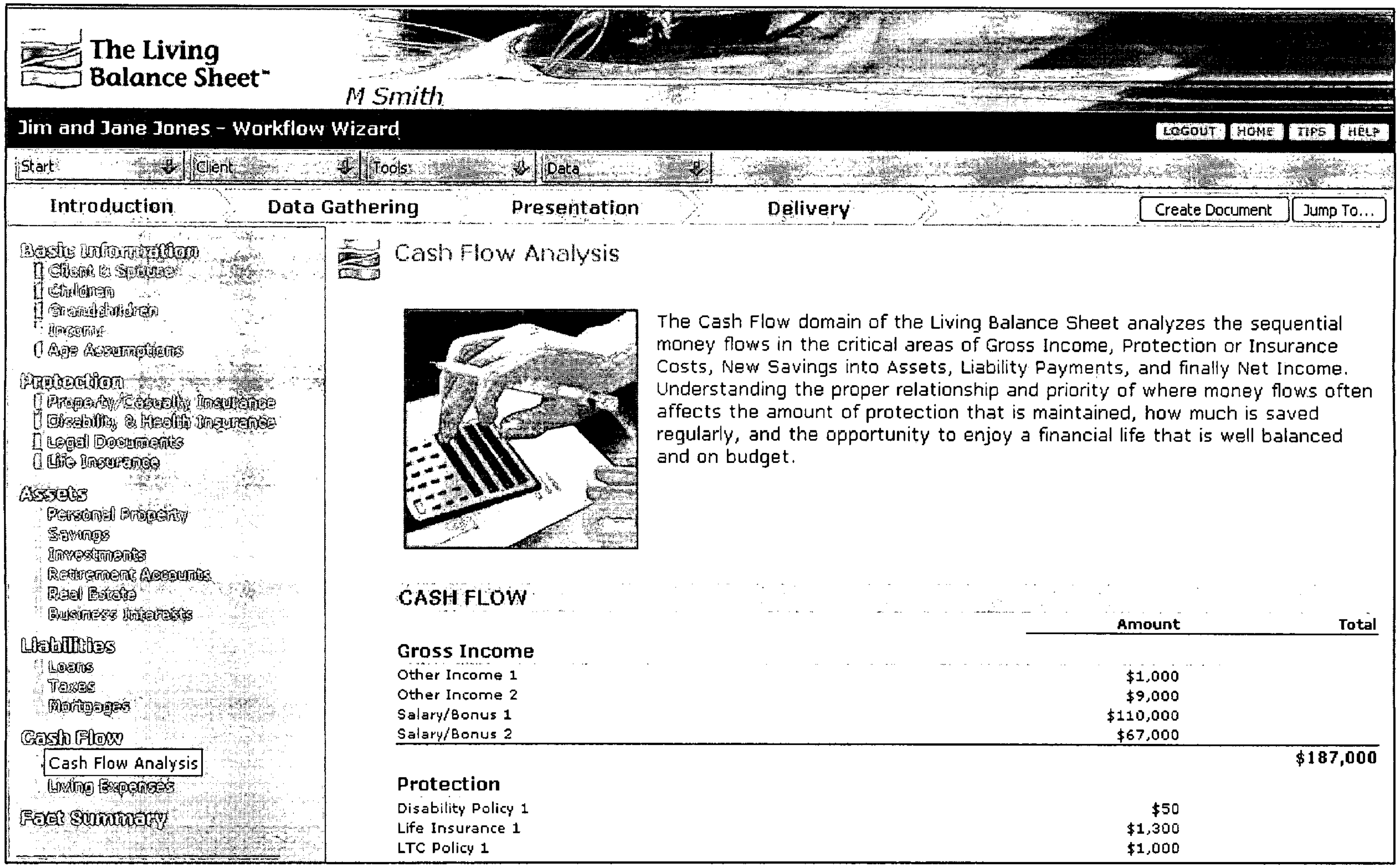

The next section of the workflow wizard can comprise a cash flow section that as shown in FIG. 99 includes a cash flow analysis and living expenses subsections. Cash flow analysis display page 990 of the cash flow analysis subsection can be displayed when for example a user selects next button 984 of FIG. 98. Cash flow analysis display page 990, which is more fully shown by the combination of FIGS. 99 and 100, generates a report and analysis based on the saved client information. Information saved with respect to the gross income, protection (e.g., insurance protection), asset building (e.g., retirement and savings accounts), and liability payments (e.g., mortgages or loans) are retrieved and/or calculated and displayed in display page 990 in a table format. As shown, subtotals are generated for the different categories and a net income value is calculated and displayed. Individual line items can if desired be selectable to quickly move the user to a corresponding display page.

Figure 101:
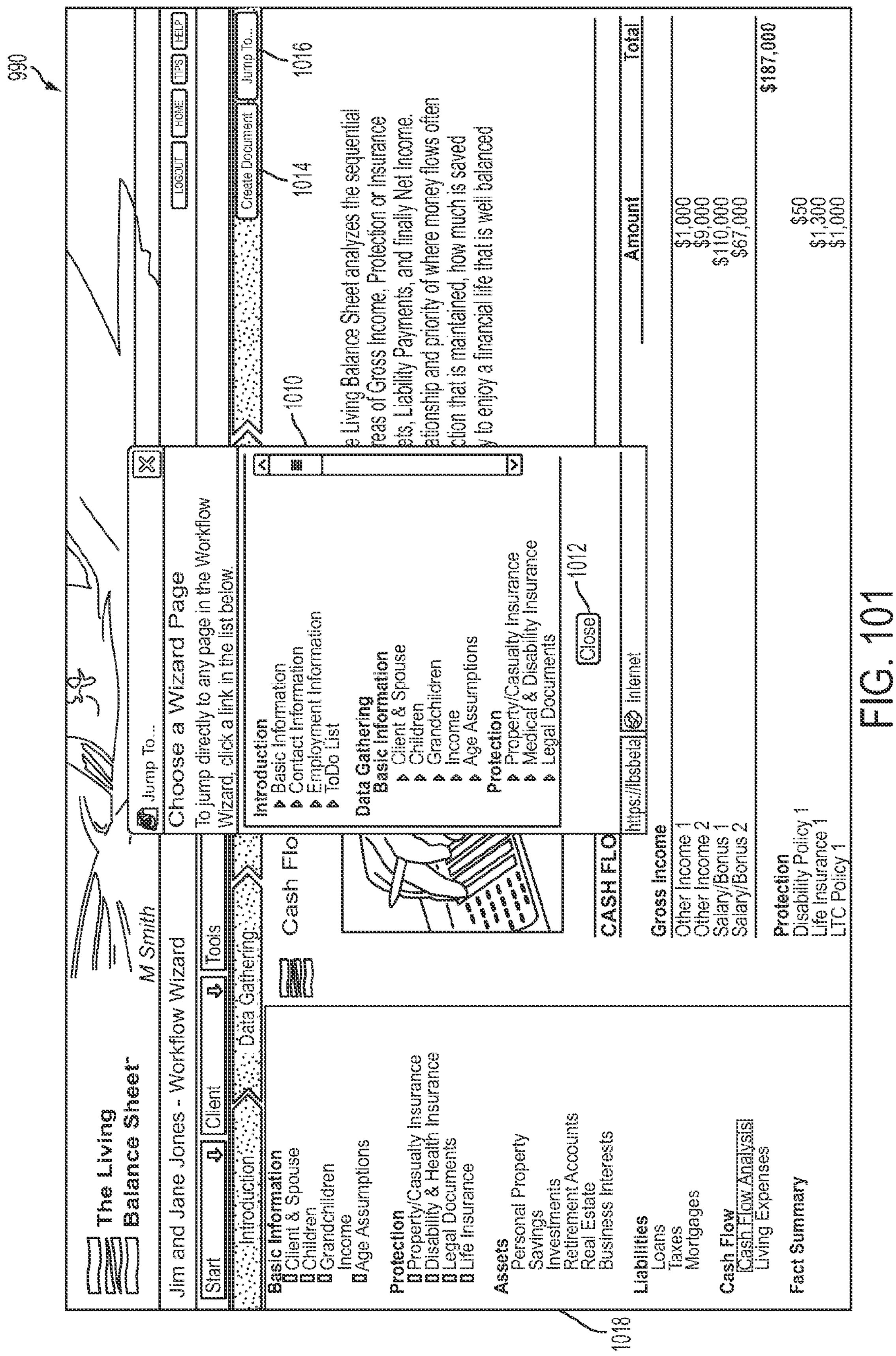
Figure 102:
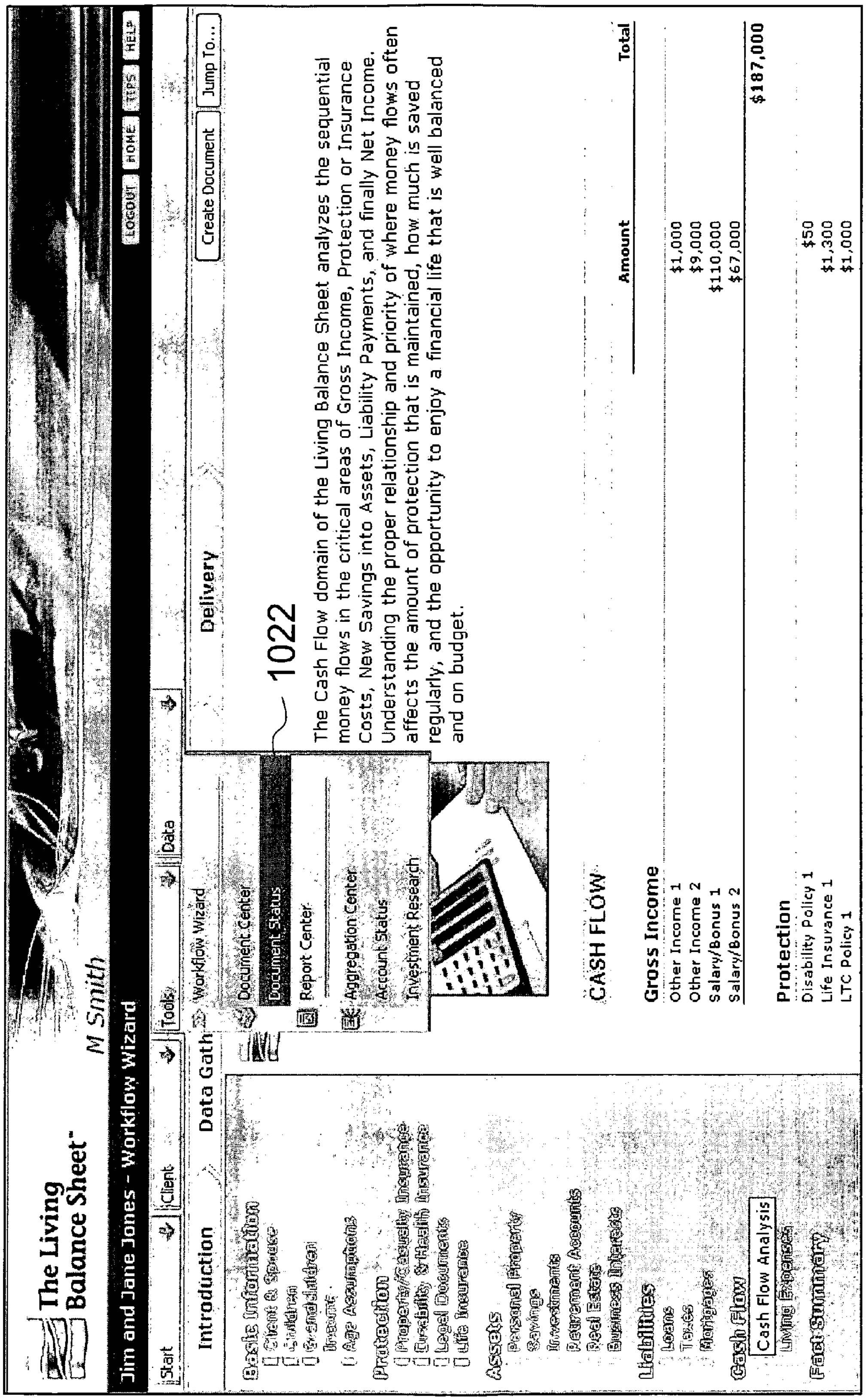

As shown, cash flow display page 990 of FIG. 101 can include jump to button 1016, which is a functionality that is also included in other figures. Using jump to button 1016, a user can jump between display pages within the workflow wizard without having to view the sequence of display pages that are between two end pages. When jump to button 1016 is selected, wizard page pop-up window 1010 is displayed. Window 1010 displays the outline of the workflow wizard such as by displaying the sections and subsections. The displayed information in window 1010 can be a redisplay of the workflow wizard. By selecting an item in window 1010, the software will automatically move the user to a display page corresponding to the selected item. Close button 1012 can be used to close window 1012. Create document button 1014 can be used to generate reports and other documents for the user that would be automatically populated with the client's information. For example, create document button 1014 when selected will cause the software to generate a cash flow document based on the contents and information in the cash flow analysis of display page 990.

Figure 103:
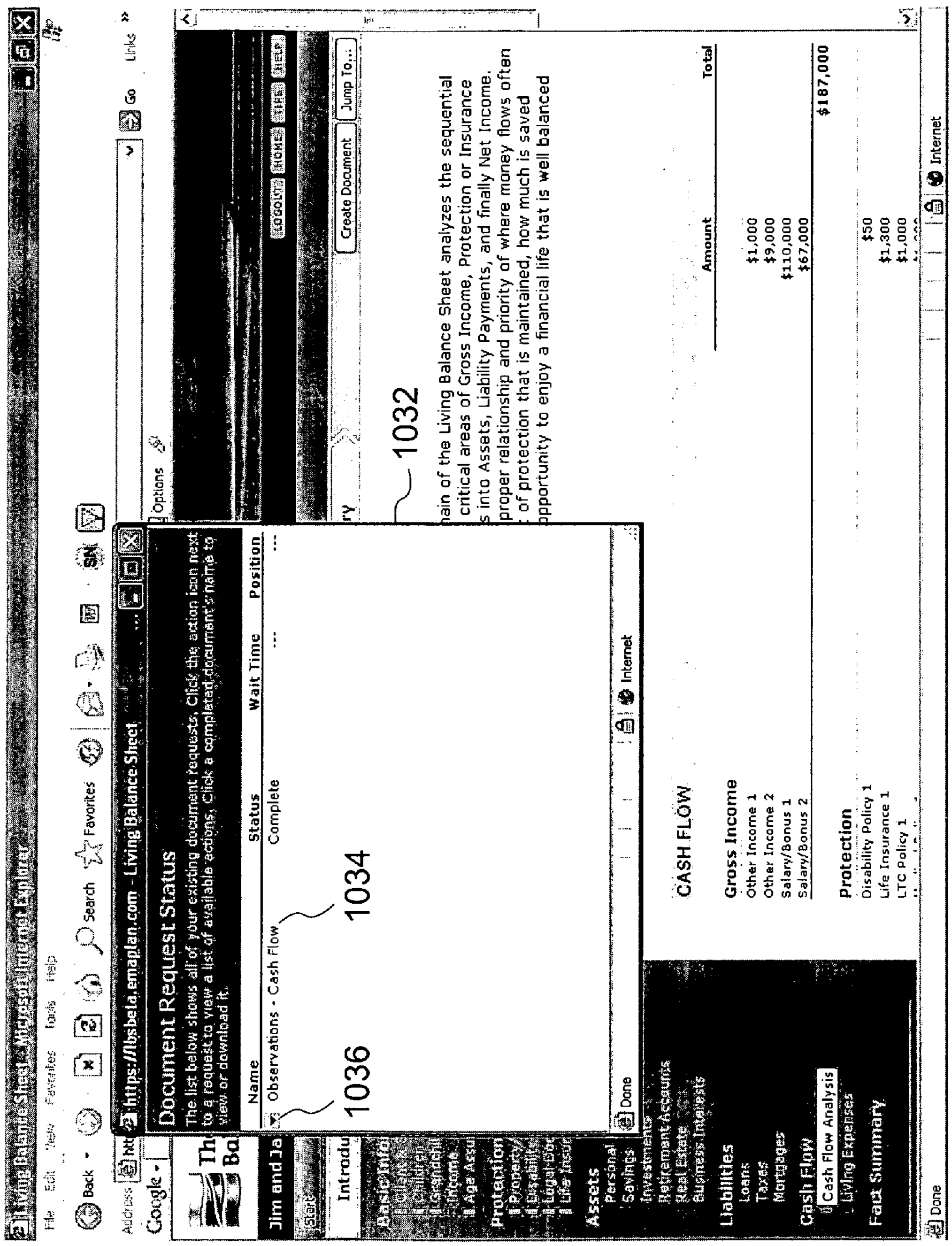
Figure 104:
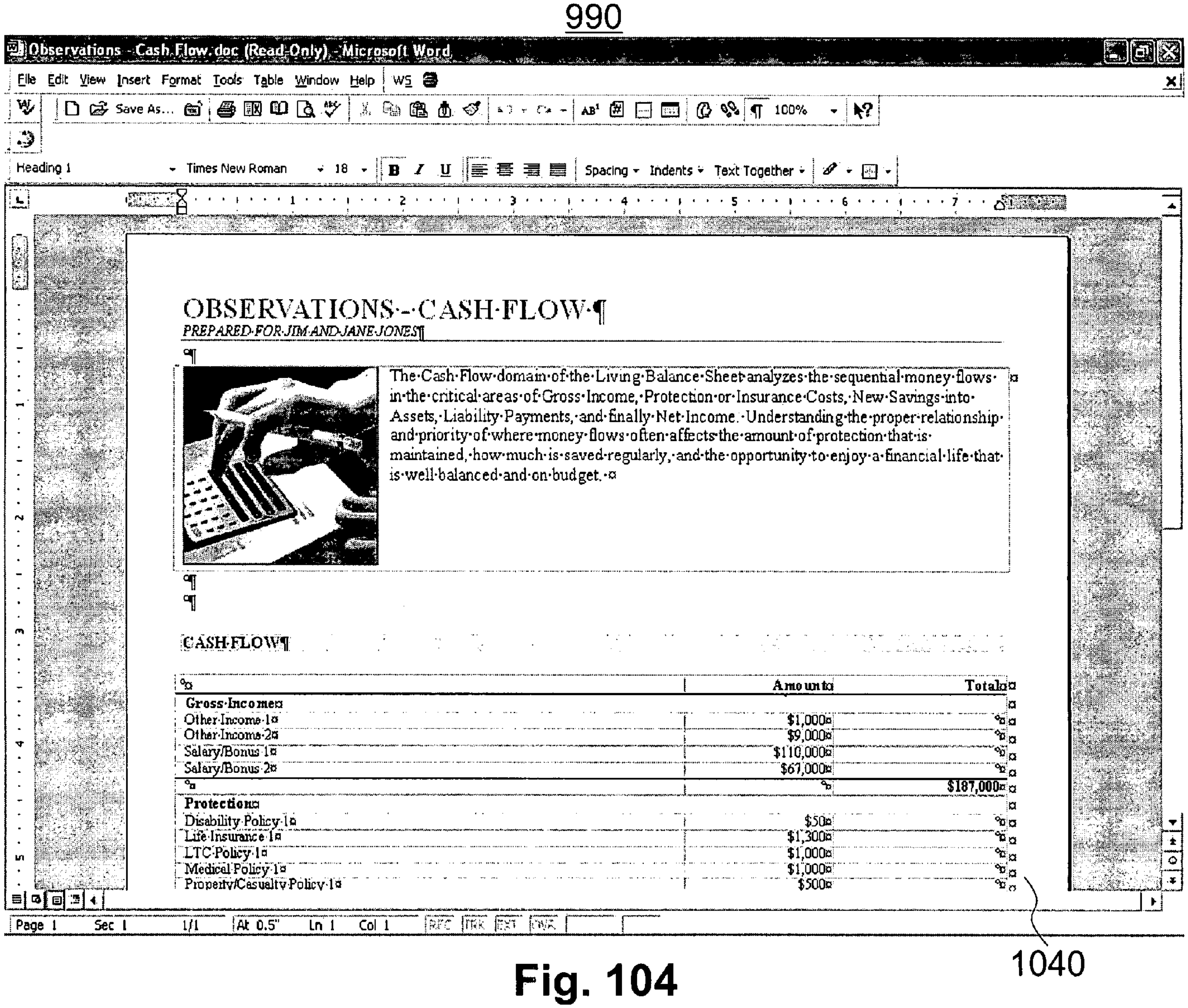
Figure 105:
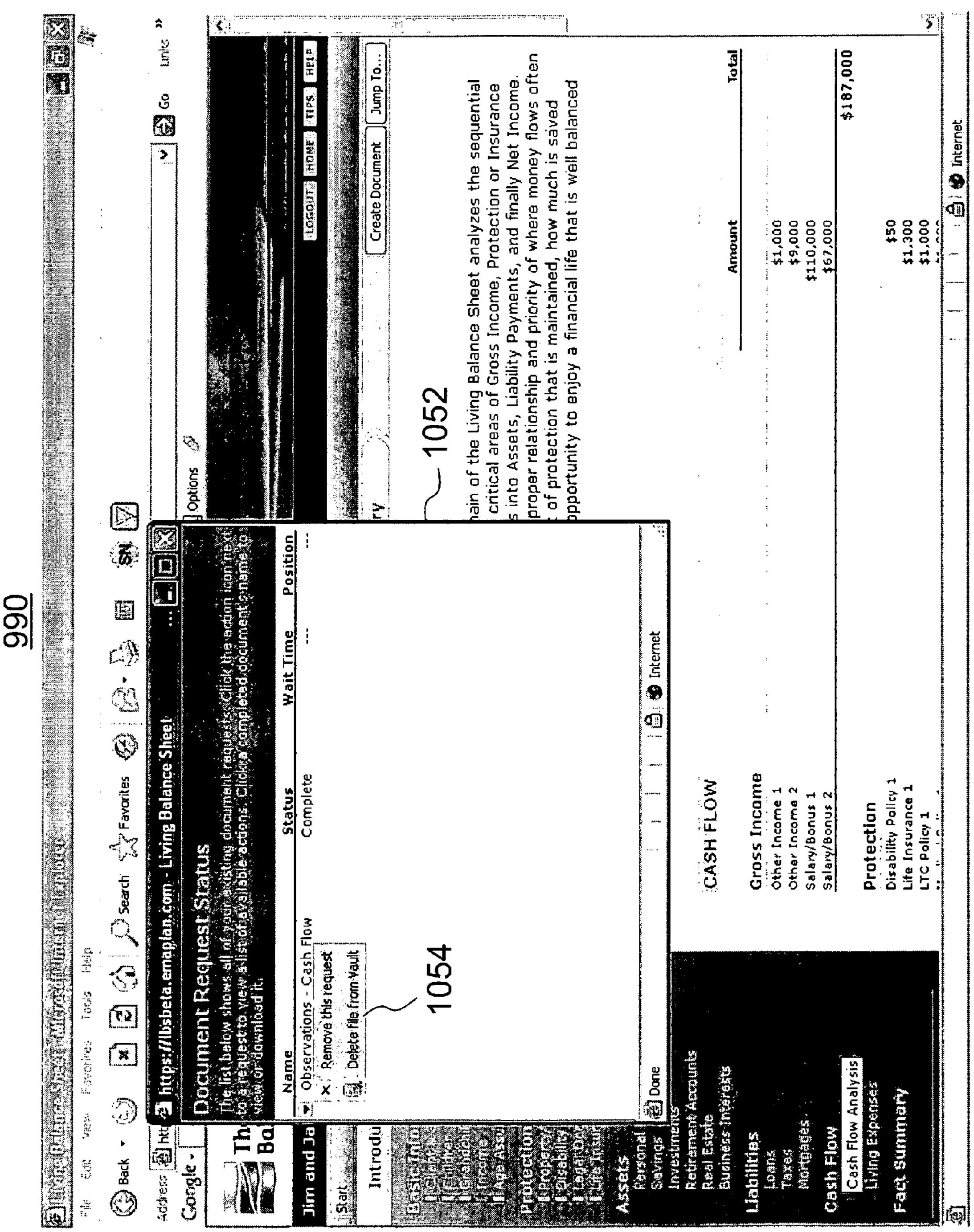

In some instances, the document may not be immediately generated or available such as for example when the bulk of the processing occurs remotely such as at the server. To check the status of a document, a user is allowed to pull down the tools menu and select document status option 1022. In response to such a selection, document request status window 1032 of FIG. 103 can be displayed. Window 1032 as shown can include list 1034 of the documents requested by the user along with the status of the document request and if not completed, the expected wait time for the completion of the requested document and the position in the queue for document creation. Arrow 1036 can provide the user with an opportunity to view additional options that are related to a document listed in window 1032. When a user selects (e.g., double clicks) a completed document list 1034, the document can be opened for user review. For example, as shown in FIG. 104, observations—cash flow report 104 can be displayed when it is selected from list 1034 of FIG. 103. The report is opened by an application that is appropriate for the document type of the report. As shown, the report is opened in a word processor application in a read only format. As such, the user may print, send (e.g., via e-mail), or save the document or perform other related functions in connection with the document. When a user selects arrow 1032 of FIG. 103, additional options with respect to the document that is associated with that arrow are displayed. For example, in FIG. 105, options 1054 are displayed, which provide the user with the option for removing that particular document request from the list or deleting a related file from the vault.

Figure 100:
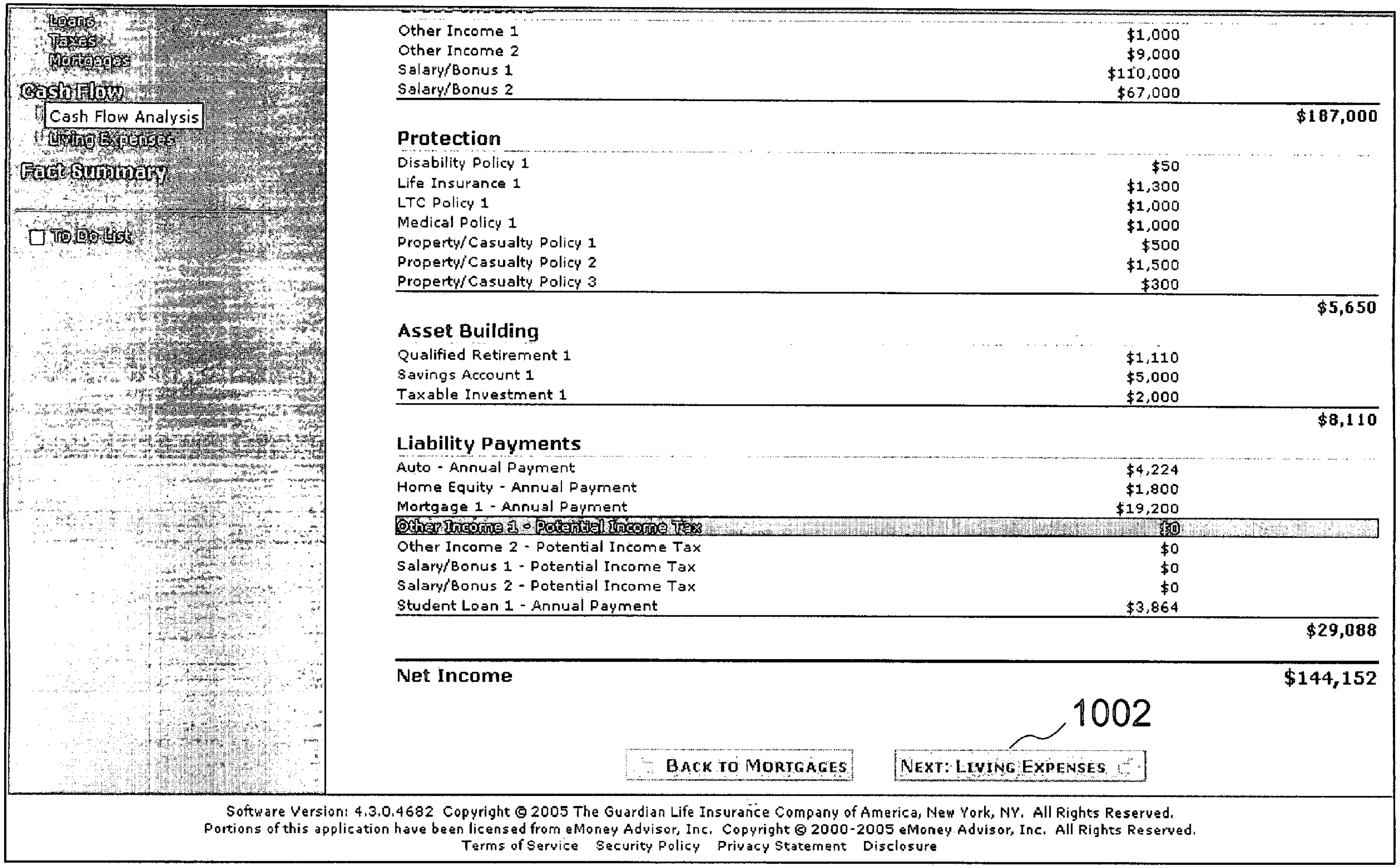
Figure 106:
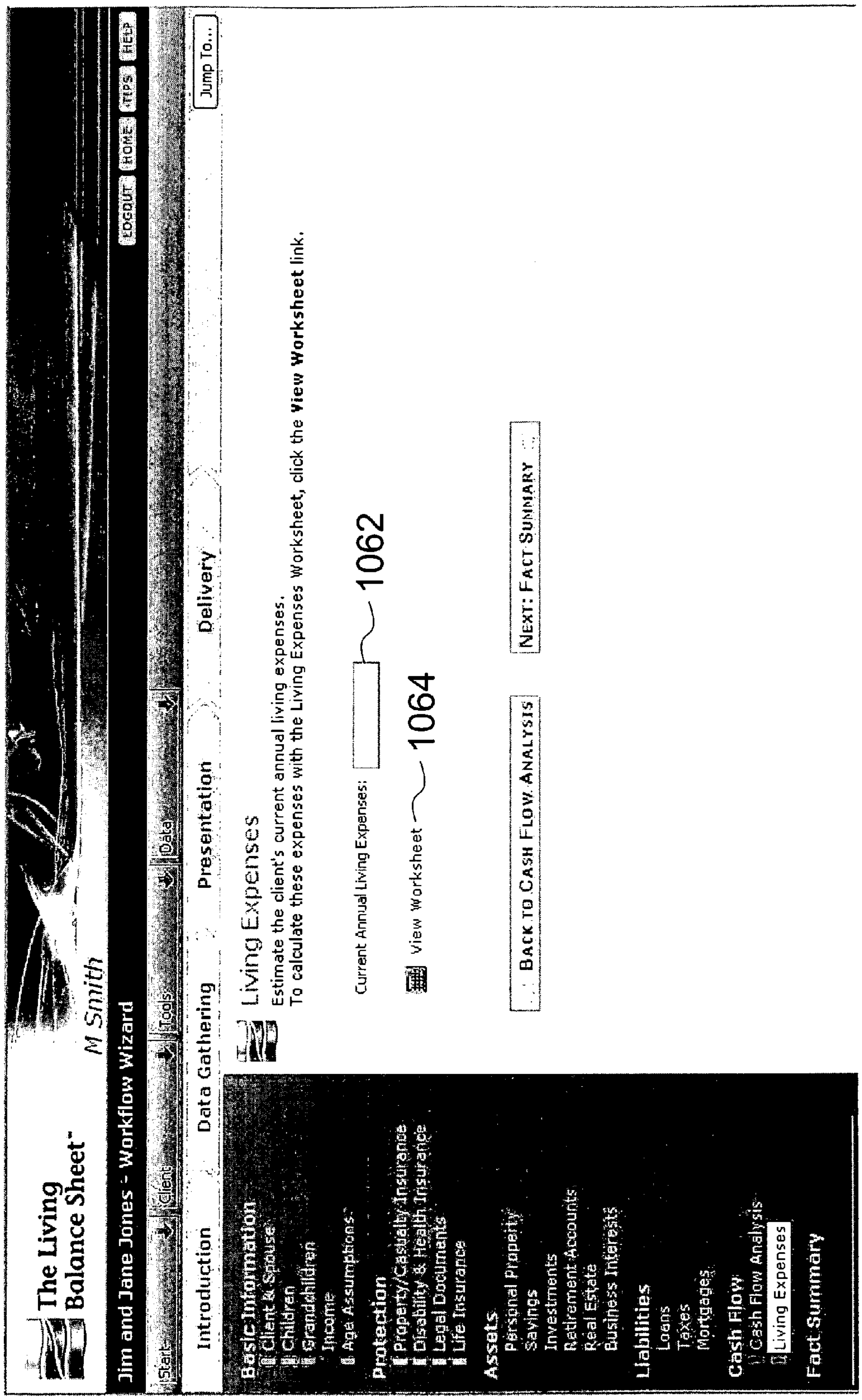
Figure 107:
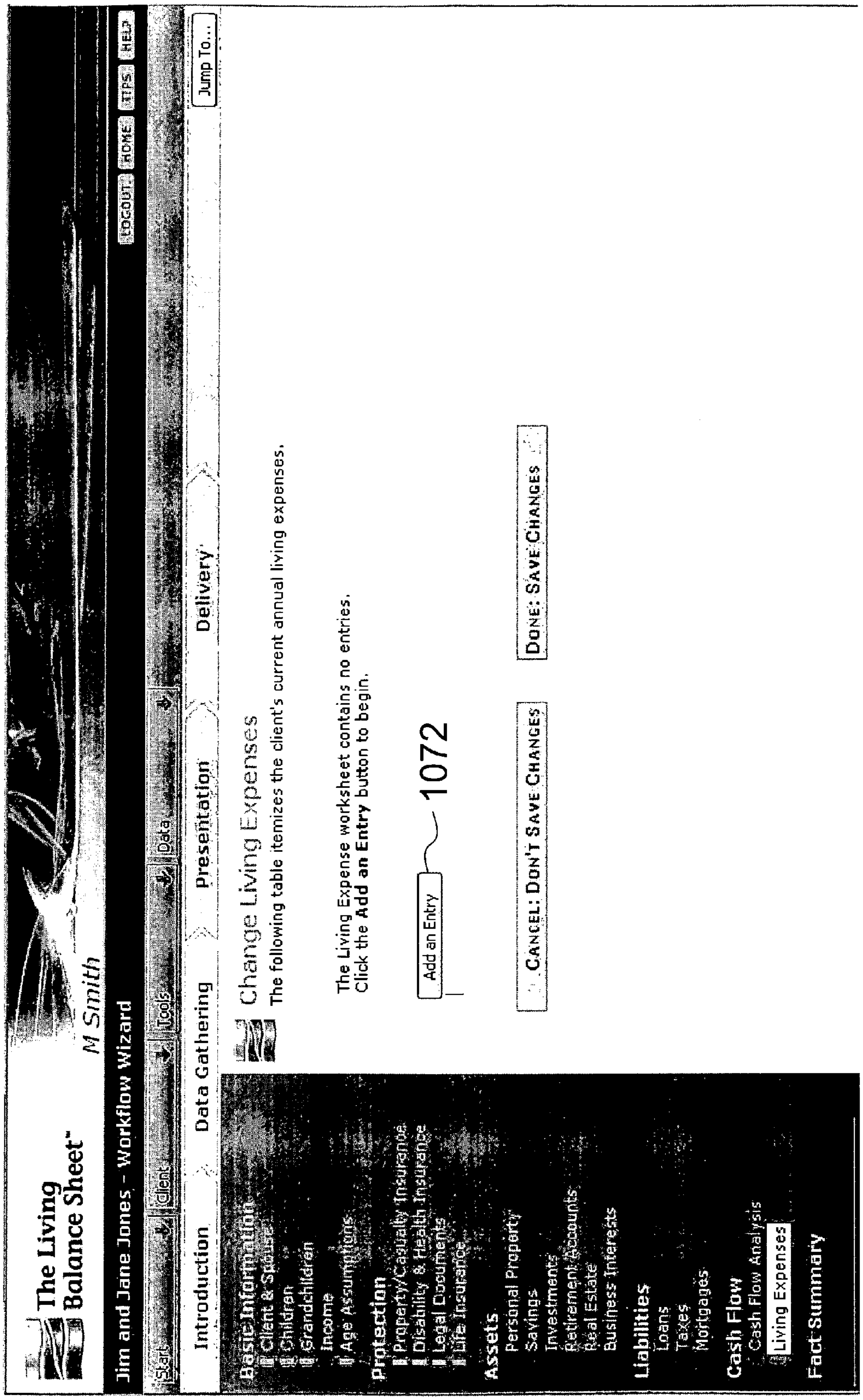
Figure 108:
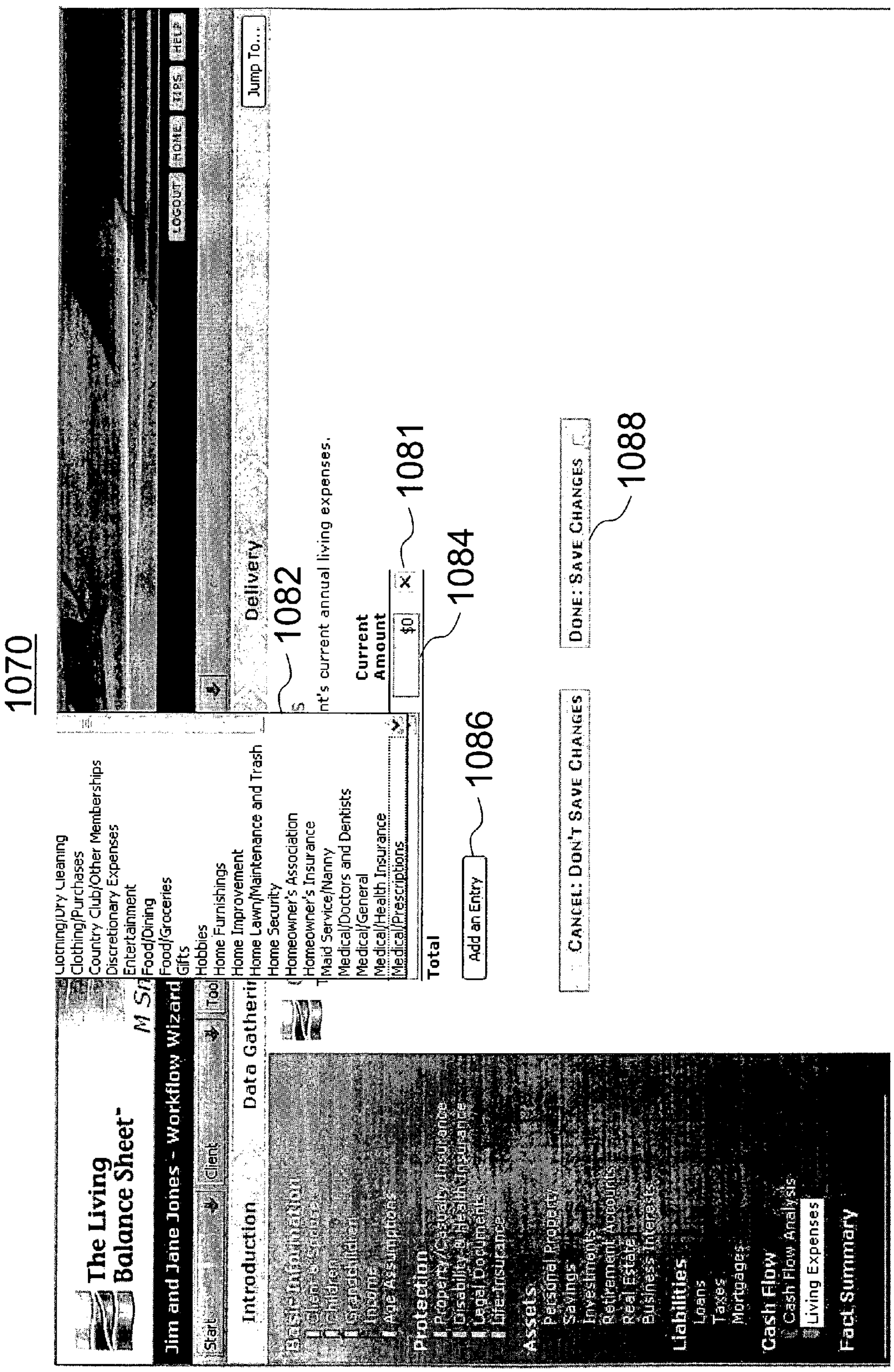
Figure 109:
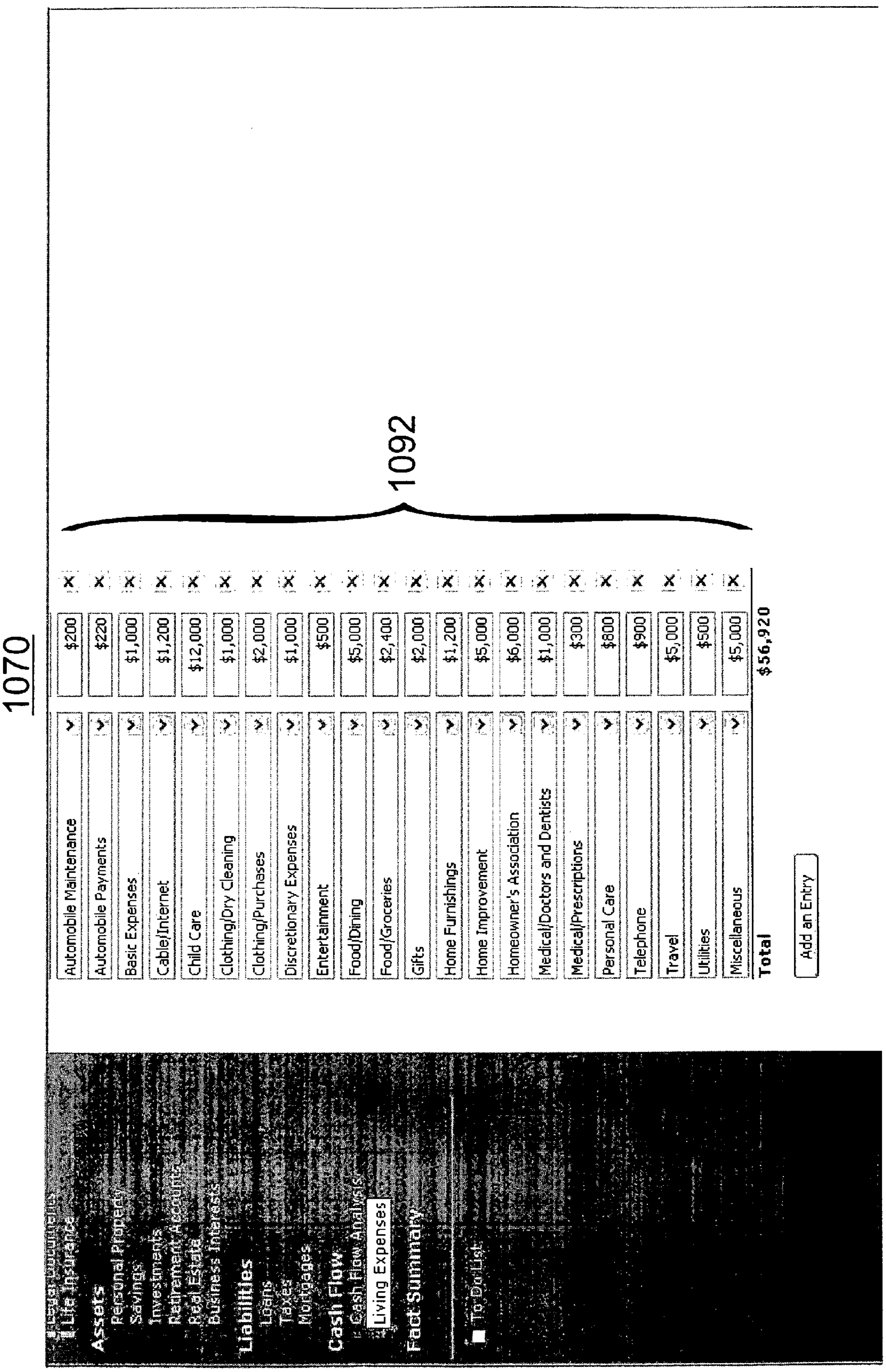
Figure 110:
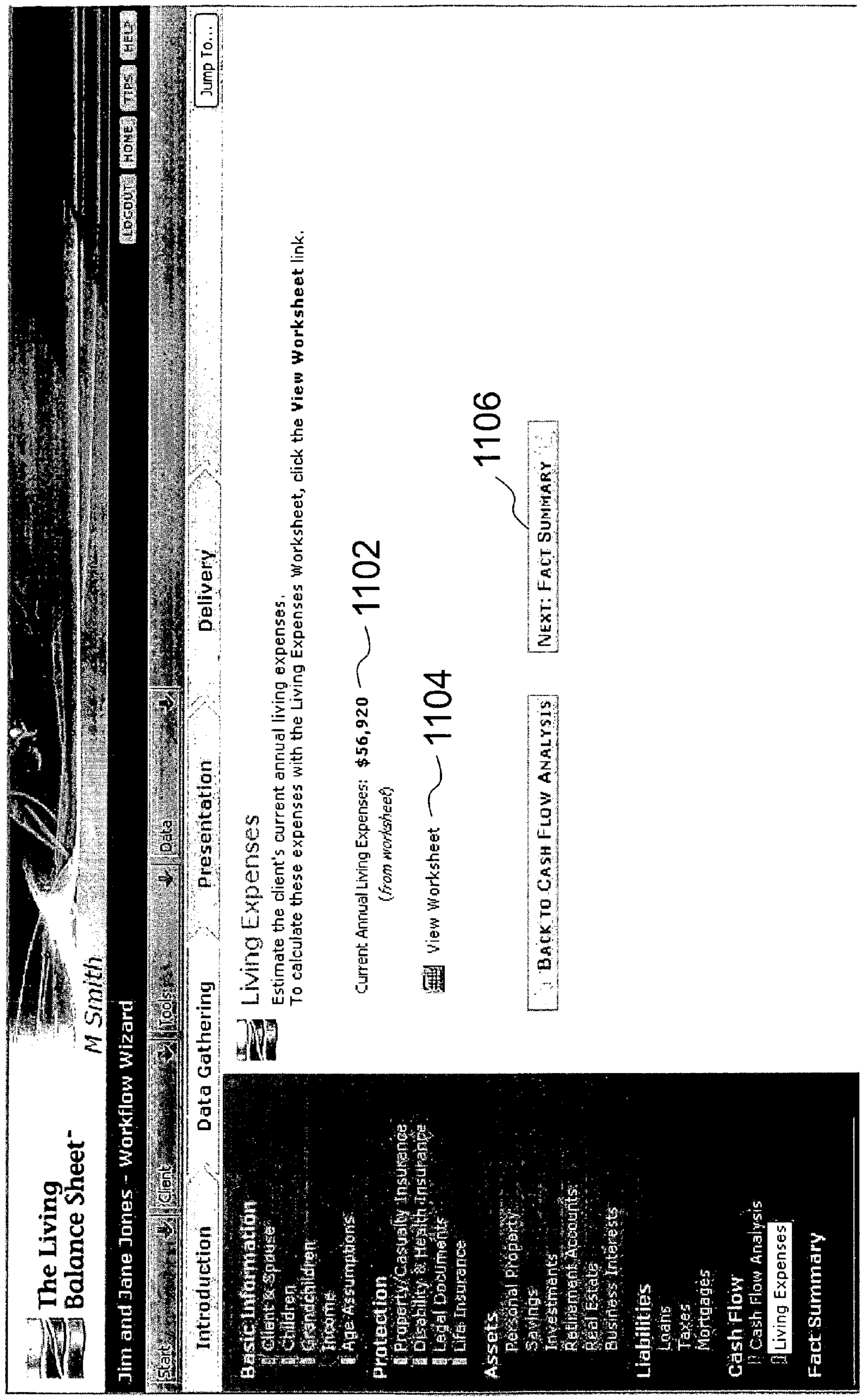
Figure 111:
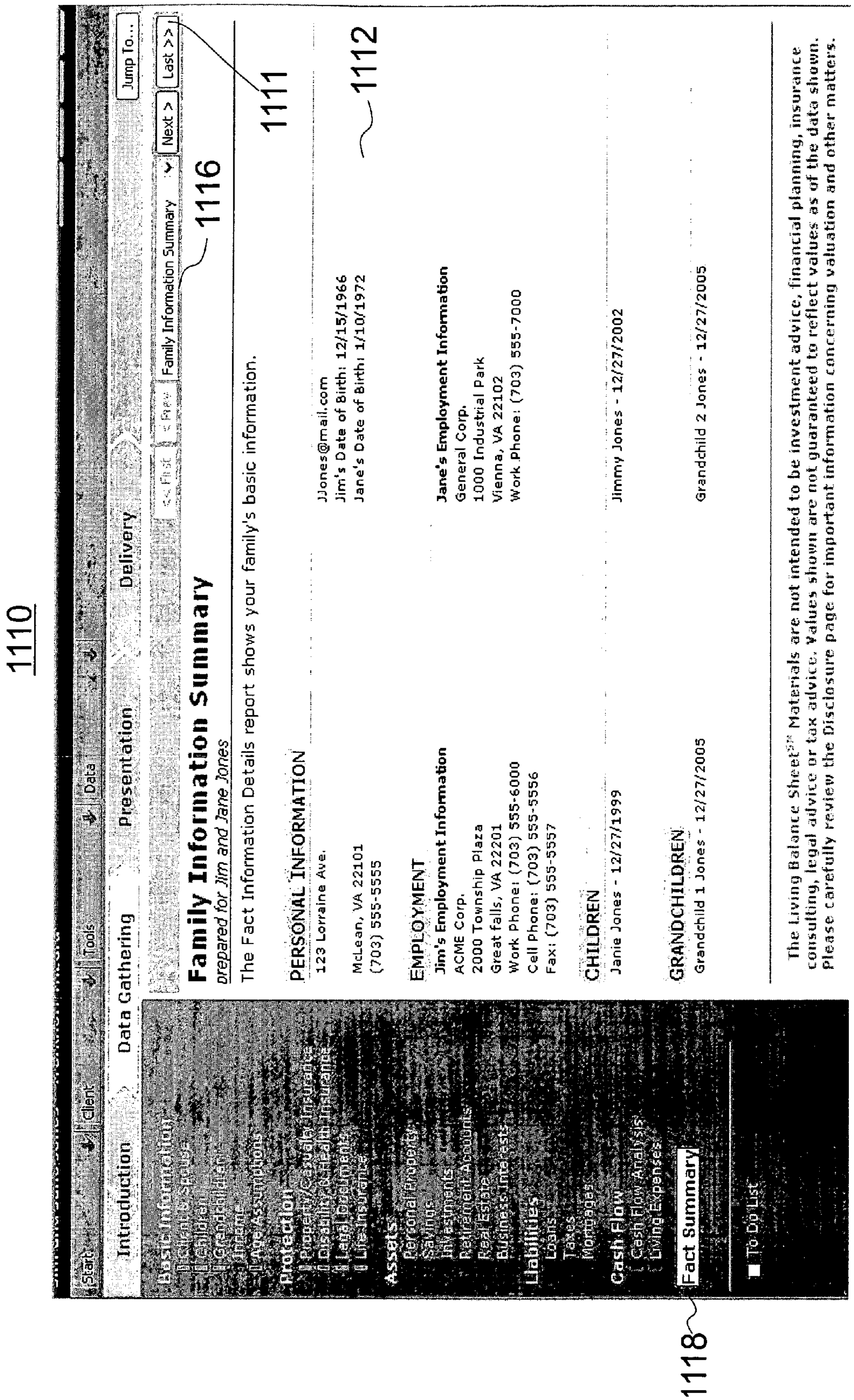

A user can for example move to the next subsection, which is the living expenses subsection of the cash flow section, by selecting next button 1002 of display page 990 of FIG. 100. In response, living expenses display page 1060 can be displayed. Living expenses display page 1060, as shown, provides the user with the option of estimating the client's current annual living expenses by entering the estimate in field 1062 or to use an interactive worksheet for generating an estimate through a detailed approach by using worksheet option 1064. Change living expenses display page 1070 can be displayed when the user selects worksheet option 1064 of FIG. 106. Change living expenses display page 1070 includes a summary of expense entries added by the user and includes add an entry button 1072 for adding entries. By selecting add an entry button 1072, expense entry 1081 is automatically added to display page 1070 for interaction by the user. Entry 1081 includes pull-down menu 1082, current amount field 1082, and an option for deleting that entry ("X"). Pull-down menu 1082 can be preconfigured with a comprehensive list of different categories of living expenses as for example shown. A user can select a category and enter an estimated annual amount for that category to configure the expense based on that client's information. To add new entries, the user can select add an entry button 1086 and make a selection or enter data within the new entry to add the information. By repeating the process, the user can complete a detailed worksheet of the current client's annual expenses such as that shown in FIG. 109. When a user selects, done button 1088 (as shown in FIG. 108), the entered or selected information is saved for the current client. In response living expenses display page 1102 is displayed, which includes an automatically calculated total of the expenses entered in the worksheet of change living expenses display page 1070 of FIGS. 107-109. To return to the worksheet, a user can select view worksheet option 1104 of FIG. 110. To continue to the next section of the workflow wizard, a user can select next button 1106.

Figure 112:
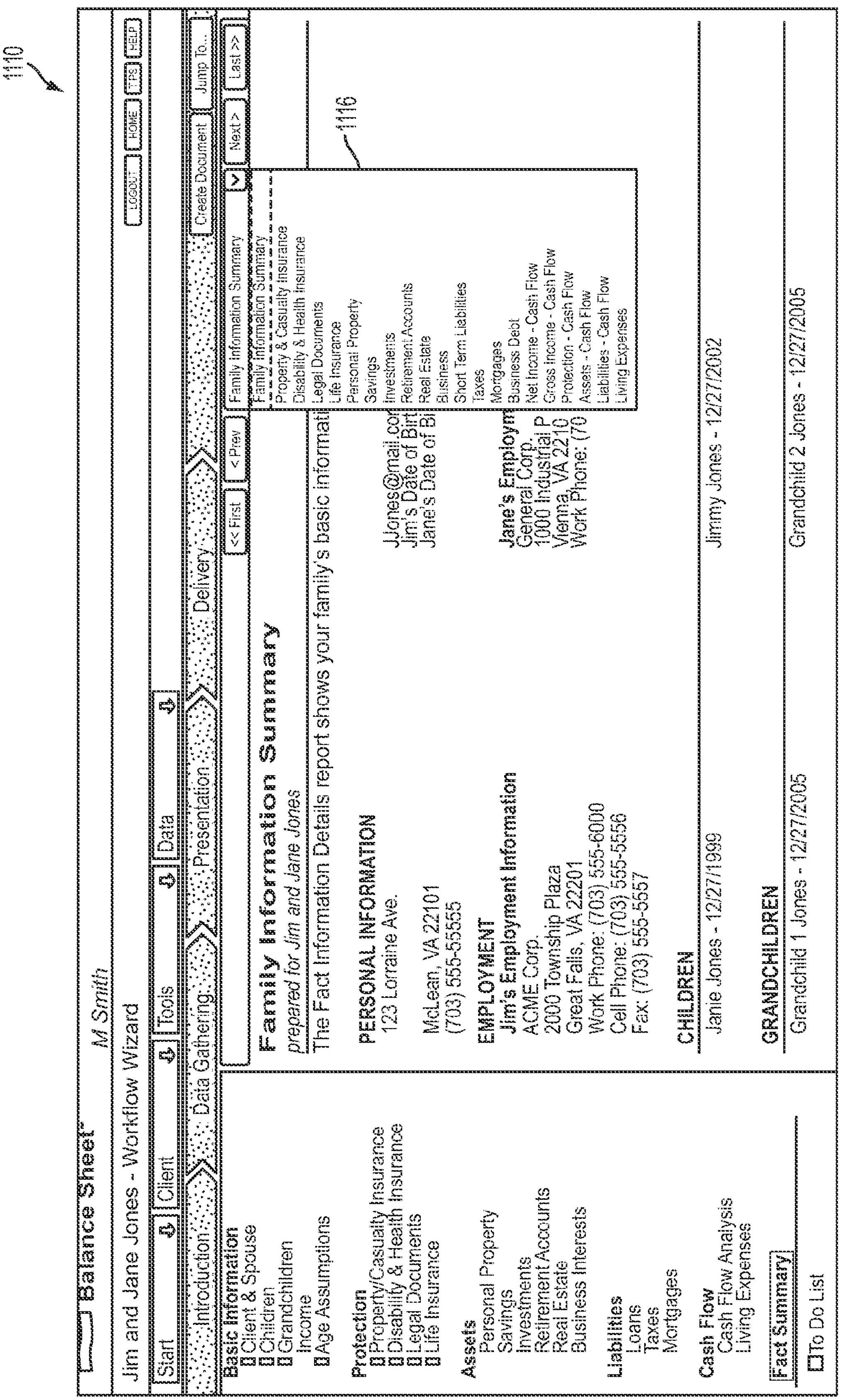

Within the data gathering section, the workflow wizard can include a fact summary section for summarizing the client information that has been entered or calculated in the data gathering stage of the wizard. The fact summary can be segmented to correspond to the data gathering sections and if appropriate the subsections of the data gathering stage. For example, family information summary display page 1110 can be displayed when a user selects next button 1106 of FIG. 110. Family information summary display page 1110 can include summary section 1112 for summarizing the client information that was entered or calculated as part of the basic information section of the data gathering stage. Fact summary section 1118 can include a navigation tool that is specifically for that section. For example, navigation tools 1114 can be implemented in the fact summary section for moving within that section. Tools 1114 can include buttons for moving to the next, previous, last, or first display pages in fact summary section 1118. Switching to this type of navigation method can be beneficial to the user because there is no need to signal to the system that a user desires to further save the information. Preferably, the display pages in fact summary section 1118 only display viewable information that cannot be edited or changed by the user within the displayed pages of that section. Navigation tool 1116 can also include a pull-down menu of quick links to the various display pages within fact summary section 1116 such as that shown in menu 1116 of FIG. 112. For example, a user can move to property & casualty insurance summary display page 1130 (or to the summary display pages of FIGS. 114-124) by selecting a listing for that item in menu 1116 or by selecting the next button of navigation tools 1114 if display page 1130 is the next display page in the sequence of display pages in this section.

Figure 113:
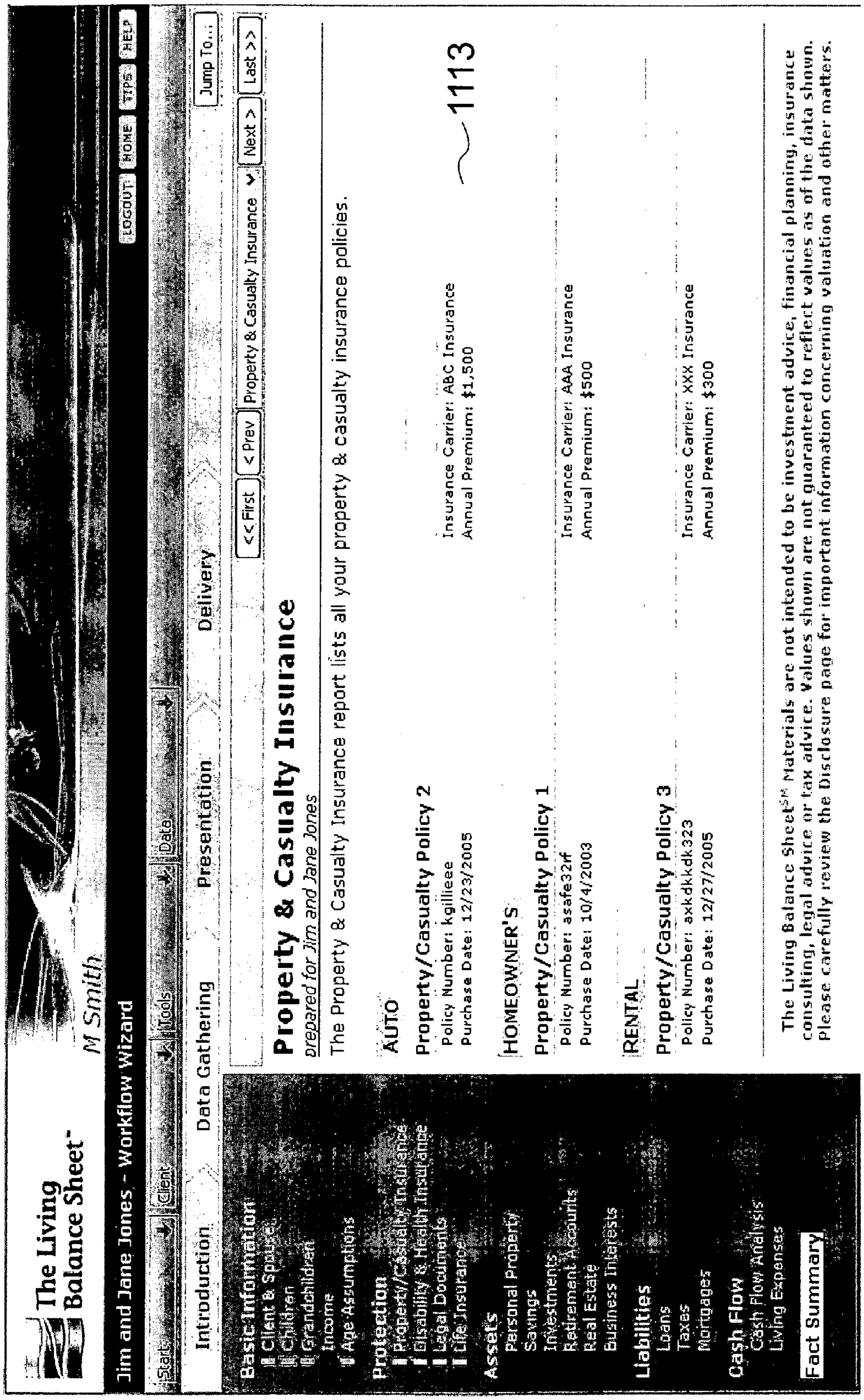
Figure 114:
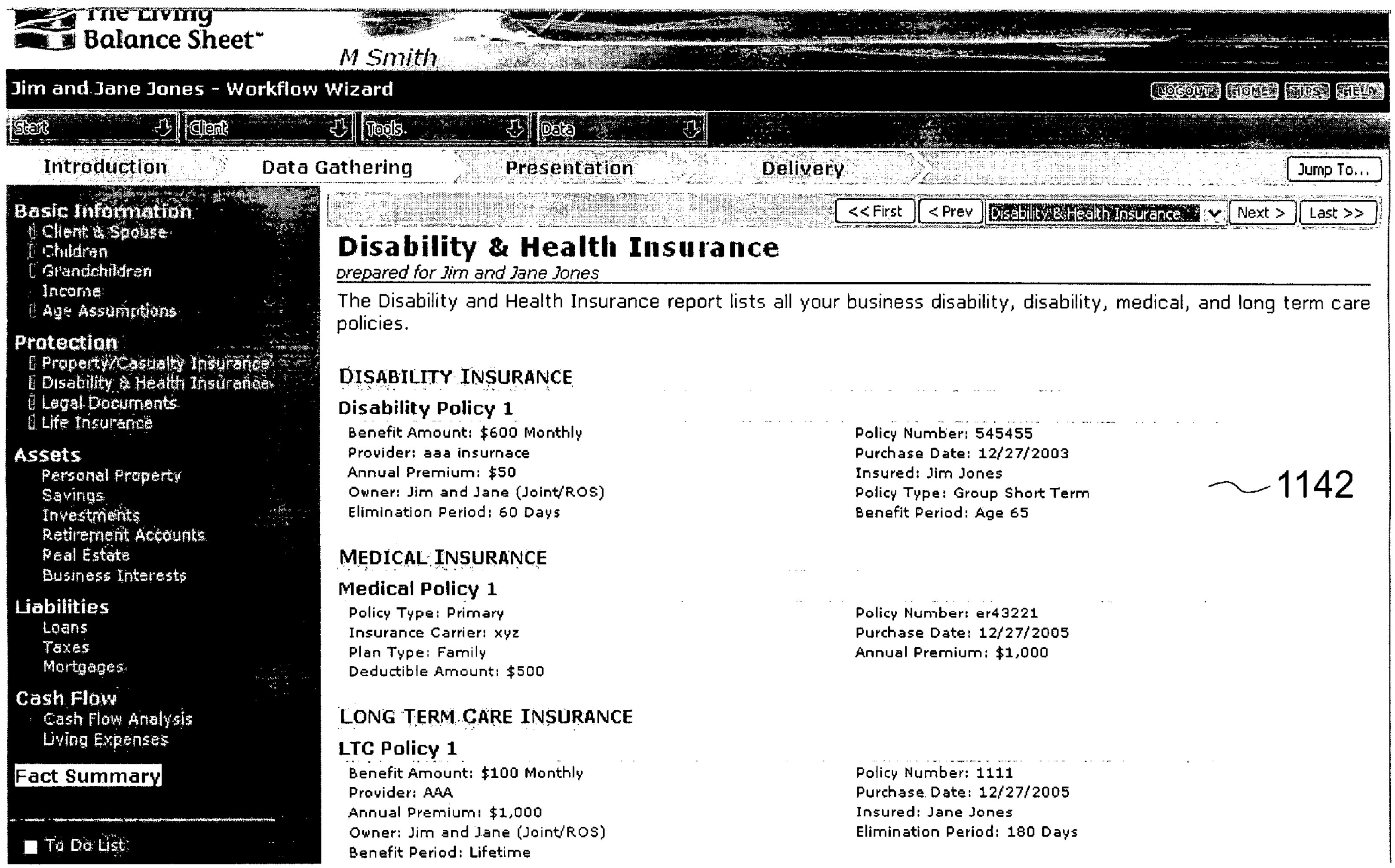
Figure 115:
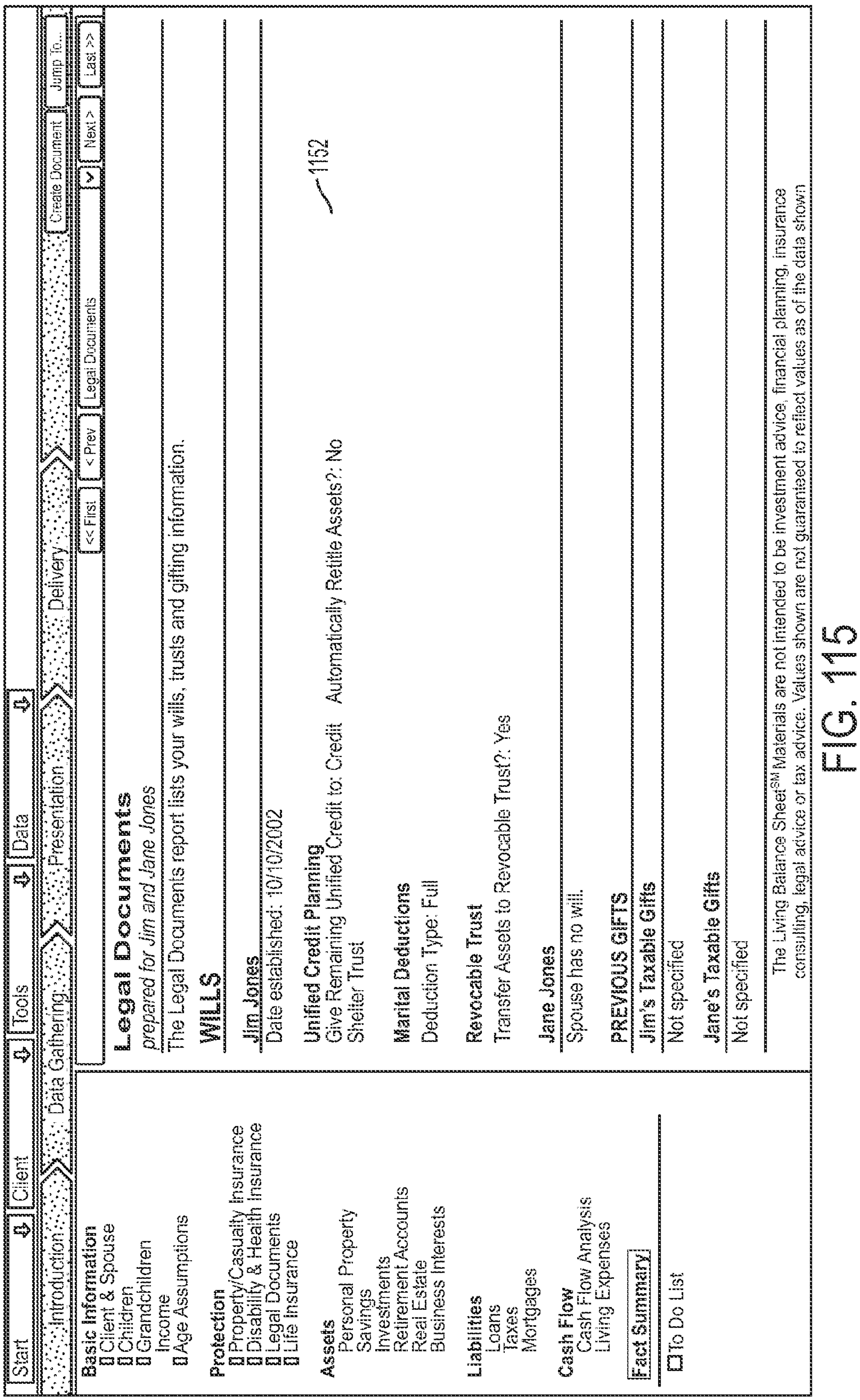
Figure 116:
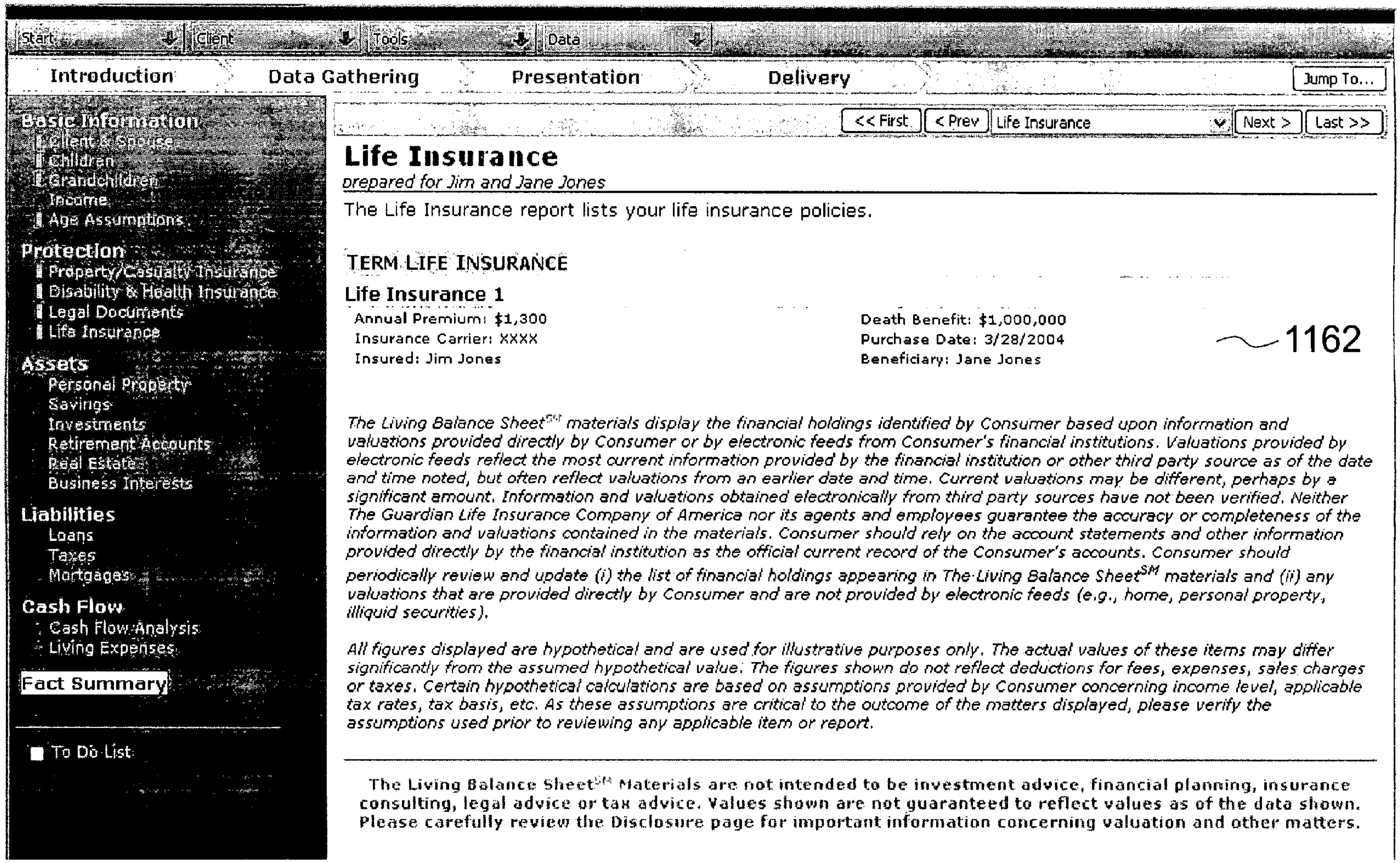
Figure 117:
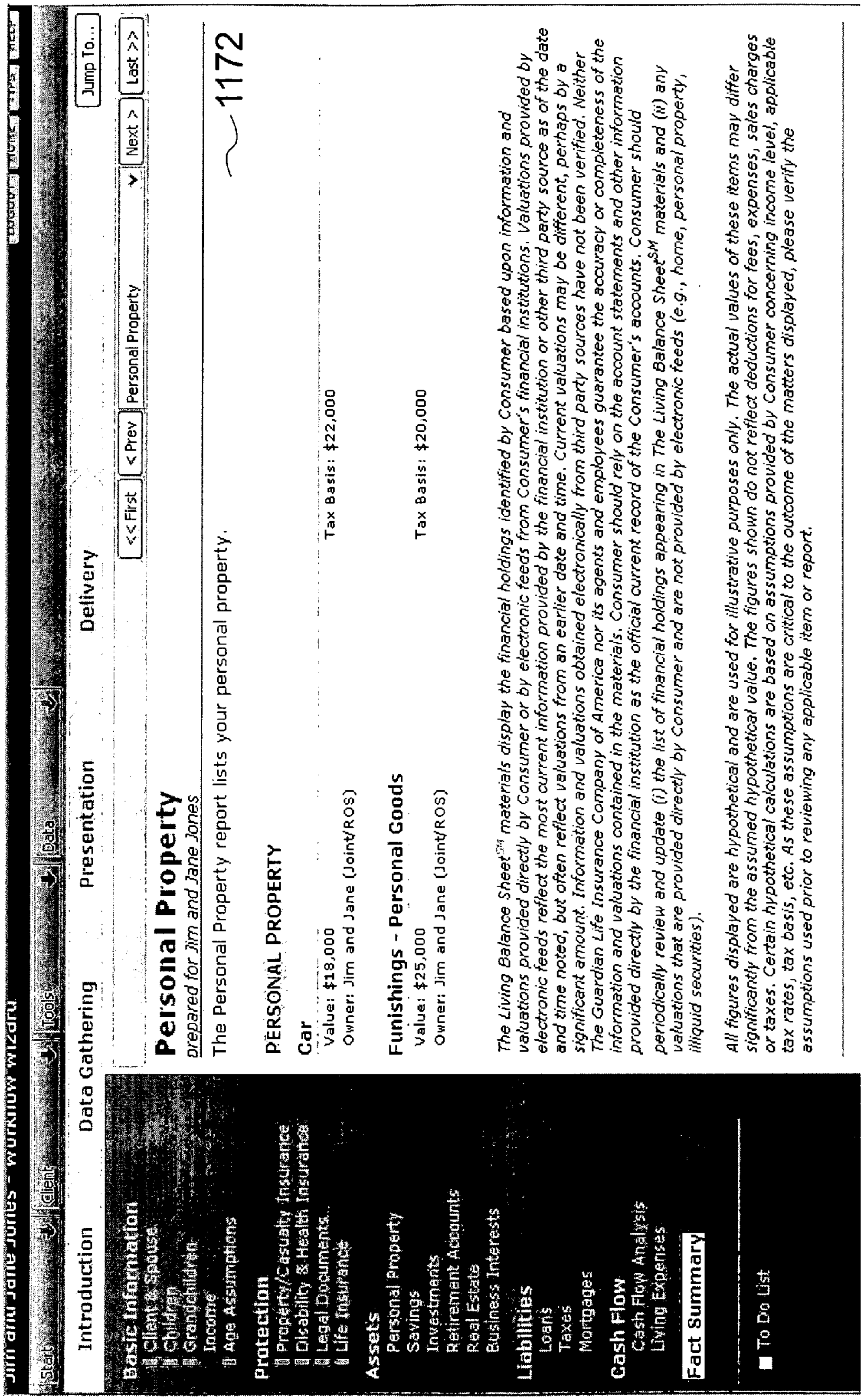

A brief description of summary display pages that can be displayed in fact summary section 1118 follows. Property & casualty insurance summary display page 1130 of FIG. 113 can include summary section 1132 that displays a summary of the client information that was entered or calculated as part of the property/casualty insurance subsection of the data gathering stage. Disability & health insurance summary display page 1140 of FIG. 114 can include summary section 1142 that displays a summary of the client information that was entered or calculated as part of the disability & health insurance subsection of the data gathering stage. Legal documents summary display page 1150 of FIG. 115 can include summary section 1152 that displays a summary of the client information that was entered or calculated as part of the legal documents subsection of the data gathering stage. Life insurance summary display page 1160 of FIG. 116 can include summary section 1162 that displays a summary of the client information that was entered or calculated as part of the life insurance subsection of the data gathering stage. Personal property summary display page 1170 of FIG. 117 can include summary section 1172 that displays a summary of the client information that was entered or calculated as part of the personal property subsection of the data gathering stage.

Figure 118:
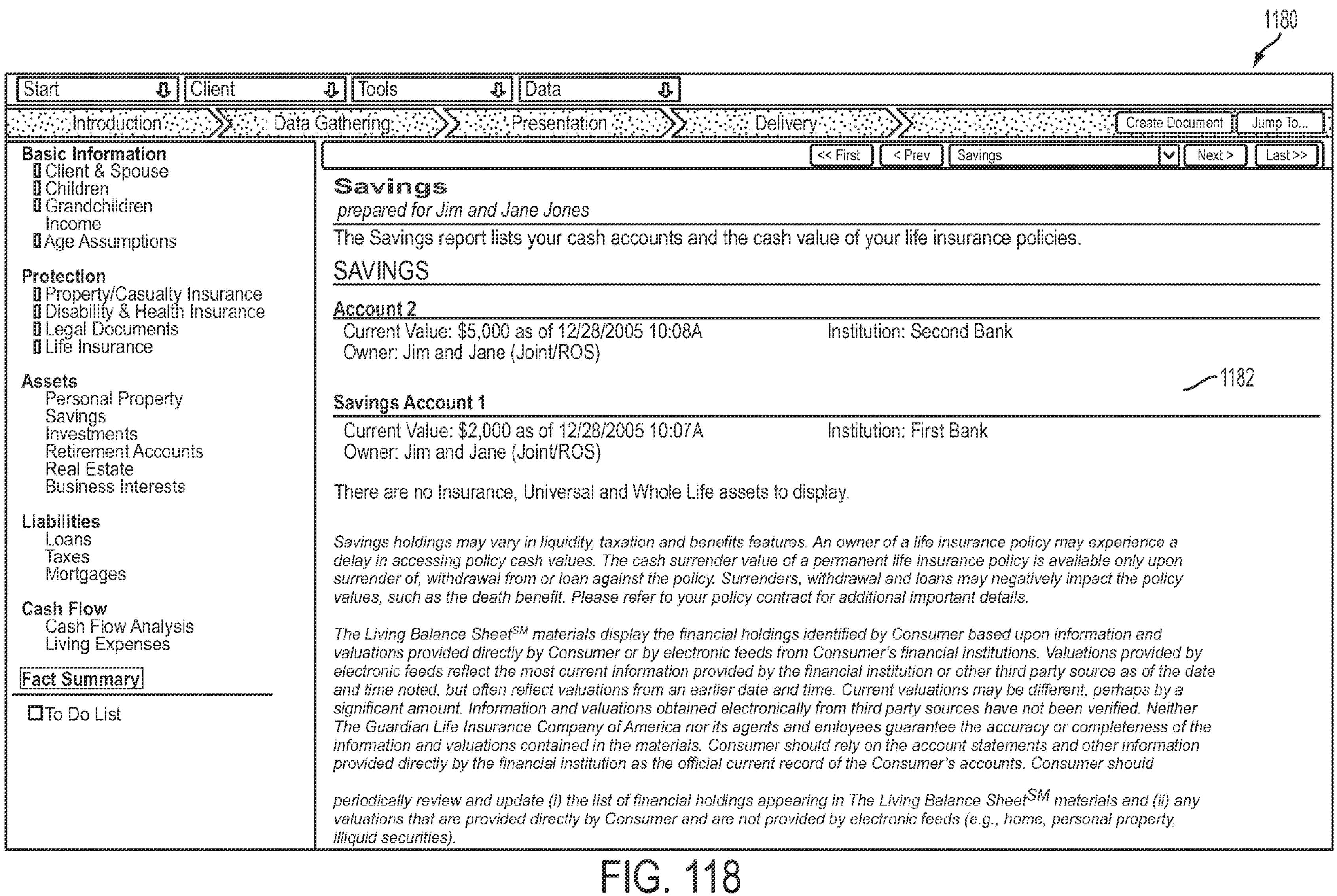
Figure 119:
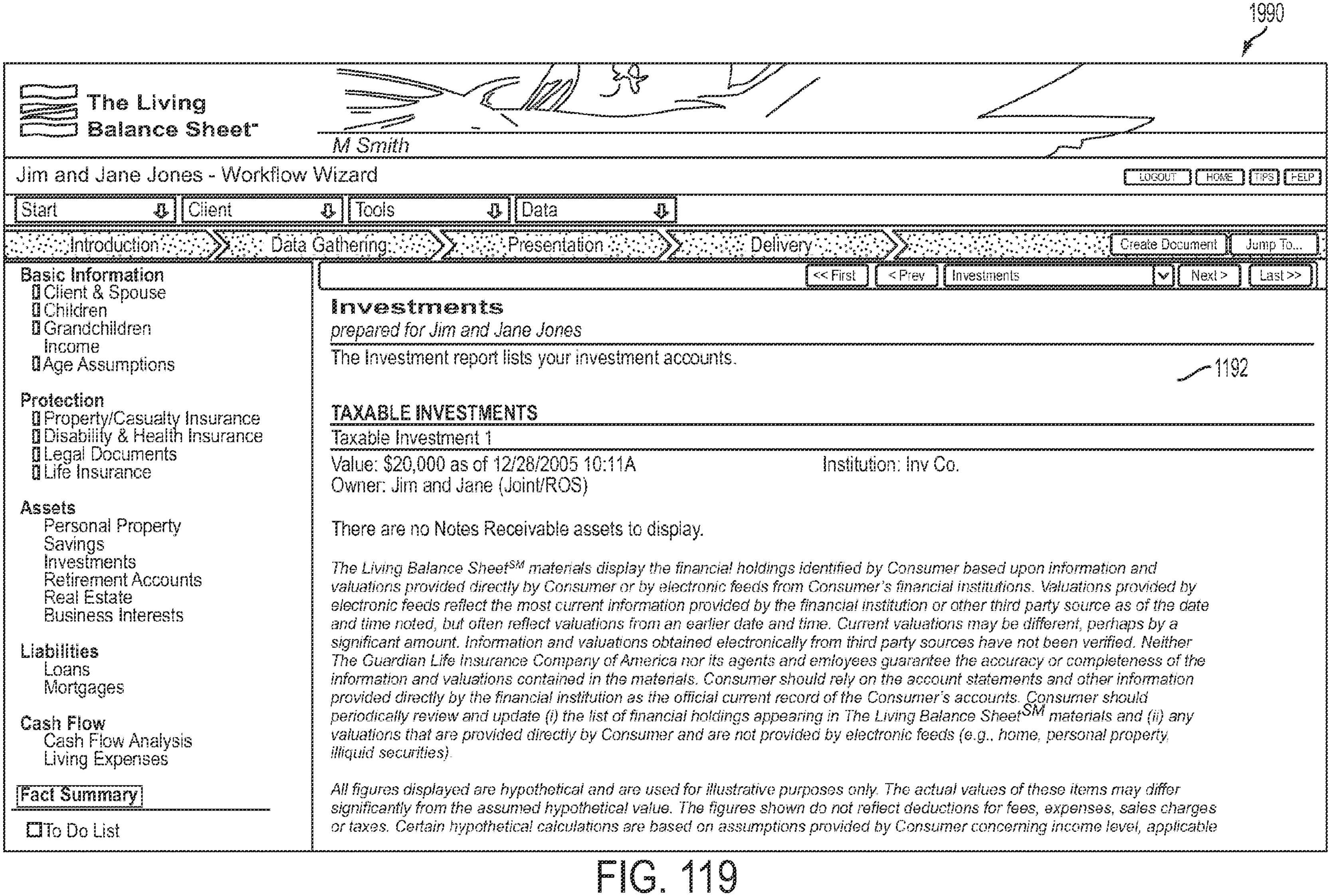
Figure 120:
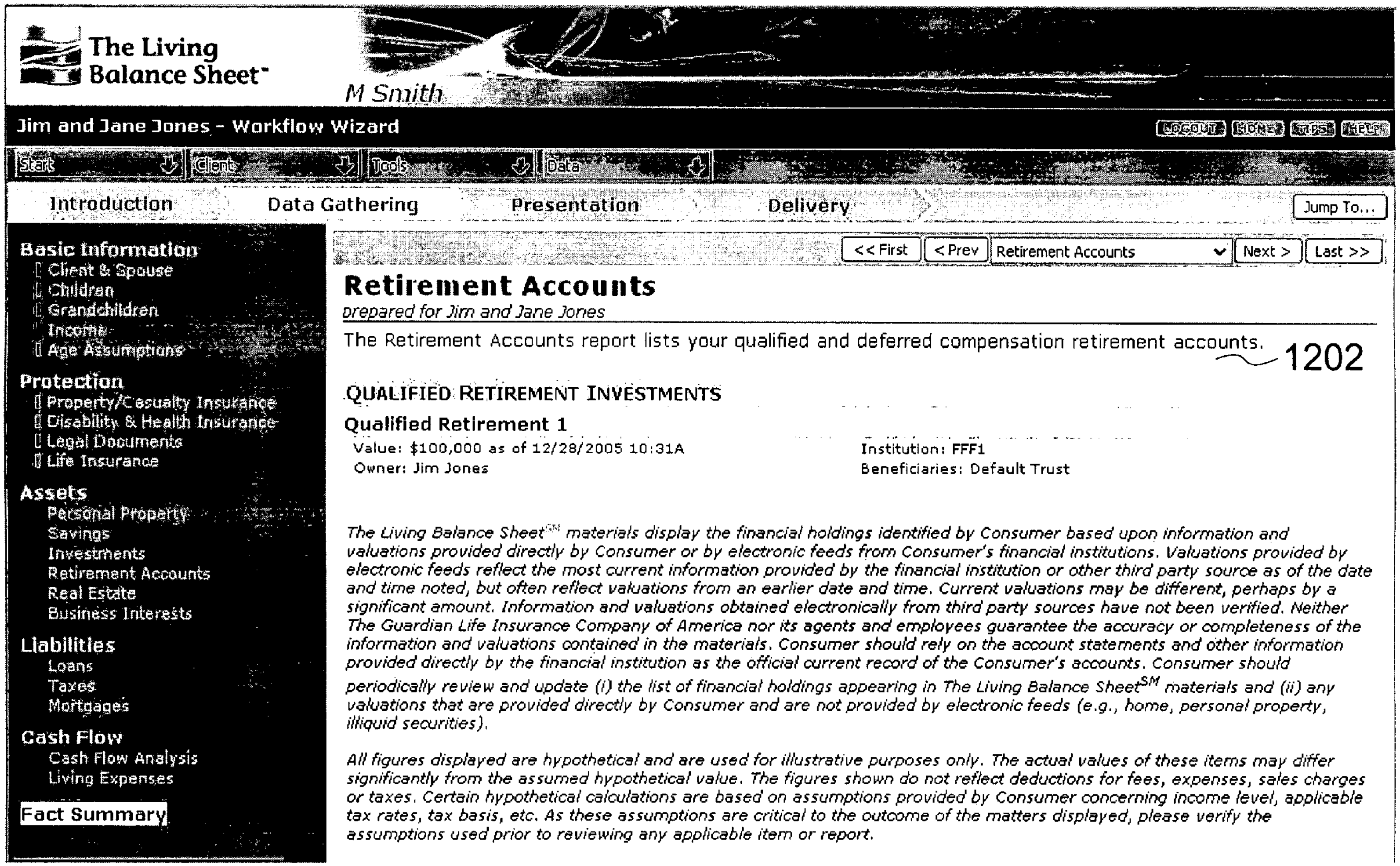
Figure 121:
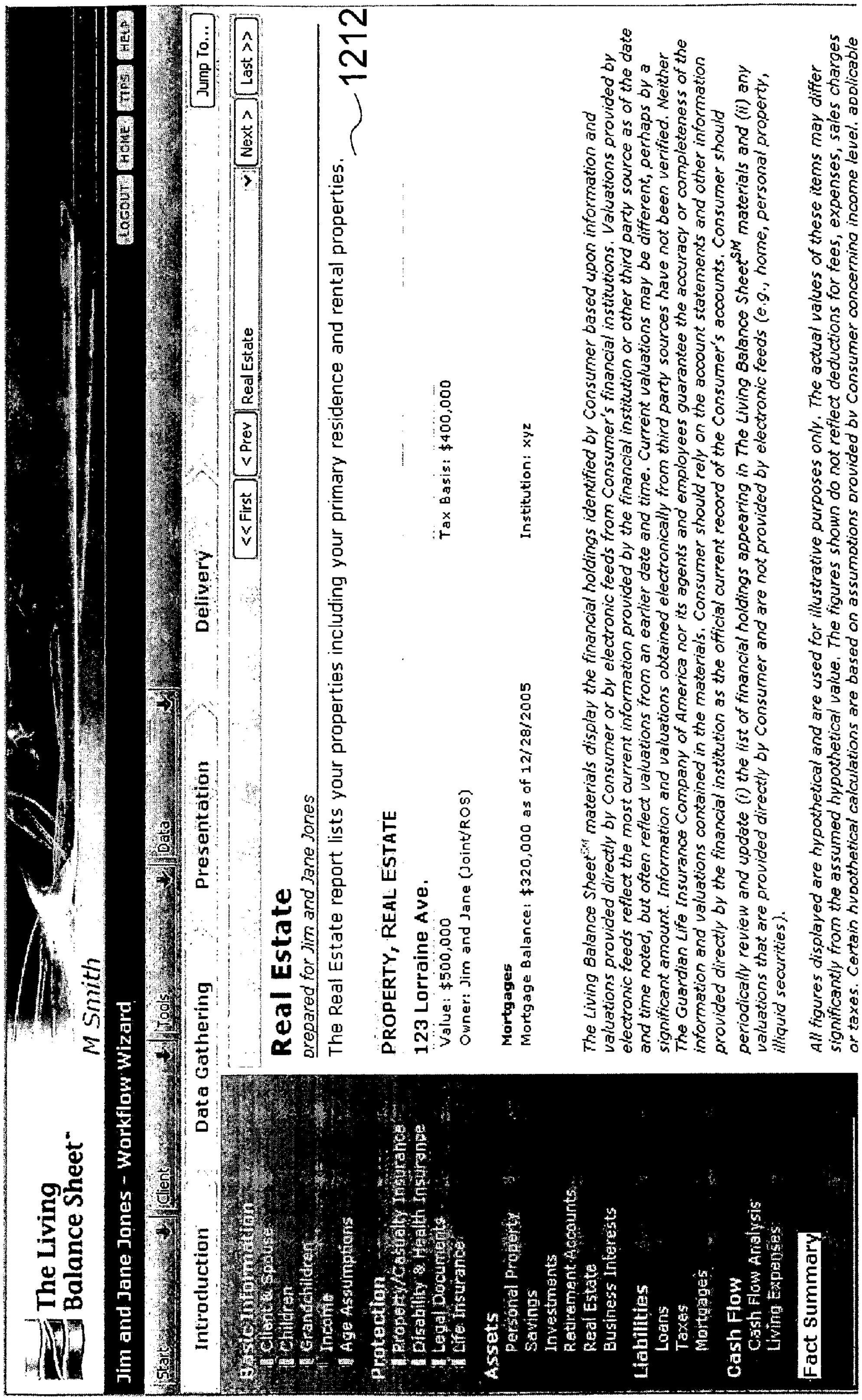
Figure 122:
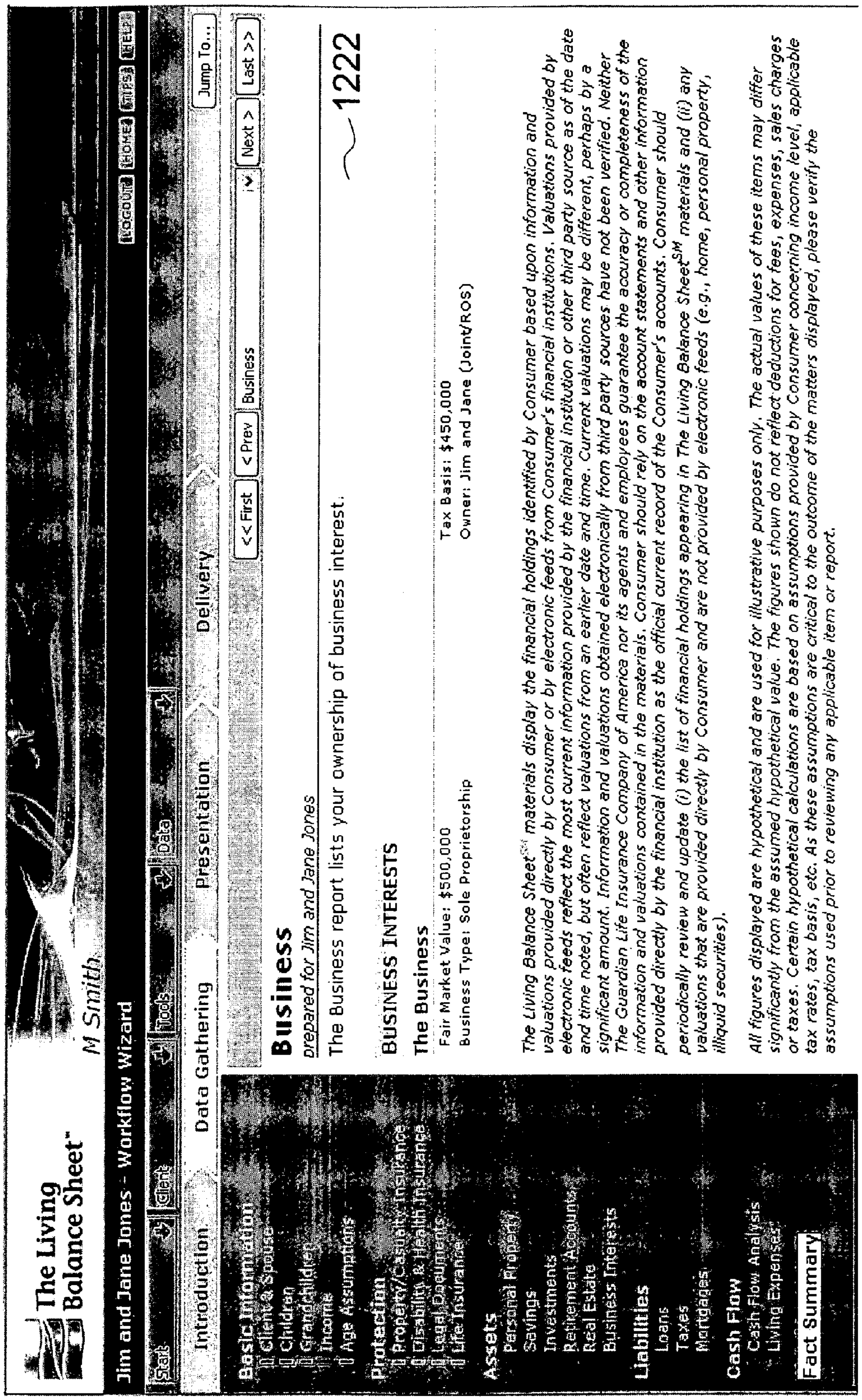
Figure 123:
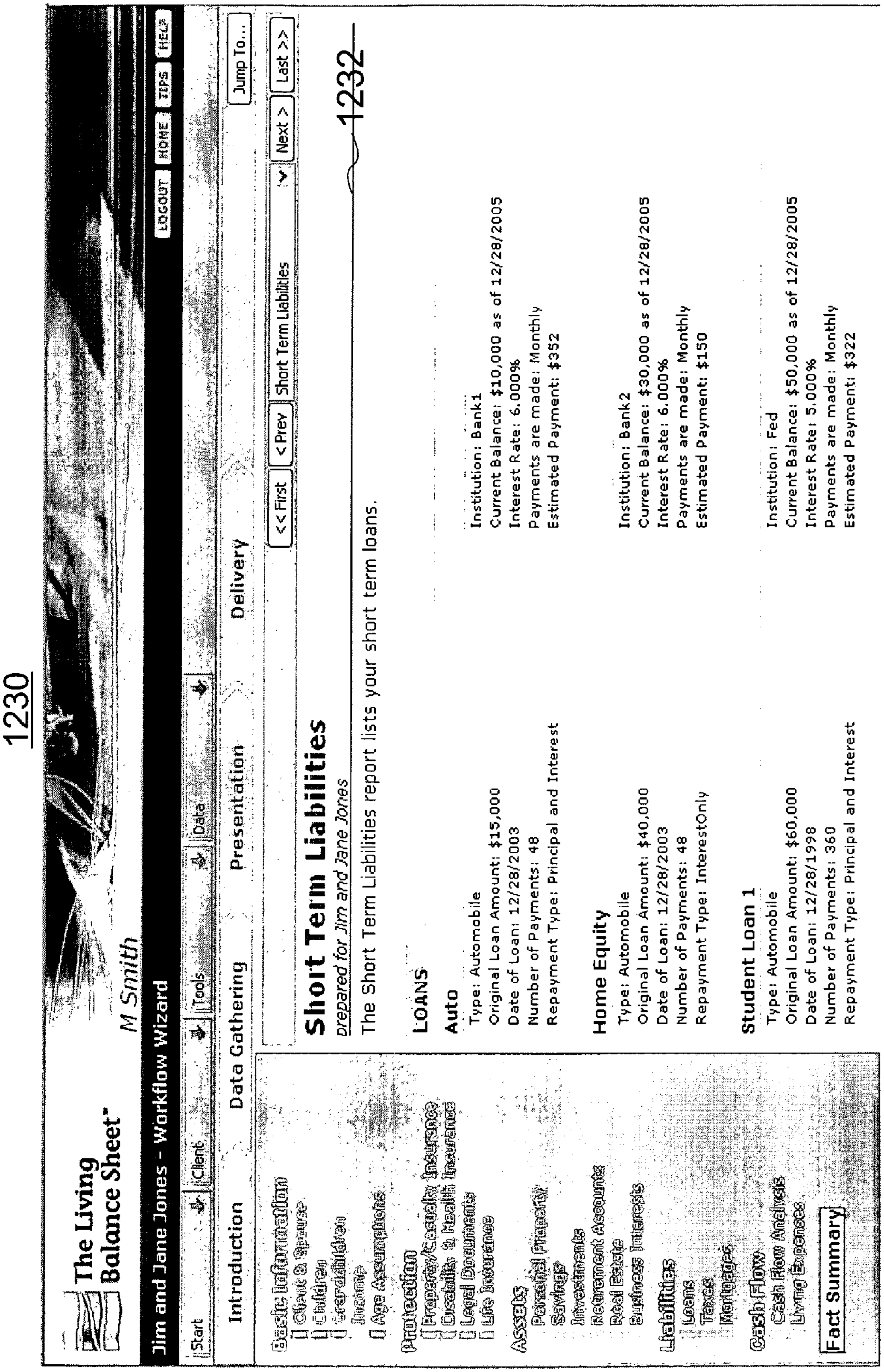
Figure 124:
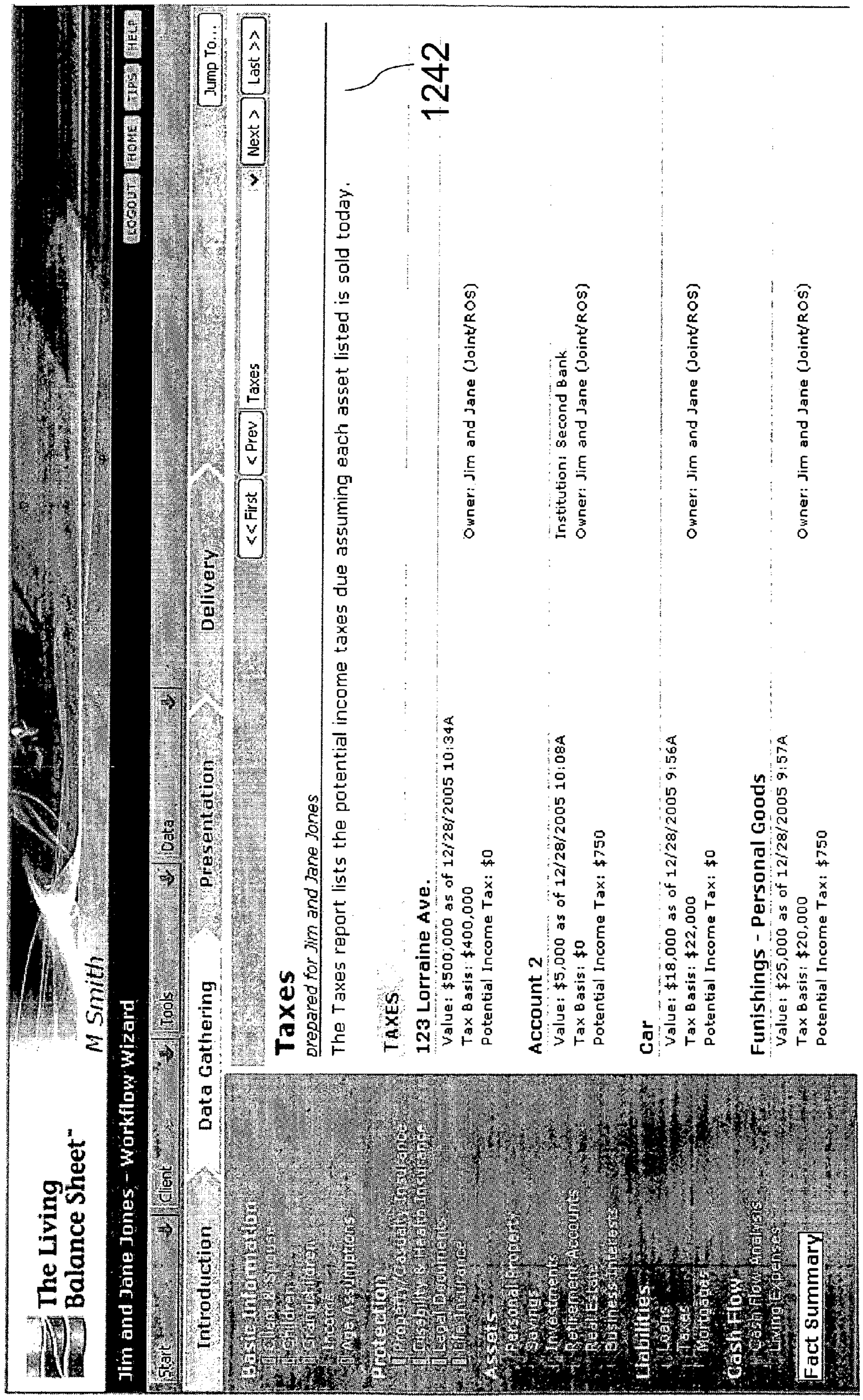
Figure 125:
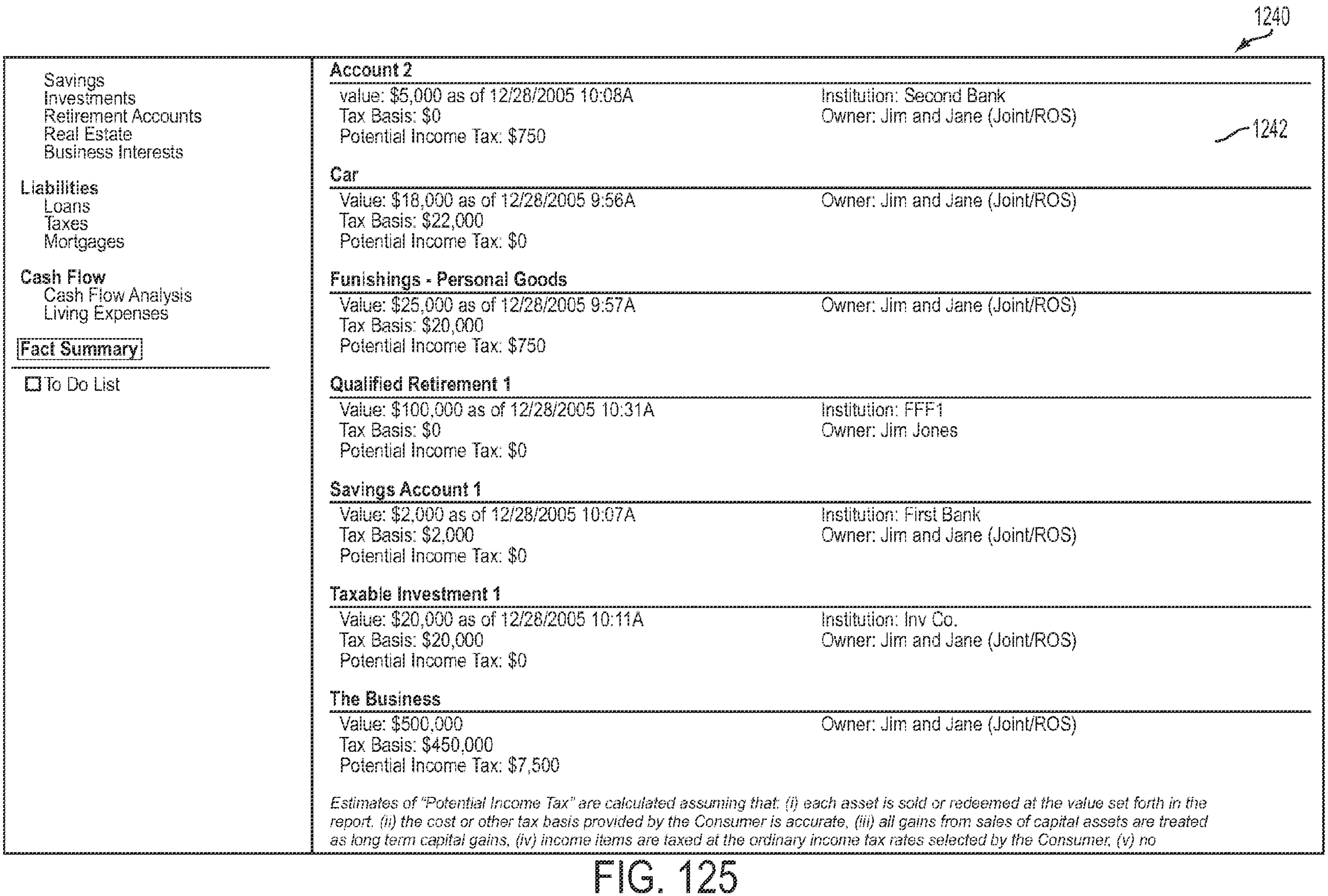

Savings summary display page 1180 of FIG. 118 can include summary section 1182 that displays a summary of the client information that was entered or calculated as part of the savings subsection of the data gathering stage. Investments summary display page 1190 of FIG. 119 can include summary section 1192 that displays a summary of the client information that was entered or calculated as part of the investments subsection of the data gathering stage. Retirement accounts summary display page 1200 of FIG. 120 can include summary section 1202 that displays a summary of the client information that was entered or calculated as part of the retirement accounts subsection of the data gathering stage. Real estate summary display page 1210 of FIG. 121 can include summary section 1212 that displays a summary of the client information that was entered or calculated as part of the real estate subsection of the data gathering stage. Business summary display page 1220 of FIG. 122 can include summary section 1222 that displays a summary of the client information that was entered or calculated as part of the business interests subsection of the data gathering stage. Short-term liabilities summary display page 1230 of FIG. 123 can include summary section 1232 that displays a summary of the client information that was entered or calculated as part of the loans subsection (e.g., a summary of the short term loans of the user) of the data gathering stage. Taxes summary display page 1240 of FIGS. 124-126 can include summary section 1242 that displays a summary of the client information that was entered or calculated as part of the taxes subsection (e.g., a summary of the client's assets and the amount of potential taxes owed if the assets were sold today) of the data gathering stage. As shown, display page 1240 can include a display of the estimated current value of the asset, the tax basis of the asset, and potential income tax due if sold today. Taxes summary display page 1240 can include next button 1262 and back button 1264 if that display page is the last display page in the fact summary section. Back button 1264 can, for example, move the user to the immediate previous subsection, which as shown would be the living expenses subsection. Next button 1262 can move the user forward in the workflow wizard to for example as shown to the presentation stage of the workflow wizard.

Figure 127:
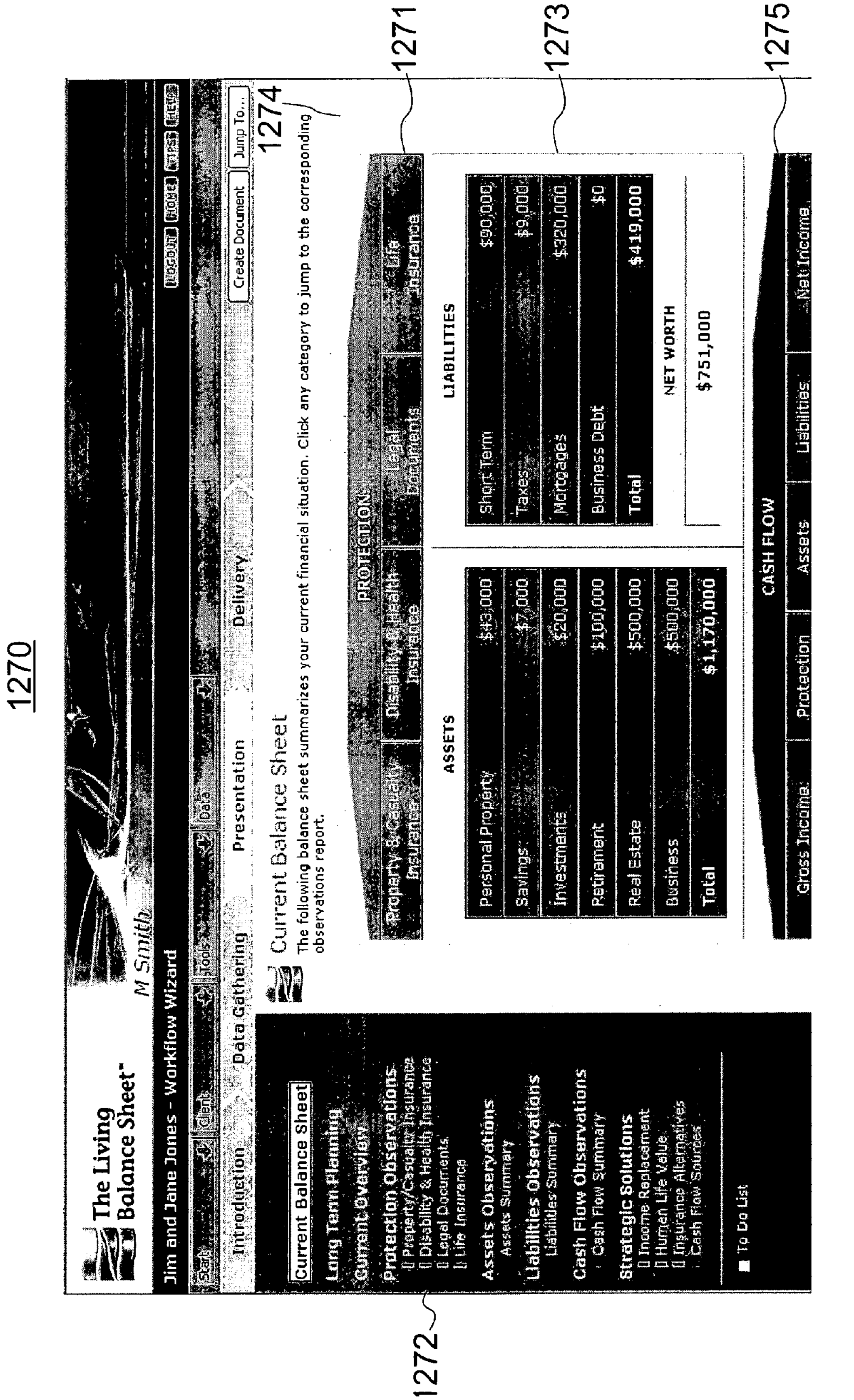

The presentation stage can be used to generate presentations for clients such as by sharing the presentation content with the client electronically during meeting or using a paper version for discussions. Section 1272 of FIG. 127 shows an example of a sequence of sections and subsections for the presentation stage. As shown, a current balance sheet section is initially displayed, which can provide an effective starting point for discussion with a client and for understanding the client's life insurance needs. For example, current balance sheet display page 1270 can be displayed. Current balance sheet display page 1270 includes interactive summary section 1274. Summary section 1274 of current balance sheet display page 1270 can be structured in a particular way as shown. Section 1274 can have three layers protection layer 1271, assets/liabilities layer 1273, and cash flow layer 1275. The layers can be coordinated to match the corresponding colors that were used in the data gathering section, mentioned above. Protection layer can comprise a horizontal row of protection related buttons, which as shown comprises a property & casualty insurance button, disability & health insurance button, legal documents button, and life insurance button. If desired, a corresponding button can be displayed for each subsection in the protection section of the data gathering stage or for each protection summary display page of the fact summary section of the data gathering stage.

Assets/liabilities layer 1273 can be positioned directly below protection layer 1271 as shown. Assets/liabilities layer 1273 can be divided into to an asset section and a liabilities section that can be displayed next to each as in the way shown in layer 1273. Assets/liabilities layer 1273 can comprise a vertical column for the assets section and for the liabilities section. The assets section can comprise a column of asset related buttons, which as shown comprises a personal property button, savings button, investments button, retirement button, real estate button, and business button. If desired, a corresponding button can be displayed for each subsection in the assets section of the data gathering stage or for each asset summary display page of the fact summary section of the data gathering stage. As shown, the asset buttons display a dollar value corresponding to the category of asset that is associated with the asset button. The value can be as a result of calculation based on client related data was entered during the data gathering stage. The assets section can include a total of the displayed dollar values for the asset categories. The liabilities section can comprise a column of liabilities related buttons, which as shown comprises a short-term loan button, taxes button, mortgages button, and business debt button. If desired, a corresponding button can be displayed for each subsection in the liabilities section of the data gathering stage or for each liabilities summary display page of the fact summary section of the data gathering stage. As shown, the liabilities buttons display a dollar value corresponding to the category of liabilities that is associated with the liabilities button. The value can be as a result of calculation based on client related data that was entered during the data gathering stage. A total can also be displayed for the assets and liabilities and in addition, a net worth section displaying the current net worth based on the total values of the assets and liabilities can be displayed. A purpose of assets/liabilities layer 1273 is to provide a quick summary of the current net-worth of the client.

The cash flow layer can comprise a horizontal row of cash flow related buttons, which as shown comprises a gross income button, protection button, assets button, liabilities button, and net income button. If desired, a corresponding button can be displayed for each subsection in the cash flow section of the data gathering stage or for each cash flow summary display page of the fact summary section of the data gathering stage. As shown, in the FIGS., such specific correspondence does not exist with respect to cash flow layer 1275. Such "non-correspondence" could also be implemented in other layers if desired.

The buttons in section 1274 can for example be configured to be selected to display for the user a corresponding observation report, which is sometimes herein referred to as a summary display page (e.g., summary display pages of the fact summary section). Thus, section 1274 can provide an interface from which a user can understand the net worth of the client, the state of the underlying assets and liabilities, and quickly access more detailed summaries regarding each category for which a button is displayed. The interface can also provide ease to the user in walking through the different categories (e.g., with the client) and analyzing their needs. The structure of section 1274 can be used to quickly demonstrate the impact of insurance triggering events on the client and his or her family.

If desired, related dollar value can be displayed in protection layer 1274 and cash flow layer 1275, such as, by displaying the values within a corresponding button.

If desired, items displayed in section 1272 section can be "live" such that a user can "click" on an item to automatically jump to a corresponding display page. Such functionality can exist throughout the workflow wizard if desired.

If desired, the buttons in the various layers can correspond to (e.g., have one to one correspondence) to display pages in the presentation stage, such as, the display pages of the protections observations section.

Current balance sheet display page 1270 can include next and back buttons (not visible) for moving to the next or previous display pages. Long term planning display page 1280 of FIGS. 128 and 129 can be displayed next. Display page 1280 can display information illustrating the uncertainties and randomness associated with the economic performance of certain long term planning strategies.

Figure 130:
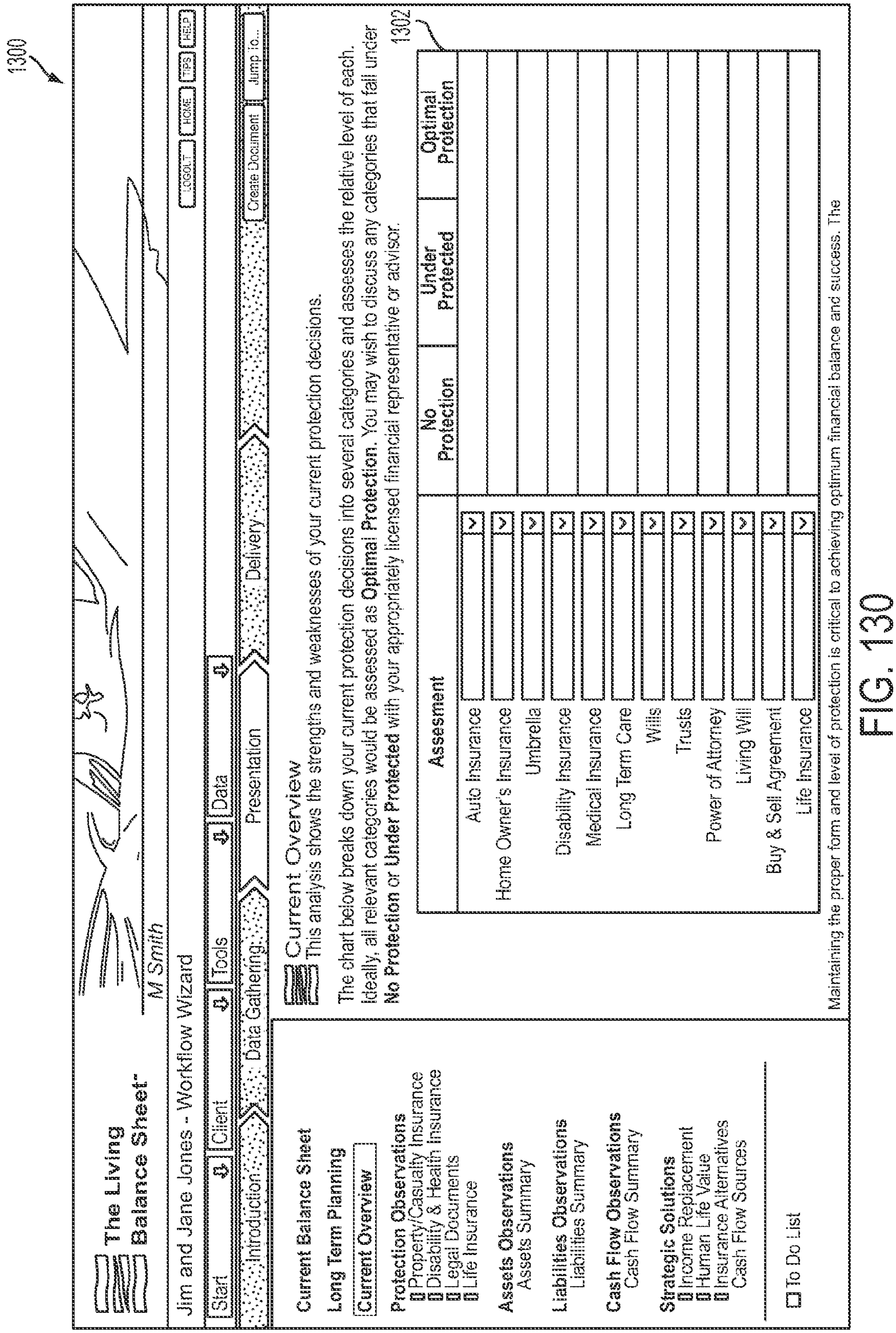
Figure 131:
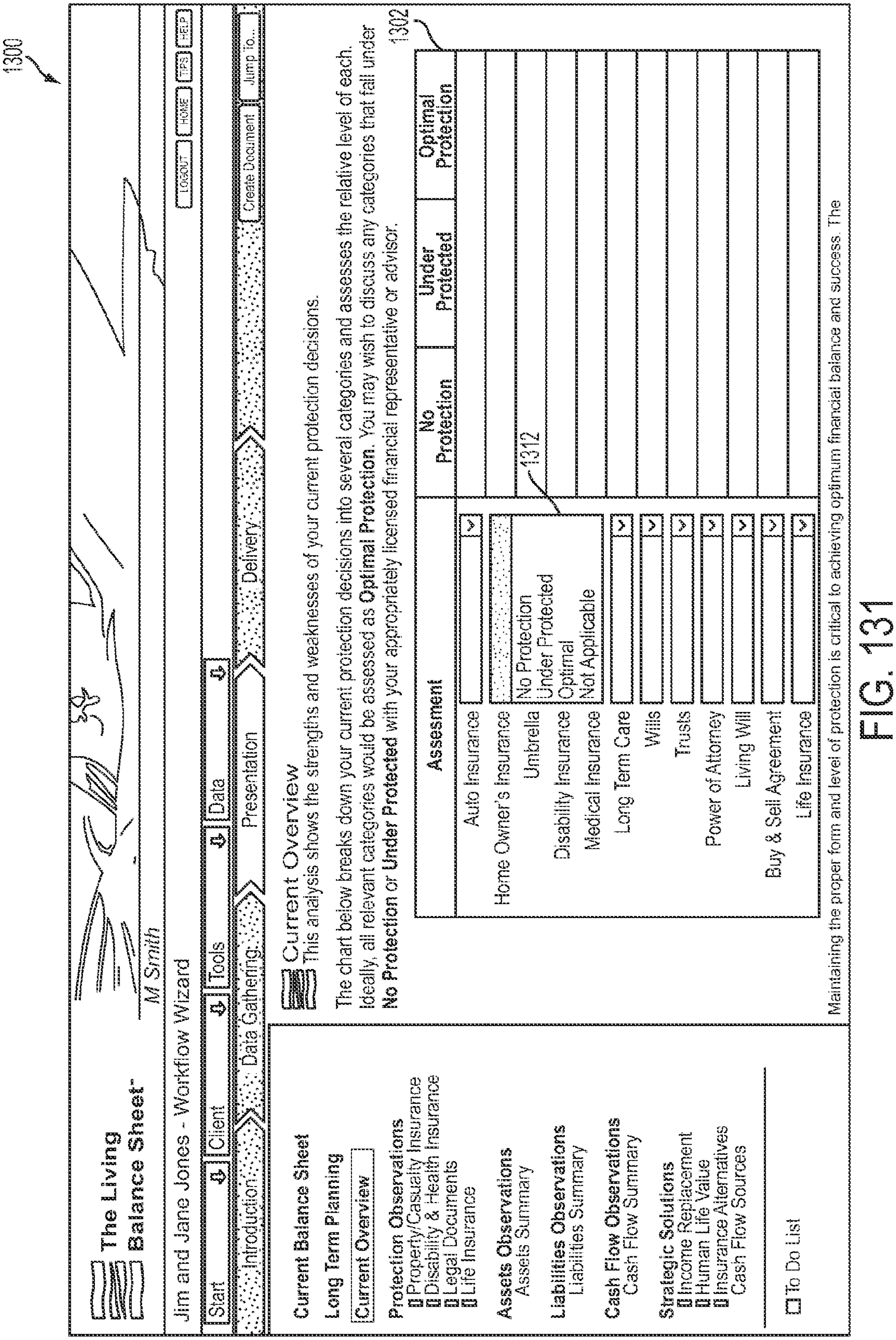
Figure 132:
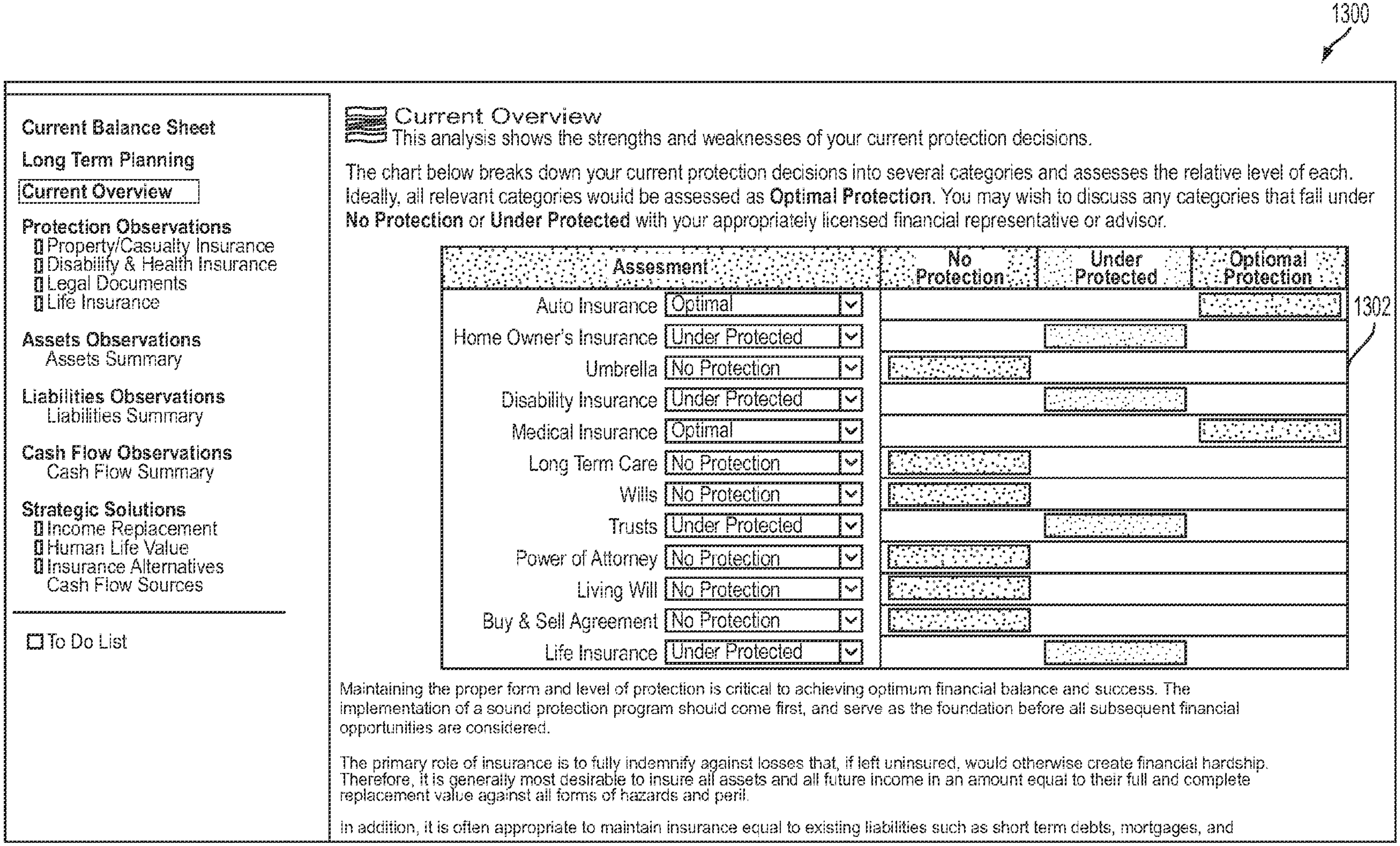

Next, a current protection overview display page can be displayed. For example, current overview display page 1300 of FIGS. 130-132 can be displayed. Current overview display page 1300 can include assessment matrix 1302 that is configured to illustrate the strengths and weaknesses of the client's current protection decisions. As shown, matrix 1302 is in the form of a matrix having a left column comprising rows that each correspond to a different protection category and a top row that comprises different protection levels (e.g., no protection, under protected, and optimal protection). A user can for example use a pull-down menu that is displayed for each protection category to select a protection level for that category. The selection can be based on a review of the client's information and based on the user's opinion as a specialist in this field. If desired, the protection levels can be automatically selected by a software program that reviews the client's information and automatically assigns levels based for example on expected levels of protection for similar clients.

If manually selected, the options in the pull-down menu (e.g., pull-down menu 1312 of FIG. 131) can be "no protection," "under protected," "optimal," and "not applicable." Selecting a particular level causes a box to be displayed in the column corresponding to that level of protection. If "not applicable" is selected, no such box displayed. A color scheme can be used to further emphasize the need to have "optimal protection." For example, "no protection" is displayed as red, "under protected" as yellow, and "optimal protection" as green. By making selections, for example, using the pull-down menu for each category as shown, a user can fill the matrix with boxes that are displayed under corresponding protection levels (e.g., see matrix 1302 of FIG. 132). Matrix 1302 can be an important presentation and sales tools for illustrating to a client a picture of the client's protection picture and persuading the client with respect to taking action to address possible weaknesses. If desired, after a level is selected, the user can reassess and use the pull-down menu to reposition the box corresponding to that category to another protection level. Thus, matrix 1302 can remain interactive after initial protection level selections are made. Display page 1300 can include a next button (not visible) for saving selections and moving to the next display page. A previous button can also be included.

Figure 133:
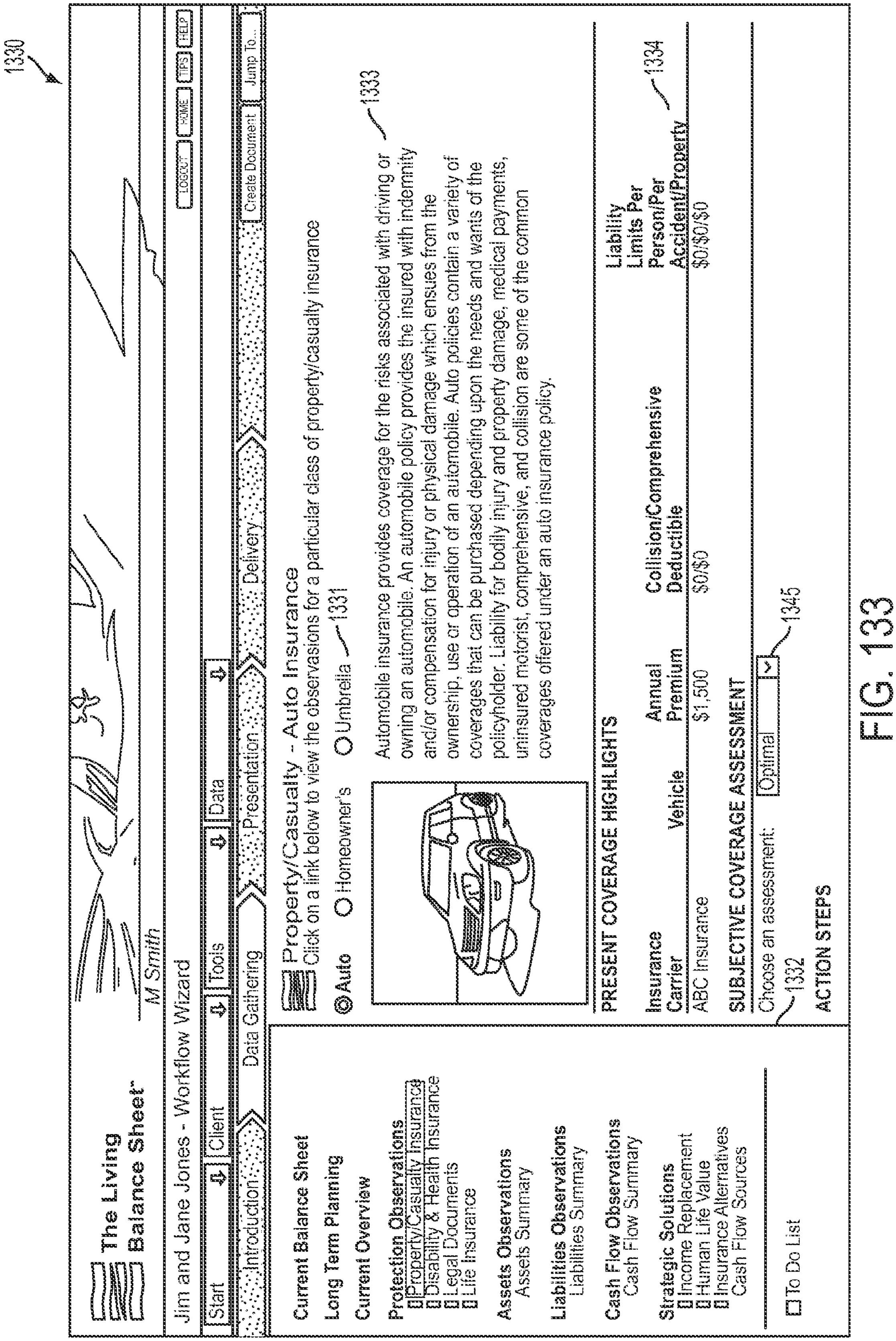
Figure 134:
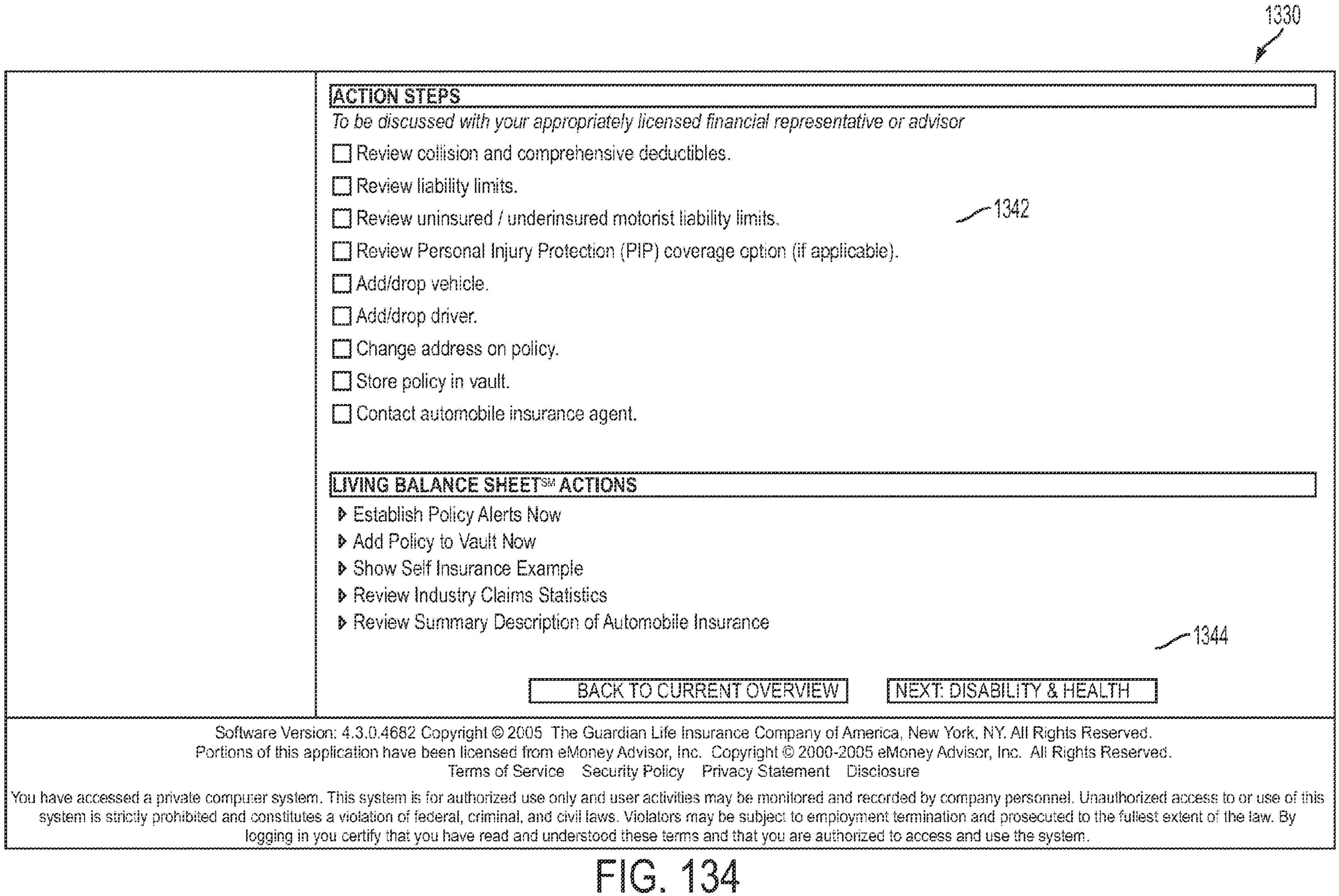

Protection observations section 1332 can be used to present an interactive insurance category specific tool for the users and clients such as to for example implement embodiments of the method and steps illustratively described in FIG. 6. Section 1332 can comprise an insurance category specific display pages for each subsection property/casualty insurance, disability & health insurance, legal documents, and life insurance. For example, property/casualty auto insurance display page 1330 of FIGS. 133-135 can be displayed to view or access auto insurance related observations, information, assessment, action steps, and actions. Display page 1330 can include radio buttons for switching to the display pages of different types of property/casualty insurance (e.g., auto, homeowner's, and umbrella). Selecting a radio button can if desired automatically and immediately switch the display page to be specifically for the insurance type of the radio button that is selected. Display page 1330 can include information section 1333 for providing an explanation of the insurance that is currently the focus of display page 1330. Display page 1330 can include present coverage highlights section 1334 that displays a summary of the client's current insurance coverage for the current insurance category (e.g., property/casualty—auto insurance as displayed). Display page 1330 can include assessment section 1345 that displays an assessment of the client's level of protection under the current insurance category. The displayed level of protection can be the level that was selected in matrix 1302 of FIG. 130. As such, the assessment can be automatically selected. A pull-down menu can be implemented to allow the level to change while in display page 1330. Display page 1330 can include action steps section 1342 of FIG. 134. Action steps section 1342 as shown displays a list of selectable action steps that are needed to be taken by the client (e.g., to discuss the subject of the action step) to for example move the sales process or interaction with the client forward. A user can click in a checkbox associated with each action step to indicate that the selected action step is to be completed with respect to the current client. As shown in FIG. 135, a check can be displayed in a checkbox in response to the selection of action step 1352. A list of checked items from the various display pages for different insurance categories or types can be displayed at the end of protection observation section 1332. Display page 1330 can include actions section 1344 that includes selectable links for software internal actions or user-centered actions that the user should take with respect to the client and the current insurance category (e.g., property/casualty—auto insurance). A list of selected actions from the various display pages for different insurance categories or types can be displayed at the end of protection observation section 1332. A user can interact with the next and back buttons to save or cancel selections and to move to the next or previous display page or section.

The protection specific display pages in the protection observations section 1332 can be configured to function and be structured in the same way as display page 1330, but each would be specifically configured to match the specific insurance or protection category that is associated with that display page. The same structure and function can be implemented if a user selects a radio button such as the radio buttons in section 1331 to access a different type of property/casualty insurance. Radio buttons may also be a combination of a textual link and an indicator marking the currently selected link.

Figure 137:
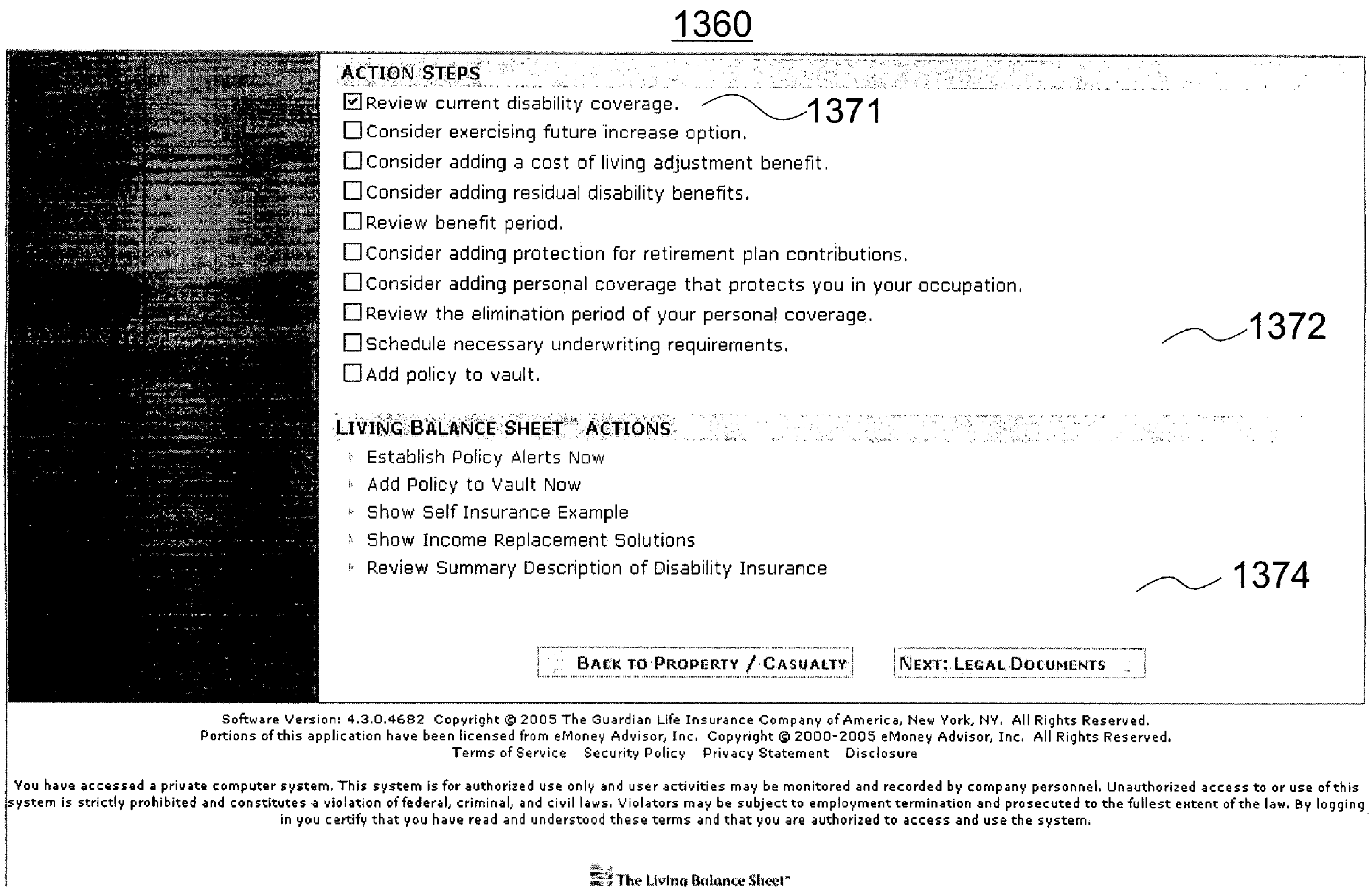
Figure 138:
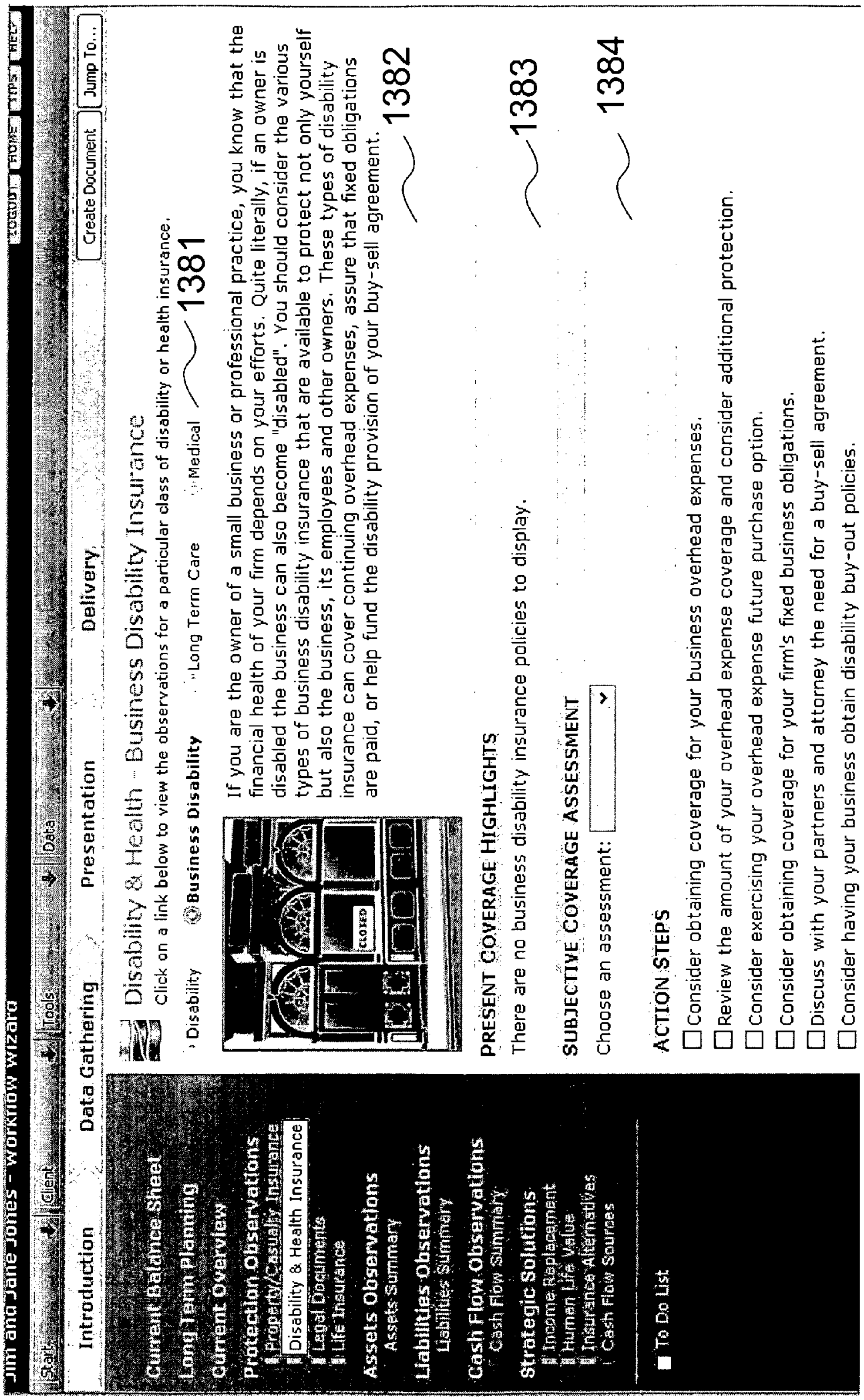

Other such display pages are illustratively shown in FIGS. 136-155. For example, FIGS. 136-137 show disability & health—disability insurance display page 1360. Display page 1360 includes insurance type section 1361 and information section 1362. Display page 1360 can include present coverage highlights section 1363 that displays a summary of the client's current insurance coverage for the current insurance category. Display page 1360 can include assessment section 1364 that displays an assessment of the client's level of protection under the current insurance category. The displayed level of protection can be the level that was selected in matrix 1302 of FIG. 130. As such, the assessment can be automatically selected. A pull-down menu can be implemented to allow the level to be changed while in display page 1360. Display page 1360 can include action steps section 1372 of FIG. 137. Action steps section 1372 as shown displays a list of selectable action steps that are needed to be taken by the client (e.g., to discuss the subject of the action step) to for example move the sales process or interaction with the client forward. A user can click in a checkbox associated with each action step to indicate that the selected action step should be completed with respect to the current client. As shown in FIG. 138, a check can be displayed in a checkbox in response to the selection of action step 1371. A list of checked items from the various display pages for different insurance categories or types can be displayed at the end of protection observation section 1332. Display page 1360 can include actions section 1374 that includes selectable links for software internal actions or user-centered actions that the user should take with respect to the client and the current insurance category (e.g., property/casualty—auto insurance). A list of selected actions from the various display pages for different insurance categories or types can be displayed at the end of protection observation section 1332. A user can interact with the next and back buttons to save or cancel selections and to move to the next or previous display page or section.

Figure 139:
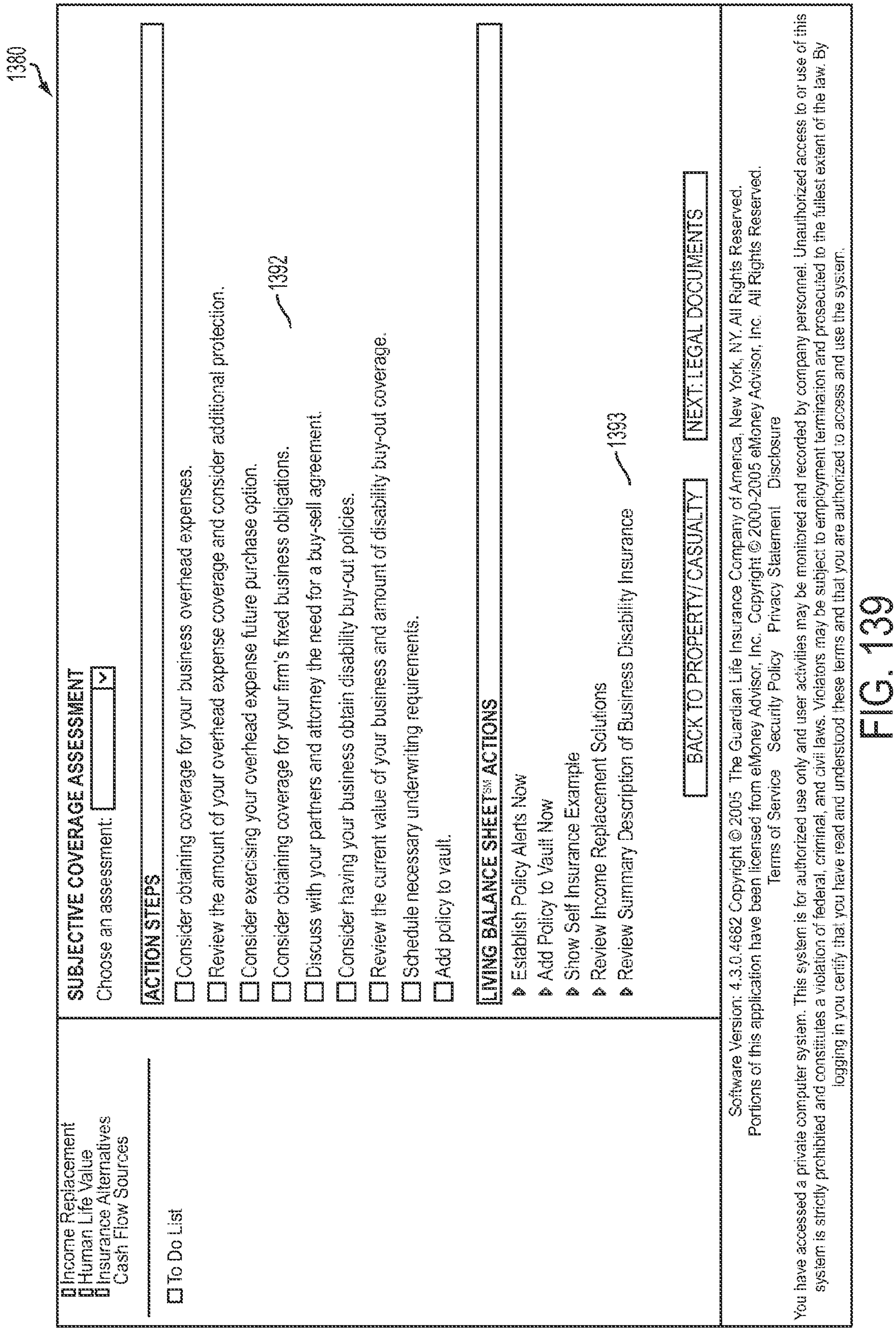

FIGS. 138-139 show disability & health—business disability insurance display page 1380. Display page 1380 includes insurance type section 1381 and information section 1382. Display page 1380 can include present coverage highlights section 1383 that displays a summary of the client's current insurance coverage for the current insurance category. Display page 1380 can include assessment section 1384 that displays an assessment of the client's level of protection under the current insurance category. The displayed level of protection can be the level that was selected in matrix 1302 of FIG. 130. As such, the assessment can be automatically selected. A pull-down menu can be implemented to allow the level to be changed while in display page 1380. Display page 1380 can include action steps section 1392 of FIG. 139. Action steps section 1392 as shown displays a list of selectable action steps that are needed to be taken by the client (e.g., to discuss the subject of the action step) to for example move the sales process or interaction with the client forward. A user can click in a checkbox associated with each action item to indicate that the selected action step should be completed with respect to the current client. A list of selected action steps from the various display pages for different insurance categories or types can be displayed at the end of protection observation section 1332. Display page 1380 can include actions section 1394 that includes selectable links for software internal actions or user-centered actions that the user should take with respect to the client and the current insurance category (e.g., property/casualty—auto insurance). A list of selected actions from the various display pages for different insurance categories or types can be displayed at the end of protection observation section 1332. A user can interact with the next and back buttons to save or cancel selections and to move to the next or previous display page or section.

Figure 140:
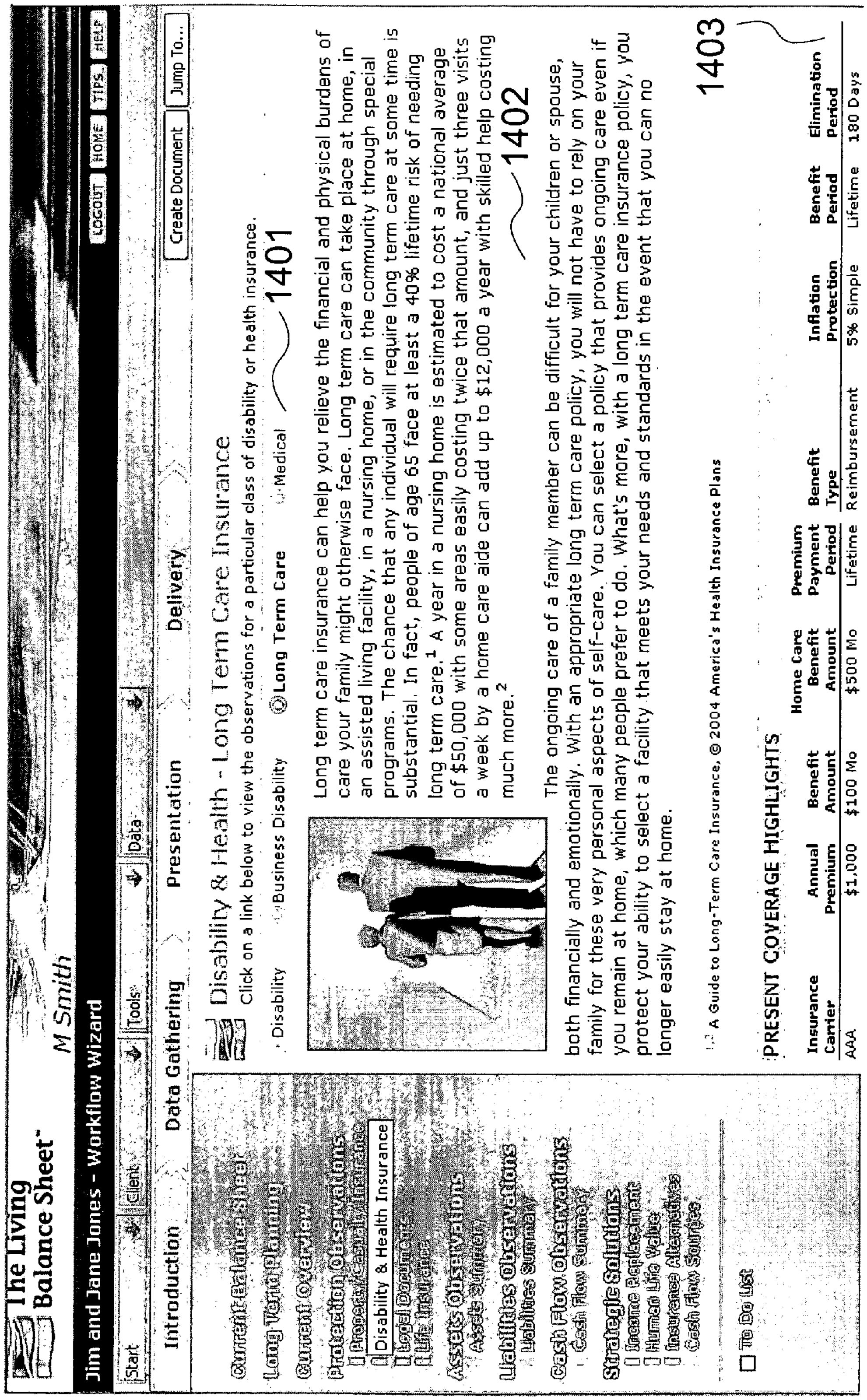
Figure 141:
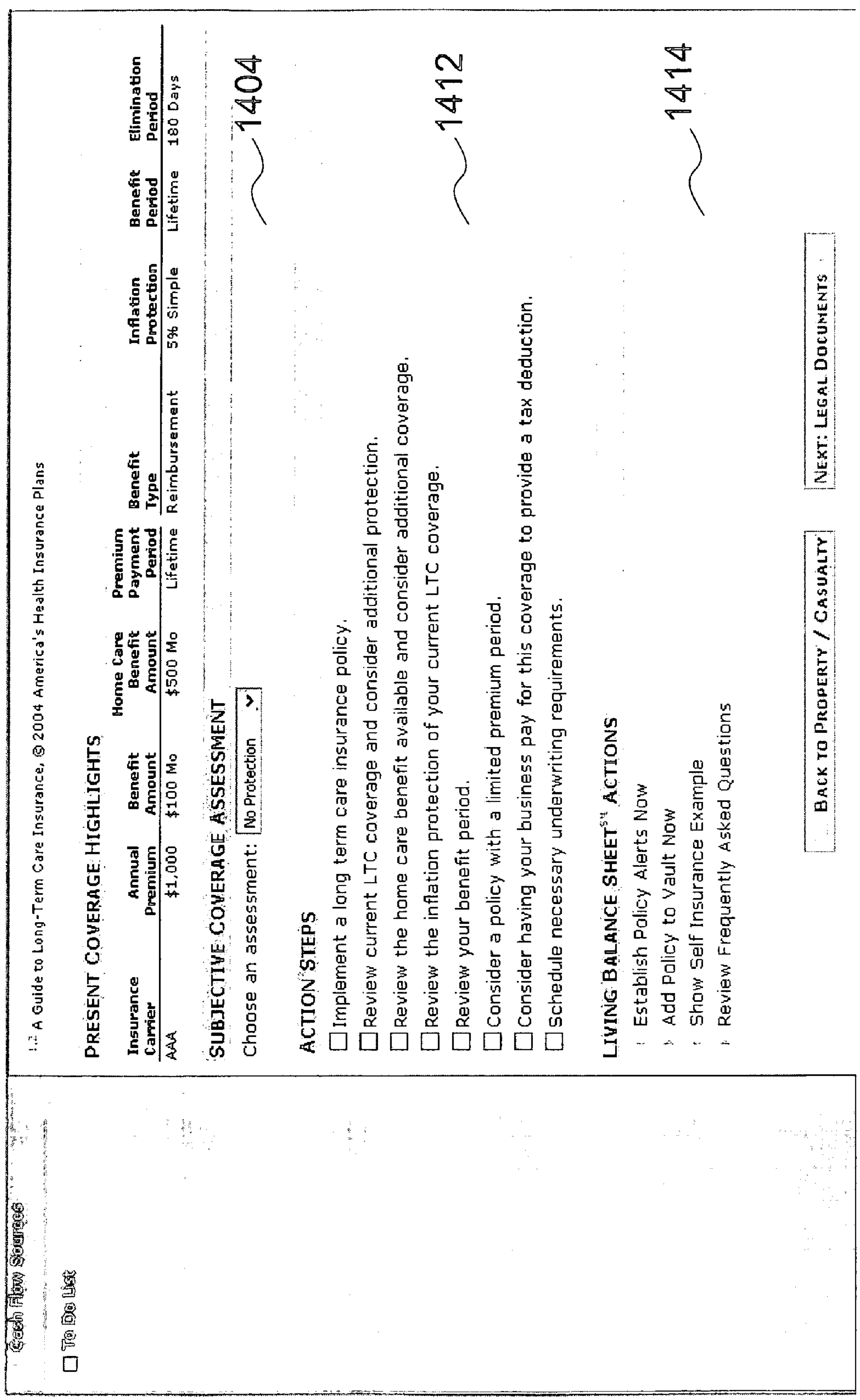

FIGS. 140-141 show disability & health—long term insurance display page 1400. Display page 1400 includes insurance type section 1401 and information section 1402. Display page 1400 can include present coverage highlights section 1403 that displays a summary of the client's current insurance coverage for the current insurance category. Display page 1400 can include assessment section 1404 that displays an assessment of the client's level of protection under the current insurance category. The displayed level of protection can be the level that was selected in matrix 1302 of FIG. 130. As such, the assessment can be automatically selected. A pull-down menu can be implemented to allow the level to be changed while in display page 1400. Display page 1400 can include action steps section 1412 of FIG. 141. Action steps section 1412, as shown, displays a list of selectable action steps that are needed to be taken by the client (e.g., to discuss the subject of the action step) to, for example, move the sales process or interaction with the client forward. A user can click in a checkbox associated with each action item to indicate that the selected action step should be completed with respect to the current client. A list of selected action steps from the various display pages for different insurance categories or types can be displayed at the end of protection observation section 1332. Display page 1400 can include actions section 1414 that includes selectable links for software internal actions or user-centered actions that the user should take with respect to the client and the current insurance category (e.g., property/casualty—auto insurance). A list of selected actions from the various display pages for different insurance categories or types can be displayed at the end of protection observation section 1332. A user can interact with the next and back buttons to save or cancel selections and to move to the next or previous display page or section.

Figure 142:
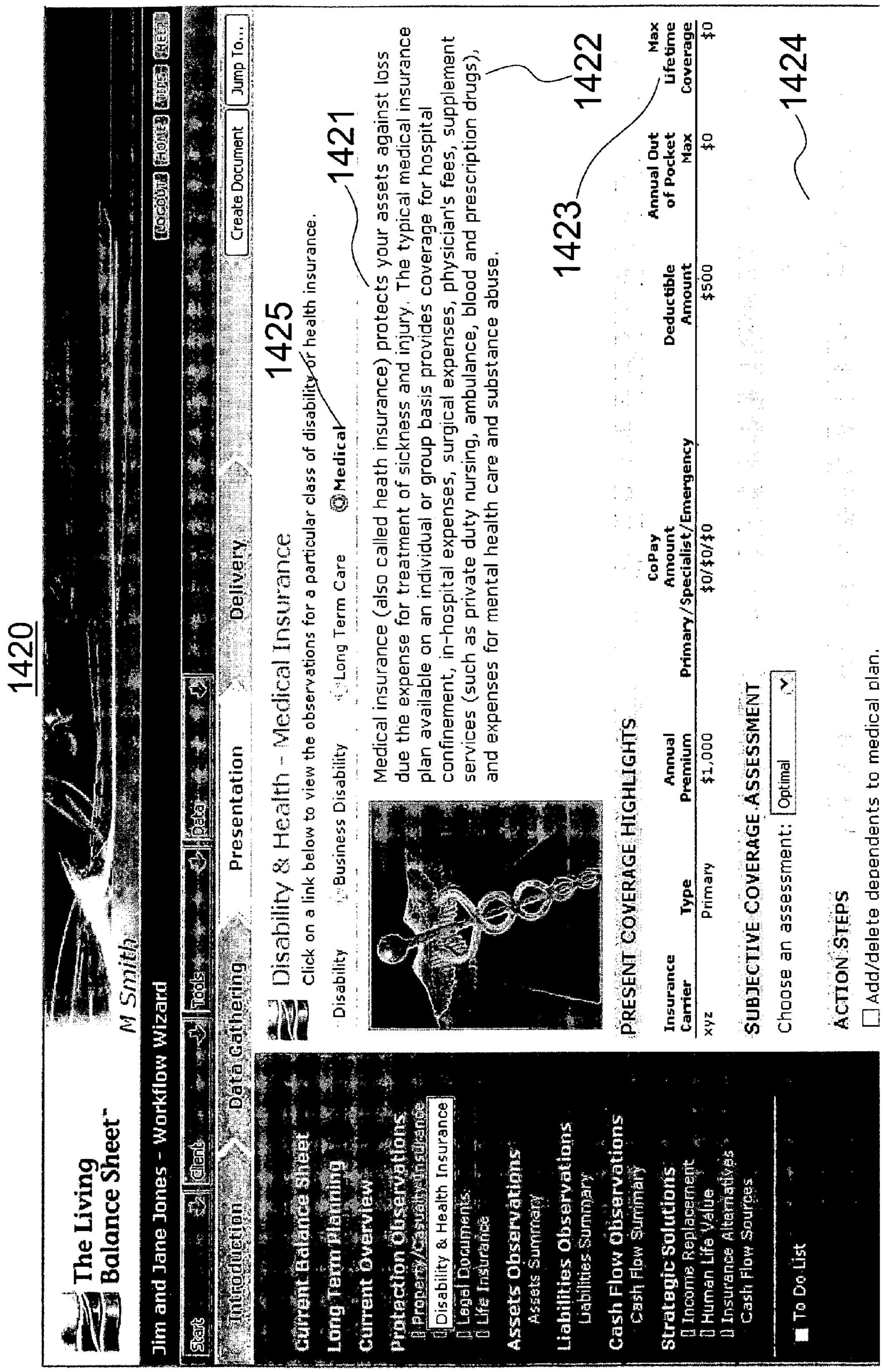
Figure 143:
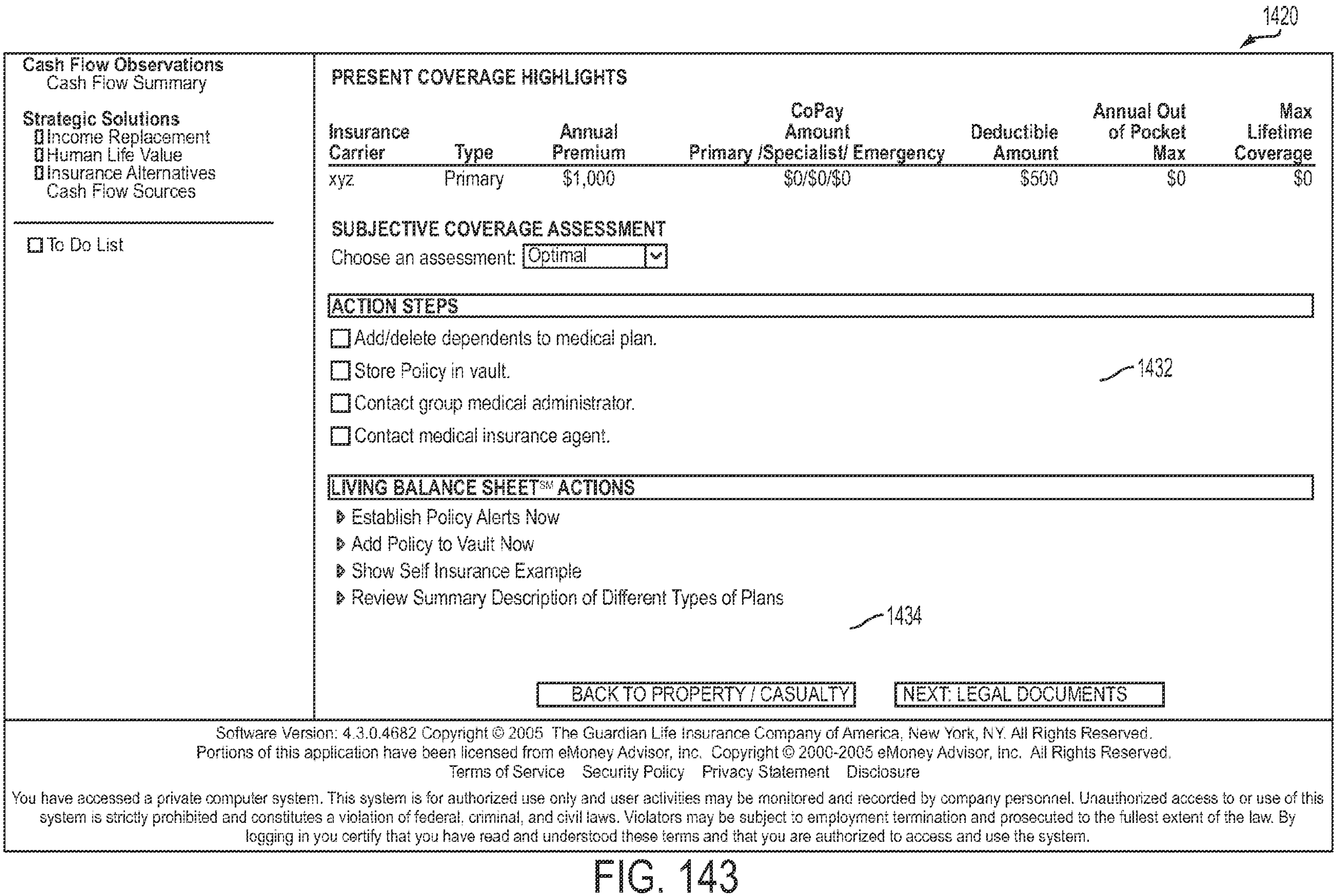

FIGS. 142-143 show disability & health—medical insurance display page 1420 (which can be displayed when the medical radio button 1425 is selected). Display page 1420 includes insurance type section 1421 and information section 1422. Display page 1420 can include present coverage highlights section 1423 that displays a summary of the client's current insurance coverage for the current insurance category. Display page 1420 can include assessment section 1424 that displays an assessment of the client's level of protection under the current insurance category. The displayed level of protection can be the level that was selected in matrix 1302 of FIG. 130. As such, the assessment can be automatically selected. A pull-down menu can be implemented to allow the level to be changed while in display page 1420. Display page 1420 can include action steps section 1432 of FIG. 143. Action steps section 1432 as shown displays a list of selectable action steps that are needed to be taken by the client (e.g., to discuss the subject of the action step) to for example move the sales process or interaction with the client forward. A user can click in a checkbox associated with each action item to indicate that the selected action step should be completed with respect to the current client. A list of selected action steps from the various display pages for different insurance categories or types can be displayed at the end of protection observation section 1332. Display page 1420 can include actions section 1434 that includes selectable links for software internal actions or user-centered actions that the user should take with respect to the client and the current insurance category (e.g., property/casualty—auto insurance). A list of selected actions from the various display pages for different insurance categories or types can be displayed at the end of protection observation section 1332. A user can interact with the next and back buttons to save or cancel selections and to move to the next or previous display page or section.

Figure 144:
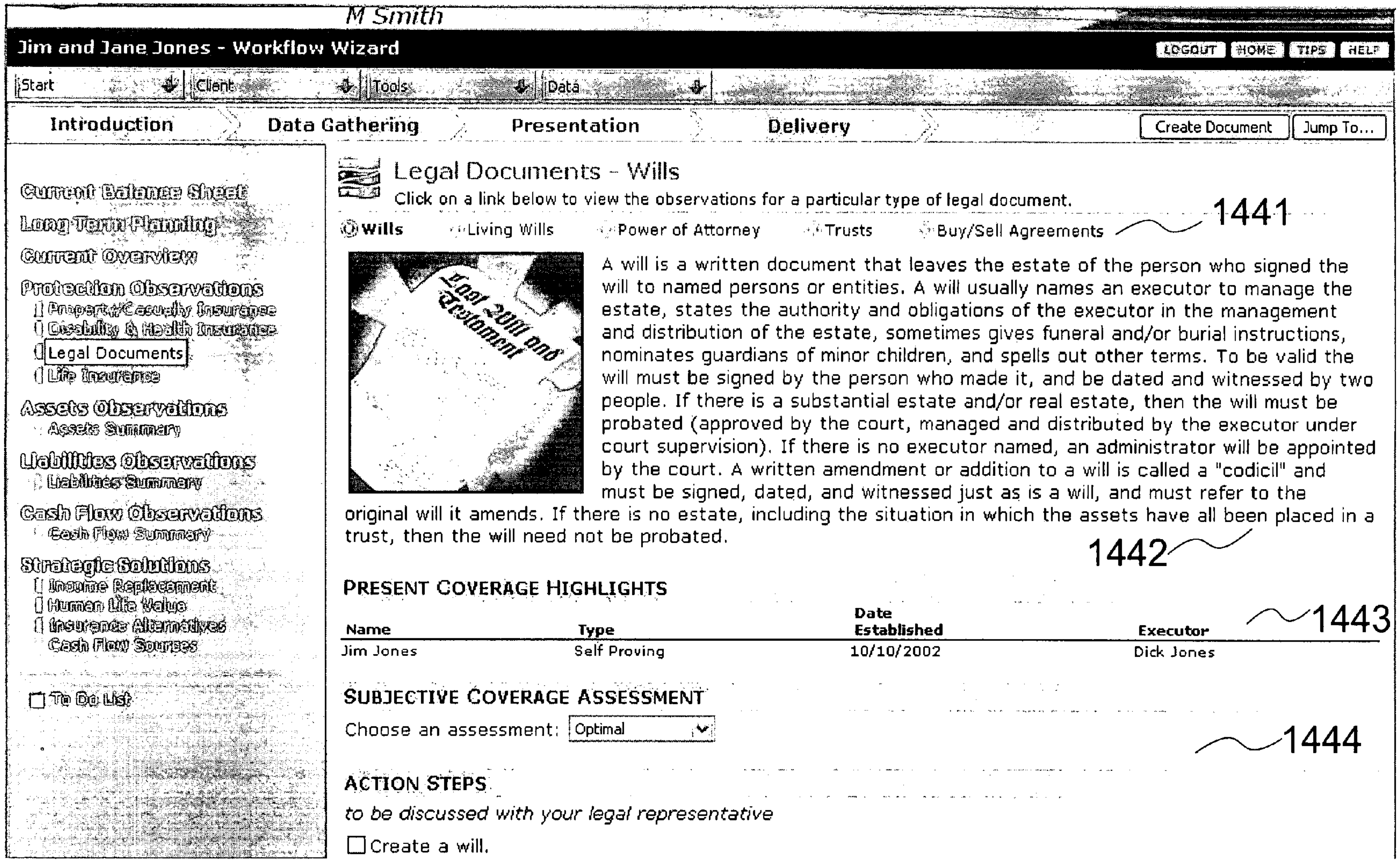
Figure 145:
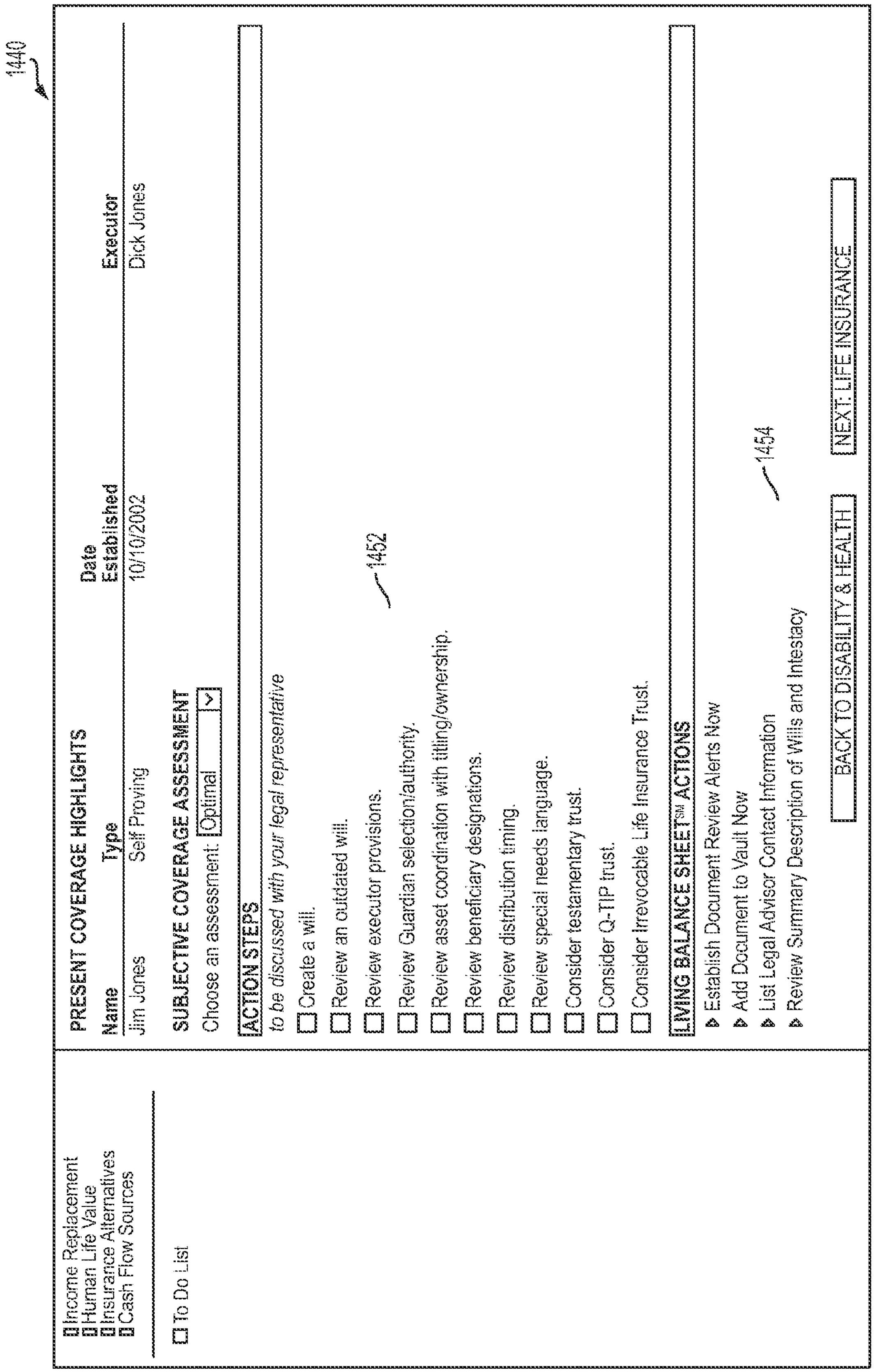

FIGS. 144-145 show legal documents-wills display page 1440. Display page 1440 includes legal document type section 1441 and information section 1442. Display page 1440 can include present coverage highlights section 1443 that displays a summary of the client's current legal document coverage for the current protection category. Display page 1440 can include assessment section 1444 that displays an assessment of the client's level of protection under the current legal document category. The displayed level of protection can be the level that was selected in matrix 1302 of FIG. 130. As such, the assessment can be automatically selected. A pull-down menu can be implemented to allow the level to be changed while in display page 1440. Display page 1440 can include action steps section 1452 of FIG. 145. Action steps section 1452 as shown displays a list of selectable action steps (e.g., specific to the current legal document category) that are needed to be taken by the client (e.g., to discuss the subject of the action step) to for example move the sales process or interaction with the client forward. A user can click in a checkbox associated with each action item to indicate that the selected action step should be completed with respect to the current client. A list of selected action steps from the various display pages for different insurance or protection categories or types can be displayed at the end of protection observation section 1332. Display page 1440 can include actions section 1454 that includes selectable links for software internal actions or user-centered actions that the user should take with respect to the client and the current protection category (e.g., legal documents—wills). A list of selected actions from the various display pages for different insurance protection categories or types can be displayed at the end of protection observation section 1332. A user can interact with the next and back buttons to save or cancel selections and to move to the next or previous display page or section.

Figure 146:
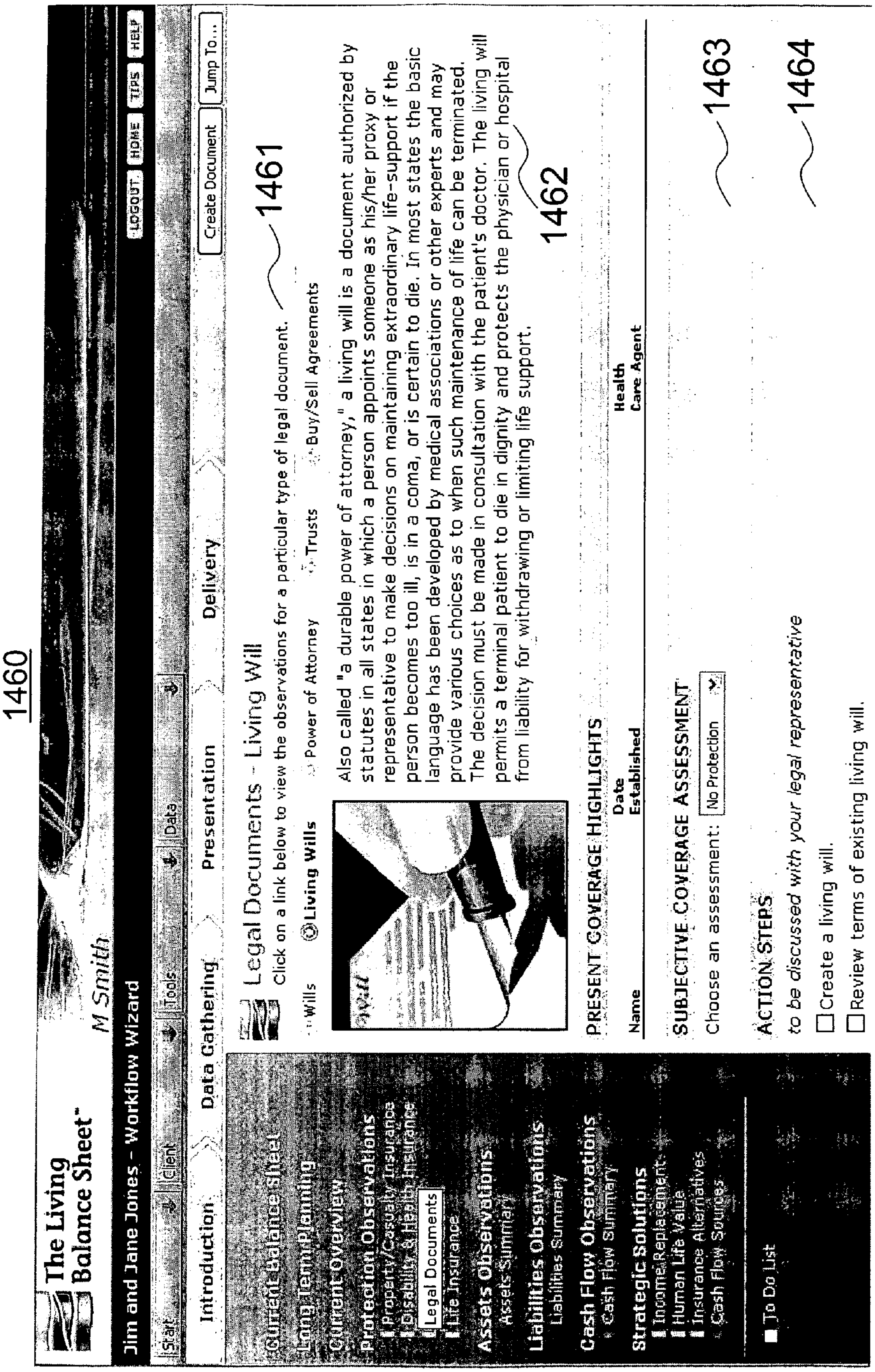
Figure 147:
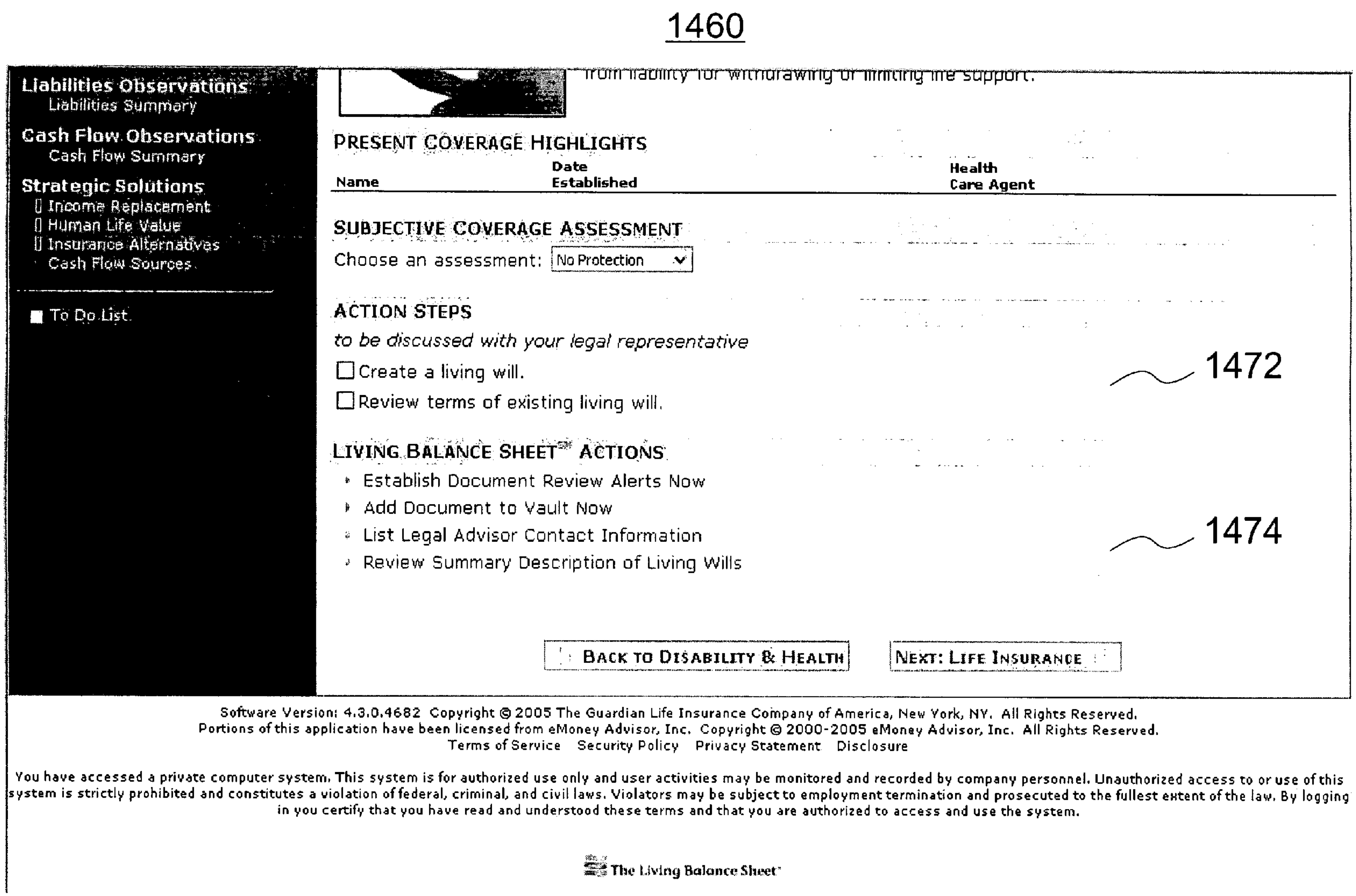

FIGS. 146-147 show legal documents-living will display page 1460. Display page 1460 includes legal document type section 1461 and information section 1462. Display page 1460 can include present coverage highlights section 1463 that displays a summary of the client's current legal document coverage for the current protection category. Display page 1460 can include assessment section 1464 that displays an assessment of the client's level of protection under the current legal document category. The displayed level of protection can be the level that was selected in matrix 1302 of FIG. 130. As such, the assessment can be automatically selected. A pull-down menu can be implemented to allow the level to be changed while in display page 1460. Display page 1460 can include action steps section 1472 of FIG. 147. Action steps section 1472 as shown displays a list of selectable action steps specific to the current category that are needed to be taken by the client (e.g., to discuss the subject of the action step) to for example move the sales process or interaction with the client forward. A user can click in a checkbox associated with each action item to indicate that the selected action step should be completed with respect to the current client. A list of selected action steps from the various display pages for different insurance or protection categories or types can be displayed at the end of protection observation section 1332. Display page 1460 can include actions section 1474 that includes selectable links for software internal actions or user-centered actions that the user should take with respect to the client and the current protection category (e.g., legal documents—wills). A list of selected actions from the various display pages for different insurance protection categories or types can be displayed at the end of protection observation section 1332. A user can interact with the next and back buttons to save or cancel selections and to move to the next or previous display page or section.

Figure 148:
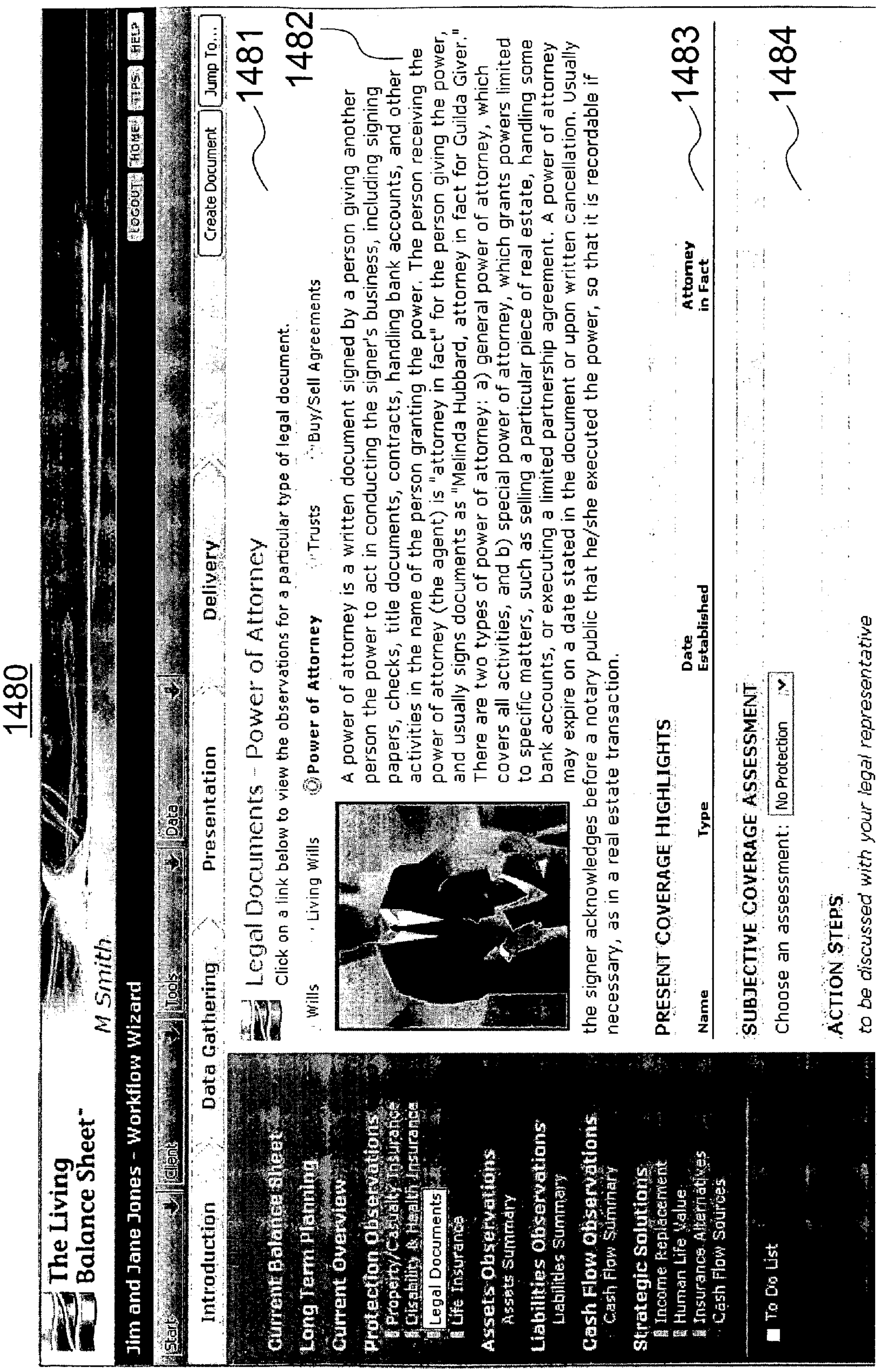
Figure 149:
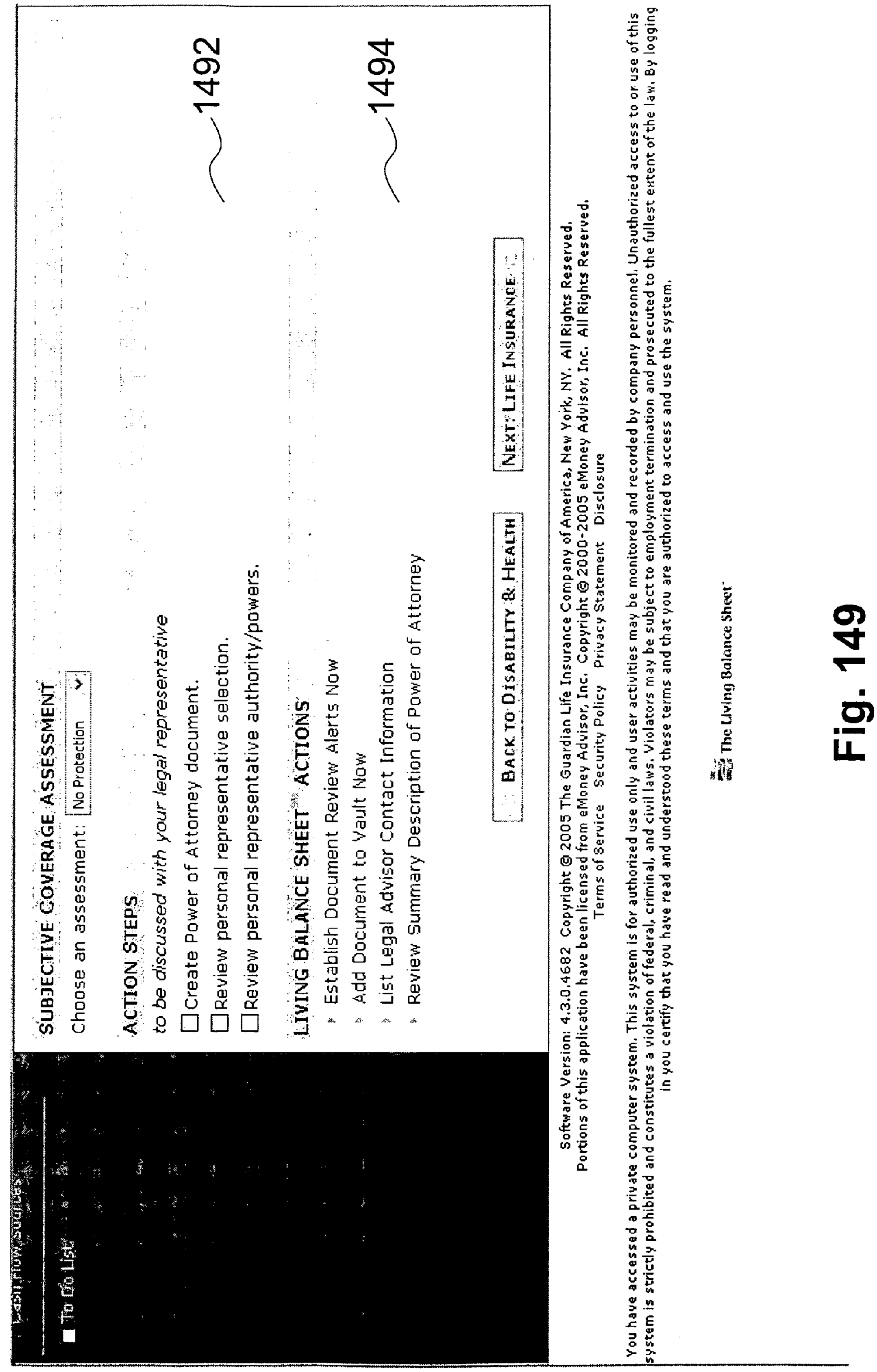

FIGS. 148-149 show legal documents-power of attorney display page 1480. Display page 1480 includes legal document type section 1481 and information section 1482. Display page 1480 can include present coverage highlights section 1483 that displays a summary of the client's current legal document coverage for the current protection category. Display page 1480 can include assessment section 1484 that displays an assessment of the client's level of protection under the current legal document category. The displayed level of protection can be the level that was selected in matrix 1302 of FIG. 130. As such, the assessment can be automatically selected. A pull-down menu can be implemented to allow the level to be changed while in display page 1480. Display page 1480 can include action steps section 1492 of FIG. 149. Action steps section 1492 as shown displays a list of selectable action steps (e.g., specific to the current category) that are needed to be taken by the client (e.g., to discuss the subject of the action step) to for example move the sales process or interaction with the client forward. A user can click in a checkbox associated with each action step to indicate that the selected action step should be completed with respect to the current client. A list of selected action steps from the various display pages for different insurance or protection categories or types can be displayed at the end of protection observation section 1332. Display page 1480 can include actions section 1494 that includes selectable links for software internal actions or user-centered actions that the user should take with respect to the client and the current protection category (e.g., property/casualty—auto insurance). A list of selected actions from the various display pages for different insurance protection categories or types can be displayed at the end of protection observation section 1332. A user can interact with the next and back buttons to save or cancel selections and to move to the next or previous display page or section.

Figure 150:
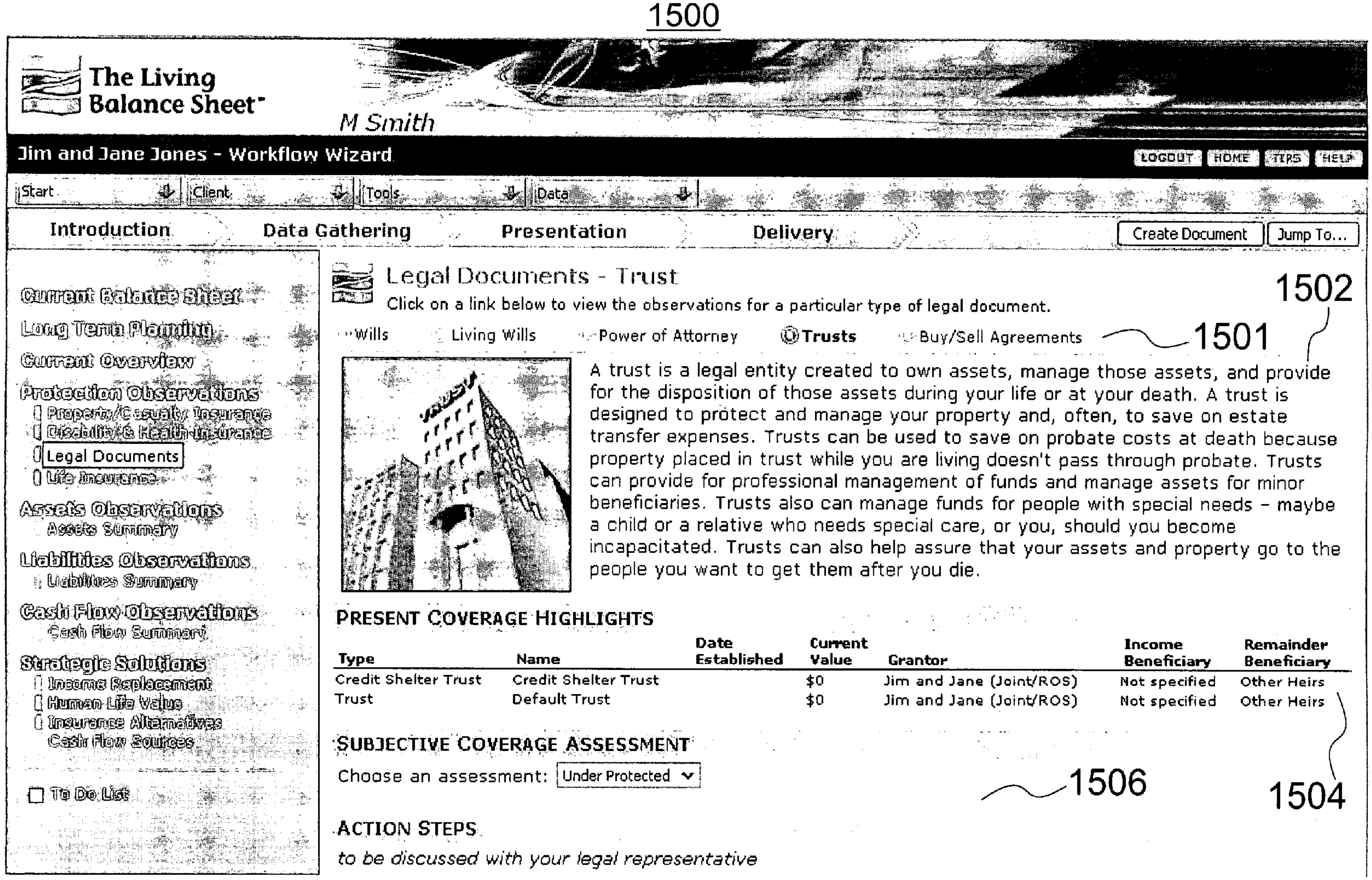
Figure 151:
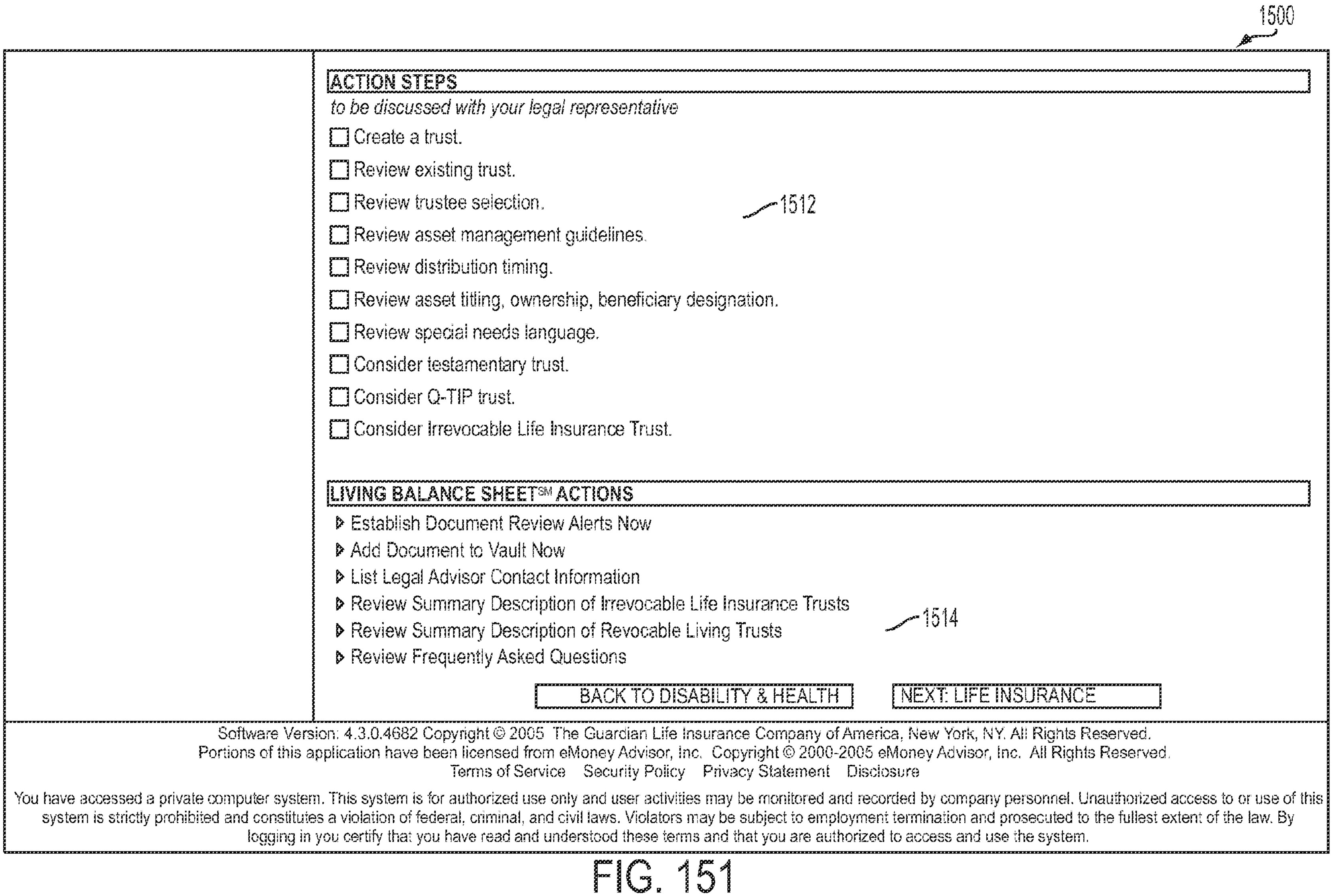

FIGS. 150-151 show legal documents-trusts display page 1500. Display page 1500 includes legal document type section 1501 and information section 1502. Display page 1500 can include present coverage highlights section 1504 that displays a summary of the client's current legal document coverage for the current protection category. Display page 1500 can include assessment section 1506 that displays an assessment of the client's level of protection under the current legal document category. The displayed level of protection can be the level that was selected in matrix 1302 of FIG. 130. As such, the assessment can be automatically selected. A pull-down menu can be implemented to allow the level to be changed while in display page 1500. Display page 1500 can include action steps section 1512 of FIG. 151. Action steps section 1512 as shown displays a list of selectable action steps (e.g., specific to the current category) that are needed to be taken by the client (e.g., to discuss the subject of the action step) to for example move the sales process or interaction with the client forward. A user can click in a checkbox associated with each action step to indicate that the selected action step should be completed with respect to the current client. A list of selected action steps from the various display pages for different insurance or protection categories or types can be displayed at the end of protection observation section 1332. Display page 1500 can include actions section 1514 that includes selectable links for software internal actions or user-centered actions that the user should take with respect to the client and the current protection category (e.g., legal documents-wills). A list of selected actions from the various display pages for different insurance protection categories or types can be displayed at the end of protection observation section 1332. A user can interact with the next and back buttons to save or cancel selections and to move to the next or previous display page or section.

Figure 152:
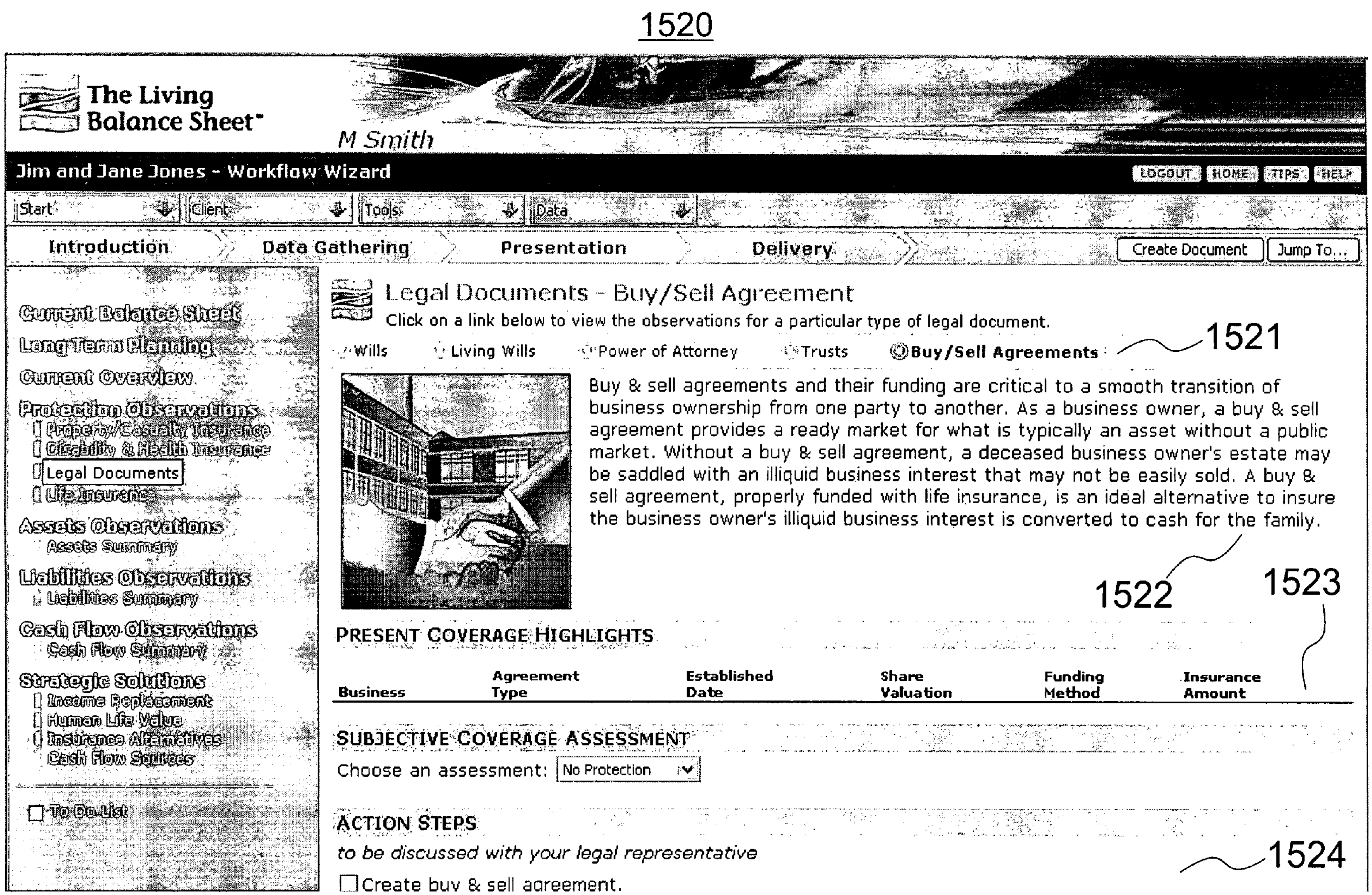
Figure 153:
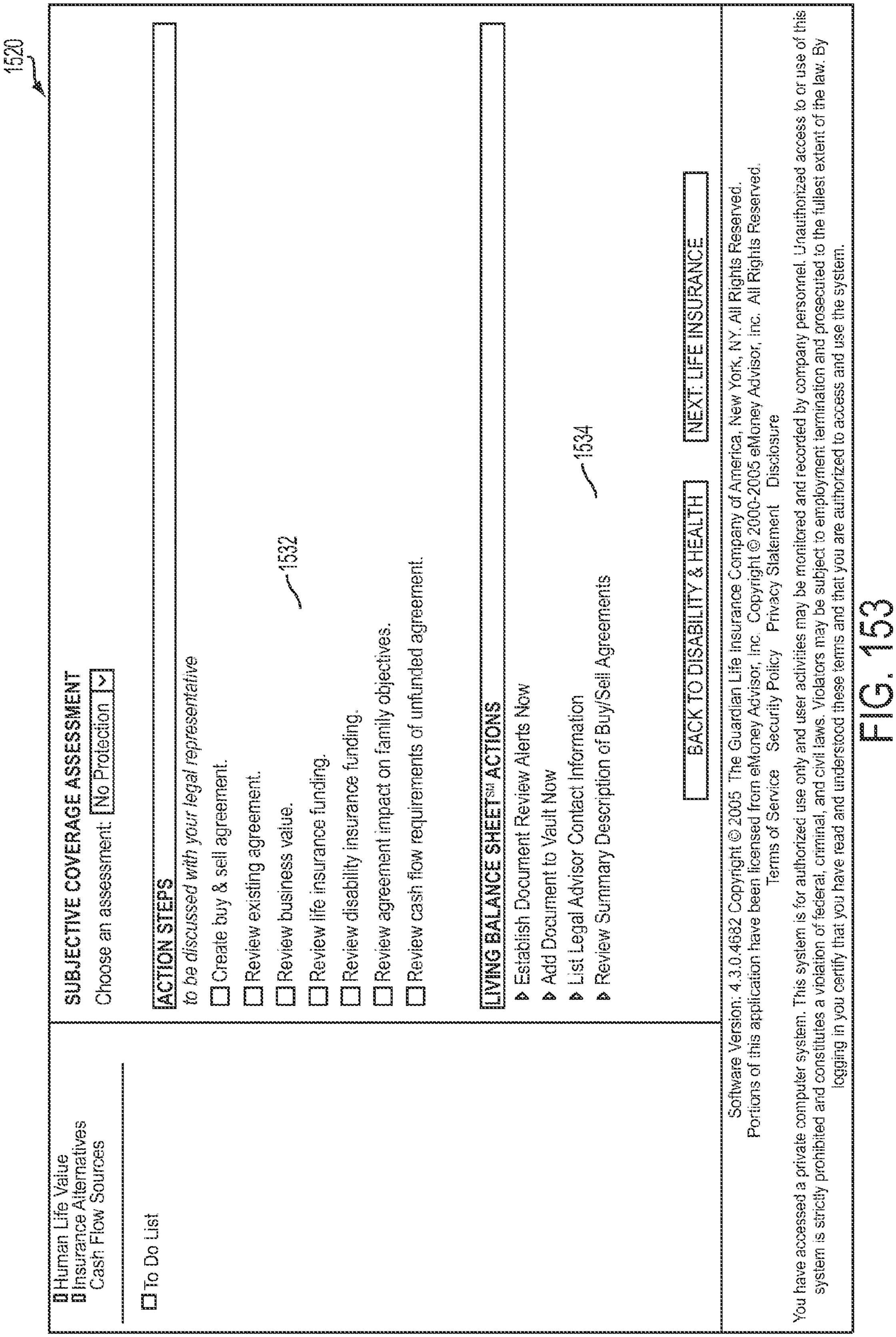

FIGS. 152-153 show legal documents-buy/sell agreements display page 1520. Display page 1520 includes legal documents type section 1521 and information section 1522. Display page 1520 can include present coverage highlights section 1523 that displays a summary of the client's current legal document coverage for the current protection category. Display page 1520 can include assessment section 1524 that displays an assessment of the client's level of protection under the current legal document category. The displayed level of protection can be the level that was selected in matrix 1302 of FIG. 130. As such, the assessment can be automatically selected. A pull-down menu can be implemented to allow the level to be changed while in display page 1520. Display page 1520 can include action steps section 1532 of FIG. 153. Action steps section 1532 as shown displays a list of selectable action steps (e.g., specific to the current category) that are needed to be taken by the client (e.g., to discuss the subject of the action step) to for example move the sales process or interaction with the client forward. A user can click in a checkbox associated with each action step to indicate that the selected action step should be completed with respect to the current client. A list of selected action steps from the various display pages for different insurance or protection categories or types can be displayed at the end of protection observation section 1332. Display page 1520 can include actions section 1534 that includes selectable links for software internal actions or user-centered actions that the user should take with respect to the client and the current protection category. A list of selected actions from the various display pages for different insurance protection categories or types can be displayed at the end of protection observation section 1332. A user can interact with the next and back buttons to save or cancel selections and to move to the next or previous display page or section.

Figure 154:
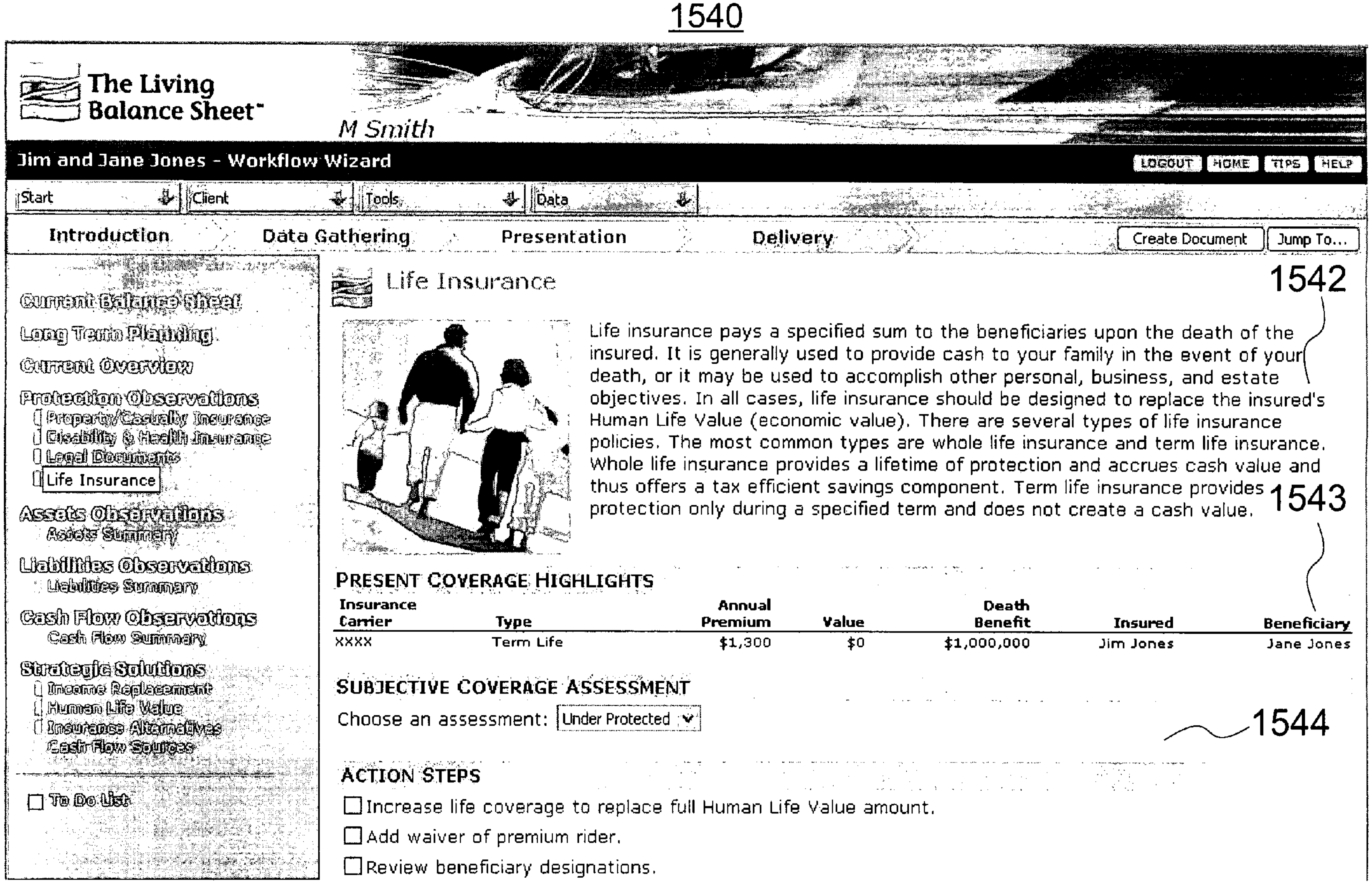
Figure 155:
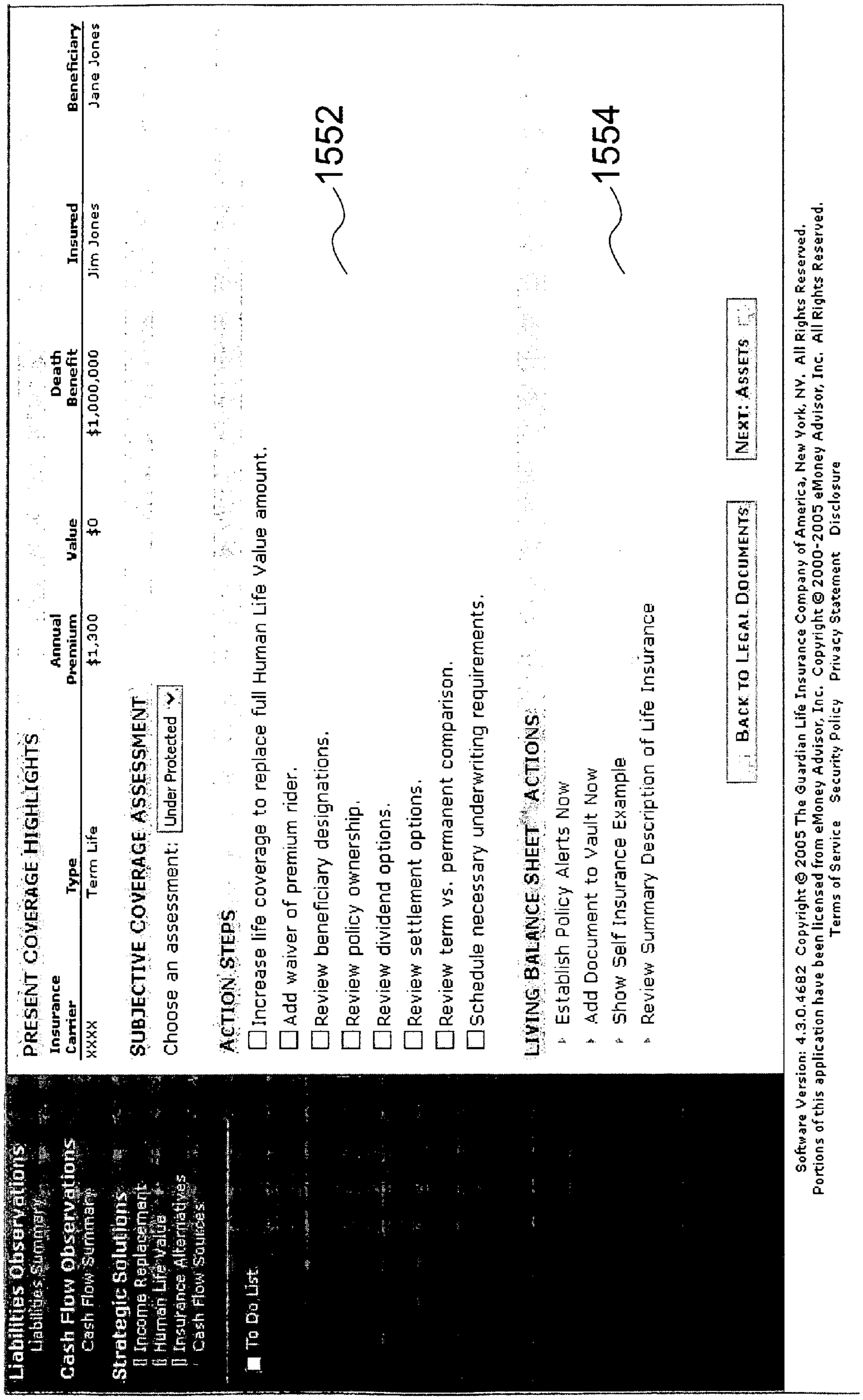

FIGS. 154-155 show life insurance display page 1540. Display page 1540 includes insurance type section 1541 and information section 1542. Display page 1540 can include present coverage highlights section 1543 that displays a summary of the client's current insurance coverage for the current insurance category. Display page 1540 can include assessment section 1544 that displays an assessment of the client's level of protection under the current insurance category. The displayed level of protection can be the level that was selected in matrix 1302 of FIG. 130. As such, the assessment can be automatically selected. A pull-down menu can be implemented to allow the level to be changed while in display page 1540. Display page 1540 can include action steps section 1552 of FIG. 155. Action steps section 1552, as shown, displays a list of selectable action steps (e.g., specific to life insurance) that are desired to be taken by the client (e.g., to discuss the subject of the action step) to, for example, move the sales process or interaction with the client forward. A user can click in one of the checkboxes associated with each action step to indicate that the selected action step should be completed. A list of selected action steps from the various display pages for different insurance protection categories or types can be displayed at the end of protection observation section 1332. Display page 1540 can include actions section 1554 of FIG. 155 that includes selectable links for internal software actions or user-centered actions that the user should take with respect to the client and the current insurance category (e.g., property/casualty—auto insurance). A user can interact with the next and back buttons to save or cancel selections and to move to the next or previous display page or section. If desired, a list summarizing the actions selected in the various display pages in connection with different insurance categories or insurance types can be displayed at the end of protection observation section 1332.

Figure 156:
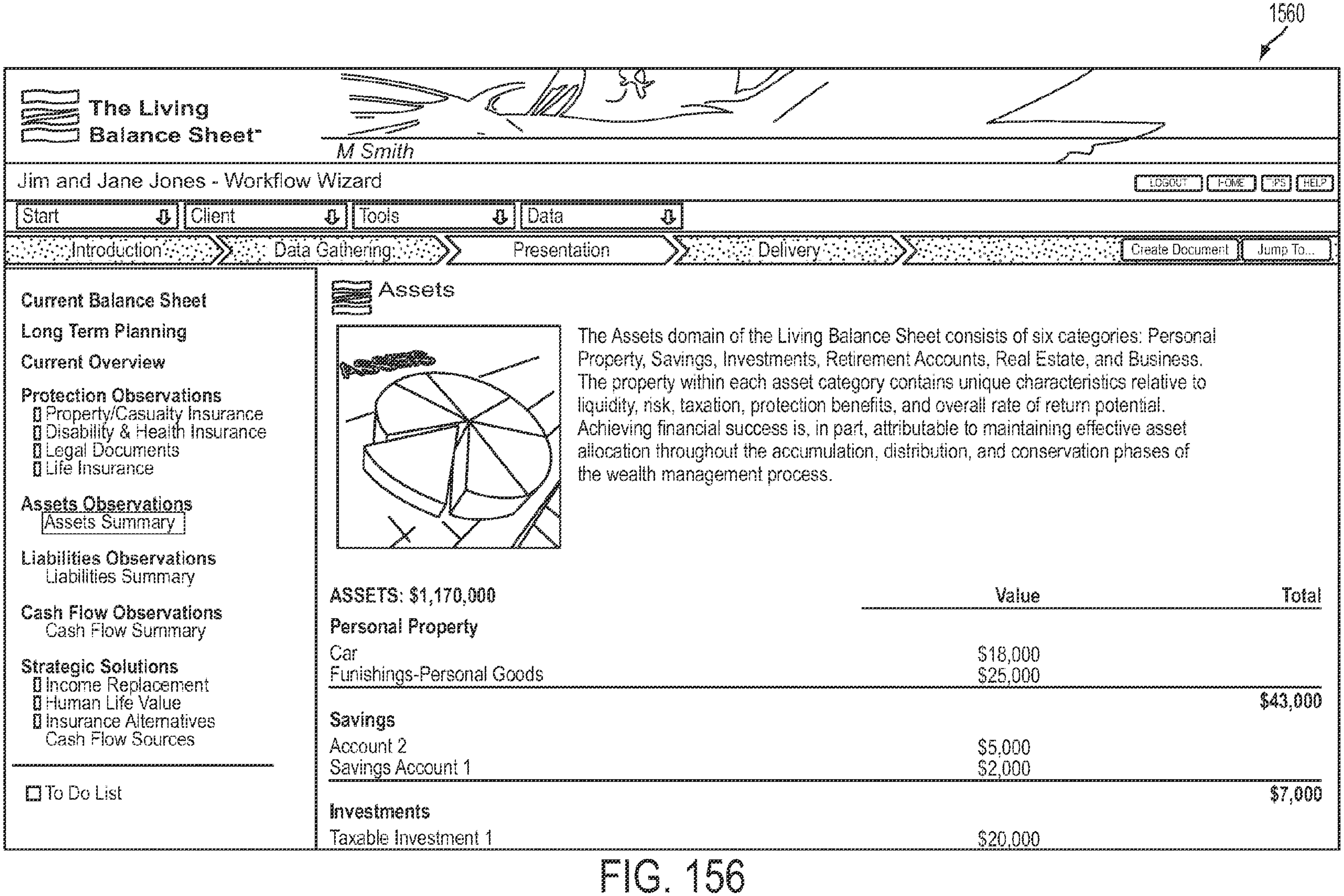
Figure 157:
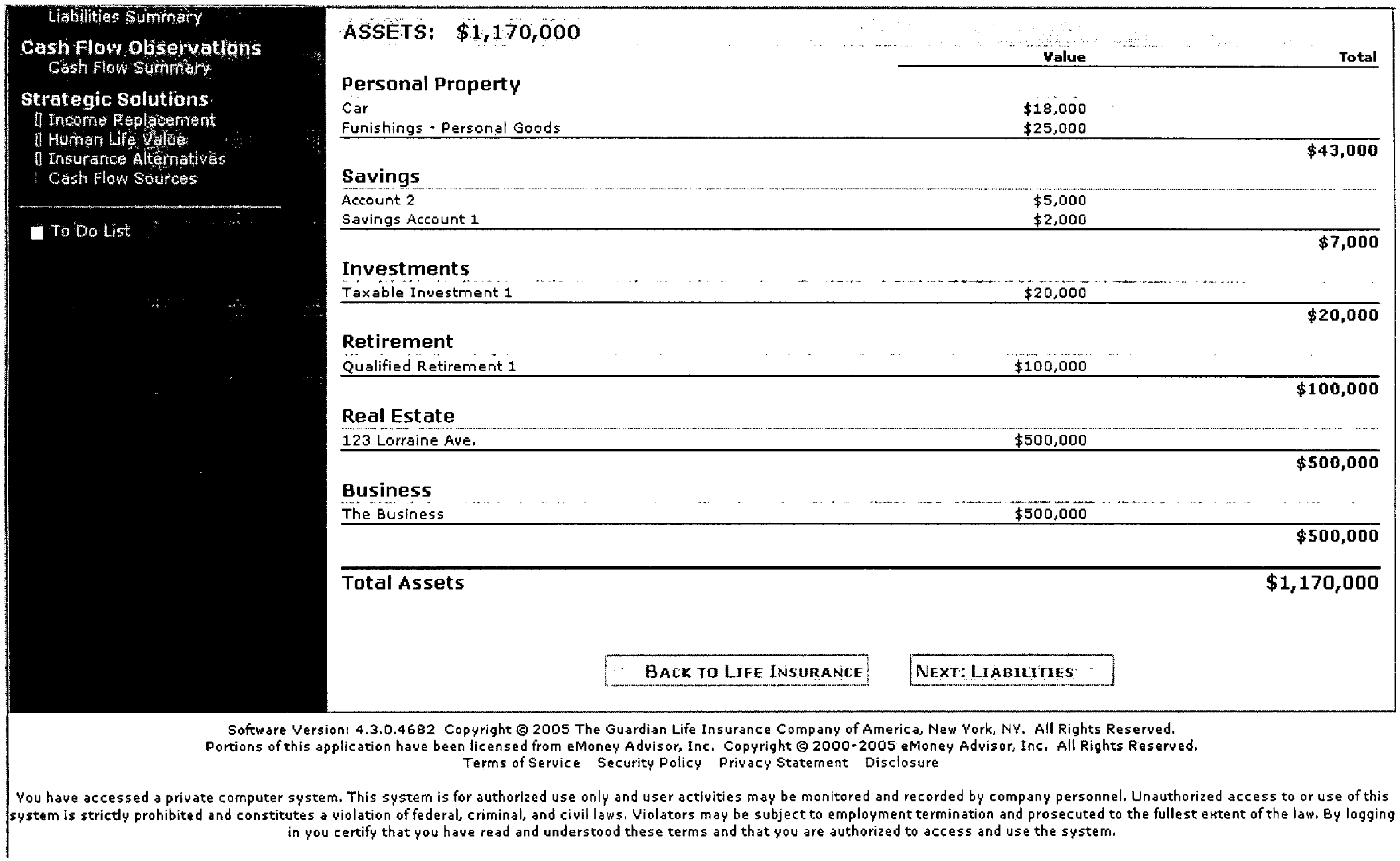

The next section in the presentation stage can be an asset observations section. For example, assets display page 1560 of FIGS. 156-157 can be displayed. Assets display page 1560 is preferably configured to provide an itemized summary/total of the client's assets, as for example entered and compiled during the data gathering stage. Assets display page 1560 can include a cumulative total per category and a total cumulative assets value for such information. For example, assets display page 1560 can include displayed sections for asset categories such as personal property, savings, investments, retirement, real estate, and business (e.g., such categories as were identified and entered during the data gathering stage). The displayed next and back button can be selected to move to the next or previous sections.

Figure 158:
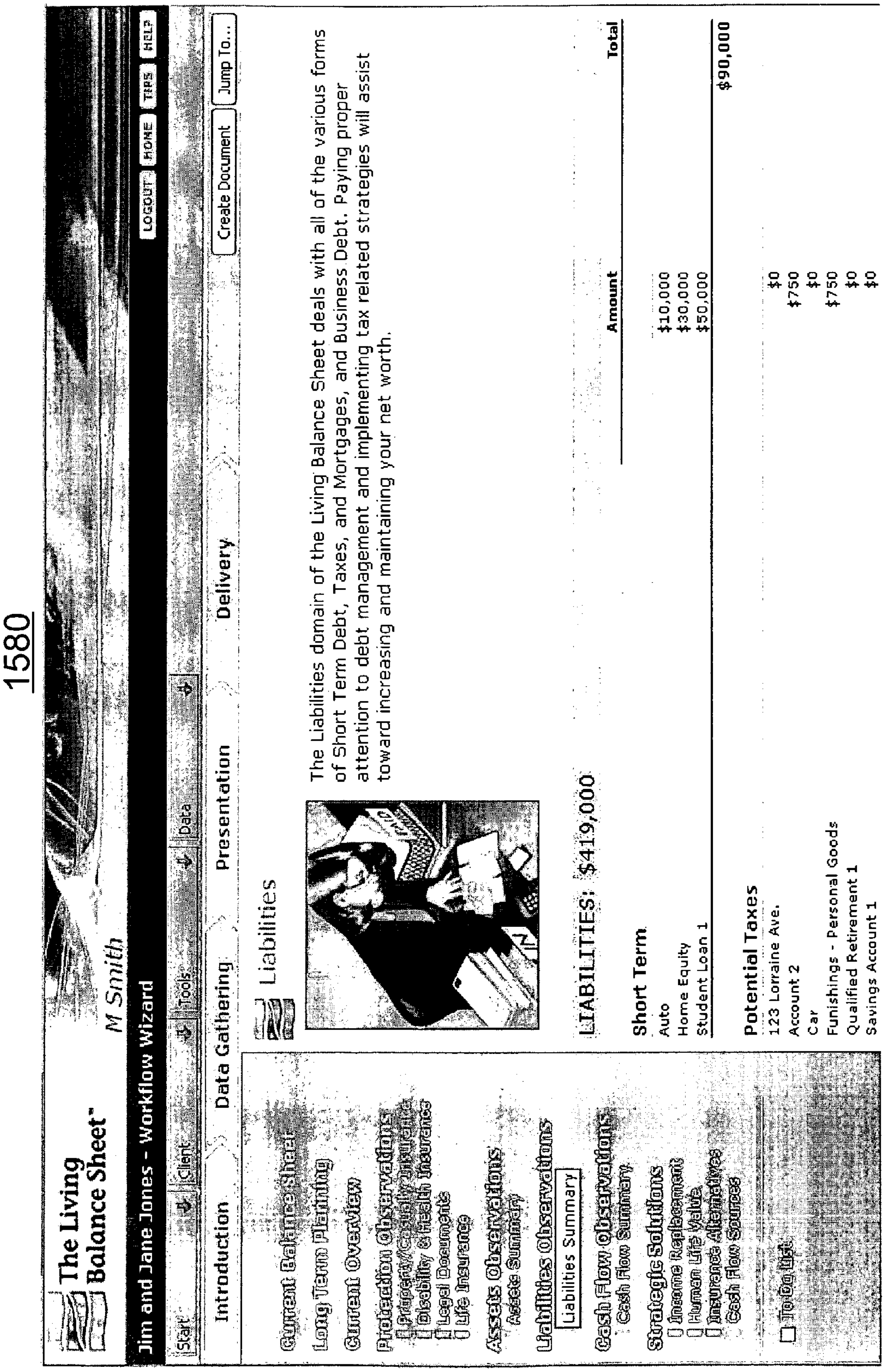

The next section in the presentation stage can be a liabilities observations section. For example, liabilities display page 1580 of FIGS. 158-159 can be displayed. Liabilities display page 1580 is preferably configured to provide an itemized summary/total of the client's liabilities that, for example, was entered or compiled during the data gathering stage. Liabilities display page 1580 can include a cumulative total per category and a total liabilities value for such information. For example, liabilities display page 1580 can include displayed sections for liabilities categories such as short-term liability, potential taxes, and mortgages (e.g., such liability categories as were identified and entered during the data gathering stage). The displayed next and back button can be selected to move to the next or previous sections.

The next section in the presentation stage can be a cash flow observations section. For example, cash flow display page 1600 of FIGS. 160-161 can be displayed. Cash flow display page 1600 is preferably configured to provide an itemized summary/total of the client's cash flow related information that, for example, was entered or compiled during the data gathering stage. Cash flow display page 1600 can include a cumulative total per category and a total a new income value for such information. For example, cash flow display page 16000 can include display sections for cash flow categories such as gross income, protection costs (i.e., costs of insurance protection), asset building savings (e.g., retirement, savings, etc.), and liability payments (e.g., car loan, student loan, etc.). For example, display screen 1600 can display itemized information and totals for such cash flow, costs, and liability payment-categories information that were identified and entered during the data gathering stage. The displayed next and back buttons can be selected to move to the next or previous sections.

The next section can be a strategic solutions section that provides illustrative presentation, information, calculators, and comparisons based on the client information that can quantify the strengths and weaknesses of the client's current level of protection and to illustrate possible ways of achieving preferred protection levels. As shown, the strategic solutions section can for example include multiple subsections such as income replacement, human life value, insurance alternatives, and cash flow sources.

Figure 162:
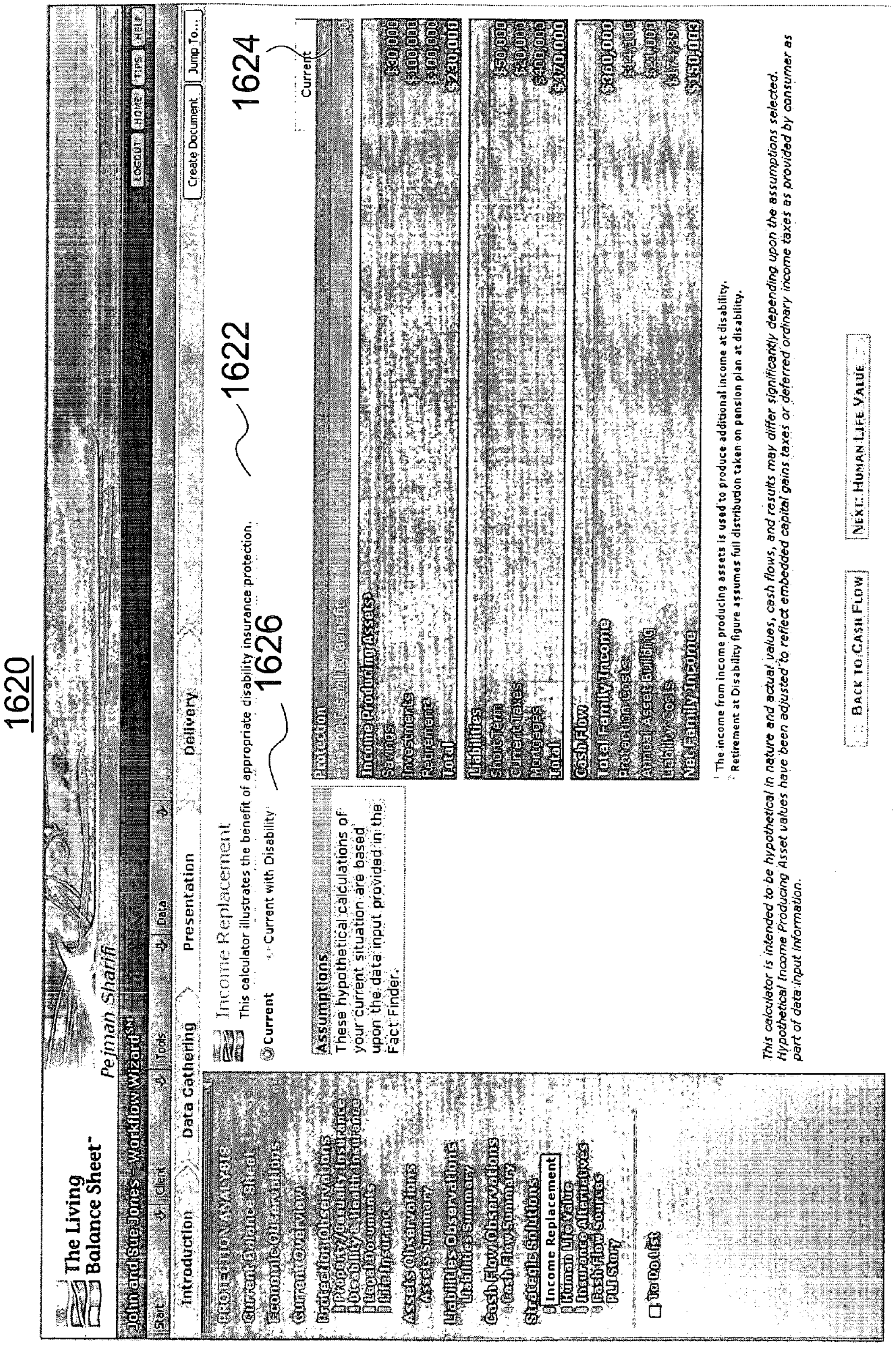

For example, as part of the income replacement section, income replacement calculator display page 1620 of FIG. 162 can be displayed. Income replacement calculator display page 1620 can be configured to display relevant financial and protection data relating to disability insurance protection. The purpose of display page 1620 can be to provide a comparative analysis of a client's current financial state and the client's financial state if the client is disabled now and must then rely on any existing disability insurance that the client owns. As shown, display page 1620 includes calculator display section 1622. Calculator display section 1622 can include "current" display section 1624 that displays a table of relevant financial and protection information of the client. The information is to reflect the current state of the client with respect to pertinent disability insurance related information. The information can be automatically populated from information that was previously entered, for example, during the data gathering stage. The display information can be displayed in appropriate categories such as protection, income producing assets, liabilities, and cash flow. Under protection, the existing annual amount of disability benefit that is covered under the client's disability protection can be displayed. Within the income producing assets category, the current client values for savings, investments, retirement, and a total of such values can be displayed. Under the liabilities category, the current client values for short-term liabilities, current taxes, mortgages, and a total thereof can be displayed. Under the cash flow category, the total family income, protection costs, annual savings (or asset building), liability costs, and the net family income, which would be the result of deducting protection costs, annual savings, and liability costs from the total family income, can be displayed. As shown, calculator display section 1622 can display the "current" state of financial and protection information.

Figure 163:
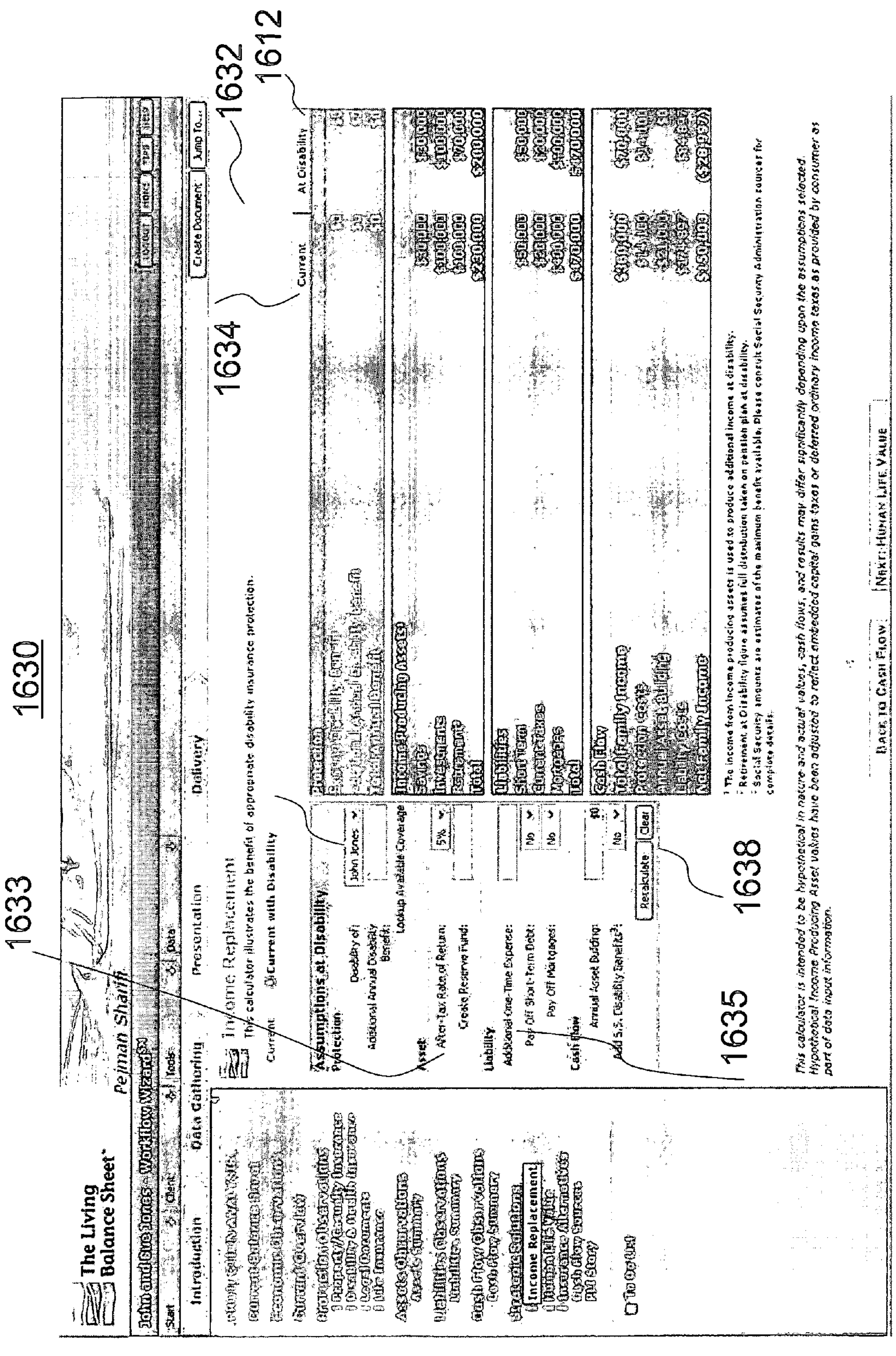

Radio buttons or links 1626 can be used to switch between different types of views. As shown, radio button 1626 reflects that the "current" view is displayed. If a user selects the "current with disability" radio button, additional information and functionality is added to display section 1622 to allow for the calculation and related analysis of the client's current financial state and the client's current financial state if the client was currently disabled. For example, with reference now to FIG. 163, calculator display section 1632 can be displayed that includes "current" display section 1634 and "at disability" display section 1636. In addition, assumptions section 1638 is displayed. The newly added "at disability" section 1636 is used to display a table of information that is also displayed as part of "current" display section 1634, but the values are revised to reflect the impact of becoming disabled to the current financial state of the client. As such, the client can visually see a detailed analysis of the likely impact of the client's current level of disability protection to the client's financial state if the client was to be currently disabled. The information is also displayed in a side-by-side manner to aid comprehension and the presentation value of the information that is displayed.

As shown, "at disability" section 1636 is displayed to reflect the current settings in assumptions section 1638 and possible underlying facts that were entered as part of the data gathering section. As such, the only numbers that are changed between "current" display section 1634 and "at disability" section 1636 are the retirement, total family income, annual savings, liability costs, and net family income information. The retirement asset value is changed to a lower amount to reflect a current payout under the retirement account (e.g., a lower payout based on an user-selected tax assumption for the client). The value displayed for total family income in the "at disability" section reflects that the loss of the employment income of the client or family member that is disabled. A user can select to identify the disability to be one of the client or spouse using pull-down menu 1631. The total family income at disability also reflects the addition of the total annual disability benefit, which is in this example is $0 and the annual return on the total assets based on the after-tax rate of return that is specified using pull-down menu 1633. Assumptions section 1638 also reflects that at disability, the client will seek a certain amount of annual savings 1635. As shown, this amount is set to zero and is reflected in the "annual savings" line item of "at disability" section 1636. The liability costs is reduced from the "current" to the "at disability" value because the liability costs includes the income tax liability arising from employment income, which in this case would be reduced due to the lack of employment income caused by the disability. With this information, the client can now see that the impact of a disability on the client current financial situation will be such that the net family income value will drop from $150,003 to a negative dollar value, which clearly reflects the need for disability protection.

Note also that there is no difference shown between the "current" and "at disability" protection costs. This is because, in this example, the client did not have disability insurance and therefore, the data would not reflect a premium payment for disability insurance. If the client had some level of disability insurance, the premium for the insurance would be reflected in the difference between the two numbers (e.g., the obligation to pay the premium would end once the insurance is activated). Therefore, data that is entered or calculated within the workflow wizard is automatically applied in other aspects of the wizard and application.

Figure 164:
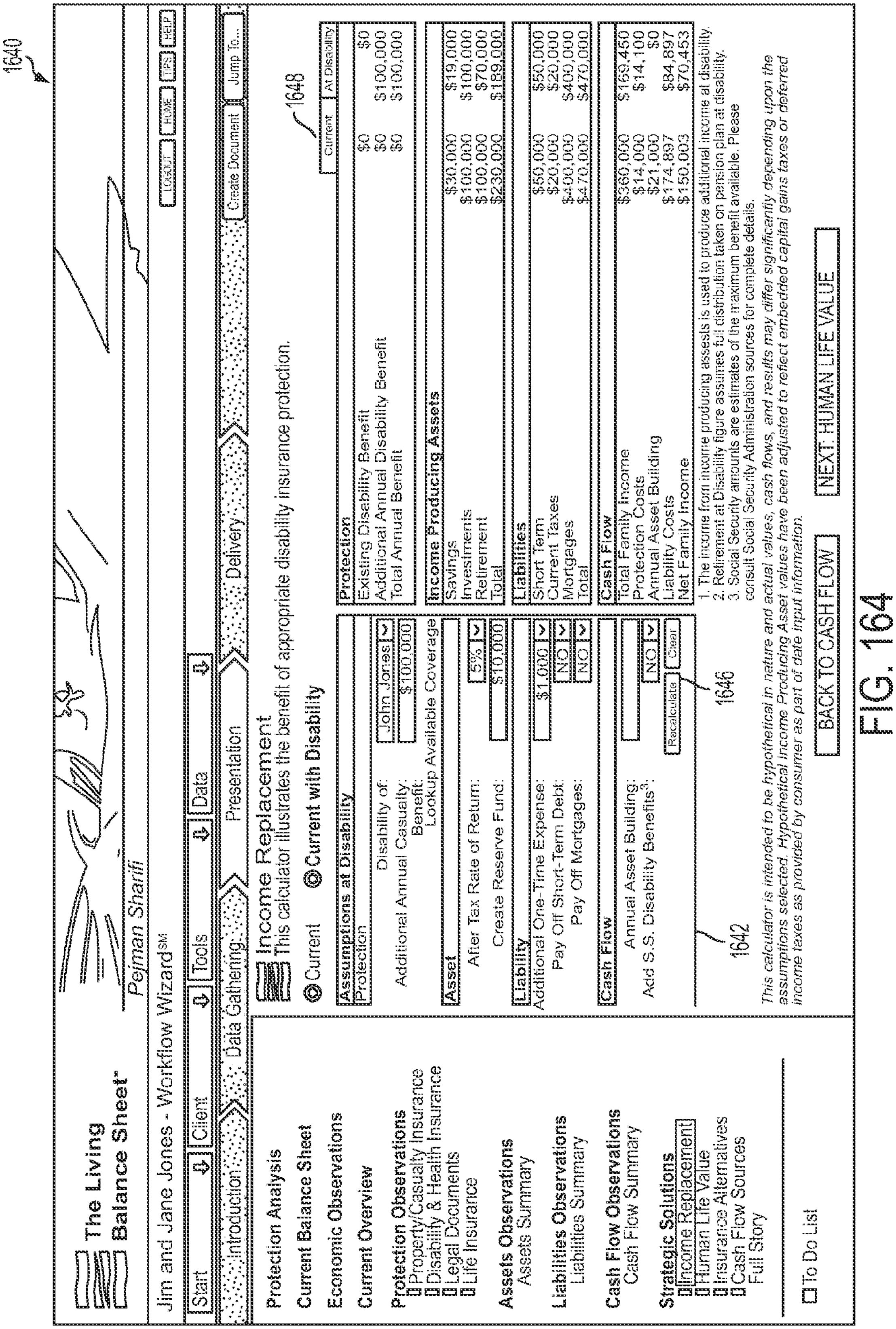

Now with reference to FIG. 164, the user may also interact with other features of assumptions section 1642 to further illustrate the "at disability" state of the client's financial condition. For example, the user may enter a value such as $100,000 in the additional annual disability benefit option of assumptions section 1642. If desired, lookup available coverage option 1644 can be displayed near the additional annual disability benefit option 1644 to allow the user to lookup additional coverage that may be available for the client (e.g., based on an automated evaluation or using lookup tables). The user may also be provided with options for entering values corresponding to creating a reserve fund and specifying an additional one-time expense that would be incurred at the time of the disability. After entering such information, the user can select recalculate button 1646. In response, "at disability" section 1648 is updated based on the new information in assumptions section 1642. As shown, "at disability" section 1648 now reflects that the client protection includes $100,000 of additional annual disability benefit. As shown, the updated savings value of $19,000 reflects a deduction from the $30,000 current savings value for the creation of the $10,000 reserve fund and the payment of the $1,000 additional one-time expense as selected in assumptions section 1642. The total family income and in turn, the net family income reflects the additional $100,000 income that is obtained from the assumed additional annual disability benefit. In addition, the information reflects the lower annual return that is received from the assets (e.g., savings) due to the reduction of the assets to create the reserve fund and to pay the one-time expense. As is comparatively evident again, the client will still face a significant change in financial condition given even this level of disability protection.

Figure 165:
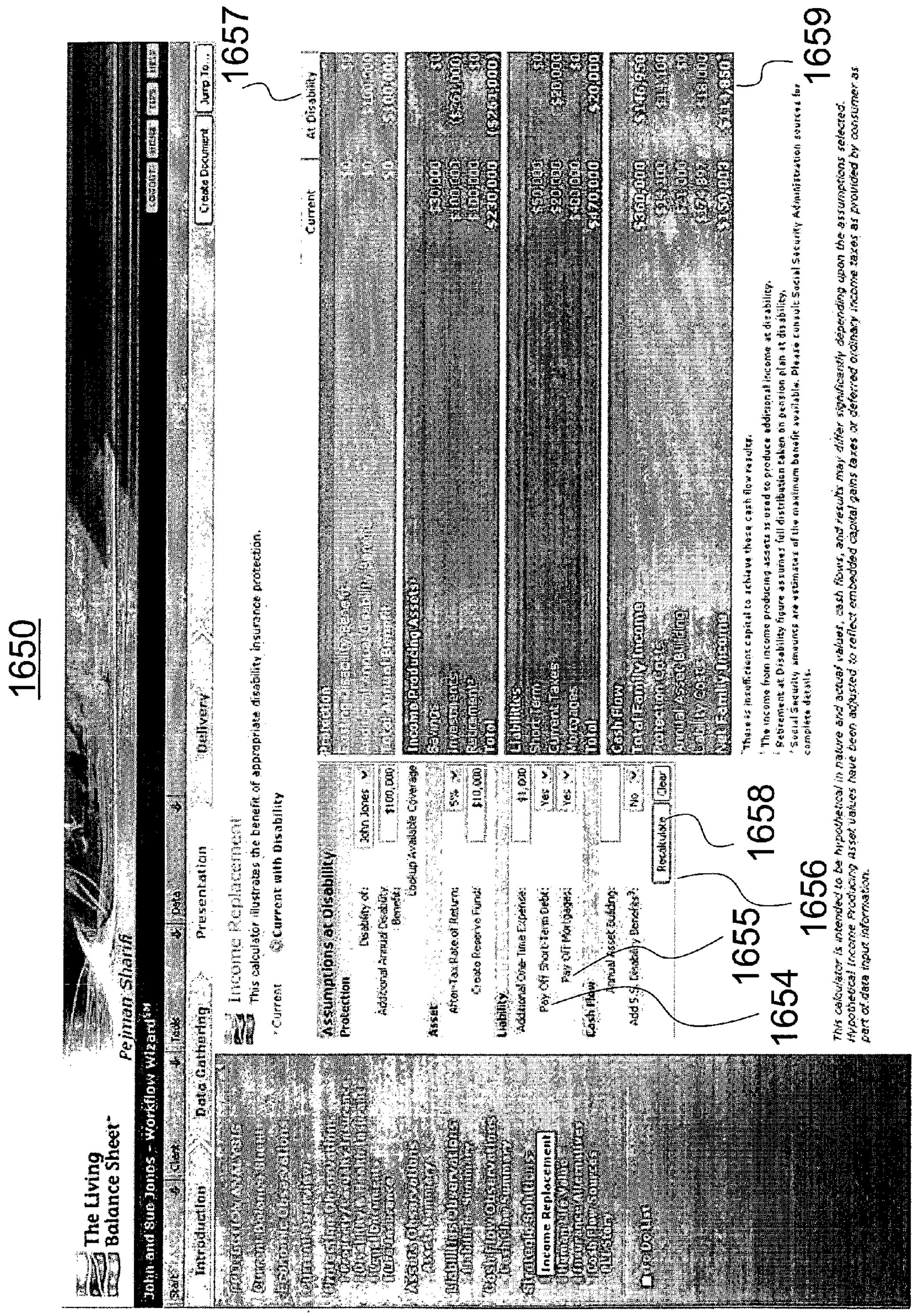

As shown in FIG. 165, other options in assumptions section 1652 can include pay off short-term debt option 1654, pay off mortgage option 1655, and add social security disability benefits option 1656. A user can switch option 1654 to "yes" to indicate that the "at disability" view should incorporate the payment of current short debt debts. A user can also switch option 1655 to "yes" to indicate that the "at disability" view should incorporate the pay off of the client mortgages. After, the client selects recalculate button 1658, "at disability" section 1657 is updated to incorporate the settings that were changed in assumptions section 1652. As such, section 1658 shows that the client's assets were applied to paying off the client's short term debt and to pay off the client's mortgage. However, the client had insufficient assets to accomplish the pay offs. Accordingly, a negative number of $387,750 is reflected in the assets section to show the inadequacy. As such, the calculation cannot provide a valid picture of a possible "at disability" view for the client. This is reflected by the asterisks 1659 and the related notation that states that there is insufficient capital to achieve these cash flow results. Note that the payment of the mortgages and short-term debts can result in a significant change in the client's liability costs, which is now shown to be zero. As such, the pay off options can be used to illustrate to the user the financial differences between paying off liabilities as a means of increasing net family income or for example maintaining the liabilities and purchasing additional disability benefits.

Figure 166:
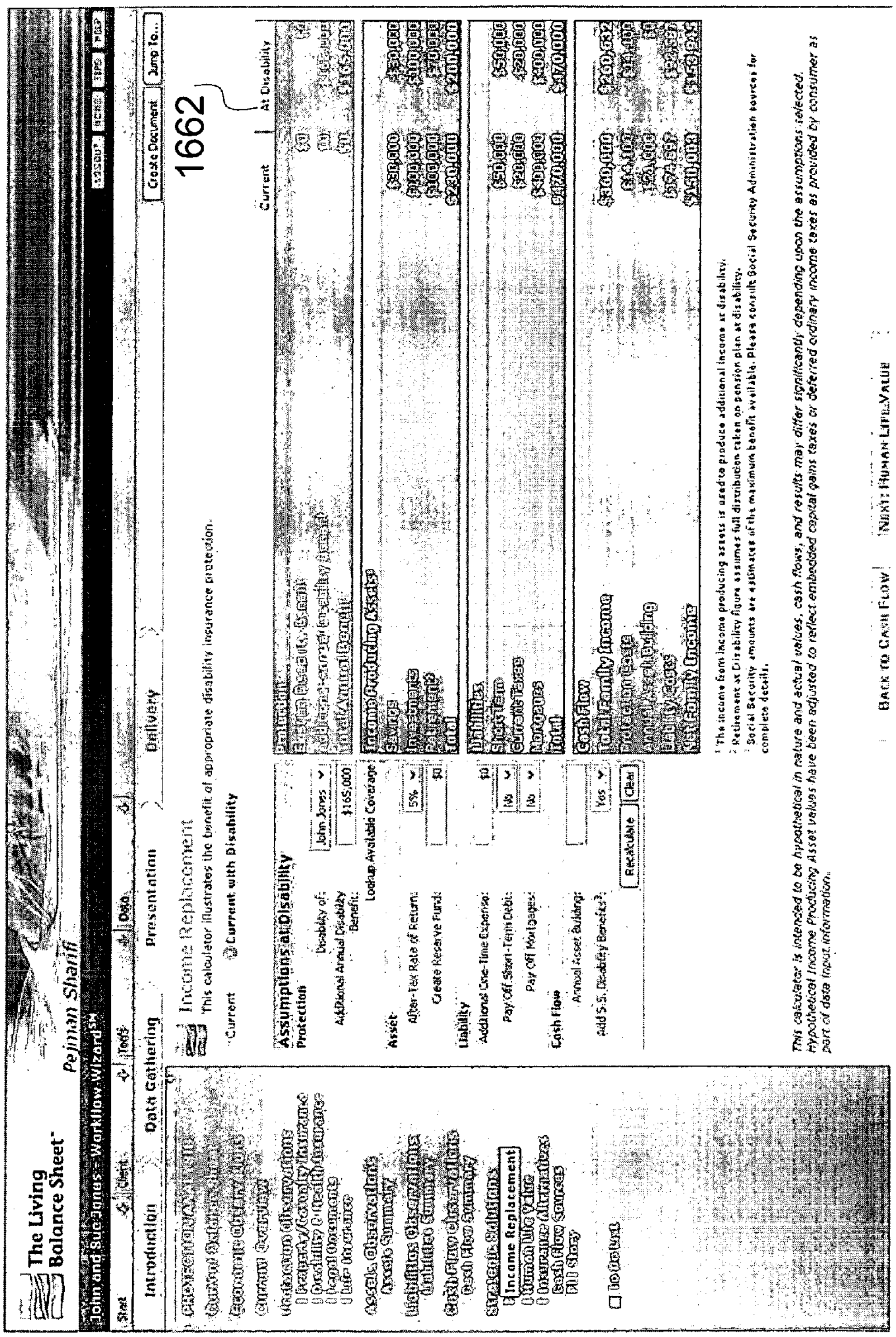
Figure 167:
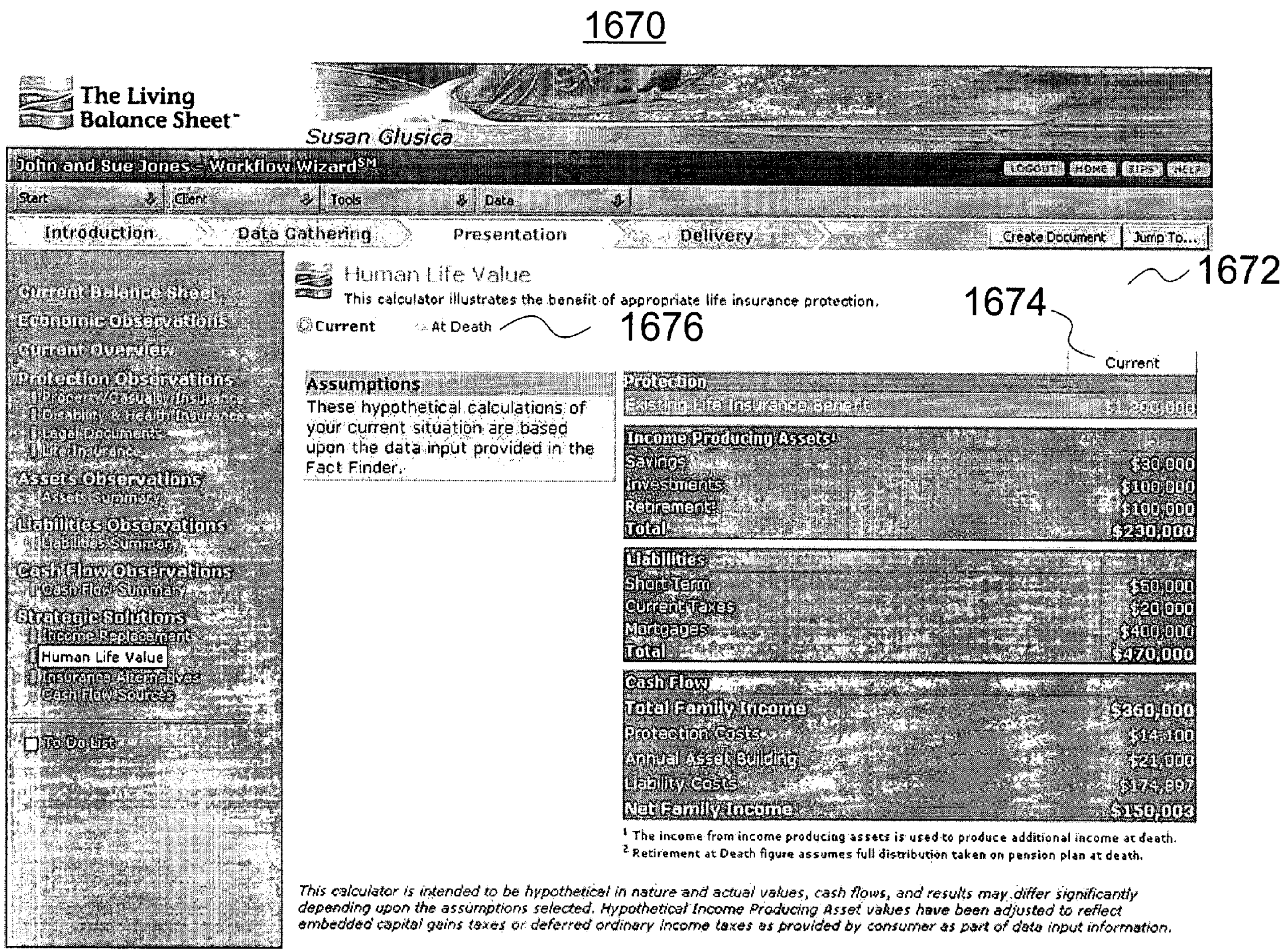

FIG. 166 illustrates display page 1660 that shows another set of assumptions at disability that are selected for analysis for the current client. As shown, the client's additional annual disability benefit has been raised to $165,000, the option to create a reserve fund has been set to zero, and the pay off short term debt and the client's mortgages options has been set to "no." In addition, the option for adding social security disability benefits to the analysis has been to switched to "yes" to include social security disability payments as part of the total family income. If desired, the protection costs section can be updated to reflect the additional cost of purchasing the additional disability benefit of $165,000. In addition, as shown in "at disability" section 1662 of FIG. 166, the additional disability benefit raises the client/family's income to $260,632, which results in a net family income of $153,945. As previously indicated, the total family income reflects any existing disability benefit, the additional disability benefit, family employment income excluding the income of the disabled family member, social security disability benefits, and a 5% return on the value of the income producing assets. The current example shows that the proposed additional disability benefits are probably sufficient for the client given the assumptions at disability that are presently selected. An additional annual disability benefit of approximately $165,000 appears to be appropriate given the existing settings.

As shown, assumptions section 1664 can be configured into sections that correspond to the sections of "at disability" section 1662, e.g., protection, assets, liability, and cash flow. As shown, the section can be displayed adjacent to each other with corresponding sections generally aligned.

Figure 160:
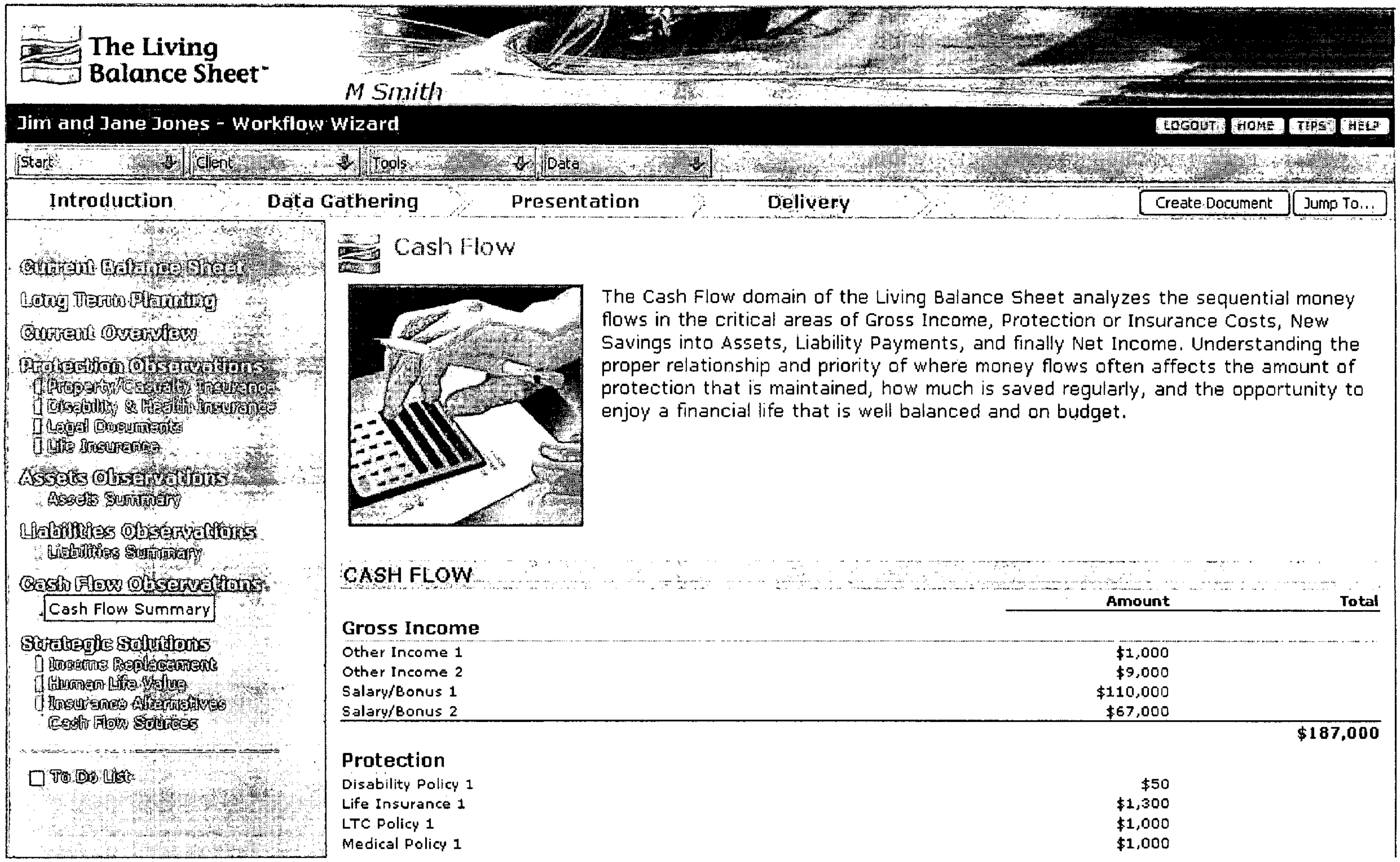
Figure 161:
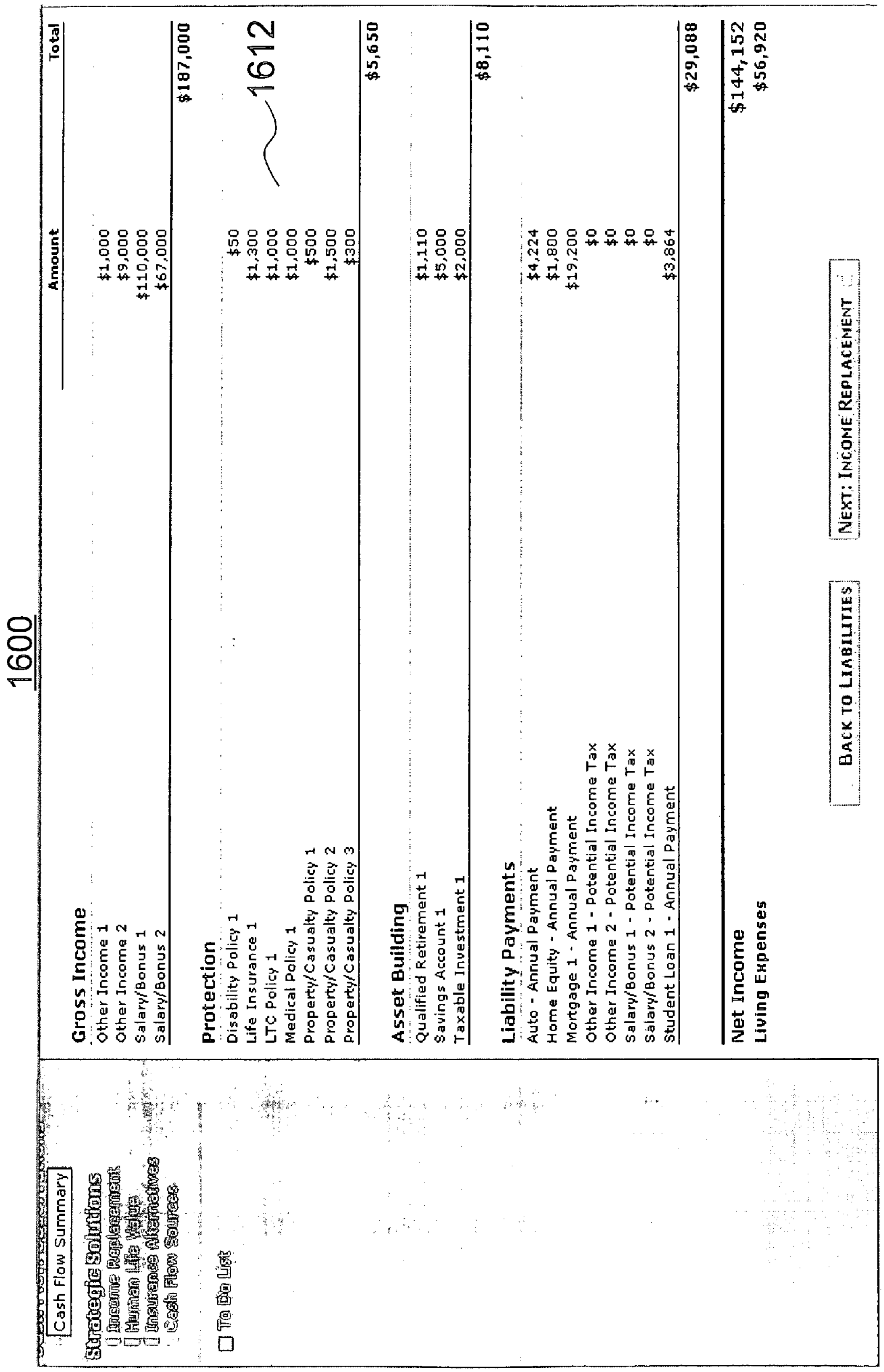

Note that the example client in FIGS. 162-166 is different than the example client of FIGS. 160-161 and other FIGS. herein.

As shown, the strategic solutions section can for example also include a human life value subsection. For example, as part of the human value subsection, human life value calculator display page 1670 can be displayed. Human life value calculator display page 1670 can be configured to display relevant financial and protection data relating to life insurance protection. The purpose of display page 1670 can be to provide a comparative analysis of a client's current financial state and the client's financial state "at death," i.e., if the client or spouse dies and therefore, must thus rely on any existing life insurance protection for their financial needs. As shown, display page 1670 includes calculator display section 1672. Calculator display section 1672 can include "current" display section 1674 that displays a table of relevant financial and protection information of the client. The information is to reflect the current state of the client with respect to life insurance protection, income producing assets, liabilities, and cash flow. The information can be automatically populated from information that was previously entered or compiled for example during the data gathering stage. The display information can be displayed in appropriate categories such as protection, income producing assets, liabilities, and cash flow. Under the protection category, the existing amount of life insurance benefit that is covered under the client's life insurance protection can be displayed. Within the income producing assets category, the current values for the client's savings, investments, retirement, and a total of such values can be displayed. Under the liabilities category, the current values for the client's short-term liabilities, current taxes, mortgages, and a total thereof can be displayed. Under the cash flow category, the total family income, protection costs, annual savings, liability costs, and the net family income, which is the result of deducting protection costs annual savings, and liability costs from the total family income, can be displayed.

Figure 168:
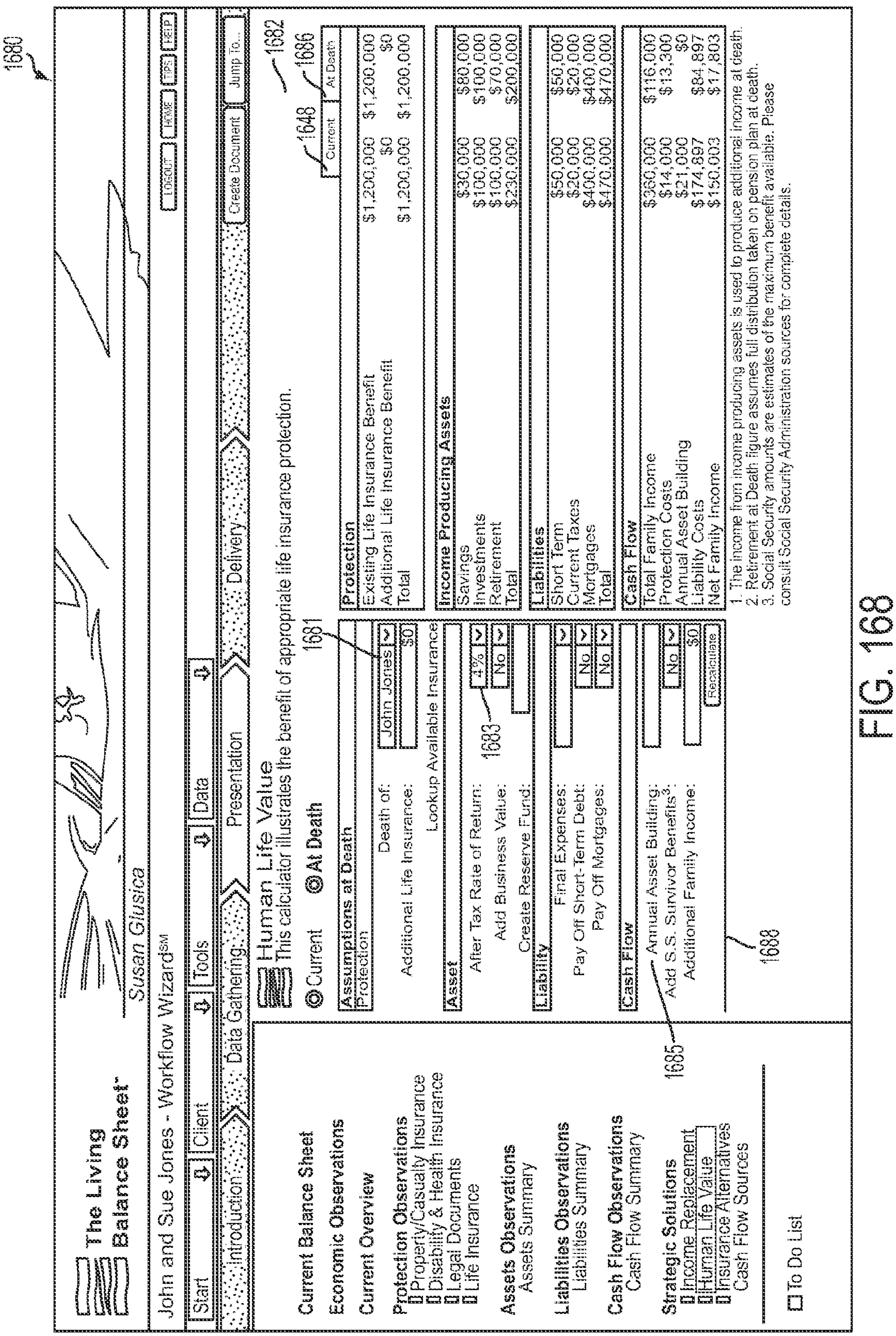

As discussed, calculator display section 1672 can display the "current" state of financial and protection information. Note that the values displayed in section 1674 preferably correspond to and were automatically populated using information that is displayed in a cash flow display page such as those shown in FIGS. 160-161 (note that FIGS. 160-161 illustrate data for a different client example). Radio buttons 1676 can be used to switch between different types of views. As shown, radio button 1676 reflects that the "current" view is displayed. If a user selects the "at death" radio button, additional information and functionality is added to display section 1672 to allow for the calculation and related analysis of the client's current financial state and the client's financial state at death. For example, with reference now to FIG. 168, calculator display section 1682 can be displayed that includes "current" display section 1684 and "at death" display section 1686. In addition, assumptions section 1688 is displayed. The newly added "at death" section 1686 is used to display a table of information that is also displayed as part of "current" display section 1684, but the values are revised to reflect the impact of the death of the client or spouse to the current financial state of the surviving family. As such, the client can visually see a detailed analysis of the likely impact of the client's current level of life insurance protection to the surviving family's financial state if the client or spouse dies. This information is also displayed in a side-by-side manner to aid comprehension and the presentation value of the information.

As shown, "at death" section 1686 is displayed to reflect the current settings in assumptions section 1688 and possible underlying facts that were gathered during the data gathering section. As such, the only numbers that are changed between "current" display section 1684 and "at death" section 1686 are the retirement, total family income, annual asset building, protection costs, liability costs, and net family income information. The retirement asset value is changed to reflect a current payout of the asset (e.g., the original asset minus income tax deductions). The value displayed for total family income in the "at death" section reflects that the loss of the employment income of the client or family member whose death is selected to be the focus of the analysis. As shown, a user can select to identify the analysis to be with respect to the client or spouse using pull-down menu 1681. The total family income at death also reflects an annual return on the life insurance benefit of $1,200,000 and on the total assets of $200,000 based on the after-tax rate of return that is specified using pull-down menu 1683. Note for example that in this case, the analysis is with respect to the client John Jones. A cash flow display page such as page 1600 of FIG. 160 (which is for another example "Jim Jones") and other data gathering and summary display pages and sections above may be used to view the specifics of the income that is attributed to John Jones (e.g., $290,000 annual salary or another combination of annual salary and other income such as $280,000 in salary and $10,000 in other income). A 4% after tax rate of return is selected for the analysis. Therefore, the annual income from the $1,200,000 life insurance benefit will be $48,000 and the annual income from the existing assets will be $8,000. The at-death income of the client's family will be reduced from $360,000 to $116,000, which is the total of the income from the life insurance, existing assets, and other pre-existing income (such as the income of the surviving spouse of $60,000), as is displayed in "at death" section 1686. Assumptions section 1688 can also be configured to reflect that at death, the client, who at that point will be the surviving spouse or family, will seek a certain amount of annual savings 1685. As shown, this amount is set zero and is reflected in the "annual savings" line item of "at death" section 1686. The liability costs is also reduced to reflect that lack of income taxes that were attributed to the "deceased" client's current income. With this information, the client can now see that the impact of the client's (or spouse's) death on the current financial situation of the client's family will be such that the net family income will drop from $151,103 to $32,103, which is a significant change.

Note also that the display reflects a difference that exists between the "current" and "at death" protection costs. Specifically, a $1,200 difference is reflected between the two numbers. This number reflects that the client will no longer need to pay certain protection costs that were associated with the deceased spouse such as any life insurance premiums. For example, this information is automatically calculated based on protection information that was previously entered and compiled such as the protection information in the protection section of cash flow display page 1600 of FIG. 160. Thus, the software has the intelligence to automatically perform calculations in section 1682 that reflect the various aspects in which the client's death affects the surviving family's financial picture (e.g., protection costs for health insurance for the deceased can be automatically identified and eliminated from the protection costs "at death"). Therefore, data that is entered or calculated within the workflow wizard can be automatically applied in other aspects of the wizard.

Figure 169:
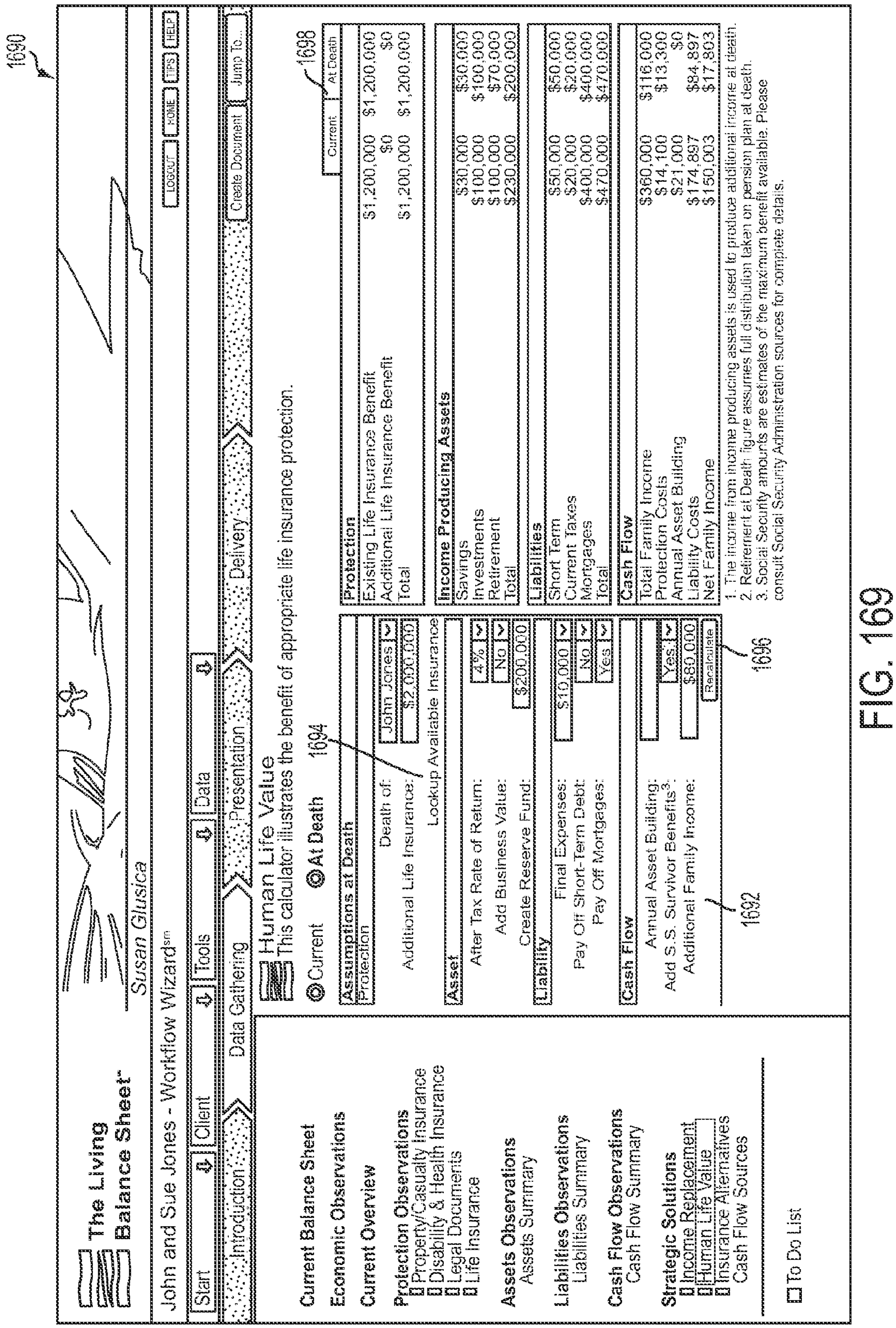
Figure 170:
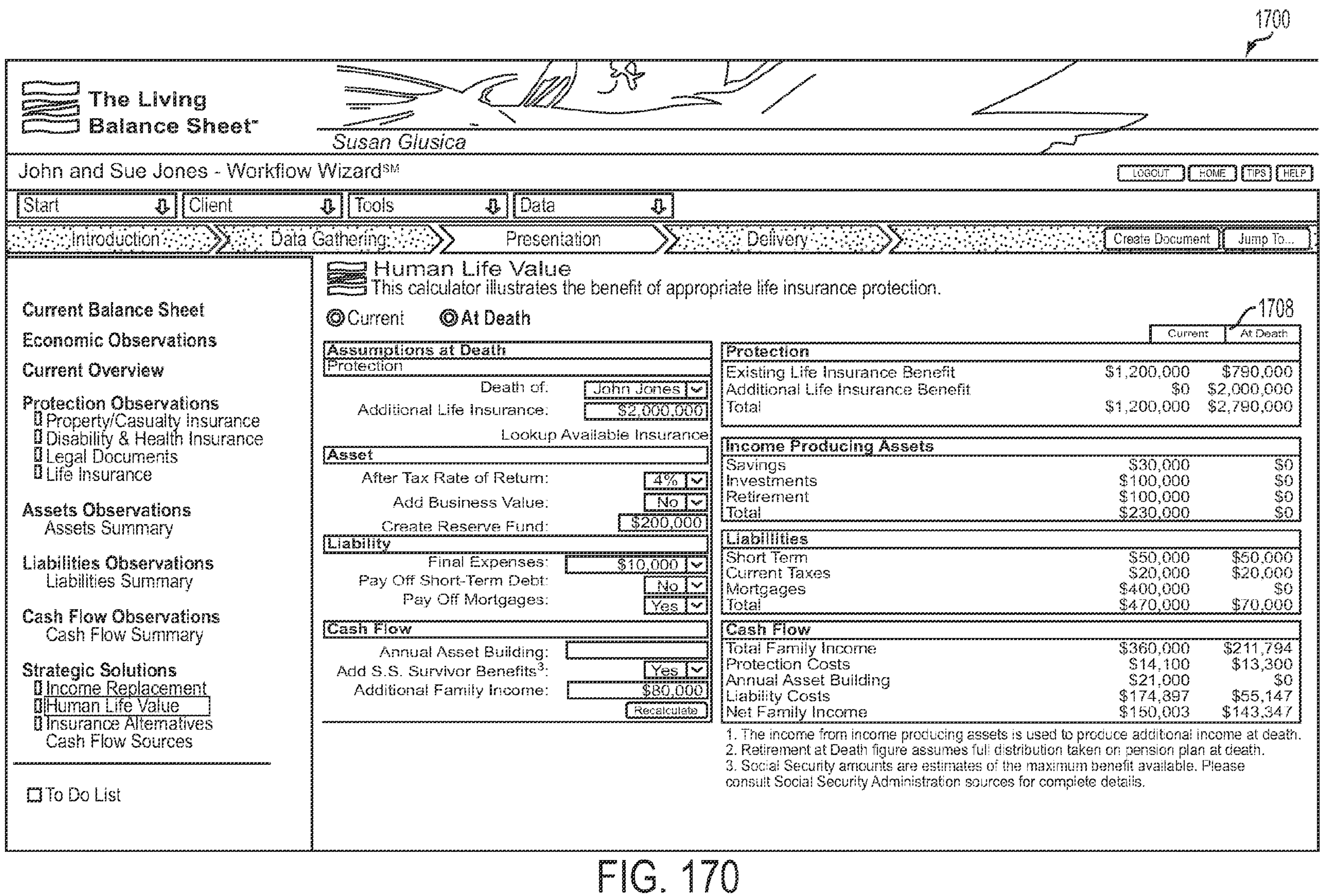

Now with reference to FIG. 169, the user may also interact with other features of assumptions section 1692 to further illustrate the "at death" state of the client's financial condition. For example, the user may enter a value such as $2,000,000 in the additional life insurance option of assumptions section 1692. If desired, lookup available insurance option 1694 can be displayed near the additional life insurance option to allow the user to lookup additional coverage that may be available for the client (e.g., based on an automated evaluation or using lookup tables). The user may also be provided with options for entering values corresponding to creating a reserve fund and specifying final expenses (e.g., associated with funeral or other services) that would be incurred at the time of the death. For example, as shown, the user enters $200,000 to indicate that analysis should include the creation of a $200,000 reserve fund. The user is also shown to have entered $10,000 to indicate that the analysis should include final expenses of $10,000. The option to specify additional family income, which for example, may have not been accounted for during the data gathering stage, can also be included as shown. As shown, the user has also entered $80,000 to indicate that the analysis should include the inclusion of additional family income of $50,000. A user may have also selected the option to pay off mortgages and an after-tax rate of return of 4%.

After entering such information, the user can select recalculate button 1696. Until such time as recalculate button 1696 is selected, "at death" section 1698 may remain unchanged in response to the user interactions with assumptions section 1692. Once button 1696 is selected, "at death" section 1698 is updated based on the new information in assumptions section 1692. For example, human life value calculator display page 1700 can be displayed when the user selects recalculate button 1696 of FIG. 169. As shown, "at death" section 1708 now reflects that the client protection includes $2,000,000 of additional life insurance. The existing life insurance value of $790,000 reflects the creation of a reserve fund, the pay off of mortgages, and the payment of final expenses. The value also reflects that the savings and assets, which totaled $200,000, were first used as a resource for paying for the reserve fund, mortgages, and final expenses and to the extent that the assets were insufficient, the life insurance benefit was used to complete those payments. In response, the values for savings, investments, and mortgages have been updated to reflect a value of zero. In addition, liability costs have been updated in the "at death" section to no longer include annual mortgage or home equity loan payments that totaled $29,750, which amounts would be reflected in the cash flow figures. The total family income and in turn, the net family income reflects a 4% rate of return on the total remaining life insurance benefit of $2,790,000 and it also reflects the loss of the deceased's employment income and any other income that would be lost due to the client death. As a result, the surviving family will have approximately the same total family income but will have a lower net income due to the reduction in protection and liability costs. The income may also reflect that the user selected the option to add social security survivor benefits to the analysis, which can be automatically determined and included in the total family income. As such, the total of $211,794 reflects $111,600 of income from the life insurance benefit (at 4%), preexisting income of $60,000, additional income of $80,000 (selected in assumptions section), and $20,134 of social security benefit. Other options can include the option to pay off short-term debts, to add business value to the analysis, which would drag in information that was saved with respect to the client's business interest into the analysis such as to include the value of the business as an asset in the income producing assets section of display.

Figure 171:
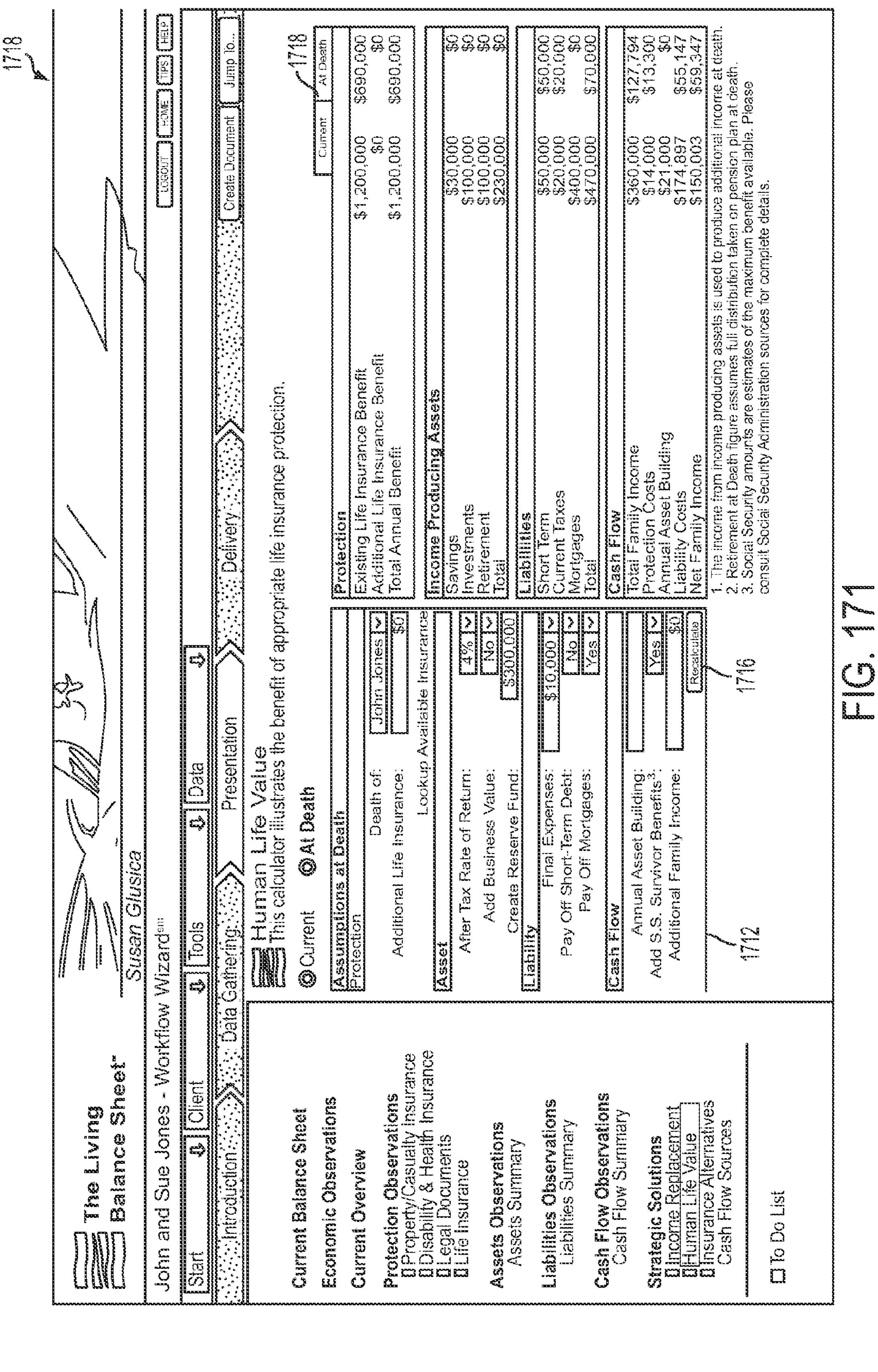

FIG. 171 provides another example of a human life value display page. In FIG. 171, the state of "at death" section 1718 reflects the state of that section after a user has made or entered selections in assumptions section 1712 and selected recalculate button 1716. Therefore, "at death" section 1718 is consistent with the current settings shown in assumptions section 1712. FIG. 171 shows that the user has selected to pay off short-term debts and mortgages, to create a reserve fund, and to pay final expenses of a specified amount. As a result, the "at death" life insurance benefit is reduced to $690,000. As a result of paying off the liabilities, the net income for the surviving family is approximately $100,000 less than the net family income as it currently stands. Therefore, the example can be used to illustrate to a client that the client's existing life insurance policy of $1,200,000 may not be sufficient if the client wants to pay off mortgages and to create a reserve fund.

As shown, assumptions section 1712 can be configured into sections that correspond to the sections of "at death" section 1718, e.g., protection, assets, liability, and cash flow. As shown, the sections (e.g., "current," "at death," and/or assumptions at death) can be displayed adjacent to each other with corresponding sections generally aligned for ease of understanding.

In addition, a color scheme matching the previously mentioned color scheme such that protections, assets, liabilities, and cash flow sections are colored to match the colors that were used for those categories in other sections of the application.

Calculations in support of the information displayed in the human life value calculator display page and the income replacement calculator display page can be performed locally at the user's computer, remotely at a server that supports the displayed page, or in combination thereof. For example, user selected options or user entered data can be sent to a server when a user presses the recalculate button. The data and/or options can be received by a server which performs the necessary calculations and transmits the results and any related information back for display on the user's computer.

Note also that typically the analysis with respect to life insurance or disability insurance is particularly applicable at a family level. Therefore, in the appropriate context, the term client may also be referring to the client's family or surviving family.

Figure 172:
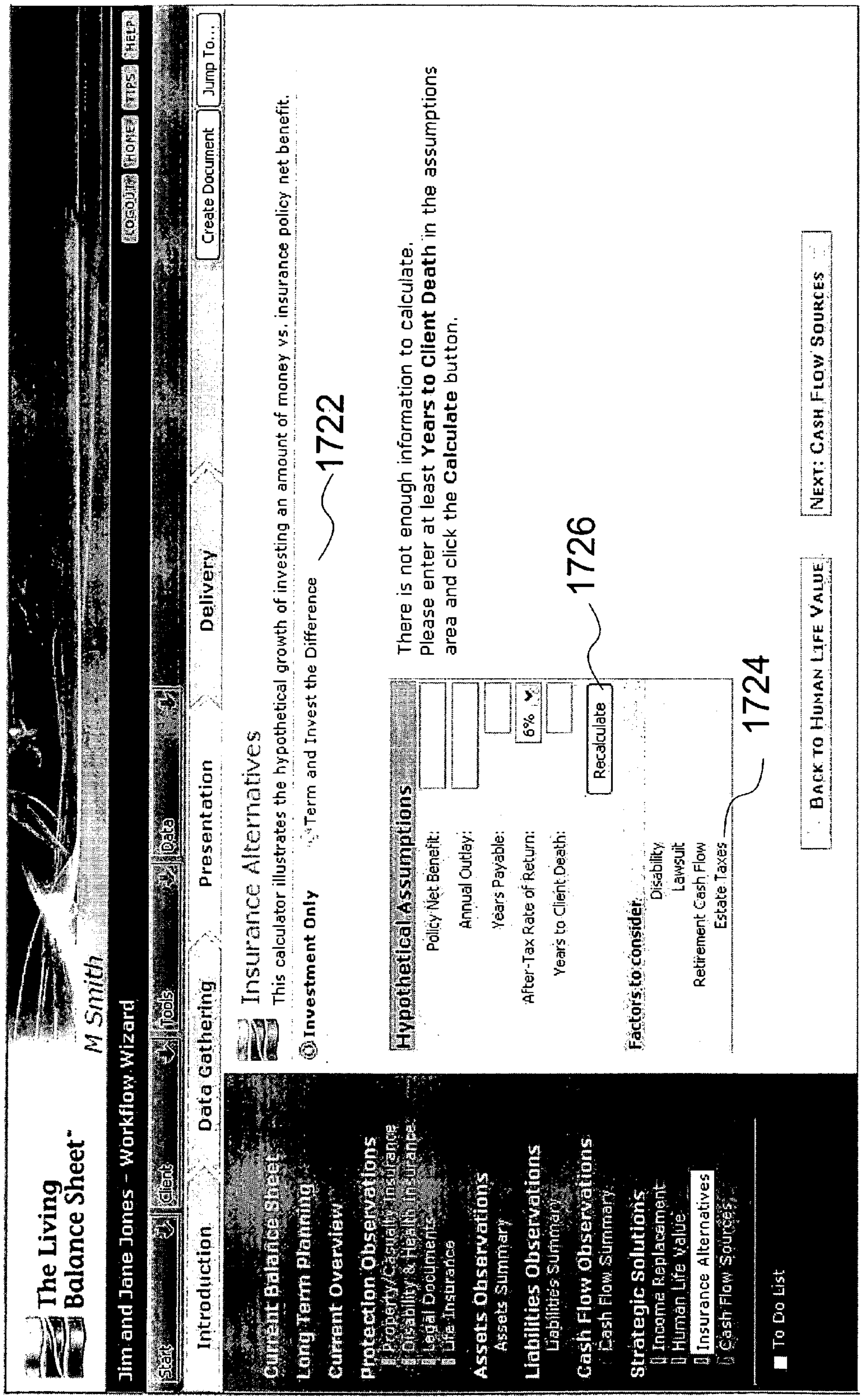
Figure 173:
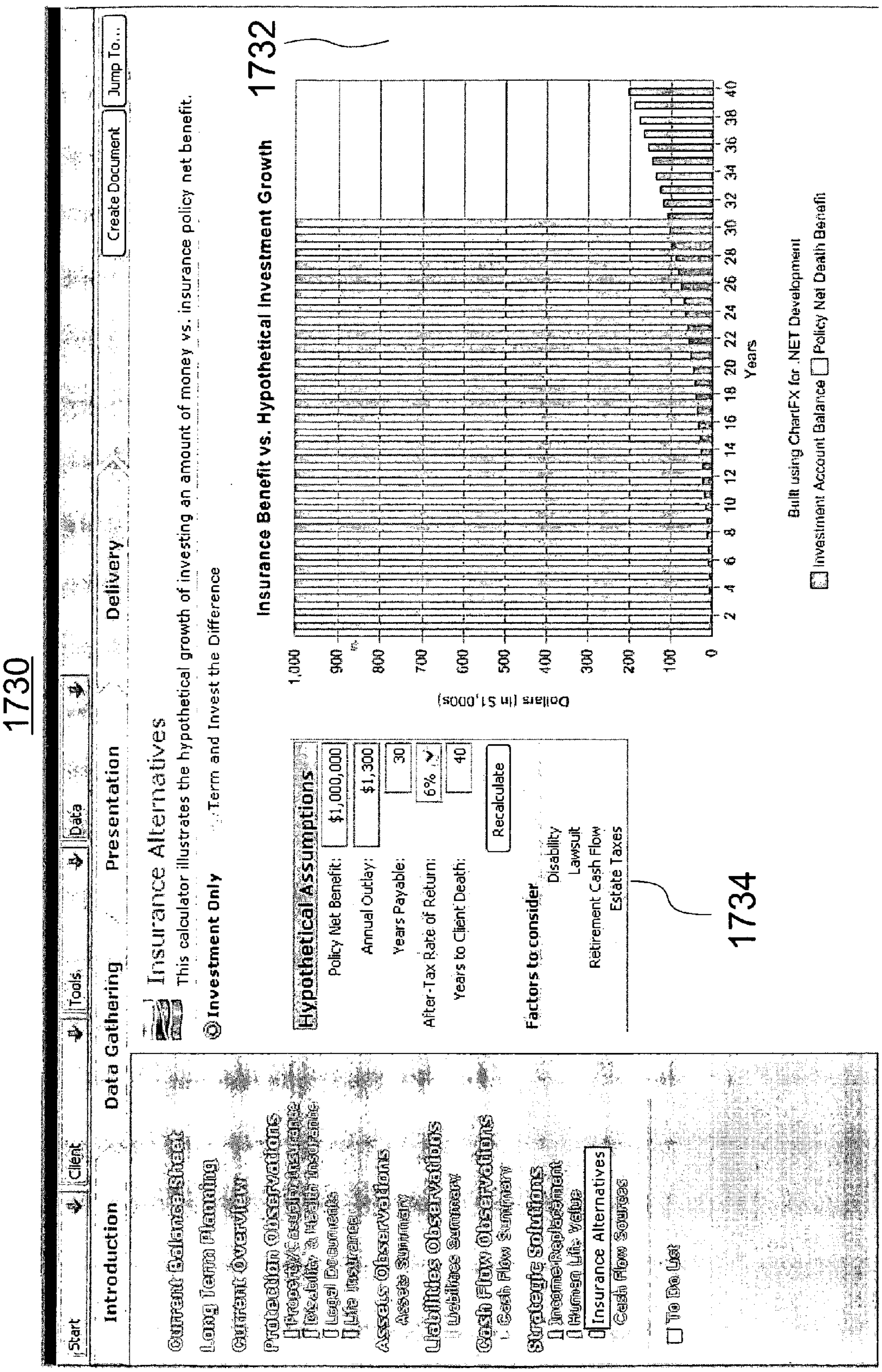
Figure 176:
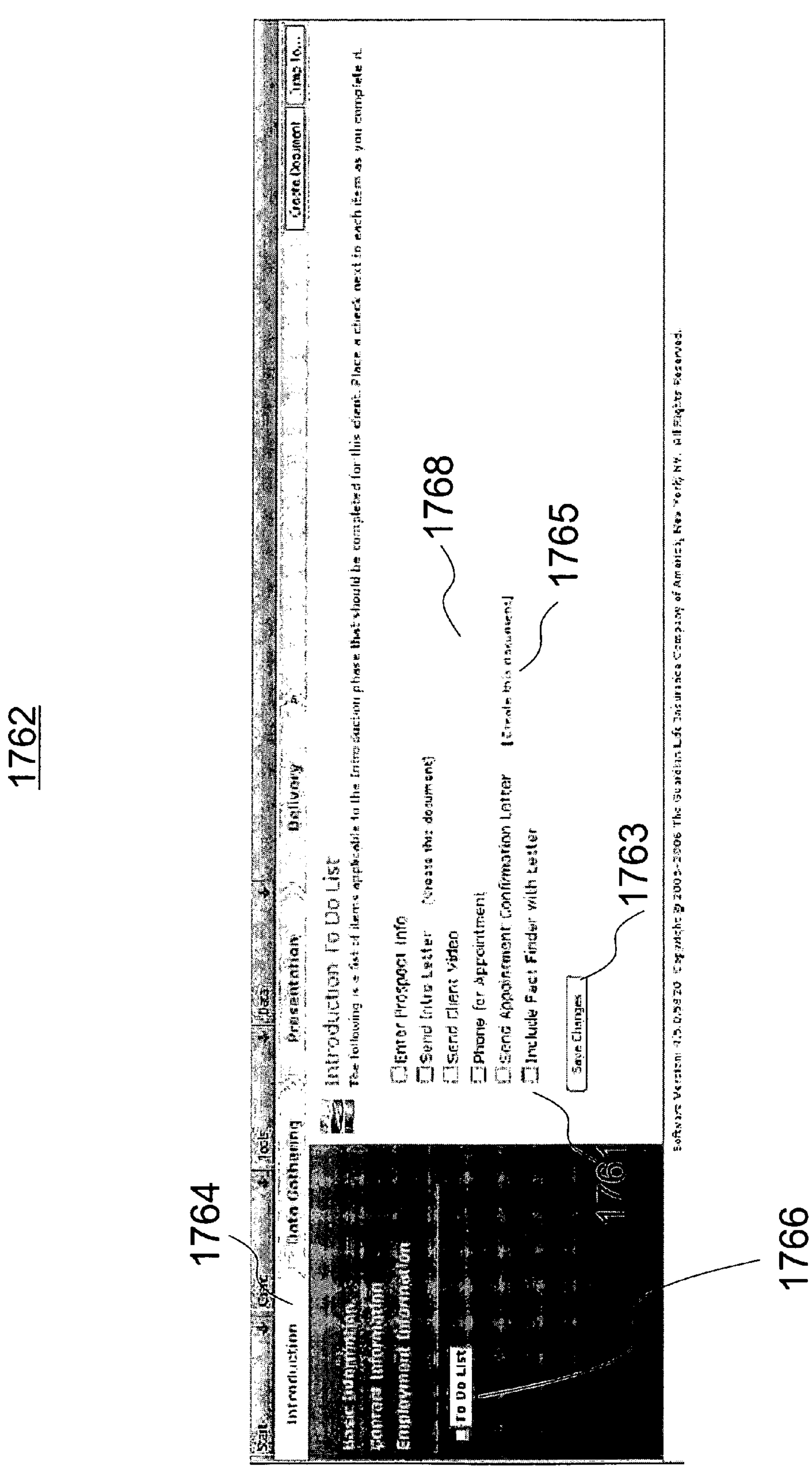

The next section can be an insurance alternatives section that can be used to compare personal savings versus life insurance. For example, a user can select the next button from a human life value calculator display page to proceed to an insurance alternatives display page such as insurance alternatives display page 1720 of FIG. 172. Display page 1720 can include radio buttons 1722 and assumptions section 1724. Assumptions section 1724 can be displayed to provide the user with the opportunity to enter relevant parameters such as the face amount of the insurance, annual outlay for savings, the after tax rate of return on the savings, and the number of years to client's death. By entering such parameters and selecting calculate button 1726, insurance alternatives display page 1730 of FIG. 173 can be displayed. Insurance alternatives display page 1730, as shown, includes graph 1732, which illustrates a comparison between insurance benefits and investment growth based on the parameters that the user entered in assumptions sections 1734. Graph 1732 shows the growth of the annual investment at the selected after tax rate in comparison to the benefit of permanent life insurance. Display page 1730 can include supporting data such as table 1742 of FIGS. 174-175 that shows numerical information with respect to the year-by-year comparison of savings (i.e., "investment only") versus life insurance. To vary the analysis, a user can change the parameters of assumptions section 1724 and select recalculate button 1726 to generate a new graph and supporting table. A user can also select radio buttons 1722 to toggle to a view of display page 1720 that illustrates a comparison between "term and invest the difference" versus permanent life. The "term and invest the difference" view can also include an assumption section for selecting relevant parameters and can also include a graph and table that illustrate a comparison between purchasing term life insurance and investing the difference between purchasing permanent life insurance and the term life insurance versus purchasing permanent life insurance.

Figure 177:
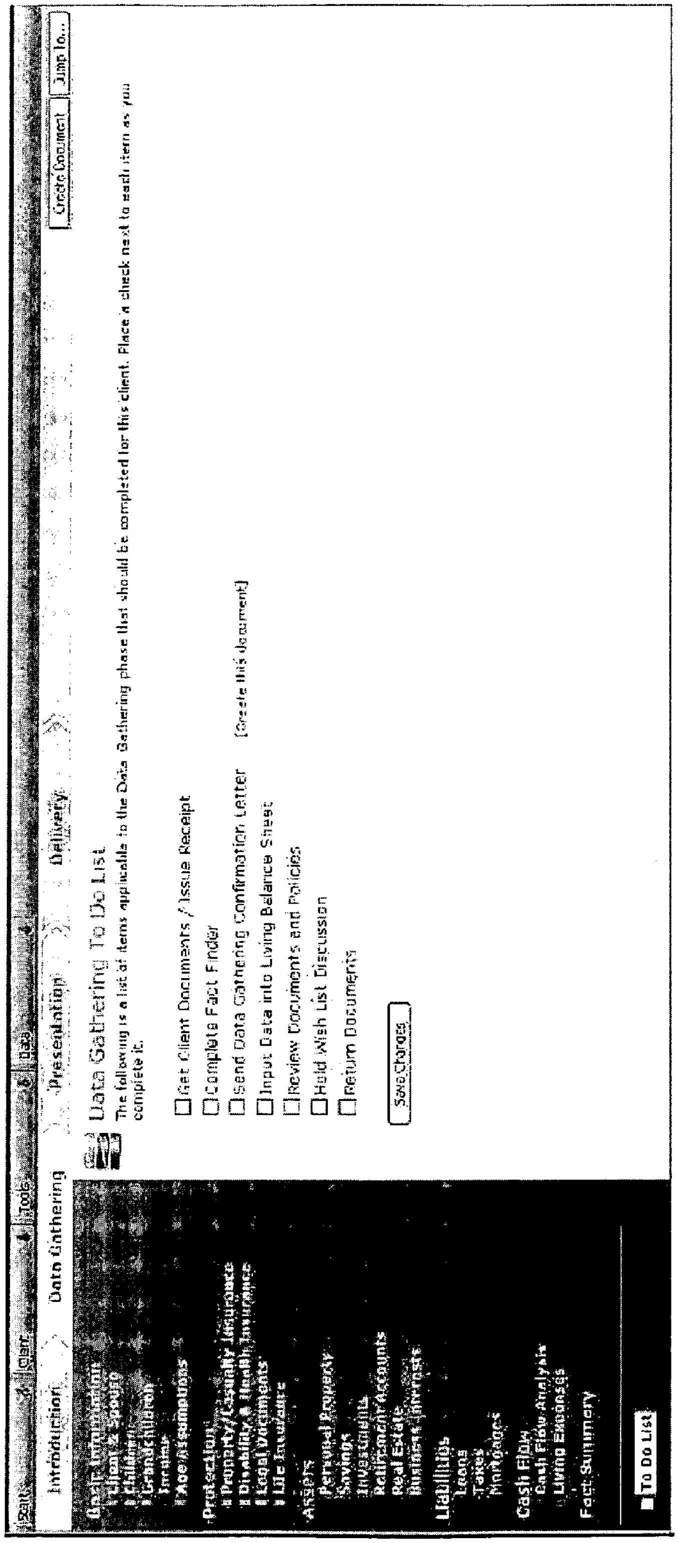
Figure 178:
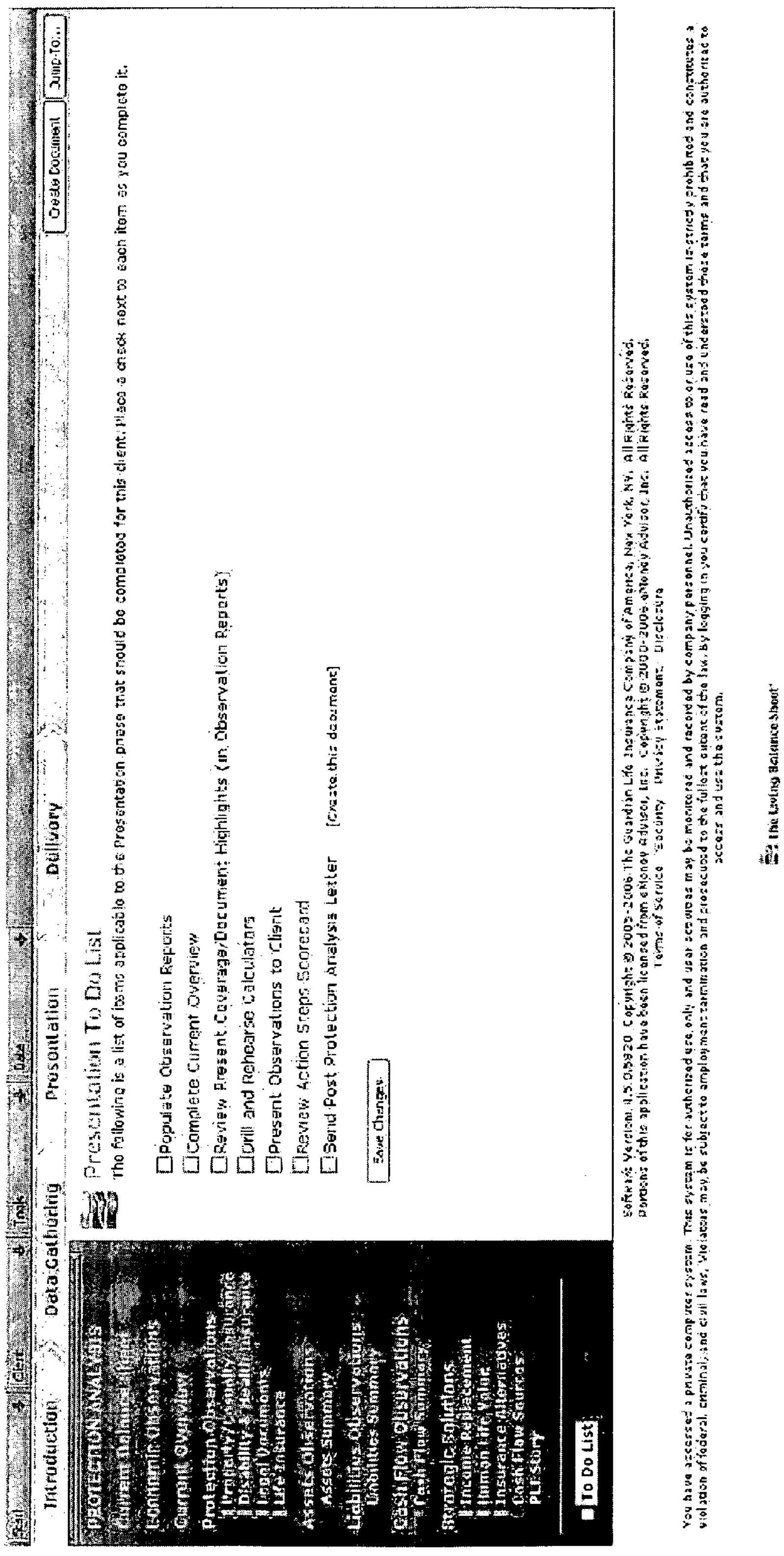
Figure 179:
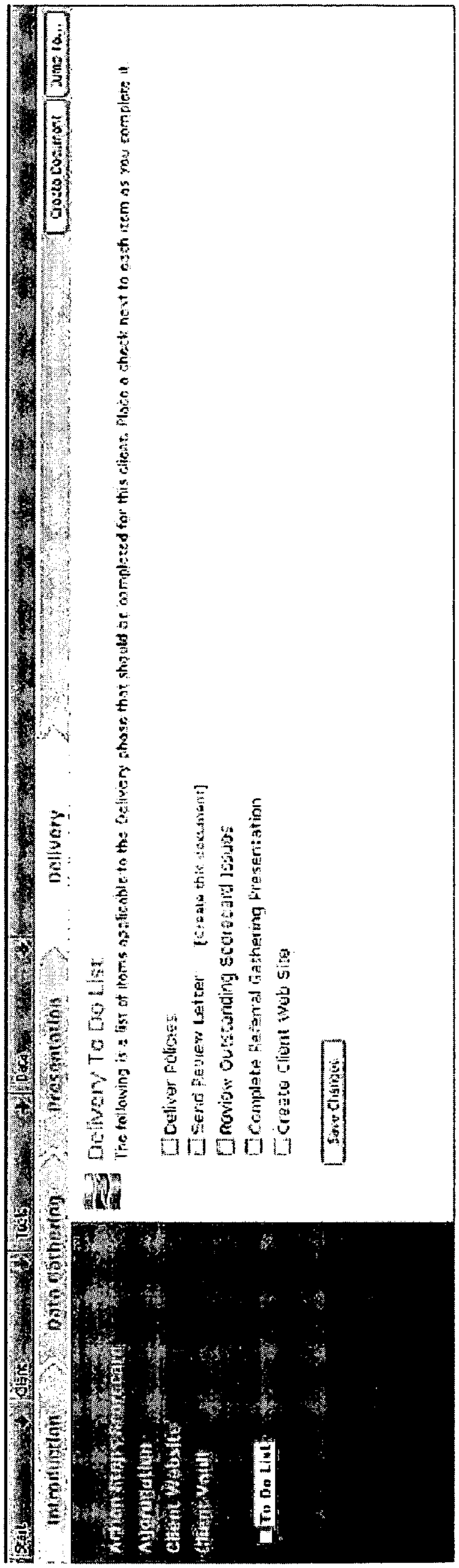

FIGS. 176-179 illustrate a "to do" feature, which also implements a form of client progress tracking. A to do list can be implemented to be used for each client so as to specify action items for the user for completion for each client. The to do list feature can have the functionality of allowing a user to indicate when an item is completed and to store that information such that when the user returns to work with that client at a later date, the user can review the to do list to identify where the user left off with that client. The to do list can be divided into categories to match the major stages, section, or subsections of the workflow wizard. For example, display page 1762 can be displayed to provide a "to do" feature. Display page 1762 can be displayed in response to the user selecting to-do list option 1766 from a display page in the introduction stage of the workflow wizard as is reflected by indicator 1764. Display page 1762 includes introduction to do list 1768, which comprises action items for the user that correspond to the introduction stage of the workflow wizard. The user can interact with list 1768 to memorialize the completion of action items and to assess remaining action items. By checking a corresponding box 1761 and selecting save changes button 1763, the user can save the information that the selected action item (the checked item) on the list has been completed so that the check will remain in that box when the user returns to the to do list at a later time. List 1768 can include quick links such as link 1765 for automatically aiding the user in completing the tasks such as by automatically generating a letter identified in list 1768. The to do feature, thus provides a convenient central tool for client tracking. Other graphical indicators such as a progress bar or other forms of visual progress indicators can also be incorporated. FIG. 177 shows data gathering to do list 1772, which has the same functionality as list 1768 of FIG. 176, but is specific to the data gathering stage of the workflow wizard. Therefore, progress in different stages of the wizard can be tracked separately. FIG. 178 shows presentation to do list 1782, which has the same functionality as list 1768 of FIG. 176, but is specific to the presentation stage of the workflow wizard. FIG. 179 shows delivery to do list 1782, which has the same functionality as list 1768 of FIG. 176, but is specific to the delivery stage of the workflow wizard.

Figure 180:
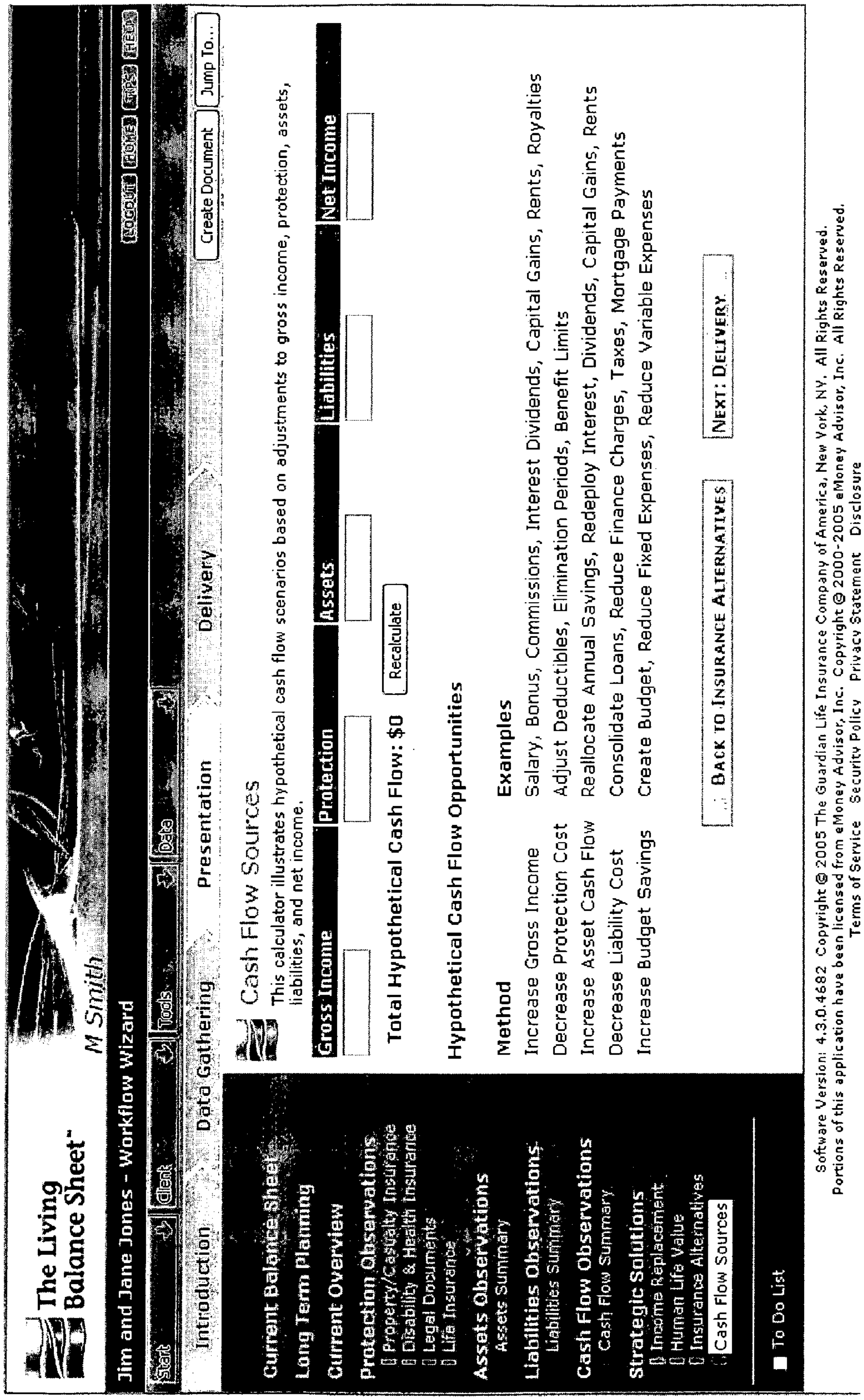
Figure 181:
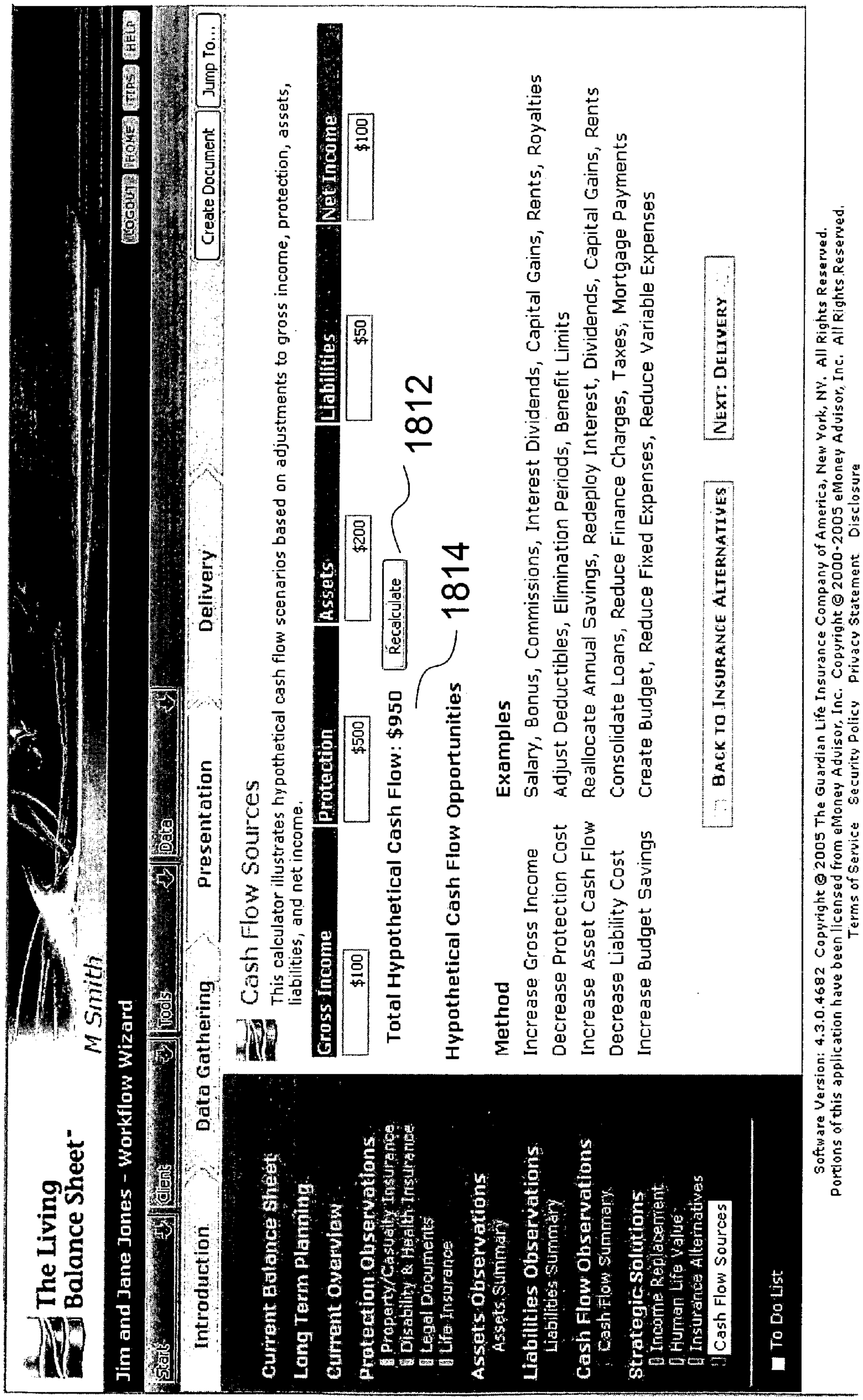

The next section as shown may be directed to identifying possible cash flow for use in purchasing need protection. For example, cash flow sources display page 1800 of FIG. 180 can be displayed. Cash flow sources display page 1800 can be configured such that it provides specific areas of cash flow that the user can use for noting possible sources of cash flow for purchasing improved protection in areas that were identified to be inadequately protected (e.g., identified by the user, such as an insurance agent, during the various applicable sections of the workflow wizard). The user may have reviewed the client financial information and may have identified certain methods by which cash flow can be identified without changing the client's current financial state. Cash flow sources display page 1800 provide the user with boxes for different cash flow categories in which the user can note the cash flow resources that the user has identified. For example, as shown in FIG. 181, cash flow sources display page 1810 shows certain dollar figures that the user was able to identify under the gross income, protection, assets, liabilities, and net income categories of the client information. Recalculate button 1812 can be used to generate a total for the different categories, which is displayed as hypothetical cash flow 1814.

Figure 182:
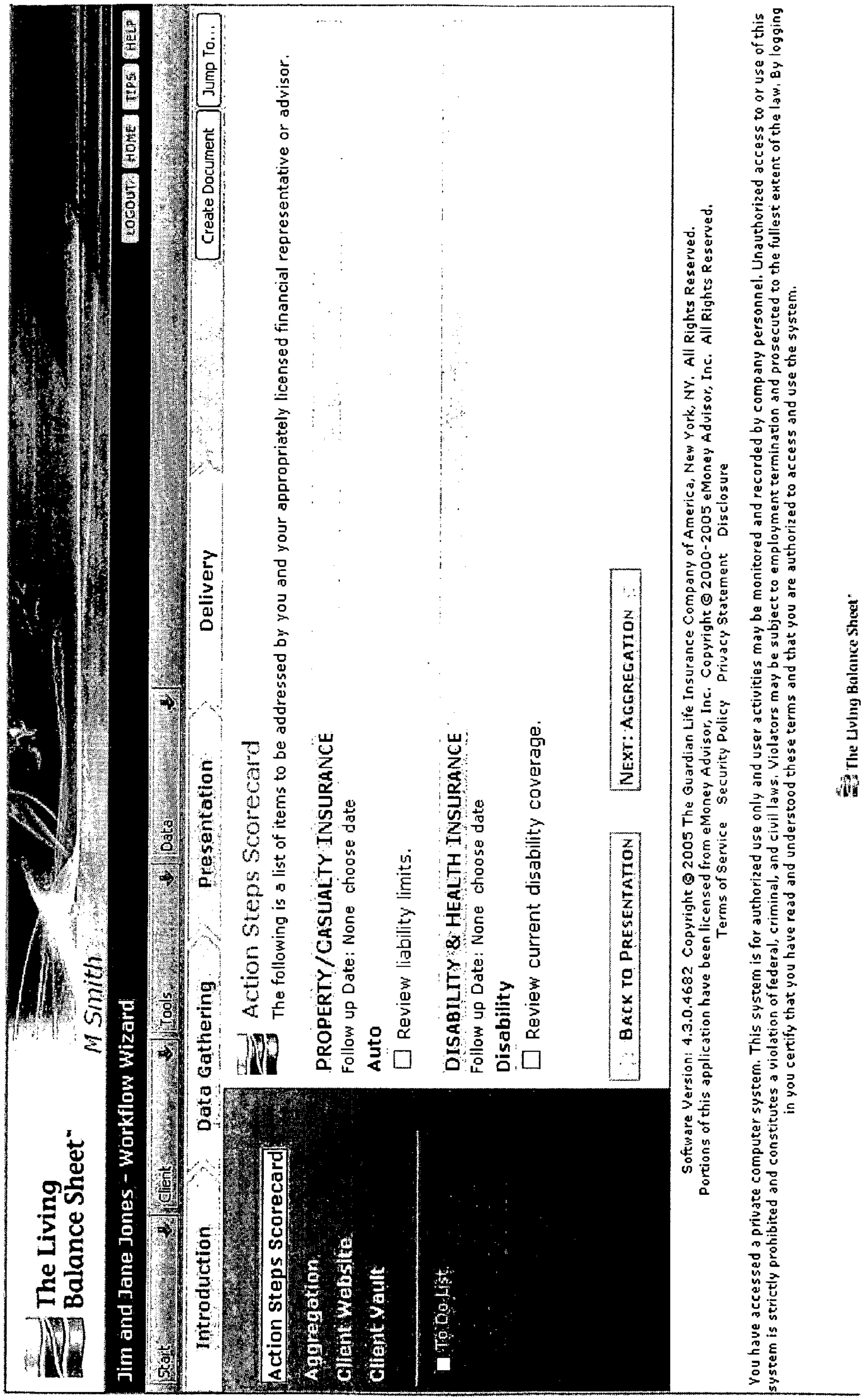

The next section as shown may be the first section of the delivery stage of the workflow wizard. As shown, the next section can be an action steps scorecard that provides a summary of the action steps that were selected during the presentation stage such as during the protection observations section. For example, action steps scorecard display page 1820 of FIG. 182 can be displayed, which contains a summary of all of the action steps that the user selected in the workflow wizard. In the given examples, action steps were only provided for selection during the protection observations section and the steps selected in that section are now again reflected in display page 1820. Display page 1820 can be divided by categories that correspond to the subsections of the protection observation section to indicate the applicability and relevance of each action step. Thus, this feature provides for an end summary of the action steps in the various relevant categories.

Figure 183:
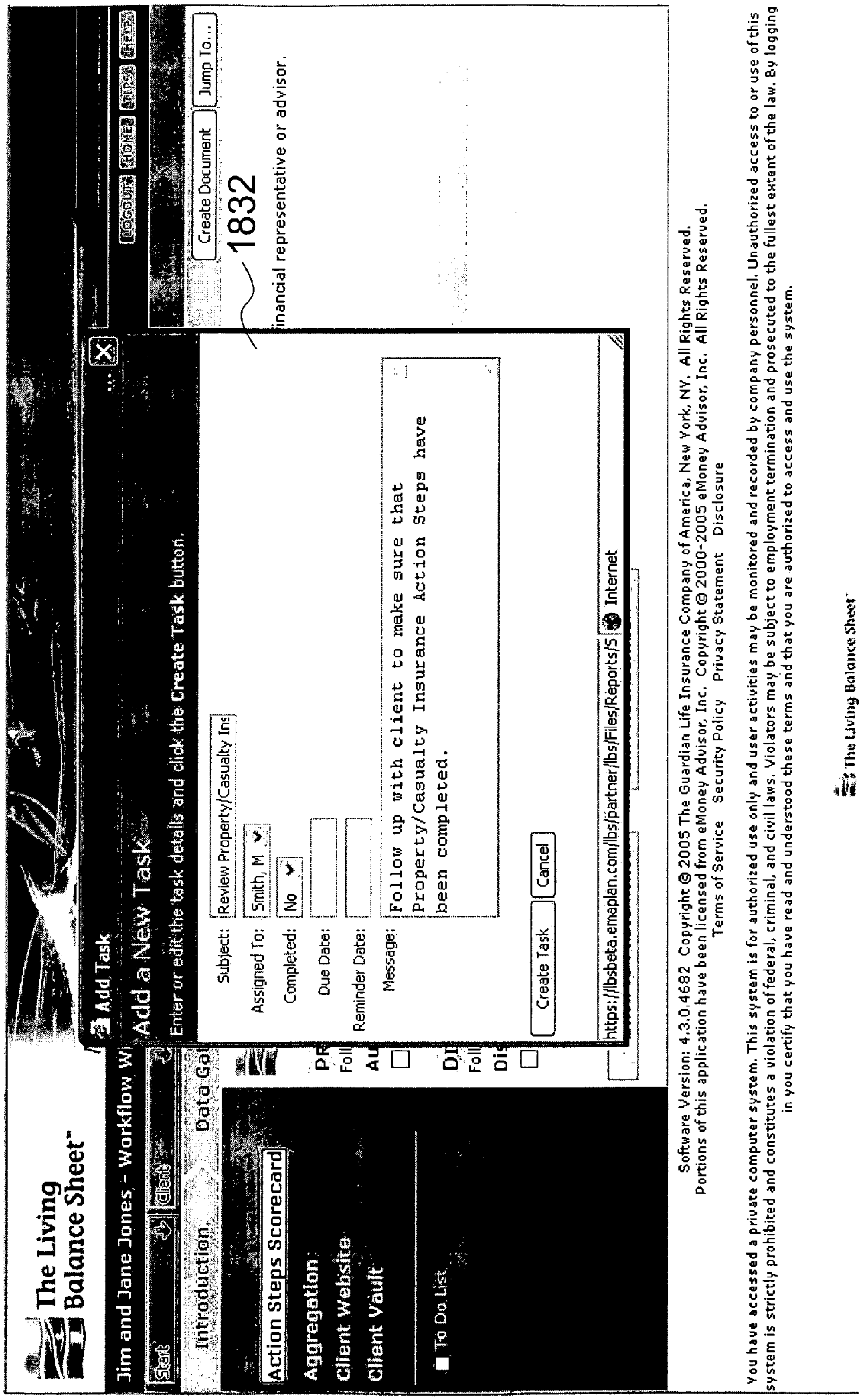
Figure 184:
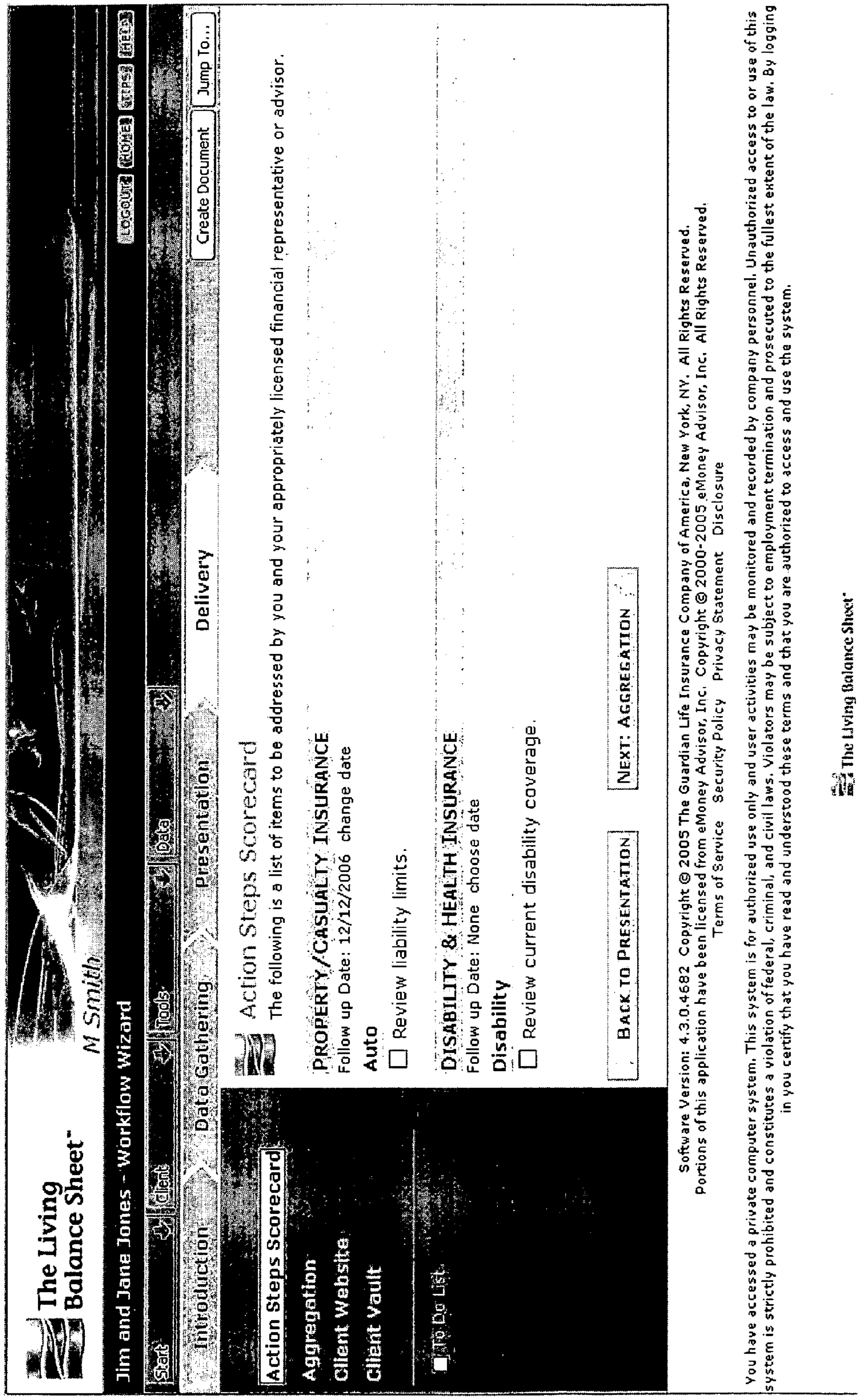
Figure 185:
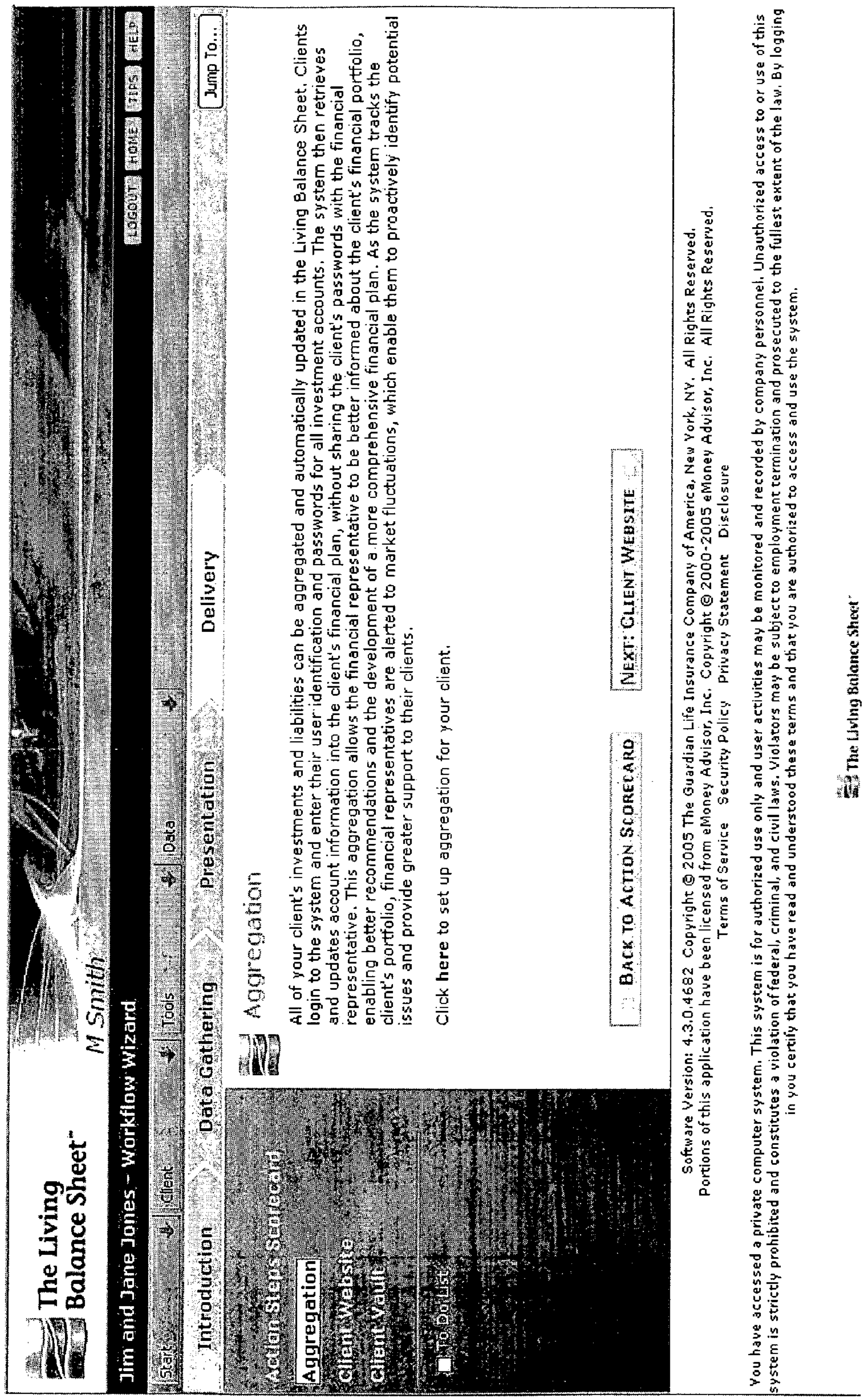

FIG. 183 illustrates that an add or edit task window can be displayed when a user selects an action step from display page 1820. Window 1832 can be used to further refine or specify the listed tasks such as by specifying a due date, a reminder date, assigned to, etc. Such parameters can be automatically operated to present the user with reminders, notices, calendars, task summaries, etc. If desired, display page 1820 can be used to generate new custom configured tasks by the user. When a user edits and saves the information in window 1832, the relevant information is updated in display page 1820 as is illustratively shown in FIG. 184.

The next sections can be used to implement client-side features and functionality for the client. For example, aggregation display page 1850 can be displayed for configuring or enabling aggregation for the client. Aggregation display page 1850 and related pages can be displayed to implement an aggregation service in which client information such as the current status of bank accounts, investment accounts, credit cards, frequent flier miles, or other client information can be collected periodically and aggregated for the client's viewing. In addition, the information can be used to update and change the financial information of the client in the application such that the information is automatically updated for the various aspects of the workflow wizard. Thus, the pertinence and meaning of the various display pages that are described herein can vary as underlying information is updated using the aggregation service. Note that the user may not necessarily need to return to the workflow wizard every time the user wants to, for example, view or update client information. The user can access the various display pages while outside of the workflow wizard, but for example, the sequencing of the workflow wizard may be excluded from such accessing technique. The aggregation service can involve a user providing the identity of a relevant institution and relevant login IDs and passwords, which can be automatically used to generate data updates. Such services are known to those of ordinary skill in the art.

Figure 186:
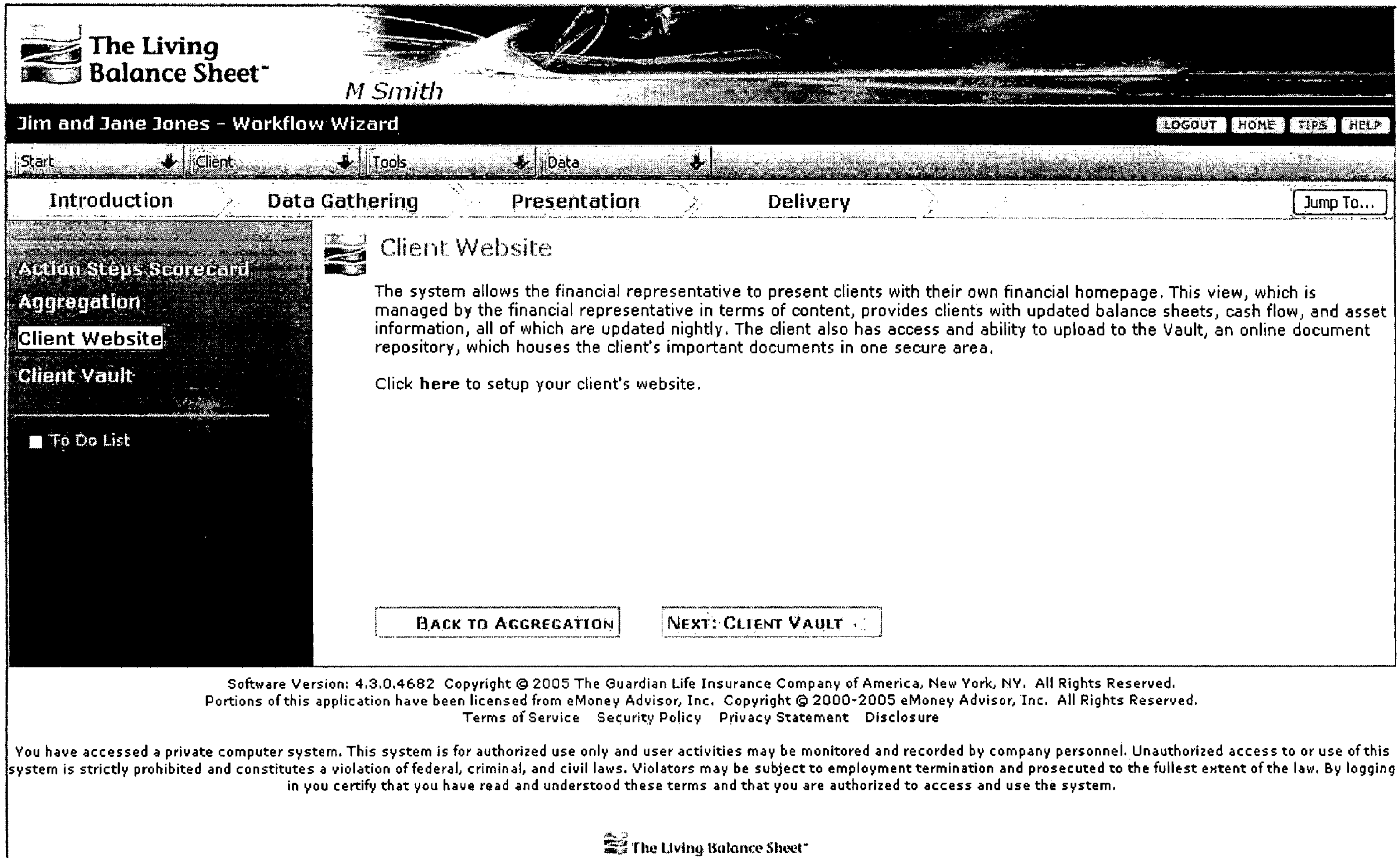

Client website display page 1860 of FIG. 186 and supporting pages can be used to establish a client website for the client. The client website can provide the user with the information from the aggregation feature and display certain "client" display pages. Examples of such client display pages are provided below. Preferably, clients are not provided access to the display pages and tools that are available to the users (e.g., the insurance professional). However, if desired, in some embodiments, such "professional" display pages can be configured to be for use by clients (e.g., publicly accessible). To setup the client website, the user may be required to specify a user name and password for the client. The user may also be given access to status information with respect to client usage.

Figure 187:
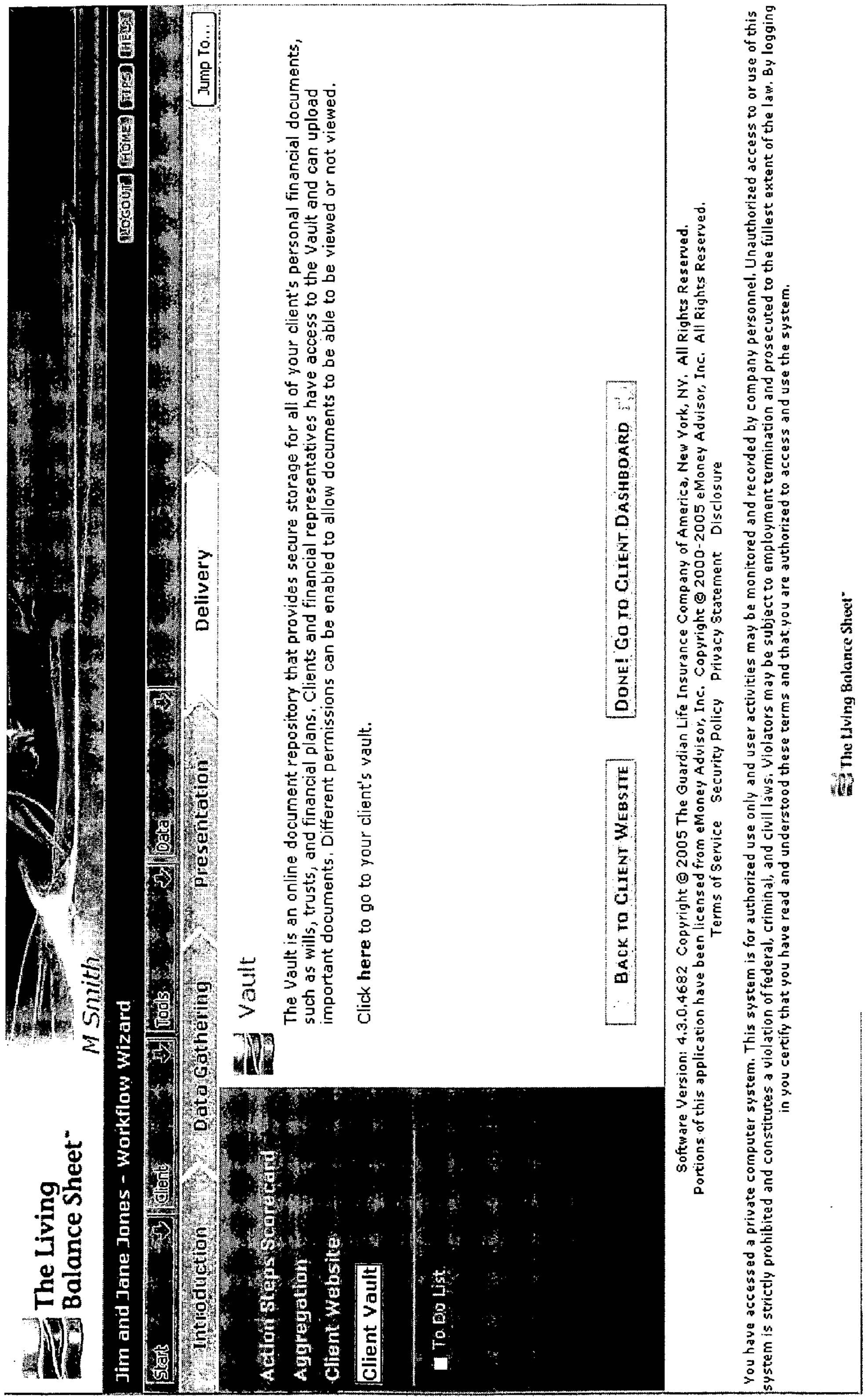
Figure 188:
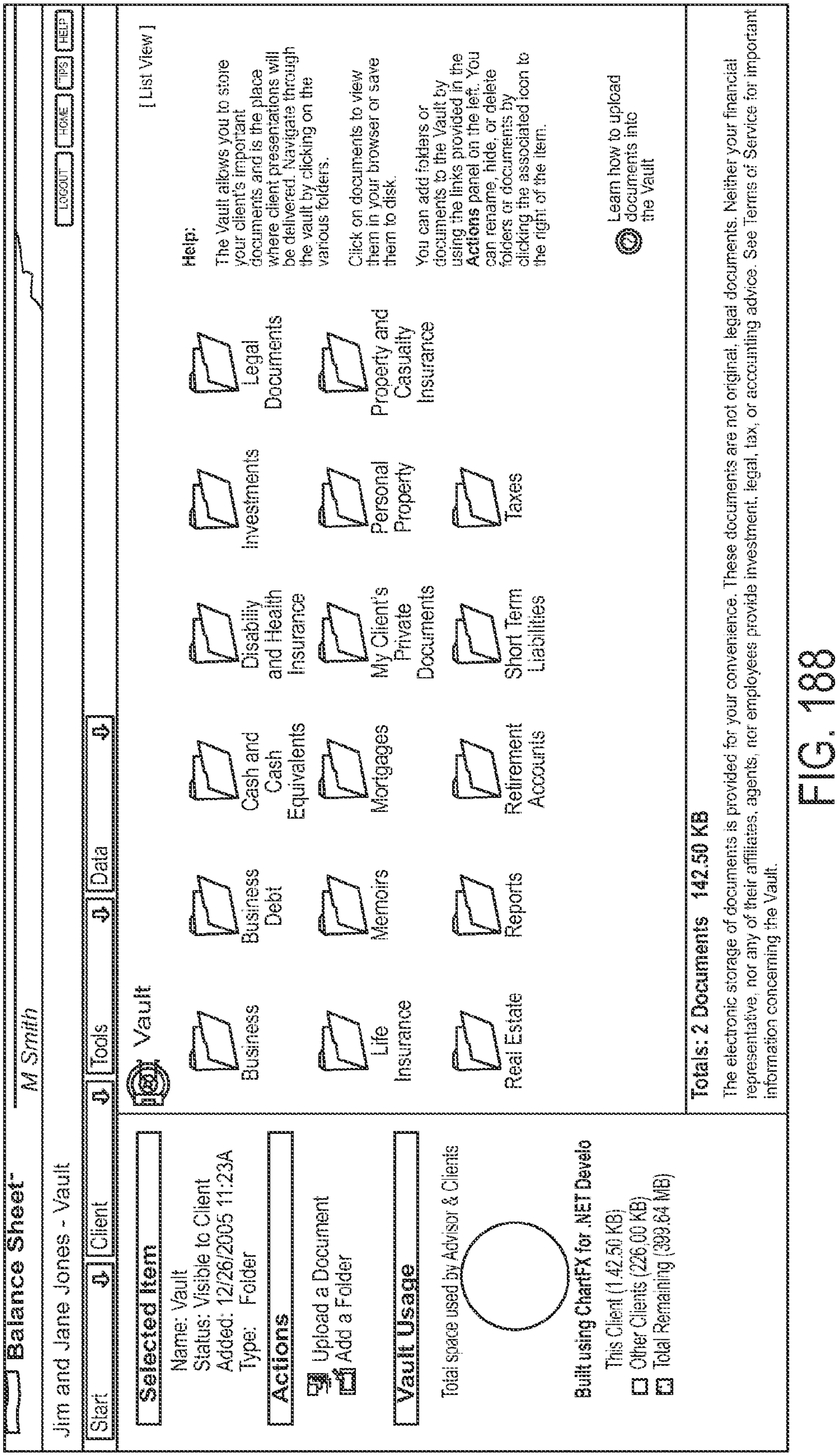

Vault website display page 1870 of FIG. 187 and supporting pages can be used to establish a document vault for the client. Once established, the user may be able to view vault display page 1880 of FIG. 188 which shows a top level view of the vault comprising folders by categories and usage statistics.

Figure 189:
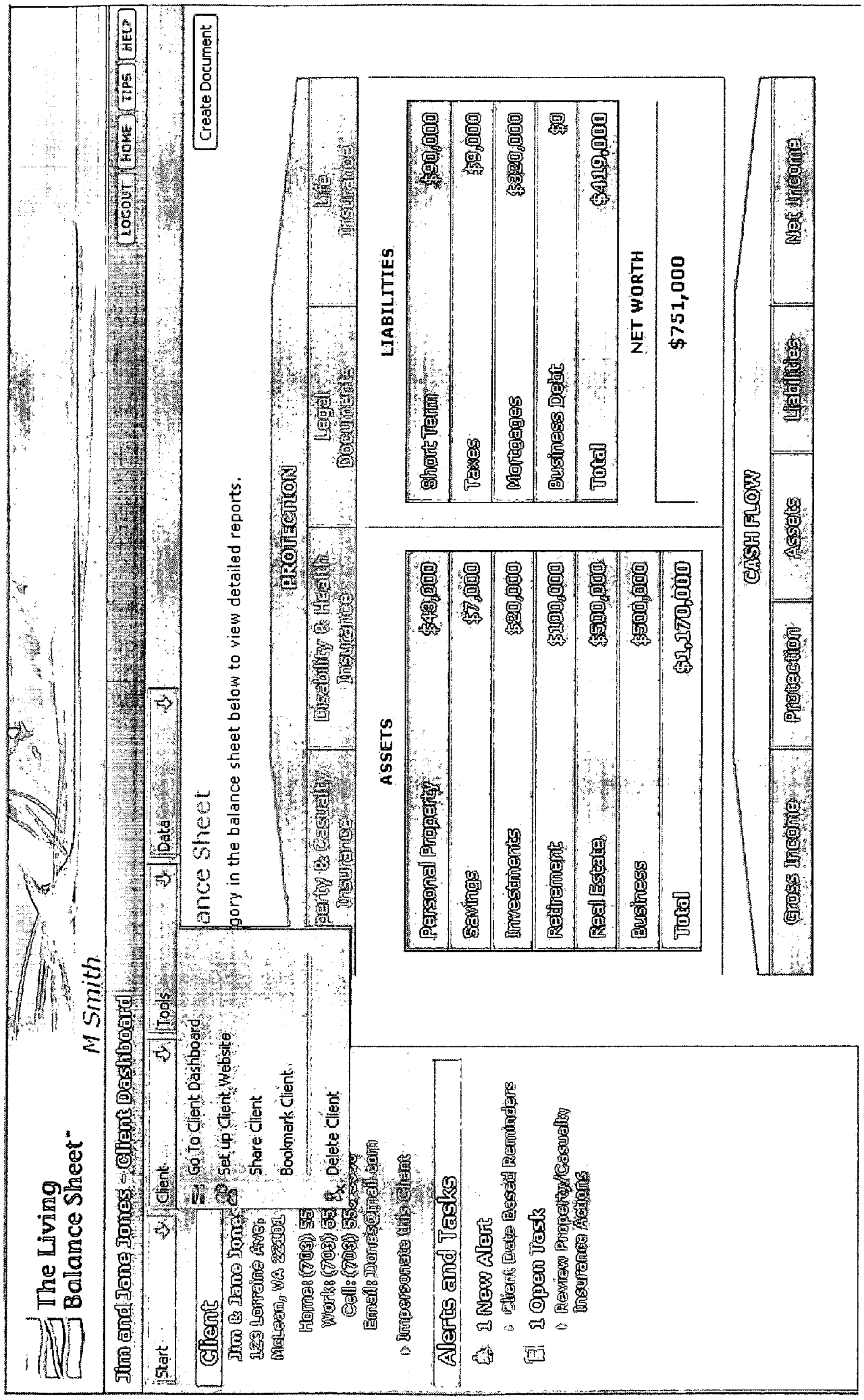
Figure 190:
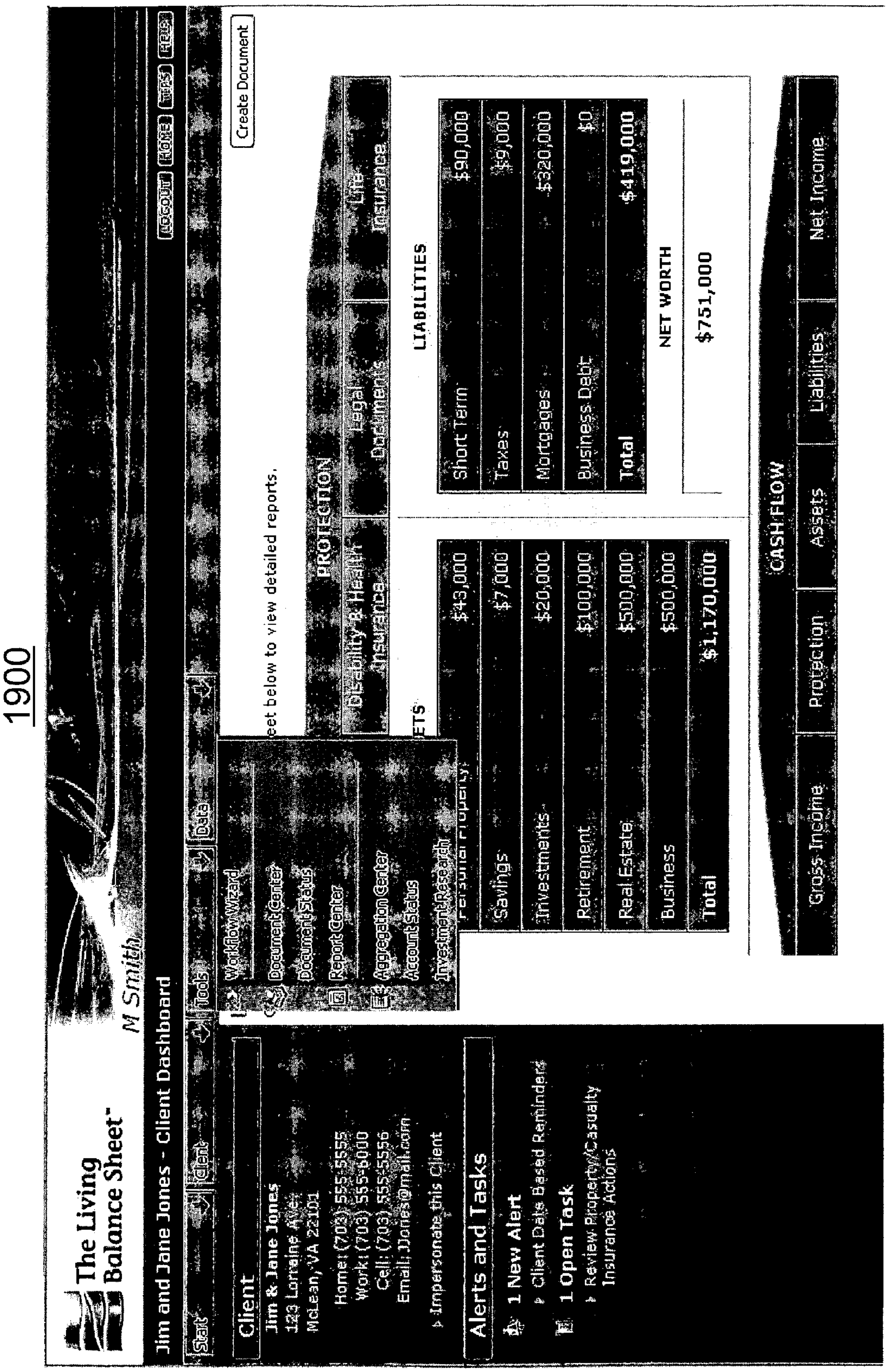
Figure 191:
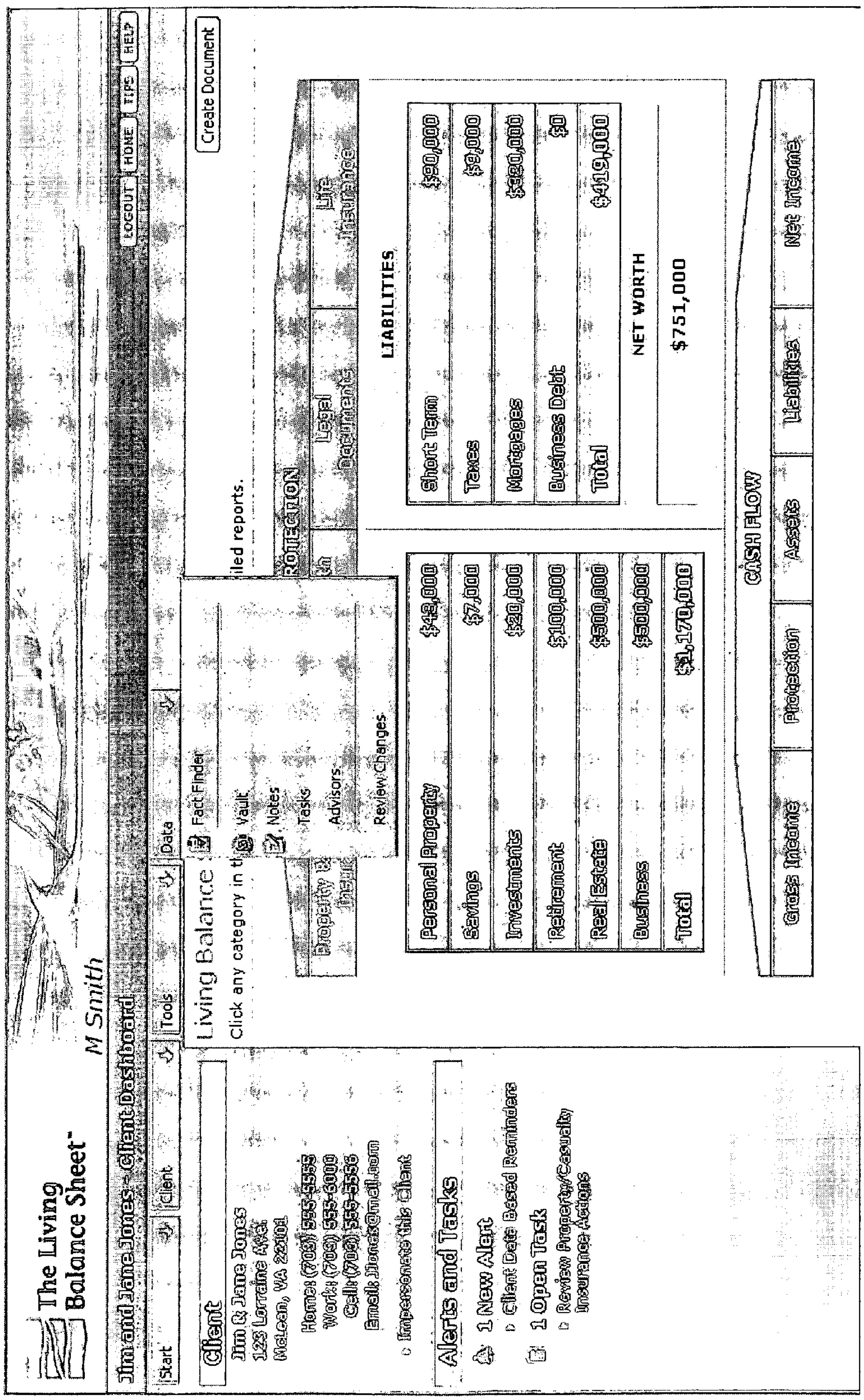
Figure 192:
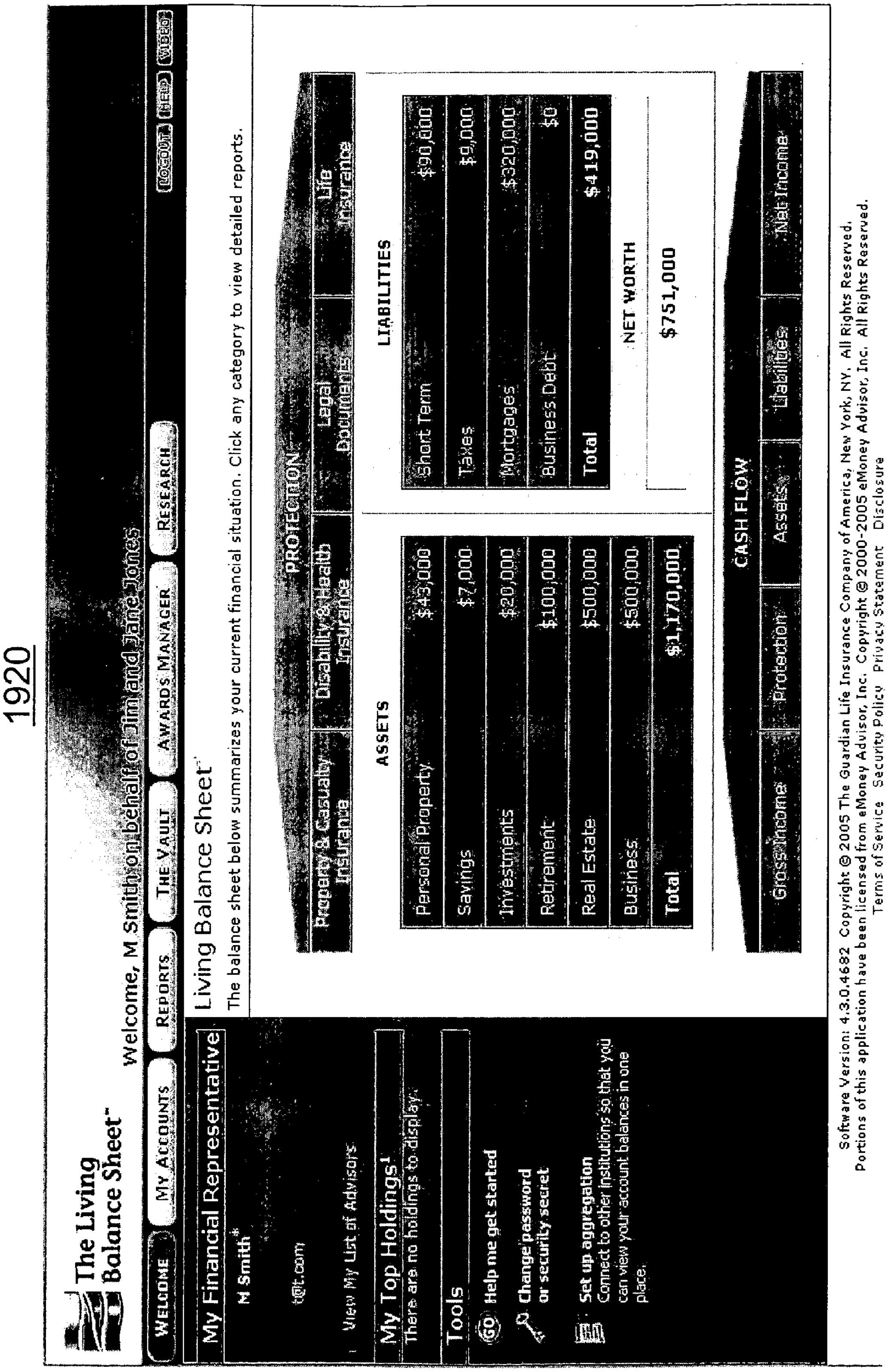
Figure 193:
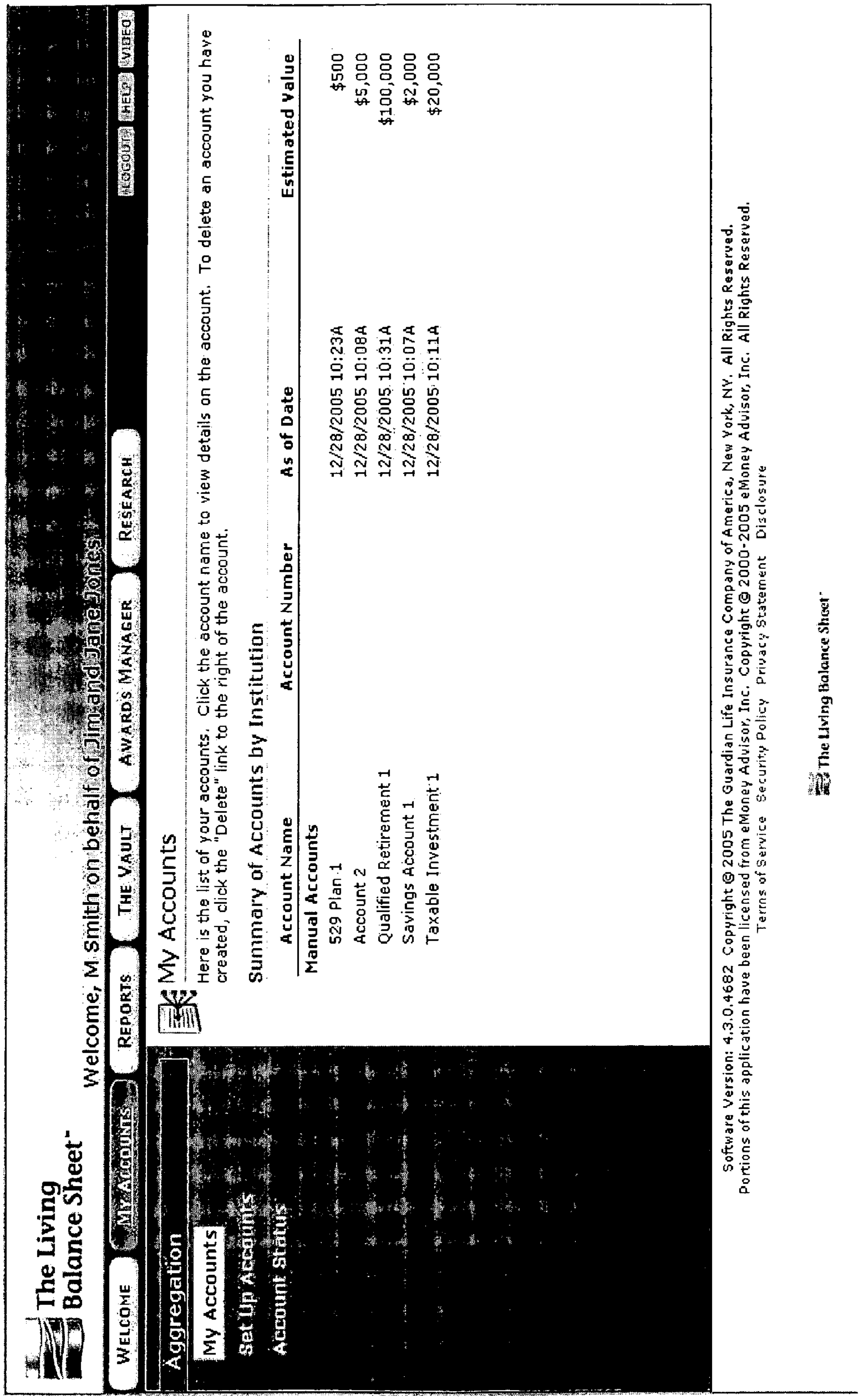
Figure 194:
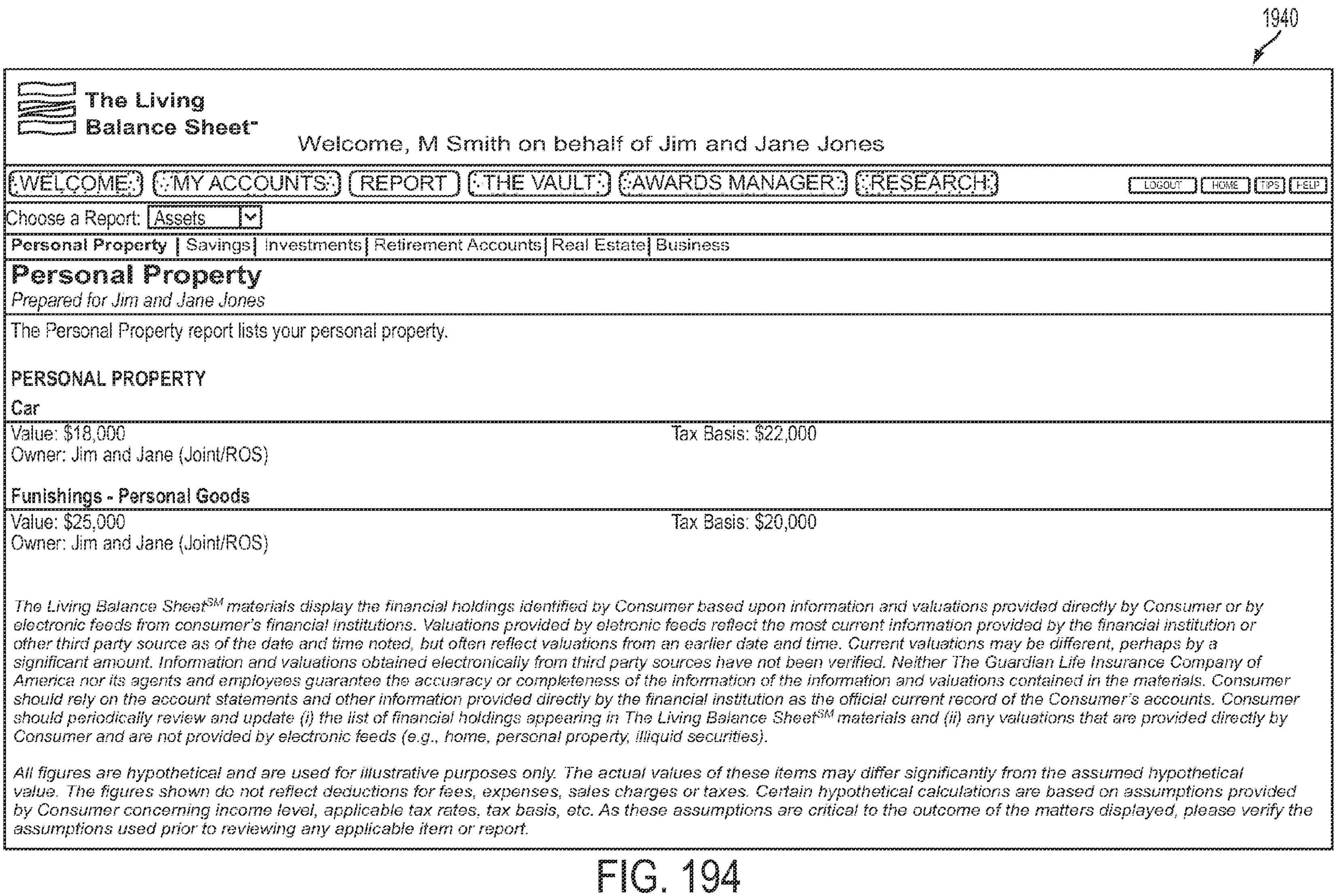
Figure 195:
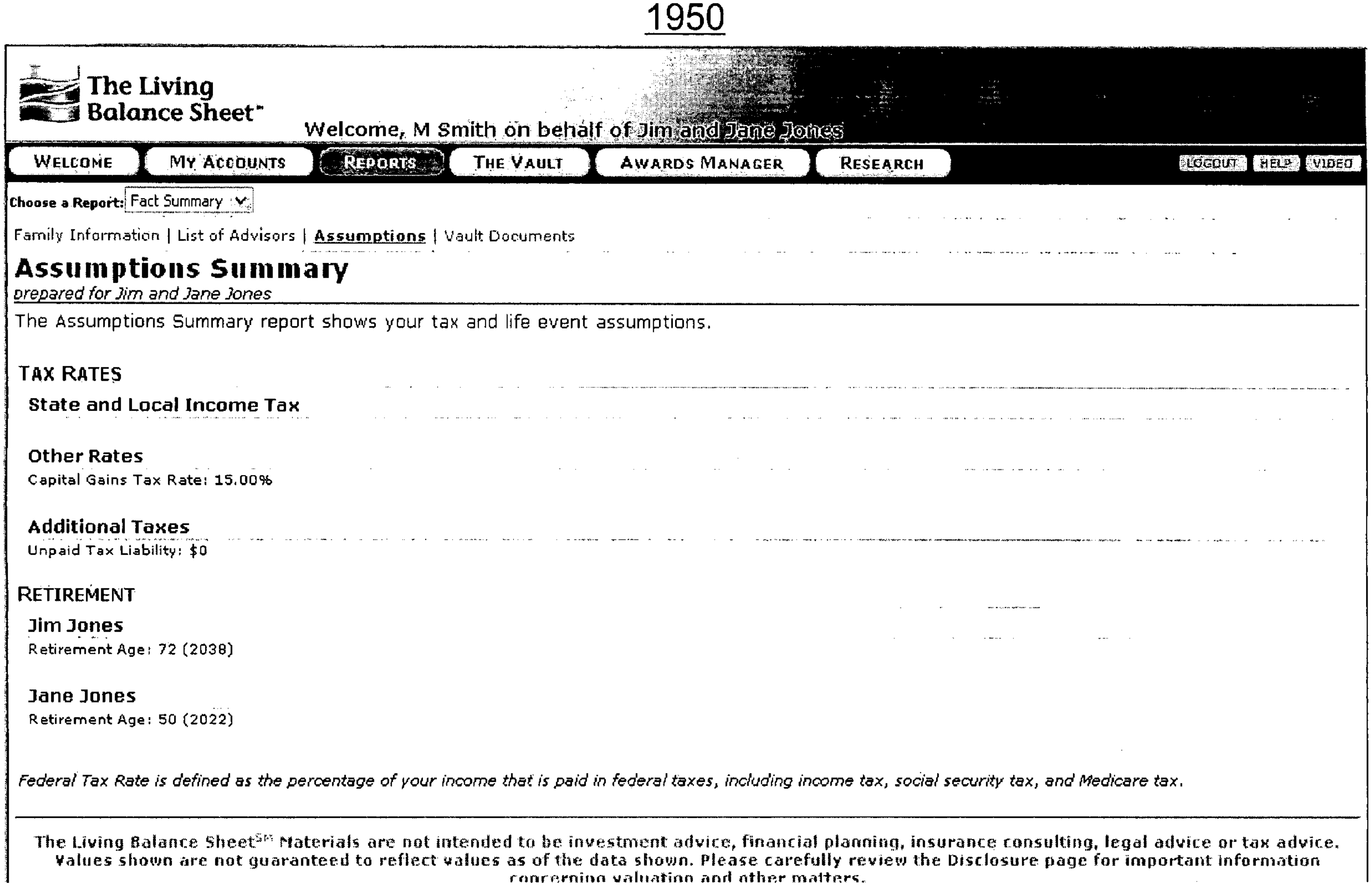

FIGS. 189-191 show different options for accessing tools, options, or display pages within the software.

Figure 196:
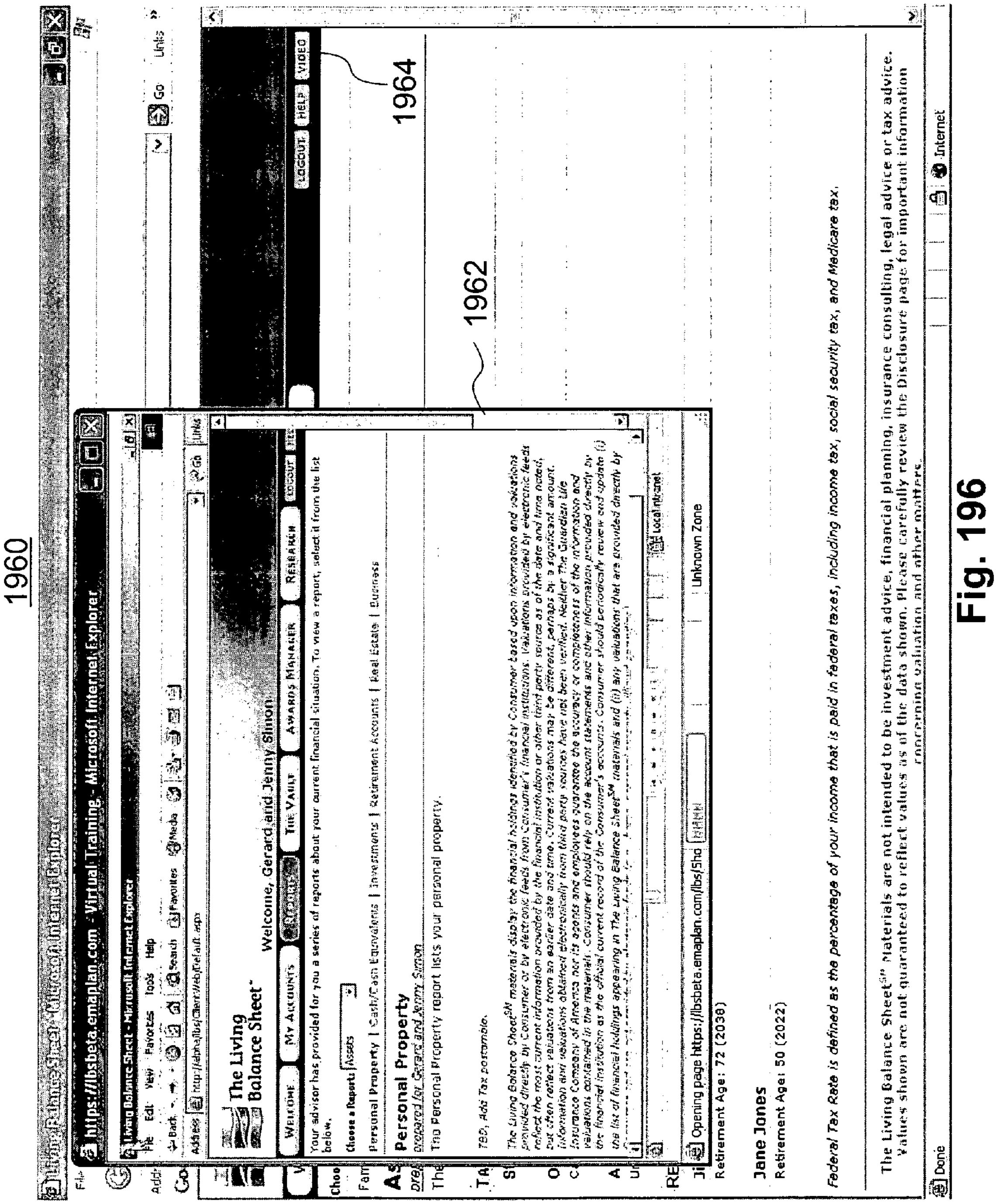

FIGS. 192-196 illustrate examples of display pages of a client website. After a client logs in and is authenticated, the client may be provided access to certain content. For example, living balance sheet display page 1920 of FIG. 192 can be displayed that provides summary information for the client and links to corresponding reports. Another example is accounts display page 1930 of FIG. 193 that provides information on the client's accounts and an estimated value, which may be based on the aggregation service. Various reports that were generated as part of the workflow wizard in the above examples can also be made available to the client via the client website. For example, personal property report display page 1940 of FIG. 194 can be displayed that summarizes the client's personal property information. Assumptions summary display page 1950 of FIG. 195 can also be displayed to the user to show the tax and life event assumptions that have been used for the client. The client website may include video content to aid the user in understanding the various available features and to possibly educate the client or promote products or services. For example, as shown in FIG. 196, a user can select video button 1964 to receive such content. In response, video window 1962 can be displayed to play video that is related to the currently viewed display page.

Figure 197:
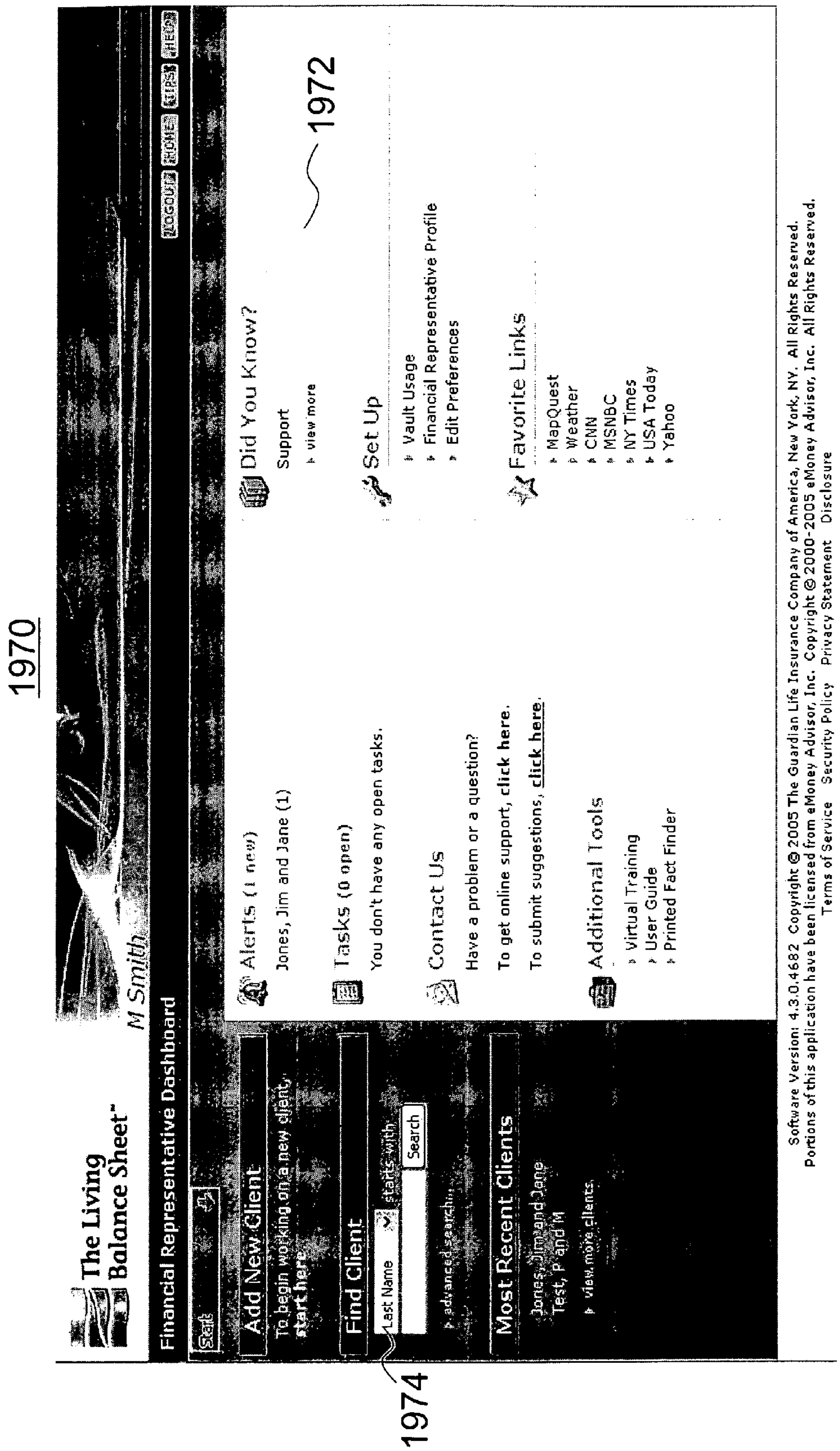

Various other user specific tools and functionality can also be implemented. For example, as shown in FIG. 197, dashboard display page 1970 can be displayed for the user (e.g., an insurance professional). Dashboard display page 1970 can provide the user with a convenient starting point for accessing various business-related links and functionality that may be needed to properly operate the user's insurance related business. For example, display page 1970 can include section 1972 that is divided into sections by categories such as alerts (e.g., to show any alerts that have been triggered for the user such as by a due date), tasks (e.g., any open tasks that are pending for the user such as from selected action steps or items with respect to a client), contact us (e.g., a section that provides quick access to contact information), additional tools, "did you know" (e.g., a section that provides support and education to the user), setup (e.g., for setting up various system aspects), and favorite links section. Display page 1970 can also include client section 1974 that provides options for adding a new client, finding a client within the client database, and active links to most recent clients that the user has interacted with recently.

Figure 198:
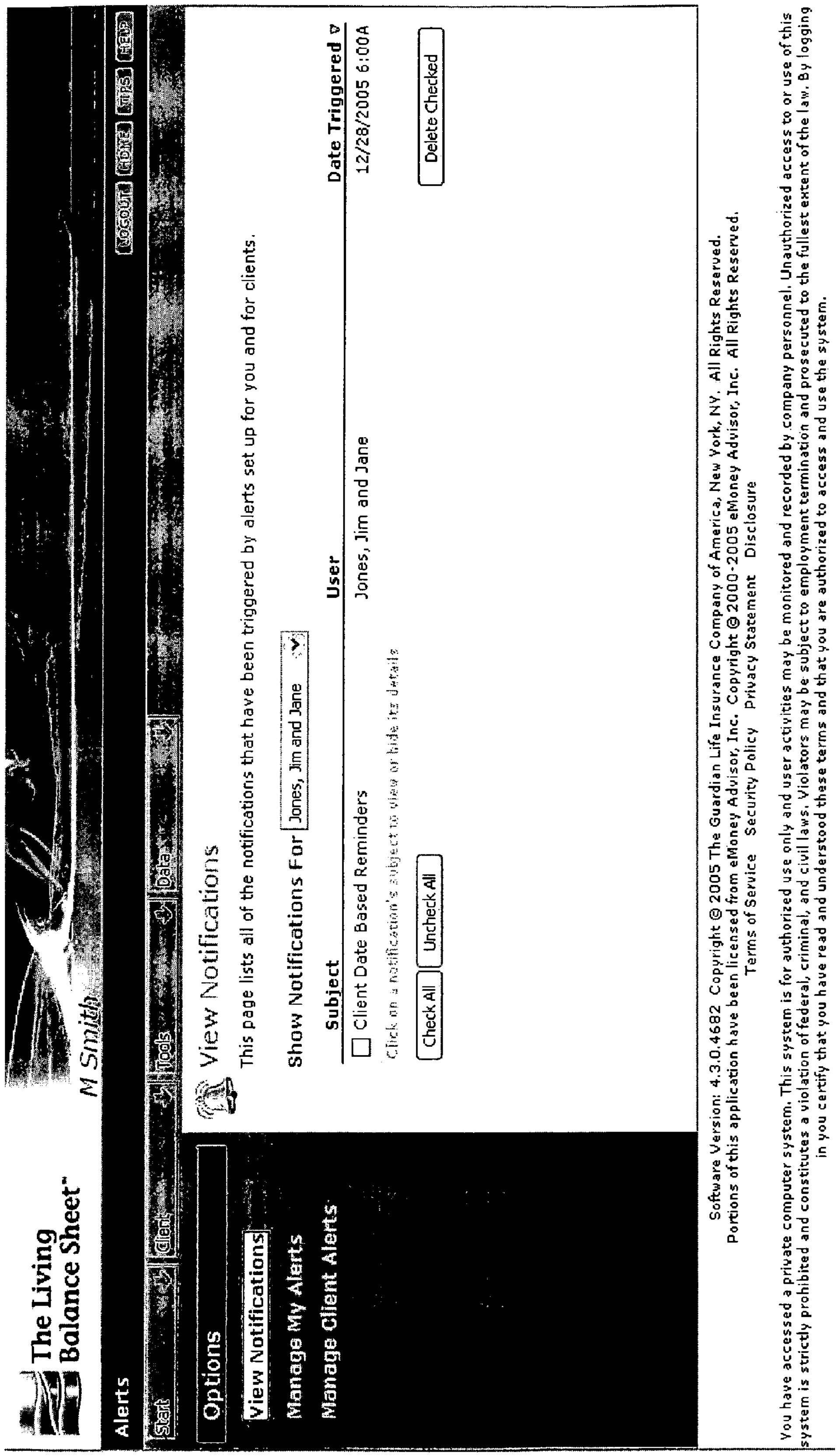
Figure 199:
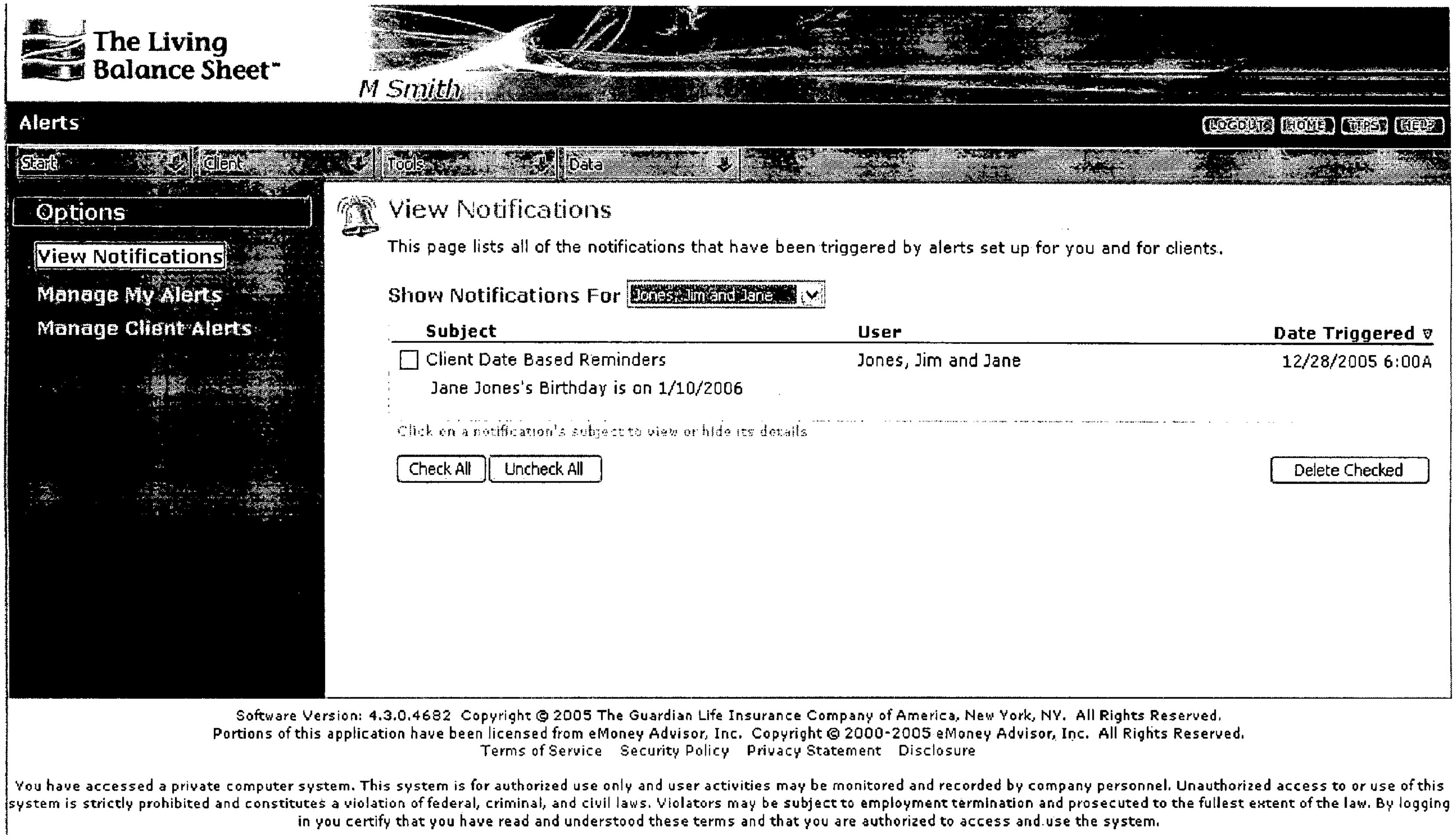
Figure 200:
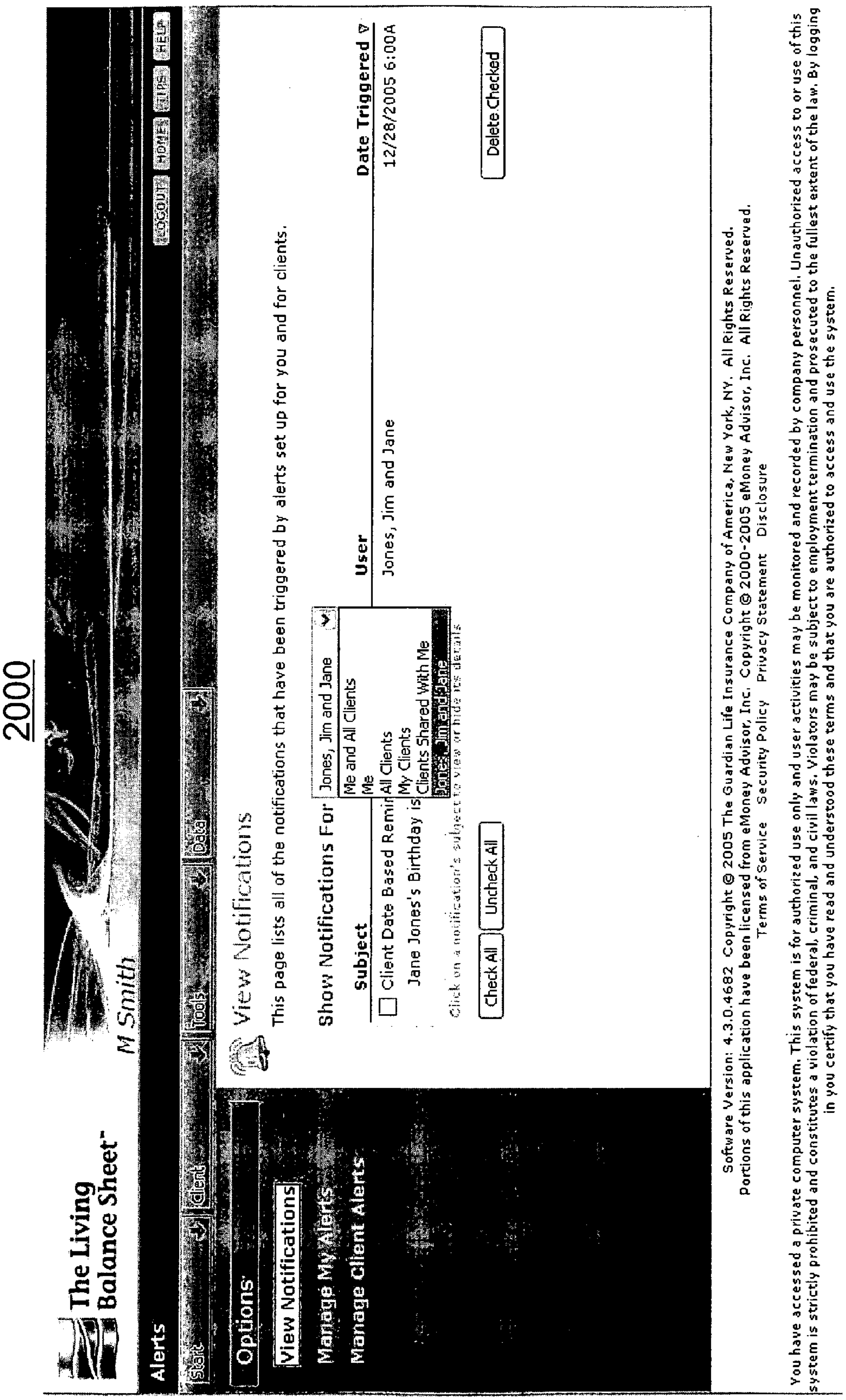
Figure 201:
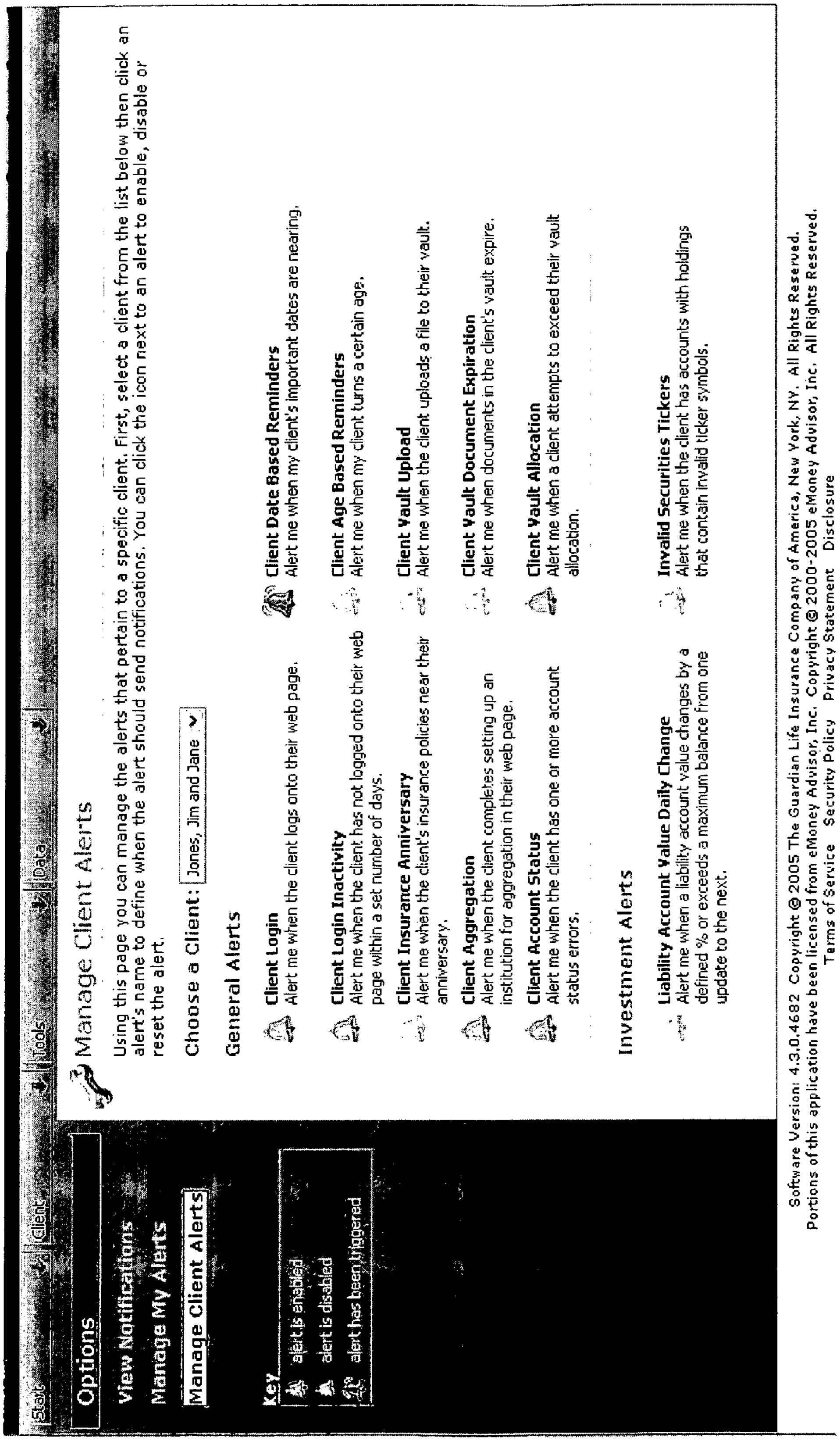

FIGS. 198-200 illustrate that a user can access a view notification display page by selecting the alerts section or a listed alert from dashboard display page 1970. FIGS. 198-200 also illustrate that the user can use a pull-down menu to select a range of notifications that can be displayed such as notifications for a specific client or all of the user's clients. FIG. 201 shows a manage client alerts display page in which preconfigured alerts that could be used for a client can be managed to be activated for the client currently listed in the choose a client section of the display page.

Figure 202:
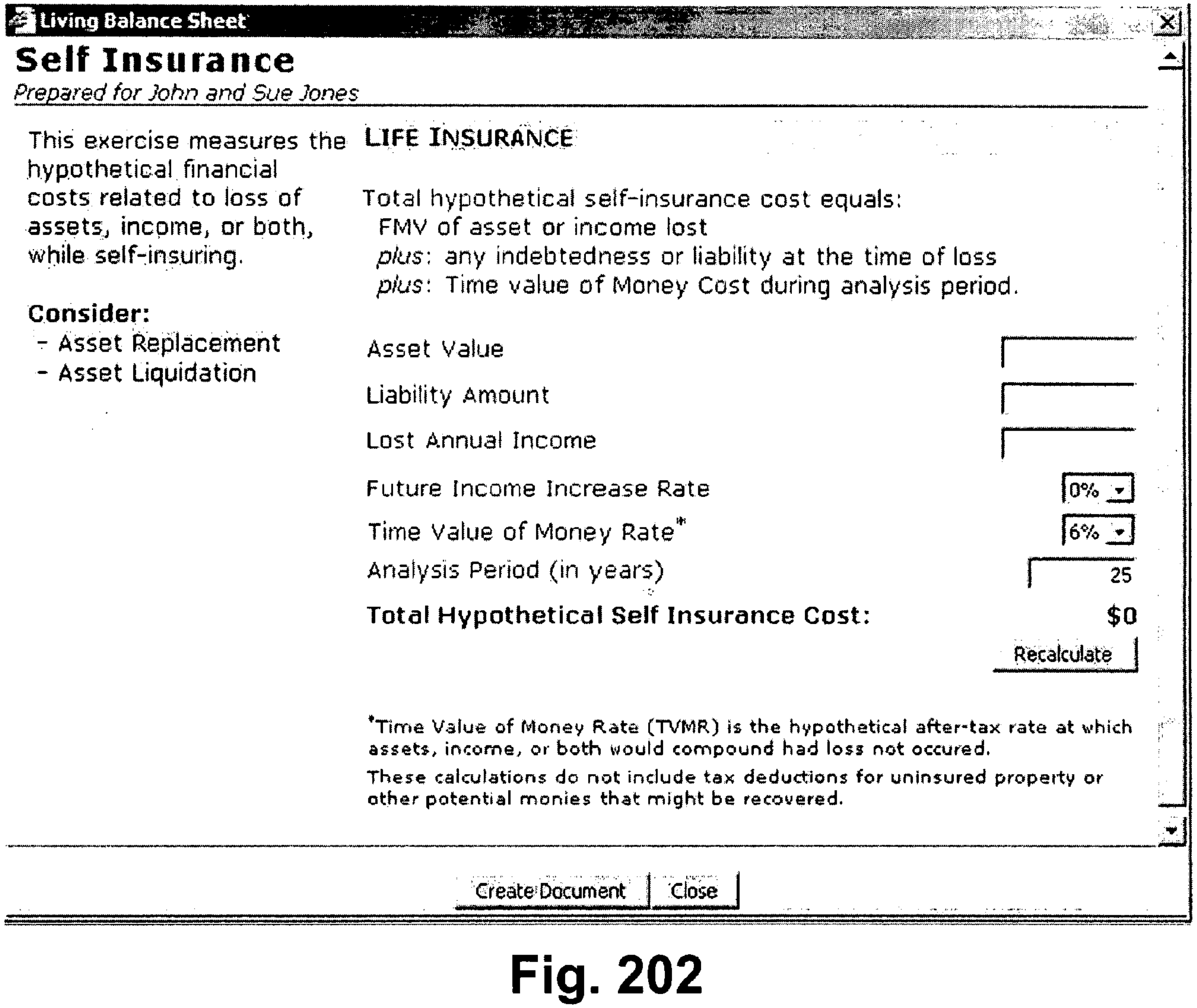

FIGS. 202 and 203 illustrate a self-insurance calculator feature. Self insurance calculator window 2022 can be displayed when a user selects Show Self Insurance Example from the Living Balance Sheet Actions 1554 of FIG. 155. FIG. 155 shows life insurance display page 1540 in protection observations section 1332. The same or similar window as window 2022 can be displayed for other self insurance examples that are identified in the links of the action sections of the insurance protection observations of section 1332. Window 2022 can provide the user with a quick and visual tool to demonstrate that the cost of self-insurance can be much greater than obtaining appropriate insurance. For example, in window 2022, the user can enter a lost annual income of $100,000, select a future income increase rate of 3% per year, a time value of money rate of 6%, and an analysis period as show in window 2023 of FIG. 203. When the user selects the recalculate button the total hypothetical self insurance cost is displayed based on the provided assumptions. The lost annual income, liability amount, and asset value can be used in the calculator to evaluate self-insurance for different types of insurance coverage such as life insurance, or umbrella coverage.

Accordingly, insurance professionals can use such display pages and features to manage and improve many aspects of their business operations and that clients can benefit from such improved operations and information. The display pages can be used as part of a client meeting, to form reports for a client, to practive for a meeting, to identify pertinent facts to discuss with a client, etc.

Although, the insurance-professional specific pages are particularly suited for insurance professionals, if desired, one or more of such pages can be configure for access and use by clients.

Note that the above display pages and processes were presented in particular sequence. However, variations in the order of the process steps, features, and the sequence of display pages, or the separate display or implementation of display pages are also contemplated.

One or more applications may be implemented (e.g., separately, in combination, or as a single application) to provide such insurance related display pages, features, or systems. Note that applications such as applets or modules can be used in or to implement display pages or features thereof.

For convenience and clarity, the word "page" is used herein to describe a graphical user interface through which a user or client interacts with the insurance services environment. Other terms may also be used for these features.

For the sake of brevity, it should be understood that certain structure and functionality, or aspects thereof of embodiments of the present invention that are evident from the illustrations of the FIGS. have not been necessarily restated herein.

A computer readable medium such as a floppy disk, CD-ROM, DVD, etc. may be use to store the processes, techniques, software, and information illustratively described herein.

It is to be understood that the invention is not to be limited to the exact configuration as illustrated and described herein. Accordingly, all expedient modifications readily attainable by one of ordinary skill in the art from the disclosure set forth herein, or by routine experimentation there from, are deemed to be within the spirit and scope of the invention as defined by the appended claims.

What is claimed is:

1. A computer-implemented method comprising:

automatically and periodically accessing current client information from one or more sources, the client information comprising a current financial state;

storing the client information including the current financial state, wherein the current financial state comprises one or more financial parameters and one or more insurance parameters;

receiving from a user a selection to to view a financial impact of an insurance need on the current financial state when the insurance need is triggered;

receiving changes to the one or more insurance parameters from the user corresponding to the insurance need;

calculating, by a computer, a modified version of the current financial state, wherein the modified version of the current financial state reflects a financial change in the current financial state that occurs when the insurance need is triggered and wherein the financial change includes increasing or decreasing one or more values of the one or more financial parameters by applying the one or more changed insurance parameters to the to the one or more financial parameters; and in response to the selection from the user to view the financial impact of the insurance need, presenting an interactive interface comprising the current financial state and the modified version of the current financial state.

2. The method of claim 1, wherein the insurance need comprises life Insurance.

3. The method of claim 1, wherein the insurance need comprises disability insurance.

4. The method of claim 1 wherein the interactive interface displays the current financial state in numerical values.

5. The method of claim 1 wherein the interactive interface comprises side-by-side tabular information for the current financial state and the modified version of the current financial state.

6. The method of claim 1, wherein the one or more changed insurance parameters correspond to an additional insurance need.

7. The method of claim 1 wherein the interactive interface provides the user with an opportunity to select to payoff debts in calculating the modified version of the current financial state.

8. The method of claim 1 wherein the interactive interface is presented in a browser.

9. The method of claim 1 further comprising calculating the current financial state by aggregating client account information from various sources.

10. The method of claim 1, further comprising:

implementing a multilayer software application for insurance professionals that comprises a first layer that gathers the client information for a plurality of clients of a user, a second layer that automatically generates reports and related action steps based on the gathered data, and a third layer that delivers the reports to the plurality of clients of the user; and wherein the storing client information further comprises storing client-specific user activity within the multilayer software application to record the client information and to track a current state of interactions with respect to at least one of the plurality of clients of the user.

11. The method of claim 10, wherein the multilayer software application presents a workflow wizard that sequentially displays sections of the workflow wizard for interaction by the user in a sequence that is consistent with the first, second, and third layers.

12. The method of claim 1 further comprising implementing aggregation services for collecting the client information.

13. The method of claim 1 further comprising implementing a client website for accessing at least some of the client information that is stored.

14. The method claim 1, wherein the current financial state comprises data related to a client's assets, liabilities and cash flow.

15. The method of claim 1, further comprising:

providing access to client-specific content through a personal website for a client.

16. The method of claim 1, further comprising:

providing the user with an opportunity to select one or more debts to payoff with an insurance proceed that is received in response to the trigger in calculating the modified version of the current financial state.

17. The method of claim 1, further comprising selling an insurance product.

18. A system for interactively analyzing and illustrating an insurance need, the system comprising:

an interface configured to automatically and periodically access current client information from one or more sources, the client information comprising a current financial state;

a memory configured to store the client information including the current financial state, wherein the current financial state comprises one or more financial parameters and one or more insurance parameters;

an input device configured to receive a selection from a user to view a financial impact of an insurance need on the current financial state when the insurance need is triggered, the input device being further configured to receive changes to the one or more insurance parameters corresponding to the insurance need;

a computer linked to the memory and configured to calculate a modified version of the current financial state, wherein the modified version of the current financial state reflects a financial change in the current financial state that occurs when the insurance need is triggered and wherein the financial change includes increasing or decreasing one or more values of the one or more financial parameters by applying the one or more changed insurance parameters to the one or more financial parameters; and an interactive interface linked to the computer and the memory, said interactive interface configured, in response to the selection from the user to view the financial impact of the insurance need, to display the current financial state and the modified version of the current financial state.

19. The system of claim 18, wherein the insurance need comprises life insurance.

20. The system of claim 18, wherein the insurance need comprises disability insurance.

21. The system of claim 18, wherein the interactive interface is configured to display the current financial state in numerical values.

22. The system of claim 18, wherein the interactive interface is configured to display side-by-side tabular information for the current financial state and the modified version of the current financial state.

23. The system of claim 18, wherein the one or more insurance parameters correspond to an additional insurance need.

24. The system of claim 18, wherein the interactive interface is further configured to receive a selection to payoff debts, which is applied in calculating the modified version of the current financial state.

25. The system of claim 18, wherein the interactive interface is configured to be displayed in a browser.

26. The system of claim 18, further comprising:

an aggregation service that is configured to calculate the current financial state by aggregating client account information from various sources.

27. The system of claim 18, further comprising:

a multilayer software application for insurance professionals that comprises a first layer configured to gather client information for a plurality of clients of a user, a second layer configured to automatically generate reports, and a third layer configured to deliver the reports to the plurality of clients of the user; and wherein the multilayer application is configured to store client-specific user activity to record the client information and to track a current state of interactions with respect to at least one of the plurality of clients of the user.

28. The system of claim 27, wherein the multilayer software application comprises a workflow wizard that is configured to sequentially display sections of the workflow wizard for interaction by the user in a sequence that is consistent with the first, second, and third layers.

29. The system of claim 18, further comprising:

an aggregation service configured to collect the client information.

30. The system of claim 18, further comprising:

a client website configured to access at least some of the client information that is stored.

31. The system of claim 18, wherein the current financial state comprises data related to a client's assets, liabilities and cash flow.

32. The system of claim 18, wherein the interactive interface is further configured to provide access to client-specific content through a personal website for a client.

33. The system of claim 18, wherein the computer is further configured to receive a selection for one or more debts to payoff with an insurance proceed proceeds received in response to the trigger in calculating the modified version of the current financial state.

34. The system of claim 18, wherein the interactive interface is further configured to facilitate selling of an insurance product.

35. A non-transitory computer-readable medium having computer-executable instructions stored thereon, wherein the computer-executable instructions in response to execution by a computer cause the computer to perform operations for a method of interactively analyzing and illustrating a client's insurance needs, the operations comprising:

automatically and periodically accessing current client information from one or more sources, the client information comprising a current financial state;

storing client information including the current financial state, wherein the current financial state comprises one or more financial parameters and one or more insurance parameters;

receiving from a user a selection to to view a financial impact of an insurance need on the current financial state when the insurance need is triggered;

receiving changes to the one or more insurance parameters from the user corresponding to the insurance need;

calculating a modified version of the current financial state, wherein the modified version of the current financial state reflects a financial change in the current financial state that occurs when the insurance need is triggered and wherein the financial change includes an increase or a decrease in one or more values of the one or more financial parameters; and in response to the selection from the user to view the financial impact of the insurance need, displaying the current financial state and the modified version of the current financial state to the user to a user.

36. The non-transitory computer readable medium of claim 35, wherein the insurance need comprises life insurance.

37. The non-transitory computer readable medium of claim 35, wherein the insurance need comprises disability insurance.

38. The non-transitory computer readable medium of claim 35, wherein the interactive interface displays the current financial state in numerical values.

39. The non-transitory computer readable medium of claim 35, wherein the interactive interface comprises side-by-side tabular information for the current financial state and the modified version of the current financial state.

40. The non-transitory computer readable medium of claim 35, wherein the one or more insurance parameters correspond to an additional insurance need.

41. The non-transitory computer readable medium of claim 35, wherein the interactive interface provides the user with an opportunity to select to payoff debts in calculating the modified version of the current financial state.

42. The non-transitory computer readable medium of claim 35, wherein the interactive interface is presented in a browser.

43. The non-transitory computer readable medium of claim 35, the operations further comprising:

calculating the current financial state by aggregating client account information from various sources.

44. The non-transitory computer readable medium of claim 35, wherein the operations further comprise implementing a multilayer software application for insurance professionals that comprises a first layer that gathers client information for a plurality of clients of a user, a second layer that automatically generates reports and related action steps based on the gathered client information, and a third layer that delivers the reports to the plurality of clients of the user; and wherein the storing client information further comprises storing client-specific user activity within the multilayer software application to record client information and to track a current state of interactions with respect to at least one of the plurality of clients of the user.

45. The non-transitory computer readable medium of claim 44, wherein the multilayer software application comprises:

a workflow wizard that sequentially displays sections of the workflow wizard for interaction by the user in a sequence that is consistent with the first, second, and third layers.

46. The non-transitory computer readable medium of claim 35, wherein the operations further comprise:

implementing aggregation services that collect the client information.

47. The non-transitory computer readable medium of claim 35, wherein the operations further comprise:

implementing a client website that accesses at least some of the client information that is stored.

48. The non-transitory computer readable medium of claim 35 wherein the current financial state comprises data related to a client's assets, liabilities and cash flow.

49. The non-transitory computer readable medium of claim 35, the operations further comprising providing access to client-specific content through a personal website for a client.

50. The non-transitory computer readable medium of claim 35, the operations further comprising providing the user with an opportunity to select one or more debts to payoff with insurance proceeds received in response to the trigger in calculating the modified version of the current financial state.

51. The non-transitory computer readable medium of claim 35, the operations further comprising selling insurance products.

* * * * *

UNITED STATES PATENT AND TRADEMARK OFFICE

CERTIFICATE OF CORRECTION

PATENT NO. : 8,073,714 B1
APPLICATION NO. : 11/510537
DATED : December 6, 2011
INVENTOR(S) : Ball It is certified that error appears in the above-identified patent and that said Letters Patent is hereby corrected as shown below:

In the Claims

Claim 1, col. 50, line 56-57 should read "...receiving from a user a selection to view a financial impact..." delete "...receiving from a user a selection to to view a financial impact...".

Claim 1, col. 1, line 1-2 should read "...or more changed insurance parameters to the one or more financial parameters..." delete "...or more changed insurance parameters to the to the one or more financial parameters...".

Claim 33, col. 53, line 23 should read "...payoff with an insurance proceed received in..." delete "...payoff with an insurance proceed proceeds received in...".

Claim 35, col. 53, line 42-43 should read "...receiving from a user a selection to view a financial impact..." delete "...receiving from a user a selection to to view a financial impact...".

Claim 35, col. 53, line 57 should read "...current financial state to the user..." delete "current financial state to the user to a user...".

Signed and Sealed this
Eighteenth Day of March, 2014

Michelle K. Lee
*Deputy Director of the United States Patent and Trademark Office*

UNITED STATES PATENT AND TRADEMARK OFFICE

CERTIFICATE OF CORRECTION

PATENT NO. : 8,073,714 B1
APPLICATION NO. : 11/510537
DATED : December 6, 2011
INVENTOR(S) : Ball It is certified that error appears in the above-identified patent and that said Letters Patent is hereby corrected as shown below:

In the Claims

Claim 1, col. 50, line 56-57 should read "...receiving from a user a selection to view a financial impact..." delete "...receiving from a user a selection to to view a financial impact...".

Claim 1, col. 51, line 1-2 should read "...or more changed insurance parameters to the one or more financial parameters..." delete "...or more changed insurance parameters to the to the one or more financial parameters...".

Claim 33, col. 53, line 23 should read "...payoff with an insurance proceed received in..." delete "...payoff with an insurance proceed proceeds received in...".

Claim 35, col. 53, line 42-43 should read "...receiving from a user a selection to view a financial impact..." delete "...receiving from a user a selection to to view a financial impact...".

Claim 35, col. 53, line 57 should read "...current financial state to the user..." delete "current financial state to the user to a user...".

This certificate supersedes the Certificate of Correction issued March 18, 2014.

Signed and Sealed this
Fifteenth Day of April, 2014

Michelle K. Lee
*Deputy Director of the United States Patent and Trademark Office*